United States Patent [19]

Rutherfoord et al.

[11] Patent Number: 4,893,256

[45] Date of Patent: Jan. 9, 1990

[54] INTERACTIVE VIDEO COMPOSITION AND PRESENTATION SYSTEMS

[75] Inventors: Charles T. Rutherfoord, DeKalb; Nancy S. Frank, Fulton, both of Ga.

[73] Assignee: International Business Machines Corporation, Armonk, N.Y.

[21] Appl. No.: 848,171

[22] Filed: Apr. 4, 1986

[51] Int. Cl.[4] .......... G06F 13/10

[52] U.S. Cl. .......... 364/518; 364/521; 364/144

[58] Field of Search .......... 364/518, 521, 579, 580, 364/130, 138, 143–146, 147; 360/14.3, 54, 72.2; 369/14, 19, 20, 30, 49, 83

[56] References Cited

U.S. PATENT DOCUMENTS

| | | | |
|---|---|---|---|
| 4,279,012 | 7/1981 | Beckedorff et al. | 364/145 |
| 4,449,180 | 5/1984 | Ohshima et al. | 364/521 X |
| 4,470,107 | 9/1984 | Daab | 364/130 X |
| 4,516,166 | 5/1985 | Tellone | 360/14.3 X |
| 4,522,482 | 6/1985 | Pettigrew et al. | 364/518 X |
| 4,538,188 | 8/1985 | Barker et al. | 360/14.3 |
| 4,591,931 | 5/1986 | Baumeister | 360/72.2 X |
| 4,591,997 | 5/1986 | Grabel | 364/518 X |
| 4,634,386 | 1/1987 | Tamaki | 360/72.2 X |
| 4,639,881 | 1/1987 | Zingher | 364/518 X |
| 4,675,755 | 6/1987 | Baumeister et al. | 360/72.2 X |
| 4,675,832 | 6/1987 | Robinson et al. | 364/521 |
| 4,677,570 | 6/1987 | Taki | 364/518 |
| 4,679,148 | 7/1987 | Wood | 364/143 X |
| 4,717,971 | 1/1988 | Sawyer | 369/83 X |

FOREIGN PATENT DOCUMENTS 3413529 10/1984 Fed. Rep. of Germany .

OTHER PUBLICATIONS

Proceedings of the IFIP 9th World Computer Congress, Sep. 1983, Szabo et al., pp. 839–845.
1985 Frontiers in Education Conference Proceedings, Oct. 1985 Barker et al., pp. 265–272.
Proceedings of the IFIP 9th World Computer Congress, 19th–23rd, Sep. 1983, Pairs, FR, pp. 839–845.
1985 Frontiers in Education Conference Proceedings 19th–22nd, Oct. 1985, Golden, CO, US, pp. 265–272.

*Primary Examiner*—Emanuel S. Kemeny
*Assistant Examiner*—Mark K. Zimmerman
*Attorney, Agent, or Firm*—Whitman & Marhoefer

[57] ABSTRACT

A method for specifying and executing independent, multi-media tasks along a synchronizing time-line, preferably in the form of a spreadsheet matrix with the event elements making up the rows and the time periods the columns. The media include various pieces of hardware such as touch screens, voice synthesizers, video disk players, and the like. In designing a presentation, the author types into the matrix indications of which piece of hardware will be operating and for what specified period of time during the presentation. This information is also accessible to all other events in the presentation thereby allowing complex multi-media presentations to be designed by a user who is relatively unsophisticated in using computers.

14 Claims, 9 Drawing Sheets

FIG. 1

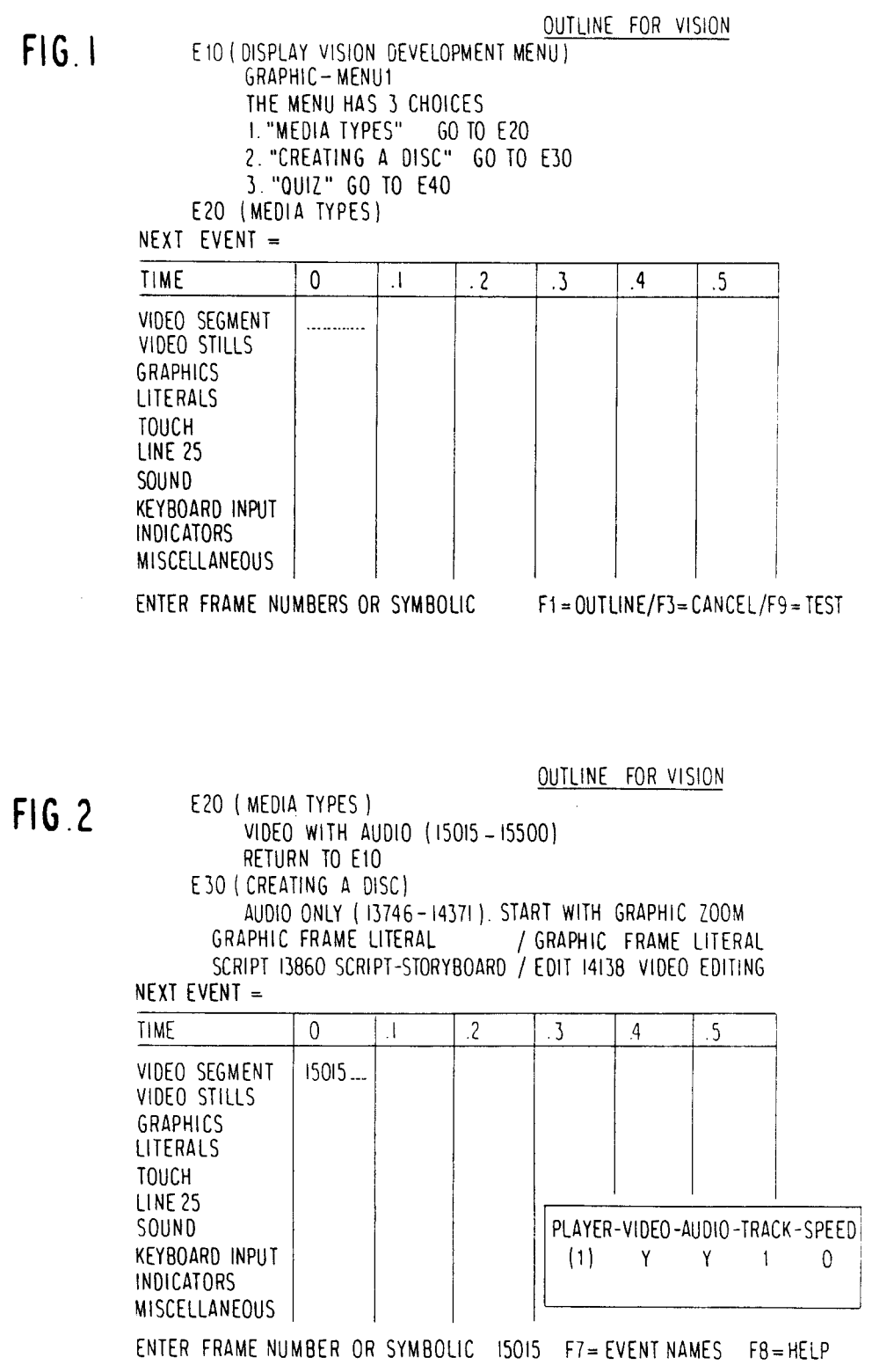

OUTLINE FOR VISION

E10 (DISPLAY VISION DEVELOPMENT MENU)
GRAPHIC-MENU1
THE MENU HAS 3 CHOICES
1. "MEDIA TYPES" GO TO E20
2. "CREATING A DISC" GO TO E30
3. "QUIZ" GO TO E40
E20 (MEDIA TYPES)

NEXT EVENT =

| TIME | 0 | .1 | .2 | .3 | .4 | .5 |
|---|---|---|---|---|---|---|
| VIDEO SEGMENT | ............ | | | | | |
| VIDEO STILLS | | | | | | |
| GRAPHICS | | | | | | |
| LITERALS | | | | | | |
| TOUCH | | | | | | |
| LINE 25 | | | | | | |
| SOUND | | | | | | |
| KEYBOARD INPUT | | | | | | |
| INDICATORS | | | | | | |
| MISCELLANEOUS | | | | | | |

ENTER FRAME NUMBERS OR SYMBOLIC F1=OUTLINE/F3=CANCEL/F9=TEST

FIG. 2

OUTLINE FOR VISION

E20 (MEDIA TYPES)
VIDEO WITH AUDIO (15015-15500)
RETURN TO E10
E30 (CREATING A DISC)
AUDIO ONLY (13746-14371). START WITH GRAPHIC ZOOM
GRAPHIC FRAME LITERAL / GRAPHIC FRAME LITERAL
SCRIPT 13860 SCRIPT-STORYBOARD / EDIT 14138 VIDEO EDITING

NEXT EVENT =

| TIME | 0 | .1 | .2 | .3 | .4 | .5 |
|---|---|---|---|---|---|---|
| VIDEO SEGMENT | 15015--- | | | | | |
| VIDEO STILLS | | | | | | |
| GRAPHICS | | | | | | |
| LITERALS | | | | | | |
| TOUCH | | | | | | |
| LINE 25 | | | | | | |
| SOUND | | | | | | |
| KEYBOARD INPUT | | | | | | |
| INDICATORS | | | | | | |
| MISCELLANEOUS | | | | | | |

| PLAYER | VIDEO | AUDIO | TRACK | SPEED |
|---|---|---|---|---|
| (1) | Y | Y | 1 | 0 |

ENTER FRAME NUMBER OR SYMBOLIC 15015 F7=EVENT NAMES F8=HELP

FIG. 3

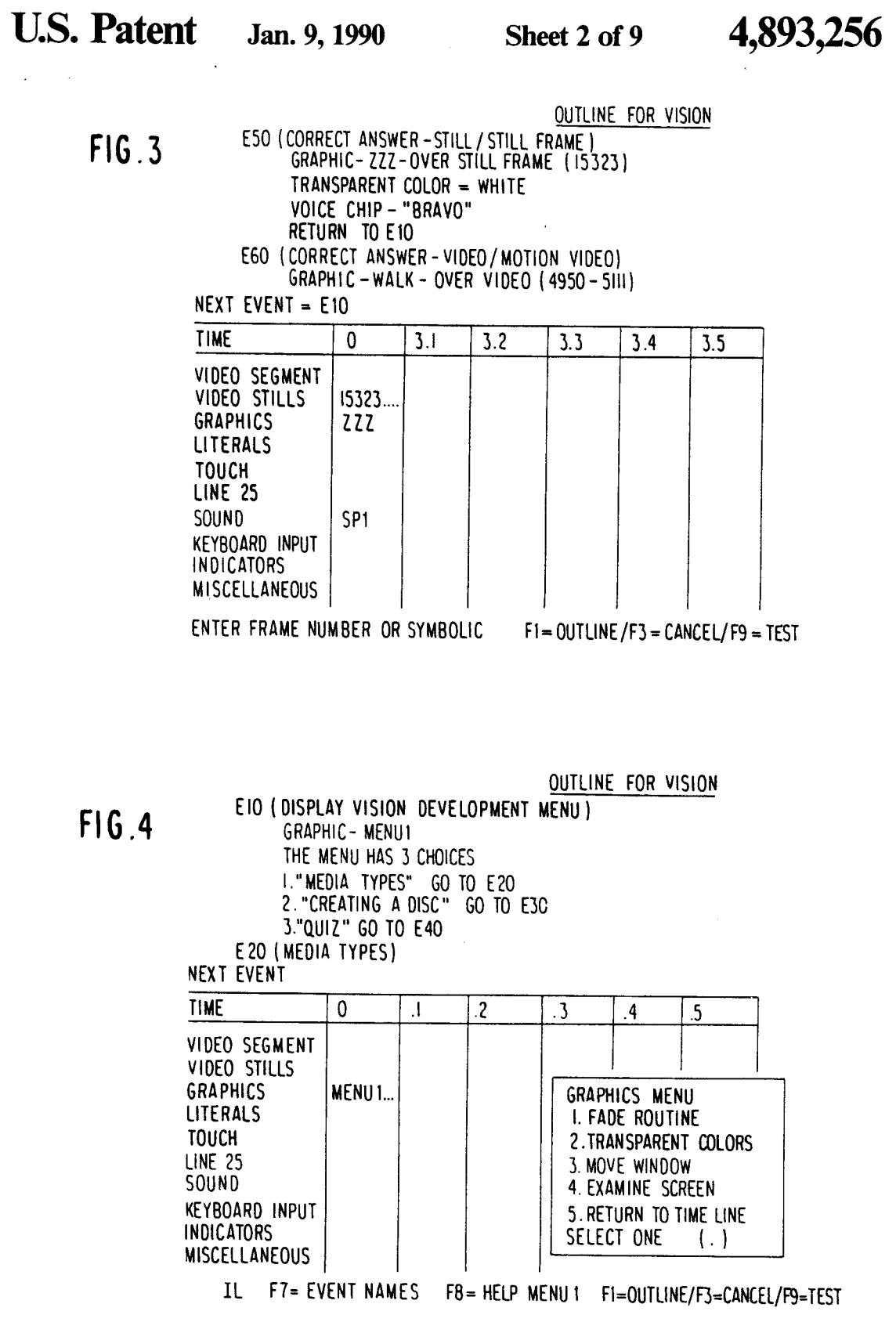

OUTLINE FOR VISION

E50 (CORRECT ANSWER-STILL/STILL FRAME)
GRAPHIC-ZZZ-OVER STILL FRAME (15323)
TRANSPARENT COLOR = WHITE
VOICE CHIP-"BRAVO"
RETURN TO E10
E60 (CORRECT ANSWER-VIDEO/MOTION VIDEO)
GRAPHIC-WALK-OVER VIDEO (4950-5111)
NEXT EVENT = E10

| TIME | 0 | 3.1 | 3.2 | 3.3 | 3.4 | 3.5 |
|---|---|---|---|---|---|---|
| VIDEO SEGMENT | | | | | | |
| VIDEO STILLS | 15323.... | | | | | |
| GRAPHICS | ZZZ | | | | | |
| LITERALS | | | | | | |
| TOUCH | | | | | | |
| LINE 25 | | | | | | |
| SOUND | SP1 | | | | | |
| KEYBOARD INPUT | | | | | | |
| INDICATORS | | | | | | |
| MISCELLANEOUS | | | | | | |

ENTER FRAME NUMBER OR SYMBOLIC F1=OUTLINE/F3=CANCEL/F9=TEST

FIG. 4

OUTLINE FOR VISION

E10 (DISPLAY VISION DEVELOPMENT MENU)
GRAPHIC-MENU1
THE MENU HAS 3 CHOICES
1."MEDIA TYPES" GO TO E20
2."CREATING A DISC" GO TO E30
3."QUIZ" GO TO E40
E20 (MEDIA TYPES)
NEXT EVENT

| TIME | 0 | .1 | .2 | .3 | .4 | .5 |
|---|---|---|---|---|---|---|
| VIDEO SEGMENT | | | | | | |
| VIDEO STILLS | | | | | | |
| GRAPHICS | MENU1... | | | | | |
| LITERALS | | | | | | |
| TOUCH | | | | | | |
| LINE 25 | | | | | | |
| SOUND | | | | | | |
| KEYBOARD INPUT | | | | | | |
| INDICATORS | | | | | | |
| MISCELLANEOUS | | | | | | |

GRAPHICS MENU
1. FADE ROUTINE
2. TRANSPARENT COLORS
3. MOVE WINDOW
4. EXAMINE SCREEN
5. RETURN TO TIME LINE
SELECT ONE (.)

IL F7= EVENT NAMES F8= HELP MENU 1 F1=OUTLINE/F3=CANCEL/F9=TEST

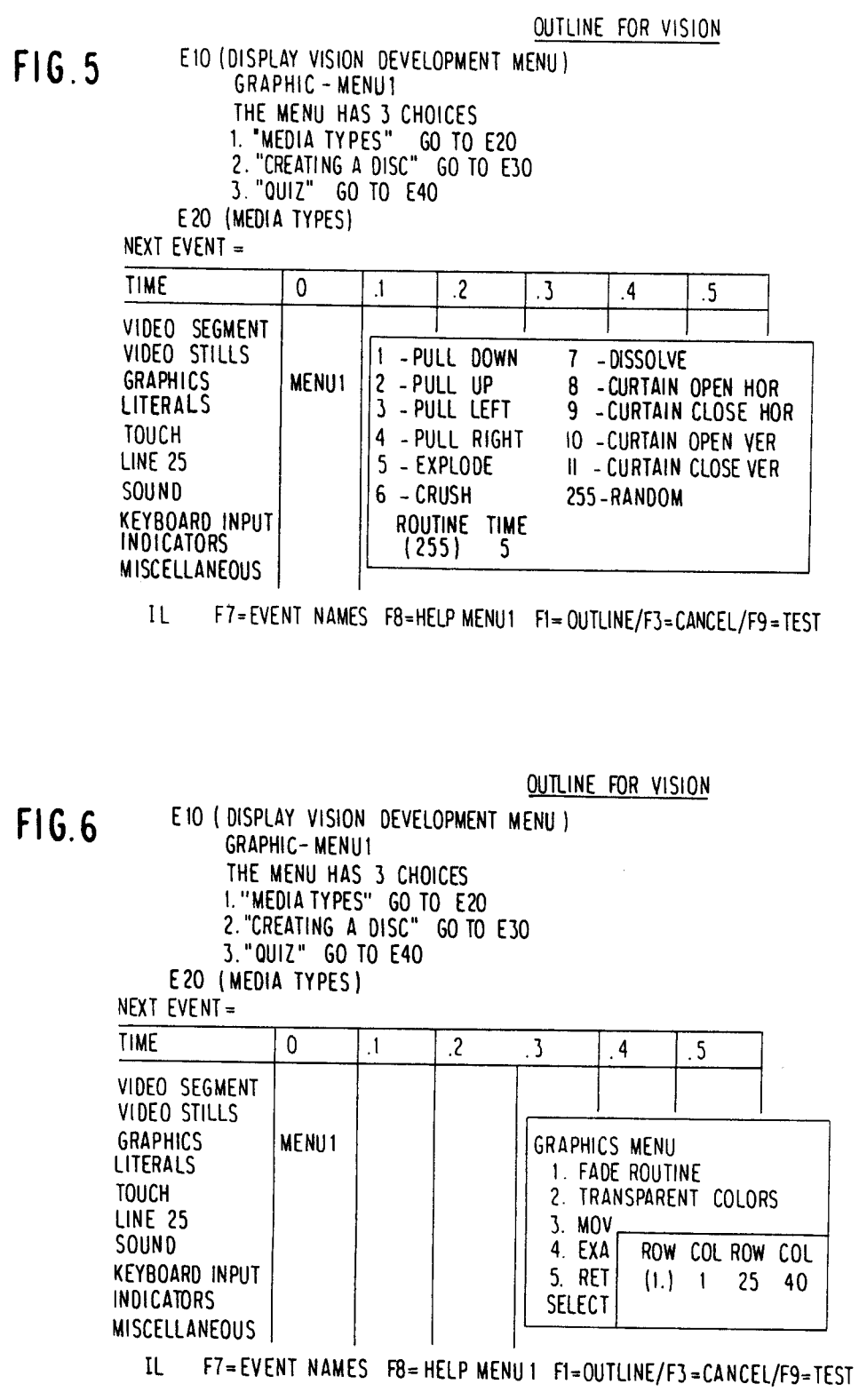

OUTLINE FOR VISION

FIG. 5

E10 (DISPLAY VISION DEVELOPMENT MENU)
GRAPHIC - MENU1
THE MENU HAS 3 CHOICES
1. "MEDIA TYPES" GO TO E20
2. "CREATING A DISC" GO TO E30
3. "QUIZ" GO TO E40
E20 (MEDIA TYPES)
NEXT EVENT =

| TIME | 0 | .1 | .2 | .3 | .4 | .5 |
|---|---|---|---|---|---|---|
| VIDEO SEGMENT | | | | | | |
| VIDEO STILLS | | | | | | |
| GRAPHICS | MENU1 | | | | | |
| LITERALS | | | | | | |
| TOUCH | | | | | | |
| LINE 25 | | | | | | |
| SOUND | | | | | | |
| KEYBOARD INPUT | | | | | | |
| INDICATORS | | | | | | |
| MISCELLANEOUS | | | | | | |

| | |
|---|---|
| 1 - PULL DOWN | 7 - DISSOLVE |
| 2 - PULL UP | 8 - CURTAIN OPEN HOR |
| 3 - PULL LEFT | 9 - CURTAIN CLOSE HOR |
| 4 - PULL RIGHT | 10 - CURTAIN OPEN VER |
| 5 - EXPLODE | 11 - CURTAIN CLOSE VER |
| 6 - CRUSH | 255 - RANDOM |

ROUTINE TIME
(255) 5

IL F7=EVENT NAMES F8=HELP MENU1 F1=OUTLINE/F3=CANCEL/F9=TEST

OUTLINE FOR VISION

FIG. 6

E10 ( DISPLAY VISION DEVELOPMENT MENU )
GRAPHIC- MENU1
THE MENU HAS 3 CHOICES
1. "MEDIA TYPES" GO TO E20
2. "CREATING A DISC" GO TO E30
3. "QUIZ" GO TO E40
E20 (MEDIA TYPES)
NEXT EVENT =

| TIME | 0 | .1 | .2 | .3 | .4 | .5 |
|---|---|---|---|---|---|---|
| VIDEO SEGMENT | | | | | | |
| VIDEO STILLS | | | | | | |
| GRAPHICS | MENU1 | | | | | |
| LITERALS | | | | | | |
| TOUCH | | | | | | |
| LINE 25 | | | | | | |
| SOUND | | | | | | |
| KEYBOARD INPUT | | | | | | |
| INDICATORS | | | | | | |
| MISCELLANEOUS | | | | | | |

GRAPHICS MENU
1. FADE ROUTINE
2. TRANSPARENT COLORS
3. MOV
4. EXA
5. RET
SELECT

| ROW | COL | ROW | COL |
|---|---|---|---|
| (1.) | 1 | 25 | 40 |

IL F7=EVENT NAMES F8=HELP MENU1 F1=OUTLINE/F3=CANCEL/F9=TEST

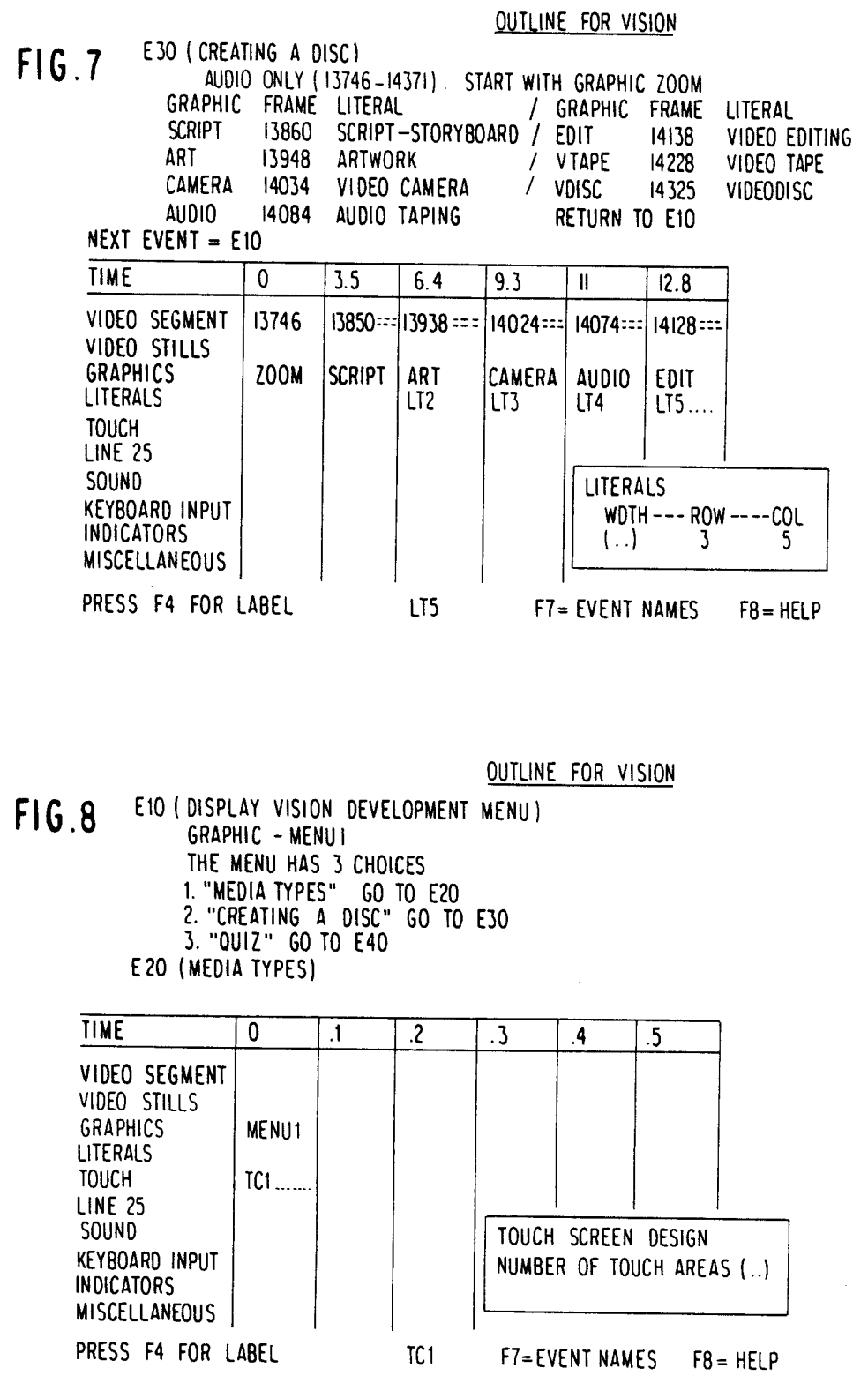

OUTLINE FOR VISION

FIG.7

E30 (CREATING A DISC)

AUDIO ONLY (13746-14371). START WITH GRAPHIC ZOOM

| GRAPHIC | FRAME | LITERAL | / | GRAPHIC | FRAME | LITERAL |
|---|---|---|---|---|---|---|
| SCRIPT | 13860 | SCRIPT-STORYBOARD | / | EDIT | 14138 | VIDEO EDITING |
| ART | 13948 | ARTWORK | / | VTAPE | 14228 | VIDEO TAPE |
| CAMERA | 14034 | VIDEO CAMERA | / | VDISC | 14325 | VIDEODISC |
| AUDIO | 14084 | AUDIO TAPING | | RETURN TO E10 | | |

NEXT EVENT = E10

| TIME | 0 | 3.5 | 6.4 | 9.3 | 11 | 12.8 |
|---|---|---|---|---|---|---|
| VIDEO SEGMENT | 13746 | 13850::: | 13938::: | 14024::: | 14074::: | 14128::: |
| VIDEO STILLS | | | | | | |
| GRAPHICS | ZOOM | SCRIPT | ART | CAMERA | AUDIO | EDIT |
| LITERALS | | | LT2 | LT3 | LT4 | LT5.... |
| TOUCH | | | | | | |
| LINE 25 | | | | | | |
| SOUND | | | | | | |
| KEYBOARD INPUT | | | | | | |
| INDICATORS | | | | | | |
| MISCELLANEOUS | | | | | | |

LITERALS
WDTH --- ROW ----COL
(..) 3 5

PRESS F4 FOR LABEL LT5 F7= EVENT NAMES F8= HELP

OUTLINE FOR VISION

FIG.8

E10 (DISPLAY VISION DEVELOPMENT MENU)

GRAPHIC - MENU1

THE MENU HAS 3 CHOICES

1. "MEDIA TYPES" GO TO E20
2. "CREATING A DISC" GO TO E30
3. "QUIZ" GO TO E40

E20 (MEDIA TYPES)

| TIME | 0 | .1 | .2 | .3 | .4 | .5 |
|---|---|---|---|---|---|---|
| VIDEO SEGMENT | | | | | | |
| VIDEO STILLS | | | | | | |
| GRAPHICS | MENU1 | | | | | |
| LITERALS | | | | | | |
| TOUCH | TC1....... | | | | | |
| LINE 25 | | | | | | |
| SOUND | | | | | | |
| KEYBOARD INPUT | | | | | | |
| INDICATORS | | | | | | |
| MISCELLANEOUS | | | | | | |

TOUCH SCREEN DESIGN
NUMBER OF TOUCH AREAS (..)

PRESS F4 FOR LABEL TC1 F7=EVENT NAMES F8= HELP

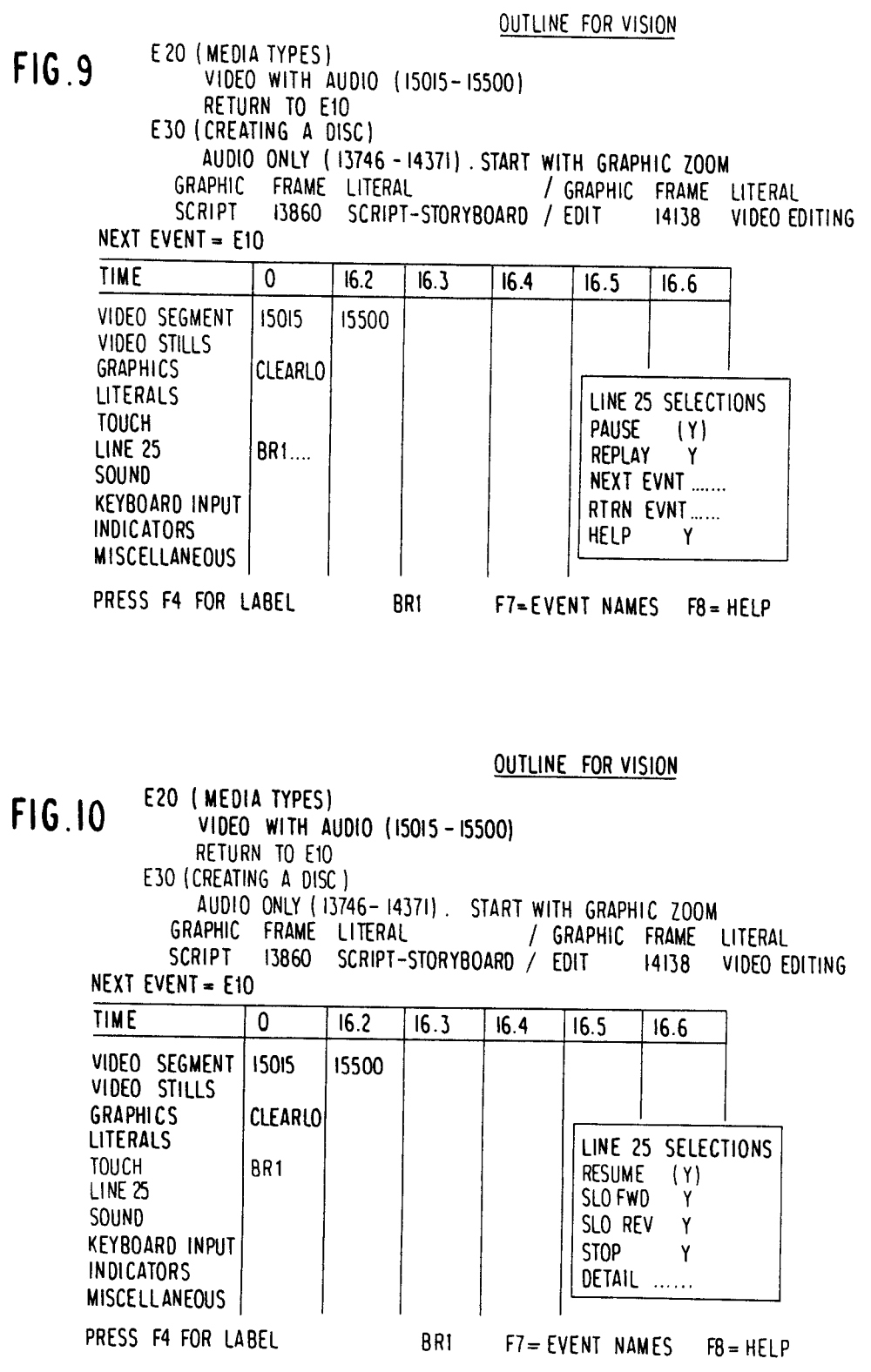

OUTLINE FOR VISION

FIG. 9

E20 (MEDIA TYPES)
VIDEO WITH AUDIO (15015-15500)
RETURN TO E10
E30 (CREATING A DISC)
AUDIO ONLY (13746-14371). START WITH GRAPHIC ZOOM
GRAPHIC FRAME LITERAL / GRAPHIC FRAME LITERAL
SCRIPT 13860 SCRIPT-STORYBOARD / EDIT 14138 VIDEO EDITING
NEXT EVENT = E10

| TIME | 0 | 16.2 | 16.3 | 16.4 | 16.5 | 16.6 |
|---|---|---|---|---|---|---|
| VIDEO SEGMENT | 15015 | 15500 | | | | |
| VIDEO STILLS | | | | | | |
| GRAPHICS | CLEARLO | | | | | |
| LITERALS | | | | | | |
| TOUCH | | | | | | |
| LINE 25 | BR1.... | | | | | |
| SOUND | | | | | | |
| KEYBOARD INPUT | | | | | | |
| INDICATORS | | | | | | |
| MISCELLANEOUS | | | | | | |

LINE 25 SELECTIONS
PAUSE (Y)
REPLAY Y
NEXT EVNT .......
RTRN EVNT......
HELP Y

PRESS F4 FOR LABEL BR1 F7=EVENT NAMES F8=HELP

OUTLINE FOR VISION

FIG. 10

E20 (MEDIA TYPES)
VIDEO WITH AUDIO (15015-15500)
RETURN TO E10
E30 (CREATING A DISC)
AUDIO ONLY (13746-14371). START WITH GRAPHIC ZOOM
GRAPHIC FRAME LITERAL / GRAPHIC FRAME LITERAL
SCRIPT 13860 SCRIPT-STORYBOARD / EDIT 14138 VIDEO EDITING
NEXT EVENT = E10

| TIME | 0 | 16.2 | 16.3 | 16.4 | 16.5 | 16.6 |
|---|---|---|---|---|---|---|
| VIDEO SEGMENT | 15015 | 15500 | | | | |
| VIDEO STILLS | | | | | | |
| GRAPHICS | CLEARLO | | | | | |
| LITERALS | | | | | | |
| TOUCH | BR1 | | | | | |
| LINE 25 | | | | | | |
| SOUND | | | | | | |
| KEYBOARD INPUT | | | | | | |
| INDICATORS | | | | | | |
| MISCELLANEOUS | | | | | | |

LINE 25 SELECTIONS
RESUME (Y)
SLO FWD Y
SLO REV Y
STOP Y
DETAIL ......

PRESS F4 FOR LABEL BR1 F7=EVENT NAMES F8=HELP

FIG. 13

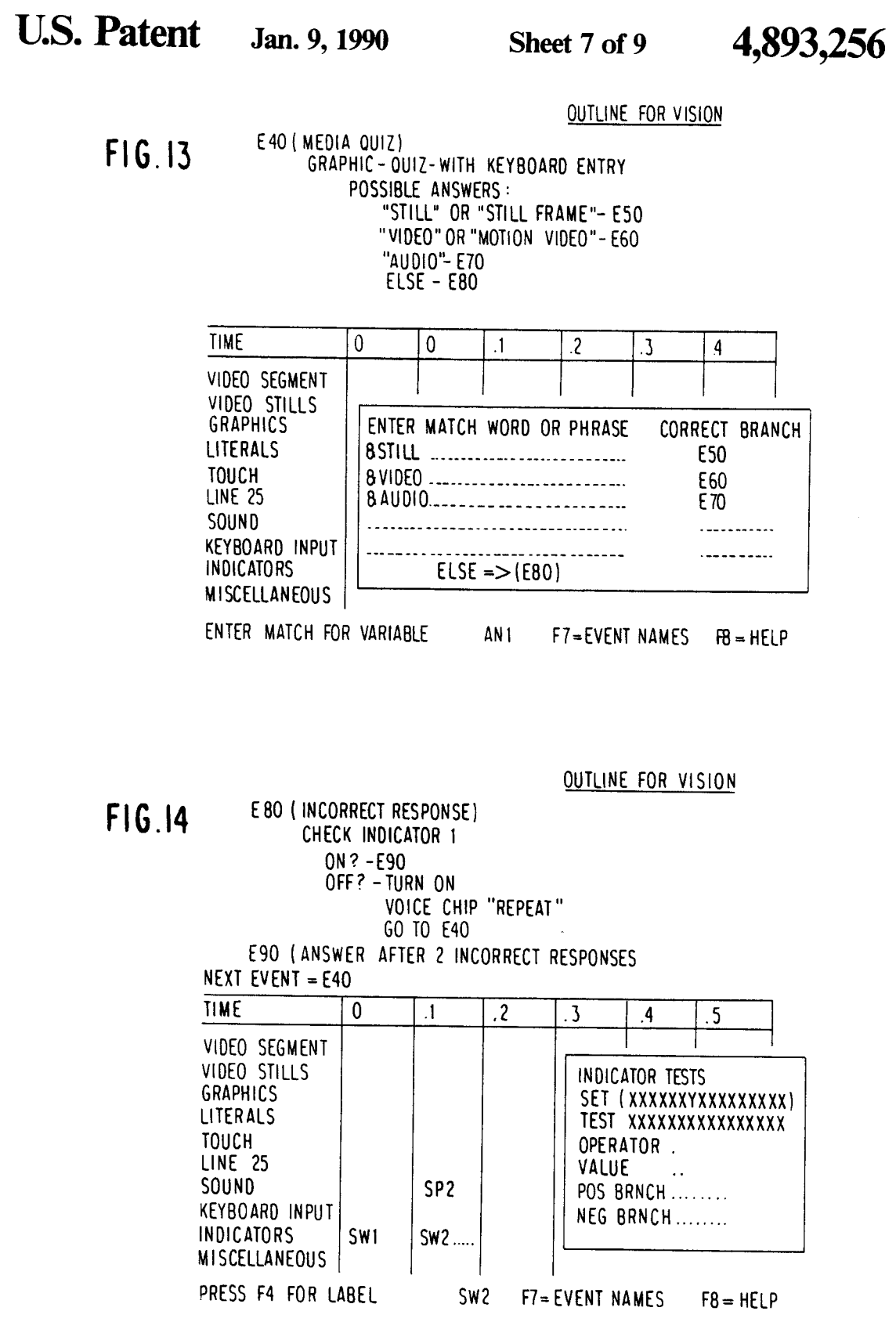

OUTLINE FOR VISION

E40 (MEDIA QUIZ)
GRAPHIC-QUIZ-WITH KEYBOARD ENTRY
POSSIBLE ANSWERS:
"STILL" OR "STILL FRAME"- E50
"VIDEO" OR "MOTION VIDEO"- E60
"AUDIO"- E70
ELSE - E80

| TIME | 0 | 0 | .1 | .2 | .3 | .4 |
|---|---|---|---|---|---|---|
| VIDEO SEGMENT | | | | | | |
| VIDEO STILLS | | | | | | |
| GRAPHICS | | | | | | |
| LITERALS | | | | | | |
| TOUCH | | | | | | |
| LINE 25 | | | | | | |
| SOUND | | | | | | |
| KEYBOARD INPUT | | | | | | |
| INDICATORS | | | | | | |
| MISCELLANEOUS | | | | | | |

| ENTER MATCH WORD OR PHRASE | CORRECT BRANCH |
|---|---|
| 8STILL ............ | E50 |
| 8VIDEO ............ | E60 |
| 8AUDIO ............ | E70 |
| ............ | ............ |
| ............ | ............ |
| ELSE => (E80) | |

ENTER MATCH FOR VARIABLE AN1 F7=EVENT NAMES F8=HELP

FIG. 14

OUTLINE FOR VISION

E80 (INCORRECT RESPONSE)
CHECK INDICATOR 1
ON? -E90
OFF? -TURN ON
VOICE CHIP "REPEAT"
GO TO E40
E90 (ANSWER AFTER 2 INCORRECT RESPONSES
NEXT EVENT = E40

| TIME | 0 | .1 | .2 | .3 | .4 | .5 |
|---|---|---|---|---|---|---|
| VIDEO SEGMENT | | | | | | |
| VIDEO STILLS | | | | | | |
| GRAPHICS | | | | | | |
| LITERALS | | | | | | |
| TOUCH | | | | | | |
| LINE 25 | | | | | | |
| SOUND | | SP2 | | | | |
| KEYBOARD INPUT | | | | | | |
| INDICATORS | SW1 | SW2..... | | | | |
| MISCELLANEOUS | | | | | | |

INDICATOR TESTS
SET (XXXXXXYXXXXXXXXX)
TEST XXXXXXXXXXXXXXXX
OPERATOR .
VALUE ..
POS BRNCH ........
NEG BRNCH ........

PRESS F4 FOR LABEL SW2 F7=EVENT NAMES F8=HELP

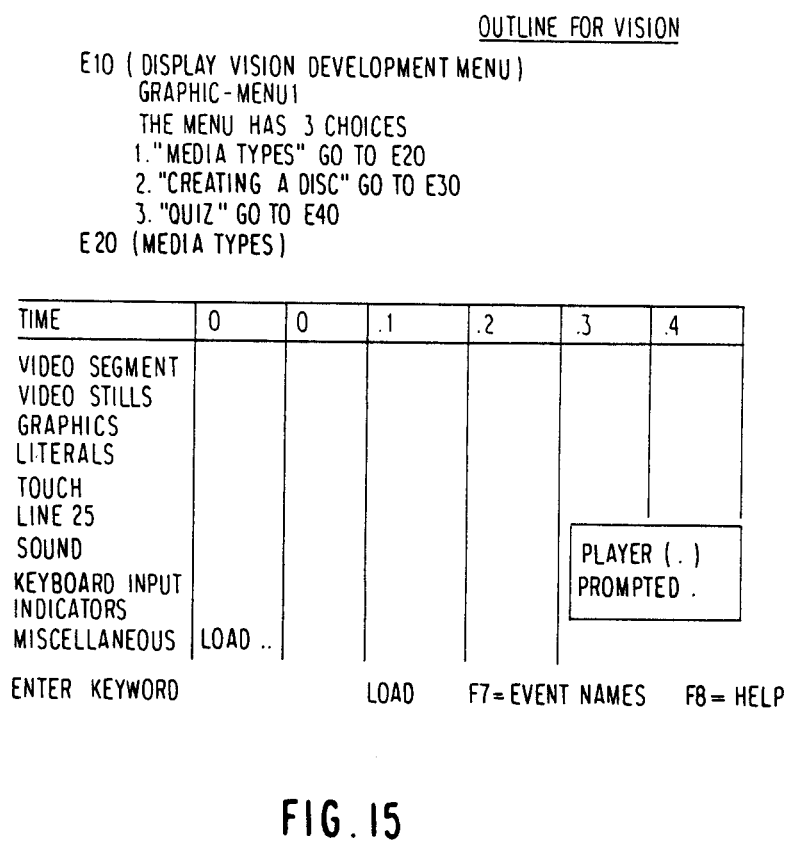

OUTLINE FOR VISION

E10 ( DISPLAY VISION DEVELOPMENT MENU )
GRAPHIC-MENU1
THE MENU HAS 3 CHOICES
1. "MEDIA TYPES" GO TO E20
2. "CREATING A DISC" GO TO E30
3. "QUIZ" GO TO E40
E20 (MEDIA TYPES)

| TIME | 0 | 0 | .1 | .2 | .3 | .4 |
|---|---|---|---|---|---|---|
| VIDEO SEGMENT | | | | | | |
| VIDEO STILLS | | | | | | |
| GRAPHICS | | | | | | |
| LITERALS | | | | | | |
| TOUCH | | | | | | |
| LINE 25 | | | | | | |
| SOUND | | | | | PLAYER ( . ) | |
| KEYBOARD INPUT | | | | | PROMPTED . | |
| INDICATORS | | | | | | |
| MISCELLANEOUS | LOAD .. | | | | | |

ENTER KEYWORD LOAD F7 = EVENT NAMES F8 = HELP

FIG. 15

INTERACTIVE VIDEO COMPOSITION AND PRESENTATION SYSTEMS

SOURCE CODE APPENDIX

The appendix provides the source code for one implementation of the invention. The appendix is in two parts, the first being the source code for the composition or composer and the second being the source code for the presentation or conductor.

The source code for the composer is dated Mar. 14, 1986, and comprises the following modules: BLDWIN (pages 1 to 3); CMPEV (pages 1 to 11); CMPTV (pages 1 and 2); CONTROL (pages 1 to 23); DISKIO (pages 1 to 3); GRAFCNTL (pages 1 to 18); GRAPHICS (pages 1 to 6); KBD (pages 1 to 11); LIT (pages 1 to 12); MATCH (pages 1 to 7); PRIM (pages 1 to 18); PUTEVT (pages 1 to 3); READEVT (pages 1 to 14); RTF (pages 1 to 3); RWACK (pages 1 to 3); RWCALC (pages 1 and 2); RWGRAPH (pages 1 to 4); RWKBD (pages 1 to 5); RWLINE25 (pages 1 to 4); RWMISC (pages 1 to 3); RWNEXT (one page); RWSETV (pages 1 to 4); RWSWITCH (pages 1 to 3); RWVIDEO (pages 1 to 6); R_LIT (pages 1 and 2); R_MISC (one page); R_SPEECH (pages 1 to 3); R_STILL (pages 1 and 2); R_TOUCH (pages 1 to 3); R_WAIT (pages 1 and 2); SPRIM (pages 1 to 16); STD2 (pages 1 to 9); STDWIN (pages 1 to 15); STILL (pages 1 to 5); TCH (pages 1 to 20); WFORMAT (pages 1 and 2); WIND (pages 1 to 15); WORDS (pages 1 to 7); WRITEEVT (pages 1 to 9); WTF (pages 1 to 3); W_LIT (pages 1 to 3); W_MISC (pages 1 and 2); W_SPEECH (pages 1 to 3); W_STILL (pages 1 and 2); W_TOUCH (pages 1 to 3); and W_WAIT (pages 1 and 2).

The source code for the conductor is dated Mar. 13, 1986, and comprises the following modules: ALL_CALC (pages 1 to 3); ASSIGNIT (pages 1 and 2); BLDINDEX (pages 1 and 2); BRANCHES (pages 1 to 13); BREAKOUT (pages 1 to 5); BUG_PROC (pages 1 to 7); CHG_ATT (pages 1 to 4); CHG_DIR (pages 1 and 2); CHKEVT (one page); CHKNUM (one page); CHKSTR (one page); CHKTIME (one page); CMALLOC (one page); CMDLIST (pages 1 to 5); CMD_PROC (pages 1 to 3); CNDPMAIN (pages 1 to 7); COLLIDE (pages 1 and 2); COPYRHT (pages 1 and 2); CURSOR (pages 1 and 2); DEVICERD (pages 1 to 3); DEVICEWT (pages 1 to 3); DO_BATCH (one page); DO_CMD (one page); EXTRACT (pages 1 to 6); FD_FILES (pages 1 to 3); FINDCMD (pages 1 and 2); FUNCT11 (pages 1 to 24); FUNCT2 (pages 1 to 8); FUNCT3 (pages 1 and 2); FUNCT41 (pages 1 to 17); F_DUMMY (one page); GETCCF (pages 1 to 3); GETEVENT (pages 1 and 2); GETM_OP (pages 1 and 2); GETPLAYR (one page); GET_KEY (pages 1 and 2); GET_OP (pages 1 and 2); GET_TCH (pages 1 and 2); GRAPHICS (pages 1 to 6); IBTRACE (pages 1 and 2); INTLACE (one page); LINE_25 (pages 1 to 4); LOADPLYR (one page); ICON_PRO (pages 1 to 4); INITVID (pages 1 and 2); LOADPLYR (pages 2 and 3); LOGERROR (pages 1 to 6); NEXT_OP (one page); NSTRING (pages 1 to 3); PLAYFROM (pages 1 and 2); PRESDATA (pages 1 to 5); PRO_LOOP (pages 1 to 3); PRTTOKEN (pages 1 to 3); PRT_CMD (pages 1 to 5); PUTBTABL (one page); PUTGTABL (one page); PUTNTABL (one page); PUTSTABL (pages 1 and 2); PUTTOKEN (pages 1 and 2); RESUME (pages 1 and 2); SBOX (pages 1 and 2); SCANBRCH (pages 1 and 2); SCANBYTE (pages 1 and 2); SCANEVT (pages 1 and 2); SCANLINE (pages 1 and 2); SCANNUM (pages 1 and 2); SCANSTR (pages 1 and 2); SETCMD (pages 1 to 7); SETFNPTR (pages 1 and 2); SETTCH (pages 1 and 2); SOLIDSYS (pages 1 and 2); SPEAK_FI (pages 1 to 3); SPK_PROC (one page); SPK_TST (pages 1 to 3); STOPVID (pages 1 and 2); SYNC (pages 1 and 2); TCH_PROC (pages 1 to 5); TICTIME (one page); TRIM_END (one page); T_ACTION (pages 1 to 3); UNSTACK (pages 1 and 2); USERPROC (pages 1 to 3); USER_IN (pages 1 to 4); USR_FILE (pages 1 to 7); VDISI (pages 1 and 2); VDIS2 (pages 1 and 2); VID_PROC (one page); VIS_POLL (pages 1 and 2); VIS_PROC (pages 1 and 2); WAITPOLL (pages 1 and 2); WRTSTR10 (pages 1 to 4); and WRT_TCH (one page).

BACKGROUND OF THE INVENTION

1. Field of the Invention

The present invention generally relates to an information providing system and, more particularly, to an interactive multi-media presentation system and a method for developing the presentation. The invention has broad application in the area of user interactive information systems such as, but not limited to, computer aided education. The invention facilitates the presentation of all manner of information which may be useful in various business contexts including sales, training and the like.

2. Description of the Prior Art

Interactive video training has become important as an effective technique in the field of computer aided education. A number of input technologies including keyboard, touch screen and light pen may be used to accept inputs and responses from a student user. Video disks are used to provide visual data in the form of graphics and animation to a display screen and audio signals to a speaker or speakers. A voice synthesizer may also be used to provide instructions and provide feedback to the student user on each answer. The programmed course of instruction may be designed to stop at any point to provide additional levels of instruction or even to repeat previous instruction as reinforcement depending on the student user's responses.

Interactive video training is but one aspect of a broader field of information presentation. Much the same techniques may be advantageously applied in other areas. For example, a sales presentation might be composed so that a prospective customer could use the presentation to determine what his needs were and how best to satisfy those needs. There are other areas where, for example, the need exists to provide the general public with information about a particular place or time in history or about an exhibit such as at a National Park or museum. Rather than the typical prerecorded tape which may be activated by an interested party, it would be desirable to provide an information system which the user could tailor to his or her individual interests.

Creating the programs for interactive video training courses and, more generally, information presentation systems has been a difficult and time consuming task. In the past, interactive video presentations have been designed manually and then subsequently coded into a computer program by program developers. This process has made such presentations expensive and limited their number to those applications for which the cost could be justified.

SUMMARY OF THE INVENTION

It is therefore an object of the subject invention to provide a method for developing a computer aided video presentation which may be practiced by persons who are relatively inexperienced in the use of computers.

It is a further object of the invention to provide a composition system which facilitates the development of an interactive multi-media presentation.

The objects of the invention are attained by a program for specifying the execution of independent, multi-media tasks along a synchronizing time line, preferably in the form of a spreadsheet matrix with event elements making up the rows and the time periods, the columns. The media which may be used in the practice of the invention include various pieces of hardware such as touch screens, graphics displays, voice synthesizers, video disk players, keyboards, and light pens as described above. These devices correspond to the rows of the matrix. The activities of multiple independent devices are synchronized by having the columns of the matrix represent moments in time. Thus, all activities specified in one column appear to happen simultaneously, while activities specified in multiple columns appear to happen successively, moving from left to right in the matrix.

The matrix used in the practice of the invention is similar to the GNATT chart concept used in the field of project management to schedule the activities of men and machines across time.

In designing a presentation, the information provider types into a series of matrices indications of which devices will be operating in a desired sequence and for a specified period of time. In the context of the invention, each event is a filled-in spreadsheet matrix. Each spreadsheet matrix includes information indicating the next event. The next event may be the next event in sequence or it may be conditional on which input is made by a user. The input may be selected by the user in response to a prompt to choose from among several possible inputs which are presented. It is also possible, because of the time line in the spreadsheet matrix, to provide a default next event should the user fail to make a choice within a predetermined period of time. The default next event does not need to be one of the events that would have occurred had the user made a selection within the predetermined period of time. The control in each spreadsheet event is also specifiable in all other events in the presentation, thereby allowing complex multi-media presentations to be designed by a user who is relatively unsophisticated in using computers. Thus, a single presentation may comprise hundreds or even thousands of filled-in spreadsheet events.

The program that permits the information provider to compose the presentation is referred to herein as the "composer". Once a presentation has been composed, the user for whom the information is intended may use the presentation by means of a second program referred to herein as the "conductor". The conductor is the run time program for the composer. The end user need only have a copy of the composed presentation and the conductor program in order to use the system. Only the information provider needs to have both the composer and the conductor programs. Thus, in the context of a host computer with a plurality of terminals, the terminals assigned to the end users would not be able to access the composer program but a terminal assigned to the information provider would. In the case of a plurality of stand alone computers, the composer program does not need to be distributed to the end users. The end users need only receive the composed presentation and the conductor program.

The reason why the author of a presentation requires both the composer and the conductor programs is to allow the author to test his presentation during the process of writing it. For example, after having written a sequence of events, the author would run the sequence using the conductor to see whether the information is presented in a manner which is satisfactory to him. If it is not, the author can return to the composer and edit the presentation. The composer supports several editing features including adding and deleting events, modifying events by the insertion or removal of columns to place forgotten event elements in the appropriate time sequence or remove superfluous event elements, and to change the sequence in which events are presented.

BRIEF DESCRIPTION OF THE DRAWINGS

The foregoing and other objects, aspects and advantages of the invention will be better understood from the following detailed description of a preferred embodiment of the invention with reference to the drawings, in which:

FIG. 1 is a representation of a computer display screen showing the initial time-line used to author an event in a presentation according to the subject invention;

FIG. 2 is a representation similar to FIG. 1 showing a pop-up menu for the video segment of the time-line;

FIG. 3 is a representation similar to FIG. 1 showing the specification of a video still in the time-line;

FIG. 4 is a representation similar to FIG. 1 showing the pop-up graphics menu;

FIG. 5 is a representation similar to FIG. 4 but showing the fade and wipe pop-up menu selected from the graphics menu;

FIG. 6 is a representation similar to FIG. 4 but showing the move option pop-up menu partially overlaying the graphics menu;

FIG. 7 is a representation similar to FIG. 1 showing the pop-up menu for literals;

FIG. 8 is a representation similar to FIG. 1 showing the touch screen design option pop-up menu;

FIG. 9 is a representation similar to FIG. 1 showing the line 25 pop-up menu;

FIG. 10 is a representation similar to FIG. 9 but showing the line 25 pop-up option menu which lists additional video control options;

FIG. 13 is a representation similar to FIG. 1 showing the pop-up menu for answer analysis;

FIG. 14 is a representation similar to FIG. 1 showing the pop-up menu for the indicators;

FIG. 15 is a representation similar to FIG. 1 showing the pop-up menu for video disk loading and unloading.

DETAILED DESCRIPTION OF THE PREFERRED EMBODIMENT OF THE INVENTION

Figure 11:
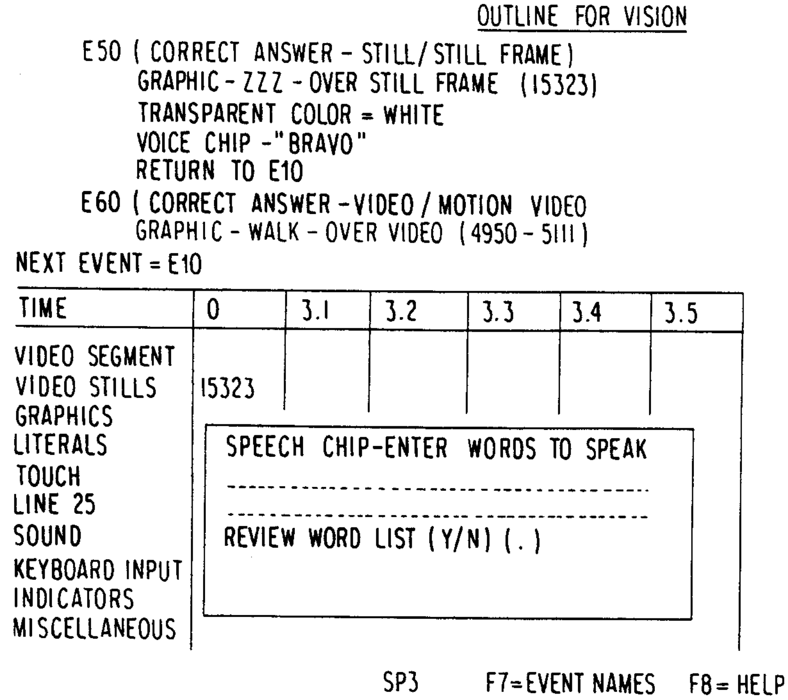
FIG. 11 is a representation similar to FIG. 1 showing the pop-up menu for sound.

As mentioned, two separate computer programs are used to allow the information provider the ability to author information which can be displayed on the screen of a host connected computer terminal or a stand alone computer system. The first of these is the composer program which gives the information provider the ability to author or compose a presentation. A presentation is the information the end user sees and/or hears at the host connected computer terminal or stand alone computer system. The authoring process consists of the instructor using a time-line to control the media of the presentation. The media can consist of graphic frames, video disk frames and sound.

The second computer program is the run time program which will be referred to as the conductor. The conductor is the application that takes the information authored by the information provider using the composer and performs the functions indicated in the time-line of each event in the course of the presentation. In general, the conductor is the program that resides in the end user's computer terminal or stand alone computer system to present the information to the end user.

The author of a presentation has the capability to present to the end user moving video pictures, still video pictures, graphic frames, text, and sound from either a video disk or a speech synthesizer. With the flexibility of the hardware devices, it is possible for the author to use media mixing to produce a variety of visual and audio effects. The author can define more than one type of user input. The input can be, for example, touch points on a touch screen display and/or the keyboard. The author can direct a presentation based on the points touched by the user or make decisions based on variable data input from the keyboard.

Preparing a presentation begins by the author deciding what information is to be presented during the presentation. Once the information has been decided upon, the author then determines what type of media will be used to present the information. All video and sound required may be created and placed on a video disk. A map of what is on the video disk, both video and sound, is made to allow the author to easily locate any video or sound data that may be required at any point in the presentation. Any graphics that may be needed are made with an all points addressable (APA) or bit mapped frame creator and editor. Once all the information is available, the author can create an outline of how the presentation is run. This outline can be made using any text editor, and the outline should include information such as what graphics are to be displayed with what video and sound. Any input allowed and what decisions are to be made based on the input from the end user should also be included. Once this outline is made, it is used during the composer process as a guide for the author. From the outline, the author should be able to fill in the time-line provided during the composer process to perform the indicated steps of the presentation.

The hardware required to run the composer and conductor are a microcomputer such as the IBM Personal Computer (PC), PC/XT or PC/AT, a vision head, and a video disk player. It is not necessary that the composer and conductor use the same type of PC; however, whichever type of PC is used, it is required to have 512K bytes of memory, an Enhanced Graphics Adaptor (EGA), and a General Purpose Interface Bus (GPIB). The vision head is a hardware device that contains a medium resolution graphics display, a touch screen, two speakers, and a voice synthesizer chip, all of which technology is known in the art. The IBM PCs use a keyboard that has ten function keys labeled F1 to F10 and a combination numeric and cursor keypad. The arrow keys on this keypad can be used to position the cursor on the display screen; however, other cursor positioning devices such as a mouse, track ball, joy stick or the like can be used to position the cursor on the screen.

As mentioned, the composer refers to the authoring process which allows the author to create a presentation. There are several steps involved in creating a presentation, and each of these steps corresponds to an option on the composer menu, an example of which is shown below.

| COMPOSER MENU |
|---|
| PRESENTATION = VISION |
| 1. AUTHOR PROFILE |
| 2. PRESENTATION PROFILE |
| 3. UPDATE OUTLINE |
| 4. AUTHOR an EVENT |
| 5. ERASE an EVENT |
| 6. TEST an EVENT |
| 7. DOCUMENT PRESENTATION |
| 9. RETURN TO MASTER MENU |
| SELECT ONE [.] |

As can be seen from the menu, two profiles must be created, the author profile and the presentation profile. These profiles are used by the composer and the conductor to identify information about the author, the equipment being used and the functions available.

A time-line is used in the authoring process. The time-line is a type of spreadsheet which controls and synchronizes graphic frames, video disks, a touch screen, a voice synthesizer and other hardware connected to the system. One such spreadsheet is required for each event in the presentation. The spreadsheet is arranged in a matrix with event elements making up the rows and the time periods, the columns.

When first beginning the time-line process, the time-line will be empty as shown, for example, in FIG. 1 of the drawings. As seen in the menu shown above, the author also has the ability to erase an event and test an event while in the composer program. It is useful to erase an event if the event has been authored incorrectly or design changes have been made. When an event is erased, its time-line is cleared of all entries. The author can use the conductor program to test an event without leaving the composer program. This helps the author to locate any problems while still in the authoring process.

Beginning first with the author profile, this option allows the author to identify information about the author and the equipment being used. This information is supplied by the author in a fill-in-the-blanks menu provided for that purpose. Using a similar fill-in-the-blanks menu, the author can next create or change the presentation profile. The presentation profile is used to identify information about the presentation such as the maximum pause time, system color, pause key label, replay key label, continue key label, help key label, and the like.

After creating the author profile, the presentation profile and the outline, the actual presentation can be authored. This corresponds to option 4 on the composer menu shown above. The presentation to be authored is indicated in the composer menu beside the "Presentation=" field. The name shown in the example above is "Vision". The presentation name can be changed by selecting option 1 of the composer menu and changing the "Presentation Name" field in the author profile.

Initially, the outline is displayed with the cursor positioned at the first event. Another event may be selected by moving the cursor using the up and down arrow keys on the computer keyboard. While in the authoring process, pressing function key F7 will list the event names and pressing another function key F8 will display any available help. Pressing function key F10 will end the option and return to the composer menu.

Once the cursor is correctly positioned beside the desired event, pressing function key F2 will begin the authoring process. A screen is displayed showing the outline of the selected event and an empty time-line as shown in FIG. 1. In FIG. 1, the outline is shown at the top of the display, and the time-line is shown at the bottom. In the time-line, the rows are event elements and the columns are times. The cursor is positioned on the video segment row at time 0. The cursor can be moved around the time-line using the four arrow or cursor control keys on the computer keyboard.

With specific reference to FIG. 1, the time row indicates the length of time, in tenths of seconds, an event element will take to complete. The total amount of time for an event is displayed in the last non-empty column. The time-line will automatically reflect the time it takes for a video segment to play. The user may alter the time manually using designated keys, except when playing a video segment, but initially the time row is displayed with tenth second increments.

A video segment is a set of consecutive video picture. To specify a video segment, the starting frame number is entered. A pop-up window is displayed at the bottom right corner of the screen as shown in FIG. 2. As indicated by the brackets in FIG. 2, the cursor is positioned at the first field in the pop-up window labeled "player". An entry is made in each field and the enter key is pressed. After the enter key is pressed, the cursor moves to the next field, and after entering a value for the last field, the pop-up window disappears and the cursor is positioned in the next time column of the video segment row. The ending frame number of the video segment must be entered in this column. Once entered, the composer program calculates the time it will take the video segment to play at a predetermined rate. The times in the time row are automatically altered, beginning with the column containing the ending frame number, to reflect the time it will take to play the video segment.

The next row in the time-line is labeled "video stills". A video still is a single frame on a video disk. All that is required to specify a video still is to enter the frame number of a frame from the video disk. This has been done in FIG. 3. No pop-up window will appear because a video still displays only video; there is no audio.

Upon pressing the enter key, the cursor is repositioned at the row labeled "graphics". Graphics frames can be either APA (all points addressable or bit mapped) frames or NAPLPS (North American Presentation Level Protocol Syntax) frames. The frame name of a graphic frame must be entered. Once entered, a pop-up menu is displayed at the bottom right corner of the screen as shown in FIG. 4. Option 1 of the pop-up menu, fade routine, allows the author to select from several different fade and wipe techniques. Fades and wipes are transition routines that dictate how a graphic will replace a previous graphic on the screen. They allow for a smooth presentation by eliminating abrupt changes on the screen. When this option is selected, a menu listing the available fade techniques is displayed at the lower right corner of the screen as shown in FIG. 5. Once the fade technique has been chosen, a time value between 0 and 99 must be entered. This value specifies how fast the fade or wipe will occur. The time value is in tenths of a second, from 0 to 99 tenths. After selecting a fade or wipe routine and a time value, the graphics menu of FIG. 4 is redisplayed to allow another selection.

Option 2 of the graphics pop-up menu of FIG. 4, transparent colors, allows the author to specify which color or colors are to be transparent. A video segment or video still can be displayed behind a graphic frame on the display screen. The video shows through the graphic in the areas in which color has been made transparent.

Option 3 of the graphics pop-up menu of FIG. 4, move window, allows the author to move the window to a precise position. A pop-up menu is displayed which prompts the author for an upper left row and column and a lower right row and column as shown in FIG. 6. Upon entering the values for the rows and columns, the pop-up menu for the move window is removed uncovering the graphics pop-up menu which it overlayed.

Option 4 of the graphics pop-up menu of FIG. 4, examine screen, allows the author to see what the graphic specified in the time-line currently looks like. The graphic is displayed with grid numbers superimposed across the top and down the left side. These numbers are helpful in deciding where to position literals and touch areas on the screen. After examining the graphic, the function key F10 may be pressed to keep the graphic and return to the pop-up graphics menu. If the graphic is not correct, the function key F3 may be pressed to cancel the current processing and return to the time-line. Option 5, return to time-line, causes the pop-up graphics menu to disappear and the cursor to be positioned on the next row labeled "literals".

Literals allow the author to display messages on the screen. A literal label is required and may either be created by the author or by pressing function key F4. The labels created by pressing F4 are in the sequence LT1, LT2, etc. After entering a label, a pop-up menu is displayed at the lower right corner of the screen as shown in FIG. 7. The author is prompted for the screen width and the row and column where the literal should be positioned. A graphics screen is then displayed and the author is prompted to enter the literal. Once the literal is entered, it can be moved around the screen using the arrow or cursor control keys on the keyboard. The color of the literal can be changed using the function keys F1 and F2. When a literal color has been selected, it is accepted by pressing function key F9. The background color can be changed by pressing function key F4. When a background color has been selected, it is accepted by pressing function key F10. The literal processing may be canceled by pressing function key F3. In either case, the time-line is then redisplayed.

The next row on the time-line is labeled "touch". A touch area is an area on the screen that has been activated to respond to touch. The author has complete flexibility in the size, location and number of touch areas. However, the touch area must always be a rectangle. In the implemented system, sixty touch areas are supported, ten of which are reserved for system use. A touch label is required and can either be created by the author or by pressing function key F4. F4 generates labels in the sequence TC1, TC2, etc. After entering a label, the author is prompted for the number of touch areas as shown in FIG. 8. A graphics screen is then displayed with a blinking cursor. The cursor must be positioned at a point corresponding to the upper left corner of the touch area. This is done using the arrow or cursor control keys on the keyboard. When the cursor is in the correct position, the enter key is pressed. The author can then enlarge and shrink the area with the cursor control keys. The down and right arrows enlarge the area and the up and left keys shrink the area. When the touch area is positioned appropriately, the enter key is pressed and a touch area is automatically assigned to the area. The remaining touch areas, if any, are created in the same way. When the specified number of touch areas have been created, function key F10 is pressed to indicate approval of all the defined touch areas. The author is prompted for various kinds of visual or auditory feedback associated with each active area. The author is then prompted for a branch event for each touch area. When all branch events have been entered, the author has the option of saving this touch area format to be used with other graphics, and then the time-line is redisplayed.

The next row on the time-line in FIG. 1 is labeled "line 25". Line 25 allows the author to specify what user control options are to be displayed at the bottom of the screen; e.g., pause and replay. These options are touch areas that give the end user control over the presentation of information. A line 25 label is required and may either be created by the author or by pressing function key F4. F4 generates labels in the sequence BR1, BR2, etc. Once a label is entered, a selection menu is displayed at the lower right corner of the screen as shown in FIG. 9. The brackets in the pop-up menu indicate the location of the cursor. It will be noted that a "Y" has been entered in the pause field. This gives the user the ability to pause the video. When this option is chosen by the author, a second pop-up menu is displayed as shown in FIG. 10. This pop-up menu lists additional user control options. For example, the resume option gives the user the ability to resume the video after a pause.

Figure 12:
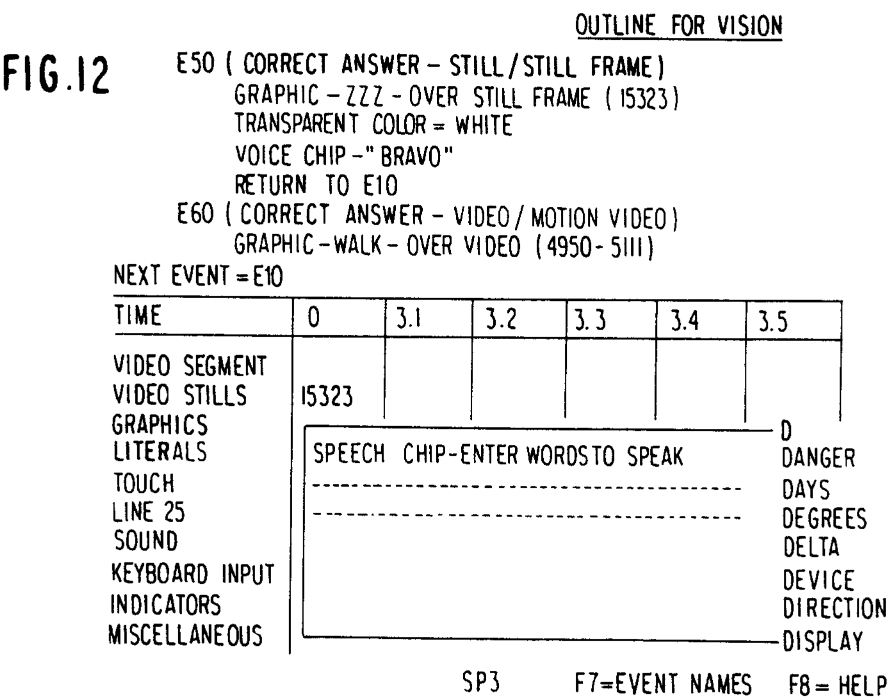
FIG. 12 is a representation similar to FIG. 11 but showing the pop-up word list.

After the detail screen name is entered in the pop-up menu shown in FIG. 10, the menu disappears and the cursor is repositioned on the row of the time-line labeled sound. Sound allows the author to specify words and phrases for the voice synthesizer. A sound label is required and may be created by the author or by pressing function key F4. The labels generated by the F4 key are in the sequence SP1, SP2, etc. A pop-up menu is displayed which prompts the author for the word or words to be spoken. This pop-up menu is shown in FIG. 11. The author is given the option of reviewing the word list before entering a word or words in this menu. If the author chooses to review the word list, the author is first prompted to enter a starting letter. The word list, beginning with this letter, is displayed to the right side of the pop-up menu as shown in FIG. 12 which shows words from the list beginning with the letter "d". The list can be scrolled using the arrow or cursor control keys on the keyboard. A word is selected by positioning the cursor on the word and pressing the enter key. The word then appears in the "Enter Words to Speak" field of the pop-up menu. If the author decides not to review the word list, the cursor is positioned in the "Enter Words to Speak" field, and the words can be entered through the keyboard. If a word is entered which is not in the word list, the message "word not found" is displayed. If the word or phrase is valid, the menu disappears, and the cursor is repositioned on the row labeled keyboard input in the time-line.

Keyboard input allows the author to specify variables and valid user input for these variables. The author is prompted for a variable to be used to match words. It must begin with a "$" if its value is to be alphanumeric or a "%" if its value is to be numeric. A label is required to identify the match word or phrase. The label can be created by the author or by pressing function key F4. The labels generated by the F4 key are in the sequence AN1, AN2, etc. The author is then prompted for the match words or phrases and the appropriate branch event in the case of a match. The pop-up menu for this is shown in FIG. 13. Up to five match words or phrases and branch events are allowed. Pressing the enter key moves the cursor through the fields. The author may also specify an event to branch to if a match was not found. After entering the branch event for the else condition, the pop-up menu disappears, and the cursor is repositioned on the row labeled indicators in the time-line.

An indicator is a switch that can be set on or off by the author. The indicator can be tested for an on or off position and branching can occur based on the switch settings. There are sixteen switches available to the author. A label is required which can be created by the user or by pressing function key F4. The labels generated by the F4 key are in the sequence SW1, SW2, etc. After entering a label, a pop-up menu is displayed at the lower right corner of the screen as shown in FIG. 14. The set line in the menu allows the author to set a switch on or off. To set the switch on, the author replaces the corresponding "X" with a "Y". To set the switch off, the author replaces the corresponding "X" with a "N". The test line in the menu allows the author to test one or more switches. Each switch can be tested for either an on or off position. For each switch to be tested, the corresponding "X" is replaced with a "Y" or "N". The operator line of the menu specifies what operation is to be performed on the switch settings. The value line is to indicate how many of the switches are tested correctly. Branching to another event is based on the result of the operator and value. The author specifies the event to be performed based on a positive result or a negative result.

The miscellaneous row of the time-line provides other authoring functions which are not defined within any of the other rows. The functions available on this line are logging and video disk loading and unloading. The author can specify that each item of an event be recorded into a log file. The author specifies when logging of the event is to start and stop using the log and nolog control words in the miscellaneous line. When log appears in the miscellaneous line, all information about the event is logged until either the end of the event is reached, a branch to another event occurs, or a nolog appears in the miscellaneous line.

The miscellaneous line also allows for the loading and unloading of the video disk player. To unload the video disk, the author types the word "unload" in the miscellaneous line. A pop-up menu then appears prompting for the player number and user load prompt as shown in FIG. 15. The author specifies which player is to be loaded; i.e., player 1 or player 2. The user prompt field indicates whether the user will be prompted with a standard load screen. If a "Y" is entered, a screen will be displayed showing the user how to load the video disk player. The user must touch the screen before the video disk is actually loaded. If an "N" is entered, the video disk will be loaded without prompting the user. After entering a response to the user prompt field, the pop-up menu disappears and the cursor returns to the time-line.

The process just described is repeated for each event in the presentation; however, it will be understood of course that not every event element will be filled in and, in some cases, only a single event element will be filled in for a given event in the presentation. The author typically proceeds through the outline filling in each event time-line until the presentation has been completely composed.

As mentioned, the conductor is the runtime facility for the composer application. What this means is that once a presentation has been authored, only the conductor is required to run the presentation. In other words, only the author requires both the composer and the conductor applications. The end users need to have only the conductor application in their computer terminal or stand alone computer. The conductor takes the information authored with the time-lines during the authoring process and performs the media mixing indicated by each time-line. The conductor uses the vision head as the interface device for input/output to the end user.

Figure 16:
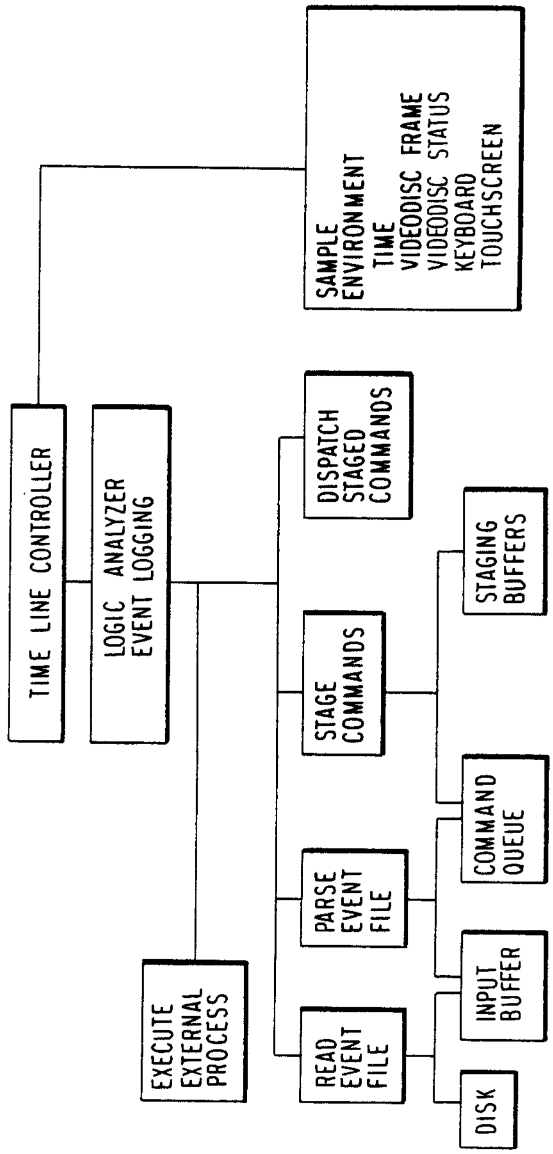
FIG. 16 is a block diagram showing the overall structure of the conductor program according to the invention.

Referring now to FIG. 16, there is shown the overall block diagram of the structure of the conductor program. The heart of the program is the time-line controller which interfaces with the device environment sampler and a logic analyzer. The logic analyzer interfaces with a read event file module, an event file parser, a command stager, and a staged command dispatcher. Processing is carried out in these modules while waiting for an external event, such as a user response, to occur. The following program written in Program Design Language (PDL) describes this processing:

```
WHILE WAITING ON EXTERNAL EVENT;
  DO ONE OF THE FOLLOWING IN PRIORITY ORDER
  SEQUENCE
  1 WHILE COMMAND QUEUE NON-EMPTY;
  UNTIL STAGING BUFFERS FULL
  CONVERT COMMAND QUEUE TO STAGED
  COMMANDS
  END UNTIL
  WEND
  2 WHILE INPUT BUFFER NON-EMPTY;
  UNTIL COMMAND QUEUE FULL
  PARSE INPUT BUFFER TO COMMAND QUEUE
  END UNTIL
  WEND
  3 WHILE MATCH ON EVENT NAME OR NEXT
  LOGICAL
  EVENT NAME;
  UNTIL INPUT BUFFER FULL
  READ EVENT FILE TO INPUT BUFFER
  END UNTIL
  WEND
 ENDDO
 WEND
 PROCESS ENVIRONMENT
  IF LOGGING ON, THEN LOG ENVIRONMENT
  LOG FILE NAME = ddmmyyhh.mm
  IF SYSTEM FUNCTIONS WAITING ON
```

-continued

```
  ENVIRONMENT
  THEN EXECUTE SYSTEM FUNCTIONS
  IF STAGED COMMANDS WAITING ON
  ENVIRONMENT
  THEN DISPATCH STAGED COMMANDS
  ELSE IF NON-STAGED COMMANDS WAITING ON
  ENVIRONMENT
  THEN STAGE AND DISPATCH COMMANDS
  OR EXECUTE EXTERNAL PROCESS 4
  ENDIF
END PROCESS EXTERNAL EVENT
LOOP
```

The PDL code for reading an event file is as follows:

```
WHILE MATCH ON EVENT NAME OR NEXT LOGICAL
EVENT
  NAME;
  UNTIL INPUT BUFFER FULL
  READ EVENT FILE TO INPUT BUFFER
  END UNTIL
WEND
512 BYTES FOR UP TO 8 64-BYTE RECORDS FROM FILE
  INDEXED BY EVENT NAME
MAINTAIN BUFFER TAIL
MAINTAIN LOGIC FOR EVENT NAME OR NEXT
EVENT NAME
  COMPLETELY READ OR NOT
```

The PDL code for parsing an event file is as follows:

```
WHILE INPUT BUFFER NON-EMPTY;
  UNTIL COMMAND QUEUE FULL
  PARSE INPUT BUFFER TO COMMAND QUEUE
  END UNTIL
WEND
COMMAND QUEUE IS A 20-ELEMENT ARRAY FOR
PARSING
  UP TO 20 COMMANDS, LENGTH = 20*3 = 60 BYTES
  (where T is the token in hexidecimal and XX is
  the offset in hexidecimal)
  1 TXX COMMAND tYPE = 1 BYTE
  2 TXX BYTE oFFSET IN INPUT BUFFER = 2 BYTES
  3 TXX
  ....
  ....
  ....
  20 TXX
MAINTAIN QUEUE TAIL
MAINTAIN INPUT BUFFER HEAD
```

The PDL code for staging commands is as follows:

```
WHILE COMMAND QUEUE NON-EMPTY;
  UNTIL STAGING BUFFERS FULL
  CONVERT COMMAND QUEUE TO STAGED
  COMMANDS
  END UNTIL
WEND
VIDEODISK STAGER
  CONVERT TO PIONEER LOGIC
  CONVERT TO PIONEER INVERTED FORMAT
  MAINTAIN STAGER TAIL
  MAINTAIN DISPATCH LOGIC
SCREEN STAGER
  BLOAD TO COMPRESSED BUFFERS (2*32K) AND
  DECOMPRESS TO DECOMPRESSED BUFFERS
  (2*32K)
  MAINTAIN BUFFER AVAILABLE FLAGS
  MAINTAIN DISPATCH LOGIC
LITERAL STAGER
  READ INDEXED LITERAL FILE TO LITERAL
  BUFFER
```

-continued

```
  MAINTAIN LITERAL BUFFER (5*8Ø BYTES)
  MAINTAIN DISPATCH LOGIC
TOUCHSCREEN STAGER
  CONVERT TOUCHSCREEN COORDINATES
  ONE-LEVEL BUFFER (UP TO 6Ø TOUCHAREAS)
  MAINTAIN DISPATCH LOGIC
SPEECH STAGER
  BUILD SPEECH STRING
  ONE-ELEMENT BUFFER
  MAINTAIN DISPATCH LOGIC
ANSWER ANALYSIS STAGER
  READ INDEXED ANSWER FILE TO MATCH BUFFER
  ONE-ELEMENT BUFFER
  MAINTAIN DISPATCH LOGIC
BRANCH STAGER
  PLACE BRANCH POINTS IN BRANCH BUFFER
  ONE-LEVEL BUFFER (UP TO 6Ø BRANCHES)
  MAINTAIN BRANCH LOGIC
  WAITING ON ENVIRONMENT FOR LOGIC
  ANALYZER
  MAINTAIN DISPATCH LOGIC
```

The PDL code for the logic analyzer/event logger is as follows:

```
IF LOGGING ON, THEN LOG ENVIRONMENT
IF ENVIRONMENT TRUE;
  IF EXTERNAL PROCESS WAITING ON ENVIRONMENT
  THEN SAVE EXECUTION ENVIRONMENT
  (SNAPSHOT)
  EXECUTE EXTERNAL PROCESS
  RESTORE EXECUTION ENVIRONMENT
  RESUME
  IF STAGED COMMANDS WAITING ON
  ENVIRONMENT
  THEN DISPATCH STAGED COMMANDS
  LOGICAL SEQUENCE OF DISPATCH
  ELSE IF BRANCH WAITING ON ENVIRONMENT
  THEN READ EVENT FILE
  CONVERT TO STAGED COMMANDS
  DISPATCH STAGED COMMANDS
ELSE (IF ENVIRONMENT FALSE),
  IF TIME ALLOWS
  CALL STAGE ROUTINE
  ENDIF
ENDIF
```

The PDL code for the time-line controller is as follows:

```
SAMPLE ENVIRONMENT
  DISCARD DISALLOWED SAMPLES
  SET TRUE/FALSE CONDITIONS
  CALL LOGIC ANALYZER/EVENT LOGGER
LOOP TO SAMPLE ENVIRONMENT
```

Source code for an implementation of the conductor is included in the appendix. This source code was written using the PDL listings above.

While the invention has been described in terms of a specific preferred embodiment, those skilled in the art will understand that the invention can be practiced with modifications and variations in both software and hardware within the scope of the appended claims. For example, the preferred embodiment of the invention has been described in terms of current technology which includes video disk players. However, it will be understood that the invention is not limited to this particular technology and can support any type of video, graphic and audio storage medium whether in digital or analog format. Further, the source code appendicies for the composer and conductor are included by way of specific illustrative example only, and those skilled in the art will recognize that other and different code could be written to implement the claimed invention.

```
/* program to build window and field structure file
   from standard WP text files */
#include "\c\stdio.h"

#define EXTERN
#include "state.i"

int nfields, nlits;

main (argc,argv)
int argc;
char *argv[];
{
   FILE *fin;
   FILE *fout;
   WINDOW outwind;
   FIELD outfld;
   char litrec[85];
   char botrec[85];
   char *p;
   char string[100];
   char *tokens[11];
   char *tokarea;
   char *malloc();
   char *fgets();
   int n;

   tokarea=malloc(512);
   nfields=0;
   nlits=0;

   fin=fopen("WINDOW.TXT","ra");
   fout=fopen("@window","wb");
   writever("315",fout);

   while ((p=fgets(string,100,fin)) != NULL) {
     tokenize(string,tokens,tokarea);
     switch (string[0]) {
       case 'H': /* header record for window */
         n=sscanf(tokens[1],"%d",&outwind.wtype);
         n=sscanf(tokens[2],"%d",&outwind.frow);
         n=sscanf(tokens[3],"%d",&outwind.lrow);
         n=sscanf(tokens[4],"%d",&outwind.fcol);
         n=sscanf(tokens[5],"%d",&outwind.lcol);
         n=sscanf(tokens[6],"%d",&outwind.nlit);
         n=sscanf(tokens[7],"%d",&outwind.nfield);
         n=sscanf(tokens[8],"%x",&outwind.dispatt);
         n=sscanf(tokens[9],"%x",&outwind.deatt);
         n=sscanf(tokens[10],"%d",&outwind.ord);
         outwind.literals=0;
         outwind.flds=0;
         outwind.line25=0;
         writwind(&outwind,fout);
         break;
       case 'F': /* field record */
         n=sscanf(tokens[1],"%d",&outfld.row);
/*       outfld.row+=(outwind.frow-1);
*/       n=sscanf(tokens[2],"%d",&outfld.col);
/*       outfld.col+=(outwind.fcol-1);
*/       n=sscanf(tokens[3],"%d",&outfld.length);
         n=sscanf(tokens[4],"%d",&outfld.datat);
         strcpy(outfld.dfault,tokens[5]);
         n=sscanf(tokens[6],"%d",&outfld.intflag);
         outfld.data=0;
         writfld(&outfld,fout);
         nfields++;
         break;
       case 'L': /* literal display text record */
         strcpy(litrec,tokens[1]);
         fwrite(litrec,85,1,fout);
         nlits++;
         break;
```

```
      case 'T': /* line 25 display record */
        strcpy(botrec,tokens[1]);
        fwrite(botrec,85,1,fout);
        break;
      default: ;
      }
    }
  printf("END.  nlits nfields= %d %d\n",nlits,nfields);
  }

writever (s,fout)  /* write version # */
char *s;
FILE *fout;
{ fwrite(s,3,1,fout);
  }

writwind (outwind,fout)
WINDOW *outwind;
FILE *fout;
{
   char *p;

   p=(char *)outwind;
   fwrite(p,sizeof(*outwind),1,fout);

   return;
   }

writfld (outfld,fout)
FIELD *outfld;
FILE *fout;
{
   char *p;

   p=(char *)outfld;
   fwrite(p,sizeof(*outfld),1,fout);
   return;
   }

tokenize (string,tokens,tokarea)
char *string;
char *tokens[];
char *tokarea;
{
   int i;
   char *p;
   char brk[3];
   char *stptok();

   if (*string=='/') *string='\0';
   brk[0]='\\';
   brk[1]='\n';
   brk[2]=NULL;

   i=0;
   while ((p=stptok(string,tokarea,100,brk)) != string){
     tokens[i]=tokarea;
     tokarea=tokarea+strlen(tokarea)+1;
     string=p+1;
     i++;
     }
   return;
   }
/********************************** CMPEV.C *************************************/
/*                                                                              */
/*                                                                              */
/*  This file is the main module for "C" composer                               */
/*                                                                              */
/********************************************************************************/

#include "\c\stdio.h"
#define EXTERN
```

```
#include "state.i"
#include "keys.i"
#include "userproc.i"

extern int _oserr;
static char cmptrail[81];

main (argc,argv)
int argc;
char *argv[];
{ int action;
  int i;
  char *p;
  char buf[81];
  char *argvp[4];
  char argvd[3][10];
  char cndname[5];
  int rc;

  extfunc=    0;
  audfirst=   0;
  audlast=    0;
  sysver=   316;

  maxcol=    80;
  expand=     0;
  filereset=  0;
  vision=     1;
  presname[0]= '\0';

  audread=  0;
  debuga= audwrite= 1;

    /* set debug parameters */
  for (i=2; i<= argc; i++) setdeb(argv[i-1]);

  init();  /* initialize whatever needs to be initialized */
  actwind= WNOUTL;
  action=  START;

  pause("after init");
  while(1)
  { if (debug) printf("before doact. actwind action= %d %d\n",actwind,action);
    action= doact(action); /* do whatever action is required */
    if (action== STOP || action== GOTOCND)
    if (audwrite)
    { audwrrec();
      close(faud);
  }

if (action== STOP) break;
if (action==GOTOCND && exevname(evname) )
{
  p=readscrn(1,1,25,80);
  movmem(evname,first_ctl_rec+3,8);
  write_rec(first_ctl_rec, ctl_file, 1, CTL_REC_LEN);

  closerw();  /* close read/write files */

  if (expand) strcpy(cndname,"CNDC");
  else strcpy(cndname,"CND");

  strcpy(argvd[0],cndname);
  strcpy(argvd[1],"\\");
  strcat(argvd[1],presname);
  strcpy(argvd[2],evname);
  argvp[0]= argvd[0];
  argvp[1]= argvd[1]; /* NULLADDR; */
  argvp[2]= argvd[2];
  argvp[3]= NULLADDR;
  freebuf();
```

```
    if (debug) printf("about to call forkv.  name= |%s|\n",cndname);
    rc= forkv(cndname,argvp);
    if (rc)
    { sprintf(buf,"ERROR IN FORKV CALLING |%s|.  RET CODE= %d. _OSERR= %d",
        cndname,rc,_oserr);
      beep(buf);
      }
    initbuf();

    chbord(1);
    while(bdos(0xb) & 0xff) bdos(7);  /* discard waiting characters */
    writscrn(1,1,25,80,p); /* rewrite old screen contents to screen */
    action= RESUME;
    actwind= (nwindows==1) ? WNOUTL : WNTIMEL;
    openrw();
    faud= openfile(cmptrail,BREAD);
    }
  }

clx(1,15);

if (action== STOP)
{ strcpy(buf,"CMPB ");
  strcat(buf,presname);
  loadkbd(buf);
  }
if (action== GOTOCND)
{
  strcpy(buf,"CNDB ");
  strcat(buf,presname);

  loadkbd(buf);
    if (exevname(evname))
    { stcpadr(evname,8,0);
      movmem(evname,first_ctl_rec+3,8);

      write_rec(first_ctl_rec, ctl_file, 1, CTL_REC_LEN);
      }
    }

  closerw();  /* close read/write files */
  discres(1); /* set players to not show #s */
  if (nplayers==2) discres(2);
  }

init ()  /* initialize routine */
{ FILE *ptfile;
  char buf[81];
  int i,t, fevt,td;
  int nirec;
  int nerr;
  DPTR dp;
  char *cp;
  WINDOW *w;
  int *ip;
  int lctlrec;

   if (vision)
   { gpib0  = ibfindx("GPIB0");
     video0 = ibfindx("VIDEO");
     if (debug) printf("gpib0 video0= %xh %xh \n",gpib0,video0);
     if (video0 < 0 || !settrans(0) )
     { printf("\n\n\n^G");
       printf("You have not set up your vision interface.   \n");
       printf(
      "You will not be able to use the touch screen or see any video.   ^G\n");
       vision=0;
       if (debug) printf("video0= %xh \n",video0);
       }
     }
```

```
/* build DSTOUCH data structure */

for (i=0; i<NTOUCH; i++)
{ touch[i]= (PDSTOUCH*) cmalloc(4*NTLDCOL,"INIT1");
  for (t=0; t< NTLDCOL; t++) touch[i][t]= NULLADDR;
  }

event_info=     cmalloc(MAX_EVENT_RECS * CTL_REC_LEN+1,"");
first_ctl_rec=  cmalloc(CTL_REC_LEN,"");
second_ctl_rec= cmalloc(CTL_REC_LEN,"");
third_ctl_rec=  cmalloc(CTL_REC_LEN,"");

/**  \ 8 \ 8 . 3    ==>  22 + 1 (for terminator) = 23      **/
for (i=0; i< NFNAME; i++) filenames[i]= cmalloc(23);
if (!readwind())
{ printf("\n\nYou have the wrong version of @WINDOW^G \n");
  printf("You must get the correct version before you can proceed \n");
exit(0);
}

td= debug;
debug=0;
for (i=0; i<MAXEVTS; i++) events[i]= cmalloc(EVENTLEN+1,"");
neventrec= cmalloc(MAXEVTS,"");
eventrec=  (int*) cmalloc(MAXEVTS*2,"");
idxrecn =  (int*) cmalloc(MAXEVTS*2,"");
debug=td;

setmode(MODE80);

if (vision) initt ch();
touchact=0;
clx(1,15); /* clear screen */

cursor(10,24);
i= (sysver & 0x7FFF);
sprintf(buf, "COMPOSER.   Version %d.%d%d  3/10/86",
  i/100, (i%100)/10, i%10 );
wrtstr(buf, ATNORM);

/* readwind(); */
setdef(WNVIDSEG);
setdef(WNVIDMAT);
setdef(WNVIDSTI);
setdef(WNFADE);
setdef(WNTRANS);

td= debug;
debug=0;
/* allocate ssval size */
for (i=0; i< NTLROW; i++)
  for (t=0; t< NTLDCOL; t++) ssval[i][t]= cmalloc(TLSIZE+1,"");
debug=td;

strcpy(dirname,""); /* initialize to default directory */

  /***** information from AUTHOR PROFILE *****/
  /* get presentation name */
if ( !(ptfile= fopenx("AUTHOR.FIL", "r")) )
{ beep("You do not have an author file.");
  exit(0);
  }
else
{ fgets(buf,80,ptfile);       /*                  presentation name */
  if (presname[0]== '\0')
  { sscanf(buf,"%s", presname);
      /* trim off quotes */
```

```
    for (t=0; presname[t]; t++) {
      presname[t]= presname[t+1];
      if (presname[t]=='"') { presname[t]='\0'; break; }
      }
    }
   fgets(buf,80,ptfile);         /*  "n"           novice or experienced */
   fgets(buf,80,ptfile);         /*  "<name>"      author name           */
   fgets(buf,80,ptfile);         /*  "06-03-1985"  date last logon       */
   fgets(buf,80,ptfile);         /*  ""            validation level      */
   fgets(buf,80,ptfile);         /*  "1"           number of players     */
   sscanf(buf+1,"%d", &nplayers);
   if (debug) printf(" buf nplayers= |%s| %d\n",buf,nplayers);
   fgets(buf,80,ptfile);         /*  "y"           touch screen          */
   sscanf(buf+1,"%c", &usetouch);
   usetouch= (toupper(usetouch)== 'Y');
   fgets(buf,80,ptfile);         /*  "y"           video disk            */
   sscanf(buf+1,"%c", &usevideo);
   usevideo= (toupper(usevideo)== 'Y');
   if (nplayers<=0) usevideo=0;
   if (debug) printf(" usetouch usevideo= %d %d\n",usetouch,usevideo);
   }
 fclosex(ptfile);

 fword= -1;
 nwords=0;
 newword=-1;
 fwords= openfile("WORDS",BREAD);
 if (fwords<=0 )
 { printf("WORDS file not found in your current directory.\n");
   exit(0);
   }
 td= debug; debug=0;
 while (reads(fwords, buf, WRECLEN))
 { buf[WRECLEN]='\0'; /* for sscanf below */
   for (t=0; t<WORDLEN-1; t++) if (buf[t]==' ') break;
   buf[t]= '\0';
   wrds[nwords]= cmalloc(strlen(buf)+1);
   stctrim(wrds[nwords],buf,0);
   sscanf(buf+t+1,"%x",&wrdaddr[nwords]);
   nwords++;
   }
 closef(fwords);
 debug= td;

 getccf(  presname, filenames );

 if (debug)
   for (i=0; i<NFNAME; i++) printf("File %d= |%s| \n",i,filenames[i]);

 glibfid= lib_open( filenames[FNAME_LBR], 0);

   /* open key file */
 ptfile= fopenx(filenames[FNAME_KEY], "r");
 if (ptfile== NULL)
 { clx(1,15);
   printf("The key file %s was not found.\n",filenames[FNAME_KEY]);
   exit(0);
   }

 for (t=1; t<=SRMISC; t++) {
   fgets(buf,80,ptfile);    /* video disk */
   stcpadr(buf,3,0);
   lithead[t][0]= (buf[1]< ' ') ? ' ' : buf[1];
   lithead[t][1]= (buf[2]< ' ') ? ' ' : buf[2];
   lithead[t][2]= '\0';
   buf[strlen(buf)-1]='\0';  /* take cut trailing quote */
   litnum[t]= stoi(buf+3);
   }
 fclosex(ptfile);
```

```
  /* open outline file */
 foutline= openfile(filenames[FNAME_VT],BREAD);
 if (foutline<=0 ) error( "NO file ",filenames[FNAME_VT]);

 maxcol=80; /* maximum column */
 mincol=1;  /* mininum column */
 maxrow=25; /* maximum row */
 minrow=1;  /* maximum column */

 /* initial values */
 entered= NO;

 openrw();  /* open index, control, ... files for presentation */

 fseek(ctl_file, 0L, 2);
 lctlrec= ftell(ctl_file) / CTL_REC_LEN;

 nerr=0;
 nevents=0;
 nirec=2;
 fseek(key_file, (long)IDX_REC_LEN, 0);  /* position to 2nd record of file */
 while ( fread(buf, IDX_REC_LEN, 1, key_file) )
 { buf[EVENTLEN]= '\0';
   stctrimr(buf);
   if (strcmp(buf,"ZZZZZZZZ")!=0)
   { strcpy(events[nevents],buf);
     neventrec[nevents]= buf[10];
     eventrec[nevents]= * (int*) &buf[11];
     idxrecn[nevents]= nirec++;
     if (eventrec[nevents] + neventrec[nevents] - 1 > lctlrec)
     { if (!nerr) printf("\n\n");
       printf(
       "ERROR in event %s.  REL IDX REC= %d.  event rec= %d.  Last rec= %d\n",
         buf,nirec-1,eventrec[nevents],lctlrec);
       nerr++;
       if (filereset)
       { idxrec= idxrecn[nevents];
         updindex ( nevents, idxrec, 0, 0);
         fseek(key_file, (long)idxrec* (long)IDX_REC_LEN, 0);
         }
       }
     nevents++;
     }
   }
 if (strcmp(buf,"ZZZZZZZZ")!=0) /* need to add a ZZZZZZZZ record to idx file*/
   fwrite("ZZZZZZZZ\0\0\0\0\0\0", IDX_REC_LEN, 1, key_file);

 if (nerr)
 { printf("YOU HAD A TOTAL OF %d ERRORS    \n",nerr);
   printf("Call Nancy Frank immediately at 404-238-4269.   \n");
   printf("Also, please write down errors listed above.    \n\n");
   exit(0);
   }

 /* set up icon window */
 read_rec( buf, lit_file, 2, LITRLEN);
 w= windows+ WNL25;
 for (i=12; i< 63+6; i++) if (buf[i]=='\0') buf[i]= ' ';
 cp= *(w->literals+5); cp+=2;  movmem(buf+12, cp, 6);
 cp= *(w->literals+6); cp+=2;  movmem(buf+18, cp, 6);
 cp= *(w->literals+7); cp+=2;  movmem(buf+63, cp, 6);

  /* initialize audit trail */
 initaud();

  /***** read in first three control records *****/

   /* first control record */
 read_rec(first_ctl_rec, ctl_file, 1, CTL_REC_LEN);
 syscolor = (first_ctl_rec[16]!=' ') ?
            first_ctl_rec[16] : 1;
```

```
defwipe  = (first_ctl_rec[50]!=' ') ?
              first_ctl_rec[50] : 0;     /* default wipe routine */
deftran  = (first_ctl_rec[51]!=' ') ?
              first_ctl_rec[51] : 0;     /* default tran routine */

if ( !( (0 <= defwipe && defwipe<=11) || defwipe == 99) )
{ beep("You have a bad default wipe # in your presentation profile");
  defwipe=0;
  }
datever = * (int *) &first_ctl_rec[28];
pause("before datever print");

expand = (datever & 0x8000) ? 1 : 0;
/* if (expand != ( (datever & 0x8000) ? 1 : 0 ) )
   { beep(
"Your data is inconsistent with the way you have said to expand the commands");
     exit(0);
     }
*/
   ip= (int*) &first_ctl_rec[28];
   *ip= 0x8000*expand + sysver;

     /**** read in second control record ****/
   pause("before reading second control rec");
   read_rec(second_ctl_rec, ctl_file, 2, CTL_REC_LEN);
   pause("after reading second control rec");
   dpal = second_ctl_rec[0];
   if (dpal!= ' ' && dpal!=0xFF)
   { dpal -= 0x30;  /* Change from ascii to binary */
     if (dpal<0 && dpal>3) dpal= ' ';
     }
   dback = second_ctl_rec[1];
     /**** read in third control record ****/
   pause("before reading third control rec");
   read_rec( third_ctl_rec, ctl_file, 3, CTL_REC_LEN);
   pause("after reading in third control record");

  initbuf();  /* init graphics buffer */

  }

static initbuf ()
{ graphbuf= cgetbuf(0xFFFFL);
  }

static freebuf ()
{ rlsml(graphbuf,0xFFFFL);
  }

static initaud ()
{ long *pos,*pos2;
  int i;
  int faud2;
  char cmptrail2[81];

  audhead= cmalloc( ADRECL, "initaud.1");
  audrdbuf= (int*) cmalloc( ADNCPR+ADNCPR, "initaud.2");
  audwrbuf= (int*) cmalloc( ADNCPR+ADNCPR, "initaud.3");

  strcpy(cmptrail,"\\");
  strcat(cmptrail,presname);
  strcat(cmptrail,"\\");
  strcat(cmptrail,"CMPTRAIL");
  strcpy(cmptrail2, cmptrail);
  strcat(cmptrail2, ".2");

  audrdfpl=0L;
  auddelay=0;
```

```
/******* will be reading an audit trail */
if (audread)
{ faud= openfile(cmptrail,BREAD);
  if (faud<0)
  { printf("ERROR.  file %s not found\n",cmptrail);
    exit(0);
    }
  read(faud, audhead, ADRECL);
  cursor(3,1);
  if (!audfirst)
  { printf(
  "There are %d sessions recorded. Enter the first and last session to run ",
      (int) audhead[0]);
    scanf("%d %d",&audfirst, &audlast);
    }
  if (audlast< audfirst) audlast= audfirst;
  audfirst--;
  audlast--;
  audinuse= audfirst;
  inaudses(audfirst);
  }
  /***** end of will be writing an audit trail */

  /****** will be writing an audit trail */
if (audwrite)
{ faud= openfile( cmptrail,BUPDATE);

    /* read or build audhead */
  if (faud>=0) read(faud, audhead, ADRECL);
  else
  { faud = creat( cmptrail,BUPDATE);
    setmem(audhead,ADRECL,'\0');
    }
  audn = (int) audhead[0];
  cursor(1,1);
  if (audwrite==2) printf("Outputting session # %d\n",audn+1);

  if (audn>= ADMAX)  /* have hit the max # of audits to keep. reset file */
  { printf(" REBUILDING %s\n",cmptrail);

    unlink(cmptrail2);
    faud2 = creat(cmptrail2,BUPDATE);
    if (faud2< 0)
    { printf("Error creating temporary file to rebuild %s",cmptrail2);
      exit(0);
      }

    audhead[0]= ADKEEP;
    audn= ADKEEP;
    pos  = (long *) (audhead+1);
    pos2 = pos+ (ADMAX-ADKEEP);

    if (lseek( faud, *pos2, 0) <0L) /* position file to start of session */
    { printf("Error reading %s.\n",cmptrail); exit(0); }

    audwrsz= *pos2 - ADRECL;
    for ( i=0; i< ADKEEP; i++, pos++, pos2++) *pos= *pos2 - audwrsz;
    for ( i= ADKEEP; i< ADMAX; i++, pos++) *pos= 0; /*reset rest of audhead*/

    write(faud2, audhead, ADRECL);

    while (1)
    { audwrbsz= read(faud, audwrbuf, ADRECL);
      if (audwrbsz) write(faud2, audwrbuf, audwrbsz);
      if (audwrbsz< ADRECL) break;
      }
    close(faud);
    close(faud2);
    unlink(cmptrail);
```

```
i= rename(cmptrail2,cmptrail);
faud= openfile(cmptrail,BUPDATE);  /* audhead already built */
]
    pos= (long*) (audhead+1);
    pos+= audn;
    *pos= lseek( faud, 0L, 2);  /* set to end of file */
    if (*pos==0) *pos= ADRECL; /* if have just created file, point to ADRECL */

    audhead[0]= ++audn;

    lseek( faud, 0L, 0);  /* reset file to beginning of file */

    write(faud,audhead,ADRECL);
    audwrbsz= 0;

    lseek( faud, 0L, 2);  /* set back to end of file to be ready to output */

    if (faud== -1)
    { printf("ERROR READING/CREATING CMPAUDIT\n");
      exit(0);
      }
    }
  /******* end of will be writing an audit trail */
  }

inaudses (session)  /* initialize audit session */
int session;
{ long *pos;
  pos= (long*) (audhead+1);
  pos+= session;

  audrdfpl= *pos;
  *pos= lseek( faud, *pos, 0);
  if (*pos< 0L)
  { printf("ERROR in audit trail. Reading past eof= %lx\n",*pos);
    exit(0);
    }

  if (session+1== audhead[0]) audrdsz= 0x7FFF;
  else audrdsz= *(pos+1) - *pos;

  audrdbsz= read( faud, audrdbuf, ADRECL);
  audrdfpl+= ADRECL;
  if (audrdbsz<=0) shutaud(1);
  audrdnxt= 0;
  }

shutaud (code)
int code;
{
  beep("SHUTTING OFF AUDIT TRAIL");
  audread=0;
  }

static setdeb (p)
char *p;
{ char *p2;
  int t,nx,tr;
  tr= nx= 0;
 if (*p== '/')
 { switch (*++p) {
     case 'a': case 'A':
       p++;
       if (toupper(*p)== 'D') debuga= 0;
       else if (toupper(*p)== 'R') { audread=1; audwrite=0; }
       else if (toupper(*p)== 'U') { audread=1; audwrite=2; }
       else if (toupper(*p)== 'W') { audread=0; audwrite=2; }
       else if (toupper(*p)== 'F') sscanf( p+1, "%d", &audfirst);
       else if (toupper(*p)== 'L') sscanf( p+1, "%d", &audlast);
       else { audwrite=0; debuga=0; }
       break;
```

```
      case 'x': case 'X': extfunc= 1;  break;
      case 'm': case 'M':
        printf("ADDRESS FOR SYSVER= %lx",&sysver);
        exit(0);
      case 'd': debug=1; break;
      case 'D': debug=2; break;
      case 'e': case 'E': expand=1;  break;
      case 'r': case 'R': filereset=1; break;
      case 's': case 'S': debugsp=1; break;
      case 'v': case 'V': vision=0;  break;
    } }
  else strcpy(presname,p);
  }

static setup ()
{
  }

bldname (fname, type)
char *fname,*type;
{ strcpy(fname,"\\");
  strcat(fname,presname);
  strcat(fname,"\\");
  strcat(fname,presname);
  strcat(fname,".");
  strcat(fname,type);
  }

or2sr (row)
int row;
{
  if (row>= ORPLAY1) return(row- (ORPLAY1-SRPLAY1));
  else return(0);
  }

#include "\c\stdio.h"
#define EXTERN

main (argc,argv)
int argc;
char *argv[];
{ FILE *ptfile;
  char buf[80];
  char presname[80];
  char *p;

    /* get presentation name */
  if ( !(ptfile= fopen("AUTHOR.FIL", "r")) )
  { printf("You do not have an author file.^G^G");
    exit(0);
    }
  else
  { fgets(buf,80,ptfile);        /*                 presentation name */
    stctrim(presname,buf+1,0);
    }
  p= presname;
  while(*p)
  { if (*p=='"') { *p='\0'; break; }
    p++;
    }
  strcpy(buf,"cev ");
  strcat(buf,presname);
  loadkbd(buf);
  }

  /* load keyboard buffer */
loadkbd (s)
char *s;
{ int i,l;
  int os;
  char kbdbuf[30];
```

```
  l= strlen(s);
  if (l>14) return(0);
  for (i=0,os=0; i<l; i++)
  { kbdbuf[os++]= s[i];
    kbdbuf[os++]= s[i];
    }

  kbdbuf[os++]= 13;
  kbdbuf[os++]= 13;

  i= 30;          poke(0,1050,&i,2);
  i= 30+ 2*(l+1); poke(0,1052,&i,2);
  i=     2*(l+1); poke(0,1054,kbdbuf,i);
  return(1);
  }

stctrim (to,from,f)  /* takes string in 'from' and puts in in 'to', after */
char *from,to[];     /* trimming off both leading and trailing blanks     */
int f;
{ int i;
  i=0;
  while (*from) {
    if (*from!=' ' || i)
    { if (f && i>= *(to-1)) printf("error in stctrim","");
      to[i++]= *from;
      }
    from++;
    }
  to[i]='\0';
  stctrimr(to);
  return(strlen(to));
  }

/* STring TRIM Right / trim off trailing blanks from string */
stctrimr (p)
char *p;
{ int l,n;
  l= strlen(p);
  n=0;
  p+= l;
  while (l--) {
    if (*(--p)==' ') *p='\0';
    else break;
    n++;
    }
  return(n);
  }

/********************************* CONTROL.C *********************************/
/*                                                                          */
/*  This file contains the main loop for which menu to use                  */
/*                                                                          */
/****************************************************************************/

#include "\c\stdio.h"
#define EXTERN extern
#include "state.i"
#include "keys.i"
#include "userproc.i"

static int lolrow, nolrecs;      /* variables for LOROW and NORECS */
extern char next_event[];
extern unsigned int segnum();
extern FILE  *lit_file, *lit_key_file;
extern char *savptr[6];
static char *scrptr;

#define OLCUR  0x0F     /* star character to point to event */
```

```
char scr[LOROW- FOROW+1][NOCOLS+1];
int cursrow=FOROW-1;  /* row number cursor was on */
int folrec;  /* first outline record on display */
static int starcol;  /* column that star is in */
static int tcursrow, tfolrec, tstarcol;  /* temporary storage */

/*** heading
OUTLINE FOR xxxxxxxx    EVENT= 12345678   NEXT EVENT= 1234567890123456789012345
                                                                          ***/
doact (action)
int action;
{
  if (actwind<0 || (actwind>= LWIND && actwind != WNMISC) )
  { printf("^G^G ERROR IN COMPOSER. ACTWIND &ACTWIND= %d %lx\n",
      actwind,&actwind);
    exit(0);
    }
  switch (actwind) {
    case WNOUTL:    action= outline(action);    break;
    case WNTIMEL:   action= timel(action);      break;
    case WNPHRASE:  action= phrase(action);     break;
    case WNLIT:     action= litcntl(action);    break;
    case WNTOUCH:   action= touccntl(action);   break;
    case WNMISC:    action= misc(action);       break;
    case WNGRAPH:   action= graphics(action);   break;
    case WNMOVE:    action= move(action);       break;
    case WNFADE:    action= fade(action);       break;
    case WNTRANS:   action= trans(action);      break;
    case WNEXAMIN:  action= examin(action);     break;
    case WNL25:     action= lin25(action);      break;
    case WNINDIC:   action= indic(action);      break;
    case WNVARS:    action= vars(action);       break;
    case WNMATCH:   action= match(action);      break;
    case WNCLEAR:   action= clear(action);      break;
    default: action= stdwin(action, actwind);   break;
    }
  return(action);
  }

static outline (action)  /* outline window */
int action;
{ int ch;
  int loutline;  /* last outline line displayed */
  char *p,ename[20];
  int i,j,t;

  switch (action) {
    case START:
      for (i=FOROW; i<=lolrow; i++) {
        setmem(&scr[i-FOROW][0],NOCOLS,' ');
        scr[i-FOROW][NOCOLS]='\0';
        }

      lolrow= LOROW;
      nolrecs= NORECS;
      readnr(foutline, nolrecs, 0, 0x80, scr[0], NOCOLS );
      dispwind(WNOUTL);

      cursor(FOROW-1,1);
      wrtstr("OUTLINE FOR ",ATNORM);
      wrtstr(presname,ATNORM);

      folrec= 0;
      dispol();
      findev(FOROW,1);
      break;
    case RESET:
    case SAVE:
      cursor(FOROW-1,25);  /* reset ACTIVE EVENT message */
      wrtstrn(" ",ATNORM,56);
```

```
    lolrow= LOROW;

    pause("copying back records.");
    t= (NOCOLS+1)* ((ORTIME-1)-FOROW);
    movmem(scrptr, scr[0], t);
    if (debug) printf("reset scr.  t= %d.   scr[0]= |%s|\n",t,scr[0]);
    cfree(scrptr,"C1");
    pause("reset scr[0]");
    nolrecs= NORECS;

    starcol= tstarcol;
    folrec=  tfolrec;
    cursrow= tcursrow;
    findev(cursrow,1); /* this will position the cursor */
    break;

  case RESUME: break;
  }

while (1) {
ch= getchx();
if (ch== GOTOEVT)
{ if (authorevt(evname,1 ) ) continue;
  actwind= WNTIMEL;  /* active window becomes timeline */
  return(START);
  }
if (ch== F2)
{ actwind= WNAUTHEV;
  dispwind(WNAUTHEV);
  while (1)
  { entwind(WNAUTHEV,0);
    if (lch== ESC || lch== F3)
    { actwind= discwind(1);
      return(RESUME);
      }
    if (lch== RETURN)
    { chkevent( fieldp(WNAUTHEV,0), ename);
      if (*ename== '*')
      { stctrim( evname, fieldp(WNAUTHEV,0), 0);
        if (authorevt(evname, 1) ) continue;
        discwind(1);
        actwind= WNTIMEL;  /* active window becomes timeline */
        return(START);
      } }
    }
  continue;
  }
 if ( ch== RETURN) {  /* display timeline */
     /* extract event name */
   if (exevname(evname))
   { if (authorevt(evname,0) ) continue;
     actwind= WNTIMEL;  /* active window becomes timeline */
     return(START);
     }
   continue;
   }
 if (ch== F9) return(GOTOCND);
 if (ch== FA) return(STOP);
 if (ch== RGT || ch== DN || ch== TAB) {  /* cursor right */
   if (!findev(cursrow+1,1)) pageold();
   }
 if (ch== LFT || ch== UP || ch== BTB) {  /* cursor left */
   if (!findev(cursrow-1,-1)) pageolu(-1);
   }
 if (ch== PDN) pageold();
 if (ch== PUP) pageolu(1);
 if (ch==HOM) {  /* set to beginning */
   readnr(foutline, nolrecs, 0, 0x80, scr[0], NOCOLS );
   folrec= 0;
   dispol();
   findev(FOROW,1);
   }
```

```
if (ch==END) {
  while ( readnr(foutline, nolrecs, folrec+ nolrecs, 0x80, scr[0],
        NOCOLS) >0) folrec+= nolrecs;
  dispol();
      findev(lolrow,-1);
      /* findev(FOROW,1); */
      }
    }
  }

authorevt (evname, readol)
char *evname;
int readol;
{ int i,fr;
  int err;
  char evt[BRANCHLEN+1];

  stctrim( evt, evname, 0);
  if (readol)
  { fr= findnr(evt, foutline, 0x80, NOCOLS );
    if (fr>=0)
    { readnr(foutline, nolrecs, fr, 0x80, scr[0], NOCOLS );
      folrec= fr;
      dispol();
      findev(FOROW,1);
      }
    }

 err= readevt( evt);
 if (err)
 { switch(err)
   { case 1: beep("YOU HAVE AN UNDETERMINED ERROR IN YOUR CONTROL FILE");
             break;
     case 2: beep("THE EVENT DOES NOT HAVE A RECORD IN THE EVENT INDEX FILE");
             break;
     case 3: beep("ONE OR MORE CONTROL RECORDS ARE MISSING");
             break;
     case 4: beep("THE EVENT CONTAINS A COMMAND WITH NO LENGTH");
             break;
     }
   return(1);
   }

 invwords();  /* invert addresses on word list */

 cursor(FOROW-1,25);
 wrtstr("EVENT= ",ATOLREV);
 wrtstrn(evt,ATOLREV,8);

 tstarcol= starcol;
 tfolrec=  folrec;
 tcursrow= cursrow;

  /* set up tenths array */
for (i=0; i<NTLDCOL; i++) tenths[i]= sdtoi(ssval[SRTIME][i]);
updsegs(0);  /* update segments */
updsegs(1);  /* update segments */

cursor(FOROW-1,43);
wrtstr("NEXT EVENT= ",ATOLREV);
  cpyevtnm(evt, next_event, 13);
  wrtstrn(evt, ATOLREV, 26);
  return(0);
  }

static findnr (evname, fd, recl, bufmod)
  /* find outline records for event */
char *evname;
int fd, recl;
int bufmod;  /* modulo of buf */
```

```
{ int rc,nr,rr;
  char p[128], en[10];

  rc= recl;
  lseek( fd, 0L, 0);

  for (nr=0; ; nr++)
  { rr= reads( fd, p, recl);
    if ( rr != recl)
    { return(-1);
      }
    p[bufmod]= '\0';

    rc= starfst(p);
    if (rc>=0)
    { exevn( en, p, rc);
      if (strcmp(en,evname)==0) break;
      }
    }
  return(nr);
  }


exevname (p)
char *p;
{ if (cursrow>= FOROW)
  { exevn(p, scr[cursrow-FOROW], starcol);
    stcpadr(p, EVENTLEN, 0);
    }
  return(cursrow>= FOROW);
  }

exevn (op, buf, os)
char *op, *buf;
int os;
{ char *p;
  int j;
  p= op;
  for (j=os+1; j< LOCOL; j++, p++)
  { if (buf[j]==' ' || buf[j]== '\0')
    { *p ='\0';
      break;
      }
    else *p= toupper( buf[j]);
    }
  }
static timel (action)
int action;
{ WINDOW *tlwind, *w;
  int retcode,octlcol,act,i,t,row,time;
  char *p, *p2, str1[9], str2[9];
  int orow, tc, rc;
  int blankit;
  int *nt;

  if (debug) printf("TIMEL.s nolrecs= %d\n",nolrecs);
  tlwind= windows+ WNTIMEL;  /* pointer to timeline window */

  switch (action) {
    case START:
      settl(0,0);
      ctlrow= ctlcol= 0;

        /* save this here since setout will change screen */
        /* must add one to it since will be for next window */
      scrsave[nwindows+1]= readscrn( 1, 1, 24, 80);
      setout();  /* set up outline */
      dispwind(WNTIMEL);
      fldnum=NTLCOL;
      break;
```

```
case RESUME:
  fldnum= savedfld[nwindows];
    /* do this only if did not just exit from NEXT window */
  if (debug) printf(" nwindows= %d.  savedwn[%d]= %d. savedwn[%d]= %d. \n",
    nwindows,nwindows, savedwn[nwindows], nwindows+1, savedwn[nwindows+1]);
  if (savedwn[nwindows+1]== WNNEXT) break;

  if (lch== F3)
  {
    /* reset time line entry */
    for (i=0; i< NTLDCOL; i++)
    { if (tenths[ctlcol+ i] != otenths[ctlcol+i])
      { itosd(otenths[ctlcol+ i],ssval[SRTIME][i]);
        dspfld(i,WNTIMEL);
        }
      }
    movmem(otenths,tenths,NTLDCOL*2);

    orow= ( ((FIELD*)(tlwind->flds)) +fldnum )->row;
    blnkdata(orow, actcol);

    for (i=0; i< norgdata; i++)
      movmem( &orgdata[i+i], orgdata[i+i+1], 4);  /* move pointer */
    strcpy( ssval[orow-(ORPLAY1-SRPLAY1)][actcol], kbdtemp);
    dspfld(fldnum,actwind);
    }
  else
    for (i=0; i< norgdata; i++)
      cfree(orgdata[i+i],"freeing saved data in timel");
  norgdata=0;
  break;

case SAVE:
  invwords();  /* invert addresses on word list */
  writeevt( presname, evname);
  opkeys();
  if (!gotocond) actwind= discwind(1);  /* this discards timeline */
  return( (gotocond) ? GOTOCND : SAVE );

}

while (1) {
  retcode= entwind( WNTIMEL, fldnum);
  actcol= (fldnum % NTLCOL)+ ctlcol;
  norgdata=0;
  if (debug) printf("timel.1  \n");

  time=0;
  switch (lch)
  { case PL:  if (ok2inc(1)) time= 1;     break;
    case MI:  if (ok2dec(1)) time=-1;     break;
    case APL: if (ok2inc(1)) time=10;     break;
    case AMI: if (ok2dec(10)) time=-10;   break;
    case F5:  time= -tenths[actcol];      break;
    default: break;
    }

  if (debug) printf("timel.2  \n");
  if ( time)
  { inctime(actcol, time, 1,
      (video[0][actcol]!= NULLADDR && video[0][actcol]->segtype==2)
      || (video[1][actcol]!= NULLADDR && video[1][actcol]->segtype==2) );
    udvidseg(actcol,0);
    udvidseg(actcol,1);
    }

  if (lch== RGT || lch== LFT || lch== TAB || lch== BTB) {
    octlcol= ctlcol;
    switch(lch) {
      case RGT: ctlcol++;            break; /* scroll right one column */
      case LFT: ctlcol--;            break; /* scroll left one column */
```

```
    case TAB:  ctlcol+= NTLCOL-1;     break; /* tab right */
    case BTB:  ctlcol-= NTLCOL-1;     break; /* tab left */
    }
  if (ctlcol<0) ctlcol=0;
  if (ctlcol> (NTLDCOL-2) - (NTLCOL-1)) ctlcol= (NTLDCOL-1) - (NTLCOL-1);
  if (ctlcol!= octlcol) {
    settl(0,ctlcol);
    dspwnd(WNTIMEL);
    }
  continue;
  }

if (debug) printf("timel.3  \n");

if (lch== F1 || lch== F9) {
  gotocond= (lch==F9);
  if (chktouch() && chkseg(0,0,0) && chkseg(1,0,0) && chkwtime())
  { if (norgdata >0)
    { norgdata= -norgdata;
      printf("SETTING NORGDATA TO -NORGDATA^G^G^G\n");
      }
    actwind= WNNEXT;
    return(START);
    }
  else continue;
  }
if (lch== F3) {
  p= readscrn(25,1,25,80);
  beep("");
  if (getyn("Do you really want to exit without saving? Y/N [ ]",
    ATNORM,25,1,80,25,49))
  { pause("before opkeys");
    opkeys();  /* save, because you may have saved a touch format */
    pause("after opkeys");
    freesavp();  /* free space for saved last line */
    pause("after freesavp");
    actwind= discwind(1);
    pause("after discwind");
    return(RESET);
    }
  else writscrn(25,1,25,80,p);   /* redisplay bottom line */
  continue;
  }
if (lch== F6)
{ stillfrm( (DSGRAPH *) 0, 1);
  lch= getchx();
  settrans(0);
  continue;
  }
if (lch== INSC) {
  if (insert(actcol)) {
    settl(0,ctlcol);
    dspwnd(WNTIMEL);
    }
  continue;
  }
if (lch== DELC) {
  delete(actcol);
  settl(0,ctlcol);
  dspwnd(WNTIMEL);
  continue;
  }

if (lch==F4)    /* build literal symbol and place in field */
{ if (crow <= ORGRAPH) beep("F4 is not used for these lines");
  else
  { row= or2sr(crow);
    strcpy(str1,lithead[row]);
    litnum[row]++;
    itos(litnum[row],str1+strlen(str1));
    stcpadr(str1, TLSIZE,0);
```

```
    strcpy(ssval[row][actcol],str1);
    dspfld(fldnum,WNTIMEL);
    entered= STAYYES;
    }
  continue;
  }

if (lch== RETURN)
{
    /* have a blank field, blank out data structure */
  if (fisblank(actwind,fldnum)) { blnkdata(crow,actcol); continue; }

    /* if have a label with a higher # than the one stored, save the # */
  row= or2sr(crow);
  if (stscmpn( lithead[row], ssval[row][actcol],2)==0)
  { stcexnum(str1,ssval[row][actcol],0);  /* extract # */
    t= stoi(str1);
    if (t> litnum[row]) litnum[row]= t;
    }

  rc=-1;
  movmem(tenths,otenths, NTLDCOL*2);
  switch (crow) {
    case ORTIME:  /* changing time segment */
      time= sdtoi(ssval[SRTIME][actcol]) - tenths[actcol];

      inctime(actcol, time, 1,
          /* update only this column if its a match frame */
        (video[0][actcol]!= NULLADDR && video[0][actcol]->segtype==2)
     || (video[1][actcol]!= NULLADDR && video[1][actcol]->segtype==2)
        );
      udvidseg(actcol,0); /* update video segment */
      udvidseg(actcol,1); /* update video segment */
      break;
    case ORPLAY1:
    case ORPLAY2:
      playeros= (crow== ORPLAY1) ? 0 : 1;

      if (load[playeros][actcol]!= NULLADDR)
      { setorgdata( &load[playeros][actcol], load[playeros][actcol],
          sizeof(DSLOAD), 0 );
        }
      else if (video[playeros][actcol]!= NULLADDR)
      { setorgdata( &video[playeros][actcol], video[playeros][actcol],
          sizeof(DSVIDEO), 0 );
        }
      else if (still[playeros][actcol]!= NULLADDR)
      { setorgdata( &still[playeros][actcol], still[playeros][actcol],
          sizeof(DSSTILL), 0 );
        }

      if (stscmpnb(ssval[SRPLAY1+playeros][actcol],"UNLOAD")==0)
      { if (load[playeros][actcol]== NULLADDR)
          load[playeros][actcol]= mallload(playeros,actcol);
        load[playeros][actcol]->loadf=0;
        savedfld[nwindows]=lfield;    /* so RESUME will work */
        actwind= WNTIMEL;
        rc= RESUME;
        }
      else
      { if (stscmpnb(ssval[SRPLAY1+playeros][actcol],"LOAD"  )==0)
          actwind= WNLOAD;
        else
         if (stpchr(ssval[SRPLAY1+playeros][actcol],'P')) actwind=WNVIDPOR;
        else
         if (stpchr(ssval[SRPLAY1+playeros][actcol],'S')) actwind=WNVIDSTI;
        else
        { if (frametyp(playeros,actcol)==1) actwind= WNVIDSEG;
          else actwind= WNVIDMAT;
          }
        rc= START;
        }
```

```
        break;
      case ORGRAPH :   /* call graphics */
        if (graph[actcol]!= NULLADDR)
        { setorgdata( &graph[actcol], graph[actcol], sizeof(DSGRAPH), 0 );
          }
/*      if (stscmpn(ssval[SRGRAPH][actcol],"CLEAR",5)==0) continue;
        else { */
          actwind= WNGRAPH;
          rc= START;
/*        } */
        break;
      case ORLIT   :
        if (lit[actcol]!= NULLADDR)
        { setorgdata( &lit[actcol], lit[actcol], sizeof(DSLIT), 0 );
          }
        actwind= WNLIT;
        rc= START;
        break;
      case ORTOUCH :
        for (i=0; i< NTOUCH; i++)
        { if (touch[i][actcol]!= NULLADDR)
            setorgdata( &touch[i][actcol], touch[i][actcol],sizeof(DSTOUCH),
              norgdata );
          }
          /* save # of touch areas */
        nt= &ntchcol[actcol];
        setorgdata( &nt, &ntchcol[actcol], 2, norgdata );

        if ( strcmp(ssval[SRTOUCH][actcol],"CLEAR")==0 )
          blnkdata(crow,actcol);
        else
        { actwind= WNTOUCH;
          rc= START;
          }
        break;
      case ORL25   :
        if (line25[actcol]!= NULLADDR)
        { setorgdata( &line25[actcol], line25[actcol], sizeof(DSLINE25),0 );
          }
        actwind= WNL25;
        rc= START;
        break;
      case ORSOUND :
        if (strncmp(ssval[SRSOUND][actcol],"SP",2)==0)
        { if (spaddr[actcol]!= NULLADDR)
          { setorgdata( &spaddr[actcol], spaddr[actcol], 2*MAXWCOL, 0 );
            setorgdata( &words[actcol], words[actcol], MAX_SPEECH_LEN+1, 1 );
            }
          actwind= WNPHRASE;
          rc= START;
          }
        else blnkdata(crow,actcol);
        break;
      case ORKBD   :
        if (keybrd[actcol]!= NULLADDR)
        { setorgdata( &keybrd[actcol], keybrd[actcol], sizeof(DSKEYBRD),0 );
          }
        if (calcs[actcol]!= NULLADDR)
        { setorgdata( &calcs[actcol], calcs[actcol], sizeof(DSCALC),0 );
          }
        if (stsisvar(ssval[SRKBD][actcol])) actwind= WNVARS;
        else  /* not a variable */
        { switch (tc= typecalc(ssval[SRKBD][actcol]))
          {
            case ADD: case SUB: case DIV: case MULT: case EXP:
              w= windows+ WNCALCS;
              p = *(w->literals+ 1) + 2;
              p2= *(w->literals+ 3) + 2;
              switch(tc)
              { case ADD:  movmem( "ADD     ",p, 8); *p2= '+';  break;
                case SUB:  movmem( "SUBTRACT",p, 8); *p2= '-';  break;
```

```
                    case DIV:  movmem( "DIVIDE  ",p, 8); *p2= 0xF6; break;
                    case MULT: movmem( "MULTIPLY",p, 8); *p2= 'x';  break;
                    case EXP:  movmem( "EXPONENT",p, 8); *p2= '^';  break;
                    }
                  actwind= WNCALCS;
                  break;
                case SET: case SETALL:
                  actwind = WNSET;
                  break;
                case COMP:
                  actwind = WNCOMP;
                  break;
                default:
                  if (stsisvar(kbdtemp)) blnkdata(crow,actcol);
                  actwind= WNMATCH;
                }
              }
            if (actwind!= WNTIMEL) rc= START;
            break;
          case ORINDIC :
            if (switches[actcol] != NULLADDR)
              setorgdata(&switches[actcol],switches[actcol],sizeof(DSSWITCH),0 );
            actwind= WNINDIC;
            rc= START;
            break;
          case ORMISC:
            act=0;
            p= ssval[SRMISC][actcol];
            if (stscmpnb(p,"LOG"    )==0) act=1;
            if (stscmpnb(p,"NOLOG"  )==0) act=2;
          /*if (stscmpnb(p,"PRINT"  )==0) act=3; */
            if (stscmpnb(p,"FIND"   )==0) act=4;
            if (stscmpnb(p,"READ"   )==0) act=5;
            if (stscmpnb(p,"WRITE"  )==0) act=6;
            if (act)
            { actwind= WNMISC;
              rc= act;
              }
            else beep("The keyword you entered is not defined.");
            break;
          }  /* end of switch on crow */
        if (rc>=0)
        { blankit=1;
          if (stscmpnb(kbdtemp,ssval[crow- (ORPLAY1-SRPLAY1)][actcol])==0 ||
            crow== ORTOUCH) blankit=0;  /* no change */
          if ( crow== ORPLAY1 || crow== ORPLAY2)
          {   /* if was blank, or is now of same type, don't blank */
            if (!framekind(kbdtemp) ||
                framekind(kbdtemp)== framekind(ssval[crow- ORPLAY1+1][actcol]) )
              blankit=0;
            }
          if (blankit)
          { if (debug || debugsp) printf("blanking entry |%s|%s|^G\n",
                kbdtemp,ssval[crow- (ORPLAY1-SRPLAY1)][actcol]);
            blnkdata(crow,actcol);
            kbdtemp[0]= '\0';
            }
          return(rc);
          }
        }
      }
    }

static setout ()
{ int nrow2rd;  /* # of rows to read */
  int nrhave;   /* # of rows that we have.  this = nolrecs- nrow2rd */
  int i,frow,lrow,t;
  char *p;
```

```
/*************
   < message line >
   next event, et.al.
 FOROW (=3)

     ============================    <demarkation line>
 ORTIME        <times for columns>

 cursrow= first row to display

 LOROW (=24)    <bottom of time line>
 *************/

 /* move outline up */
 /* save upper area of scr */
if (debug) printf("nolrecs=%d\n",nolrecs);
pause("SETOUT.s");
t= (NOCOLS+1)* ((ORTIME-1)-FOROW);
scrptr= cmalloc( t,"C1");
movmem(scr[0], scrptr, t);
if (debug) printf("scrptr scr[0]= |%s| |%s|\n",scrptr,scr[0]);
pause("saved scr[0]");

lolrow=  (ORTIME-2);
nolrecs= lolrow - FOROW + 1;
frow= cursrow;                    /*  first and         */
lrow= cursrow + nolrecs - 1;      /*  last rows to move */
if (lrow>LOROW)
{ nrow2rd= lrow - LOROW;
  lrow = LOROW;
  }
else nrow2rd=0;
p= readscrn( frow, 1, lrow, 80);
writscrn( FOROW, 1, lrow- (frow - FOROW), 80, p);
folrec+= cursrow- FOROW;
if (nrow2rd)
{ nrhave= nolrecs- nrow2rd;
  readnr(foutline, nrow2rd, folrec+ nrhave, 0x80, scr[nrhave], NOCOLS );
  for (i= FOROW+ nrhave; i<= lolrow; i++)
  { cursor(i,1);
    wrtstr(" ",ATNORM);
    wrtstr(scr[i-FOROW], ATNORM);
  } }
 }

static framekind (s)  /* frame kind */
char *s;
/* returns:  0 for blank
             1 for LOAD
             2 for UNLOAD
             3 for STILL
             4 for PORTFOLIO
             5 for BEG MID OR END FRAME
*/
{ int rc;
  if (isblank(s))                         rc= 0;
  else if (stscmpnb(s, "LOAD"   )==0)     rc= 1;
  else if (stscmpnb(s, "UNLOAD")==0)      rc= 2;
  else if (stpchr(s,'S') )                rc= 3;
  else if (stpchr(s,'P') )                rc= 4;
  else                                    rc= 5;
  if (debug) printf("framekind.e s= |%s|  returning %d \n",s, rc);
  return(rc);
  }

stsisvar (s)
char *s;
{ return( *s== '%' || *s=='$');
  }
```

```
static ok2dec (amt)
int amt;
{ int t1,t2;
  if (actcol==0) t1=0;
  else t1= tenths[actcol-1];
  t2= tenths[actcol]-amt;
  if (t2 && t2<=t1)
  { beep("You cannot decrement time any more.");
    return(0);
    }
  else return(1);
  }

static ok2inc (amt)
int amt;
{ if ( (video[0][actcol] != NULLADDR
        && video[0][actcol]->segtype== 2
        && tenths[actcol+1]!=0
        && (tenths[actcol]+amt >= tenths[actcol+1])
        )
    || (video[1][actcol] != NULLADDR
        && video[1][actcol]->segtype== 2
        && tenths[actcol+1]!=0
        && (tenths[actcol]+amt >= tenths[actcol+1])
        )
      )
  { beep("You cannot increment a match frame this much.");
    return(0);
    }
  else return(1);
  }

static misc (action)
int action;
{ char *p;

  switch (action) {
    case 1:  /* LOG */
    case 2:  /* NOLOG */
      if (print[actcol]== NULLADDR)
        print[actcol]=(DSPRINT*) cmalloc(sizeof(DSPRINT));
      print[actcol]->logf= 2-action;
      savedfld[nwindows]=lfield;     /* so RESUME will work */
      action= RESUME;
      actwind= WNTIMEL;
      break;
/*  case 3: */ /* PRINT */  /* not active */
/*    action= START;      */
/*    actwind= WNPRINT;   */
/*    break;              */
    case 4: case 5: case 6:  /* find, read, write */
      cfree(print[actcol], "MISC");
      action=  RESUME;
      actwind= WNTIMEL;
      break;
    }
  return(action);
  }

/*************************************************************************/
/*********************** control supporting routines ********************/

static dispol ()   /* display outline */
{ int i;
  resolcur();  /* reset cursor */
  for (i= FOROW; i<= lolrow; i++) {
    cursor(i,1);
    wrtstr(" ",ATNORM);
    wrtstr(scr[i-FOROW], ATNORM);
    }
  }
```

```
static findev (lnum,dir)
  /* find event beginning at line lnum in direction dir */
int lnum, dir;
{ int i,j,t;
  for (i= lnum; FOROW<=i && i<= lolrow; i+= dir) {
    if ( (t= starfst(scr[i-FOROW]) ) >=0 )     /* found next */
    { starcol= t;
      resolcur();
      cursrow= i;
      cursor(i,1);

      if (actwind== WNOUTL)
      { wrtch(OLCUR,ATOLCUR);
        for (j=starcol+1; j< LOCOL; j++) if (scr[i-FOROW][j]==' ') break;
        cursor(i,3+starcol);
        color(ATOLREV,j-(starcol+1));
        cursor(i,1);
        }
      return(1);
      }
    }
  return(0);
  }

static starfst (p)
char *p;
{ int pos;
  int rc;  /* =0 if didn't find anything, else = 1 */
  int len=0;  /* length of what was found */
  rc=0;
  pos=0;
  while (*p)
  { if (*p=='*')
    { p++;
      if (*p!='*' && *p!=' ') /* not an event if have 2 asterisks */
      { while (*p && *p!=' ') { p++; len++; }
        if (len<= EVENTLEN) rc=1;
        }
      break;
      }
    if (*p!=' ') { pos=-1; rc=1; break; }  /* mustn't be anything before '*' */
    pos++;
    p++;
    }
  if (!rc) pos=-1;
  return(pos);
  }

pageold ()
  /* REQUEST:  page outline down */
{
  if ( readnr(foutline, nolrecs, folrec+ nolrecs, 0x80, scr[0], NOCOLS ) >0)
  {
    folrec+= nolrecs;
    dispol();
    findev(FOROW,1);
    }
  else
  {
    findev(lolrow,-1);
    }
  }

pageolu (cflag)
int cflag; /* =1 if are to start at the top of the page */
{ int skip;
  skip=0;
  if (folrec) {  /* are not at beginning of file */
    folrec-=nolrecs;
    if (folrec<0)
```

```
    { skip= -folrec;
      folrec=0;
      }
    readnr(foutline, nolrecs, folrec, 0x80, scr[0], NOCOLS);
    dispol();
    }    /* are at beginning of file */
  else if (cflag<0) return;  /* RGT or UP */

  if (cflag>0) findev(FOROW,1);
  else findev(lolrow-skip,-1);
  }

  /* this is called in wind.c */
readnr (fd, nrecs, nxtrec, recl, buf, bufmod)
  /* read next 'nrecs' from file pointed to by file descriptor 'fd'.
     record length is 'recl'.  next record to read is nxtrec.
     place in buffer buf */
int fd, nrecs, nxtrec, recl;
char *buf;
int bufmod;  /* modulo of buf */
{ int i,j,rc,nr;
  char temp[128];
  char *p;
  if (debug) printf("readnr. nrecs nxtrec= %d %d\n",nrecs,nxtrec);
  pause("READNR");

  p= buf;

  nr=0;
  if (nxtrec<0) return(0);
  rc= recl;

  lseek( fd, (long) nxtrec* (long) recl, 0);

  for (i=0; i< nrecs; i++, p+= (bufmod+1) )
  { if ( rc== recl) rc= reads(fd, temp, recl);
    if ( rc== recl)
    { movmem(temp,p,bufmod);
      nr++;
      }
    else
    { if (i==0) break;  /* if there aren't any to read in, don't reset */
      setmem(p,bufmod,' ');
      rc=0;
      }
    p[bufmod]= '\0';
    }
  return(nr);
  }

static resolcur ()
{
  if (cursrow>=FOROW) {
    cursor(cursrow,1);
    wrtch(' ',ATNORM);
    cursor(cursrow,starcol+1);
    color(ATNORM,10);
    }
  cursrow= FOROW-1;
  }


settl (r,c)  /* set time line pointers */
int r, c;
{ WINDOW *pw;
  FIELD *pf;
  int i,j;

  ctlcol=c;
  pw= windows + WNTIMEL;
  pf= pw->flds;
```

```
  for ( i= 0; i< NTLROW; i++) {
    for ( j= 0; j< NTLCOL; j++) {
      pf->data= ssval[r+i][c+j];
      /* strcpy(pf->data,ssval[r+i][c+j]); */
      pf++;
    } }
  }
pause (p)
char *p;
{ char c;
  int t;
  if (!debug || audread) return;
  printf("PAUSING for |%s|.\n",p);
  t= audread;
  audread=0;
  c= getchx();
  audread=t;
  if (c=='s' || c=='S') exit(0);
  }

chktouch ()  /* check touch */
{ int col,i,tn;
  int tnum[NTOUCH+1];
  char buf[81];
  for (col= 0; col< NTLDCOL; col++)
  { for (i=0; i< NTOUCH; i++) tnum[i+1]=0;
    for (i=0; i< NTOUCH; i++)
    { if (touch[i][col]!= NULLADDR && (tn= touch[i][col]->counter) >0)
      { if (tnum[tn]==0) tnum[tn]= 1;
        else
        { sprintf(buf,
          "Counter # %d is defined more than once in column %d for touch %d",
            tn,col+1,i);
          beep(buf);
          return(0);
    } } } }
  return(1);
  }

/* check wipe time */
static chkwtime ()
{ int i;
  DSGRAPH *g;
  int rc;
  char buf[81];

  rc=1;
  for (i=0; i< NTLDCOL && rc ; i++)
  { if (i && tenths[i-1] && tenths[i] && tenths[i-1]>= tenths[i])
    { sprintf(buf,
   "The time you have for column %d is less than or equal to the prior column",
        i+1);
      beep(buf);
      rc=0;
      }
    else
    { if ( (g= graph[i])== NULLADDR) continue;
        /* have a wipe && next column is not 0.0 and don't have enough time */
      if (g->routnum && tenths[i+1] && g->time
          && tenths[i]+ g->time> tenths[i+1])
      { segerr("You do not have enough time for the wipe at column ",i);
        rc=0;
        }
      }
    }
  return(rc);
  }

  /* check segments */
chkseg (playos,startcol,endflg)
int playos;
```

```
int startcol;  /* column to start in                                   */
int endflg;    /* if =0 stop, =1 means reset times without messages */
{ int i;
  int lasttype;  /* last type                  */
  unsigned int lastseg;   /* last segment                  */
  int lastcol;   /* last column segment is in */
  int rc;
  DSVIDEO *dv;
  char buf[80];

  rc=1;
  lasttype= 3;
  lastcol= -1;
    /* do for each column */
  for (i=startcol; i<NTLDCOL && rc; i++)
  { if ( (dv= video[playos][i])== NULLADDR) continue;
    if ( lastcol>=0 && video[playos][lastcol] && dv->segtype!=1)
      dv->speed= video[playos][lastcol]->speed;  /* make sure speed bit is ok*/

    switch (dv->segtype)
    { case 1:  /* beginning segment */
        if (lasttype==1)
        { segerr("Have two beginning segments in row at column ",i);
          rc=0;
          }
        break;

      case 2:  /* middle segment     */
        if (lasttype==3)
        { segerr("Have match frame that doesn't follow beginning frame ",i);
          rc=0;
          }
        if (rc) rc= chktime(i,playos,lastseg,dv->bframe,1);
        break;

      case 3:  /* ending segment     */
        if (lasttype==3)
        { segerr(
          "Have ending frame that doesn't follow beginning or ending frame ",
            i);
          rc=0;
          }
        if (rc) rc= chktime(i,playos,lastseg,dv->eframe,1);
        break;
      }

   if (endflg && dv->segtype==3) break;
   if (rc)
   { if (lastcol>=0)
     { switch (segdir(i,playos))
       { case -1:
           if (segnum(lastcol,playos) <= segnum(i,playos) )
           { sprintf(buf,
               "Segment frame #s are not decreasing for column %d, player %d",
               i+1,playos+1);
             beep(buf);
             rc=0;
             }
           break;
         case  0: break;
         case  1:
           if (segnum(lastcol,playos) >= segnum(i,playos) )
           { segerr("Segment frame #s are not increasing for column ",i);
             rc=0;
             }
           break;
         }
       }
     }
   lasttype= video[playos][i]->segtype;
   lastcol= (lasttype==3) ? -1 : i;
```

```
    lastseg= video[playos][i]->bframe;
    }  /* end of loop */

  if (!endflg && rc && lasttype!=3)
  { segerr("Last segment is not an end frame ",-1);
    rc=0;
    }
  return(rc);
  }

static chktime (col,playos,lastseg,curseg,chkflg)
int col,playos;
unsigned int lastseg, curseg;
int chkflg;
{ int realtime, time, rc;
  long nsegs;
    /* 30 frames/second  = 3 frames/10th sec. */
    /* time (in 10ths) = 10 tenths /30 frames */
  nsegs= (long) curseg- (long) lastseg;
  if (nsegs<0) nsegs= -nsegs;
  if (nsegs<minfrdif(playos,col-1))
  { if (wipeerr) segerr("There is not enough time for the wipe.  See column ",
      col);
    else segerr("Frames are too close together.  See column ", col);
    rc=0;
    }
  else
  { time= sdtoi(ssval[SRTIME][col-1]) +
      (int) ( (float) (nsegs/framep10(video[playos][col]->speed) +.5) );
    realtime= sdtoi(ssval[SRTIME][col]);
    if (time!= realtime)
    { /* itosd(time,ssval[SRTIME][col]); */
      inctime(col, time- realtime, 1,0);
      /* dspfld(col-ctlcol,WNTIMEL); */
      if (!chkflg)
      { segerr("Time doesn't agree with frame #s.  It was reset for column ",
        col);
        rc=0;
        }
      }
    else rc=1;
    }
  return(rc);
  }

static segdir (col,playos)
int col,playos;
{ DSVIDEO *dv;
  dv= video[playos][col];
  if (dv== NULLADDR) return(0);
  return ( (dv->bframe < dv->eframe) ? 1 : -1 );
  }

unsigned int segnum (col,playos)
int col,playos;
{ DSVIDEO *dv;
  dv= video[playos][col];
  if (dv== NULLADDR) return(0);
  return ( (dv->segtype!=3) ? dv->bframe : dv->eframe );
  }

segerr (s,n)
char *s;
int n;
{ int r,c;
  char buf[81];
  strcpy(buf,s);
  if (n>=0) sprintf(buf+strlen(buf),"%d",n+1);

  r= crow;
  c= ccol;
```

```
  beep(buf);
  cursor(r,c);
  }

updsegs (playos)
int playos;
{ DSVIDEO *dv;
  unsigned int lastseg;
  int lastsp;
  int i;
  lastseg=0;
  lastsp= 0;
  for (i=0; i<NTLDCOL; i++)  /* scan forwards setting bframe for type 3 */
  { dv= video[playos][i];
    if (dv!= NULL)
    { if (dv->segtype==1) { lastseg= dv->bframe; lastsp= dv->speed; }
      else
      { dv->speed= lastsp;
        if (dv->segtype==3) dv->bframe= lastseg;
    } } }
  for (i= NTLDCOL-1; i>=0; i--)  /* scan backwards setting eframe */
  { dv= video[playos][i];
    if (dv!= NULLADDR)
    { if (dv->segtype==3) lastseg= dv->eframe;
      else dv->eframe= lastseg;
    } }
  }

static udvidseg (col,playos)
int col,playos;
{ DSVIDEO *dv;
  long amt;  /* amount to increment */
  int i;

  dv= video[playos][col];
  if (dv== NULLADDR) return;   /* don't have a video segment */
    /* don't do anything when have a beginning segment,
         are in column 0, or this is the first segment */
  if (dv->segtype== 1 || col==0 || video[playos][col-1]==NULLADDR) return;

  amt= 3L*(tenths[col] - tenths[col-1]);
  if (dv->bframe > dv->eframe) amt= -amt;
    /* calculate from previous column */
  amt+= stol(ssval[SRPLAY1+playos][col-1]);
  ltos(amt,ssval[SRPLAY1+playos][col]);
  if (dv->segtype== 3)
  {   /* have an ending frame */
    stcsufc(ENDSEG, ssval[SRPLAY1+playos][col], 0);
    dv->eframe= amt;
      /* reset ending frame for entire segment */
    for (i= col-1; i>=0 && video[playos][i]!= NULLADDR; i--)
    { video[playos][i]->eframe= amt;
      if (video[playos][i]->segtype== 1) break;
      }
    }
  else dv->bframe= amt;
  stcpadr(ssval[SRPLAY1+playos][col], ENTRYLEN, 0);
  dspfld(col- ctlcol+ (1+playos)*NTLCOL, WNTIMEL);
  }

static setorgdata (paddr, p, size, norg)
CHARPTR *paddr;
char *p;
int size, norg;
{ orgdata[norg+norg]= cmalloc(size,"in setorgdata");
  movmem( p, orgdata[norg+norg], size);
  orgdata[norg+norg+1]= (char *) paddr;
  norgdata= norg+1;
  }

typecalc (s)
char *s;
```

```
{ if (stscmpnb( s,"ADD"    )==0 ) return( ADD    );
  if (stscmpnb( s,"SUB"    )==0 ) return( SUB    );
  if (stscmpnb( s,"DIV"    )==0 ) return( DIV    );
  if (stscmpnb( s,"MULT"   )==0 ) return( MULT   );
  if (stscmpnb( s,"EXP"    )==0 ) return( EXP    );
  if (stscmpnb( s,"SET"    )==0 ) return( SET    );
  if (stscmpnb( s,"SETALL" )==0 ) return( SETALL );
  if (stscmpnb( s,"COMP"   )==0 ) return( COMP   );
  return(0);
  }
/********************************** DISKIO.C **********************************/
/*                                                                             */
/*                                                                             */
/******************************************************************************/

#include "\c\stdio.h"
#define EXTERN extern
#include "state.i"

closef (fd)
int fd;
{ if (debug) printf("CLOSEF. fd= %d\n",fd);
  close(fd);
  }

createf (fname,mode)
char *fname;
unsigned mode;
{ return( creat(fname,mode));  /* C library routine */
  }

FILE *fopenx (fname, mode)
char *fname, *mode;
{ FILE *fpointer;
  if (debug) printf("fopenx.  fname mode= |%s|%s|\n", fname, mode);
  fpointer= fopen(fname,mode);
  return( fpointer);
  }

fclosex (fp)
FILE *fp;
{ if (debug) printf("fclosex.\n");
  fclose(fp);
  }

freadx (where, elsize, nelem, stream)
char *where;
int elsize, nelem;
FILE *stream;
{ if (debug>1) printf("FREAD. elsize nelem where %d %d %lx\n",
     elsize, nelem, where);
  return( fread(where, elsize, nelem, stream));
  }

DPTR nextrec (fd,buf,len)    /* find where next record is to go */
/* REQUEST:
    return current eof, i.e. where next record will be output.
    if len>0, output record pointed to by buf into file indicated by fd.
    (new eof will be  returned value plus len
                                                                             */
int fd;      /* file descriptor              */
char *buf;   /* buffer to read in            */
int len;     /* length of buffer             */
{ long fend;
  fend= lseek(fd, 0L, 2);   /* seek to end of file */
  if (fend<0) { printf("error in nextrec. fd= %d\n",fd); exit(0); }
  if (len) writer(fd, fend, buf, len);
  if (debug) printf("NEXTREC.E fd, returns = %d %lx\n",fd,fend);
  return(fend);
  }
```

```
openfile (fname,mode)  /* open file */
char *fname;
int mode;
{ int t;
  t= open(fname,mode);
  if (debug) printf("OPENFILE.e   file descriptor= %s %d\n",fname,t);
  return( t);
  }

readr (fd, dptr, pbuf, len)  /* read record */
int fd;      /* file descriptor to use */
DPTR dptr;  /* dptr of record to read if >=0. else read next */
char *pbuf; /* pointer to where to place record read in */
int len;     /* length of record to read                  */
/* returns: =n (# bytes read). =0 eof.  =-1 error, -2 seek error */

/****** add checking about eof from FCB *******/
{ int rc;
  long t;
    /* file, offset, base (relative to beginning */
  if (debug)
    printf("readr.s fd dptr pbuf len= %d %lx %lx %d",fd,dptr,pbuf,len);

  if (dptr== NULLDPTR) error("error in readr.  bad dptr","");
  t= lseek( fd, dptr, 0);
  if (debug) printf("lseek returned %ld\n",t);
  if (t< 0L ) rc=-2;
  else rc= reads( fd, pbuf, len);
  if (debug) printf("  RETURNS rc = %d\n",rc);
  return(rc);
  }

reads (fd, pbuf, len)  /* read record */
int fd;      /* file descriptor to use */
char *pbuf; /* pointer to where to place record read in */
int len;     /* length of record to read                  */
{ if (debug) printf("reads.s fd pbuf len= %d %lx %d\n", fd, pbuf, len);
  return( read( fd, pbuf, len));
  }

writer (fd, dptr, pbuf, len)
int fd;      /* file descriptor to use */
DPTR dptr;  /* record # to write if dptr>=0.  else write sequentially */
char *pbuf; /* pointer to where to place record read in */
int len;     /* length of record                          */
/* returns: # char written if successful. -1 if error. -2 if seek error */
/****** add checking about eof from FCB *******/
{ if (debug)
    printf("writer.s fd dptr pbuf *pbuf len= %d %lx %lx .%s. %d\n",
      fd,dptr,pbuf,pbuf,len);
    /* file, offset, base (relative to beginning */
  if (dptr== NULLDPTR) error("error in writer. bad dptr","");
  if (lseek( fd, dptr, 0) < 0)
  { if (debug) printf("writer.  lseek failed\n");
    return(-2);
    }
  return (writes( fd, pbuf, len) );
  }

writes (fd, pbuf, len)
int fd;      /* file descriptor to use */
char *pbuf; /* pointer to where to place record read in */
int len;     /* length of record                          */
{
  return (write( fd, pbuf, len) != len);
  }

/********************************* GRAFCNTL.C ********************************/
/*                                                                           */
/*                                                                           */
/*****************************************************************************/
```

```
/* This module contains the control functions for graphics, literals, and
   touch area definitions */

/*      smode: actual mode of screen */

#include <\c\stdio.h>
#define EXTERN extern
#include "state.i"
#include "keys.i"
#include "userproc.i"

int setdeflg;
int trreturn = WNGRAPH;

static int newpal,newbord,newback;

/***************************************************************************/
toucсntl (action)       /* TOUch CoNTroL
  *  control routine for touch row in timeline
  *  RETURNS:  RESUME
  *  GLOBALS:
  **/
int action;  /* action code */
{
   DSTOUCH *t;
   WINDOW *w;
   FIELD *f;
   int actgraf,i;
   char actgname[25];
   int retcode,fcode;
   int numfld=0;
   char *p,*q;

     /******* don't blank out data anymore.  leave it alone, just change the
              name.  this allows for saving a format as TC1, say.  Then
              changing the name to TC2 and saving that                ******/
     /* if changed name of touch area, blank out data */
/* if (stscmpbc(ssval[SRTOUCH][actcol],kbdtemp)) blnkdata(ORTOUCH,actcol); */

   if (ntchcol[actcol] == 0)  /* no touch areas, new definition */
     fcode = rformat(actcol,ssval[SRTOUCH][actcol]);

   /* display graphic and get touch areas */
   actgraf= getgraph(actgname);

   if (actgraf < 0) maxcol = 80; else maxcol = 40;

   p=readscrn(1,1,25,80);     /* read contents of screen into temp buffer */
   addwind(WNTOUCH);
   retcode= gettouch(actcol, actgraf, actgname);    /* get touch areas */
   nwindows--;
    cls(1);         /* clear screen and border */

    writscrn(1,1,25,80,p); /* rewrite old screen contents to screen */
    maxcol=80;
    action = RESUME;
    actwind = WNTIMEL;
    return(action);
    }

/***************************************************************************/
getgraph (s)    /* GET GRAPH
   *  s will be set to the first graphics name found on Timeline (actcol
   *  and earlier)
   *  if none are found or if a CLEARxx name is found, gptr is initialized
   *  RETURNS:  column # of name or -1
   *  GLOBALS:  actcol, ssval[]
   **/
char *s;        /* pointer to buffer which will receive graphics name  */
{ int i;
```

```
  int gnum= -1;

  for (i=actcol; i>=0; --i)
  { stctrim(s,ssval[SRGRAPH][i],0);
    if (*s > ' ')
    { gnum= i;
      break;
      }
    }
  if (gnum <0 || isclear(ssval[SRGRAPH][gnum]) ) blgptr();
  return(gnum);
  }

/***********************************************************************/
graphics (action)  /* GRAPHICS
  *  control routine for graphics row of timeline
  *  RETURNS:  an action code
  *  GLOBALS:
  **/
int action;    /* action code */
{
  int retcode;
  FIELD *f;
  WINDOW *w;
  DSGRAPH *g;

  char *pp;

  pp= ssval[SRGRAPH][actcol];

  if (graph[actcol] == (DSGRAPH *)0) /* have new graph cmd */
  { graph[actcol] = (DSGRAPH *) cmalloc(sizeof(DSGRAPH),"graphics1");
    setdeflg=1;
    }
  else setdeflg=0;

  g= graph[actcol];
  g->videotex = 0;
  haveclear= isclear(pp);
  if (!haveclear)
  {
    if (setdeflg)
    { g->cmdtype=0;     /* Command type (=9, NOT FOUND)       */
      g->frow = g->fcol = g->lrow = g->lcol = 0;
      g->mask= 0xFFFF; /* for R2, = 0x0001 */ /* Mask for the transparent colors
   */

      g->time=0;                                 /* Time for Reveal     */
      g->routnum= defwipe;                       /* Routine Number      */
      g->trncolor= 0x0000;                       /* Transparent Colors  */
      g->bckcolor=(dback != 32) ? dback: 0x00FF; /* Backgrnd color      */
      g->borcolor= 0x00FF;                       /* Border color        */
      g->palcolor= (dpal != 32) ? dpal : 255; /* Palette Color */
      }
    }
  else  /* have clear command */
  { g->routnum=0;  /* no wipe allowed */
    if (setdeflg)
    { g->time=0;                                 /* time                */
      g->mask= 0xFFFF;
      g->bckcolor= (deftran) ? deftran-1 : 0;
      g->borcolor= g->bckcolor;
      g->palcolor= (dpal != 32) ? dpal : 255; /* Palette Color */
      if (deftran)
      { g->trncolor= 1;
        g->trncolor <<= deftran-1;
        }
      else g->trncolor=0;

      g->frow= 1;
```

```
   g->fcol= 1;
   g->lrow= 25;
   retcode= clmode(*(ssval[SRGRAPH][actcol]+5));
   g->lcol= (retcode == MODE80 || retcode == MODEHI) ? 80 : 40;
   }

 if (*(pp+5) <= ' ')       /* CLEAR command */
 {                         /* for R2 */
   g->palcolor= 0x00FF;                       /* palette color      */
   /* if don't have a default transparent color, set to default background*/
   if (deftran==0)
   { g->bckcolor=  (dback != 32) ? dback: 0; /* Backgrnd color     */
     g->trncolor= 1;
     g->trncolor <<= g->bckcolor;
     }
   g->borcolor= g->bckcolor;                  /* border color       */
   actwind = WNTIMEL;
   return(RESUME);
   }
 else                      /* CLEARxx command */
 { actwind = WNCLEAR;
   return(START);
     }
   }

 setdef(WNGRAPH);    /* set defaults for menu screen */
 dispwind(WNGRAPH); /* display menu window */

 while (actwind== WNGRAPH)
 { entwind(WNGRAPH,0); /* get menu selection */
   if (lch == ESC || lch== F3) { actwind = WNTIMEL; action = RESUME; }
   else if (lch== RETURN )    /* if a normal selection was made */
   { action = START;
     w=windows+actwind; /* set pointers for current window and field */
     f=w->flds;
     switch (*(f->data) )
     { case '1': /* fade         */ actwind= WNFADE;  break;
       case '2': /* trans colors */ actwind= WNTRANS; trreturn=WNGRAPH; break;
       case '3': /* move graphic */ actwind= WNMOVE;                    break;
       case '4': /* examine screen */ actwind = WNEXAMIN;               break;
       case '5': case ' ': case '\0': /* return to timeline */
         action= RESUME;
         actwind = WNTIMEL;
         break;
       default: break;
       }
     }
     /* if are going to go back to the time line and do not have
        enough time for the wipe, don't go back */
   if (actwind== WNTIMEL && !adjwipe(g->routnum, g->time, 0, actcol))
   { actwind= WNFADE; action= START; }
   }
 discwind(1);
 return(action);
 }

/***********************************************************************/
fade (action)  /*  FADE
  *  processes popup window for wipe routine of graphics command
  *  RETURNS: action code
  *  GLOBALS: actcol, graph[], windows[]
  **/
int action;      /*      action code     */
{
  int retcode;
  int numfld;
  FIELD *f;
  WINDOW *w;
  DSGRAPH *g;
  int typetwo;
  int oldtime;
```

```
w=windows+actwind;  /* set pointers to current window, field, and graphic */
f=w->flds;
g=graph[actcol];
retcode=0;

if (action == START) {
     /* leave window defaults alone. */

   if (setdeflg) sprintf(f->data,"%d",defwipe);
   else
   { sprintf(f->data,"%d",g->routnum);
     f++;
     sprintf(f->data,"%d",g->time);
     f=w->flds;
     }
   dispwind(WNFADE); /* display window */
   numfld = 0;
   }
else if (action == RESUME) {
   numfld = savedfld[nwindows];  /* get back saved field on resume */
   }
while (!retcode)
{ retcode = entwind(WNFADE,numfld);  /* get data from window */
  if (retcode == DONE || lch == ESC) {            /* if completed normally */

     /* assign new data to data structure */
     oldtime= (g->routnum) ? g->time : 0;
     f=w->flds;
     g->routnum= stoi(f->data);
     f++;
     g->time= stoi(f->data);

     if (!adjwipe(g->routnum, g->time, oldtime, actcol)) retcode=0;

     discwind(1);
     action = START;
     actwind = WNGRAPH;
     }
   else if (retcode == QUIT) {   /* if F3 was pressed */
     discwind(1);
     action = START;
     actwind = WNGRAPH;
     }
   return (action);
   }
}

static adjwipe (routine, time, oldtime, col)  /* adjust wipe time */
  /* return 0 if don't have enough time for wipe */
int routine, time, oldtime, col;
{ int rc;
  int cantchange;
  int amt;
  rc=1;
  amt=0;
  cantchange= ( (video[0][col+1]!= NULLADDR && video[0][col+1]->segtype!=1)
             || (video[1][col+1]!= NULLADDR && video[1][col+1]->segtype!=1) );
  if (!routine) time=0;
  if (oldtime > time)  /* have adjust time down */
  { if (!cantchange)  /* can change */
    {  /* time exactly matches time */  /* leave .1 between columns */
      if (tenths[col]+ oldtime == tenths[col+1])
      { amt= time - oldtime;
        if (!time) amt++;  /* must have at least .1 between columns */
        }
      }
    }
 else
 { /* have wipe and have non-zero column folowing this */
```

```
    if (routine!=0 && tenths[col+1])
    { amt= tenths[col]+ time - tenths[col+1];
      if (amt<0) amt=0;
      if (cantchange && amt)
      { beep("You do not have enough time to perform the wipe");
        rc=0;
        amt=0;
        }
      }
    }
  if (amt) inctime(col+1,amt,1,0);
  return(rc);
  }

/***********************************************************************/
move (action)  /* MOVE
  *  processes popup window for move routine of graphics command
  *  RETURNS: action code
  *  GLOBALS: actcol, graph[], windows[]
  **/
int action;     /*      action code     */
{
   int retcode;
   int numfld;
   int havefile;
   FIELD *f;
   WINDOW *w;
   DSGRAPH *g;
   GHEADER header;

   w=windows+actwind;  /* set pointers for current window, field, and graphic */
   f=w->flds;
   g=graph[actcol];
   havefile= (readgraph(ssval[SRGRAPH][actcol],&header,1)!= NULLADDR);
   if (action == START) {
     if (setdeflg) setdef(WNMOVE); /* if new, then set defaults */
       /* set top row regardless */
     if (havefile)
     { sprintf(f->data,"%d", header.ulrowcol >> 8    );  f++;
       sprintf(f->data,"%d", header.ulrowcol & 0x00FF ); f++;
       sprintf(f->data,"%d", header.lrrowcol >> 8     ); f++;
       sprintf(f->data,"%d", header.lrrowcol & 0x00FF ); f++;
       if (setdeflg)
       { strcpy(f->data,(f-4)->data); f++;
         strcpy(f->data,(f-4)->data); f++;
         strcpy(f->data,(f-4)->data); f++;
         strcpy(f->data,(f-4)->data); f++;
         }
        }
       else  /* if setdeflg, second row was already set */
       { strcpy(f->data," ?");  f++;
         strcpy(f->data," ?");  f++;
         strcpy(f->data," ?");  f++;
         strcpy(f->data," ?");  f++;
         }
       if (!setdeflg)
       {                        /* load old data into i/o fields */
         sprintf(f->data,"%d",g->frow); f++;
         sprintf(f->data,"%d",g->fcol); f++;
         sprintf(f->data,"%d",g->lrow); f++;
         sprintf(f->data,"%d",g->lcol);
         }
       dispwind(WNMOVE); /* display window */
       numfld = 0;
       }
     else if (action == RESUME) {
       numfld = savedfld[nwindows]; /* get back saved last field */
       }
     f=w->flds;
     retcode = entwind(WNMOVE,numfld); /* enter data into window */
     if (retcode == DONE || ich == ESC) {              /* if completed normally */
```

```
      /* assign new data into data structure */
      f+=4;
      g->frow= stoi(f->data); f++;
      g->fcol= stoi(f->data); f++;
      g->lrow= stoi(f->data); f++;
      g->lcol= stoi(f->data);
      discwind(1);
      action = START;
      actwind = WNGRAPH;
      }
    else if (retcode == QUIT) {  /* if F3 was pressed */
      discwind(1);
      action = START;
      actwind = WNGRAPH;
      }
    return (action);
    }

/***************************************************************************/
trans (action)          /* TRANSparent colors
  *  processes popup window for transparent colors routine of graphics command
  *  RETURNS: action code
  *  GLOBALS: actcol, graph[], windows[]
  **/
int action;      /*      action code      */
{
    int retcode;
    FIELD *f;
    WINDOW *w;
    DSGRAPH *g;
    int i;
    char temp;
   w=windows+actwind; /* set pointers to current window, field, and graphic */
   f=w->flds;
   g=graph[actcol];
   if (action == START) {
     if (setdeflg)
     { setdef(WNTRANS); /* if new graphic, then set defaults */
       sprintf(f->data,"%2d",deftran);
       }
     else sprintf(f->data,"%2d",getbit(g->trncolor));  /* else load old data */

     dispwind(WNTRANS); /* display the window */
     }
   retcode = entwind(WNTRANS,0); /* enter data into the window */
   if (retcode == DONE || lch == ESC) { /* if completed normally */

     /* assign new data to data structure */

     g->trncolor = 0;
     i= stoi(f->data);
     if (i)
     { g->trncolor= 1;
       g->trncolor <<= i-1;
       }

     discwind(1);
     actwind = trreturn;
     action = (actwind == WNGRAPH) ? START : RESUME;
     }
   else if (retcode == QUIT || retcode== DOSOME) { /* function key pressed */
     discwind(1);
     actwind = trreturn;
     action = (actwind == WNGRAPH) ? START : RESUME;
     }
   return (action);
   }

/***************************************************************************/
getbit (d)      /* GET BIT
```

```
  *  if d has one bit set, i.e. d = 2 to the nth
  *  RETURNS:  the number of the bit set (1-16)
  *  else returns 0
  *  GLOBALS:  none
  **/
int d;
{ int i,j;
  int rc;
  for (i=1, j=1, rc=0; j<=16 && rc==0; i*=2, j++)
    if (d==i) rc= j;
  return(rc);
  }

/***************************************************************************/
examin (action) /* EXAMINe screen
  *  processes popup window for show screen routine of graphics command
  *  RETURNS: action code
  *  GLOBALS: actcol, graph[], windows[]
  **/
int action;      /*      action code     */
{
   DSGRAPH *g;
   int i,ok;
   int omaxcol;
   unsigned vsrowcol,verowcol;
   char *p,*q;
   GHEADER header;
   char temp[81];

   p= NULLADDR;
   g= graph[actcol];
   omaxcol= maxcol;
   maxcol= 40;
   q= readscrn(1,1,25,80);
   newpal= newback= newbord= 0;

   addwind(WNEXAMIN);

   gratt= ATTR;
   p=readgraph(ssval[SRGRAPH][actcol],&header,0);
   if (p!= NULLADDR)
   { setmode(header.gmode);

     back=    header.color  ;
     border=  header.color  ;
     palette= header.palette;

     if (smode!= MODEMD && smode!= MODEHI)
     { if (g->bckcolor != 0xFF) back=    g->bckcolor;
       if (g->borcolor != 0xFF) border=  g->borcolor;
       if (g->palcolor != 0xFF) palette= g->palcolor;
       }
     if (back== ATTR) gratt=1;

     setgrcol( back, border, palette);

     if ((g->frow == 0) && (g->fcol == 0) && (g->lrow == 0) && (g->lcol == 0))
     { vsrowcol=header.ulrowcol;
       verowcol=header.lrrowcol;
       }
     else {
       vsrowcol = g->frow; vsrowcol <<= 8; vsrowcol += g->fcol;
       verowcol = g->lrow; verowcol <<= 8; verowcol += g->lcol;
       }
     dispgraph(0x0101,vsrowcol,verowcol,p);
     }
  else {
    back=    g->bckcolor;
```

```
 border=  g->borcolor;
 palette= g->palcolor;
 setmode(MODE80);
 cls(0);
 }

   setupcol(1, gratt);
   ok = 0;

/* if (smode != MODELO) chbord(border);
   else {
     chbord(back);
     chback(back);
     chpal(palette);
     } */
   while (ok == 0) {
     lch = getchx();
     ok= colswitch(g, lch, 1);
     }
   setmode(MODE80);
   cls(1);
   writscrn(1,1,25,80,q);
   freegraf();
   action = START;
   actwind = WNGRAPH;
   maxcol= omaxcol;

   nwindows--;
   return (action);
   }

/**********************************************************************/
assignch (ch, s)        /*  ASSIGN CHaracter
  *  one character string is formed at s
  *  RETURNS:  nothing
  *  GLOBALS:  none
  **/
char ch;                /*  the character        */
char *s;                /*  string pointer       */
{ *s= ch;
  *(s+1)='\0';
  }

#define SET_C 100
#define TEST_C 101
#define ADD_C 102

/**********************************************************************/
indic (action)          /*  INDICators (switches)
  *  control routine for indicators row in timeline
  *  RETURNS:  action code
  *  GLOBALS:
  **/
int action;  /* action code */
{
   int retcode;
   int numfld;
   int i,code,oc,nx;
   char *p;
   unsigned two[16];
   FIELD *f;
   WINDOW *w;
   DSSWITCH *s;

   two[0]=1;
   for (i=1;i<16;++i) two[i]=two[i-1]*2;

   w=windows+actwind;
   f=w->flds;
   if (switches[actcol] == (DSSWITCH *)0) setdeflg=1;
   else setdeflg=0;
```

```
if (action == START) {
  numfld = 0;
  if (setdeflg) setdef(WNINDIC);
  else {
    s=switches[actcol];
      /*******************/
      /* assign old data */
      /*******************/
    if (s->opcode == SET_C) {
      *(f->data)= '\0';
      for (i=0;i<16;++i) {
        if ((s->mask & two[i]) == two[i]) {
          if ((s->swset & two[i]) == two[i]) strcat(f->data,"Y");
          else strcat(f->data,"N");
          }
        else strcat(f->data,"x");
        }
      f++;
      strcpy(f->data,"xxxxxxxxxxxxxxxx"); f++;
      strcpy(f->data," "); f++;
      strcpy(f->data," "); f++;
      strcpy(f->data," "); f++;
      strcpy(f->data," ");
      }
    else
    {   /* build set and test strings */
      strcpy(f->data,"xxxxxxxxxxxxxxxx"); f++;
      *(f->data)= '\0';
      for (i=0;i<16;++i) {
        if ((s->mask & two[i]) == two[i]) {
            /* if have ADD command or if test for 'Y' */
          if ( s->opcode== ADD_C || (s->swtest & two[i]) == two[i])
            strcat(f->data,"Y");
          else strcat(f->data,"N");
          }
        else strcat(f->data,"x");
        }
      f++;
      if (s->opcode == TEST_C) {
        strcpy(f->data," "); f++;
        strcpy(f->data," "); f++;
        }
      else  /* have ADD */
      { *(f->data)= s->op; *( (f->data)+1)= '\0';  f++;
        sprintf(f->data,"%d",s->nhits);            f++;
        }
          cpyevtnm(f->data,s->posevent,f->length); f++;
          cpyevtnm(f->data,s->negevent,f->length);
          }
        f=w->flds;
        numfld= (s->opcode == TEST_C || s->opcode == ADD_C) ? 1 : 0;
        } /* end of assign data */
      dispwind(WNINDIC);
      }
    else if (action == RESUME) numfld = savedfld[nwindows];

    code = 0;
    oc= 0;
    while (code != DONE) {
      retcode = entwind(WNINDIC,numfld);
      if (retcode == QUIT) {
        discwind(1);
        action = RESUME;
        actwind = WNTIMEL;
        code = DONE;
        }
      else
      if (retcode == FINT)
      { if (fldnum==0)
        { if ( strcmp(f->data, "xxxxxxxxxxxxxxxx") )
          { oc= SET_C;
```

```
      retcode= FINTDONE;
      code = DONE;
    } }
  else if (fldnum== 2)  /* have changed operator field */
  { f= w->flds+ 2;
    if ( *(f->data) != '\0' && *(f->data) != ' ') /* have an operator */
    { f--;  /* look at switches to test */
      for (i=0, p= f->data, nx=0; i<16; i++, p++)
        if (*p== 'N') { nx++; *p= 'x'; }
      if (nx)
      { dspfld(1,WNINDIC);
        beep("You cannot enter 'N' when you use an operator");
        }
      }
    }
  numfld= fldnum+1;
  }
else if (retcode == FINTDONE || lch== ESC) {
  f=w->flds;
  if ( strcmp(f->data,     "xxxxxxxxxxxxxxxx") ) oc= SET_C;
  else if (!isblank((f+2)->data) || !isblank((f+3)->data)) oc= ADD_C;
  else if (strcmp((f+1)->data, "xxxxxxxxxxxxxxxx") ) oc= TEST_C;
  if (!oc)
  { beep("You have not specified whether this is a SET TEST or ADD");
    numfld=0;
    continue;
    }
  else code= DONE;
  }
}
 if (oc)
 {   /* assign new data to structure */
   if (switches[actcol]==(DSSWITCH *)0) {
     p= cmalloc(sizeof(DSSWITCH));
     switches[actcol]=(DSSWITCH *)p;
     s=switches[actcol];
     }
   s->opcode=oc;
   switch (s->opcode) {
     case SET_C:
       s->mask = 0;
       s->swset = 0;
       for (i=0;i<16;++i) {
         if ((f->data)[i] != 'x' && (f->data)[i]!= 'X') {
           s->mask += two[i];
           if ((f->data)[i] == 'Y') s->swset += two[i];
           }
         }
       break;
     case ADD_C:
     case TEST_C:
       f++;
       s->mask = 0;
       s->swtest = 0;
       for (i=0;i<16;++i) {
         if ((f->data)[i] != 'X' && (f->data)[i]!= 'x') {
             /* if operation is ADD, only turn on if a 'Y' */
           if ( (s->opcode== TEST_C) || (f->data)[i]=='Y') s->mask += two[i];
           if ( (f->data)[i] == 'Y') s->swtest += two[i];
           }
         }
       f++;
       if (s->opcode== ADD_C)
       { s->op= *(f->data);       f++;
         s->nhits= stoi(f->data); f++;
         }
       else f+=2;
       chkevent(f->data,s->posevent);  f++;
       chkevent(f->data,s->negevent);
       break;
     }
```

```
    action = RESUME;
    actwind = WNTIMEL;
    discwind(1);
    }
  return (action);
  }
/***********************************************************************/
getheader (g,header)    /*  GET HEADER
  *  if graphics file is successfully opened, header information is
  *  transferred to header
  *  RETURNS:  whether or not open was successful
  *  GLOBALS:   none
  *  note:  fread returns an int quantity!
  **/
 DSGRAPH *g;      /*  DSGRAPH pointer     */
 GHEADER *header;        /*  pointer to graph header structure  */
 {
   FILE *fp;
   char temp[10];
   char actgname[30];
   char buffer[30];
   long nact;

   stctrim(temp,ssval[SRGRAPH][actcol],0);
   sprintf(actgname,"\\%s\\%s.%c%c%c",presname,temp,presname[0],presname[1],
     presname[2]);

   fp=fopen(actgname,"rb");
   if (fp!= NULL)
   { nact=fread(buffer,1,1,fp);

     if (nact != 1L) printf("error in fread, nact = %ld\n",nact);
     if (*(buffer) == 0xFD) {
       fseek(fp,7L,0);  /* if bsave, then skip bsave header */
       }
     else fseek(fp,0L,0);
     nact=fread(buffer,28,1,fp);
     if (nact != 1L) printf("error in fread, nact = %d\n",nact);
     fclose(fp);
     if (*(buffer) > 6 ) movmem(buffer,(char *)header,28);
     else movmem(buffer,(char *)header,11);
     }
   return( fp!= NULL);
   }

 /***********************************************************************/
 clear (action)          /*  CLEAR
   *  control routine for graphics CLEARXX
   *  RETURNS:  action code
   *  GLOBALS:  actcol
   **/
 int action;      /*  action code         */
 { int numfld;
   char *p,*ss;
   FIELD *f;
   WINDOW *w;
   DSGRAPH *g;
   int ok;

   g=graph[actcol];
   if (g== NULLADDR)
   { beep("ERROR IN CLEAR.  no data structure defined^G^G");
     actwind = WNTIMEL;
     return(RESUME);
     }
   ss=ssval[SRGRAPH][actcol];

   p=readscrn(1,1,25,80);
   addwind(WNCLEAR);
```

```
cls(0);

setclmode(*(ss+5));
g->lcol= maxcol;

back    = g->bckcolor;
border  = g->borcolor;
palette = g->palcolor;

if (back==0xff)    back=0;
if (border==0xff)  border=0;
if (palette==0xff) palette=0;

setgrcol( back, border, palette);

setupcol( 1, ATTR);
cursor(1,1);
ok = 0;

newpal=newback=newbord=0;

while (ok == 0) {
  lch = getchx();
  ok= colswitch(g, lch, 1);
  }

setmode(MODE80);
cls(1);
writscrn(1,1,25,80,p);
action = START;
trreturn = WNTIMEL;
actwind = WNTRANS;
nwindows--;

if (setdeflg)  /* set default transparencies */
{ if (g->bckcolor)
  { g->trncolor=1;
    g->trncolor <<=  g->bckcolor;
    }
  else g->trncolor=0;
  setdeflg= 0;  /* since have set transparent information */
  }
return (action);
}

/************************************************************************/
setgrcol ( back, border, palette) /*  SET GRaph COLor
 *      if graphics, background and palette changed
 *  else background and border changed
 *  RETURNS:  nothing
 *  GLOBALS:  smode
 **/
int back;               /*  background color    */
int border;      /*  border color           */
int palette;     /* palette id              */
{
 if (smode== MODELO)
 { if (back != 0xff || smode !=smode) chbord(back);
   if (palette != 0xff) chpal(palette);
   }
 else if (border != 0xff) chbord(border);
 if (back != 0xff) chback(back);
 if (debug) printf("setgrcol.s back border palette smode= %d %d %d ___\n",
   back,border,palette,smode);
 pause("setgrcol");
 }

************************************************************************/
setclmode (ch)           /*  SET CLear MODE
 *  calls clmode() and setmode()
```

```
  *  RETURNS:  nothing
  *  GLOBALS:  none
  **/
char ch;                /*  x of CLEARxy        */
{ setmode(clmode(ch));
  }

/************************************************************************/
clmode (ch)      /*  CLear MODE
  *  translates from 'H', 'L', 'M', '4', '8' to correct screen mode
  *  RETURNS:  screen mode
  *  GLOBALS:  sets havegraph = 0
  **/
char ch;
{ int rc;
  switch(ch)
  { case 'H': rc= MODEHI; break;
    case 'L': rc= MODELO; break;
    case 'M': rc= MODEMD; break;
    case '4': rc= MODE40; break;
    case '8': rc= MODE80; break;
    case '1':   /* break; */
    default: rc= MODE80;
    }
  havegraph= 0;
  return(rc);
  }

/**********************************************************************/
static colswitch (g, ch, fullclr) /*  COLor SWITCH
  *  routine which allows user to select colors
  *  RETURNS:  ch if == FA, ESC, F3; else 0
  *  GLOBALS:  smode
  **/
DSGRAPH *g;             /*  g pointer           */
int ch;                 /*  user response       */
int fullclr;            /*  Full clear indicator        */
{ char temp[81];
  int ok=0;

  if (g== NULLADDR) beep("BAD g pointer in literal");
switch (ch) {
  case ESC: case F3:
  case FA:
    ok = ch;
    if (ch== FA)
    { /* save data to structure */
      if (palette<0 || (palette!= 255 && palette>3) )
      { sprintf(temp,"Bad palette, (=%d).  Set to 255^G^G",palette);
        beep(temp);
        palette= 255;
        newpal= 1;
        }
      }
    if (newpal)  g->palcolor= palette;
    if (newback) g->bckcolor= back;
      /* set border color to background color for MODELO */
    if (smode== MODELO) g->borcolor= g->bckcolor;
    else if (newbord) g->borcolor= border;
    break;
  case F1:
    if (!fullclr) beep("Cannot change color with partial clear");
    else
    if (smode != MODELO)
    { if (border < 0xF) border++;
      else border = 0;
      chbord(border);
      newbord = 1;
      }
```

```
      else beep("Cannot change border in LO mode");
      break;
    case F2:
      if (!fullclr) beep("Cannot change color with partial clear");
      else
      if (smode == MODELO)
      { if (palette < 3) palette++;
        else palette = 0;
        chpal(palette);
        newpal= 1;
        }
      else beep("You can only change palette in LO mode");
      break;
    case F4:
      if (back < 0xF) back++;
      else back=0;
      if (smode == MODELO) chbord(back);
      chback(back);
      if ( back== ATTR || back==0 ) setupcol(1,ATTR); /* reset grid and inst */
      newback= 1;
      break;
    default:
      break;
    }
  return(ok);
  }

/*************************************************************************/
 isclear (s)              /*  IS CLEAR
   *  RETURNS:  whether s points to a name starting with "CLEAR"
   *  GLOBALS:  none
   **/
 char *s;          /*  string pointer               */
 { return( stscmpn(s, "CLEAR", 5) == 0);
   }

 #define FILLCHAR (char) 219

 /*************************************************************************/
 static setupcol (fullclr, att)  /*  SET UP COLor
   *  sets up screen for color choices
   *  RETURNS:  nothing
   *  GLOBALS:  none
   **/
 int fullclr, att;
 { char temp[81];

   *temp= '\0';
   if (fullclr && smode != MODELO) strcpy(temp,"F1=Border");
   if (fullclr && smode == MODELO)
   { if (*temp) strcat(temp,"/");
     strcat(temp,"F2=Palette(    )");
     }
   if (smode == MODELO)
   { if (*temp) strcat(temp,"/");
     strcat(temp,"F4=Background");
     }
   else
   if (haveclear)
   { if (*temp) strcat(temp,"/");
     strcat(temp,"F4=Fill color");
     }

   if (back==att) att=1;
   grid(att);
   cursor(23,1);
   wrtstr(temp, att);
   if (fullclr && smode== MODELO)
   { cursor(23,13);
     wrtch(FILLCHAR,1);
```

```
    wrtch(FILLCHAR,2);
    wrtch(FILLCHAR,3);
    }
  cursor(24,1);
  wrtstr("F10=Accept screen/F3=Cancel",att);
  }

/********************************** GRAPHICS.C **********************************/
/*                                                                              */
/*                                                                              */
/********************************************************************************/

#include <\c\stdio.h>
#define EXTERN extern
#include "state.i"
#include "keys.i"
#include "userproc.i"

static char *gptr= NULLADDR;
static long lgptr;

char *readgraph (fname,header,headonly)
  /* read and decompress graphics image from file returning pointer to
     decompressed image
     if headonly, get header for graph, instead of reading it all */
char *fname;       /* file name containing graphics image */
GHEADER *header;   /* pointer to file header */
int headonly;
{
   int inlibr= 0;
   char *pl,*d;
   long nact;
   long lsize;
   long toread;
   long plsize;
   unsigned compcalc();
   int para;
   FILE *fp;
   union {
     struct {
       unsigned offset;
       unsigned segment;
       } parts ;
     char *ptr;
     } pp,qq;
   char templ[80], temp2[80];

   stctrim(templ,fname,0);

   if ( glibfid>=0)
   { lsize= lib_msize(glibfid, templ);
     inlibr= (lsize) ? 1 : 0;
     }

   if (!inlibr)
   {
     sprintf(temp2, "\\%s\\%s.%c%c%c",presname,templ,presname[0],presname[1],
       presname[2]);
     fp= fopenx(temp2,"rb");  /* open graphics image file */
     if (fp== NULLADDR) return(0L);
     fseek(fp,0L,2);
     lsize= (long) ftell(fp);
     fseek(fp,0L,0);
     }

   plsize= lsize+17;
   pl= cgetbuf( plsize );

   pause("pl");

   pp.ptr= pl;
```

```
if (!inlibr)
{ nact= fread(p1,1,1,fp);
  if (*p1 == 0xFD)
  { fseek(fp,7L,0);
    lsize -= 7;
    }
  else fseek(fp,0L,0);
  if (nact != 1L)
  { sprintf(temp1,"error in fread, nact = %ld",nact);
    beep(temp1);
    return(0L);
    }
  }

para=pp.parts.offset/16;
pp.parts.segment+=(para+1);
pp.parts.offset=0;

if (inlibr)
{ nact= lib_read(glibfid, temp1, pp.ptr, lsize);
  if (nact != lsize)
  { printf("error in lib_read, nact lsize = %ld %ld^G^G___\n",nact,lsize);
    return(0L);
    }
  }
else
{ do
  {
    toread= lsize;
    if (toread>= 0x8000L) toread= 0x7FFFL;
    lsize -= 0x7fffL;
    nact = fread(pp.ptr, 1, (int) toread, fp);
    if (nact != toread)
    { printf("error in fread, nact lsize toread= %ld %ld %ld^G^G___\n",
        nact,lsize,toread);
      return(0L);
      }
    } while (lsize > 0);
  }

if (!inlibr && fp!= NULL) fclose(fp);

if (*(pp.ptr) > 6 ) movmem(pp.ptr,(char *)header,28);
else movmem(pp.ptr,(char *)header,11);

if (headonly) return((char *) 1L);
   lsize= compcalc(header);
   lgptr= lsize+16;
   gptr = graphbuf; /* cgetbuf( lgptr );  */ /* gptr is the original pointer */
                                             /* it is freed in freegraf      */
   pause("READGRAF.gptr");
   qq.ptr= gptr;
   para=qq.parts.offset/16;
   qq.parts.segment+=(para+1);
   qq.parts.offset=0;
   decomp(qq.parts.segment,pp.parts.segment);

   rlsml(p1,p1size);
   havegraph=1;
   return(qq.ptr);
   }

char * cgetbuf (ls)
long ls;
{ char *p;
  if (debug) printf("cgetbuf. length= %lx ",ls);
  p= getbuf(ls);
  if (p== NULLADDR)
  { printf("ERROR in cgetbuf.  Trying to get %ld bytes\n",ls);
    exit(0);
    }
```

```
  if (debug) printf("  returns %lx\n", p);
  return(p);
  }

freegraf ()
{
/*if (debug) printf("FREEGRAPH. gptr lgptr= %lx %lx\n",gptr,lgptr);
  pause("FREEGRAPH");
  if (gptr!= NULLADDR) rlsml(gptr,lgptr);  */
  gptr= NULLADDR;
  havegraph=0;
  }

blgptr ()
{
  gptr= NULLADDR;
  lgptr= 0;
  }

dispgraph (wsrowcol,vsrowcol,verowcol,q) /* display a graphics image viewport
                                            frow vsrowcol to verowcol */
unsigned wsrowcol; /* window start row/column */
unsigned vsrowcol; /* viewport start row/column */
unsigned verowcol; /* viewport end row/column */
char *q;       /* pointer to decompressed graphics image */
{ if (q!= NULLADDR)
  { movepc(smode,wsrowcol,vsrowcol,verowcol,q,scrseg);
    }
  }

grid (att)  /* print row/column index overlay */
int att;
{  int i,j;
   char temp[4];

   if (att== back) att=1;
   for (i=2;i<24;i+=2) {
     cursor(i,1);
     sprintf(temp,"%d",i);
     wrtstr(temp,att);
     }
     /* 40 column if graphics, else 80 */
   if (smode == ALPHA || smode == C1680) j=80;
   else j=40;
   for (i=5;i<j;i+=5) {
     cursor(1,i);
     sprintf(temp,"%d",i);
     wrtstr(temp,att);
     }
   }

#define ULC    201    /* define special characters for box */
#define URC    187    /* NOTE: if run with CGA card, box will appear as */
#define BLC    200    /*       a fuzzy blur, due to the absence of bitmap */
#define BRC    188    /*       for characters above 127 */
#define TOP    205
#define BOTTOM 205
#define SIDE   186

box (top,left,bottom,right,att)
int top,left,bottom,right; /* coordinates of box */
int att;
{
   int i;
   if (debug) printf("box. top left bottom right att= %d %d %d %d %xh\n",
     top,left,bottom,right,att);
   if (smode == GRAPHICS || smode==TEXT40 || smode == C1640 ) {
     left = (left+1) /2;
     right= (right+1)/2;
     }
```

```
cursor(top,left);
wrtch(ULC,att);
wrtchars(TOP, right- (left+1), att);
wrtch(URC,att);
for (i=top+1;i<bottom;++i) {
  cursor(i,left);
  wrtch(SIDE,att);
  cursor(i,right);
  wrtch(SIDE,att);
  }
cursor(bottom,left);
wrtch(BLC,att);
wrtchars(BOTTOM, right- (left+1), att);
wrtch(BRC,att);
}

boxchg (delrow, delcol, frow, lrow, fcol, lcol, att)
  int delrow, delcol, frow, lrow, fcol, lcol, att;
  { int i;
    int fr, lr;
    int fc, lc;
    int del;

    if (delcol>0)  /* moving column to right */
    {   /* redraw top line */
      cursor(frow, lcol-delcol);
      wrtchars(TOP, delcol, att);
      wrtch(URC,att);
      }
    else /* moving column to left */
    if (delcol<0)
    { cursor(frow, lcol);
      wrtch(URC,att);
      }

    fr=0;
    if (delcol) { fr= frow+1; lr= lrow-1; }
    else
    if (delrow >0) { fr= lrow- delrow; lr= lrow-1; }
    if (fr)
    { cursor(fr, lcol);
      for (i= fr; i<= lr; i++) { cursor(i,lcol); wrtch(SIDE,att); }
      for (i= lrow- delrow; i<= lrow-1; i++) { cursor(i,fcol); wrtch(SIDE,att); }
      }

    if (delrow)
    { cursor(lrow, fcol);
      wrtch(BLC,att);
      }
      /* do not insert anything here */ /* see comment on !delrow below */

    fc=0;
    if (delrow) { fc= fcol+1; lc= lcol-1; del= lc- fc+1; }
    else
    if (delcol >0) { fc= lcol- delcol; lc= lcol-1; del= delcol; }
    if (fc)
    { if (!delrow) cursor(lrow, fc); /* if delrow, will have positioned cursor */
      wrtchars(BOTTOM, del, att);
      wrtch(BRC,att);
      }
    else
    { cursor(lrow, lcol);
      wrtch(BRC,att);
      }
    }
  setmode (mode)  /* set screen mode */
  int mode;
  {
     union REGS inregs;  /* input registers */
     union REGS outregs; /* output registers */
```

```
    if (debug) printf("setmode.s mode havegraph gcurson= %d %d %d\n",
      mode,havegraph,gcurson);
    pause("setmode");

    smode = mode;  /* screen mode */
    inregs.h.ah=0;
    inregs.h.al=smode;
    int86(0x10,&inregs,&outregs); /* interrupt 10 call */
    if (smode < 0x0D) scrseg = 0xB800;
    else scrseg = 0xA000;
    maxcol= setmaxcol(smode);

    if (smode == MODE80 || smode == MODE40) havegraph= 0;
    if (debug) printf("setmode.e smode mode gcurson= %d %d %d\n",
      smode,mode,gcurson);
    }

setmaxcol (mode)
int mode;
{ return( ( mode == ALPHA ||  mode == C1680) ? 80 : 40 );
  }

unsigned compcalc (header)
GHEADER *header;
{
    unsigned table[8];
    int mode,erc,src,rows,cols;
    int area;
    unsigned total;
    char *d;

    table[0]=0x02; table[1]=0x02; table[2]=0x10; table[3]=0x08;
    table[4]=0x00; table[5]=0x00; table[6]=0x20; table[7]=0x20;

    mode = (int)header->gmode & 0x000E;
    src=header->ulrowcol;
    erc=header->lrrowcol;

    erc-=src;
    erc+=0x0101;
    cols=erc & 0x00FF;
    rows=erc>>8;
    area=rows*cols;
    total= ((unsigned) area ) * table[mode/2];
    total+=(unsigned)11;
    if (mode >= 0x0C) total+=(unsigned)17;
    else if (mode >= 4) total+=(unsigned)384;
    total+=(unsigned)256;
    return(total);
    }
```

```
/********************************** KBD.C ************************************/
/*                                                                           */
/*                                                                           */
/*****************************************************************************/
#define EXTERN extern
#include "\c\stdio.h"
#include "state.i"
#include "keys.i"
#include "userproc.i"

#define NKEYS 32
static int keyoktab[LWIND][NKEYS]= {
/*                                            R         M A A                */
/*                            P P   B H     L i B     P i P M                */
/*                        R E g g T T o E   e g S I D l n l i_C C C          */
/*F F F F F F F F F F e s U D a a m n U D f h p n e u u u n N F F            */
/*1 2 3 4 5 6 7 8 9 A t c p n b b e d p n t t a s l s s s u 1 1 2            */
  0,3,0,0,0,0,3,0,3,3,2,3,3,3,0,0,5,4,5,5,4,4,4,4,4,0,0,0,0,4,0,0/* 0 outline*/
 ,3,0,3,3,3,3,3,0,3,0,2,3,3,3,3,3,5,5,5,5,4,4,4,4,4,3,3,3,3,4,3,3/* 1 time ln*/
 ,0,0,3,0,0,0,3,0,0,0,2,3,0,0,0,0,0,0,0,0,4,4,4,4,4,0,0,0,0,4,0,0/* 2 vid seg*/
 ,0,0,3,0,0,0,3,0,0,0,2,3,0,0,0,0,0,0,0,0,4,4,4,4,4,0,0,0,0,4,0,0/* 3 vid sti*/
 ,0,0,3,0,0,0,3,0,0,0,2,3,0,0,0,0,0,0,0,0,4,4,4,4,4,0,0,0,0,4,0,0/* 4 vid por*/
 ,0,0,3,0,0,0,3,0,0,0,2,3,0,0,0,0,0,0,0,0,4,4,4,4,4,0,0,0,0,4,0,0/* 5 graphic*/
 ,0,0,3,0,0,0,3,0,0,0,2,3,0,0,0,0,0,0,0,0,4,4,4,4,4,0,0,0,0,4,0,0/* 6 fade   */
 ,0,0,3,0,0,0,3,0,0,0,2,3,0,0,0,0,0,0,0,0,4,4,4,4,4,0,0,0,0,4,0,0/* 7 transpa*/
 ,0,0,3,0,0,0,3,0,0,0,2,3,0,0,0,0,0,0,0,0,4,4,4,4,4,0,0,0,0,4,0,0/* 8 move   */
 ,3,3,3,3,0,3,3,0,3,3,2,3,3,3,0,0,3,3,5,5,4,4,4,4,4,0,0,0,0,4,0,0/* 9 literal*/
 ,3,3,3,3,3,3,3,3,3,3,2,3,3,3,0,0,3,3,5,5,4,4,4,4,4,0,0,0,0,4,0,0/*10 touch  */
 ,0,0,3,0,0,0,3,0,0,0,2,3,0,0,0,0,0,0,0,0,4,4,4,4,4,0,0,0,0,4,0,0/*11 line 25*/
 ,0,3,3,0,0,0,3,0,0,0,2,3,0,0,0,0,0,0,0,0,4,4,4,4,4,0,0,0,0,4,0,0/*12 speech */
 ,0,0,3,0,0,0,3,0,0,0,2,3,3,3,0,0,3,4,5,5,4,4,4,4,4,0,0,0,0,4,0,0/*13 words  */
 ,0,0,3,0,0,0,3,0,0,0,2,3,0,0,0,0,0,0,0,0,4,4,4,4,4,0,0,0,0,4,0,0/*14 variabl*/
 ,0,0,3,0,0,0,3,0,0,0,2,3,0,0,0,0,0,0,0,0,4,4,4,4,4,0,0,0,0,4,0,0/*15 match  */
 ,0,0,3,0,0,0,3,0,0,0,2,3,0,0,0,0,0,0,5,5,4,4,4,4,4,0,0,0,0,4,0,0/*16 indic  */
 ,0,0,3,0,0,0,3,0,0,0,2,3,0,0,0,0,0,0,0,0,4,4,4,4,4,0,0,0,0,4,0,0/*17 load   */
 ,0,0,3,0,0,0,3,0,0,0,2,3,0,0,0,0,0,0,0,0,4,4,4,4,4,0,0,0,0,4,0,0/*18 print  */
 ,0,0,3,0,0,0,3,0,0,0,2,3,3,3,0,0,3,3,5,5,4,4,4,4,4,0,0,0,0,4,0,0/*19 events */
 ,0,0,0,0,0,0,3,0,0,0,2,3,0,0,0,0,3,3,0,0,0,0,4,4,4,0,0,0,0,4,0,0/*20 help   */
 ,3,3,3,3,0,0,3,0,0,3,2,3,0,0,0,0,3,3,0,0,0,0,1,4,4,0,0,0,0,1,0,0/*21 examine*/
 ,0,0,3,0,0,0,3,0,0,0,2,3,0,0,0,0,0,0,5,5,4,4,4,4,4,0,0,0,0,4,0,0/*22 next ev*/
 ,3,3,3,3,0,0,3,0,0,3,2,3,0,0,0,0,0,0,0,0,4,4,4,4,4,0,0,0,0,4,0,0/*23 clear  */
 ,0,0,3,0,0,0,3,0,0,0,2,3,0,0,0,0,0,0,0,0,4,4,4,4,4,0,0,0,0,4,0,0/*24 vid mat*/
 ,0,0,3,3,0,0,3,3,3,3,2,3,0,0,0,0,0,0,5,5,4,4,4,4,4,0,0,0,0,4,0,0/*25 touch 2*/
 ,0,0,3,0,0,0,0,0,0,0,2,3,0,0,0,0,0,0,0,0,4,4,4,4,4,0,0,0,0,4,0,0/*26 get evt*/
 ,0,0,3,0,0,0,0,0,0,0,2,3,0,0,0,0,0,0,0,0,4,4,4,4,4,0,0,0,0,4,0,0/*27 calcs  */
 ,0,0,3,0,0,0,0,0,0,0,2,3,0,0,0,0,0,0,0,0,4,4,4,4,4,0,0,0,0,4,0,0/*28 set    */
 ,0,0,3,0,0,0,0,0,0,0,2,3,0,0,0,0,0,0,0,0,4,4,4,4,4,0,0,0,0,4,0,0/*29 comp   */
  };
/*                                                                           */
/*1 2 3 4 5 6 7 8 9 0 1 2 3 4 5 6 7 8 9 0 1 2 3 4 5 6 7 8 9 0 1 2 .          */
/* 0 means key is not defined                                                */
/*#define TASCII  1                                                          */
/*#define TRETURN 2                                                          */
/*#define TFN     3                                                          */
/*#define TMOVE   4                                                          */

 extern int modefact;

 #define SECIND 0

 resettch ()
 { char buf[255];
   ibrpp(touchdev,buf);
   if (buf[0] & 8) ibrd(touchdev,buf,255);
   }

 getcx () /* read a character from the console without checking for ^C */
 { int ch;
   int i;
```

```
  ch= bdos(7) & 0x00FF;

  if (ch== XRETURN)   /* check key file */
  { if (actwind== WNOUTL && nwindows!=1)
    { printf("ERROR. actwind nwindows= %d %d ^G^G^G\n",actwind,nwindows);
      dispmem(0);
      }
    for (i=0; i<= nwindows; i++)
    { if (savedwn[i]<0 || savedwn[i]>=LWIND)
      { printf("error in getcx. nwindows= %d\n^G^G^G",nwindows);
        for (i=0; i<= nwindows; i++) printf("savedwn[%d]= %d\n",i,savedwn[i]);
          printf("savedwn= %lx\n",savedwn);
        dispmem(0);
        break;
        }
      }

    if (strcmp(lithead[1], "VS") || strcmp(lithead[4], "LT")
      || strcmp(lithead[10],"MS"))
    { beep("YOUR KEY FILE IS BAD.  IT IS BEING RESET^G^G^G^G^G^G^G");
      strcpy(lithead[1], "VS");
      strcpy(lithead[2], "ST");
      strcpy(lithead[3], "DS");
      strcpy(lithead[4], "LT");
      strcpy(lithead[5], "TC");
      strcpy(lithead[6], "BR");
      strcpy(lithead[7], "SP");
      strcpy(lithead[8], "AN");
      strcpy(lithead[9], "SW");
      strcpy(lithead[10],"MS");
      }
    }

  if (havemsg) {
    havemsg=0;
    wmsg("");
    }
  return(ch);
  }

static gc ()
/*get a character from the keyboard and take the appropriate action*/
 { int ch,i;

   if (haveaud()) ch= audin();
   else
   {
     ch= getcx();
     if (ch== 0x12 && faud!=0)    /* restart audit trail */
     { audread=1;  /* ^R */
       ch= audin();
       }
     if (ch==SECIND) {   /* have secondary key        */
       ch= getcx();      /* get second character      */
       ch= keyact[ch];   /* translate secondary code */
       }
       /* translate special characters */
     for (i=0; i<NSPECIAL; i++) if ( specch[i]== ch) { ch= speceq[i]; break; }
     }

   if (audwrite)
   { audout(ch);
     if (ch== RETURN)  audwrrec(); /* dump buffer */
     }

   return(ch);
   }

 audwrrec ()
 { if (audwrite && audwrbsz)
```

```
  { write( faud, audwrbuf, audwrbsz);
    audwrbsz=0;
    }
  }

static audout (ch)
int ch;
{ if (!audwrite) return;
  audwrbuf[audwrbsz/2]= ch;  /* divide by two since audwrbsz is an absolute
                                 measure and audwrbuf is an integer */
  audwrbsz+=2;  /* add 2 since are outputting integers */
  if (audwrbsz==ADRECL) /* dump buffer */
  { write( faud, audwrbuf, audwrbsz);
    audwrbsz=0;
    }
  }

static haveaud ()  /* have audit input?
                      returns 1 if have keyboard input
                      returns 2 if have touch screen input */
{ long il;
  int ch;

  if ( audread==0) return(0);

  /* see if have a character waiting at the key board */
  while( bdos(0xb))  /* do have a character */
  { ch= bdos(7) & 0x00FF;
    if (ch== '+') auddelay++;
    if (ch== '-' && auddelay) auddelay--;
    if (toupper(ch)== 'S') { audread=0; return(0); }
    }

    /* delay for audit */
  for (il=0; il< (long) auddelay * 1000; il++) il= il;

  return( (audrdbuf[audrdnxt/2]) ? 1 : 2 );
  }

static audin ()
{ int ch;
  static char s[2]= " ";
/*int tr,tc;
  FIELD *f; */

  ch= audrdbuf[audrdnxt/2];  /* divide by two since audrdnxt is in chars */

  audrdnxt+=2;  /* add two since are moving two bytes to right in array */
  if (audrdnxt>= audrdbsz)
  { if (audwrite)  /* are also writing out audit trail */
      lseek( faud, audrdfpl, 0);
    audrdbsz= read( faud, audrdbuf, ADRECL);
    if (audwrite) lseek( faud, 0L, 2); /* reset to end of file */
    if (audrdbsz<=0) shutaud(2);
    audrdnxt= 0;
    }
    /* are not in last session and have said to quit composer */
  if (audinuse!= audlast && ch== FA && actwind== WNOUTL)
    /* are not in last session and have said to quit ccmposer */
  { audinuse++;
    inaudses(audinuse);  /* go to next session */
    ch= HOM;
    }
  if (debuga)
  { if (ch<=LASCII) { s[0]= ch; wrtstrnc(23,1,s,0x70,6); }
    else wrtstrnc(23,1,keynames[ch- F1],0x70,6);
/*  tr= crow;
    tc= ccol;
    f= (windows+ WNMATCH)->flds;
    cursor(25,50);
```

```
    printf("ADDR of field %d= %lx\n",11,(f+11)->data);
    cursor(tr,tc); */
    }
  return(ch);
  }

getchx ()
/*get a character from the keyboard and take the appropriate action*/
{ int ch,tr,tc;
  long left, sizmem();
  char buf[255];
  FIELD *f;

  if (haveaud()== 2)
  { audin();  /* throuw away character saying we have a touch */
    touchrow= audin();
    touchcol= audin();
    audout( 0);
    audout( touchrow);
    audout( touchcol);
    return(0);  /* have gotten touch input */
    }

  if (touchact && !haveaud() )
    /* (touchact) is true, i.e., touch screen is active */
  { while(!bdos(0xb))
    { buf[0]= '\0';
      ibrpp(touchdev, buf);
      if (buf[0] & 8)  /* something out there */
      { ibrd(touchdev,buf,255);
        if (buf[0]== 3 && buf[1]== 0)
        { touchrow= buf[2];
          touchcol= buf[3]/modefact;
          audout( 0);
          audout( touchrow);
          audout( touchcol);
          return(0);  /* have gotten touch input */
        } }
      }  /* end of waiting for character */
    }  /* end of (touchact) */

  while (1) {
    if (smode!=TEXT40 && smode!= ALPHA && gcurson) gcurs();
    ch= gc();

    if (ch== CD) {
      left= sizmem();
      f= (windows+ WNMATCH)->flds;
      printf("ADDR of field %d= %lx\n",11,(f+11)->data);
      printf("MEMORY LEFT= %lx. smode= %d. ENTER DEBUG VALUEs ",
        left,smode);

      scanf("%d %d",&debug,&debugsp);
      if (debug== -2)
      { printf(" ibfind(vdiscl)= %xh \n",ibfind("vdiscl") );
        debug=0;
        }
      if (debug== -3)
      { printf(" ibfind(touch)= %xh \n",ibfind("touch") );
        debug=0;
        }
      if (debug== -1) { vision=1; debug=0; }
      if (debug==8)  { dispmem(0); debug=0; }
      continue;
      }
     if (ch== CE) {
      dispdata(actcol);
      continue;
      }
```

```
        /* only do test on chtype here if have a function key or special key */
        /* RETURN, et.al. have a ch>= F1                                      */
      if (ch== BAD || (ch>=F1 && !chtype(ch) )  )
      { if (debug) printf(" actwind fldnum= %d %d\n",actwind, fldnum);
        beep("The key you just pressed cannot be used at this time.");
        ch= BAD;
        continue;
        }
      if (smode!=TEXT40 && smode!= ALPHA  && gcurson) gcurs();
      if (makeuppr && 'a'<= ch && ch <= 'z') ch+= 'A'-'a';
      if (makelowr && 'A'<= ch && ch <= 'Z') ch+= 'a'-'A';
      if (makeynx)
      { if (ch== 'X') ch= 'x';
        if (ch== 'n') ch= 'N';
        if (ch== 'y') ch= 'Y';
        if (' '<= ch && ch<='~' && ch!= 'x' && ch!= 'Y' && ch!= 'N') ch= BAD;
        }
      if (ch== F7 && actwind != WNEVTS) {
        if (event(START)) return(GOTOEVT);
        continue;
        }
      if (actwind== WNTIMEL || actwind==WNNEXT) {
        if (ch== PDN) {
          tr= crow; tc= ccol;
          pageold();         /* PAGE Out Line Down */
          cursor(tr, tc);    /* reposition cursor  */
          continue;
          }
        if (ch== PUP) {
          tr= crow; tc= ccol;
          pageolu(1);          /* PAGE Out Line Up  */
          cursor(tr, tc);      /* reposition cursor */
          continue;
          }
        }
      if (actwind== WNTIMEL) {
        if (!entered) { /* in timeline and haven't entered */
          if (ch== XPLUS) ch= PL;       /* return plus action code  */
          else if (ch==XMINUS) ch= MI; /* return minus action code */
          }
        else {  /* have entered */
          if (ch== APL) ch= BAD;
          else if (ch== AMI) ch= BAD;
          }
        }
      if (ch!=BAD) return(ch);
      }
  }

chtype (ch)
int ch;
{ int t;
  int rc;
  if (FASCII<= ch && ch <= LASCII) rc= TASCII;
  else {
    t= ch- F1;
    if (t>= NKEYS) rc= 0;
    else rc= keyoktab[actwind][t];
    }
  if (debug) printf("chtype.e actwind ch t rc= %d %xh %xh %d\n",
    actwind,ch,t,rc);
  return(rc);
  }

beep (s)
char *s;
{ wmsg(s);
  beeponly();
  }
```

```
beeponly ()
{ while(bdos(0xb) & 0xff) bdos(7);  /* discard waiting characters */
  bdos(2,7);   /* do beep */
  }

chkch (str,datat) /* data type checking for string against type datat */
char *str;
int datat;
{
   char string[81];
   int i;
   int ok;
   int temp;
   int t1,t2,t3,t4,t5,end;
   unsigned sn;

   trimblnk(str,string);
   ok=YES;

   if (datat<0) datat= -datat;
   if (!*string && datat!=MODE) return(YES);  /* blank field */

   switch (datat) {
     case ALPHANUM:   break;
     case NUMERIC: if (!number(string) ) ok= NO; break;
     case S12:
       if (*string != 'S' && *string!='0'
           && *string != '1' && *string != '2') ok = NO;
       break;
     case N09: if (!isdigit(*string)) ok = NO;               break;
     case YN:  if (*string != 'Y' && *string != 'N') ok = NO; break;
     case N12: if (*string < '1' || *string > '2') ok = NO; break;
     case N15: if (*string < '1' || *string > '5') ok = NO; break;
     case N011DEF:
       sscanf(string,"%d",&temp);
       if (((temp >= 0) && (temp <=11)) || temp == DEF) ok = YES;
       else ok = NO;
       break;
     case N011:
       sscanf(string,"%d",&temp);
       if ( temp < 0 || temp  > 11 ) ok = NO;
       break;
    case N0100:
      sscanf(string,"%d",&temp);
      if ((temp >= 0) && (temp <=100)) ok = YES;
      else ok = NO;
      break;
    case N016: sscanf(string,"%d",&temp); if (temp<0 || temp>16) ok=NO; break;
    case N125: sscanf(string,"%d",&temp); if (temp<1 || temp>25) ok=NO; break;
    case N150: sscanf(string,"%d",&temp); if (temp<1 || temp>50) ok=NO; break;
    case N180: sscanf(string,"%d",&temp); if (temp<1 || temp>80) ok=NO; break;
    case N0255: sscanf(string,"%d",&temp); if(temp<0 || temp>255) ok=NO;break;
    case PCTDOLV: if (!isvar(string)) ok= NO;
      break;
    case YNX:
      for (i=0;i<strlen(string);++i) {
        if (string[i]== 'y') string[i]= 'Y';
        if (string[i]== 'n') string[i]= 'N';
        if (string[i]== 'X') string[i]= 'x';
        if (string[i]!='Y' && string[i]!='N' && string[i]!= 'x') ok = NO;
        }
      break;
    case TKU:
      if (strlen(string)!=1 ||
            (*string != 'T' && *string!= 'K' && *string!= 'U') ) ok= NO;
      break;
    case LTNUM: /* these are obsolete tests and are no longer used */
    case TCNUM: case ENUM: case BRNUM: case ANNUM: case SWNUM: case STILL:
      break;
    case EQOPS:
```

```
  if (*string == '>' || *string == '<' || *string == '=') ok = YES;
  else ok = NO;
  break;
case MODE:
  if (strcmp(string,"LO") != 0 && strcmp(string,"MD") != 0 &&
      strcmp(string,"HI") != 0 && strcmp(string,"80") != 0 &&
      strcmp(string,"40") != 0) ok= NO;
  break;
case MISC:
  /* do string compares for the various legal strings that can be input
     on the MISC line */
  break;
case VID:
  if (stscmpnb(string,"LOAD")==0) break;     /* = LOAD   */
  if (stscmpnb(string,"UNLOAD")==0) break;   /* = UNLOAD */
  t1=0;
  if (string[0]=='P') t1=1;
  if (string[0]=='S') t1=1;
  if (string[0]==BEGSEG) t1=1;
  t2= strlen(string);
  t2= (string[t2-1] == ENDSEG) ? t2 : 0;
  if (t2) string[t2-1]= '\0';
  if (!isint(string+t1) )  ok= NO;
  else
  { sscanf(string+t1, "%u", &sn);
    if (sn < 0 || 56000 < sn) ok=NO;
    }
  if (t2) string[t2-1]= ENDSEG;
  if (ok== NO && debug) printf("sn= %d\n",&sn);
  break;
case LOWER: break;  /* don't need to check anything */

case SEGNUM:
  if ( !isint(string) ) ok = NO;
  else
  { sscanf(string,"%d",&sn);
    if (sn <= 0 || 56000 < sn) ok=NO;
    }
  if (ok== NO && debug) printf("sn= %d\n",sn);
  break;

case DTTIME:  /* time amount */
  if (!(stsisnum (string, 0, 7, 1, 1, &t1, &t2, &t3, &t4, &t5, &end )
    && (end>= strlen(string) || *(string+end)=='*' || *(string+end)==' ')
    && (end+1>= strlen(string) || isblank(string+end+1) )
    ) ) ok= NO;
    break;

case ENAME:  /* event name */
   if (!chkevent(string, NULLADDR) )
     beep("What you entered is not an event name.^G^G");
  break;

case ENAMEVAR: /* event name or variable */
   if (!isvar(string) && !chkevent(string, NULLADDR) )
     beep("What you entered is not an event or variable name.^G^G");
  break;

case SPEED:
  sscanf(string,"%d",&temp);
  if ( (temp<=0 || 100<=temp) && temp!=100 && temp!=200 && temp!=300)
    ok=NO;
  break;

case NUMVAR: /* numeric variable */
  if (!isvar(string) || *string!= '%') ok= NO;
  break;

case NUMORVAR: /* number or numeric variable */
  if (!number(string) && (!isvar(string) || *string!= '%') ) ok= NO;
  break;
```

```
  case DISPONLY: break;

  default:
    ok = NO;
    break;
  }

if ( debug)
  printf("CHKCH. returns %d  str data type= |%s| %d\n",ok,string,datat);
return(ok);
}
  static number (s)
  char *s;
  { int i;
    for (i=0; i<strlen(s); ++i) if (!isdigitp( s[i]) ) return(0);
    return(1);
    }

  static isvar (s)
  char *s;
  { return( stsisvar(s) && vname(s+1) );
    }

  static vname (s)
  char *s;
  { int i;
    if (!isalpha(*s)) return(0);
    for (i=1; i<strlen(s); ++i) if (!isdigit(s[i]) && !isalpha(s[i]) ) return(0);
    return(1);
    }

    /* display memory */
    /* commands:
    a  # #              adds two numbers
    c                   continue
    d                   display
    e                   END
    s  Dseg  string     scans for string

    */
  dispmem (dlev)
  int dlev;
  { int seg,os,len,i,ty,n1,n2;
    unsigned int ds;
    char ch,action,scanstr[80];
    static char form1[]= "\n %x:%x ";
    if (debug<dlev) return;
    while (1)
    { printf("input ACTION a.dd c.ontinue d.isplay e.nd q.uit s.can\n");
      gets(scanstr);
      sscanf(scanstr,"%c\n",&action);
      if (action=='q') exit(0);
      switch (action)
      { case 'a':
          printf("input numbers\n");
          scanf("%x %x\n",&n1,&n2);
          n1= n1+n2;
          printf("ANS= %x\n",n1);
          break;

        case 's':
          printf("input ds SCAN STRING\n");
          scanf("%x %s\n",&ds,scanstr);
          matchmem(scanstr,ds,0,0xffff);
          break;

        case 'e': return;
```

```
        case 'd':
          printf(" INPUT seg offset show-char?\n");
          scanf("%x %x %d\n", &seg,&os,&ty);
        case 'c':
          len=128;
          while (len>0)
          { printf(form1,seg,os);
            for (i=0; i<16 && len>0 ; i++, len--)
            { peek(seg, os++, &ch, 1);
              if (!ty) printf(" %2x",ch);
              if ( ch<0x20 )  ch=0x20;
              printf("%c",ch);
              }
            }
          printf("\n");
          break;
        }
      }
    }

matchmem (scanstr,ds,fos,los)
unsigned int ds, fos,los;
char *scanstr;
{ unsigned int os, start;
  int j;
  char ch;
  os=0;
  while (1)
  { j=0;
    start= os;
    while (1)
    { peek(ds,os++,&ch,1);
      if (!scanstr[j]) { printf("%x \n",start); break; }
      if (scanstr[j++]!= ch) break;  /* not found */
      }
    if (!os) break;
    }
  }

gcurs ()
{ gcurs2(crow,ccol);
  }

gcurs2 (row,col)
int row,col;
{ unsigned rowcol;
  rowcol= row;
  rowcol<<=8;
  rowcol+= col;
  gcursor(rowcol);
  }

/********************************* LIT.C **************************************/
/*                                                                            */
/*  this file controls specifying literals from the time-line                 */
/*                                                                            */
/******************************************************************************/
/* This module contains the control functions for graphics, literals, and
   touch area definitions */
#include <\c\stdio.h>
#define EXTERN extern
#include "state.i"
#include "keys.i"
#include "userproc.i"

extern int setdeflg;

extern FILE *lit_key_file, *lit_file;
static int flitcol, llitcol; /* 1st and last literal columns, set by displits*/
static int hitf3esc;
```

```
litcntl (action) /* control routine for literal row on timeline */
int action;     /* action code */
{
   DSLIT templit,*t;
   WINDOW *w;
   FIELD *f;
   int grcol;  /* column that graph is in */
   int i;
   char *grptr;
   char gname[9];
   int retcode,recnum;
   int numfld=0;
   char *p,*q;
   GHEADER header;   /* graphics header */
   int newmode;
   char oldmode[3];

   hitf3esc=0;
   w=windows+actwind;  /* get pointers to current window and field */
   f=w->flds;

   if (lit[actcol]==(DSLIT *)0) setdeflg = YES; /* if not allocated */
   else setdeflg = NO;

   switch (action)
   { case START: /* if starting this window */

       grptr= NULLADDR;
       havegraph=0;
       haveclear=0;
       grcol= getgraph(gname);
       if (grcol<0) newmode=MODE80;
       else
       { if (haveclear= isclear( gname ) ) newmode = clmode( gname[5]);
         else
         { grptr= readgraph(gname,&header,0);  /* read graphics image */
           newmode= header.gmode;      /* set graphics mode */
           havegraph=1;
           }
         }

      if (setdeflg)    /* if not allocated, then set defaults for the window */
      { setdef(WNLIT);
        setmem(templit.literal,sizeof(templit.literal),'\0');
        templit.litlen=0;
        templit.editcode=0;
        templit.fcolor=  7;  /* white on black */
        templit.lcolor= 0xFFFF;  /* not assigned   */

        /* if have a literal, see if a column has this same name */
        if (!stsisvar(ssval[SRLIT][actcol]) )
        { for (i=0; i< NTLDCOL; i++)
          { if (i!=actcol&& stscmpbc(ssval[SRLIT][i],ssval[SRLIT][actcol])==0)
            {  /* have found a column with same name */
              movmem(lit[i]->literal,templit.literal,MXLIT+1);
              templit.litlen= lit[i]->litlen;
              break;
            } }

          if (i>= NTLDCOL) /* didn't find literal in another column */
          { recnum= findindx(lit_key_file, lit_file, ssval[SRLIT][actcol],
              templit.literal, 0, LITKLEN, LITKRLEN, LITRLEN, 0);
            if (recnum>0)
            { read_rec(templit.literal,lit_file,recnum,LITRLEN);
              templit.litlen= strlen(templit.literal);
              if (debug) printf("templit.literal= |%s|. templit.litlen=%d \n",
                templit.literal, templit.litlen);
              pause("read in literal ");
              }
            }
```

```
      }  /* end of have a literal */
    }
  else {  /* have data already.  assign old data to i/o fields */
    t = lit[actcol];
    sprintf(f->data,"%d",t->row); f++;
    sprintf(f->data,"%d",t->col);
    movmem(lit[actcol],&templit,sizeof(templit));
    }

  f=w->flds;
  f+= 2;
  switch(newmode)
  { case MODEHI:     strcpy(f->data,"HI"); break;
    case MODEMD:     strcpy(f->data,"MD"); break;
    case MODE40:    strcpy(f->data,"40"); break;
    case MODE80:     strcpy(f->data,"80"); break;
    case MODELO:
    default:        strcpy(f->data,"LO"); break;
    }
  strcpy(oldmode,f->data);

  dispwind(WNLIT); /* display window */
  break;
     case RESUME: /* if resuming this window, set beginning field */
       numfld=savedfld[nwindows];
       break;
     }

   retcode = entwind(WNLIT,numfld); /* enter data into window */
   if (lch== F3)
     /* return to timeline without doing anything */
   { hitf3esc= F3;
     discwind(1);
     action = RESUME;
     actwind = WNTIMEL;
     freegraf();
     }
   else  /* finished normally */
   { /* assign variables to data structure */
     f=w->flds;
     sscanf(f->data,"%d",&templit.row);  f++;
     sscanf(f->data,"%d",&templit.col);  f++;
     if (grcol>=0 && strcmp(f->data,oldmode)!=0)
     { strcpy(f->data,oldmode);
       beep("You cannot change modes.  Mode was left as it was^G^G");
       }
     if (strcmp(f->data,"LO")==0) newmode= MODELO;
     if (strcmp(f->data,"MD")==0) newmode= MODEMD;
     if (strcmp(f->data,"HI")==0) newmode= MODEHI;
     if (strcmp(f->data,"40")==0) newmode= MODE40;
     if (strcmp(f->data,"80")==0) newmode= MODE80;

/*   templit.litlen=maxcol-templit.col; */ /* set this in getlit */

       /* display graphic and get literal */
     discwind(YES); /* discard current window */
     p= readscrn(1,1,25,80);                /* save current screen contents    */

     setmode(newmode);
     retcode=getlit(&templit,grcol,grptr,&header); /* lit input routine */

     if (retcode== F3) hitf3esc= F3;
     /* if literal completed ok, then move data from temp into data structure*/
     if (retcode == DONE) {
       if (lit[actcol]== NULLADDR) { /* if space not allocated, then do so */
         q=cmalloc(sizeof(templit));
         lit[actcol]=(DSLIT *)q;
         }
       movmem(&templit,lit[actcol],sizeof(templit));

         /* set any other columns with same name */
```

```
    for (i=0; i< NTLDCOL; i++)
    { if (i!=actcol && stscmpbc(ssval[SRLIT][i],ssval[SRLIT][actcol])==0)
        movmem(lit[actcol]->literal,lit[i]->literal,MXLIT+1);
      }

    }
  /* return to timeline */
  action = RESUME;
      actwind = WNTIMEL;
      cls(1); /* clear screen and border */
      writscrn(1,1,25,80,p); /* write old screen info back to screen */
      }
    maxcol = 80;
    return(action);
    }

static int cfore, cback, latt, palette, blinkon;

static getbfl (att)   /* get Background Foreground Latt */
int att;
{ if (smode != MODELO)
  { cback= (att & 0x70) >> 4;
    cfore= att & 0x0F;
    blinkon= (smode== MODE40 || smode == MODE80 ) && att & 0x80;
    }
  else
  { cfore= ( att & 0xF)/2;
    }
  latt = ovlbytes(cback, cfore, 4);
  }

static getlit (l,graphcol, grptr, header) /* get a literal from the screen,
                              and update the structure pointed to by l */
DSLIT *l;            /* pointer to literal structure */
int graphcol;
char *grptr;         /* graph pointer */
GHEADER *header;     /* graphics header */
{
   DSGRAPH *g;            /* graphics structure */
   int i,ch;
   int retval = DONE;
   unsigned vsrowcol,src; /* information for dispgraph */
   unsigned verowcol,erc;
   int retcode;
   char temp[20];
   int back,border;

   if (debug) printf("l->literal= |%s|. l->litlen=%d \n",
     l->literal, l->litlen);
   pause(" getlit ");

   if (graphcol>=0) {     /* get and display graphics image */
     g=graph[graphcol];

     back=    (g->bckcolor == 255) ? header->color   : g->bckcolor;
     border=  (g->borcolor == 255) ? header->color   : g->borcolor;
     palette= (g->palcolor == 255) ? header->palette : g->palcolor;

     if ((g->frow == 0) && (g->fcol == 0) && (g->lrow == 0) && (g->lcol == 0))
     { vsrowcol=header->ulrowcol;
       verowcol=header->lrrowcol;
       }
     else {
       vsrowcol = ovlbytes( g->frow, g->fcol, 8);
       verowcol = ovlbytes( g->lrow, g->lcol, 8);
       }

     if (debug) printf("lit.  smode back grptr = %d %d %xh  \n",
       smode,back,grptr);
     pause("LIT");
```

```
        if (smode== MODELO) setgrcol( back, border, palette);
        else
        {
          setgrcol( 0xff, border, palette); /* 0xff means don't set backgr */
          if (grptr== NULLADDR) fillit( back, vsrowcol, verowcol);
          }

        if (grptr!=NULLADDR) dispgraph(0x0101,vsrowcol,verowcol,grptr);
        }
     else {                    /* display a blank screen in the appropriate */
       cls(0);                 /* graphics mode */
       setmode( (maxcol == 40) ? MODE40 : MODE80 );
       back=    0;
       border=  0;
       palette= 0;
       }

     gratt= ovlbytes(back, ATTR, 4); /* set graphics display attribute */

     stillfrm(g, 0);  /* display still frame, if have one */

     retval= getliter(l,grptr,2);

     freegraf();
     setmode(MODE80);  /* set screen mode to "normal" and return */
     settrans(0x0000);
     if (hitf3esc== F3) retval= F3;
     return(retval);
     }

getliter (l,p,ncolors)
DSLIT *l;
char *p;
int ncolors;  /* # of colors to get */
{  char temp[81];
   int retval = DONE;
   int i;
   char data[81];
   char *dataptr;
   int chcount;
   int maxchcount;  /* maximum check count */
   int tr,tc;
   char prompt[45];
   int retcode;
   int fcolor = 1;  /* is this first color */
   int att;

   if (debug) printf("l->literal= |%s|. l->litlen=%d \n",
     l->literal, l->litlen);
   pause(" getliter ");
   hitf3esc= 0;
   grid(gratt);    /* print coordinate grid */
   displits(actcol,0);                       /* display other literals        */

   /* finish displaying screen overaly data */
   cursor(24,1);
   wrtstrn("ENTER literal THEN Use KEYPAD to Move",gratt,40);
   cursor(25,1);
   sprintf(temp,"ROW=%2d--COL=%2d",l->row,l->col);
   wrtstr(temp,gratt);
   if (l->col < 2) l->col = 2;

   maxchcount = l->litlen;

    /* set up l->literal, data, and dataptr */
   l->litlen= maxcol- (l->col);
   l->literal[l->litlen]= '\0';
   strcpy(data,l->literal);
   stcpadr(data,l->litlen,0);
   dataptr=data;
```

```
  /* display literal, ready for entry mode */
cursor(l->row,(l->col)-1);

wrtch( '[',gratt);
getbfl(l->fcolor);
wrtstr(l->literal,latt);
wrtchars('.',l->litlen - maxchcount, gratt);
wrtch(']',gratt);

 /* set up for entry mode */
cursor(l->row,l->col);
chcount = 0;
retcode = NO;
entered = NO;

/* keyboard input routine */
while (retcode == NO && !hitf3esc) {
  lch=getchx();
  if (lch== F3)  { hitf3esc= F3; break; }
  if (lch== ESC)
  { hitf3esc= ESC;
    data[maxchcount]= '\0';
    strcpy(l->literal,data);
    l->litlen= strlen(l->literal);
    break;
    }
  switch (chtype(lch)) {
    case TFN:
      break;
    case TRETURN:                    /* if return */
      data[maxchcount]= '\0';
      strcpy(l->literal,data);

      resetgr(p,l->row,l->col-1,l->litlen+2);
      l->litlen= strlen(l->literal);
      retcode = YES;
      break;
    case TASCII:                    /* if ascii character */
      if (chcount < l->litlen)
      { *dataptr = lch;
        dataptr++;
        chcount++;
        entered = YES;
        wrtch(lch,gratt);
        }
      else beep("");
      break;
    case TMOVE:                   /* if cursor movement key */
      switch (lch) {
        case CLF:
            /* clear field */
          setmem(data+chcount,strlen(data)- chcount,' ');
          maxchcount= chcount;
          wrtchars( '.', strlen(data)-chcount, gratt);
          cursor(l->row,(l->col)+chcount);  /* reset cursor position */
          break;
        case INS:
          if (stxinscf(data,chcount,' ',0) )
          { tr= crow; tc= ccol;
            cursor(l->row, l->col);
            wrtstr(data,latt);
            if (maxchcount < maxcol - l->col) maxchcount++;
            if (debug) printf("maxchcount l->col= %d %d\n",
              maxchcount,l->col);
            cursor(tr,l->col+maxchcount);
            wrtchars('.',strlen(data)-maxchcount,gratt);
            cursor(tr,tc); /* reset cursor position */
            }
          else beep("Inserting a space would lose a character");
          break;
```

```
        case DEL:
          stxdelcf(data,chcount);
          tr= crow; tc= ccol;
          cursor(l->row, l->col);
          wrtstr(data,latt);
          if (maxchcount>0) maxchcount--;
          cursor(tr,l->col+maxchcount);
          wrtchars('.',strlen(data)-maxchcount,gratt);
          cursor(tr,tc); /* reset cursor position */
          if (debug) printf(" maxchcount strlen(data)= %d %d\n",
            maxchcount,strlen(data));
          pause("DEL");
          break;
        case LFT:
          if (chcount > 0) {
            dataptr--;
            chcount--;
            cursor(crow,ccol-1);
            }
          else beep("");
          break;
        case RGT:
          if (chcount < ((l->litlen)-1)) {
            dataptr++;
            chcount++;
            cursor(crow,ccol+1);
            }
          else beep("");
          break;
        case BACKSPA:
          if (chcount > 0) {
            dataptr--;
            chcount--;
            cursor(crow,ccol-1);
            }
          else beep("");
          break;
        default:
          beep("");
          break;
        }
      break;
    default:
      break;
    }
  if (chcount> maxchcount) maxchcount= chcount;
  }
if (!hitf3esc)
{ /* redisplay graphics image or blank screen */

  grid(gratt);

  /* display the rest of the screen overlay data */

  cursor(l->row,l->col);
  wrtstr(l->literal,latt);
  if (ncolors==2) strcpy(prompt,"F9=Accept FIRST Color/F3=Cancel");
  else strcpy(prompt,"F9=Accept/F3=Cancel");
  cursor(24,1);
  wrtstrn(prompt,gratt,40);
  cursor(25,1);
  sprintf(temp,"ROW=%2d--COL=%2d",l->row,l->col);
  wrtstr(temp,gratt);
  /* another keyboard input routine for moving the literal around
     on the screen */
  retcode = NO;
  }
while (retcode == NO && !hitf3esc )
{ lch=getchx();

  if (lch== F3)  { hitf3esc= F3; break; }
```

```
    if (lch== ESC)
    { hitf3esc= ESC;
      if (fcolor) l->fcolor= ovlbytes( cback, setcolor(cfore,palette), 4);
      if (l->lcolor== 0xFFFF) l->lcolor= l->fcolor;
      break;
      }
    switch (lch) {
      case HOM: movelit( -1,-1, 1, p, prompt, gratt, latt);  break;
      case END: movelit(  1,-1, 1, p, prompt, gratt, latt);  break;
      case PUP: movelit( -1, 1, 1, p, prompt, gratt, latt);  break;
      case PDN: movelit(  1, 1, 1, p, prompt, gratt, latt);  break;
      case UP:  movelit( -1, 0, 1, p, prompt, gratt, latt);  break;
      case DN:  movelit(  1, 0, 1, p, prompt, gratt, latt);  break;
      case LFT: movelit(  0,-1, 1, p, prompt, gratt, latt);  break;
      case RGT: movelit(  0, 1, 1, p, prompt, gratt, latt);  break;
      case F9:       /* accept first or last color */
        if (fcolor)
        { l->fcolor= ovlbytes( cback, setcolor(cfore,palette), 4) | blinkon;
          if ( ncolors==2)
          {   /* if last color not defined, default it to first color */
            if (l->lcolor== 0xFFFF) l->lcolor= l->fcolor;
            getbfl(l->lcolor);

            cursor(l->row,l->col);
            wrtstr(l->literal,latt);
            strcpy(prompt,"F9=Accept LAST Color/F3=Cancel ");
            cursor(24,1);
            wrtstrn(prompt,gratt,40);
            }
          else retcode= YES;  /* only need to define one color */
          fcolor=0;
          }
        else {    /* !fcolor */
          l->lcolor= ovlbytes( cback, setcolor(cfore,palette), 4);
          retcode = YES;
          retval = DONE;
          }
        break;
      case F1:    /* change foreground color */
      case F2:
        if (lch== F1) cfore++;
        else cfore--;
        if (smode == MODELO)
        { if (cfore <  0   ) cfore = 0x3;
          if (cfore > 0x3) cfore = 0;
          }
        else
        { if (cfore <    0) cfore = 0xF;
          if (cfore > 0xF) cfore = 0;
          }
        printlit(l);
        break;
      case F4:
        cback++;
        if (smode>= MODEMD && cback >0x0F) cback=0;
        if (smode<  MODEMD && cback >0x07) cback=0;
        printlit(l);
        break;
      case F6:
        if (smode!= MODE40 && smode!= MODE80)
          beep("You can only have blinking in text modes");
        else
        { blinkon ^= 0x80;
          printlit(l);
          }
        break;
      default:
        break;
      }
    }
 return(retval);
 }
```

```
static printlit (l)
DSLIT *l;
{ latt = ovlbytes(cback, cfore, 4);
  latt |= blinkon;
  cursor(l->row,l->col);
  wrtstr(l->literal,latt);
  if (debug) printf("cback cfore blinkon latt smode= %xh %xh %xh %xh %d ___\n",
    cback,cfore,blinkon,latt,smode);
  }

setcolor (fore, pal)
int fore, pal;
{ if (smode == MODELO) return( (fore*2)+ (pal%2) );
  else return(fore);
  }

movelit ( delrow, delcol, l, p, prompt, gratt, latt)
int delrow, delcol, gratt, latt;
DSLIT *l;
char *p, *prompt;
{ char temp[81];
  int nr, nlc,nrc;
  nr= l->row+ delrow;
  nlc= l->col+ delcol;
  nrc= nlc+ l->litlen-1;  /* add in length of literal */

  if (moveok( nr, (delcol<0) ? nlc : nrc, 1, 1, 25, maxcol))
  { resetgr(p,l->row, l->col, l->litlen);

    if ( nlc <=2 ) grid(gratt); /* redraw grid if it was messed up */
    if ( nr == 24)
    { cursor(24,1);
      wrtstrn(prompt,gratt,40);
      }

    l->row= nr;
    l->col= nlc;
    cursor( nr, nlc);
    wrtstr(l->literal,latt);
    cursor(25,1);
    sprintf(temp,"ROW=%2d--COL=%2d",l->row,l->col);
    wrtstr(temp,gratt);
    }
  }

resetgr (p,row,col,len)
char *p;
int row,col,len;
{ DSLIT *l;
  unsigned src, erc;
  int i,attr;

    /* ok to do movement */
  if (p!= NULLADDR)
  { src= ovlbytes(row,col, 8);
    erc= src;
    erc+= len - 1;
    dispgraph(src,src,erc,p);
    }
  else {                  /* if not graphics, the redisplay blanks */
    cursor(row, col);
    wrtblank(len,gratt);
    }

    /* if there are other literals, see if they were overlapped and are now
         observable */
  for (i= flitcol; i<= llitcol; i++)
  { if (i== actcol) continue;
    l= lit[i];
    if (l== NULLADDR) continue;
```

```
    if (l->row== row &&                    /* on same row        */
       (    ( col   <= l->col && l->col < col   + len) /* overlapping in row */
         || ( l->col<= col    && col    < l->col+ l->litlen)
         ) )
    { cursor(l->row,l->col);
      attr= l->fcolor;
      if (smode == MODELO) attr/=2;
      wrtstr(l->literal,attr);
      }
    }
  }

displits (col, dothis)  /* display literals from after last CLEAR to 'col' */
int col,dothis;
{ int i,attr;
  DSLIT *l;
  int nlits=0;

  llitcol= -2;
  flitcol= -1;

  if (col>=0)
  { llitcol= col;  /* move to last of blank time columns */
    while (llitcol < NTLDCOL && isblank(ssval[SRTIME][llitcol+1]) ) llitcol++;
      /* go back until you find a clear or until you hit column 0 */
    flitcol= col;
    while (flitcol>= 0 && isblank(ssval[SRGRAPH][flitcol]) ) flitcol--;
      /* go to beginning of group of columns without time */
    while (flitcol > 0 && isblank(ssval[SRTIME][flitcol]) ) flitcol--;

    for ( i= flitcol; i<=llitcol; i++)
    { if (!dothis && i== col) continue;
      if ( (l= lit[i]) != NULLADDR)
      { nlits++;
        cursor(l->row,l->col);
        attr= l->fcolor;
        if (smode == MODELO) attr/=2;
        wrtstr(l->literal,attr);
        }
      }
    }
  return(nlits);
  }
```

```
/********************************** MATCH.C ************************************/
/*                                                                              */
/*                                                                              */
/*******************************************************************************/

/* This module contains the control functions for graphics, literals, and
   touch area definitions */
#include <\c\stdio.h>
#define EXTERN extern
#include "state.i"
#include "keys.i"
#include "userproc.i"

static int setdeflg;
static DSKEYBRD k;

vars (action)
int action;
{
    int retcode;
    int numfld;
    int i;
    FIELD *f;
    WINDOW *w;

    w=windows+actwind;
    f=w->flds;

    if (keybrd[actcol] == (DSKEYBRD *)0) setdeflg=YES;
    else setdeflg= NO;

    if (action == START) {

      if (setdeflg) setdef(WNVARS);
      else {        /* assign old data */
        movmem(keybrd[actcol], &k, sizeof(DSKEYBRD) );
        sprintf(f->data,"%d",k.row); f++;
        sprintf(f->data,"%d",k.col); f++;
        sprintf(f->data,"%d",k.len); f++;
        ctos(k.device, f->data);
        f=w->flds;
        }
      dispwind(WNVARS);
      numfld = 0;
      }
    else if (action == RESUME) {
      numfld = savedfld[nwindows];
      }
    retcode = entwind(WNVARS,numfld);
    if (retcode == DONE || lch == ESC) {

      /* assign new data to structure */
      sscanf(f->data,"%d",&(k.row)); f++;
      sscanf(f->data,"%d",&(k.col)); f++;
      sscanf(f->data,"%d",&(k.len)); f++;
      sscanf(f->data,"%c",&(k.device));
      k.attr=0x07;
      sttofi(k.vname,ssval[SRKBD][actcol],sizeof(k.vname));
      discwind(YES);
      action = RESUME;
      actwind = WNTIMEL;

      if (keybrd[actcol]== NULLADDR)
        keybrd[actcol]= (DSKEYBRD *) cmalloc(sizeof(DSKEYBRD));
      movmem( &k, keybrd[actcol], sizeof(DSKEYBRD) );
      }
    else if (retcode == QUIT) {
      discwind(YES);
      action = RESUME;
```

```
    actwind = WNTIMEL;
    }
  return (action);
  }


match (action)
int action;
{  int retcode;
   static int numfld;
   int i,j,m,gotlit;
   int nc;  /* # of bytes copied onto match string */
   char *p,*fstring,fstr[MAX_MATCH_LEN+5+40];
   FIELD *f;
   WINDOW *w;

   fstring= fstr;
   w=windows+actwind;
   f=w->flds;

   if (keybrd[actcol] == NULLADDR) setdeflg=YES;
   else setdeflg= NO;

   if (action == START) {
     gotlit=0;
     if (setdeflg) setdef(WNMATCH);
       /* see if another column has the same name.  if so, get literal */
     for (i=0; i< NTLDCOL; i++)
     { if (i!=actcol && stscmpbc(ssval[SRKBD][i],ssval[SRKBD][actcol])==0)
       {   /* have found a column with same name */
         movmem(keybrd[i]->mphrase,fstring,MAX_MATCH_LEN);
         gotlit=1;
         break;
         }
       }

     if (!gotlit && setdeflg) gotlit= getmatch(ssval[SRKBD][actcol],fstring);

     if (gotlit) asgmatch(fstring,f,keybrd[actcol]);

     if (!setdeflg)
     { /* assign old data */
       movmem( keybrd[actcol], &k, sizeof(DSKEYBRD) );
       /* do this only if a column with the same name hasn't been found */
     if (!gotlit)
     { movmem(k.mphrase,fstring,MAX_MATCH_LEN);
       asgmatch(fstring,f,&k);
       }
     f+=10;

     fitost(f->data,k.vname,f->length,0);
     f++;
     cpyevtnm(f->data,k.branches[5].event,f->length);
     } /* end of assigning data */

   dispwind(WNMATCH);
   numfld = 0;
   }

 sttofi( k.mstring, ssval[SRKBD][actcol], VARKLEN);

 action = 0;
 while(!action)
 { retcode = entwind(WNMATCH,numfld);
   numfld= fldnum;

   if (lch== ESC)  /* move cursor to variable name field */
   { numfld= w->nfield-2;
     continue;
     }
```

```
switch (retcode)
{ case DONE:
    if (fisblank(WNMATCH, w->nfield-1) )
    { beep("You must enter something into this field");
      break;
      }

    /* assign new data to structure */
    f=w->flds;

    for (i=0; i<5; ++i)
    { j= (!isblank(f->data)) + (!isblank( (f+1)->data));
      if (j==1) /* have one blank field and one non-blank field */
      { beep("You must have both a match phrase and a branch");
        break;
        }
      f += 2;
      }
    if (j==1) break;  /* stay in loop */

    f=w->flds;
    fstring= fstr;
    nc=0;
    for (i=0, j=0; i<5; ++i, j++)
    { nc+= (stctrim(fstring,f->data,0)+1);
            /* leave room for nulls */
      if (nc + (4-i) > MAX_MATCH_LEN)
      { beep("Your match phrases are too long. Total must be <=80");
        actwind = WNMATCH;
        return(RESUME);
        }
      fstring+= strlen(fstring)+1;
      f++;
      chkevent(f->data,k.branches[j].event);
      f++;
      }
   setmem(fstring,MAX_MATCH_LEN-nc,' ');
   movmem(fstr,k.mphrase,MAX_MATCH_LEN);
   for (i=j; i< 5; i++) k.branches[i].event[0]= '\0';

   sttofi(k.vname,f->data,sizeof(k.vname));
   f++;
   chkevent(f->data,k.branches[5].event);

     /* set any other columns with same name */
   for (i=0; i< NTLDCOL; i++)
   {
     if (i!=actcol &&
       stscmpbc(ssval[SRKBD][i],ssval[SRKBD][actcol])==0 )
       { movmem(k.mphrase,keybrd[i]->mphrase,MAX_MATCH_LEN);
         }
     }

   discwind(YES);
   action = RESUME;
   actwind = WNTIMEL;

   if (keybrd[actcol]== NULLADDR)
   { p= cmalloc(sizeof(DSKEYBRD));
     keybrd[actcol]=(DSKEYBRD *)p;
     }

   movmem( &k, keybrd[actcol], sizeof(DSKEYBRD) );
   break;  /* end DONE */

case QUIT:
     /* blank ssval entry if not defined */
   discwind(YES);
   action = RESUME;
   actwind = WNTIMEL;
   break;  /* end QUIT */
```

```
        case DOSOME:
          break;
        }  /* end switch */

      }  /* end of while */

    return (action);
    }

static df (s)
char *s;
{ FIELD *f;
  f= (windows+ WNMATCH)->flds;
  printf("%s. ADDR of field %d= %lx\n",s,11,(f+11)->data);
  }

asgmatch (fstring,f,k)
/* this routine takes the string 'fstring' which contains the match phrases
   and the keyboard data in 'k' and puts this information into the fields
   pointed to by 'f'
*/
char *fstring;
FIELD *f;
DSKEYBRD *k;
{ int i;
  char *p;
  p= fstring;
  for (i=0; i<5; ++i)
  {   /* insures there is a terminating character */
      /* must use fstr since fstring is increasing */
     p[MAX_MATCH_LEN+i]= '\0';

     stccpy(f->data,fstring,f->length+1);
     fstring+= strlen(fstring)+1;
     f++;
     if (k!= NULLADDR) cpyevtnm(f->data, k->branches[i].event, f->length);
     else stcblnkn (f->data,f->length,0);
     f++;
     }
  }

lin25 (action)
int action;
{
   int retcode;
   int numfld;
   int i;
   char *p;
   FIELD *f;
   WINDOW *w;
   DSLINE25 *l;

   if (stscmpn( ssval[SRL25][actcol], "CLEAR",5)==0)
   { if (line25[actcol] == (DSLINE25 *)0) {
       line25[actcol]= (DSLINE25 *) cmalloc(sizeof(DSLINE25));
       }
     l=line25[actcol];

       /* save it */
     l->replay=  'N';
     l->slowfwd= 'N';
     l->slowbk=  'N';
     l->resume=  'N';
     l->help=    'N';
     l->stop=    'N';
     l->pause=   'N';

     actwind = WNTIMEL;
     return(RESUME);
     }
```

```
w=windows+actwind;
f=w->flds;

l= line25[actcol];
if (l == (DSLINE25 *)0) setdeflg=YES;
else setdeflg= NO;
if (action == START) {
  if (setdeflg) setdef(WNL25);
  else {
    /* assign old data */
    assignch(l->replay,  f->data);  f++;
    assignch(l->slowbk,  f->data);  f++;
    assignch(l->slowfwd, f->data);  f++;
    cpyevtnm(f->data,l->nextevt, f->length); f++;
    cpyevtnm(f->data,l->rtrnevt, f->length); f++;
    cpyevtnm(f->data,l->detail,f->length); f++;
    f=w->flds;
    }
  dispwind(WNL25);
  numfld = 0;
  }
else if (action == RESUME) numfld = savedfld[nwindows];
retcode = entwind(WNL25,numfld);
if (retcode == DONE || lch == ESC) {
  /* assign new data to structure */
  if (line25[actcol] == (DSLINE25 *)0) {
    line25[actcol]= (DSLINE25 *) cmalloc(sizeof(DSLINE25));
    }
  l=line25[actcol];
    /* save it */
  l->replay= *(f->data); f++;
  l->slowfwd= *(f->data);  f++;
  l->slowbk=  *(f->data);  f++;

  l->stop=   (l->slowfwd == 'Y' || l->slowbk == 'Y') ? 'Y' : 'N';
  l->pause=  l->stop;
  l->resume= l->pause;
  l->help=  (l->pause == 'Y' || l->replay == 'Y' ||
             !isblank(l->nextevt) || !isblank(l->rtrnevt) ) ? 'Y' : 'N';

  chkevent(f->data,l->nextevt);  f++;
  chkevent(f->data,l->rtrnevt);  f++;
  chkevent(f->data,l->detail);   f++;
  f=w->flds;
  discwind(YES);
  action = RESUME;
  actwind = WNTIMEL;
  }
else if (retcode == QUIT) {
  discwind(YES);
  action = RESUME;
  actwind = WNTIMEL;
  }
return (action);
}
static getmatch (name, match)
char  *name, *match;
{ int recnum;
  recnum= findindx(lit_key_file, lit_file,
    name, match, 0, LITKLEN, LITKRLEN, LITRLEN, 0);
  if (recnum >0) read_rec( match, lit_file, recnum, LITRLEN);
  return(recnum>0);
  }


static putmatch (name, match)
char  *name, *match;
{ int recnum;
  recnum= findindx(lit_key_file, lit_file,
    name, match, 0, LITKLEN, LITKRLEN, LITRLEN, 2);
  }  /* End putmatch */
```

```
/********************************* PRIM.C ************************************/
/*      Documented and compiled 2.21.86 KMB                                  */
/*                                                                           */
/*****************************************************************************/

#define EXTERN extern
#include "\c\stdio.h"
#include "state.i"
#include "keys.i"
#include "userproc.i"

#define VIDEO 0x10       /*  the video interrupt number  */

#define SET_VIDEO_MODE 0x00     /* the 16 video services       */
/*
#define SET_CURSOR_TYPE 0x01
#define SET_CURSOR_POS 0x02
#define GET_CURSOR_POS 0x03
#define GET_LIGHT_PEN_POS 0x04
#define SELECT_ACTIVE_PAGE 0x05
#define SCROLL_UP 0x06
#define SCROLL_DOWN 0x07
#define GET_CHAR_ATT 0x08
#define PUT_CHAR_ATT 0x09
#define PUT_CHAR_ONLY 0x0A
#define SET_COLOR_PALETTE 0x0B
#define PUT_DOT equ 0x0C
#define GET_DOT equ 0x0D
#define PUT_TTY equ 0x0E
#define GET_VIDEO_MODE 0x0F
#define SET_PALETTE_REGISTERS 0x10
#define CLEAR 0
*/

/*****************************************************************************
*       Interrupts are called by placing appropriate values in the members of
*       a REGS union and then calling int86(n,in,out).  The interrupt number
*       is the first argument. In and out are pointers to REGS unions.  After
*       issuing the interrupt call, int86 places the values of the registers
*       in the members of *out.  There are 16 video services with codes 0-15.
*       This code is to placed in the ah member. Alternately, we place code*256
*       in the ax member (or code << 8 or hexcode*0x100).
*       Depending on the service, certain values need to be placed in other
*       members, including the al.
*****************************************************************************/

/******************************** Video modes ********************************
  * There are 16 video modes supported by either the MA, CGA, PCjr, or the EGA
  * boards.  This software is for the EGA, which supports modes 0-7, and 10-15.
  * Of these, only 5 are being supported by this software.

 #      ID      TYPE            COLORS          DIMENSIONS

 1      40      Text             16              40 X 25
 3      80      Text             16              80 X 25
 4      LO      Graphics          4             320 X 200
13      MD      Graphics         16             320 X 200
14      HI      Graphics         16             640 X 200

In LO mode the 4 colors are the palette.  There are four palettes, 0-3.

*****************************************************************************/

/**************************** Color Attributes ******************************
  * Color              Foreground                  Background
  * black              0                           0
  * blue               1                           16
  * green              2                           32
  * cyan               3        X 16 =             48
  * red                4                           64
  * magenta            5                           80
```

```
 * brown              6                     96
 * dk white           7                    112
--------------------------------------------------------------------------------
 * dk grey            8       These colors are the above with high intensity.
 * lt blue            9
 * lt green           10      High = 8                   Blink = 128
 * lt cyan            11
 * lt red             12
 * lt magenta         13
 * yellow             14
 * white              15

 * There are 16 foreground or character colors and 8 background colors, which
 * coincide with the first 8 of the former.  The background attributes are the
 * character attributes times 16 or << 4.  The full attribute is foreground +
 * background.  Using the foreground alone gives, for example, red on black.
 * Adding 128 to the attribute causes it to blink (in text mode).

 * The following format for the data attributes of Text modes is supported by
 * the EGA card. Bits 0-2 are for the foreground,  3 for the intensity, 4-6
 * for the background, and bit 7 for blinking.  The latter may be toggled into
 * a background intensity bit. This is the IRGB format.

*******************************************************************************/

/*************************** Set Color Palette ******************************

 * Service 11 or 0x0B, SET COLOR PALETTE, deserves special consideration.
 * Members bh are loaded with a color id and bl with a color (0-15).  In
 * the text modes, if bh = 0, then bl specifies the border color.  In any
 * graphics mode, if bh = 0, then bl specifies the default color of the border
 *  as well as of the background.

 * On the other hand, if in LO mode and bh = 1, then bl specifies the color
 * palette.  Palette 0 has red, green, brown and the current background color.

 * Palette 1 has cyan, magenta, white and the current background color.
 * Since the EGA card has both high and low intensity palettes (0-3), this
 * service has been replaced by Set Palette Register.

 **/
/********************************** EGA Palette ****************************
  * The EGA supports a palette of 64 colors which are composites of R, r, G,
  * g, B, and b.  R, G, B are the primary (darker) colors of the CGA and r, g,
  * b are new secondary colors. The format of the register attributes in the
  * new 16/64 modes has bits 0-2 for the primary colors and bits 3-5 for the
  * secondary.  In the old CGA compatible modes, bits 0-2 are for the colors
  * and bit 4!! is the intensity bit.

  * The 16 palette registers may be set by a new BIOS call Service 16.
  **/

/*************************** Set Palette Registers ************************
  * Service 16 or 0x10 is specific to the EGA and PC jr adapters.  With al = 0
  * (set individual palette registers), bl is set to the number of the palette
  * register and bh is set to the palette value.  With al = 1 (set border or
  * overscan register), bh is set to the value.  With al = 2, all registers may
  * be set at once.  With al = 3, bit 7 may be toggled between blinking and
  * background intensity.

  * Note the differences from Service 11.  We now place the color in bh, not bl.
  * Also, Service 11 colors follow the data attribute format XXXXIRGB, while we
now
  * have XXXIXRGB or XXrgbRGB. If attribute a follows the XXXXIRGB format, then
  * (a & 7) + (a & 8)*2 belongs to the XXXIXRGB.

  **/

/******************************************************************************/
cls (att)       /* CLear entire Screen
```

```
 *  clears the entire screen, including the border, to attribute att     *
 *  equivalent to clx(att,0) (black on att)                               *
 *  RETURNS: nothing                                                      */
 *  GLOBALS: none

int att;                  /*  attribute for entire screen */
{ clx(att,0x0);
  }

/*************************************************************************/
clx (hatt,latt)           /* CLear entire screen
  *  clears the entire screen, including the border, to attribute       *
  *  latt on hatt                                                       *
  *  RETURNS: nothing                                                   */
  *  GLOBALS: none

int hatt;                 /*  border and background color */
int latt;                 /*  forground color             */
{
   union REGS inregs;
   union REGS outregs;
   int port = 0x03DA;
     /* does the border */
   inregs.h.bh=0;
   inregs.h.bl=hatt;
   inregs.h.ah=11;
   inregs.h.al=0;

   vretrace();    /* wait for retrace */

   int86(0x10,&inregs,&outregs);
     /* set up regular */
   inregs.x.cx=0;
   inregs.h.dh=24;
   inregs.h.dl=79;
   hatt<<=4;
   inregs.h.bh=hatt+ latt;
   inregs.x.ax=0x600;

   vretrace();    /* wait for retrace */

   int86(0x10,&inregs,&outregs);
  }

/*************************************************************************/
char *fieldp (windnum,fldnum)    /* return FIELD Pointer
  *  finds the pointer to fldnum field of windnum window                  *
  *  RETURNS: field pointer                                               *
  *  GLOBALS: windows - pointer to base of global array of windows        */

int windnum;              /* window number              */
int fldnum;               /* field number               */
{ WINDOW *w;
  FIELD *f;
  w= windows+ windnum;
  f= w->flds;
  f+= fldnum;
  return( f->data);
  }

/*************************************************************************/
getyn (s,att,mr,mc,ml,ar,ac)    /* GET Yes or No
  *  a generalized message/response function                                 *
  *  after displaying prompt the user's hand is held until he responds with a*
  *  Y or N                                                                  *
  *  RETURNS: 1 or 0, depending on whether Y or N was the response           *
  *  GLOBALS: none                                                           */
char *s;                  /* message string */
int att;                  /* attribute */
int mr;                   /* message row */
```

```
 int mc;                 /* message column */
 int ml;                 /* message length */
 int ar;                 /* answer row */
 int ac;                 /* answer column */
 { int ch,ch2;
   if (debug) printf("getyn.s\n");
   cursor(mr,mc);
   wrtchars(' ',ml,att);
   cursor(mr,mc);
   wrtstr(s,att);
   cursor(mr,mc+strlen(s)-2);
   ch=0;
  while (1)
  { ch2 = getchx();
    if (ch2<= 0xff) ch2= toupper(ch2);
    if (isyn(ch2)) {
      ch= ch2;
      cursor(ar,ac);
      wrtch(ch,att);
      continue;
      }
    if (ch2== RETURN)
    { if (ch) break;  /* have hit RETURN after entering a Y or N */
      beep("Enter a 'Y' or 'N' first");
      }
    else if (ch) beep("Enter a 'Y', 'N', or RETURN");
         else beep("Enter a 'Y' or 'N' first");
    }
  return(isy(ch));
  }

/****************************************************************************/
soffset ()              /* Screen OFFSET
  *  calculates byte offset from "base" of memory map of current cursor pos. *
  *  RETURNS: offset                                                          *
  *  GLOBALS: crow, ccol: current coordinates of cursor                      */
{ int nchplin;  /* # of characters per line */
   int retval;

   switch (smode)
   { case MODE40  : nchplin=  80; break;
     case MODE80   : nchplin= 160; break;
     case MODELO: nchplin= 320; break;
     case 6       : nchplin= 320; break;
     case MODEMD   : nchplin= 320; break;
     case MODEHI   : nchplin= 640; break;
     default: nchplin= 160;
     }

   retval=(crow-1)*nchplin+(ccol*2)-2;
   return(retval);
   }

/****************************************************************************/
wrtch (ch,att)                    /* WRiTe CHaracter
  *  write ch to screen at current cursor position,incrementing that position*
  *  by one column.  No provision for row or screen wrap                     *
  *  if smode == MODE80, writes to memory map; else calls wrtstr10()          *
  *  if former, attribute not written to screen if < 0                       *
  *  RETURNS: 1 if advanced cursor, 0 otherwise                              *
  *  GLOBALS: smode, crow, ccol, maxcol,scrseg                              */
int ch;             /* character to display */
int att;            /* display attribute */
{
   char buff[2];
   int rc;
   if (crow<1 || crow>25 || ccol <1 || ccol>80) return;
   buff[0]=ch;
   buff[1]=att;
```

```
   rc= (ccol< maxcol);
   if (smode <= MODE80) {
     poke(scrseg,soffset(),buff,1+ (att>=0));
     if (ccol <maxcol ) ccol++;
     cursor(crow,ccol);
     }
   else
   { if (att<0) att=0;  /* this case should never occur */
     if (att & 0xF0) wrtstr10(&ch,1,att);
     else
     { wc10(ch,att);
       if (ccol <maxcol ) ccol++;
       cursor(crow,ccol);
       }
     }
   return(rc);
   }

/****************************************************************************/
wrtstrn (string,att,n)     /* WRiTe STRing padded to N characters
  *  display a string padded on the right to n bytes                      *
  *  calls wtrstr()                                                       *
  *  RETURNS: nothing                                                     *
  *  GLOBALS: none                                                       */
char *string;             /* string to display */
int att;                  /* display attribute */
int n;                    /* number of bytes total */
{ char buf[81];
  strcpy(buf,string);
  stcpadr(buf,n,0);
  wrtstr(buf,att);
  }

/****************************************************************************/
wrtstr (string,att)       /* WRiTe STRing
  *  display a string of characters on the screen,like puts with display  *
  *  attributes.  No provision for row or screen wrap                     *
  *  if smode == MODE80, writes to memory map; else calls wrtstr10()      *
  *  if former, wrapping allowed  (?? )                                   *
  *  RETURNS: nothing                                                     *
  *  GLOBALS: none                                                       */
char *string;             /* string to display */
int att;                  /* display attribute */
{
   char buff[160];
   int i,j,nbeeps,slen;
   unsigned so;

     /* count # of trailing control Gs */
   slen= strlen(string);
   if (slen<=0) return;
   for (i=slen-1, nbeeps=0; i>0; i--)
     if (string[i]==0x7)
       { string[i]=' ';
         nbeeps++;
         }

    i= maxcol-ccol+1;  /* maximum # of characters that can be printed */
    if (slen> i) slen=i;

    if (smode <= MODE80)
    { so= soffset();
      for (i=0,j=1;i< slen; i++,j+=2) {
         buff[2*i]=string[i];

         if (att>=0) buff[j]=att;
         else peek(scrseg,so+j,buff+j,1);
         }
      poke(scrseg,so,buff,2*slen);
      ccol+=slen;
```

```
    if (ccol>maxcol) ccol=maxcol;
    cursor(crow,ccol);  /* this was commented out. 1/6/86 */
    }
  else wrtstr10(string,slen,att);
  while (nbeeps--) beeponly();
  }

/**************************************************************************/
wrtstrnc (row,col,string,att,len) /* WRiTe padded STRing no move Cursor
  *  display a string of characters on the screen at row, col
  *  wrtstrn is called
  *  cursor is returned to original position
  *  RETURNS: nothing
  *  GLOBALS: crow, ccol
  **/
int row,col;              /* proposed position of string on screen */
char *string;             /* string to display */
int att;                  /* display attribute */
int len;                  /* padded length of string  */
{ int r,c;
  r= crow;
  c= ccol;
  cursor(row,col);
  wrtstrn( string,att,len);
  cursor(r,c);
  }

/**************************************************************************/
cursor (row,col)          /* set CURSOR position
  *  uses video IO (Int 10h) to position cursor at row, col              *
  *  "base" of screen is at (1,1)                                        *
  *  uses interrupt 10h                                                  *
  *  sets crow, ccol to new position of cursor                           *
  *  RETURNS: nothing                                                    *
  *  GLOBALS: crow, ccol                                                */
int row,col;               /* row 1-25, column 1-80 */
{
  union REGS inregs;
  union REGS outregs;
  unsigned x;

  --row;           /* adjust for relative to zero */
  --col;           /* adjust for relative to zero */
  x=((row <<8 ) + col);
  inregs.x.dx = x;      /* CH,CL Row,column for cursor */
  inregs.h.bh = 0x00;    /* BH=0 Page number */
  inregs.h.ah = 0x02;    /* AH=2 Set cursor position */
  int86(0x10,&inregs,&outregs); /* BIOSCALL */
  ccol = col+1;
  crow = row+1;
  }

/**************************************************************************/
color (att,length)        /* change foreground/background COLOR of screen
  *  length display attributes of screen are replaced with att starting with  *
  *  current cursor position                                                  *
  *  if smode == MODE80, accesses memory map; else calls color10              *
  *  former wraps and doesn't move cursor                                     *
  *  latter does not wrap and does not return cursor to old pos               *
  *  RETURNS: nothing                                                         *
  *  GLOBALS: nothing                                                        */
int att;                  /* diaplay attribute */
int length;               /* length of "string" to change. */
{
  int i;
  int toffset;

  if (smode == MODE80 ) {
    toffset=soffset()+1;
    for (i=0;i<length;i++) {
```

```
      poke(scrseg,toffset,&att,1);
      toffset+=2;
      }
    }
  else color10(att,length);
  }

/****************************************************************************/
color10 (att,length)      /* change COLOR of screen with interrupt 10h
  *  length display attributes of screen are replaced with att starting with  *
  *  current cursor position                                                  *
  *  RETURNS: nothing                                                         *
  *  GLOBALS: nothing                                                        */
int att;                  /* diaplay attribute */
int length;               /* length of "string" to change. Will not wrap */
{
  union REGS inregs;
  union REGS outregs;
  int ch;
  int row,column;
  for (;length>0;length--) {
    inregs.h.ah = 0x08;
    inregs.h.bh = 0;
    int86(0x10,&inregs,&outregs);
    ch=outregs.h.al;
     inregs.h.bh = 0x00;
     inregs.h.ah = 0x09;
     inregs.x.cx = 0x01;
     inregs.h.al = ch;
     inregs.h.bl = att;
     int86(0x10,&inregs,&outregs);
     inregs.h.ah = 0x03;
     inregs.h.bh = 0x00;
     int86(0x10,&inregs,&outregs);
     row = outregs.h.dh;
     column = outregs.h.dl;
     if (column < 79) column++;
     column++;
     row++;
     cursor(row,column);
     }
  cursor (crow,ccol);
  }

 int nsavs=0;
 char *savptr[MAXWINDS+1];

  /* used by readscrn below */
 char *rscrn (ptr, top, left, bottom, right)
 char *ptr;
 int top, left, bottom, right;
 { union {
     struct {
       unsigned offset;
       unsigned segment;
       } parts ;
     char *ptr;
     } buffer;
  unsigned vsrc,verc,para;

  buffer.ptr= ptr;
  para =buffer.parts.offset/16;
  buffer.parts.segment+=(para+1);
  buffer.parts.offset=0;
  vsrc= ovlbytes( top,   left,   8);
  verc= ovlbytes( bottom, right, 8);
  savepc2(smode,vsrc,verc,buffer.parts.segment);
  return(buffer.ptr);
  }
```

```
/****************************************************************************/
char *readscrn (top,left,bottom,right) /* READ SCReeN
  *  will save a rectangle of Hware memory map to local buffer          *
  *  allocates buffer whose pointer is saved in savptr[nsavs]           *
  *  increments nsavs                                                   *
  *  calls MASM routine savepc2 which does the data transfer            *
  *  RETURNS: the pointer, if successful                                *
  *  GLOBALS: savptr[], nsavs                                           */
int top,left,bottom,right;      /* coordinates of rectangle  */
{  char *savbuf, *rcbuf;
   unsigned int bufsiz, bufcalc();
   bufsiz=bufcalc(top,left,bottom,right);
   savbuf= cmalloc(bufsiz+16,"readscrn");

   rcbuf= rscrn(savbuf, top, left, bottom, right);  /* actually save screen */

   if (nsavs>= MAXWINDS)
   { printf("ERROR in readscrn. nsavs= %d^G^G^G\n",nsavs);
     printf("Contact Nancy Frank at 404-238-4269 immediately\n");
     exit(0);
     }
   savptr[nsavs++]=savbuf;
   return(rcbuf);
   }

/****************************************************************************/
wmsg (s)        /* Write MeSsaGe
  *  displays a message at (1,1) of screen                              *
  *  cursor position is restored                                        *
  *  message padded to linesize                                         *
  *  RETURNS: nothing                                                   *
  *  GLOBALS: smode                                                     */
char *s;                                  /* pointer to message       */
{ int r,c;
  int att;
  char *s2[81];
  havemsg=*s;
  r= crow;
  c= ccol;
  cursor(1,1);
  strcpy(s2,s);
  stcpadr(s2,maxcol,0);
  *(s2+maxcol)='\0';  /* to truncate string if necessary */
  if (smode == MODE80) att = 0x07;
  else att= 0x03;
  wrtstr(s2,att);
  cursor(r,c);
  }

/****************************************************************************/
writscrn(top,left,bottom,right,buffer)  /* WRITe SCReeN
  *  restores contents of buffer to a rectangle of Hware memory map     *
  *  frees buffer by calling freesavp()                                 *
  *  RETURNS: nothing                                                   *
  *  GLOBALS: none                                                      */
int top,left,bottom,right;      /* coordinates of rectangle  */
char *buffer;                             /* pointer to buffer        */
{
   unsigned vsrc,verc;

   vsrc= ovlbytes( top,   left,   8);
   verc= ovlbytes( bottom, right, 8);
   if (buffer!= NULLADDR) dispgraph(0x0101,vsrc,verc,buffer);
   freesavp();
   }
```

```
/***************************************************************************/
freesavp ()    /* FREE SAVed Pointer                                      *
  *  frees the buffer pointed to by savptr[nsavs]                          *
  *  decrements nsavs                                                      *
  *  RETURNS: nothing                                                     */
  *  GLOBALS: savptr[], nsavs
{ int rc,i;
  nsavs--;
  rc= cfree(savptr[nsavs],"freesavp");
  if (rc || debug)
  { printf(" FRESSAVP.  nsavs= %d\n   pointers= ",nsavs);
    for (i= 0; i<= nsavs; i++) printf(" %lx",savptr[i]);
    printf("\n");
    }
  pause("FREESAVP");
  }

/***************************************************************************/
fisblank (wn,fn)                  /* Field IS BLANK                        *
  *  decrements nsavs                                                      *
  *  RETURNS: 0 or 1 depending on whether field of window is blank        */
  *  GLOBALS: windows
int wn;          /* number of window     */
int fn;          /* number of field within window       */
{ WINDOW *w;
  FIELD *f;
  w= windows+ wn;
  f= w->flds;
  f+= fn;
  return(isblank(f->data));
  }

/***************************************************************************/
padright (p,n)           /* PAD RIGHT                                      *
  *  pads string p on the right with blanks to a total length of n         *
  *  RETURNS: nothing                                                     */
  *  GLOBALS: none
char *p;                 /* pointer to string               */
int n;           /* desired length of string     */
{ char *p2;
  int l;
  l= strlen(p);
  p2= p+l;
  stcblnkn(p2,n-l,0);
  }

/***************************************************************************/
trimblnk (from,to)                /* TRIM BLaNKs                           
  *  string 'to' created from 'from' - less leading and trailing blanks    *
  *  RETURNS: nothing                                                     */
  *  GLOBALS: none
char *from;              /* pointer to source    */
char to[];               /* destination               */
{ stctrim(to,from,0);
  }
 /* isfile (filename) *//* returns YES if file exists, NO if it doesn't */
 /*char *filename;
 {
    FILE *fp;
    int retval;

    fp = fopen(filename,"r");
    if (fp == NULL) retval = NO;
    else {
      retval = YES;
      fclose(fp);
      }
    return(retval);
    }
  */
```

```
/*****************************************************************************/
char *cmalloc (n,s)   /* ALLOCate buffer
  *  calls library function malloc                                          *
  *  if null return, exits with "ERROR. MALLOC WAS NOT SUCCESSFUL.  n= xxxx" *
  *  RETURNS: a pointer to a character buffer                               *
  *  GLOBALS: none                                                         */

unsigned n;              /*  desired number of bytes  */
char *s;                         /*  message string      */
{ char *p;
  p= malloc(n);
  if (debug==2) printf("cmalloc. allocating %u bytes. pointer= %lx\n",
    n,p);
  if (p==NULL)
  { printf("\nERROR. COMPOSER RAN OUT OF AVAILABLE MEMORY.  \n");
    printf(  "You were in |%s|. n= %u    \n   ",s,n);
    printf(  "No damage has been done, you can restart COMPOSER   \n");
    printf(  "However, the changes to the current event will not have been kept.
\n");
    exit(0);
    }
  return(p);
  }

/***************************************************************************** /
cfree (p,s)   /* FREE buffer
  *  calls library function free - frees buffer allocated by cmalloc        *
  *  on an error exits with "ERROR IN FREE WHILE -----------"               *
  *  RETURNS: 0 on success; non-zero on an error                           *
  *  GLOBALS: none                                                         */

char *p;                 /*  pointer to buffer to be freed  */
char *s;                 /*  message string from calling function  */
{ int rc;
  char temp[81];
  if (p== NULLADDR) return( 0);
  rc= free(p);
  if (rc!=0)
  { sprintf(temp,"ERROR IN FREE (%lx) WHILE %s.^G^G",p,s);
    beep(temp);
    }
  return( rc);
  }

/*****************************************************************************/
loadkbd (s)              /* LOAD KeyBoarD buffer
  *  loads up to 14 bytes of string s plus CRTN in Hware keyboard buffer     *
  *  RETURNS: 0 if string too long (no loading); else returns 1              *
  *  GLOBALS: writes to low memory at &1050, 1052, 1054                     */

char *s;                 /*  string to be loaded  */
{ int i,l;
  int os;
  char kbdbuf[30];

  l= strlen(s);
  if (debug) printf("loadkbd.s  string length = |%s| %d\n",s,l);
  if (l>14) return(0);
  for (i=0,os=0; i<l; i++)
  { kbdbuf[os++]= s[i];
    kbdbuf[os++]= s[i];
    }

  kbdbuf[os++]= 13;
  kbdbuf[os++]= 13;

  i= 30;           poke(0,1050,&i,2);
  i= 30+ 2*(l+1); poke(0,1052,&i,2);
  i=     2*(l+1); poke(0,1054,kbdbuf,i);
  return(1);
  }
```

```
/***************************************************************************/
ncol4080 ()              /* Number of COLumns (40 or 80)                  *
  *  RETURNS: number of columns of text screen would display            */
  *  GLOBALS: smode
{ return ( (smode ==MODELO || smode ==MODEMD || smode ==MODE40) ? 40 : 8  ;
  }

/***************************************************************************
printfx (p,n)            /* PRINT heXadecimal integer
  *  uses printf to display the hexidecimal equivalents of a string
  *  RETURNS: nothing                                                     *
  *  GLOBALS: none                                                        */
char *p;                 /* string pointer          */
int n;             /* number of bytes to display   */
{ if (n>0) while (n--) printf(" %x",*p++);
  }

/***************************************************************************/
unsigned bufcalc (top,left,bottom,right) /* BUFfer dimension CALCulation   *
  *  calculates bytes needed for window buffer                            *
  *  mode dependent                                                       *
  *  RETURNS: number of bytes                                             *
  *  GLOBALS: smode (screen mode)                                         */

 int top,left,bottom,right;       /* coordinates of window on screen */
 {
   char table[8];
   int mode,erc,src,rows,cols;
   int area;
   unsigned total;

   table[0]=0x02;
   table[1]=0x02;

   table[2]=0x10;
   table[3]=0x08;
   table[4]=0x00;
   table[5]=0x00;
   table[6]=0x20;
   table[7]=0x20;

   mode = (int)smode & 0x000E;
   src=top;
   src<<=8;
   src+=left;
   erc=bottom;
   erc<<=8;
   erc+=right;
   erc-=src;
   erc+=0x0101;
   cols=erc & 0x00FF;
   rows=erc>>8;
   area=rows*cols;
   total=(unsigned)(area*table[mode/2]);
   total+=(unsigned)11;
   if (mode >= 0x0C) total+=(unsigned)17;
   else if (mode >= 4) total+=(unsigned)384;
   total+=(unsigned)256;
   return(total);
   }

/***************************************************************************/
static int wrtstr10 (string,slen,att)     /* WRiTe STRing with interrupt 10h  *
  *  uses interrupt 10h                                                   *
  *  RETURNS: 0 if ok, 1 if string truncated to avoid screen scroll       *
  *  GLOBALS:                                                             */
char *string;            /* string to display */
int slen;
unsigned int att;                  /* display attribute */
{
```

```
 int rowcol,back,i,row,col;
 unsigned char_att;
 union REGS inregs;
 union REGS outregs;

 row= crow-1;
 col= ccol-1;
 rowcol = (crow << 8) + ccol;
 if (smode == 4) att &= 3;                     /* color 0 to 3 on 0 */
 else if (smode == 6) att &= 1;                /* color 0 to 1 on 0 */
 else if (smode >= 13 && (back= (att >> 4)) ) /* back != 0 */
 { fill(back,rowcol,rowcol+slen-1);      /* fill with back color */
   att = 0x80 | ((att & 0x0F) ^ back); /* xor foreground */
   }

 for (i = 0;i < slen; i++)
 { wc10((int) *(string+i), att);
   if (++col >= maxcol)
   { ++row;
     col = 0;
     }
   inregs.x.ax = 0x0200;                          /* set cursor position */
   inregs.x.bx = 0;
   inregs.x.dx = (row << 8) + col;                /* base 0 */
   int86(0x10,&inregs,&outregs);
   }
 crow= row+1;
 ccol= col+1;
 }

/****************************************************************************/
wc10 (ch,att)              /* WRiTe CHaracter with int 10h
  *  uses video IO (int 10h) to write character                              *
  *  RETURNS: nothing                                                        *
  *  GLOBALS: none                                                          */
int ch;             /* character to display */
int att;            /* display attribute */
{ union REGS inregs;
  union REGS outregs;

  inregs.h.ah = 0x09;     /* write char-att */
  inregs.h.al = ch;       /* character code */
  inregs.x.bx = att;
  inregs.x.cx = 1;
  int86(0x10,&inregs,&outregs);
  if (debug==5)
  { printf("wc10.e ch att smode= %xh %xh %d\n",ch,att,smode);
    pause("wc10.e");
    }
  }

/****************************************************************************/
wrtchars (ch,num,att)      /* WRiTe CHARacters
  *  sets up wrtstr() to write num chars ch to the screen
  *  RETURNS:  nothing
  *  GLOBALS:  none
  **/
int ch, num, att;
{ char buf[81];
  if (num)
  { setmem(buf, num, (char)ch );
    buf[num]= '\0';
    wrtstr(buf, att);
    }
  }
```

```
/*****************************************************************************/
wrtblank (num,att)      /* WRiTe BLANK
  *  write a string of blanks to the screen at current cursor
  *  RETURNS: nothing
  *  GLOBALS: none
  **/
int num; /* number of characters */
int att; /* display attribute */
{ wrtchars(' ',num,att);
  }


/* set_pals.c */

#define TOEGA(color)        (((color & 8)<<1) + (color & 7))
#define TOCGA(color)        (((color & 16)>>1) + (color & 7))

/* define screen header */
struct header {
              char mode;
              char sig;
              int size;
              char pal;
              char bord;
              char scol;
              char srow;
              char ecol;
              char erow;
              char jump;
              char reg[17];
              };

set_pals (g)
struct header *g;
   {
   int i,full_screen;

      if (g->srow == 1 && g->scol == 1 && g->erow == 25 && g->ecol == maxcol)
         full_screen = TRUE;
      else
         full_screen = FALSE;

      switch(g->mode)
         {
         case 1:
         case 3:
                 if (full_screen)        /* change border */
                    chbord((int)g->bord);
                 break;
         case 4:
                 chpal((int)g->pal);     /* change palette */
                 chback((int)g->bord);   /* change background */
                 chbord((int)g->bord);   /* change border */
                 break;
         case 6:
                 chback((int)g->bord);   /* change background */
                 chbord((int)g->bord);   /* change border */
                 break;
         case 13:
         case 14:
                 chback(TOCGA((int)g->reg[0]));   /* change background */

                 for (i = 1;i < 16;i++)           /* set fifteen palette registe
s */
                    set_pal(i,(int)g->reg[i]);

                 if (full_screen)                 /* change border */
                    chbord(TOCGA((int)g->reg[16]));
                 break;
         default:
                 break;
```

```
      }
   }

set_pal (reg,val)             /* called by all chxxx routines */
int reg,val;                     /* to change color on the screen */
   {
   union REGS inregs;
      if (reg == 16)
         reg++;               /* border register is 17 on the EGA card */
      inregs.x.ax = 0x1000;
      inregs.x.bx = (val << 8) + reg;
      vretrace();
      int86(0x10,&inregs,&inregs);
   }

chback (color)
int color;
   {
   int ega_color;

      ega_color = TOEGA(color); /* left shift intensity */
      set_pal(0,ega_color);
      back = color;             /* current background GLOBAL */
   }


chpal (num)
int num;
   {
   switch(num)
      {
      case 0:                  /* defines palette 0 */
              set_pal(1,2);       /* green   */
              set_pal(2,4);       /* red     */
              set_pal(3,6);       /* brown   */
              break;
      case 1:                  /* defines palette 1 */
              set_pal(1,3);       /* cyan    */
              set_pal(2,5);       /* magenta */
              set_pal(3,7);       /* white   */
              break;
      case 2:                  /* defines palette 2 */
              set_pal(1,0x12);    /* hi green*/
              set_pal(2,0x14);    /* hi red  */
              set_pal(3,0x16);    /* hi brown*/
              break;
      case 3:                  /* defines palette 3 */
              set_pal(1,0x13);    /* hi cyan */
              set_pal(2,0x15);    /* hi magen*/
              set_pal(3,0x17);    /* hi white*/
              break;
      }
   palette = num;              /* current palette GLOBAL */
   }

chbord (color)
int color;
   {
   int ega_color;

      ega_color = TOEGA(color); /* left shift intensity */
      set_pal(16,ega_color);
      border = color;           /* current border color GLOBAL */
   }

vretrace ()
   {
   unsigned int port = 0x3da;

   while (!(inp(port) & 8));    /* wait for vertical retrace */
```

```
    while (inp(port) & 8);        /* wait for not vertical retrace */
    }

fillit (back, frowcol, lrowcol)
unsigned back, frowcol, lrowcol;
{ fill( (smode== MODE80 || smode== MODE40) ? back<<4 : back, frowcol, lrowcol);
  if (debug)
    printf("FILLIT.e smode back frowcol lrowcol= %d %xh %xh %xh \n",
    smode, back,frowcol,lrowcol);
  pause("fillit");
  }
 #define EXTERN extern

 #include "\c\stdio.h"
 #include "std.i"

 extern char *event_info;    /* character array containing event to be output */
 extern int event_info_psn;  /* size of the array                              */
 extern int num_evt_recs;    /* number of keys read in readevt                 */

 EXTERN int nevents;
 EXTERN char *neventrec;
 EXTERN int *eventrec;
 EXTERN int *idxrecn;
 EXTERN int relevent;

 put_event (presname,evname)
 { int nrecs;
   int i,nctl;

   nrecs= event_info_psn / CTL_REC_LEN;

     /* round out event with spaces */
   if (event_info_psn % CTL_REC_LEN)
   { nrecs++;
     i= nrecs * CTL_REC_LEN;
     setmem( &event_info[event_info_psn], i-event_info_psn,' ');
     event_info_psn = i;
     }

   fseek(ctl_file, 0L, 2);
   nctlrec= 1+ ftell(ctl_file) / CTL_REC_LEN;
   nctl= nctlrec;

   nrecs= 1+ (event_info_psn-1) / CTL_REC_LEN;
   if (debug) printf("nrecs event_info_psn= %d %d \n",nrecs,event_info_psn);
   if (nrecs <= neventrec[relevent] )
   {  /* output in place */
     writerecs(eventrec[relevent], nrecs);
     if (nrecs< neventrec[relevent])
       updindex( relevent, idxrecn[relevent], nrecs, eventrec[relevent]);
     }
   else /* event has expanded.  put at end of file */
   {
     writerecs(nctl, nrecs);
     updindex( -1, 1, -1, nctl+nrecs-1);
     updindex( relevent, idxrecn[relevent], nrecs, nctl);
     }
   }

updindex ( relevent, idxrec, nrecs, recn)
int relevent,idxrec, nrecs, recn;
{ char buf[13];
  int *ip;
  if (relevent>=0)
  { eventrec[relevent]= recn;
    neventrec[relevent]= nrecs;
```

```
    }

  read_rec(buf, key_file, idxrec, IDX_REC_LEN);
  if (nrecs>=0) buf[10]= nrecs;
  ip= (int *) &buf[11];
  *ip= recn;
  write_rec(buf,key_file,idxrec, IDX_REC_LEN);
  }

writerecs (recnum, nrecs)
int recnum;
int nrecs;
{ int i;

  for (i=0; i< nrecs; i++)
    write_rec( &event_info[i*CTL_REC_LEN],ctl_file, recnum+i, CTL_REC_LEN);
  }

/*****************************************************
* This module writes the the record rec_num in file *
* file_name from the buffer pointed to by var.      *
*****************************************************/

int write_rec (var, file_name, rec_num, rec_len)
char *var;
FILE *file_name;
int rec_num,
    rec_len;
{ long dptr;

  if (debug) printf("WRITE_REC.s rec_num rec_len= %d %d\n",rec_num,rec_len);
  if (file_name== key_file && rec_num != 1 && rec_num != idxrec)
  { printf("\n\n\nERROR WRITING INDEX RECORD TO %d not at %d.^G^G\n",
      rec_num,idxrec);
    printf("Call Nancy Frank immediately at 404-238-4269.   \n");
    printf("Also, please write down the first line of this message.\n\n");
    exit(0);
    }
  if (file_name== ctl_file)
  {  if ( rec_num != 1 &&
        (rec_num < fctlrec || (lctlrec < rec_num && rec_num != nctlrec) ) )
      { printf(
       "\n\n\nERROR WRITING CONTROL RECORD TO %d not from %d to %d or at %d^G^G\n
",
          rec_num,fctlrec,lctlrec,nctlrec);
       printf("Call Nancy Frank immediately at 404-238-4269.   \n");
       printf("Also, please write down the first line of this message.\n\n");
       exit(0);
       }
    if (rec_num== nctlrec) nctlrec++;  /* are writing next record */
    }

  dptr= rec_num-1;
  dptr*= rec_len;
  if (fseek(file_name, dptr, 0)) return(-1);
  else return(fwrite(var, rec_len, 1, file_name));


#include <\c\stdio.h>   /* Standard header         */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"

/*************************************************************************
* May want to make old_opcode a global so that you don't have to pass it  *
* thru so many modules.                                                  *
*************************************************************************/
```

```
extern   char  dir_to_use[];
struct event_key_rec cur_event_key;         /* Holds the current key record */

/************************* Local globals to read_event ************************
* event_info is a char array that holds the file image of all the CTL file    *
* records for a given event                                                    *
******************************************************************************/

int   c_col;                   /* Current column of the SS         */
int   f_col, l_col;
int   ic_col;  /* invisible colors column */
int   event_info_psn;          /* Current position in event_info    */
long  int   time;              /* Current time for column           */
int   rw_error;                /* Error code - set in all of the read modules  */

char  calctime[NTLDCOL];       /* Flag array for calculated times          */

/**************************************************************************/
int readevt (event_name)        /*  READ EVenT
  *  calls get_event to open the key and control files and load all the
  *  information on the requested event. It then loops through getting an
  *  an opcode and dispatching it through a large switch block - one case
  *  for each group of 10 opcodes.
  *  RETURNS:  nothing
  *  GLOBALS:
  **/
char  *event_name;          /* Strings holding the names */
{
   int    rtn_code;              /* Return code for the fclose                */
   int    op_group;              /* Group of opcode                           */
   int    new_opcode;            /* Holding place for next opcode for compare */
  int    done_w_event = FALSE;   /* Done flag for the loop                    */
   char      get_opcode();

   initialize( event_name);                       /* Initialize the globals */

   time           = 0;
   load_ssval(TIME, 0, &time, FLOAT, NIL);

   event_info_psn = 0;                   /* Initialize some local globals */
   rw_error       = NO_ERROR;  /* = 0 */

   rtn_code= get_event( event_name);   /* Load the event information */

   if (rtn_code) return(rtn_code);

   wipetime=0;  /* time alloted for wipe since last column */
   c_col=0;
   l_col          = -1;  /* set to -1 so gets incremented to 0 at beginning */
   if (neventrec[relevent] > 0) do                  /* Loop through the records
     */
   {
        /* see if will go past record */
      if ( event_info_psn + 1 + event_info[event_info_psn+1] >
            CTL_REC_LEN* neventrec[relevent] ) return(3);

      new_opcode = (int)event_info[event_info_psn];
      ++event_info_psn;
      if (!event_info[event_info_psn])
      { if (debug) printf("new_opcode event_info_psn= %d %d\n",
          new_opcode,event_info_psn);
        initialize( event_name);                /* Initialize the globals */
        return(4); /* no length to command */
        }

      if (new_opcode== WAIT || new_opcode== NO_OP)
      {
        c_col= l_col+1;
        f_col= c_col;
        l_col= c_col;
```

```
      ic_col= f_col;
      ntchbr=0;
      ntchack=0;
      }
    op_group = new_opcode / 10;      /* Get the group (first digit)       */

    if (debug)
     printf(
   "READEVT idxrec=%d new_opcode=%d psn=%d c_col=%d op_group=%d ssval |%s|\n",
  idxrec,new_opcode,event_info_psn,c_col,op_group,ssval[op_group-1][c_col]);

      /* have an entry at the same time */
/***  if (op_group > STILL && op_group <= MISC
        && new_opcode!= DEF_INVSBL_COLORS
        && new_opcode!= DEF_TOUCH_BR_TBL
        && new_opcode!= DEF_PAUSE
        && !isblank(ssval[op_group-1][c_col]))
    { if (debug)
        printf("incrementing column. op_group c_col ssval = %d %d |%s|\n",
          op_group,c_col,ssval[op_group-1][c_col]);
      c_col++;
      } ***/

    switch(new_opcode)
    { case DEF_TCH_ACK:       rack();                           break;
      case DEF_TOUCH_BR_TBL: r_touch(new_opcode);               break;
      case SET_PLAYER:        rplayer();                        break;
      case CALC_ADD: case CALC_SUB: case CALC_MULT:
      case CALC_DIV: case CALC_EXP:   rcalc(new_opcode); break;
      case SET_VAR:           rsetv(new_opcode);                break;
        default:
          switch(op_group)       /* Go read the info for an opcode    */
          { case SYS           : r_wait_or_no_op(new_opcode); break;
            case VIDEO_SEG_G   : r_video_seg(new_opcode);      break;
            case STILL_G       : r_still(new_opcode);          break;
            case GRAPHICS_G    : r_graphics(new_opcode);       break;
            case LITERAL_G     : r_literals(new_opcode);       break;
            case TOUCH_G       : r_touch(new_opcode);          break;
            case LINE25_G      : r_line25(new_opcode);         break;
            case SPEECH_G      : r_speech(new_opcode);         break;
            case KBRD_INPT_G   : r_kbd_inpt(new_opcode);       break;
            case SWITCH_G      : r_switches(new_opcode);       break;
            case MISC_G        : r_misc(new_opcode);           break;
            case NEXT_EVENT_G  : r_next_event(new_opcode);
                                 done_w_event = TRUE;
                                 break;
            default:  /* go to next command */
              event_info_psn += (int)event_info[event_info_psn] + 1;
              if (debug) printf("command not found. eip set to %d\n",
                event_info_psn);
              break;
            } /* End switch to dispatch the opcode */
        }

      if (rw_error != NO_ERROR)      /* Check the error status.    */
        done_w_event = TRUE;         /* If there was one, get out. */

    } /* End the loop to cycle thru the records for one event */
    while (!done_w_event);

    finish_cols();            /* Finish the timeline */
    if (debug) printf("readevt.  returning %d\n",rw_error);
    return(rw_error);

  } /* End read_event */

  /*********************************************************************/
  static int initialize (event_name) /*  INITIALIZE
    *  initializes all of the arrays to NULLADDR
    *  RETURNS:  nothing
```

```
  *  GLOBALS:
  **/
char  *event_name; /*  pointer to event name */
{ int    col;
  int    row;
  int    word;
  int    touch_area;
  char   fname[255];

  next_event[0] = '\0';  /* set next_event to null */

  for (col = 0; col < NTLDCOL; ++col)      /* Initialize the flag array */
  { calctime[col] = FALSE;
    ntchcol[col]= 0;
    }

  for (row = 0; row < NTLROW; ++row)
  {  for (col = 0; col < NTLDCOL; ++col) stcblnkn(ssval[row][col],TLSIZE,0);
     } /* End for(that initializess the ssval array) */

  release_mem();
  } /* End initialize */

/**************************************************************************/
bad_symbolic (opcode,col)        /* BAD SYMBOLIC
  *  called when a r_* routine encounters an opcode without a symbolic name
  *  uses badsymbl() to print a message and releases the allocated structure
  *  RETURNS:  nothing
  *  GLOBALS:  none
  **/
int   opcode;              /* opcode       */
int col;                   /* column of screen */
{ switch(opcode)
  { case VIDEO_SEG_G : badsymbl("VIDEO",     ORPLAY1+playeros,col); break;
    case STILL_G     : badsymbl("STILL",     ORPLAY1+playeros,col); break;
    case GRAPHICS_G  : badsymbl("GRAPH",     ORGRAPH,         col); break;
    case LITERAL_G   : badsymbl("LITERAL",   ORLIT,           col); break;
    case TOUCH_G     : badsymbl("TOUCH",     ORTOUCH,         col); break;
    case LINE25_G    : badsymbl("LINE25",    ORL25,           col); break;
    case SPEECH_G    : badsymbl("SPEECH",    ORSOUND,         col); break;
    case KBRD_INPT_G : badsymbl("KEYBRD",    ORKBD,           col); break;
    case SWITCH_G    : badsymbl("SWITCHES",  ORINDIC,         col); break;
    case MISC_G      : badsymbl("MISC",      ORMISC,          col); break;
    } /* End switch */
  } /* End bad_symbolic */

/**************************************************************************/
badsymbl (s,row,col)             /*  BAD SYMBOL
  *  prints a message and releases the allocated structure
  *  RETURNS:  nothing
  *  GLOBALS:  none
  **/
char *s;         /*  pointer to message buffer   */
int row,col;     /*  screen position             */
{ printf("There was a bad or missing symbolic for %s, column %d.\n", s,col);
  blnkdata(row,col);
  }

/************************************************************************/
static int get_event (evtname)           /*  GET_EVENT
  *  opens both the .IDX and .CTL files. Then it reads all the records
  *  w/ key = *event_name into a holding array(event_recs). Then it loops
  *  thru the array finding the next sequence number and reading the corres-
  *  ponding .CTL file record into the next free space in event_info[].
  *  Finally it closes up the files.
  *
  *  RETURNS:  nothing
  *  GLOBALS
  **/
char  *evtname;
{ int   ctl_rec_num, cur_key_rec;
```

```
   int   i,td, idx_file_len;
   char eventname[EVENTLEN+1];

   if (debug) printf("get_event.s\n");
   stctrim(eventname,evtname,0);

   if (debug) printf("eventname events[0]= |%s|%s|\n",
     eventname,events[0]);
   read_rec(&cur_event_key, key_file, 1, IDX_REC_LEN); /* Get first record   */
   tidxtype( cur_event_key.filler1);  /* test that index type is right */

   idx_file_len = cur_event_key.sequence;             /* to get file length */

   /* Load the key record array to get the RRN's of the .CTL file records    */
   fseek(key_file, (long)IDX_REC_LEN, 0);  /* position to begining of file */

   idxrec = fctlrec = lctlrec = 0;
   for (i=0; i< nevents; i++)
   { if (strcmp(eventname,events[i]) ==0)  /* have found the event */
     { idxrec= idxrecn[i];  /* set index record # */
       relevent=i;
       fctlrec= eventrec[i];
       lctlrec= eventrec[i]+ neventrec[i] - 1;
       break;
       }
     }

   if (debug) printf("i nevents= %d %d\n",i,nevents);
   if (i>= nevents) return(2);

   if (debug)
     printf("relevent eventrec[relevent] neventrec[relevent]= %d %d %d\n",
       relevent,eventrec[relevent],neventrec[relevent]);
   for ( i=0, ctl_rec_num= eventrec[relevent];
         i < neventrec[relevent]; i++, ++ctl_rec_num)
   {  if (!read_rec(&(event_info[i * CTL_REC_LEN]), ctl_file,
          ctl_rec_num, CTL_REC_LEN)) return(3);
   } /* End load event_info[] loop */

   if (debug) printf("GETEVENT.e returning 0\n");

  return( 0); /* error if haven't found event */
} /* End get_event */

/*************************************************************************/
int str_compare (string1,string2,length) /* STRing COMPARE
  * simply compares 2 non-null-terminated strings up to the specified length
  * or until they prove to be nonidentical.
  * RETURNS:  TRUE or FALSE
  * GLOBALS:  none
  **/
char  string1[], string2[];      /*  string pointers     */
int   length;                    /* maximum length of comparison */
{
   int   match = TRUE;
   int   done  = FALSE;
   int   i     = 0;

   do
   { if (string1[i] != string2[i]) match = FALSE;
     ++i;
     if (i == length) done = TRUE;
   } /* End do loop */

   while (!done && match);
   return(match);
} /* End str_compare */
```

```
/*************************************************************************/
read_rec (var,file_name,rec_num,rec_len)        /* READ RECord
   *  reads the the record rec_num of file file_name
   *  transfers rec_len bytes to var
   *  does not check return codes from fseek, fread
   *  RETURNS:  nothing
   *  GLOBALS:  none
   **/
char *var;       /*  pointer to buffer destination of data  */
FILE *file_name;       /*  file pointer */
int rec_num, rec_len;
{ int    rtn_code, rcs, i;
  long filepos;

  filepos= (long) (rec_num-1) * (long) rec_len;
  rcs = fseek(file_name,filepos, 0);
  rtn_code = fread(var, rec_len, 1, file_name);
  if (debug>1) printf("read_rec. rcs=%d rtn_code=%d rec_num=%d rec_len=%d\n",
    rcs,rtn_code,rec_num,rec_len);
  return(rtn_code);
  } /* End read_rec */

/*
prfield (h,s,len,lf)
char *h,*s;
int len,lf;
{ printf("%s |",h);
  while (len--)
  { if ( ' '< *s && *s <= 0x7f) printf("%c",*s); else printf("_");
    s++;
    }
  printf("|");
  if (lf) printf("\n");
  }
*/

/*************************************************************************/
int pad_right_blks(string,length)       /*  PAD_RIGHT_BLocKS
  * pads a null-terminated string on the right with blanks to length.
  * The new string doesn't have a null at the end
  *  RETURNS:  nothing
  *  GLOBALS:  none
  **/
char  string[]; /*  string pointer              */
int   length;   /*  length of padded field      */
{
   int    i = 0;
   int    psn;
   int    done = FALSE;

   do      /* Look for null terminator */
   {
      if (i == length)              /* If last character, we're done */
         done = TRUE;

      else if (string[i] == '\0')      /* If null, we've found the position */
      {
         psn = i;
         done = TRUE;
      } /* End if */

      else
         ++i;
   } /* End do */
   while (!done);

   if (i != length)        /* If i = length, no null found */
   {
      for (i = psn; i < length; ++i)
         string[i] = ' ';
```

```
   }/* End if */
} /* End pad_right_blks */

/***************************************************************************/
int decode_config (config,player,video,track) /* DECODE CONFIGuration
  *  decodes the configuration byte config and puts the parts into locations
  *  player, video, and track
  *  RETURNS:  nothing
  *  GLOBALS:  none
  **/
char  config;   /*  configuration byte  */
int   *player, *video, *track;
{

/**** decoding table for video_flag ***/
/*                  playeros
      video_flag     0     1
                  +-----+-----+
          0       | '2' | '1' |
          1       | '1' | '2' |
                  +-----+-----+
*/
   *player = (int)((config & 0x18) >> 3);
   if (*player>2)
   { printf("^G^G     \nPLAYER= %d for column %d.  SET to 1.\n",*player,c_col);
     }
   *video  = ( (int)((config & 0x04) >> 2)== (*player-1) ) ? '2' : '1' ;
   *track  = (int)(config & 0x03);
   if (*track==3) *track= 'S';
     else *track+=0x30;
     if (debug) printf("decode.  config&0x04 *player *video= %x %d %x\n",
       config&0x04, *player, *video);
     pause("decode");
  } /* End decode_config */


  /***************************************************************************/
  int load_ssval (row,col,ptr,type,length)  /*  LOAD SpreadSheet VALue
    *  loads the appropriate value into the 'string' array ssval[].
    *  The conversion is specified by the type parameter.
    *  The value is pointed to by ptr.
                           *
    *  RETURNS:  nothing
    *  GLOBALS:  ssval[]
    **/
  int row, col;              /*  SS params    */
  int type;                  /*  type of conversion */
  int length;                /*  length of value    */
  char  *ptr;                /*  pointer to value   */
  {
     int   n, i, len;
     SS_ENTRY *p1;
     unsigned int   *uns_num;
     int            *int_num;
     long  int      *lint;
     char           int_part[5], frac_part[5];

     len = strlen(ssval[row][col]);          /* Save the original length */
     switch(type)
     { case STRING : n = stccpy(ssval[row][col], ptr, length + 1); break;

       case INT :
           int_num = (int *)ptr;
           n = stci_d(ssval[row][col], *int_num, SS_COL_STR_LEN);
           break;

        case UNSIGNED :
           uns_num = (unsigned int *)ptr;
           n = stcu_d(ssval[row][col], *uns_num, SS_COL_STR_LEN);
           break;
```

```
   case FLOAT :
      lint = (long int *)ptr;
      sprintf(int_part, "%d", *lint / 10);
      sprintf(frac_part, "%d", *lint - (10 * (*lint / 10)));
      strcpy(ssval[row][col], "");
      strcat(ssval[row][col], int_part);
      strcat(ssval[row][col], ".");
      strcat(ssval[row][col], frac_part);
      break;

} /* End switch */

padright(ssval[row][col], len);  /* Pad it to the original length */

} /* End load_ssval */


/**************************************************************************/
int get_symbolic_name (rec_length, opcode) /* GET SYMBOLIC NAME
  *  loads the symbolic name at the end of a record into the ssval[]
  *  array. It can tell if a symbolic name is present if the length in
  *  the record is not the same as rec_length (sizeof(REC_TYPE)) for
  *  each type. Since the record defintions do not contain space for
  *  the symbolic name, any difference between the sizeof() and the
  *  actual length (in the record) MUST be the symbolic name.
  *  It also updates event_info_psn to point to the next record.
                                                          *
  *** note by Alan Shalloway.
   rec_length is the offset position from the beginning of the command ***
  *  RETURNS:  TRUE/FALSE (a symbolic name was found)
  *  GLOBALS:
  **/
/* command #                               7
   length byte      event_info_psn         8    (11)
   command                                 9-13
   name                                   14-19

   rec_length= 6
   eip= 14
*/
{
   int   real_len;
   int   length;
   int   op_group;
   int rc;
   int i;
   char c;

   real_len = (int)event_info[event_info_psn];
   op_group = opcode / 10;
   length = (int)event_info[event_info_psn] - rec_length + 1;
   if (0 <= length && length <= ENTRYLEN )   /* There is a symbolic name */
   {  if (length)   /* not an error if no trailing name */
         load_ssval(op_group - 1, c_col, &(event_info[event_info_psn +
                  rec_length]), STRING, length);
      rc= TRUE;
   } /* End if */
   else  rc= FALSE; /* There isn't a symbolic name */

   if (rc== FALSE || debug)
   { if (rc== FALSE) printf("ERROR IN GET_SYMBOLIC.  ");
     printf("rec_length length opcode event_info_psn= %d %d %d %d___\n",
        rec_length,length,opcode,event_info_psn);

     printf(" event_info[%d] = ",event_info_psn);
     for (i= 0; i<20; i++)
     { c= event_info[event_info_psn+i];
       if (c == 0x1A) c= '.';
       printf("  %x.%c",event_info[event_info_psn+i],c);
       }
```

```
    printf("\n");
    }

  event_info_psn += real_len + 1;          /* Point to next record */
  return(rc);
} /* End load symbolic */

/***********************************************************************/
static int finish_cols ()       /*  FINISH COLumnS
  *  finishes up the loading process. It pads the times of unused
  *  columns times with increments of .1 second.
  *  RETURNS:  nothing
  *  GLOBALS: c_col
  **/
{
  long     int   new_time;

  ++c_col;
  new_time = time;
  while (c_col < NTLDCOL)
  {  ++new_time;
     load_ssval(TIME, c_col++, &new_time, FLOAT, NIL);

  } /* End while(loading the columns with the extra times */
} /* End finish_cols */

/***********************************************************************/
int add_null (str,len)  /*  ADD_NULL
  *  adds a null to the end of a field and trims off the blanks
  *  The null is added in the last position so anything there will be lost.
  *  RETURNS:  nothing
  *  GLOBALS:  none
  **/
char  *str;     /*  field pointer  */
int   len;      /*  desired length of string  */
{
  char  *temp;
  temp = cmalloc(len);            /* Set up a holding place */
  movmem(str, temp, len);         /* Copy the string to it  */
  *(temp + len - 1l) = '\0';      /* Force a null in the last position */
  stctrim(str, temp, 0);          /* Trim the blanks and put a null on */
  free(temp);
} /* End add_null */

/***********************************************************************/
FILE *openrwf (fn)       /*  OPEN Read-Write file
  *  attempts to open R/W files in binary-update ("rb+") mode
  *  if this fails for the var file, a mode of "w+" is used
  *  if unsuccessful, a message is printed and exit(0) is called
  *  RETURNS:  file pointer
  *  GLOBALS:  filenames[]
  **/
int fn;          /*  index into array of filenames */
{ FILE *fptr;

  if (debug) printf("openrwf.  fn filename[fn]= %d |%s|\n",fn,filenames[fn]);
    fptr= fopenx(filenames[fn], "rb+");
    if (fptr == NULLADDR)
    { if (fn== FNAME_VAR) fptr= fopenx(filenames[fn],"w+");
      if (fptr== NULLADDR)
      { printf(" FILE= %s was not found\n",filenames[fn]);
        exit(0);
        }
      }
    return(fptr);
    }

  /***********************************************************************/
  int openrw ()           /* OPEN Read-Write files
    *  calls fopenx() for tfile, openrwf() for other R/W files
    *  a message is printed if a call fails
    *  RETURNS:  nothing
```

```
 * GLOBALS:  file pointers and names for R/W files
 **/
{
   ctl_file =     openrwf(FNAME_CTL);
   key_file =     openrwf(FNAME_IDX);
   lit_file =     openrwf(FNAME_LIT);
   lit_key_file= openrwf(FNAME_LTX);
   var_file =     openrwf(FNAME_VAR);
   var_key_file= openrwf(FNAME_VRX);

   tfile = fopenx(filenames[FNAME_TCH], "rb+");
     /* create it if it doesn't already exist */
   if (tfile == NULLADDR) tfile = fopenx(filenames[FNAME_TCH], "wb+");
} /* End openrw */

/*************************************************************************/
int closerw ()          /* CLOSE Read-Write files
 *  closes the R/W files
 *  a message is printed if a call fails
 *  RETURNS:  nothing
 *  GLOBALS:  ctl_file, key_file, lit_file, etc.
 **/
{ int    rtn_code;

  if (fclose(ctl_file) == -1)   pf("CTL");
  if (fclose(key_file) == -1)   pf("IDX");
  if (fclose(lit_file) == -1)   pf("LIT");
  if (fclose(lit_key_file)==-1) pf("LTX");
  if (fclose(var_file) == -1)   pf("VAR");
  if(fclose(var_key_file)==-1)  pf("VRX");
  fclose(tfile);
} /* End closerw */

/*************************************************************************/
static pf (s)           /* PrintF
 *  local func for a failed fclose call
 *  RETURNS:  nothing
 *  GLOBALS:  none
 **/
char *s;
{ printf("The close for the .%s file  failed.\n");
  }

/*************************************************************************/
int flushrw ()          /* FLUSH Read-Write files
 *  flushes the R/W files
 *  RETURNS:  nothing
 *  GLOBALS:  ctl_file, key_file, lit_file, etc.
 **/
{  int   rtn_code;

   fflush(ctl_file);
   fflush(key_file);
   fflush(lit_file);
   fflush(lit_key_file);
   fflush(var_file);
   fflush(var_key_file);
   fflush(tfile);

} /* End flushrw */

/*************************************************************************/
static int release_mem ()       /*  RELEASE MEMory
 * sets in motion the release of all the Timeline buffers
 *  RETURNS:  nothing
 *  GLOBALS:  none
 **/
{  int   col;           /* Column counter                    */
   for (col = 0; col < NTLDCOL; ++col) release_col(col);
} /* End release_mem */
```

```
/***************************************************************************/
release (p,col,s)        /*  RELEASE allocated memory
  *  prints a message if library function free() fails
  *  free() frees a particular buffer
  *  RETURNS:  nothing
  *  GLOBALS:  none
  **/
char *p;          /*  buffer to be freed  */
int col;          /*  column number (for message) */
char *s;          /*  pointer to message buffer   */
{ int rc;  /* set to 0 for no error. returns !rc */
  if (rc= (p!= NULLADDR) )
  { if ( free(p))
    { printf("There was a bad memory de-allocation for %s, col= %d  p= %lx\n",
        s,col,p);
      }
    else rc=0;
    }
  return(!rc);
  }

/***************************************************************************/
release_col (col)                /*  RELEASE COLumn buffers
  *  calls blnkdata to release buffers for one column of the Timeline
  *  RETURNS:  nothing
  *  GLOBALS:  none
  **/
int col;                 /*  column of Timeline  */
{ int    i;
  for (i= ORPLAY1; i<= ORMISC; i++) blnkdata(i,col);
  }

extern int ctlcol;

/***************************************************************************/
blnkdata (row,col)       /*  BLaNK DATA
  *  determines appropriate buffer from row, col
  *  "releases" buffer and sets pointer to NULLADDR
  *  RETURNS:  nothing
  *  GLOBALS:  Timeline buffers
  **/
int row,col;             /*  screen position  */
{
  int    i; /* Number of the current touch area  */
  switch (row)
  { case ORTIME:
      tenths[col]= (col) ? tenths[col-1] : 0;
      break;
    case ORPLAY1:
      release((char*) video[0][col] ,col,"video 0");  video[0][col]= NULLADDR;
      release((char*) still[0][col] ,col,"still 0");  still[0][col]= NULLADDR;
      release((char*) load[0][col]  ,col,"load 0");   load[0][col]=  NULLADDR;
      break;
    case ORPLAY2:
      release((char*) video[1][col] ,col,"video 1");  video[1][col]= NULLADDR;
      release((char*) still[1][col] ,col,"still 1");  still[1][col]= NULLADDR;
      release((char*) load[1][col]  ,col,"load 1");   load[1][col]=  NULLADDR;
      break;
    case ORGRAPH :
      release((char*) graph[col]    ,col,"graph");    graph[col]=    NULLADDR;
      break;
    case ORLIT   :
      release((char*) lit[col]      ,col,"lit");      lit[col]=      NULLADDR;
      break;
    case ORTOUCH :
      for (i = 0; i < NTOUCH; ++i)
      { if (!release((char*)touch[i][col],col,"touch"))
          printf("touch # %d.  addr of touch # %d= %lx\n",i,touch[i][col]);
        touch[i][col]= NULLADDR;
        ntchcol[col]=0;
```

```
      }
    break;
  case ORL25   :
    release((char*) line25[col]   ,col,"line25");   line25[col]=   NULLADDR;
    break;
  case ORSOUND :
    release((char*) words[col]    ,col,"words");    words[col]=    NULLADDR;
    release((char*) spaddr[col]   ,col,"spaddr");   spaddr[col]=   NULLADDR;
    break;
  case ORKBD   :
    release((char*) keybrd[col]   ,col,"keyboard"); keybrd[col]=   NULLADDR;
    release((char*) calcs[col]    ,col,"calcs"   ); calcs[col]=    NULLADDR;
    break;
  case ORINDIC :
    release((char*) switches[col] ,col,"switches"); switches[col]= NULLADDR;
    break;
  case ORMISC  :
    release((char*) print[col]    ,col,"misc.");    print[col]=    NULLADDR;
    break;
  }
}

/**********************************************************************/
getblcol (row, cmdnum)  /*  GET BLank COLumn
  *  finds an appropriate blank column in array ssval
  *  sets l_col to this column number
  *  RETURNS:  column number
  *  GLOBALS:  ic_col, f_col, l_col
  **/
int row;          /*  row #       */
int cmdnum;       /* command #    */
{ int col;
  if (cmdnum== DEF_INVSBL_COLORS) col= ic_col++;
  else
  { col= f_col;
    while (!isblank(ssval[row][col]) ) col++;
    }

  if (col> l_col) l_col= col;
  if (debug) printf("GETBLCOL.e  row=%d cmdnum=%d col=%d f_col=%d l_col=%d \n",
    row,cmdnum,col,f_col,l_col);
  return(col);
  }

/**********************************************************************/
tidxtype (ch)             /* Test IDX TYPE
  *  argument should be event_key.filler1
  *  a value of 255 implies that there is only one index entry for each
  *  event (current version of composer)
  *  if found otherwise, messages are displayed and an exit is forced
  *  RETURNS:  exit(0)
  *  GLOBALS:  none
  **/
char ch;                  /* value to be tested   */
{ if (ch != 0xFF)
  { clx(1,15);
    beep("Your index file is not compatible with your version of Composer");
    printf(
      "\nYou need a version of the index file that has one record per event");
    exit(0);
    }
  }
#include <\c\stdio.h>      /* Standard header         */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
```

```
extern int    c_col;                /* Current column of the SS          */
extern int    event_info_psn;         /* Current position in event_info    */
extern int    rw_error;               /* Error flag                        */

int   rformat (col, label)
/****************************************************************************
* This module saves a touch area format in the file touchl.idx. col is the   *
* column that the touch areas are going to be saved from.  label is a string *
* containing the label of the touch area.                                    *
****************************************************************************/
int   col;
char  *label;
{
#define  GOOD_READ         0
#define  LABEL_NOT_FOUND   1
#define  NO_FILE           2
#define  RANGE_ERROR       3
#define  RCLEN             2

   int            tnum;        /* Current touch area that are working on   */
   extern FILE    *tfile;      /* File handle for the touch.idx file       */
   char           *malloc();
   long  int      last_byte;   /* Used to determine the length of the file */
   int            last_rec;    /* Last record of the file                  */
   int            done = FALSE;  /* EOF flag                               */
   int            found = FALSE; /* Found the label in the file flag       */
   int            values[4];   /* Temporary holding place for the row/cols */
   int            n;           /* Returned by the conversion - good or bad */
   int            i;           /* Loop counter                             */
   int            cur_rec;     /* Current record in the file               */
   int            good_data;   /* Flag tells whether there was a good def  */
   long  int      ftell();
   char           filename[80];  /* File name                              */
   char           num[3];        /* A 2 digit number holder */
   char           temp[EVENT_NAME_LENGTH + 1];  /* Temp label for compare */
   struct
   {  char   label[EVENT_NAME_LENGTH];         /* The name of the format    */
      char   rcinfo[MAX_SAVE_AREAS * 4 * RCLEN]; /* The ASCII row-col info */
      char   events[MAX_SAVE_AREAS][10];
   } format;                   /* The record that I'm building to write    */

  if (debug) printf("RFORMAT.s\n");

   fseek(tfile, 0l, 2);          /* Find the last record in the file */
   last_byte = ftell(tfile);
   last_rec = last_byte / sizeof(format);

  if (debug) printf("rformat.  last_byte last_rec sizeof(format)=%ld %d %d\n",
    last_byte,last_rec,sizeof(format) );
  if (last_rec == 0) return(LABEL_NOT_FOUND);   /* If no records, get out */

  strcpy(temp, label);         /* Set up a temporary area for the label */
  pad_right_blks(temp, EVENT_NAME_LENGTH);/* Now temp is not null termed */

  cur_rec = 1;
  while (!done && !found)     /* Go find the record */
  {  read_rec(&format, tfile, cur_rec, sizeof(format));
     if (str_compare(&(format.label), temp, EVENT_NAME_LENGTH)) found = TRUE;
     else if (cur_rec < last_rec) ++cur_rec;
     else done = TRUE;
  } /* End while (searching for the label) */

  if (debug) printf("rformat.  done found =%d %d=\n",done,found);

  if (!found) return(LABEL_NOT_FOUND);
  for (tnum = 0; tnum < MAX_SAVE_AREAS; ++tnum)
  {  good_data = TRUE;
     for (i = 0; i < 4; ++i)
     {  num[0] = format.rcinfo[(tnum * (RCLEN * 4)) + (i * RCLEN)];
        num[1] = format.rcinfo[(tnum * (RCLEN * 4)) + (i * RCLEN) + 1];
        num[2] = '\0';
```

```
            n = sscanf(num, "%d", &(values[i]));
            if (debug) printf(" num n= %s %d\n",num,n);
            if ((n == 0) || (n == -1)) good_data = FALSE;
         } /* End for (getting all four components) */

         if (debug) printf(" good_data= %d\n",good_data);

         if (good_data)
         {  maketch(tnum,col);
            ntchcol[col]++;
            moveevent( touch[tnum][col]->branch,format.events[tnum],0);
            touch[tnum][col]->frow = values[0];
            touch[tnum][col]->fcol = values[1];
            touch[tnum][col]->lrow = values[2];
            touch[tnum][col]->lcol = values[3];
            touch[tnum][col]->counter= tnum+1;
         }
      } /* End for loop (getting all the data) */

      return(NO_ERROR);

   } /* End rtf */


   /* new format for touch areas

   0x8001  signifies version of touch format
   <4. first touch area> (0 means none)
   <4. last touch area>  (0 means none)
   <4. first open space> (0 means none)
   <4. last open space>  (0 means none)
   <4. size of touch area>
   <4. size of allocation> (usually same as above, but may not be)
   <4. prior used area>
   <4. next used area>
   <1. status byte of touch area>

   <2. # of touch areas>
   for each touch area
     <8. name of format>
     <2. touch area #>
     <2. first row>
     <2. last row>
     <2. first col>
     <2. last col>
     <n. branch for touch area>
     <m. acknowledgement for touch area>
     ...


   actions:  allocate new */

   #include <\c\stdio.h>    /* Standard header          */

   #define  EXTERN extern   /* So all EXTERN xxxx in data.i become extern xxxx */

   #include <std.i>         /* Some global definitions */
   #include <data.i>        /* Global data definitions */
   #include <rwdefs.h>      /* Local definitions       */
   #include "userproc.i"

   extern int   c_col;                 /* Current column of the SS       */
   extern int   f_col;
   extern int   event_info_psn;        /* Current position in event_info */
   extern int   ntchack;

   static int tnum,len,nextcmd;
   static DSTOUCH *t;

   rack ()
   { int len,key;
     char *p;
```

```
c_col= f_col;

len= 0xff & event_info[ event_info_psn];
event_info_psn++;
nextcmd= event_info_psn+ len;

if (debug) printf(" nextcmd event_info_psn ntchack= %d %d %d\n",
  nextcmd,event_info_psn,ntchack);

while ( event_info_psn< nextcmd)
{ key= 0xff & event_info[ event_info_psn];
  event_info_psn++;

  tnum= ntchack++;
  t= touch[tnum][c_col];
  if (t!= NULLADDR)
  { t->acknowl= event_info[ event_info_psn++];
    switch (t->acknowl)
    { case 0: break;     /* no feedback for this area */
      case 1:  /* draw box outline          */
      case 2:  /* fill with color           */
      case 3:  /* flood exterior with color */
        t->acknowlp=  cmalloc(1);
        *t->acknowlp= event_info[event_info_psn++];
        break;
      case 4:  break; /* sound good beep            */
      case 5:  break; /* sound bad beep             */
      case 6:  /* speech phrase from chip    */
        t->acknowl= 11;
        event_info_psn+= 2;
        break;
      case 7:  /* display message            */
        t->acknowl= 10;
        len= strlen(&event_info[event_info_psn+4]);
        p= cmalloc( len+4+1,"Reading display message");
        t->acknowlp= p;
        if (debug) printf("allocated %d\n",len+5);
        *p++= event_info[event_info_psn++]; /* font */
        *p++= event_info[event_info_psn++];
        *p++= event_info[event_info_psn++];
        *p++= event_info[event_info_psn++];
        strcpy(p, &event_info[event_info_psn]);
        event_info_psn+= len+1;
        break;
      case 8:  break; /* explode */
      case 9:  break; /* crush   */

      case 10: /* change color 1 to color 2 */
      case 11: /* change not color 1 to color 2 */
        t->acknowl-= 4; /* 10->6, 11->7 */

        t->acknowlp= cmalloc(2);
        *t->acknowlp=     event_info[event_info_psn++];
        *(t->acknowlp+1)= event_info[event_info_psn++];
        break;
      }
    }

  }
  event_info_psn= nextcmd; /* this should not be necessary */
  }


wack ( col, first_area, last_area)
int col, first_area, last_area;
{ int len,lenloc,tnum,touch_area;
  DSTOUCH *t;
  char *p;

  /* if touch area is not defined, just return */
  if (touch[first_area][col]== NULLADDR) return;
```

```
len=0;
event_info[event_info_psn++]=  (char) DEF_TCH_ACK;
lenloc= event_info_psn++;

for (tnum= first_area; tnum <= last_area; ++tnum)
{ t= touch[tnum][col];
  if (t != NULLADDR && (touch_area=t->counter) >0 )
  { event_info[ event_info_psn++]= touch_area;

    event_info[ event_info_psn++]= t->acknowl;
    switch (t->acknowl)
    { case 0: break;   /* no feedback for this area */
      case 1:  /* draw box outline          */
      case 2:  /* fill box                  */
      case 3:  /* flood exterior with color */
        event_info[ event_info_psn++]= *t->acknowlp;
        break;
      case 4: break;  /* sound good beep           */
      case 5: break;  /* sound bad beep            */

      case 10:  /* literal                  */
        event_info[ event_info_psn-1]= 7;
        p= t->acknowlp;
        event_info[ event_info_psn++]= *p++;
        event_info[ event_info_psn++]= *p++;
        event_info[ event_info_psn++]= *p++;
        event_info[ event_info_psn++]= *p++;
        strcpy( &event_info[ event_info_psn], p);
        event_info_psn+= strlen(p)+1;
        break;
      case 11:  /* speech phrase            */
        event_info[ event_info_psn-1]= 6;
        event_info[ event_info_psn++]= 0;
        event_info[ event_info_psn++]= 0;
        break;
      case 8:   break;  /* explode                 */
      case 9:   break;  /* crush                   */
      case 6:  /* change color 1 to color 2 */
      case 7:  /* change not color 1 to color 2 */
        event_info[ event_info_psn-1]+= 4;
        event_info[ event_info_psn++]= *t->acknowlp;
        event_info[ event_info_psn++]= *(t->acknowlp+1);
        break;
      default:
        event_info[ event_info_psn++]= 0;
        printf(
"error writing out acknowledgement. ack 1st_area tnum= %x %d %d^G^G^G^G\n",
          t->acknowl,first_area,tnum);
       break;
      }
    }
  }
 event_info[lenloc]= (event_info_psn-1) - lenloc;
 }

#include <\c\stdio.h>   /* Standard header  */
#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"

extern int   c_col;              /* Current column of the SS          */
extern int   event_info_psn;     /* Current position in event_info    */
extern int   rw_error;           /* Error flag                        */

rcalc (opcode)
int opcode;
{ int len;
  int eip;
```

```
DSCALC *c;
int cmdlen;
int dec;

c_col= getblcol(SRKBD,opcode);
if (debug) printf("RCALC.s opcode c_col= %d %d\n",opcode,c_col);
c= alloccalc(c_col);
eip= event_info_psn;

switch (opcode)
{ case CALC_ADD:  strcpy(ssval[SRKBD][c_col],"ADD");  break;
  case CALC_SUB:  strcpy(ssval[SRKBD][c_col],"SUB");  break;
  case CALC_MULT: strcpy(ssval[SRKBD][c_col],"MULT"); break;
  case CALC_DIV:  strcpy(ssval[SRKBD][c_col],"DIV");  break;
  case CALC_EXP:  strcpy(ssval[SRKBD][c_col],"EXP");  break;
  default:
  }

cmdlen= event_info[eip++];

dec= eip  /* type */
     + 1  /* length */
     + 1  /* first character of value */
     + event_info[eip+1];  /* point to type of next variable */
dec +=   1     /* point to length of next byte */
       + 1     /* point to first char of value */
       + event_info[dec+1]; /* point to # of decimal points */
dec +=   1     /* point to length of next byte */
       + 1     /* point to first char of value */
       + event_info[dec+1]; /* point to # of decimal points */

c->ndec= event_info[dec];

eip= getvar(eip, c->value1, c->var1, c->ndec, opcode);
eip= getvar(eip, c->value2, c->var2, c->ndec, opcode);
eip= getvar(eip, c->value3, c->var3, c->ndec, opcode);

if (c->ndec!= event_info[eip++]) beep("ERROR IN # OF DEC PTS FOR CALCS");

event_info_psn+= cmdlen+1;
 }

wcalc (opcode)
int opcode;
{ int length_psn;
  int eip;
  DSCALC *c;

  c= calcs[c_col];
  eip= event_info_psn;
  if (debug)
    printf("WCALC.s opcode c_col calcs eip= %d %d %lx %d\n",
      opcode,c_col,c,eip);
  event_info[eip++]= opcode;
  length_psn= eip++;

  eip= moveval(c->value1, c->var1, (stsisvar(c->value1)) ? VARTYPE : 5, eip);
  eip= moveval(c->value2, c->var2, (stsisvar(c->value2)) ? VARTYPE : 5, eip);
  eip= moveval(c->value3, c->var3, (stsisvar(c->value3)) ? VARTYPE : 5, eip);

  event_info[eip++]= c->ndec;

  event_info[length_psn]= eip- (length_psn+ 1);
  event_info_psn= eip;
  if (debug) printf("wcalc.e length_psn eip= %d %d\n",length_psn, eip);
  pause("wcalc");
  }
```

```
#include <\c\stdio.h>       /* Standard header          */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"

extern int   c_col;                 /* Current column of the SS              */
extern int   event_info_psn;          /* Current position in event_info    */
extern int   rw_error;                /* Error flag                          */

extern   char  check;
extern   int   first_opcode_psn;

int   r_graphics (opcode)
/****************************************************************************
* This module reads all the data for a still opcode(4X). It uses the        *
* structures(defined in rwdefs.h) as templates. To get the information out   *
* of the event_info[] array it makes px(x=1,2, etc) point to the current     *
* position in the array and then addresses the info by p1->xxxx, etc.        *
****************************************************************************/
int   opcode;
{  DSP_SCRN_REC             *p1;
   DEF_INVSBL_COLORS_REC    *p2;
   int wipenum;
   int i,j;

   c_col= getblcol(SRGRAPH,opcode);
   switch(opcode)
   {
      case DSP_SCRN :
         if (graph[c_col] == NULLADDR)
           graph[c_col] = (DSGRAPH *)cmalloc(sizeof(DSGRAPH));
         graph[c_col]->cmdtype = opcode - (GRAPHICS_G * 10);
         p1 = (DSP_SCRN_REC *)(&(event_info[event_info_psn]));
         wipenum= (int)p1->routine_num;
         graph[c_col]->routnum  = (wipenum==255) ? DEF : wipenum;
         graph[c_col]->time     = (int)p1->transition_time;
         if (wipenum) wipetime+= (int)p1->transition_time;
         graph[c_col]->palcolor = (int)p1->fg_color;
         graph[c_col]->bckcolor = (int)p1->bg_color;
         graph[c_col]->borcolor = (int)p1->border_color;
         graph[c_col]->frow     = (int)p1->first_row;
         graph[c_col]->fcol     = (int)p1->first_col;
         graph[c_col]->lrow     = (int)p1->last_row;
         graph[c_col]->lcol     = (int)p1->last_col;
         graph[c_col]->videotex = FALSE;

         if (!get_symbolic_name(sizeof(DSP_SCRN_REC), opcode))
            bad_symbolic(GRAPHICS_G, c_col);
         break;

      case DSP_VTEX_SCRN :
         /* Just need to load the name of the graphics screen into ssval[] */

          if (graph[c_col] == NULLADDR)
            graph[c_col] = (DSGRAPH *)cmalloc(sizeof(DSGRAPH));
          graph[c_col]->cmdtype = opcode - (GRAPHICS_G * 10);
          graph[c_col]->videotex = TRUE;
          if (!get_symbolic_name(sizeof(DSP_VTEX_SCRN_REC), opcode))
             bad_symbolic(GRAPHICS_G, c_col);
          break;

       case DEF_INVSBL_COLORS :
          if (graph[c_col] == NULLADDR)
            graph[c_col] = (DSGRAPH *)cmalloc(sizeof(DSGRAPH));
          p2 = (DEF_INVSBL_COLORS_REC *)(&(event_info[event_info_psn]));
          graph[c_col]->mask      = p2->mask;
```

```
        graph[c_col]->trncolor= 0;
        for (i=1, j=1; j<=16; i *= 2, j++)
        { if ( i & p2->color_bits)
          { graph[c_col]->trncolor= i;
            break;
          } }
/*      graph[c_col]->trncolor = p2->color_bits; */
        event_info_psn += p2->length + 1;
        /* Don't have to load anyrhing into ssval[][] for this one */
        break;

      default :
        rw_error = BAD_OPCODE;
        break;

    } /* End switch */
} /* End r_graphics */

/************************ Local globals to write_event ***********************
* event_info is a char array that holds the file image of all the CTL file    *
* records for a given event                                                    *
*****************************************************************************/

int   w_graph (col)
/****************************************************************************
* This module takes the current element in the graphics array and makes a 4X *
* opcode out of it and puts it into the event_info[] array. It uses struc-   *
* tures defined in rwdefs.h as templates to address the information.         *
****************************************************************************/
int   col;
{
   DSP_SCRN_REC            *p1;
   DSP_VTEX_SCRN_REC       *p2;
   DEF_INVSBL_COLORS_REC   *p3;
   int wipenum;

   /* If ssval != "CLEARxx" then an opcode 42 must follow a 40 or 41. */
/* if (!str_compare(ssval[SRGRAPH][col], &("CLEAR"), 5))
   {   */
      if (debug) printf("W 42. col psn mask trans= %d %d %xh %xh\n",
        col,event_info_psn,graph[col]->mask,graph[col]->trncolor);

     event_info[event_info_psn] = (char)DEF_INVSBL_COLORS;      /* Opcode 42 */
     ++event_info_psn;

     p3 = (DEF_INVSBL_COLORS_REC *)(&(event_info[event_info_psn]));

     p3->length      = sizeof(DEF_INVSBL_COLORS_REC) - sizeof(p3->length);
     p3->mask        = graph[col]->mask;
     p3->color_bits = graph[col]->trncolor;

     event_info_psn += sizeof(DEF_INVSBL_COLORS_REC);

/* } /* End if (opcode 42) */  */

  if (!graph[col]->videotex)      /* This is a not a videotex screen */
  {
  if (debug) printf("Writing an opcode 40.\n");
     event_info[event_info_psn] = (char)DSP_SCRN;          /* Opcode 40 */
     ++event_info_psn;

     p1 = (DSP_SCRN_REC *)(&(event_info[event_info_psn]));

     p1->length = sizeof(DSP_SCRN_REC) - sizeof(p1->length) +
        sslen(ssval[SRGRAPH][col]);
     if (debug) printf("The length of the length = %d\n", sizeof(p1->length));
     if (debug) printf("The length of this graphic record = %d\n", p1->length);
```

```
   wipenum= graph[col]->routnum;
   p1->routine_num      =  (char) (wipenum== DEF) ? 255 : wipenum;
   p1->transition_time =  (char)graph[col]->time;
   if (wipenum) wipetime+= graph[col]->time;
   p1->fg_color         =  (char)graph[col]->palcolor;
   p1->bg_color         =  (char)graph[col]->bckcolor;
   p1->border_color     =  (char)graph[col]->borcolor;
   p1->first_row        =  (char)graph[col]->frow;
   p1->first_col        =  (char)graph[col]->fcol;
   p1->last_row         =  (char)graph[col]->lrow;
   p1->last_col         =  (char)graph[col]->lcol;

   put_symbolic_name(SRGRAPH, col, event_info_psn +
      sizeof(DSP_SCRN_REC));
   if (debug) printf("The length after put_symbolic = %d\n", p1->length);

} /* End if (opcode 40) */


else                           /* This is a videotex screen */
{
   event_info[event_info_psn] = (char)DSP_VTEX_SCRN;         /* Opcode 41 */
   ++event_info_psn;

   p2 = (DSP_VTEX_SCRN_REC *)(&(event_info[event_info_psn]));

   p2->length = sizeof(DSP_VTEX_SCRN_REC) - sizeof(p2->length) +
      sslen(ssval[SRGRAPH][col]);

   put_symbolic_name(SRGRAPH, col, event_info_psn +

            sizeof(DSP_VTEX_SCRN_REC));

      } /* End else (opcode 41) */


   } /* End graphics */
```

```
#include <\c\stdio.h>   /* Standard header         */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */

extern int   c_col;                /* Current column of the SS          */
extern int   event_info_psn;         /* Current position in event_info    */
extern int   rw_error;               /* Error flag                        */

r_kbd_inpt (opcode)
/************************************************************************
* This module reads all the data for a keyboard input opcode(9X). It uses the*
* structures(defined in rwdefs.h) as templates. To get the information out   *
* of the event_info[] array it makes px(x=1,2, etc) point to the current     *
* position in the array and then addresses the info by p1->xxxx, etc.        *
************************************************************************/
int   opcode;
{
   INPT_REC     *p1;
   char  *temp;
   int   i, *rec_num;
   int   done = FALSE;
   int   cur_psn = 0;
   int   branch = 0;
   int   eip,length;
   int   ms_len;  /* Number of records for every match string in literal file */
   int   ms_extra;/* Fractional part of last record for match string          */
   extern   FILE  *lit_file, *var_file;


   c_col= getblcol(SRKBD, opcode);

   keybrd[c_col] = (DSKEYBRD *)malloc(sizeof(DSKEYBRD));
   switch(opcode)
   {
      case KBD_INPT :
      case TOUCH_INPT :
         p1 = (INPT_REC *)(&(event_info[event_info_psn]));
         keybrd[c_col]->recnum      = p1->rec_num;
         keybrd[c_col]->row         = p1->row;
         keybrd[c_col]->col         = p1->col;
         keybrd[c_col]->attr        = p1->field_attr;
         keybrd[c_col]->len         = p1->field_length;
         keybrd[c_col]->editcode    = p1->edit_code;
         keybrd[c_col]->echo        = p1->screen_echo;
         keybrd[c_col]->voice       = p1->voice_echo;
         keybrd[c_col]->vrecnum     = p1->rec_num;
         keybrd[c_col]->device      = (opcode== KBD_INPT) ? 'K' :
                                      ( (p1->screen_echo== 1) ? 'T' : 'U') ;

         if (!get_symbolic_name(sizeof(INPT_REC), opcode))
            bad_symbolic( KBRD_INPT_G , c_col);
         break;
case DEF_MATCH_BR :
   eip= event_info_psn;
   length= event_info[eip++];
   for (branch = 0; branch <= 5; ++branch)
      moveevent( keybrd[c_col]->branches[branch].event, " ",0);

   movmem(&event_info[eip], keybrd[c_col]->vname, NAME_LENGTH);
   eip+= NAME_LENGTH;
   keybrd[c_col]->vrecnum  = * ((int*) &event_info[eip]); eip+=2;

   movmem(&event_info[eip],keybrd[c_col]->mstring,NAME_LENGTH);
   eip+= NAME_LENGTH;

   keybrd[c_col]->msrecnum = * ((int*) &event_info[eip]); eip+=2;
```

```
/* Assign the two names of 8 characters apiece */
length -= 20;  /* subtract 2 names of 8 + 2 words */
branch = 0;
while (length >= LABEL_LENGTH)
{ eip+= moveevent( keybrd[c_col]->branches[branch].event,
    &event_info[eip], 0);
   ++branch;
   length -= LABEL_LENGTH;

} /* End while loop */

/* Now go get the match phrase */
ms_len = MAX_MATCH_LEN / LIT_REC_LEN;   /*  Calculate the length     */
ms_extra = MAX_MATCH_LEN % LIT_REC_LEN;
if (ms_extra != 0) ++ms_len;
temp = malloc(ms_len * MAX_MATCH_LEN);  /* Temporary storage for the */
                                        /* match phrase records      */
read_rec(temp, lit_file,
         keybrd[c_col]->msrecnum, ms_len * LIT_REC_LEN);
movmem(temp, keybrd[c_col]->mphrase, MAX_MATCH_LEN);
free(temp);

/*------------------------------------------------------------*/
/* Load ssval[] with the symbolic name. This is a little      */
/* tricky. We need to pass get_symbolic_name() the length of  */
/* the record so that it can tell how long the name is(see    */
/* that routine). The length is the first parameter below.    */
/*------------------------------------------------------------*/
--branch;   /* Point to the last branch generated */
if (branch<0) moveevent( keybrd[c_col]->branches[5].event, " ",0);
else if ( branch != 5)
{ moveevent( keybrd[c_col]->branches[5].event,
    keybrd[c_col]->branches[branch].event,0);
  }
for (i= (branch<0) ? 0 : branch; i<5; i++)
  moveevent(keybrd[c_col]->branches[i].event," ",0);

if (!get_symbolic_name(eip-event_info_psn,opcode))
  bad_symbolic(KBRD_INPT_G, c_col);
break;

      default : rw_error = BAD_OPCODE; break;

   } /* End switch */
} /* End r_kbd_input */

int   wvar (col)
/***************************************************************************
* This module takes the inforamtion for the current keyboard input element *
* and makes an opcode for it. It uses structures defined in rwdefs.h as tem- *
* plates to address the information.                                        *
***************************************************************************/
int   col;
{
  INPT_REC      *pl;
  int      length_psn;
  int      i;
  int dt;

  /*
    outputting an opcode 90 or 91.  91 will be for touchscreen emulation
    of a keyboard.  Test has already been done that a variable name is
    present in the timeline */

  if (keybrd[col]->len <= 5)      dt = INT_VAR;
  else if (keybrd[col]->len >= 9) dt = DOUBLE_VAR;
  else                            dt = SINGLE_VAR;

  keybrd[col]->vrecnum = findvar( ssval[SRKBD][col], dt);
  event_info[event_info_psn++] = (keybrd[col]->device== 'K')
    ? (char)KBD_INPT /*90*/ : (char)TOUCH_INPT; /*91*/
```

```
  length_psn = event_info_psn;

  pl = (INPT_REC *)(&(event_info[event_info_psn]));

  pl->rec_num      = keybrd[col]->recnum;
  pl->row          = keybrd[col]->row;
  pl->col          = keybrd[col]->col;
  pl->field_attr    = keybrd[col]->attr;
  pl->field_length = keybrd[col]->len;
  pl->edit_code    = keybrd[col]->editcode;
  pl->screen_echo= (keybrd[col]->device== 'K') ? 1 :
                   ( (keybrd[col]->device== 'T') ? 1 : 3);
  pl->voice_echo    = keybrd[col]->voice;
  pl->rec_num      = keybrd[col]->vrecnum;

  put_symbolic_name(SRKBD, col,event_info_psn+sizeof(INPT_REC));
  pl->length = event_info_psn - length_psn - sizeof(pl->length);
  }

wdefkbd (col)  /* define keyboard command */
int col;
{ int length_psn;
  int branch, curbranch;
  int i;
  char varkey[VARKLEN+1];

  event_info[event_info_psn++] = (char)DEF_MATCH_BR;
  length_psn = event_info_psn++;

  keybrd[col]->msrecnum = findindx(lit_key_file, lit_file,
    ssval[SRKBD][col],keybrd[col]->mphrase,0,LITKLEN,LITKRLEN,LITRLEN, 2);

  fitost( varkey, keybrd[col]->vname, EVENTLEN, 0);
  keybrd[col]->vrecnum = findvar( varkey, 0);

  movmem(keybrd[c_col]->vname, &event_info[event_info_psn], NAME_LENGTH);
  event_info_psn+= NAME_LENGTH;
  * ((int*) &event_info[event_info_psn]) = keybrd[c_col]->vrecnum;
  event_info_psn+=2;

  movmem(keybrd[c_col]->mstring,&event_info[event_info_psn], NAME_LENGTH);

  event_info_psn+= NAME_LENGTH;

  * ((int*) &event_info[event_info_psn]) = keybrd[c_col]->msrecnum;
  event_info_psn+=2;

  curbranch = 0;
  for (branch = 0; branch <= 5; ++branch)
  {
    /* Got a branch */
    if (haveevt(keybrd[col]->branches[branch].event) )
    { event_info_psn+= moveevent(&event_info[event_info_psn],
        keybrd[col]->branches[branch].event,1);
      curbranch++;
      } /* have a branch */
    }  /* end of branch loop */

  put_symbolic_name(SRKBD, col, event_info_psn);
  event_info[length_psn] = event_info_psn - length_psn - 1;
  } /* End keybrd */


typedef struct
{ char            rtype;
  char            alpha_flag;
  unsigned int    alpha_use;
  char            length;
  char            alpha_data[40];
  char            num_flag;
  unsigned int    num_use;
```

```
  char            data_type;
  char            num_data[8];
  char            filler1[7];
  } VAR_RECORD;

findvar ( name, datatype)
char *name;
int datatype;
{ VAR_RECORD var_rec;
  int rn;

  initvar(&var_rec,*name);
  var_rec.rtype     = (char)1;
  var_rec.num_flag  = (char)1;

  var_rec.data_type= datatype;

  rn= findindx( var_key_file, var_file, name, (char*)&var_rec,
        1, VARKLEN, VARKRLEN, VARRLEN, 1);
  return(rn);
  }

static initvar (var_rec,ch)
VAR_RECORD *var_rec;
char ch;
{ setmem(var_rec->alpha_data,40,' '); /* Init the data field */
  setmem(var_rec->num_data,8,0);      /* Init the data field */
  var_rec->rtype       = 0;
  var_rec->alpha_flag  = (ch== '$');
  var_rec->alpha_use   = 0;
  var_rec->length      = 0;
  var_rec->num_flag    = (ch== '%');
  var_rec->num_use     = 0;
  setmem(var_rec->filler1,7,' ');
  }
#include <\c\stdio.h>   /* Standard header         */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"

extern int   c_col,f_col, l_col;     /* Current column of the SS           */
extern int   event_info_psn;         /* Current position in event_info     */
extern int   rw_error;               /* Error flag                         */
extern   int   first_opcode_psn;

int   r_line25 (opcode)
/****************************************************************************
* This module reads all the data for a line25 opcode(7X). It uses the       *
* structures(defined in rwdefs.h) as templates. To get the information out  *
* of the event_info[] array it makes px(x=1,2, etc) point to the current    *
* position in the array and then addresses the info by p1->xxxx, etc.       *
****************************************************************************/
int   opcode;
{
   DSLINE25 *l;
   int   done = FALSE;
   int   key;
   int length;  /* length of command */
   int eip;

   c_col= f_col;
   if (debug) printf("r_line25.s  opcode event_info_psn c_col= %d %d %d\n",
     opcode,event_info_psn,c_col);

   if (line25[c_col]== NULLADDR)
     line25[c_col] = (DSLINE25 *)cmalloc(sizeof(DSLINE25));
   l= line25[c_col];
```

```
eip= event_info_psn;
length= event_info[eip++];

switch(opcode)
{
  case DEF_SYS_BR_TBL :
    if (debug) printf("DEF_SYS_BR_TBL.  event_info_psn= %d\n",
      event_info_psn);
      /* Initialize the structure */
    moveevent( l->nextevt, " ",0);
    moveevent( l->rtrnevt, " ",0);

    do          /* Cycle through getting one key definintion at a time */
    {  key = event_info[eip++];
       if (debug) printf(" line25 key eip event_info_psn= %d %d %d\n",
         key,eip,event_info_psn);
       switch(key)
       { case PAUSE_C:  l->pause  = event_info[eip++]; break;
         case REPLAY_C: l->replay = event_info[eip++]; break;
         case HELP_C :  l->help   = event_info[eip++]; break;
         case CONTINUE_C :
           eip+= moveevent( l->nextevt, &event_info[eip],0);
           break;
         case RETURN_C :
           eip+= moveevent( l->rtrnevt, &event_info[eip],0);
           break;
        default:
          /*-------------------------------------------------------------*/
          /* Load ssval[] with the symbolic name. This is a little       */
          /* tricky. We need to pass get_symbolic_name() the length of   */
          /* the record so that it can tell how long the name is(see     */
          /* that routine). The length is the first parameter below.     */
          /*-------------------------------------------------------------*/
          eip--;  /* eip shouldn't have been incremented */
          if (!get_symbolic_name(eip- event_info_psn, opcode))
             bad_symbolic(LINE25_G, c_col);
          done = TRUE;

       } /* end switch */
    } /* End do loop */
    while (!done);
    break;

  case DEF_PAUSE :
    if (debug) printf("DEF_PAUSE\n");
    l->resume = 'Y';
    moveevent( l->detail, " ",0);

    do
    {  key= event_info[eip++];
       if (debug) printf(" line25 key eip= %d %d\n",key,eip);
       switch(key)
       { case SLOW_BACK_C :    l->slowbk  = event_info[eip++]; break;
         case SLOW_FORWARD_C : l->slowfwd = event_info[eip++]; break;
         case STOP_C :         l->stop    = event_info[eip++]; break;
         case MORE_INFO_C:
           /* Load the event name from the next 10 bytes */
           eip+= moveevent(l->detail, &event_info[eip], 0);
           break;
        default:  /* We are done */
          /*-------------------------------------------------------------*/
          /* Load ssval[] with the symbolic name. This is a little       */
          /* tricky. We need to pass get_symbolic_name() the length of   */
          /* the record so that it can tell how long the name is(see     */
          /* that routine). The length is the first parameter below.     */
          /*-------------------------------------------------------------*/
          eip--;  /* should not have been incremented */
          if (!get_symbolic_name(eip- event_info_psn, opcode))
             bad_symbolic(LINE25_G, c_col);
          done = TRUE;
```

```
      } /* End switch */
    } /* End do loop */
    while (!done);
    break;

 default : rw_error = BAD_OPCODE;  break;

   } /* End switch */
if (debug) dispdata(0);
pause("end of r_line25");
}/* End r_line25 */

int   w_line25 (col)
/*****************************************************************************
* This module takes all of the information in the current line25 element and *
* makes an opcode 7X outof it. It uses structures defined in rwdefs.h as     *
* templates to address the information.                                      *
*****************************************************************************/
int   col;
{
   int   touch_area;
   int   length_psn;
   int   i;

   /* output command 71 */

    event_info[event_info_psn++] = (char)DEF_SYS_BR_TBL; /* Opcode 71 */

    length_psn = event_info_psn;     /* Remember where the length will go   */
    event_info_psn++;
    event_info[event_info_psn++] = (char)PAUSE_C;
    event_info[event_info_psn++] = line25[col]->pause;
    event_info[event_info_psn++] = (char)REPLAY_C;
    event_info[event_info_psn++] = line25[col]->replay;

    if (haveevt( line25[col]->nextevt) )
    { event_info[event_info_psn++] = (char)CONTINUE_C;
      event_info_psn+=
        moveevent( &(event_info[event_info_psn]), line25[col]->nextevt, 1 );
      }

    if (haveevt( line25[col]->rtrnevt) )
    { event_info[event_info_psn++] = (char)RETURN_C;
      event_info_psn+=
        moveevent( &(event_info[event_info_psn]), line25[col]->rtrnevt, 1 );
      }

     event_info[event_info_psn++] = (char)HELP_C;
     event_info[event_info_psn++] = line25[col]->help;

    put_symbolic_name(SRL25, col, event_info_psn);
    event_info[length_psn]= event_info_psn- length_psn- 1;


   /* output op code 72 */

    event_info[event_info_psn++] = (char)DEF_PAUSE;   /* Generate opcode */

    length_psn = event_info_psn++;    /* Remember where the length will go   */

    event_info[event_info_psn++] = (char)SLOW_BACK_C;
    event_info[event_info_psn++] = line25[col]->slowbk;
    event_info[event_info_psn++] = (char)SLOW_FORWARD_C;
    event_info[event_info_psn++] = line25[col]->slowfwd;
    event_info[event_info_psn++] = (char)STOP_C;
    event_info[event_info_psn++] = line25[col]->stop;

    if (haveevt( line25[col]->detail) )
    { event_info[event_info_psn++] = (char)MORE_INFO_C;
      event_info_psn +=
        moveevent(  &(event_info[event_info_psn]), line25[col]->detail, 1 );
      }
```

```
    put_symbolic_name(SRL25, col, event_info_psn);
    event_info[length_psn]= event_info_psn- length_psn- 1;

} /* End touch */
#include <\c\stdio.h>      /* Standard header        */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"

extern int   c_col;               /* Current column of the SS          */
extern int   event_info_psn;        /* Current position in event_info   */
extern int   rw_error;              /* Error flag                        */

int   r_misc (opcode)
/*****************************************************************************
* This module reads all the data for a miscellaneous opcode(11X). It uses the*
* structures(defined in rwdefs.h) as templates. To get the information out   *
* of the event_info[] array it makes px(x=1,2, etc) point to the current     *
* position in the array and then addresses the info by p1->xxxx, etc.       *
*****************************************************************************/
int   opcode;
{
  TOGGLE_LOG_REC *p1;
  PRT_CTL_REC     *p2;
  char  *malloc();

  c_col= getblcol(SRMISC,opcode);

  if (debug) printf(" r_misc.  c_col opcode= %d %d\n",c_col,opcode);
  switch (opcode)
  { case FIND: case READ: case WRITE:
      switch (opcode)
      { case FIND:  strcpy(ssval[SRMISC][c_col],"FIND    "); break;
        case READ:  strcpy(ssval[SRMISC][c_col],"READ    "); break;
        case WRITE: strcpy(ssval[SRMISC][c_col],"WRITE   "); break;
        }
      event_info_psn += 3;
      break;

    default:

      print[c_col] = (DSPRINT *)malloc(sizeof(DSPRINT));
      switch(opcode)
      { case TOGGLE_LOG :
          p1 = (TOGGLE_LOG_REC *)(&(event_info[event_info_psn]));
          print[c_col]->logf = p1->toggle;

          if (p1->toggle == (char)1) load_ssval(SRMISC, c_col,"LOG",STRING,3);
          else load_ssval(SRMISC, c_col, "NOLOG", STRING, 5);

          event_info_psn += p1->length + 1;
          break;

        case PRT_CTL :
          p2 = (PRT_CTL_REC *)(&(event_info[event_info_psn]));
          print[c_col]->prwidth = (int)p2->width;
          print[c_col]->prtype  = (int)p2->control_code; /* -CHECK THIS OUT- */
          print[c_col]->prff    = p2->form_feed;
          load_ssval(SRMISC, c_col, "PRINT", STRING, 5);
          event_info_psn += p2->length + 1;
          break;

        default : rw_error = BAD_OPCODE; break;
        } /* End switch 2 */
    } /* End switch 1 */
  } /* end r_misc */
```

```
int   w_misc (col,playos)
/****************************************************************************
* This module takes the current element of the print[] array and makes a   *
* print opcode(11X) out of it. It uses structures defined is rwdefs.h as    *
* templates                                                                 *
****************************************************************************/
int   col,playos;
{
   TOGGLE_LOG_REC *p1;
   PRT_CTL_REC    *p2;

   if ((str_compare(ssval[SRMISC][col], &("LOG"), 3)) ||  /* If "LOG" or    */
       (str_compare(ssval[SRMISC][col], &("NOLOG"), 5)))  /* "NOLOG" in SS  */
   {                                                      /* then op 110    */
      event_info[event_info_psn] = (char)TOGGLE_LOG;    /* Opcode 110 */
      ++event_info_psn;

      p1 = (TOGGLE_LOG_REC *)(&(event_info[event_info_psn]));

      p1->length = sizeof(TOGGLE_LOG_REC) - sizeof(p1->length);
      p1->toggle = print[col]->logf;

      event_info_psn += sizeof(TOGGLE_LOG_REC);

   } /* End if (opcode 110) */


   else if (str_compare(ssval[SRMISC][col], &("PRINT"), 5)) /* If "PRINT"    */
   {                                                        /* then op 111   */
      event_info[event_info_psn] = (char)PRT_CTL;    /* Opcode 111 */
      ++event_info_psn;

      p2 = (PRT_CTL_REC *)(&(event_info[event_info_psn]));

      p2->length       = sizeof(PRT_CTL_REC) - sizeof(p2->length);
      p2->width        = print[col]->prwidth;
      p2->control_code = print[col]->prtype;
      p2->form_feed    = print[col]->prff;

      event_info_psn += sizeof(PRT_CTL_REC);

   } /* End else if (opcode 111) */

} /* End print */


int w_file (opcode)
/****************************************************************************
* This module write the FIND READ WRITE commands.                           *
****************************************************************************/
int   opcode;
{ char *s;

  event_info[event_info_psn++]= opcode;   /* command */
  event_info[event_info_psn++]= 2;        /* length  */
  event_info_psn+= 2;                     /* space for reserved word */
  }
```

```
#include <\c\stdio.h>      /* Standard header          */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"

extern int   c_col;               /* Current column of the SS          */
extern int   event_info_psn;        /* Current position in event_info    */
extern int   rw_error;              /* Error flag                        */
extern   char  next_event[];

int   r_next_event (opcode)
/*****************************************************************************
* This module reads the next event name for a 200 opcode.                    *
*****************************************************************************/
int   opcode;
{ int length;
  int i;

  length = (int)event_info[event_info_psn++];

  if (debug)
  { printf("rnext length event_info_psn= %d %d\n",
      length,event_info_psn);
    for (i=0; i<20; i++) printf("%x ",event_info[event_info_psn+i]);
    printf("\n");
    for (i=0; i<20; i++) printf("%c ",event_info[event_info_psn+i]);
    printf("\n");
    }
  pause(" rnext");
  length= moveevent( next_event, &event_info[event_info_psn], 0);
  event_info_psn+= length;
  }


int   w_next_event ()
/*****************************************************************************
* This module writes the next event name for a 200 opcode.                   *
*****************************************************************************/
{ int eip, len;
  eip= event_info_psn;

  event_info[event_info_psn] = (char)NXT_EVT;  /* set command */
  event_info_psn+=2;                           /* position to event name */
  len= moveevent( &event_info[event_info_psn], next_event, 1);
  event_info_psn+= len;     /* position event_info_psn to next command */
  event_info[eip+1]= len;   /* set length byte */
  }
#include <\c\stdio.h>   /* Standard header  */
#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"

extern int   c_col;               /* Current column of the SS          */
extern int   event_info_psn;      /* Current position in event_info    */
extern int   rw_error;            /* Error flag                        */

rsetv (opcode)
int opcode;
{ int len;
  int eip;
  int cmdlen;
  int dec;
  DSCALC *c;
```

```
c_col= getblcol(SRKBD,opcode);
if (debug) printf("RSETV.s opcode c_col= %d %d\n",opcode,c_col);
c= alloccalc(c_col);
eip= event_info_psn;
if (debug)
{ printf("event_info[%d] ...= ",eip);
  for (len=eip; len<eip+10; len++) printf(" %x",event_info[len]);
  printf("\n");
  }
cmdlen= event_info[eip++];
if (event_info[eip]== 7) strcpy(ssval[SRKBD][c_col],"SET     ");
else strcpy(ssval[SRKBD][c_col],"SETALL  ");

if (debug) printf("rwsetv.1 eip= %d\n",eip);

   /* eip+1 is length, skip length, add length of variable */
dec= eip  /* type */
     + 1  /* length */
     + 1  /* first character of value */
     + event_info[eip+1];  /* point to type of next variable */
if (debug) printf("dec eip= %d %d\n",dec,eip);
dec +=   1    /* point to length of next byte */
       + 1    /* point to first char of value */
       + event_info[dec+1]; /* point to # of decimal points */
if (debug) printf("dec = %d\n",dec);
c->ndec= event_info[dec];

eip= getvar(eip, c->value1, c->var1, c->ndec, opcode);
eip= getvar(eip, c->value2, c->var2, c->ndec, opcode);

if (c->ndec!= event_info[eip++]) beep("MISCALCULATED # DEC PTS IN SET");

event_info_psn+= cmdlen+1;
}

getvar (eip, value, var, ndec, opcode)
int eip;
char *value, *var;
int ndec;
{ int len;
  double num;
  char *p;
  int ndp;
  int type;
  char buf[81];
  static char *cmds[]= { "ADD", "SUB", "MULT", "DIV", "EXP", "SET" };

  if (debug) printf("getvar. eip= %d\n",eip);
  type= event_info[eip++];
  len= event_info[eip++];
  switch (type)
  { case 1:  /* character         */    /* will not use */
    case 2:  /* integer           */    /* will not use */
    case 3:  /* unsigned integer */    /* will not use */
    case 4:  /* float             */    /* will not use */
    case 6:  /* long              */    /* will not use */
      sprintf(buf,"BAD TYPE IN %s COMMAND",cmds[opcode-CALC_ADD]);
      beep(buf);
      break;
    case 5:  /* double   */
      movmem(&event_info[eip],&num,8);
      sprintf(value,"%lf",num);
      p= value;
      ndp=-100;
      while (*p)
      {
        if (*p=='.')
        { if (ndec==0)  /* no decimal points */ { *p='\0'; break; }
          ndp=0;
          }
```

```
        else if (++ndp> ndec) { *p='\0'; break; } /*have all the '.'s wanted*/
        p++;
        }
      break;
    case 7:  /* variable */
    case 8:  /* variable group */
      movmem(&event_info[eip], value, len);
      if (!stsisvar(value))
      { sprintf(buf,"ERROR IN %s COMMAND",cmds[opcode-CALC_ADD]);
        beep(buf);
        }
      if (len!= EVENTLEN+2)
      { sprintf(buf,"WRONG LENGTH IN VARIABLE FOR %s COMMAND",
          cmds[opcode-CALC_ADD]);
        beep(buf);
        }
      movmem(value, var, len);
      value[EVENTLEN]= '\0';
      break;
    case 9:  /* string   */
      strcpy(value, &event_info[eip]);

      break;
    }
  eip+= len;

  if (debug) printf("getvar.e eip value= %d |%s|\n",eip,value);
  return(eip);
  }

wsetv (opcode)
int opcode;
{ int length_psn;
  int eip;
  DSCALC *c;
  int t;

  c= calcs[c_col];
  eip= event_info_psn;
  if (debug)
    printf("WSETV.s opcode c_col calcs eip= %d %d %lx %d\n",
      opcode,c_col,c,eip);
  event_info[eip++]= opcode;
  length_psn= eip++;

  if (strncmp("SETALL",ssval[SRKBD][c_col])==0) t= 8; else t=7;
  if (debug) printf("event_info[eip-1]= %d^G\n",event_info[eip-1]);

  eip= moveval( c->value1, c->var1, t, eip);  /* moving variable */
  if ( stsisvar(c->value2)) t= 7;
  else t= (*c->value1=='$') ? 9 : 5;
  eip= moveval( c->value2, c->var2, t, eip);

  event_info[eip++]= c->ndec;
  event_info[length_psn]= eip- (length_psn+ 1);
  event_info_psn= eip;
  if (debug) printf("wsetv.e eip= %d\n",eip);
  pause("wsetv");
  }

moveval ( from, var, type, eip)
char *from, *var;
int type, eip;
{ int len;
  char buf[40];
  double num;
  if (debug) printf("moveval.s from var type eip= |%s|%s| %d %d\n",
    from,var,type,eip);
```

```
  event_info[eip++]= type;
  switch(type)
  { case 5:  /* double */
      sscanf(from,"%lf",&num);
      if (debug) printf("from num= |%s| %lf\n",from,num);
      movmem(&num,&event_info[eip+1],8);
      len=8;
      break;
    case VARTYPE:  /* variable */
  case 8:         /* set variables */
    if (debug) printf("WORKING ON A VARIABLE\n");
    strcpy(buf,from);
    stcpadr(buf,EVENTLEN,0);
    if (strncmp(buf, var, 8)!=0)   /* name has changed */
    { if (debug) printf("name changed\n ");
      movmem(buf,var,EVENTLEN);
      setmem(&var[EVENTLEN],2,'\0');
      }
    if (debug) printf("var= |%s|\n",var);
    len= moveevent( &event_info[eip+1], var, 1);
    break;
  case 9:  /* string */
    len= strlen(from)+1;
    strcpy(&event_info[eip+1], from);
    break;
  default:
    sprintf(buf,"BAD TYPE (%d) IN MOVEVAL.",type);
    beep(buf);
  }

 event_info[eip++]= len;
 eip+= len;
 if (debug) printf("moveval.  isvar= %d  len= %d\n",stsisvar(from),len);
 return(eip);
 }

#include <\c\stdio.h>   /* Standard header         */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"

extern int   c_col;                 /* Current column of the SS          */
extern int   event_info_psn;        /* Current position in event_info    */
extern int   rw_error;              /* Error flag                        */

int   r_switches (opcode)
/******************************************************************************
* This module reads all the data for a switches opcode(10X). It uses the     *
* structures(defined in rwdefs.h) as templates. To get the information out   *
* of the event_info[] array it makes px(x=1,2, etc) point to the current     *
* position in the array and then addresses the info by p1->xxxx, etc.        *
******************************************************************************/
int   opcode;
{  int eip, length;
   DSSWITCH *sw;

   c_col= getblcol(SRINDIC,opcode);
   if (debug) printf(" read switch.  opcode c_col= %d %d\n",opcode, c_col);
   switches[c_col] = (DSSWITCH *) cmalloc(sizeof(DSSWITCH));
   sw= switches[c_col];
   eip= event_info_psn;
   length= event_info[eip++];
   switch(opcode)
   {
```

```
      case SET_IND :
         sw->opcode = SET_IND;
         sw->mask   = *(int*) &event_info[eip]; eip+=2;
         sw->swset  = *(int*) &event_info[eip]; eip+=2;
         sw->swtest = 0;         /* Zero it out so that the write    */
                                 /* module can differentiate b/ them */

         if (!get_symbolic_name( eip- event_info_psn, opcode))
            bad_symbolic(SWITCH_G, c_col);
         break;

      case TEST_IND :
         sw->opcode = TEST_IND;
         sw->mask   = *(int*) &event_info[eip]; eip+=2;
         sw->swtest = *(int*) &event_info[eip]; eip+=2;
         sw->swset  = 0;   /* Zero it out so that the write    */
                           /* module can differentiate b/ them */

         /* Assign the true and false branch labels */
         eip+= moveevent( sw->posevent, &event_info[eip], 0);
         eip+= moveevent( sw->negevent, &event_info[eip], 0);

         if (!get_symbolic_name( eip- event_info_psn, opcode))
            bad_symbolic(SWITCH_G, c_col);
         break;

      case ADD_IND :
         sw->opcode = ADD_IND;
         sw->mask   = *(int*) &event_info[eip]; eip+=2;
         sw->op     = event_info[eip++];
         sw->nhits  = event_info[eip++];
         sw->swtest = 0;
         sw->swset  = 0;

         /* Assign the true and false branch labels */
         eip+= moveevent( sw->posevent, &event_info[eip], 0);
         eip+= moveevent( sw->negevent, &event_info[eip], 0);

         if (!get_symbolic_name( eip-event_info_psn, opcode))
            bad_symbolic(SWITCH_G, c_col);
         break;

      default :
         rw_error = BAD_OPCODE;
         break;

   } /* End switch */
} /* End r_switches */


wset (col)
int col;
{ DSSWITCH *sw;
  int eip;
  int length_psn;

  sw= switches[c_col];
  event_info[event_info_psn++] = (char)SET_IND;
  eip= event_info_psn;
  length_psn= eip++;
  *(int*) &event_info[eip] = sw->mask;   eip+=2;
  *(int*) &event_info[eip] = sw->swset;  eip+=2;
  put_symbolic_name(SRINDIC, col, eip);
  event_info[length_psn]= event_info_psn- length_psn- 1;
  }
```

```
wtest (col)
int col;
{ DSSWITCH *sw;
  int eip;
  int length_psn;
  sw= switches[c_col];
  event_info[event_info_psn++] = (char)TEST_IND;
  eip= event_info_psn;
  length_psn= eip++;

  *(int*) &event_info[eip] = sw->mask;    eip+=2;
  *(int*) &event_info[eip] = sw->swtest;  eip+=2;
  eip+= moveevent( &event_info[eip], sw->posevent, 1);
  eip+= moveevent( &event_info[eip], sw->negevent, 1);
 put_symbolic_name(SRINDIC, col, eip);
 event_info[length_psn]= event_info_psn- length_psn- 1;
 }

wadd (col)
/*****************************************************************************
* This module takes all of the information in the current switches[] element *
* and makes a switch opcode(10X) out of it. It uses structures declared in   *
* rwdefs.h as templates to address the information.                          *
*****************************************************************************/
int   col;
{ DSSWITCH *sw;
  int eip;
  int length_psn;
  sw= switches[c_col];
  event_info[event_info_psn++] = (char)ADD_IND;
  eip= event_info_psn;
  length_psn= eip++;
  *(int*) &event_info[eip]= sw->mask; eip+=2;
  event_info[eip++]= sw->op;
  event_info[eip++]= sw->nhits;
  eip+= moveevent( &event_info[eip], sw->posevent,1);
  eip+= moveevent( &event_info[eip], sw->negevent,1);
  put_symbolic_name(SRINDIC, col, eip);
  event_info[length_psn]= event_info_psn- length_psn- 1;
  } /* End switches */

#include <\c\stdio.h>    /* Standard header         */

#define  EXTERN extern   /* So all EXTERN xxxx in data.i become extern xxxx */

#include <std.i>         /* Some global definitions */
#include <data.i>        /* Global data definitions */
#include <rwdefs.h>      /* Local definitions       */
#include "userproc.i"

/************************ Local globals to write_event ************************
* event_info is a char array that holds the file image of all the CTL file    *
* records for a given event                                                   *
******************************************************************************/

extern   char config,old_config;
extern   int   event_info_psn;
extern   int   first_opcode_psn;
extern   int      first_video;   /* Flag to mark the first video opcode    */
static   int      length_psn;
extern   int lastplayer;

extern int   rw_error;              /* Error flag                          */
extern int c_col,f_col;
```

```
int   r_video_seg (opcode)
/*****************************************************************************
* This module reads all the data for a video segment opcode(2X). It uses the *
* structures(defined in rwdefs.h) as templates. To get the information out   *
* of the event_info[] array it makes px(x=1,2, etc) point to the current     *
* position in the array and then addresses the info by p1->xxxx, etc.        *
*****************************************************************************/
int   opcode;
{ int dum1, dum2;

   int tplayn,tvidof,ttrack;
   PLAY_VID_SEG_REC  *p1;
   WAIT_FRAME_REC    *p2;
   CHG_AUD_VID_REC   *p3;
   LD_OR_UNLD_REC    *p4;
   WAIT_ON_END_REC   *p5;
   DSVIDEO *pv;
   int   i, len;
   char  *malloc(), *s;

   c_col= f_col;
   switch(opcode)
   {  case VIDEO_START: event_info_psn += event_info[event_info_psn]+ 1; break;
      case PLAY_VID_SEG :
         p1 = (PLAY_VID_SEG_REC *)(&(event_info[event_info_psn]));
         decode_config(p1->config,&playeros,&tvidof, &ttrack);
         playeros--;   /* convert from player # to player offset */

         if (debug) printf(" PLAY VIDEO SEG cmd  playeros col= %d %d\n",
           playeros,c_col);
         video[playeros][c_col] = (DSVIDEO *)malloc(sizeof(DSVIDEO));
         pv= video[playeros][c_col];
         pv->vidof= tvidof;
         pv->track= ttrack;
         pv->bframe  = p1->beg_frame;
         pv->eframe  = p1->end_frame;
         pv->segtype = BEG_FRAME;
         pv->speed   = p1->speed;

         load_ssval(SRPLAY1+playeros, c_col, &(pv->bframe),UNSIGNED, NIL);

         event_info_psn+= p1->length+1; /* increment pointer */

         /* Add the '[' at the beginning of the ssval entry */
         len = strlen(ssval[SRPLAY1+playeros][c_col]);    /* Shift everything  *

         s = malloc(len + 1);     /* Allocate a temporary string */
         *s = BEGSEG;             /* Set the first character     */
         stccpy((s + 1l), ssval[SRPLAY1+playeros][c_col], len - 1);/* -1 */
         free(ssval[SRPLAY1+playeros][c_col]);
         ssval[SRPLAY1+playeros][c_col] = s;
         break;

      case WAIT_FRAME :
         p2 = (WAIT_FRAME_REC *)(&(event_info[event_info_psn]));
         decode_config(p2->config, &playeros, &tvidof, &ttrack);
         playeros--;   /* convert from player # to player offset */

         if (debug) printf(" WAIT FRAME cmd  playeros col= %d %d\n",
           playeros,c_col);
         video[playeros][c_col] = (DSVIDEO *)malloc(sizeof(DSVIDEO));
         video[playeros][c_col]->vidof= tvidof;
         video[playeros][c_col]->track= ttrack;
         video[playeros][c_col]->bframe  = p2->frame;
         video[playeros][c_col]->segtype = MID_FRAME;

         load_ssval(SRPLAY1+playeros, c_col, &(video[playeros][c_col]->bframe),
            UNSIGNED, NIL);
         /* Add squiggles */
         event_info_psn += (int)p2->length + 1;
         break;
```

```
case CHG_AUD_VID :
   p3 = (CHG_AUD_VID_REC *)(&(event_info[event_info_psn]));
   decode_config(p3->config, &playeros, &tvidof, &ttrack);
   playeros--;   /* convert from player # to player offset */

   if (debug) printf(" CHANGE AUDIO/VIDEO cmd  playeros col= %d %d\n",
     playeros,c_col);
   video[playeros][c_col] = (DSVIDEO *)malloc(sizeof(DSVIDEO));
   video[playeros][c_col]->vidof= tvidof;
   video[playeros][c_col]->track= ttrack;
   video[playeros][c_col]->bframe = p3->frame;
   video[playeros][c_col]->segtype = MID_FRAME;
   load_ssval(SRPLAY1+playeros, c_col, &(video[playeros][c_col]->bframe),
      UNSIGNED, NIL);
   /* Must load up ssval[(opcode \ 10) - 1][c_col] */
      event_info_psn += (int)p3->length + 1;
      break;

   case LD_OR_UNLD :
      p4 = (LD_OR_UNLD_REC *)  (&(event_info[event_info_psn]));
      decode_config(p4->config, &playeros, &dum1, &dum2 );
      playeros--;   /* convert from player # to player offset */

      if (debug) printf(" LOAD/UNLOAD cmd  playeros col= %d %d\n",
        playeros,c_col);
      load[playeros][c_col] = (DSLOAD *)malloc(sizeof(DSLOAD));
      load[playeros][c_col]->prompt = p4->prompt;
      load[playeros][c_col]->loadf  = p4->load;
      if (p4->load == 1) load_ssval(SRPLAY1+playeros,c_col,"LOAD",STRING,4);
      else load_ssval(SRPLAY1+playeros, c_col, "UNLOAD", STRING, 6);

      /* Must load up ssval[(opcode \ 10) - 1][c_col] */
      event_info_psn += (int)p4->length + 1;
      break;

   case WAIT_ON_END :
      p5 = (WAIT_ON_END_REC *)(&(event_info[event_info_psn]));
      decode_config(p5->config, &playeros, &tvidof, &ttrack);
      playeros--;   /* convert from player # to player offset */

      if (debug) printf(" WAIT ON END cmd  playeros col= %d %d\n",
        playeros,c_col);
      video[playeros][c_col] = (DSVIDEO *)malloc(sizeof(DSVIDEO));
      video[playeros][c_col]->vidof= tvidof;
      video[playeros][c_col]->track= ttrack;
      video[playeros][c_col]->eframe  = p5->end_frame;
      video[playeros][c_col]->segtype = END_FRAME;
      load_ssval(SRPLAY1+playeros, c_col, &(video[playeros][c_col]->eframe),
                 UNSIGNED, NIL);
      event_info_psn += (int)p5->length + 1;

      /* Add the '}' at the end of the ssval entry */
      len = strlen(ssval[SRPLAY1+playeros][c_col]); /* Find the last char   *
/
      for (i = len; i >= 1; --i)
         if (*(ssval[SRPLAY1+playeros][c_col] + (long)(i - 1)) != ' ')
            break;
      if (i == len) *(ssval[SRPLAY1+playeros][c_col]+(long)(i-1)) = ENDSEG;
      else *(ssval[SRPLAY1+playeros][c_col] + (long)i) = ENDSEG;

/*------------- COMMENTED OUT -------------------------------------------
      /* Now add the '*' to the time */
      len = strlen(ssval[TIME][c_col]); /* Find the last char   */
      for (i = len; i >= 1; --i)
         if (*(ssval[TIME][c_col] + (long)(i - 1)) != ' ')
            break;
      if (i == len)
         *(ssval[TIME][c_col] + (long)(i - 1)) = '*';
      else
         *(ssval[TIME][c_col] + (long)i) = '*';
```

```
          break;

      default :                                  /* Else error */
          if (debug) printf(" RWVIDEO ERROR cmd= %d\n", opcode);

          rw_error = BAD_OPCODE;
          break;

    } /* End switch */
} /* End r_video_seg */

wbeg (code)
int code;
{ PLAY_VID_SEG_REC  *p1;
  DSVIDEO *pv;

  if (debug)
    printf(" WRITE BEG SEG cmd  playeros col code event_info_psn= %d %d %d\n",
      playeros,c_col,code,event_info_psn);

    /* return if are not expanding and are to output a VIDEO_START */
  if (code== VIDEO_START && !expand) return;

  pv= video[playeros][c_col];
  encode_config(&config, playeros+1, pv->vidof, pv->track);

  event_info[event_info_psn] = (char) code; /* Opcode 20 or 22 */
  ++event_info_psn;
  p1 = (PLAY_VID_SEG_REC *)(&(event_info[event_info_psn]));
  length_psn = event_info_psn;
  p1->config = config;
  if (code== PLAY_VID_SEG) p1->beg_frame = pv->bframe;
  else
  { if (pv->bframe <= pv->eframe) p1->beg_frame= 0x0000; /* going forward   */
    else                          p1->beg_frame= 0xFFFF; /* going backwards */
    }
  p1->end_frame = pv->eframe;
  p1->speed = pv->speed;
  put_symbolic_name(SRPLAY1+playeros, c_col, event_info_psn +
    sizeof(PLAY_VID_SEG_REC));
  p1->length = event_info_psn - length_psn - sizeof(p1->length);

  /* Assumes that event_info_psn has been correctly updated          */
  /* Also assumes that put_ssval() is smart enough to check whether   */
  /* the value that you are trying to load is really a symbolic. If it */
  /* is(tests whether it's alpha) then it's dumped, if not, no dump.   */

  old_config = config;      /* Save the new config for the next time */

  if (code== PLAY_VID_SEG && expand)  /* output VIDEO_WAIT */
  { event_info[event_info_psn++] = (char) VIDEO_WAIT;
    event_info[event_info_psn++] = (char) 1;
    event_info[event_info_psn++] = (char) 20;
    }

  wmid (cmdnum)
  char cmdnum;
  { WAIT_FRAME_REC    *p2;
    DSVIDEO *pv;
    int prevcol;
    char temp[81];

    if (debug) printf(" WRITE MID SEG cmd  playeros col= %d %d\n",
      playeros,c_col);
```

```
  for (prevcol= c_col-1; prevcol>=0; prevcol--) {  /* scan backwards */
    if (video[playeros][prevcol]!= NULLADDR) break;
    }
  if (prevcol<0)
  { sprintf(temp,
     "ERROR IN WRITING OUT VIDEO FOR COLUMN %d.  NO PREVIOUS SEGMENT",c_col+1);
    beep(temp);
    return;
    }

  pv= video[playeros][c_col];
  encode_config(&config, playeros+1, pv->vidof, pv->track);

  event_info[event_info_psn++] = cmdnum;
  p2 = (WAIT_FRAME_REC *)(&(event_info[event_info_psn]));
  p2->length = sizeof(WAIT_FRAME_REC) - sizeof(p2->length);
  p2->config = config;
  p2->frame = pv->bframe;
  event_info_psn += sizeof(WAIT_FRAME_REC);

  old_config = config;     /* Save the new config for the next time */
  }

wwaitend ()
{ WAIT_ON_END_REC   *p3;
  DSVIDEO *pv;
  if (debug)
    printf(" WRITE WAIT ON END cmd  playeros col wipetime= %d %d %d\n",
    playeros,c_col,wipetime);


  pv= video[playeros][c_col];
  encode_config(&config, playeros+1, pv->vidof, pv->track);

  event_info[event_info_psn] = (char)WAIT_ON_END;       /* Opcode 25 */
  ++event_info_psn;
  p3 = (WAIT_ON_END_REC *)(&(event_info[event_info_psn]));
  p3->length = sizeof(WAIT_ON_END_REC) - sizeof(p3->length);
  p3->config = config;
  p3->end_frame = pv->eframe;
  event_info_psn += sizeof(WAIT_ON_END_REC);

  old_config = config;     /* Save the new config for the next time */
  if (debug) printf("wwaitend.e  wipetime= %d \n",wipetime);
  }

rplayer ()
{ int player;
  event_info_psn++;  /* skip length byte */
  player= event_info[event_info_psn++]+1;  /* 0,1 -> 1,2 */
  if (video[0][c_col]!= NULLADDR) video[0][c_col]->vidof= 0x30+ player;
  if (video[1][c_col]!= NULLADDR) video[1][c_col]->vidof= 0x30+ player;
  if (still[0][c_col]!= NULLADDR) still[0][c_col]->vidof= 0x30+ player;
  if (still[1][c_col]!= NULLADDR) still[1][c_col]->vidof= 0x30+ player;
  }

wplayer (player)
int player;
{ if (debug) printf("wplayer.s  expand player lastplayer= %d %d %d\n",
    expand, player, lastplayer);
  if (expand && player!= lastplayer)
  { if (debug) printf("event_info_psn= %d\n",event_info_psn);
    event_info[event_info_psn]= SET_PLAYER; event_info_psn++;
    event_info[event_info_psn]= 1;          event_info_psn++;
    event_info[event_info_psn]= player-1;  /* translate 1,2 -> 0,1 */
    event_info_psn++;
    lastplayer= player;
    if (debug) printf("event_info_psn= %d\n",event_info_psn);
    }
  }
```

```
#include <\c\stdio.h>       /* Standard header         */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"

extern int   c_col;              /* Current column of the SS          */
extern int   event_info_psn;       /* Current position in event_info   */
extern int   rw_error;             /* Error flag                       */

int   r_literals (opcode)
/***************************************************************************
* This module reads all the data for a still opcode(5X). It uses the       *
* structures(defined in rwdefs.h) as templates. To get the information out *
* of the event_info[] array it makes px(x=1,2, etc) point to the current   *
* position in the array and then addresses the info by p1->xxxx, etc.      *
***************************************************************************/
int   opcode;
{
   DSP_LIT_VAR_REC   *p1;
   char  temp[VAR_REC_LEN];
   extern   FILE  *lit_file, *var_file;
   int   i;

   c_col= getblcol(SRLIT,opcode);
   lit[c_col] = (DSLIT *) cmalloc(sizeof(DSLIT));
   switch(opcode)
   {  case DSP_LIT_VAR :
         p1 = (DSP_LIT_VAR_REC *)(&(event_info[event_info_psn]));
         lit[c_col]->recnum   = (int)p1->rec_num;
         lit[c_col]->row      = (int)p1->row;
         lit[c_col]->col      = (int)p1->col;
         lit[c_col]->fcolor  = (int)(p1->before_attr);
         lit[c_col]->lcolor  = (int)(p1->after_attr);
         lit[c_col]->litlen   = (int)p1->field_length;
         lit[c_col]->editcode = (int)p1->edit_code;

         if (!get_symbolic_name(sizeof(DSP_LIT_VAR_REC), opcode))
            bad_symbolic(LITERAL_G, c_col);
         else
         { if (stsisvar(ssval[SRLIT][c_col]))
           { read_rec(temp, var_file, lit[c_col]->recnum, VAR_REC_LEN);

             movmem( temp+5, lit[c_col]->literal, lit[c_col]->litlen);
             lit[c_col]->literal[lit[c_col]->litlen] = '\0';
             }
           else  /* No, just a regular literal */
           { read_rec(lit[c_col]->literal, lit_file, lit[c_col]->recnum,
               LIT_REC_LEN);
             }
           } /* End else (wasn't a bad_symbolic name) */
         break;
                default : rw_error = BAD_OPCODE; break;

             }/* End switch */
           } /* End r_literal */

#include <\c\stdio.h>       /* Standard header         */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"
```

```
extern int   c_col;                  /* Current column of the SS          */
extern int   event_info_psn;           /* Current position in event_info    */
extern int   rw_error;                 /* Error flag                        */


int   r_misc(opcode)
/******************************************************************************
* This module reads all the data for a miscellaneous opcode(11X). It uses the*
* structures(defined in rwdefs.h) as templates. To get the information out   *
* of the event_info[] array it makes px(x=1,2, etc) point to the current     *
* position in the array and then addresses the info by p1->xxxx, etc.        *
******************************************************************************/
int   opcode;
{
   TOGGLE_LOG_REC *p1;
   PRT_CTL_REC    *p2;
   char  *malloc();

   c_col= getblcol(SRMISC,opcode);
   print[c_col] = (DSPRINT *)malloc(sizeof(DSPRINT));
   switch(opcode)
   {
      case TOGGLE_LOG :
         p1 = (TOGGLE_LOG_REC *)(&(event_info[event_info_psn]));
         print[c_col]->logf = p1->toggle;

         if (p1->toggle == (char)1) load_ssval(SRMISC, c_col,"LOG",STRING,3);
         else load_ssval(SRMISC, c_col, "NOLOG", STRING, 5);

         event_info_psn += p1->length + 1;
         break;

      case PRT_CTL :
         p2 = (PRT_CTL_REC *)(&(event_info[event_info_psn]));
         print[c_col]->prwidth = (int)p2->width;
         print[c_col]->prtype  = (int)p2->control_code; /* -CHECK THIS OUT- */
         print[c_col]->prff    = p2->form_feed;
         load_ssval(SRMISC, c_col, "PRINT", STRING, 5);
         event_info_psn += p2->length + 1;
         break;

      default : rw_error = BAD_OPCODE; break;

   } /* End switch */
} /* End r_misc */

#include <\c\stdio.h>   /* Standard header          */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"

extern int   c_col;                  /* Current column of the SS          */
extern int   event_info_psn;           /* Current position in event_info    */
extern int   rw_error;                 /* Error flag                        */

int   r_speech (opcode)
/******************************************************************************
* This module reads all the data for a speech opcode(8X). It uses the        *
* structures(defined in rwdefs.h) as templates. To get the information out   *
* of the event_info[] array it makes px(x=1,2, etc) point to the current     *
* position in the array and then addresses the info by p1->xxxx, etc.        *
******************************************************************************/
int   opcode;
{
   SPEECH_CHIP_REC   *p1;
   char  *temp;
   int   cur_addr = 0;
```

```
int   i;
int   done     = FALSE;
int   ms_len;
int   ms_extra;
int   last_key;
int   last_data;
long  int   last_byte;
long  int   ftell();
unsigned int   addr;
extern   FILE  *lit_file, *lit_key_file;
char     ssval_lit[EVENTLEN+1];  /* Holding place for ssval entry */
int   found = FALSE;        /* Loop control                                  */
int   no_more_keys = FALSE;
int   cur_key;              /* Current literal key                           */
int wrecl;  /* record length for words */
struct                      /* Structure to hold a literal key               */
{
   char  lit_name[EVENTLEN];
   int   rec_num;
} lit_key;

c_col= getblcol(SRSOUND,opcode);

switch(opcode)
{
   case SPEECH_CHIP :
      words[c_col] = cmalloc(MAX_SPEECH_LEN);
      spaddr[c_col] = (unsigned int *) cmalloc(2* MAXWCOL);

      p1 = (SPEECH_CHIP_REC *)(&(event_info[event_info_psn]));
do    /* Cycle thru the addresses in the record until find a 00           */
{  addr = p1->word_addr[cur_addr];
   spaddr[c_col][cur_addr++] = addr;
   if (addr == 0)  /* Must be a valid address */
   {  done = TRUE;
      /* = 0   no more addresses  */
      /*-------------------------------------------------------------*/
      /* Load ssval[] with the symbolic name. This is a little        */
      /* tricky. We need to pass get_symbolic_name() the length of    */
      /* the record so that it can tell how long the name is(see      */
      /* that routine). The length is the first parameter below.      */
      /*-------------------------------------------------------------*/
      if (
        !get_symbolic_name(((cur_addr ) * sizeof(unsigned int)) + 1,
           opcode))
      {  printf("There was a bad or missing symbolic name for SPEECH co
lumn %d.\n", c_col);
         blnkdata(ORSOUND,c_col);
         }
      else
      {  strcpy(&ssval_lit, ssval[SPEECH_G - 1][c_col]);
         pad_right_blks(ssval_lit, EVENTLEN); /* Pad right for the comp
are */

         fseek(lit_key_file, 01, 2);
         last_byte = ftell(lit_key_file);
         last_key  = last_byte / LIT_KEY_LEN;
         if (last_key == 0) last_key = 1;  /* Skip over the header reco
rd */

         fseek(lit_file, 01, 2);
         last_byte = ftell(lit_file);
         last_data = last_byte / LIT_REC_LEN;

         if (last_key > 1)
         {  cur_key = 2;
            while (!no_more_keys && !found)
            {  read_rec(&lit_key, lit_key_file, cur_key, LIT_KEY_LEN);
 /* Get record  */
               if (str_compare(&(lit_key.lit_name), ssval_lit, EVENTLEN
))
                  found = TRUE;
```

```
                    else if (cur_key < last_key) ++cur_key;
                    else no_more_keys = TRUE;    /* Too far - key is not here
*/
                 } /* End while */
              } /* End if(there were some literals) */

              if (found)
              {
                 ms_len = MAX_SPEECH_LEN / LIT_REC_LEN;    /*  Calculate the
length     */
                 ms_extra = MAX_SPEECH_LEN % LIT_REC_LEN;
                 if (ms_extra != 0) ++ms_len;
                 temp = cmalloc(ms_len * LIT_REC_LEN);
                 read_rec(temp, lit_file, lit_key.rec_num,
                          ms_len * LIT_REC_LEN);
                 movmem(temp, words[c_col], MAX_SPEECH_LEN);
                 *(words[c_col] + MAX_SPEECH_LEN - 11) = '\0';
                 if (debug)
                 {
                    printf("The speech record read for col %d was |%s|\n",
                       c_col,words[c_col]);
                 } /* End if (debug to show the contents of the record) */

              free(temp);
              } /* End if (found) */
              else printf("Speech record not found for %s.\n",
                 ssval[SPEECH_G - 1][c_col]);
           } /* End else (wasn't a bad symbolic) */
        } /* End else */
     } /* End do loop */
     while (!done);
     break;

  case SPEECH_FILE :
     /* Just need to load the file name into ssval[] */
     if (!get_symbolic_name(sizeof(SPEECH_FILE_REC), opcode))
        printf("There was a bad or missibg symbolic name for speech column %
d\n", c_col);
     break;

  default :
     rw_error = BAD_OPCODE;
     break;

   } /* End switch */
} /* End r_speech */

#include <\c\stdio.h>        /* Standard header          */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */

extern int   c_col;                  /* Current column of the SS          */
extern int   f_col;
extern int   event_info_psn;           /* Current position in event_info    */
extern int   rw_error;                 /* Error flag                        */

int   r_still(opcode)
/*************************************************************************
* This module reads all the data for a still opcode(3X). It uses the     *
* structures(defined in rwdefs.h) as templates. To get the information out *
* of the event_info[] array it makes px(x=1,2, etc) point to the current    *
* position in the array and then addresses the info by p1->xxxx, etc.       *
*************************************************************************/
int   opcode;
{
```

```
SHOW_STILL_REC    *p1;
STILL_SERIES_REC  *p2;
int   decode_config();
char  *malloc(), *s;
char  string[SS_COL_STR_LEN + 1];
int   len;
int tvidof,ttrack;

c_col= f_col;

switch(opcode)
{
   case SHOW_STILL :
      p1 = (SHOW_STILL_REC *)(&(event_info[event_info_psn]));
      decode_config(p1->config, &playeros, &tvidof, &ttrack);
      playeros--;  /* convert player # to player offset *7
      still[playeros][c_col] = (DSSTILL *)malloc(sizeof(DSSTILL));
      still[playeros][c_col]->vidof= tvidof;
      still[playeros][c_col]->track= ttrack;
      still[playeros][c_col]->bframe = p1->frame;

      load_ssval(SRPLAY1+playeros, c_col, &(p1->frame), UNSIGNED, NIL);
      event_info_psn+= p1->length+1; /* increment pointer */
      /* Add the 'S' at the beginning of the ssval entry */
      stcprefc('S',ssval[SRPLAY1+playeros][c_col],0);
      break;


   case STILL_SERIES :
      p2 = (STILL_SERIES_REC *)(&(event_info[event_info_psn]));
      decode_config(p2->config, &playeros, &tvidof, &ttrack);
      playeros--;  /* convert player # to player offset */
      still[playeros][c_col] = (DSSTILL *)malloc(sizeof(DSSTILL));
      still[playeros][c_col]->vidof= tvidof;
      still[playeros][c_col]->track= ttrack;

      still[playeros][c_col]->bframe = p2->beg_frame;
      still[playeros][c_col]->eframe = p2->end_frame;
      still[playeros][c_col]->nskip  = (int)p2->increment;
      still[playeros][c_col]->time   = (int)p2->time;

      /* No symbolic name so get the frame number */
      load_ssval(SRPLAY1+playeros, c_col, &(p2->beg_frame), UNSIGNED, NIL);

      event_info_psn+= p2->length+1; /* increment pointer */

      if (debug) printf("The portfolio ssval = [%s].\n",
           ssval[SRPLAY1+playeros][c_col]);

      /* Add the 'P' at the beginning of the ssval entry */
      stcprefc('P',ssval[SRPLAY1+playeros][c_col],0);
      break;

   default :
      rw_error = BAD_OPCODE;
      break;

  } /* End switch */
} /* End r_still */

#include <\c\stdio.h>       /* Standard header         */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"
```

```
extern int   c_col;                   /* Current column of the SS          */
extern int   f_col;
extern int   event_info_psn;            /* Current position in event_info    */
extern int   rw_error;                  /* Error flag                        */
extern int ntchbr;

int   r_touch (opcode)
/*************************************************************************
* This module reads all the data for a touch opcode(6X). It uses the     *
* structures(defined in rwdefs.h) as templates. To get the information out *
* of the event_info[] array it makes px(x=1,2, etc) point to the current  *
* position in the array and then addresses the info by p1->xxxx, etc.     *
*************************************************************************/
int   opcode;
{
   DEF_TOUCH_REC   *p1;
   DEF_TOUCH_BR_TBL_REC *p2;

   DSTOUCH *t;
   int    cur_key_def = 0;      /* Index to current key def in record template  */
   int    done = FALSE;         /* Loop control                                 */
   int    key;                  /* Number of the key being defined              */
   int    tnum;
   int    length, eip;

   c_col= f_col;
   switch(opcode)
   { case DEF_TOUCH :
         p1 = (DEF_TOUCH_REC *)(&(event_info[event_info_psn]));

         do    /* Cycle through getting one key definintion at a time */
         { key = (int)p1->key_def[cur_key_def].key_num;
           if (key < SYS_TOUCH_KEY)  /* key must be a valid one   */
           {  tnum= ntchcol[c_col];
              ntchcol[c_col]++;  /* have another touch area */
              t = touch[tnum][c_col];
              if (t== NULLADDR) t = (DSTOUCH *)maketch(tnum,c_col);
              t->frow= p1->key_def[cur_key_def].first_row;
              t->fcol= p1->key_def[cur_key_def].first_col;
              t->lrow= p1->key_def[cur_key_def].last_row;
              t->lcol= p1->key_def[cur_key_def].last_col;
              t->counter= key;
              ++cur_key_def;
           } /* End if  */

           else                         /* key >= SYS_TOUCH_KEY means done   */
           {  /*------------------------------------------------------------*/
              /* Load ssval[] with the symbolic name. This is a little       */
              /* tricky. We need to pass get_symbolic_name() the length of   */
              /* the record so that it can tell how long the name is(see     */
              /* that routine). The length is the first parameter below.     */
              /*------------------------------------------------------------*/
              if (!get_symbolic_name((cur_key_def * sizeof(key_def_rec)) + 1,
                                   opcode))
                 bad_symbolic(TOUCH_G, c_col);
              done = TRUE;

           } /* End else */
         } /* End do loop */
         while (!done);
         break;

      case DEF_TOUCH_BR_TBL :
         eip= event_info_psn;
         length= event_info[eip++];
         do    /* Cycle through getting one key definintion at a time */
         {  key = event_info[eip++];
            if (key < SYS_TOUCH_KEY)     /* key is a valid one                */
            { if (touch[ntchbr][c_col]== NULLADDR) maketch(ntchbr,c_col);
              eip+= moveevent( touch[ntchbr][c_col]->branch,
                      &event_info[eip], 0);
```

```
            ++ntchbr;
         } /* End if */

         else                          /* key >= SYS_TOUCH_KEY means done   *
/
         {
            /*------------------------------------------------------------*/
            /* Load ssval[] with the symbolic name. This is a little      */
            /* tricky. We need to pass get_symbolic_name() the length of  */
            /* the record so that it can tell how long the name is(see    */
            /* that routine). The length is the first parameter below.    */
            /*------------------------------------------------------------*/
            event_info_psn += length + 1;
            done = TRUE;

         } /* End else */
      } /* End do loop */
      while (!done);
      break;


   case  CLR_TOUCH_TBL :
      load_ssval(SRTOUCH, c_col, "CLEAR", STRING, 5);
      event_info_psn += sizeof(CLR_TOUCH_TBL_REC);
      break;

   default :
      rw_error = BAD_OPCODE;
      break;

 } /* End switch */
 } /* End r_touch */

#include <\c\stdio.h>      /* Standard header         */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */

extern int   c_col;                /* Current column of the SS         */
extern int   f_col;
extern int   event_info_psn;        /* Current position in event_info    */
extern int   time;            /* Current time for column            */
extern int   rw_error;              /* Error flag                        */
extern char  calotime[NTLDCOL];

int   r_wait_or_no_op (opcode)
/******************************************************************************
* This module reads all the data for a system opcode(0X). It uses the        *
* structures(defined in rwdefs.h) as templates. To get the information out   *
* of the event_info[] array it makes px(x=1,2, etc) point to the current     *
* position in the array and then addresses the info by p1->xxxx, etc.        *
*****************************************************************************/
int   opcode;
{
   TIME_REC     *p1;
   char         *p2;
   int          i;
   int          len;
   int   wait_time;

   c_col= f_col;
   p1 = (TIME_REC *)(&(event_info[event_info_psn]));

   switch(opcode)
   {  case VIDEO_WAIT :  break;
```

```
      case WAIT :
      case NO_OP :
          /* subtract wait time */
        wait_time = p1->time+ wipetime; /* Get the time and add it */
        if (wait_time > 0) time += wait_time;     /* to the previos column   */
        else time = 0;       /* A zero means wait for ever - start time over  */
        if (debug) printf("wait_time time wipetime p1->time= %d %d %d %ld\n",
          wait_time, time, wipetime, p1->time);
        wipetime=0;
        load_ssval(TIME, c_col, &time, FLOAT, NIL);

        if (opcode== NO_OP)
        { if (p1->length == NTLDCOL)       /* Is this a calc time no-op? */
          { p2 = (char *)(&(p1->time));
            for (i = 0; i < NTLDCOL; ++i, ++p2) calctime[i] = *p2;
            } /* End if */
          }

         if (calctime[c_col])      /* Check to see if the time is calculated */
         { /* Now add the '*' to the time */
           len = strlen(ssval[TIME][c_col]); /* Find the last char   */
           for (i = len; i >= 1; --i)
             if (*(ssval[TIME][c_col] + (i - 1)) != ' ') break;
           if (i == len) i--;
           *(ssval[TIME][c_col] + i ) = '*';
           } /* End checking for a calculated time */

         /* Add an asterisk to the right end of the number in ssval[] */
         break;

      default :                        /* Else error */
         rw_error = BAD_OPCODE;
         break;

   }/* End switch */

   event_info_psn += (int)(p1->length) + 1;

} /* End r_wait_or_no_op */


/********************************* SPRIM.C ***********************************/
/*                                                                           */
/*                                                                           */
/*****************************************************************************/

#define EXTERN extern
#include "\c\stdio.h"
#include "std.i"
extern int debug;

/*****************************************************************************/
/**                                                                        **/
/**       MOVEMENT ROUTINES                                                **/
/**                                                                        **/
/*****************************************************************************/

/******************************* Definitions ********************************
*
*
* A string is a sequence of n non-null bytes terminated by a null.  The length*
* given by strlen(p) is n, where p is the string pointer.  The string actually*
* occupies n+1 bytes which leads to the concept of a field.  If f is a pointer*
* to a field of bytes, then *(f-1) (the value of the byte pointed to by f-1)  *
* is the space allocated for the field f (including the null if it is to be a *
* string) or the field length.  If the field length is to be checked in these *
* functions, a check flag cf is passed in with a non-zero value.  A function  *
* will exit with an error message rather than exceed the field length.        *
*                                                                             *
```

```
* Several functions are named using the Lattice string function convention,  *
* e.g. stzxxx, where z is s, c, or p.  If s is used, the function returns a  *
* status code.  If c is used, a count is returned; while if p is used, the   *
* function returns a string pointer.                                         *
*
                                          *
*****************************************************************************/

/****************************************************************************/
ctos (ch, s)     /*  Character TO String                                    *
  *   moves the character 'ch' to pointer 's' and adds termination character *
  *   to form a string.  The function is equivalent to chtost(s,ch).        *
  *   RETURNS:  nothing                                                      *
  *   GLOBALS:  none                                                         */
char ch;         /* character to be moved              */
char *s;         /* string to create from the character */
{ chtost (s,ch);
  }

/****************************************************************************/
chtost (s,ch)    /*  Character TO String                                    *
  *   moves the character 'ch' to pointer 's' and adds termination character *
  *   to form a string.
                *
  *   RETURNS:  nothing                                                      *
  *   GLOBALS:  none                                                         */
char ch;         /* character to be moved              */
char *s;         /* string to create from the character */
{ *s++= ch;
  *s='\0';
  }


/****************************************************************************/
fitost (to, from, len, f)             /*      convert a FIeld TO STring.
  *   If f is non-zero, the field length is checked versus len+1            *
  *   the aborting error message is "fitost.  field too long"               *
  *   transfers len bytes from source to destination and appends a null.    *
  *   RETURNS:  nothing                                                      *
  *   GLOBALS:  none                                                         */
char *to;                /* destination field pointer    */
char *from;              /* source pointer               */
int len;                 /* number of bytes to transfer  */
int f;                   /* field check flag             */
{ if ( f && *(to-1)<= len) error("fitost. field too long","");
  movmem(from,to,len);
  ficpadr(to,len);
  to[len]= '\0';
  }


/****************************************************************************/
sfisblnk (p,n)          /*  string or field is blank
  *  The function checks at most n characters starting with *p.  A non-space *
  *  character terminates the check.
              *
  *  RETURNS: 1 if the characters are all spaces (or null); else 0.         *
  *  GLOBALS:  none                                                         */
char *p;                          /*      pointer to string or field
*/
int n;                   /*   maximum number of characters to check      */
{ while (n--)
  { if (*p== '\0') return(1);
    if (*p!= ' ') return(0);
    p++;
    }
  return(1);  /* is all blanks */
  }
```

```
/*****************************************************************************/
isblank (p)               /*  string IS BLANK
                     *
  *  The function checks whether all characters of a string are spaces.     *
  *  RETURNS: 1 if true; 0 if false                                          *
  *  GLOBALS:  none                                                         */
char *p;                          /*      pointer to string        */
{ while(1) {
    if (*p=='\0') return(1);
    if (*p!=' ') return(0);
    p++;
    }
  }

/*****************************************************************************/
isdigitp(ch)                      /* IS DIGIT or decimal Point
  *  determines whether a character is a digit or a decimal point            *
  *  RETURNS: 1 if true; 0 if false                                          *
  *  GLOBALS:  none                                                         */
char ch;                                  /* the character                */
{ return(isdigit(ch) || ch=='.');
  }

/*****************************************************************************/
isint(s)                          /* IS INTeger string of digits
  *  determines whether a string consists strictly of digits                 *
  *  RETURNS: 1 if true; 0 if false                                          *
  *  GLOBALS:  none                                                         */
char *s;                          /* pointer to the string         */
{ while (*s)
  { if (isdigit(*s)) s++;
    else break;
    }
  return ( (*s) ? 0 : 1 );  /* return 0 if are at a character */
  }

/*****************************************************************************/
isy(ch)           /*  IS 'Y'
                         *
  *  determines whether a character is 'Y' or 'y'.
         *
  *  RETURNS:  1 if true; else 0.
                         *
  *  GLOBALS:  none                                                         */
char ch;                  /* the character                        */
{ return(ch== 'y' || ch== 'Y');
  }

/*****************************************************************************/
isyn(ch)                  /*  IS 'Y' or 'N'
                              *
  *  determines whether a character is 'Y', 'y', 'N', or 'n'
  *
  *  RETURNS:  1 if true; else 0.
                         *
  *  GLOBALS:  none                                                         */
char ch;                  /* the character                        */
{ return(ch== 'y' || ch== 'Y' || ch== 'n' || ch== 'N');
  }

/*****************************************************************************/
itos(num,s)               /*      converts an Integer TO a String
   *
  * an integer is converted to an ASCII string.  There is no length check, so*
  * the programmer must provide sufficient space.
                  *
  * RETURNS: nothing
                   *
  * GLOBALS: none
                                */
```

```
int num;                    /*  the number to be converted  */
char *s;                    /*  pointer to the string            */
{ sprintf(s,"%d",num);

  }


itosd (num, s)
int num;
char *s;
{
  sprintf(s,"%d.%d",num/10,num%10);

/*char *s2;
  int n,nm;

  s2=s;
  if (num<0)
  { num= -num;
    *s2++= '-';
    }
  *s2='\0';
  nm= num;
  n= nm/10000;  if (n || *s) *s2++= n+0x30;   nm-= n*10000;
  n= nm/ 1000;  if (n || *s) *s2++= n+0x30;   nm-= n* 1000;
  n= nm/  100;  if (n || *s) *s2++= n+0x30;   nm-= n*  100;
  n= nm/   10;               *s2++= n+0x30;   nm-= n*   10;
  *s2++= '.';
  *s2++= (nm % 10) + 0x30;
  *s2='\0'; */
  }

/*****************************************************************************/
fstndig (s)             /*  FirST Non-DIGit in string
                     *
  *  finds first non-digit in string and determines its offset from the head  *
  *  of the string.                                                           *
  *  RETURNS:  above offset if non-digit found; else -1                       *
  *  GLOBALS: none
                                     */
char *s;                /*  pointer to the string       */
{ int rc=0;
  while (*s && isdigit(*s) ) { rc++; s++; }
  if (!*s) rc=-1;  /* do not have a non-digit */
  return(rc);
  }

/*****************************************************************************/
ltos(num,s)             /*  converts Long integer TO a String
              *
  *  a long integer is converted to an ascii string.  There is no length check*
  *  the programmer must provide sufficient space                             *
  *  sprintf is called                                                        *
  *  RETURNS:  nothing
                           *
  *  GLOBALS: none
                                     */
long num;                   /*  the long integer            */
char *s;                    /*  pointer to the string       */
{ sprintf(s,"%ld",num);
  }

/*****************************************************************************/
sdtoi (s)               /*  converts a String (Decimal) TO an Integer
                        *
  *  the first substring representing a decimal real number is extracted from *
  *  s and converted to an integer                                             *
  *  the integer is the truncation of 10 X the real number                     *
  *  stcexnum, strlen and stoi are called.  see itosd                          *
  *  RETURNS:  the value of the integer                                        *
  *  GLOBALS: none                                                            */
```

```
char *s;                  /*  the string pointer          */
{ int i,l;
  int fdp;  /* found decimal point */
  char s2x[21],*s2; s2= s2x+1; *s2x= 19;

  stcexnum(s2,s,l);
    /* eliminate period if present */
  fdp=0;
  l= strlen(s2);
  for (i=0; i<l; i++) {
    if (s2[i]=='.') { fdp= 1; s2[i]= s2[i+1]; s2[i+1]='\0'; break; }
    }
  if (!fdp) { s2[l]= '0'; s2[l+1]= '\0'; }
  return( stoi(s2));
  }

/****************************************************************************/
stoi (s)                  /*  converts a String TO an Integer
                  *
  *  a numerical substring is extracted from s and converted to an integer    *
  *  initial non-numerical characters are discarded                          *
  *  greater than 79 characters in the substring produces an error           *
  *  stcexnum and sscanf are called                                          *
  *  RETURNS:  the (int) value of the substring                              *
  *  GLOBALS: none                                                           */
char *s;                  /*  the string pointer          */
{ int num;
  char *s2,s2x[81]; s2= s2x+1; *s2x=79;
  stcexnum(s2,s,l);
  if (*s2) sscanf(s2, "%d", &num);
  else num=0;
  return(num);
  }

/****************************************************************************/
long stol (s)             /*  converts a String TO an Long integer
                  *
  *  a numerical substring is extracted from s and converted to a long integer*
  *  initial non-numerical characters are discarded                          *
  *  greater than 79 characters in the substring produces an error           *
  *  stcexnum and sscanf are called                                          *
  *  RETURNS:  the (long) value                                              *
  *  GLOBALS: none                                                           */
char *s;                  /*  the string pointer          */
{ long num;
  char *s2,s2x[81]; s2= s2x+1; *s2x=79;
  stcexnum(s2,s,l);
  if (*s2) sscanf(s2, "%ld", &num);
  else num=0;
  return(num);
  }

/****************************************************************************/
stcblnk (p)               /*  STring (Count) BLaNK
  *  replaces characters of string with blanks                               *
  *  does not change length of string                                        *
  *  RETURNS:  the length of the string                                      *
  *  GLOBALS: none                                                           */
char *p;                  /*  the string pointer          */
{ int l;
  l=0;
  while (*p) { *p++=' '; l++; }
  return(l);
  }

/****************************************************************************/
stcblnkn (p,n,f)                  /*  STring (Count) BLaNK Number
  *  If f is non-zero, the field length is checked versus n                  *
  *  the aborting error message is "stcblnkn.  field too long"               *
  *  creates a terminated string of n blanks at p                            *
  *  calls setmem                                                            *
```

```
  *  RETURNS:  the length of the string created                             *
  *  GLOBALS: none                                                          */
char *p;        /*  the string pointer          */
int n;          /*  the desired length          */
int f;          /*  field control code          */
{ if (n<=0) return(0);
  if (f && *(p-1)<n) error("stcblnkn. field too long","");
  setmem(p,n,' ');
  *(p+n)= '\0';
  return(n);
  }

/****************************************************************************/
sfccat (to,from,n,f)            /*  String Field (Count) conCATenate
  *  If f is non-zero, the field length is checked versus n                 *
  *  the aborting error message is "sfccat.  field too long"                *
  *  concatenates all or none of 'from' string to 'to' string               *
  *  n is desired length of 'to' string after concatenation                 *
  *  string is padded on the right with blanks, if necessary                *
  *  strlen, setmem, stccpy and stcpadr are called                          *
  *  RETURNS:  1 or 0, whether or not 'from' bytes are concatenated to 'to' *
  *  GLOBALS: none                                                          */
char *to;       /*  the destination string pointer      */
char *from;     /*  the source string pointer   */
int n;          /*  the desired length          */
int f;          /*  field control code          */
{ int rc,l;
  if (f && *(to-1)<n) error("sfccat.  field too long","");

  l= strlen(to);
  n-= l;
  to+= l;
  if (n<=0) rc=0;
  { rc= (n>= strlen(from)); /* rc says whether can copy entire string */
    stccpy(to,from,n+1);  /* add 1 for terminating byte */
    stcpadr(to,n,0);
    }
  return(rc);
  }

/****************************************************************************/
sfxcpy (to,from,n,f)            /*  String FiXed length CoPY
  *  If f is non-zero, the field length is checked versus n                *
  *  the aborting error message is "sfxcpy.  field too long"                *
  *  copies up to n bytes plus the null of 'from' string to 'to' string     *
  *  string is padded on the right with blanks, if necessary                *
  *  stccpy and stcpadr are called                                          *
  *  RETURNS:  nothing                                                      *
  *  GLOBALS: none                                                          */
char *to;       /*  the destination string pointer      */
char *from;     /*  the source string pointer   */
int n;          /*  the desired length          */
int f;          /*  field control code          */
{ if (n>0)
  { if (f && *(to-1)<n) error("sfxcpy.  field too long","");
    stccpy(to, from, n+1);
    stcpadr(to, n, f);
    }
  }

/****************************************************************************/
stscmpbc (str1,str2)    /*  STring (Status) CoMPare, no Blanks, Case insens.
  *  A case insensitive comparison is made on the strings ignoring leading  *
  *  blanks.  The return code is the result of the comparison of the first two*
  *  bytes which were not identical.                                        *

  *  strcmp, stctrim and stxlower are called                                *
  *  RETURNS:  0 if str1 = str2; < 0 if str1 < str2; >0 if str1 > str2      *
  *  GLOBALS: none                                                          */
```

```
char *str1, *str2;      /*  the string pointers          */
{ int i;
  char bstr1[81], bstr2[81];
    /* trim off blanks */
  stctrim(bstr1,str1,0);
  stctrim(bstr2,str2,0);
    /* convert to lower case */
  stxlower(bstr1);
  stxlower(bstr2);
    /* do string comparison */
  return(strcmp(bstr1,bstr2));
  }

/****************************************************************************/
stscmpn (str1,str2,n)   /*  STring (Status) CoMPare, N characters
  *  A comparison is made on the first n characters of the two strings      *
  *  The return code is the result of the comparison of the first two bytes  *
  *  which were not identical.                                               *

  *  stccpy and strcmp are called                              *
  *  RETURNS:  0 if str1 = str2; < 0 if str1 < str2; > 0 if str1 > str2      *
  *  GLOBALS: none                                                          */
char *str1, *str2;      /*  the string pointers          */
int n;                  /*  length of comparison         */
{ char bstr1[81], bstr2[81];
  stccpy(bstr1,str1,n+1);
  stccpy(bstr2,str2,n+1);
  return(strcmp(bstr1,bstr2));
  }

/****************************************************************************/
stscmpnb (str1,str2)    /*  STring (Status) CoMPare, no Blanks
  *  A comparison is made on the strings ignoring leading blanks             *
  *  The return code is the result of the comparison of the first two bytes  *
  *  which were not identical.                                               *
  *  strcmp and stctrim are called                                           *
  *  RETURNS:  0 if str1 = str2; < 0 if str1 < str2; >0 if str1 > str2       *
  *  GLOBALS: none                                                          */
char *str1, *str2;      /*  the string pointers          */
{ char bstr1[81], bstr2[81];
  stctrim(bstr1,str1,0);
  stctrim(bstr2,str2,0);
  return(strcmp(bstr1,bstr2));
  }

/****************************************************************************/
stxdelch (s,n)   /*  STring DELete CHaracter
  *  the nth character of a string is deleted provide that n <= string length *
  *  there is no result otherwise                                             *
  *  strlen is called                                                         *
  *  RETURNS:  nothing                                                        *
  *  GLOBALS: none                                                           */
char *s;                /*  the string pointer           */
int n;                  /*  number of character to be deleted   */
{ int i;
  for (i=n; i<strlen(s); i++) *(s+i)= *(s+i+1);
  }

/****************************************************************************/
stxdelcf (s,n)   /*  STring DELete Character Filled
  *  the nth character of a string is deleted provide that n <= string length *
  *  the length is maintained by padding on the right with a space            *
  *  last character is blanked out even when nth character is not deleted     *
  *  strlen is called                                                         *
  *  RETURNS:  nothing                                                        *
  *  GLOBALS: none                                                           */
char *s;                /*  the string pointer           */
int n;                  /*  number of character to be deleted   */
{ int i,l;
  l= strlen(s)-1;
  for (i=n; i<l; i++) *(s+i)= *(s+i+1);
  if (l>=0) *(s+l)=' ';  /* pad right with space */
  }
```

```
/***************************************************************************/
stcexnum (s2,s,f)               /*  STring (Count) EXtract NUMber.
  *  a numerical substring of string 's' is extracted and placed in 's2'     *
  *  digits and decimal points are allowed in the substring but no sign      *
  *  initial invalid characters are discarded until a valid one is found     *
  *  subsequently, the extraction is terminated by an invalid character      *
  *  if code f is non-zero, a length check is performed:  max = *(s2-1)      *
                          *
  *  If the substring is too long, the function prints the values of the     *
  *  strings involved and exits with the message "error in stcexnum"         *
  *  isdigitp is called                                                      *
  *  RETURNS:  the number of characters placed in s2                         *
  *  GLOBALS:  none                                                         */
char *s;                        /*  the source string        - */
char *s2;                       /*  the destination string     */
int f;                  /*  field control code          */
{ char *p,*p2;
  int l;
  l=0;
  p= s;
  p2= s2;
  *s2='\0';
  while (*s) {
    if (isdigitp(*s)) {
      if (f && (l>=*(p2-1)))
      { printf(" s s2= |%s|%s|\n",p,p2);
        error("error in stcexnum","");
        }
      l++;
      *s2++= *s;
      }
    else if (*p2) break; /* have already extracted number */
    s++;
    }
  *s2='\0';
  return(l);
  }

/***************************************************************************/
stcfillr (p,c)          /*  STring (Count) FILL
  *  the blanks of a string are replaced by a fill character                 *
  *  RETURNS:  the number of blanks replaced                                 *
  *  GLOBALS:  none                                                         */
char *p;                        /*  the string pointer         */
char c;                         /*  the fill character         */
{ int l,i;
  char *p2;
  l= strlen(p);
  i=0;
  p2= p+ l- 1; /* points to last character */
  while (l--) {
    if (*p2 ==' ') { i++; *p2=c; }
    p2--;
    }
  return(i);
  }

/***************************************************************************/
stcfnbl (s)             /*  STring (Count) find First Non-BLank
  *  actually finds first blank in a string                                  *
  *  RETURNS:  -1 or the offset from the head of the string of the first blank*
  *  GLOBALS:  none                                                         */
char *s;                        /*  the string pointer         */
{ int n;
  n=0;
  while (*s)
  { if (*s==' ') return(n);
    s--;
    n++;
    }
  return(-1);
  }
```

```
/*****************************************************************************/
stcftok (s,tok,ntok)           /*  STring (Count) Find TOKens
  *  attempts to find ntok tokens in string s                                *
  *  token characters are placed in string tok                               *
  *  RETURNS:  -1 if < ntok tokens found or the offset of the last token     *
  *  GLOBALS:  none                                                          */
char *s;                       /*  the string pointer          */
char *tok;                     /*  the pointer to a token      */
int ntok;                      /*  number of tokens to find    */
{ char *p;
  int rc, pos, newtok;
  int ntokf;  /* # of tokens found */
  p= tok;
  newtok=1;
  rc=-1;
  ntokf=0;
  pos=0;

  while (1)
  { if (*s=='\0' || *s==' ')
    { if (!newtok) newtok=1;   /* are in a token, ending it */
      if (*s=='\0') break;     /* are done */
      if (ntokf== ntok) break;  /* found all of the tokens wanted */
      }
    else /* have a character in a token */
    { if (newtok)
      { ntokf++;
        newtok=0;
        if (ntok== ntokf) rc= pos;
        }
      if (tok!= NULLADDR) *tok++= *s;
      }
    s++;
    pos++;
    }
  if (tok!= NULLADDR) *tok= '\0';
  return(rc);
  }

/*****************************************************************************/
stxinsch (s,n,ch,cf)           /*  STring  INSert CHaracter
  *  If cf is non-zero, the field length is checked versus strlen(s)         *
  *  the aborting error message is "error in stxinsch"                       *
  *  a character is inserted in the string at offset n                       *
  *  the rightmost characters are shifted by one -- the null is overwritten  *
  *  RETURNS:  nothing                                                       *
  *  GLOBALS:  none                                                          */
char *s;                       /*  the string pointer          */
int n;                         /*  proposed offset of inserted character */
char ch;                       /*  character to be inserted    */
int cf;                        /* field check flag             */
{ int i;
  if (cf && *(s-1)== strlen(s)) error("error in stxinsch","");
  for (i=strlen(s); i>n; i--) *(s+i)= *(s+i-1);
  *(s+n)= ch;
  }

/*****************************************************************************/
stxinscf (s,n,ch,cf)           /*  STring  INSert CHaracter Field
  *  the check flag is not used                                              *
  *  if the last character of string s is a blank, ch is inserted at offset n *
  *  the rightmost characters are shifted by one up to the null              *
  *  the null is not overwritten                                             *
  *  RETURNS:  1 or 0; whether or not the character was inserted             *
  *  GLOBALS:  none                                                          */
char *s;                       /*  the string pointer          */
int n;                         /*  proposed offset of inserted character */
char ch;                       /*  character to be inserted    */
int cf;                        /* field check flag             */
```

```
{ int i,l;
  int rc;
  l= strlen(s)-1;
  if ( *(s+l)!= ' ') rc=0;
  else
  { for (i= l; i>n; i--) *(s+i)= *(s+i-1);
    *(s+n)= ch;
    rc=1;
    }
  if (debug) printf("stxinscf.  string rc= |%s| %d\n",s, rc);
  return(rc);
  }

/****************************************************************************/
stsisint (s, end)              /*  STring (Status) IS INTeger_
  *  simply calls stsisnum(s,1,99,0,0,.........,end)                        *
  *  RETURNS:  1 or 0; whether or not s contains a signed integer with no more*
  *            than 99 digits                                               *
  *  GLOBALS:  none
  **/
char *s;                   /*  string pointer              */
int *end;                  /*  *end will contain offset of end of integer  */
{ int nblnks, nsign, ndig, npt, ndec;
  return(stsisnum(s, 1, 99, 0, 0, &nblnks, &nsign, &ndig, &npt, &ndec, end));
  }

/****************************************************************************/
stsispin (s, end)              /*  STring (Status) IS P? INTeger
  *  simply calls stsisnum(s,0,99,0,0,.........,end)                        *
  *  RETURNS:  1 or 0; whether or not s contains an unsigned integer with no  *
  *            more than 99 digits                                          *
  *  GLOBALS:  none
  **/
char *s;                   /*  string pointer              */
int *end;                  /*  *end will contain offset of end of integer  */
{ int nblnks, nsign, ndig, npt, ndec;
  return(stsisnum(s, 0, 99, 0, 0, &nblnks, &nsign, &ndig, &npt, &ndec, end));
  }

/****************************************************************************/
stsisnum (s,     nsigna, ndiga, npta, ndeca,
          anblnks, ansign,  andig,  anpt,  andec, aend)
               /*  STring (Status) IS NUMber
  *  a number is extracted from a string and checked for validity           *
  *  control info passed in as arguments includes the number of digits,     *
  *  signs, decimal points and decimal places allowed
  *  pointers are passed in so the calling function can retrieve the number *
  *  of leading blanks, digits, decimal points, decimal places, and signs   *
  *  found; also the offset from the head of the string of the last character *
  *  of the numerical string
  *  RETURNS:  1 or 0; whether or not the number is valid under the above   *
  *            conditions
  *  GLOBALS:  none                                                        */
char *s;                   /*  pointer to the string               */
int ndiga;                 /* # of digits allowed                  */
int npta;                  /* # of decimal points allowed ( 0 or 1)*/
int ndeca;                 /* # of decimals places allowed         */
int nsigna;                /* # of signs allowed (0 or 1)          */
int *anblnks;              /* # of leading blanks                  */
int *andig;                /* # of digits                          */
int *anpt;                 /* # of decimal points found            */
int *andec;                /* # of decimal places found            */
int *ansign;               /* # of signs found                     */
int *aend;                 /* = nblnks + nsign + ndig + npts + ndec*/
{ char *p;
  int rc;   /* return code */
  int nblnks, ndig, npt, ndec, nsign, end;

  nblnks=0;
  ndig=0;
```

```
 npt=0;
 ndec=0;
 nsign=0;
 end=0;
 p= s;
 rc=1;
 while (*p && rc)
 {
   if (*p==' ')  /* have a blank */
   { if (end==nblnks) nblnks++;  /* have a leading blank */
     else break;
   else if (*p=='.') npt++;  /* have a decimal point */
   else if (*p=='-') { nsign++; if (end!=nblnks) rc=0; }
   else if (isdigit(*p)) { if (!npt) ndig++; else ndec++; }
   else break;
   p++;
   end++;
   }

   /* test if have number */
  if (rc)
  { rc= (end && nsign<= nsigna && ndig<= ndiga && npt<= npta && ndec<= ndeca );
    }

  *anblnks= nblnks;
  *andig=   ndig;
  *anpt=    npt;
  *andec=   ndec;
  *ansign=  nsign;
  *aend=    end;

  return(rc);
  }
/******************************************************************************/
stxlower (p)            /*  STring to LOWER case
  *  the characters of a string are converted to lower case                  *
  *  RETURNS:  nothing                                                        *
  *  GLOBALS:  none                                                           */
char *p;                /*  string pointer               */
{ while (*p)
  { *p= tolower(*p);
    p++;
    }
  }

/******************************************************************************/
stcpadr (p,n,f)         /*  STring (Count) PAD on the Right
  *  if f != 0, and n > *(p-1) the function exits with "error in stcpadr";   *
  *  else the function pads the string on the right with blanks to a total   *
  *  length of n characters                                                   *
  *  RETURNS:  the number of blanks added                                     *
  *  GLOBALS:  none                                                           */
char *p;                /*  string pointer               */
int n;                  /*  desired length of padded string     */
int f;                  /*  field check flag             */
{ char *p2;
  int l;
  if (f && *(p-1)<n) error("error in stcpadr","");
  l= strlen(p);
  p2= p+l;
  stcblnkn(p2,n-l,0);
  return(n-l);
  }

/******************************************************************************/

ficpadr (p,n)           /*  FIeld (Count) PAD on the Right
  *  the function replaces up to n nulls with blanks starting at p+n-1 and    *
  *  proceeding toward p                                                      *
  *  the function terminates upon encountering the first non-null            *
```

```
  * RETURNS:  nothing                                                         *
  * GLOBALS:  none                                                           */
char *p;               /*  string pointer            */
int n;                 /*  maximum count             */
{ int dopad=0;  /* says whether to pad or not */
  while (n--)
  { if (dopad || (dopad= (*p=='\0')) ) *p=' ';
    p++;
    }
  }

/*****************************************************************************/
stcprefc (c,s,f)       /*  STring (Count) PREFace Character
  *  if f != 0, and *(s-1) <= string length, the function exits with        *
  *  "error in stcprefc";                                                    *
  *  else the function shifts the characters of the string to the right and *
  *  places the character c in the first position
  *  the string length increases unless the last character was a blank      *
  *  RETURNS:  the length of the prefaced string                             *
  *  GLOBALS:  none                                                         */
char c;                /*  the character             */
char *s;               /*  string pointer            */
int f;                 /*  field check flag          */
{ int i,l;
  l= strlen(s);

  if (f && (*(s-1)<= l) ) error("error in stcprefc","");
  for (i=l; i>0; i--) s[i]=s[i-1];
  *s= c;

    /* determine place for terminating character */
  if (s[l]!=' ') l++;
  s[l]= '\0';

  return(l);
  }

/*****************************************************************************/
stcremc (s,c,f)        /*  STring (Count) REMove Character
  *  the first occurrence of c in string s is determined and c is deleted   *
  *  if f is non-zero, the string is padded on the right with a blank; else *
  *  the string length decreases                                             *
  *  RETURNS:  1 or 0; whether or not c was found (and removed)              *
  *  GLOBALS:  none                                                         */
char c;                /*  the character             */
char *s;               /*  string pointer            */
int f;                 /*  field check flag          */
{ char *p;
  int rc;
  p= stpchr(s,c);
  if (p== NULL) rc=0;
  else

  { do { *p= *(p+1); } while (*++p);  /* move characters left by one */
    if (f) *(p-1)= ' ';
    rc=1;
    }
  return(rc);

/*****************************************************************************/
stcsufc (c,s,f) /*  STring (Count) SUFfix Character
  *  if f != 0, and *(p-1) <= string length, the function exits with        *
  *  "error in stcsufc"; else                                                *
  *  the function attempts to replace the first blank or the null of a     *
  *  string with character c
  *  if necessary, a new terminator is created, in this case the function   *
  *  may exit with "error in stcsufc" if flag f is non-zero and *(p-1) <=   *
  *  the string length
  *  RETURNS:  nothing                                                       *
  *  GLOBALS:  none                                                         */
```

```
char c;              /*  the character              */
char *s;             /*  string pointer             */
int f;               /*  field check flag           */
{ char *p;
  p=s;
  while (*s && *s!=' ') s++;
    /* add character here.  if char is null, then make next one null */
  if (!*s)
  { if (f && *(p-1)<=strlen(s)) error("error in stcsufc","");
    *(s+1)='\0';
    }
  *s=c;
  }

/***************************************************************************/
stctrim(to,from,f)             /*  STring  (Count) TRIM  -
  *  string 'to' is created from string 'from' less its leading blanks        *
  *  if flag f is non-zero the function will not create a string with         *
  *  greater than *(to-1) characters: the function exits with "error in       *
  *  stctrim"; else trailing blanks are trimmed off with stctrimr             *
  *  GLOBALS:  none                                                          */
char *from;          /*  source string pointer          */
char to[];           /*  destination string pointer     */
int f;               /*  field check flag               */
{ int i;
  i=0;
  while (*from) {
    if (*from!=' ' || i)
    { if (f && i>= *(to-1)) error("error in stctrim","");
      to[i++]= *from;
      }
    from++;
    }
  to[i]='\0';
  stctrimr(to);
  return(strlen(to));
  }

/***************************************************************************/
stctrimr(p)          /*  STring  (Count) TRIM Right
  *  the trailing blanks of a string are trimmed off by shifting the null     *
  *  string length thus decreases                                             *
  *  RETURNS:  the number of blanks trimmed off                               *
  *  GLOBALS:  none                                                          */
char *p;             /*  string pointer             */
{ int l,n;
  l= strlen(p);
  n=0;
  p+= l;
  while (l--) {
    if (*(--p)==' ') *p='\0';
    else break;
    n++;
    }
  return(n);
  }

/***************************************************************************/
stxupper (p)         /*  STring to UPPER case
  *  the characters of a string are converted to upper case                   *
  *  RETURNS:  nothing                                                        *
  *  GLOBALS:  none                                                          */
char *p;             /*  string pointer             */
{ while (*p)
  { *p= toupper(*p);
    p++;
    }
  }
```

```
/*****************************************************************************/
sttofi(to,from,len)              /*  STring  TO FIeld
  *  the characters of string 'from' are transferred to field 'to' which is  *
  *  padded to length len with blanks if necessary                           *
  *  GLOBALS:  none                                                          */
char *from;             /*  source string pointer              */
char *to;               /*  destination field pointer          */
int len;                /*  minimum field length               */
{ int l;
  l= strlen(from);
  if (l> len) l= len;
  if (l>0) movmem(from,to,l);
  len-= l;
  if (l>0) setmem(to+l,len,' ');
  }

prfi (heading,s,len)  /* print field */
char *heading,*s;
int len;
{ int i;
  printf("%s= ",heading);
  for(i=0; i< len; i++) printf("%x.%c ",*(s+i),*(s+i) );
  printf("\n");
  }

/********************************** STD2.C ************************************/
/*                                                                            */
/*                                                                            */
/*****************************************************************************/

#include "\c\stdio.h"
#define EXTERN extern
#include "state.i"
#include "keys.i"
#include "userproc.i"

dispdata (col)
int col;
{ int i;
  DSTOUCH *t;
  DSLINE25 *l;
  DSSWITCH *s;
  DSPRINT *p;
  DSKEYBRD *k;
  DSLIT *lt;
  DSCALC *c;

  printf("\nDISPDATA.  col actcol tenths= %d %d %d \n",col,actcol,tenths[col]);

  prtvid(col,0);
  prtvid(col,1);
  printf("GRAPH ");
  if (graph[col]== NULLADDR) printf("NOT DEFINED ___\n");
  else {
    printf(" cmdtype=%d videotex=%d routnum=%d time=%d",
      graph[col]->cmdtype,graph[col]->videotex,graph[col]->routnum,
      graph[col]->time);
    printf(" palcolor=%xh bckcolor=%xh borcolor=%xh ___\n",
      graph[col]->palcolor,graph[col]->bckcolor,graph[col]->borcolor);
    printf(" frow=%d fcol=%d lrow=%d lcol=%xh trncolor=%xh mask=%xh ___\n",
      graph[col]->frow,graph[col]->fcol,graph[col]->lrow,graph[col]->lcol,
      graph[col]->trncolor,graph[col]->mask);
    }

  printf("LITERAL ");
  lt= lit[col];
  if (lt== NULLADDR) printf("NOT DEFINED ___\n");
  else {
    printf("recnum=%d row=%d col=%d fcolor=%xh lcolor=%xh ",
       lt->recnum,lt->row,lt->col,lt->fcolor,
       lt->lcolor);
```

```
  printf("literal=|%s| litlen=%d editcode=%d ___\n",
    lt->literal,lt->litlen,lt->editcode);
  }

printf("TOUCH ");
t= touch[0][col];
if (t== NULLADDR)
{ printf("NOT DEFINED ___\n");
  if (ntchcol[col]) printf(" BUT ntchcol[%d]= %d___^G\n",col,ntchcol[col]);
  }

else
{ i=0;
  printf("ntouchs= %d\n",ntchcol[col]);
  for (i=0; i< ntchcol[col]; i++)
  { t= touch[i][col];
    if (t== NULLADDR) break;
    printf(
      " # %d row=%d fcol=%d lrow=%d lcol=%d counter=%d acknowl=%d branch= "
      ,i,t->frow,t->fcol,t->lrow,t->lcol,t->counter,t->acknowl);
    pevent(t->branch);
    printf("___\n");
    if (t->acknowlp!=NULLADDR) printf("acknow= %d %d\n",
     *(t->acknowlp), *(t->acknowlp+1) );
    }
  }

printf("INDICATORS ");
s= switches[col];
if (s== NULLADDR) printf("NOT DEFINED ___\n");
else
{ printf(" mask swset swtest opcode op nhits posevent negevent= ");
  printf(" %x %x %x %d %c %d",
    s->mask,s->swset,s->swtest,s->opcode,s->op,s->nhits);
  pevent( s->posevent);
  pevent( s->negevent);
  printf("___\n");
  }

printf("WORDS ");
if (words[col]== NULLADDR) printf("NOT DEFINED ___\n");
else
{ printf("= |%s| spaddr= ",words[col]);
  for (i=0; spaddr[col][i]; i++) printf(" %x",spaddr[col][i]);
  printf(" ___\n");
  }


k= keybrd[col];
printf("KEYBOARD ");
if (k== NULLADDR) printf("NOT DEFINED ___\n");
else
{ printf(" recnum=%d row=%d col=%d attr=%d len=%d editcode=%d",
    k->recnum, k->row, k->col, k->attr, k->len, k->editcode);
  printf(" voice=%d echo=%d\n", k->voice, k->echo);
  printf("mphrase (%lx)= ",k->mphrase);
  for (i=0; i< MAX_MATCH_LEN; i++) printf(" %x",(int) k->mphrase[i]);
  printf("\n");

  for (i=0; i<=5; i++)
  { printf("branch # %d= ",i);
    pevent(k->branches[i].event);
    }

  printf("vname vrecnum mstring msrecnum device= |");
  for (i=0; i<8; i++) printf("%c",k->vname[i]);
  printf("| %d |",k->vrecnum);
  for (i=0; i<8; i++) printf("%c",k->mstring[i]);
  printf("| %d '%c'\n",k->msrecnum,k->device);
  }
```

```
  printf("CALCS ");
  c= calcs[col];
  if (c== NULLADDR) printf("NOT DEFINED ___\n");
  else
  { printf(" value1 value2 value3 ndec= |%s|%s|%s| %d ___\n",
      c->value1, c->value2, c->value3, c->ndec);
    printf("var1= "); pevent(c->var1);
    printf("\nvar2= "); pevent(c->var2);
    printf("\nvar3= "); pevent(c->var3);
    printf("\n");
    }

  printf("LINE25 ");
  l= line25[col];
  if (l== NULLADDR) printf("NOT DEFINED ___\n");
  else
  { printf(" pause replay nextevt rtrnevt help resume slowbk slowfwd detail");
    printf(" %c %c", l->pause, l->replay);
    pevent( l->nextevt);
    pevent( l->rtrnevt);
    printf(" %c %c %c %c %c", l->help, l->resume,l->slowbk,l->stop,l->slowfwd);
    pevent( l->detail);
    printf("___\n");
    }

  printf("MISC ");
  p= print[col];
  if (p== NULLADDR) printf("NOT DEFINED ___\n");
  else
  { printf(" prwidth prtype prff logf");
    printf(" .%d.  .%d.  .%d.  .%d.\n",
      p->prwidth, p->prtype, p->prff, p->logf);
    }

  pause("dispdata.e");
  }

prtvid (col,playos)
int col,playos;
{ DSVIDEO *v;
  DSSTILL *s;
  DSLOAD  *l;

  printf("VIDEO %d ",playos+1);
  if ((v=video[playos][col])== NULLADDR) printf("NOT DEFINED ___\n");
  else {
    printf(" bframe eframe segtype vidof track speed = ");
    printf(" .%u .%u .%d .%c .%c .%d ___\n",
      v->bframe,v->eframe,v->segtype,v->vidof,v->track, v->speed);
    }

  printf("STILL %d ",playos+1);

  if ((s=still[playos][col])== NULLADDR) printf("NOT DEFINED ___\n");
  else {
    printf(" bframe eframe vidof track nskip time= ");
    printf(" .%u .%u .%c .%c .%d .%d ___\n",
      s->bframe,s->eframe,s->vidof,s->track,s->nskip,s->time);
    }

  printf("LOAD %d ",playos+1);
  if ((l=load[playos][col])== NULLADDR) printf("NOT DEFINED ___\n");
  else {
    printf(" loadf prompt= .%d .%d ___\n", l->loadf, l->prompt);
    }
  }

extern FILE *openkey();
```

```
opkeys ()  /* output key file */
{ FILE *ptfile;
  int t;
  char keybuf[30];
  int ovdisc2;
  int filen;
  char dq[3];                      dq[0]= '"'; dq[1]= '\n'; dq[2]= '\0';

  if (debug) printf("vdisc1 vdisc2= %d %d ___\n",vdisc1,vdisc2);
  pause("opkeys.s");
  if (debug==2) return;

  if (vdisc2>0)
  { ovdisc2= vdisc2;
    closepl2();  /* close player 2 */
    if (close( vdisc2) == -1)
    { printf("\n error closing player 2. ^G^G\n");
      exit(0);
      }
    }
  else ovdisc2= -1;

  for (filen= 1; filen <=2; filen++)
  { if (filen==1) ptfile= fopenx(filenames[FNAME_KEY], "w");
    else
    { bldname(keybuf, "KY2");
      ptfile= fopenx(keybuf, "w");
      }
    if (ptfile==0)
    { printf("\n error opening key file. filen= %1 ^G^G\n",filen);
      exit(0);
      }

    for (t=1; t<=SRMISC; t++)
    { keybuf[0]='"';
      keybuf[1]= lithead[t][0];
      keybuf[2]= lithead[t][1];
      keybuf[3]= '\0';
      itos(litnum[t],keybuf+3);
      strcat(keybuf,dq);
       fputs(keybuf,ptfile);
       }
     if (fclosex(ptfile) ==-1) beep("ERROR CLOSING KEY FILE");
     }

   if (ovdisc2>0) vdisc2= ibfind("vdisc2");

   if (debug) printf(" ovdisc2 vdisc2= %d %d ___\n",ovdisc2,vdisc2);
   pause("opkeys.e");
   }


#define POS  50
#define MOS 150

chkevent (evn, to)
char *evn, *to;
/*  evn is an event name from COMPOSER */
/*  to is a field of length 10, having the following makeup:
     byte 0: symbol describing type of event
     bytes 1-8: name of event
     byte 9: if =0, means start at first column of event
              if =51-150 means jump forward 1-100 columns from here
            if =151-250 means jump backward from 1-100 columns from here
*/
{ int i,next;
  char name[BRANCHLEN+1];
  char evtn[BRANCHLEN+1];
  char temp[BRANCHLEN+1];
  char *p;
  int etype,rc,os,isvar;
  int l;
```

```
  stctrim(evtn,evn,0);

/* to put back intra-event branching, uncomment out the following lines */
/* also see cpyevtnm */
/*p= stpchr(evtn,'-');
  if (p!= NULLADDR) os= MOS;
  else
  { p= stpchr(evtn,'+');
    if (p!= NULLADDR) os=POS;
    }
  if (p!=NULLADDR) */ /* have a trailing # */
/*{ *p='\0';*//* terminate name of event */
/*  os+=stoi(p+1);
    }
  else */      os=0x20;
/* end of lines to uncomment out to put back in intra-event branching */

  if (*evtn== '=') return( chkeq(evtn,to));

  rc=0;
  etype='*';
  isvar=0;
  if ( getword(evtn, name, 0) >= 0)
  { if (strcmp(name,"LOOP")==0)                             { etype= '@'; rc=0; }
    if (strcmp(name,"SHOW")==0)                             { etype= '#'; rc=1; }
    if (strcmp(name,"END")==0  || strcmp(name,"CONT")==0 ||
     strcmp(name,"RETURN")==0 || strcmp(name,"PRINT")==0)   { etype= '/'; rc=1; }
    if (strcmp(name,"CALL")==0 )                            { etype= '&'; rc=1; }
    if (isvar= (*evtn== '$' || *evtn=='%') )               { etype= *evtn; rc=1; }
    if (etype== '*' || etype== '@')
    {
      if (etype== '*') next= 0;
      else next= stcftok(evtn, NULLADDR, 2);
      if (next>=0)
      { for (i=0; i<nevents && !rc; i++)
          if (strcmp(evtn+next,events[i])==0) rc=1;
      } }
    }

  if (to!= NULLADDR)
  { movmem(to, temp, EVENTLEN+2);
    *to= (isblank(evtn)) ? ' ' : etype;

    if (isvar)                              next=1;
    else if (etype== '*' || etype== '/') next=0;
    else next= stcftok(evtn, NULLADDR, 2);

    if (debug) printf("etype etype next= .%c. %xh %d \n",etype,etype,next);
    if (next<0) *(to+1)= '\0';
    else
    { l= strlen(evtn+next);
      if (l < EVENTLEN+2) sfxcpy(to+1,evtn+next,EVENTLEN-isvar,0);
      else  /* have a long event name */
      { *to |= 0x80;  /* turn on high order bit */
        strcpy(to+1,evtn+next);
        if (debug) printf("copied string *to= %xh \n",*to);
        }
      }

    if (isvar)
    { if (strncmp( to, temp, EVENTLEN)!=0) *(int*) (to+ EVENTLEN)= 0;
      }
    /* else *(to+ EVENTLEN+1)= os; */ /* put back for inter column branching */

    }
  if (debug) printf("chkevent.  next to evn= %d %lx %lx |%s|%s|\n",
    next,to,evn,to,evn);
  pause("chkevent");
  return(rc);
  }
```

```
cpyevtnm (to,from,n)
char *to, *from;
int n;
{ int fos;
  int os;
  char *p;
  char from2[BRANCHLEN+1];
  int isvar;
  int l, highon;

  movmem(from,from2,BRANCHLEN+1);  /* move max needed */

  highon= (*from2 & 0x80);  /* remember if high order bit is on */
  *from2 &= 0x7F;           /* turn high order bit off if on    */
  if (*from2 == '=') cpyevteq(to,from2,n);
  else
  {
  /* to put back intra-event branching, uncomment out the following lines */
  /* also see chkevent and see below */
  /*os= 0xff & *(from2+EVENTLEN+1); */
  /*if (os< POS) */
      os=0;            /* <======== */
  /* end of lines to uncomment out to put back in intra-event branching */

    *to= '\0';
    if (*from2!= '\0' && *from2!=' ')
    { fos=1;
      if (*from2== '=') { fos=0; highon; } /* treat as copying whole thing */
      if (*from2== '@') strcpy(to,"LOOP ");
      if (*from2== '#') strcpy(to,"SHOW ");
      if (*from2== '&') strcpy(to,"CALL ");
      if (isvar= (*from2== '%' || *from2== '$') )
      { fos=0;
        n= 8;
        os= 0;
        }
      if (highon) strcat(to, from2+fos);    /* load up previous values */
      else
      { from2[EVENTLEN+1]= '\0';
        sfccat( to, from2+fos, n, 0);
        }
  /* to put back intra-event branching, uncomment out the following lines */
  /* also see chkevent and see above                   */
  /*  if ( (*from2== '*' || *from2=='#') && os && os !=0x20)*//*have an offset *
/
  /*  { stctrimr(to);*//* trim off right blanks   */
  /*    if (os>=MOS) { strcat(to,"-"); os-=MOS; } */
  /*    else { strcat(to,"+"); os-= POS; }        */
  /*    p= to+ strlen(to);                        */
  /*    if (os> NTLDCOL-1) os= NTLDCOL-1;         */
  /*    itos(os,p);                               */
  /*    stcpadr(to,n,0);                          */
  /*    }                                         */
  /* end of lines to uncomment out to put back in intra-event branching */
      }
    else stcpadr(to,n,0);  /* pad to field as there is nothing to copy */
    }
  if (debug) printf("cpyevtnm. to from= |%s|%s|\n",to,from);
  }

chkeq (from,to)
char *from,*to;
{ *to++= '=' | 0x80;
  if      (stscmpnb(from+1,"BLANK"    )==0) { *to++= ' ';  *to='\0'; }
  else if (stscmpnb(from+1,"BACKSPACE")==0) { *to++= 0x08; *to='\0'; }
  else if (stscmpnb(from+1,"RETURN"   )==0) { *to++= 0x0d; *to='\0'; }
  else                                      strcpy(to,++from);
  if (debug) printf("chkeq to from= |%s|%s|\n",to,from);
  return(1);
  }
```

```
cpyevteq (to,from,n)
char *to, *from;
int n;
{
  *to++= '=';
  if (isblank(++from)) strcpy(to,"BLANK"    );
  else if (*from== 0x08) strcpy(to,"BACKSPACE");
  else if (*from== 0x0d) strcpy(to,"RETURN"   );
  else                   strcpy(to,from);
  if (debug) printf("cpyevteq to from from= |%s|%s|.%x.\n",to,from,*from);
  pause("cpyevteq");
  }

isevent (evn)
char *evn;
{ char *p;
  p= NULLADDR;
  return(chkevent(evn,p));
  }

haveevt (s)
char *s;
{ char buf[EVENTLEN+3];
  fitost( buf, s, EVENTLEN+2, 0);
  return( !isblank(buf));
  }

moveevent (d, s, fndrecfl)
char *s, *d;
int fndrecfl;
{ int i, *rn;
  char temp[EVENTLEN+1];
  int rc;

  if ( (*s & 0x80) || *s== '=')
  { strcpy(d,s);
    rc= strlen(s)+1;
    }
  else
  { rc= EVENTLEN+2;
    movmem( s, d, EVENTLEN+2);  /* move all 10 bytes */
    if (!stsisvar(d)) ficpadr(d, EVENTLEN+2);  /* if not variable, just pad */
    else  /* have a variable */
    { rn= (int *) (d+ EVENTLEN);
      if (fndrecfl && *rn==0)  /* don't have a record # and want to get one */
      { fitost( temp, d, EVENTLEN, 0);
        *rn= findvar( temp, 0);
        }
      }
    }

  return(rc);
  }

pevent (s)
char *s;
{ char buf[BRANCHLEN+1];
  if (stsisvar(s))
  { movmem(s, buf, EVENTLEN);
    buf[EVENTLEN]= '\0';
    printf(" |%s| %x %x",buf,s[EVENTLEN],s[EVENTLEN+1]);
    }
  else
  { if (*s & 0x80) printf(" |%s|",s);
    else
    { movmem(s, buf, EVENTLEN+1);
      buf[EVENTLEN+1]= '\0';
      printf(" |%s|",buf);
      }
    }
  }
```

```
/********************************* STDWIN.C ***********************************/
/*                                                                            */
/*                                                                            */
/******************************************************************************/

#include "\c\stdio.h"
#define EXTERN extern
#include "state.i"
#include "keys.i"
#include "userproc.i"
extern char next_event[], *stpchr();

static int doupdseg;

stdwin (action,windtype) /*  standard window handler */
int action,windtype;
{ FIELD *f;
  int ofield, orow;
  int ch, fs, retcode;
  int rc, i;

  if (debug)
    printf(
    "stdwin.1 video[0][0] &vid->eframe video[0][0]->eframe=%lx %lx %u ^G^G\n",
    video[0][0],&video[0][0]->eframe,video[0][0]->eframe);
  rc=0;
  switch (action) {
    case START:
      ofield= fldnum; /* remember original field */
      orow=   crow;   /* remember current row    */
      if (!loadwin(windtype)) { rc= RESUME; actwind= WNTIMEL; break; }
      dispwind( windtype);
      fs= 0;
      break;

    case RESUME:
      fs= savedfld[nwindows];
      break;
    }

  while (!rc) {
    retcode= entwind(windtype, fs);
    fs= fldnum;
    if (actwind== WNSET && retcode== FINT)
    { f= (windows+WNSET)->flds;
      if (*f->data== '$')

      continue;
      }
    if (retcode == QUIT  ||  (actwind == WNNEXT  &&  lch == ESC) )
    { /* if (actwind != WNNEXT)  */ /* do not blank data if aborted saving event
 */
      /* { stcblnk( ssval[ orow-(ORPLAY1-SRPLAY1) ][actcol] );
        blnkdata(orow,actcol);
        } */
      actwind= discwind(1);
      dspfld(ofield, actwind);
      rc=  RESUME;
      break;
      }
    if (actwind== WNNEXT) {
      if (lch== RETURN)
      { if (retcode== FINTDONE || retcode== DONE )
        { if (!savewind(windtype)) continue;
          rc= SAVE;
          }
        if (retcode== FINT)
        { if (!fs) { fs++; continue; }

        }
```

```
      if (rc) actwind= discwind(1);
      break;
      }

    if ( lch== ESC ||
         (lch== RETURN && (retcode== FINTDONE || retcode== DONE ) )
         )
    {    /* save information */
      if (!savewind(windtype)) continue;
      actwind= discwind(1);
      rc= RESUME;
      break;
      }
    }

  return(rc);
  }

static loadwin (windtype)
int windtype;
{ int rc;
  switch (windtype) {
    case WNVIDSEG :
    case WNVIDMAT : rc= ldvidseg(); break;
    case WNVIDSTI : rc= ldvidsti(1); break;
    case WNVIDPOR : rc= ldvidpor(1); break;
    case WNLOAD   : rc= ldload(1);   break;
    case WNPRINT  : rc= ldprint(1);  break;
    case WNNEXT   : rc= ldnext(1);   break;
    case WNCALCS  : rc= ldcalcs(1);  break;
    case WNSET    : rc= ldset(1);    break;
    case WNCOMP   : rc= 1;           break;
    default       : rc= 0;
    }
  return(rc);
  }

static savewind (windtype)
int windtype;
{ int rc;
  switch (windtype) {
    case WNVIDSEG :
    case WNVIDMAT : rc= svvidseg(); break;
    case WNVIDSTI : rc= ldvidsti(0); break;
    case WNVIDPOR : rc= ldvidpor(0); break;
    case WNLOAD   : rc= ldload(0);   break;
    case WNPRINT  : rc= ldprint(0);  break;
    case WNNEXT   : rc= ldnext(0);   break;
    case WNCALCS  : rc= ldcalcs(0);  break;
    case WNSET    : rc= ldset(0);    break;
    case WNCOMP   : rc= 1;           break;
    default       : rc= 0;
    }

  return(rc);
  }

frametyp (playos, col)
int playos, col;
{ int type, prevcol;
  DSVIDEO *dv;
  if (stpchr(ssval[SRPLAY1+playos][col],BEGSEG)!=NULLADDR) type=1;
  else if (stpchr(ssval[SRPLAY1+playos][col],ENDSEG)!=NULLADDR) type=3;
  else
  {
      /* not specified and not previously defined */
    if (video[playos][actcol]== NULLADDR)
    { for (prevcol= col-1; prevcol>=0; prevcol--) /* scan backwards */
      { if (video[playos][prevcol]!= NULLADDR) break;
        }
```

```
      type=1;  /* if don't find one, this will be a beginning segment */
      if (prevcol>=0)
      { dv= video[playos][prevcol];
        if (dv!= NULLADDR && dv->segtype!=3) type=3;/*make this an ending seg*/
      } }
    else type=2; /* this is a type 2 */
    }
  return(type);
  }

minfrdif (playos,col)
int playos,col;
{ int minframe;
  int minwipe;
  wipeerr=0;
  if (col<0) return(0);
  minframe= (int) ( (3.0 * vidspeed(video[playos][col]->speed) ) +.49) ;
  if (graph[col]!= NULLADDR && graph[col]->routnum!=0 )
  { minwipe=
      (int) ((graph[col]->time*3.0* vidspeed(video[playos][col]->speed))+.49) ;
    if (minframe< minwipe) minframe= minwipe;
    if (debug) printf("resetting minframe due to wiptetime. minframe= %d\n",
      minframe);
    wipeerr=1;
    }
  return(minframe);
  }
float vidspeed (code)
int code;
{ float d;
  int sp;
  sp= code;
  if (sp ==0) d= 1.00;
  else if (sp == 0x82) d= 2.00;
  else if (sp == 0x83) d= 3.00;
  else d= (float)sp/100.0;
  return(d);
  }

float framep10 (code)
int code;
{ float d;
  d= (float) 3.0 * vidspeed(code);
  return(d);
  }

static ldvidseg ()  /* load video segment */
{ int i,time,type,usedef;
  unsigned int framenum;
  long lfn,mindif;
  int prevcol;
  char buf[81];
  DSVIDEO *dv;   FIELD *f;

  if (debug)
    printf(
    "stdwin.A video[0][0] &vid->eframe video[0][0]->eframe=%lx %lx %u ^G^G\n",
    video[0][0],&video[0][0]->eframe,video[0][0]->eframe);
  framenum= (unsigned int) stol(ssval[SRPLAY1+playeros][actcol]);
  for (prevcol= actcol-1; prevcol>=0; prevcol--) {  /* scan backwards */
    if (video[playeros][prevcol]!= NULLADDR) break;
    }

    /* see if have specified what type this is */
  type=frametyp(playeros,actcol);

  if (usedef= (video[playeros][actcol]== NULLADDR))
  { video[playeros][actcol] = mallvid(playeros,actcol);
    video[playeros][actcol]->segtype= 0;
    }
```

```
if (type!=1 && prevcol>=0)
{ lfn= stol(ssval[SRPLAY1+playeros][prevcol])- framenum;
  if (lfn<0) lfn=-lfn;
  mindif= minfrdif(playeros,prevcol);
  if (lfn< mindif)
  { if (wipeerr) sprintf(buf,
      "Columns must be at least %d frames apart due to wipe time",
      mindif);
    else sprintf(buf,"Columns must be at least %d frames apart",mindif);
    beep(buf);
    }
  }
dv= video[playeros][actcol];
  /* if have a type already, and have changed type */
doupdseg=  (dv->segtype!=0 && dv->segtype!= type) ? 1 : 0 ;

dv->segtype= type;
switch (type) {
  case 1:
    if (debug) printf("ldvidseg.1  dv->eframe= %u ^G^G\n",dv->eframe);
    dv->bframe= framenum;

      /* calculate time difference */
    if (stpchr(ssval[SRPLAY1+playeros][actcol],BEGSEG)==NULL)
    { stcprefc(BEGSEG,ssval[SRPLAY1+playeros][actcol],0);
      dspfld( (actcol-ctlcol)+ NTLCOL+ playeros*NTLCOL,WNTIMEL);
      }
    break;
  case 2: /* middle segment */
    dv->bframe= framenum;
    if (prevcol>=0) dv->eframe= video[playeros][prevcol]->eframe;

    /* intentional fall-through */
  case 3: /* ending segment */
    if (prevcol>=0) dv->speed=video[playeros][prevcol]->speed;

    if (type==3) {  /* do only for ending segments */
      dv->eframe= framenum;
      if (stpchr(ssval[SRPLAY1+playeros][actcol],ENDSEG)==NULLADDR)
      { stcsufc(ENDSEG,ssval[SRPLAY1+playeros][actcol],0);
        dspfld( (actcol-ctlcol) + NTLCOL + playeros*NTLCOL,WNTIMEL);
        }
      savedfld[nwindows]=lfield;    /* so RESUME will work */
      cpyvideo(-1,actcol,0,framenum,playeros);
      }

    if (prevcol>=0)
    {  /* calc diff between columns */
      time= ((long)framenum- (long)stol(ssval[SRPLAY1+playeros][prevcol]))
              /framep10(dv->speed)+.5;
      if (debug)
        printf(" time framenum playeros stol[SRPLAY...]= %d %u %d %ld\n",
        time, framenum, playeros, stol(ssval[SRPLAY1+playeros][prevcol]));

      if (time<0) time= -time;
      time+= tenths[prevcol];  /* calc actual time */
      time-= tenths[actcol];   /* calc difference  */

        /* increment time only if not time 0.0 */
      if (type==3 || tenths[actcol]) inctime(actcol,time,1,(type==2));
      }

    break;
  }  /* end of switch */

if (type==1 || type==2 )
{ f= (windows+ actwind)->flds;
```

```
if (usedef)
{ f++;
  if (type==1) f++;
  ctos( 0x31 + playeros, f->data);
  }
else
{ ctos(dv->track,f++->data);
  if (type==1)
  { if (dv->speed==0) strcpy(f->data,"100");
    else if (dv->speed== 0x82 ) strcpy(f->data,"200");
    else if (dv->speed== 0x83 ) strcpy(f->data,"300");
    else i3tos((int) 0xFF & (int) dv->speed,f->data);
    f++;
    }
  ctos(dv->vidof,f->data);
  }
 }
if (type==3 && doupdseg) updsegs(playeros);
return(type!=3);
}

static svvidseg ()   /* save video segment */
{ DSVIDEO *dv;   FIELD *f;
  int sp;
  dv= video[playeros][actcol];
  if (debug) printf("svvidseg.1  dv->eframe doupdseg= %u %d ^G^G\n",
    dv->eframe,doupdseg);
  f= (windows+ actwind)->flds;

  dv->track= *(f++->data);
  if (dv->segtype==1)
  { sp= stoi(f++->data);
    if (sp ==100) dv->speed=0;
    else if (sp == 200) dv->speed= 0x82;
    else if (sp == 300) dv->speed= 0x83;
    else dv->speed= sp;

    dv->vidof= *(f->data);
    if (doupdseg) updsegs(playeros);
    else cpyvideo(actcol,-1,dv->bframe,0,playeros);
    chkseg(playeros,actcol,1);
    }
  else dv->vidof= *(f->data);
  if (dv->segtype!=1 && doupdseg) updsegs(playeros);

  dspfld( (actcol-ctlcol) + NTLCOL, WNTIMEL);
  return(1);
  }

static cpyvideo (f,t,bf,ef,playos)
int f,t,bf,ef,playos;
{ DSVIDEO *dvf,*dvt;
  int i,from,to,newf;

  if (debug) printf("cpyvideo.s  f t bf ef playos= %d %d %d %d %d^G \n",
    f,t,bf,ef,playos);

  from=f;
  if (f<0) {  /* scan left 'till find beginning */
    for (i= t-1; i>=0; i--)
      if (video[playos][i]!=NULLADDR && video[playos][i]->segtype==1)
      { from=i; break; }
    }
  if (from<0) return; /* didn't find a beginning segment */

  dvf= video[playos][from];
  if (bf) dvf->bframe= bf;
  if (ef) dvf->eframe= ef;
```

```
  to=.t;
  if (t<0) {  /* scan right 'till find ending */
    for (i= f+1; i< NTLDCOL; i++)
    { if (isblank(ssval[SRTIME][i])) continue;
      if ( video[playos][i]!=NULLADDR) {
        if ( video[playos][i]->segtype==3) { to=i; break; }
        if ( video[playos][i]->segtype==1) { to=i-1; break; }
        }
      else break;
      }
    if (to<0) to= i-1;
    }

  for (i= from+1; i<=to; i++)
  { if (isblank(ssval[SRTIME][i])) continue;
    if ( newf= (video[playos][i]== NULLADDR) )  {
      video[playos][i]= mallvid(playos,i);
      video[playos][i]->segtype=2;
      }
    dvt= video[playos][i];
    if (dvt->segtype!=2) dvt->bframe= dvf->bframe;
    dvt->eframe= dvf->eframe;
    dvt->speed = dvf->speed;
    if (debug)
      printf("newf dvt->segtype dvt->eframe dvf->eframe= %d %d %u %u\n",
      newf, dvt->segtype, dvt->eframe, dvf->eframe);
    pause("cpyvideo");
    if (newf || dvt->segtype==3)
    { dvt->vidof = dvf->vidof;
      dvt->track = dvf->track;
      }
    }
  }

static ldvidsti (lf)
int lf;
{ DSSTILL *ds;
  FIELD *f;
  int usedef;

  ds= still[playeros][actcol];
  f= (windows+ WNVIDSTI)->flds;
  usedef= (ds==NULLADDR);
  if (usedef) {
    still[playeros][actcol] = mallsti(playeros,actcol);
    ds= still[playeros][actcol];
    ds->vidof= 0x31+ playeros;
    }

  if (lf) {
    ds->bframe= stol(ssval[SRPLAY1+playeros][actcol]);
    ds->eframe= 0;
    if (nplayers==1) return(0); /* can only have one player */
    if (usedef) ctos( 0x31 + playeros, f->data);
    else ctos(ds->vidof,f->data);
    }
  else ds->vidof= *(f->data);    /* saving video still */
  return(1);
  }

static ldvidpor (lf)
int lf;
{ DSSTILL *ds;
  FIELD *f;
  int usedef;
  ds= still[playeros][actcol];
  f= (windows+ WNVIDPOR)->flds;
  usedef= (ds==NULLADDR);
  if (usedef) {
```

```
    still[playeros][actcol] = mallsti(playeros,actcol);
    ds= still[playeros][actcol];
    ds->vidof= 0x31+ playeros;
    }


  if (lf) {
    ds->bframe= stol(ssval[SRPLAY1+playeros][actcol]);
    if (usedef) setdef( WNVIDPOR);
    else {
      itos(ds->eframe,f++->data);
      itos(ds->nskip, f++->data);      itos(ds->time,   f++->data);
      }
    }
  else {  /* saving video still */
    ds->eframe= stol(f++->data);
    ds->nskip=  stoi(f++->data);        ds->time=   stoi(f++->data);
    }
  return(1);
  }

static ldload (lf)
int lf;
{ FIELD *f;

   f= (windows+ WNLOAD)->flds;
   if (lf) {   /* load up previous values */
     if (load[playeros][actcol]== NULLADDR) {
       load[playeros][actcol]= mallload(playeros,actcol);
       setdef(WNLOAD);
       }
     else {
       if (load[playeros][actcol]->prompt) strcpy(f->data, "Y");
       else strcpy(f->data, "N");
       }
     }
   else {  /* saving printer information */
     load[playeros][actcol]->loadf=1;
     load[playeros][actcol]->prompt= (*(f->data)=='Y') ? 1 : 0;
     }
   return(1);
   }

 static ldprint (lf)
 int lf;
 { FIELD *f;

   f= (windows+ WNPRINT)->flds;
   if (lf) {   /* load up previous values */
     if (print[actcol]== NULLADDR) {
       print[actcol]=(DSPRINT*) cmalloc(sizeof(print));
       setdef(WNPRINT);
       }
     else {
       i3tos(print[actcol]->prwidth,f->data);  f++;
       i2tos(print[actcol]->prtype, f->data);  f++;
       ctos(print[actcol]->prff,f->data);
       }
     }
   else {  /* saving printer information */
     print[actcol]->prwidth= stoi(f->data); ++f;
     print[actcol]->prtype = stoi(f->data); ++f;
     print[actcol]->prff= *(f->data);
     }
   return(1);
   }
```

```
static ldnext (lf)
int lf;
{ FIELD *f;
  int i,j,time,nt;
  static int colnext;
  f= (windows+ WNNEXT)->flds;
  if (lf)
  { cpyevtnm(f->data,next_event,f->length);
    f++;

    colnext= lcolumn();
    if (colnext==-1 ) time=0;   /* screen is blank */
    else time= tenths[colnext];
    itosd(time,f->data);

      /* position screen to show where next time comes from */
/*    settl(0,ctlcol);
      dspwnd(WNTIMEL);
*/
    }
  else {
    if (isblank(f->data)) beep("You did not          /* saving information      */
    else if (!chkevent(f->data,next_event) )    enter an event name.");
      beep("What you entered is not an event name.^G^G^G");
      /* next_time is difference between last column and this one */
    next_time = (colnext>0) ? tenths[colnext-1] : 0;
    ++f;
    nt= sdtoi(f->data);
    if (nt) next_time= nt- next_time;
    else next_time= 0;
    }
  return(1);
  }

DSCALC *alloccalc (col)
int col;
{ DSCALC *c;
  if (calcs[col]== NULLADDR)
  { c= (DSCALC *) cmalloc( sizeof(DSCALC), "stdwinl");
    calcs[col] = c;
    *c->value1= '\0';
    *c->value2= '\0';
    *c->value3= '\0';
    setmem(c->var1,10,'\0');
    setmem(c->var2,10,'\0');
    setmem(c->var3,10,'\0');
    c->ndec= 0;
    }
  return(calcs[col]);
  }

static ldcalcs (lf)
int lf;
{ FIELD *f;
  DSCALC *c;
  f= (windows+ WNCALCS)->flds;
  c= alloccalc(actcol);
  if (lf)
  { strcpy(f->data,c->value1);
    stcpadr(f->data,f->length,0);
    f++;
    strcpy(f->data,c->value2);
    stcpadr(f->data,f->length,0);
    f++;
    strcpy(f->data,c->value3);
    stcpadr(f->data,f->length,0);
    f++;
    sprintf(f->data,"%d",c->ndec);
    }
  else                                          /* saving information      */
```

```
    { strcpy(c->value1,f->data);
      stctrimr(f->length);
      f++;
      strcpy(c->value2,f->data);
      stctrimr(f->length);
      f++;
      strcpy(c->value3,f->data);
      stctrimr(f->length);
      f++;
      sscanf(f->data,"%d",&c->ndec);
      }
   return(1);
   }

static ldset (lf)
int lf;
{ FIELD *f;
  DSCALC *c;
  WINDOW *w;
  w= windows+ WNSET;
  f= w->flds;

  c= alloccalc(actcol);
  if (lf)
  {
    strcpy(f->data,c->value1);
    if (strlen(c->value1) > f->length)
      printf("ERROR 1 ldset. strlen(c->value1) =%d. f->length= %d^G^G\n",
        strlen(c->value1), f->length);
    f++;
    if (strlen(c->value2)+1> f->length) printf("ERROR 2 ldset^G^G\n");
    strcpy(f->data,c->value2);
    f++;
    sprintf(f->data,"%d",c->ndec);
    }
  else
  { strcpy(c->value1,f->data); f++;              /* saving information      */
    strcpy(c->value2,f->data); f++;
    sscanf(f->data,"%d",&c->ndec);
    }
  return(1);
  }

i1tos (num,s) int num; char *s;
{ *s++= (num % 10) + 0x30;
  *s='\0';
  }

i2tos (num,s) int num; char *s;
{ int n;
  n= (num/10) % 10;
  if (n) *s++= n+0x30;
  else *s++=' ';
  *s++= (num % 10) + 0x30;
  *s='\0';
  }

i3tos (num,s)
int num;
char *s;
{ int n;
  char *p;
  p=s;
  n= (num/100) % 10;
  if (n) *s= n+0x30;
  else *s=' ';
  s++;
  n= (num/10) % 10;
  if (n || *p!=' ') *s= n+0x30;
  else *s=' ';
```

```
  s++;
  *s= (num % 10) + 0x30;
  s++;
  *s='\0';
  }

insert (col)
int col;
{ int time;
  if ( (time= newtime(col)) <0) {
    beep("You do not have enough time to insert a column here.");
    return(0);
    }
  else {
    if (!col && time) inctime(col,time,0,0);
    if (!col) time=0;  /* set first time to 0 */
    movecol(NTLDCOL-1, col, col,time);
    insvid(col,0);
    insvid(col,1);
    return(1);
    }
  }

insvid (col,playos)
int col,playos;
{ long seg;
  if (col>0 && (video[playos][col-1]!=NULLADDR) &&
      video[playos][col-1]->segtype!=3)
  { cpyvideo(col-1,col,0,0,playos);
    seg= stol(ssval[SRPLAY1+playos][col-1])+stol(ssval[SRPLAY1+playos][col+1]);
    seg/= 2L;
    ltos(seg,ssval[SRPLAY1+playos][col]);

    video[playos][col]->bframe= seg;  /* put frame # into database */
    dspfld(NTLCOL+col,WNTIMEL);
    }
  }

lcolumn ()
{ int i,j,colnext;
    /* find time for next event */
  colnext=-1;
  for (j=NTLDCOL-2; j>=0 && colnext==-1; j--)
  { for (i= SRPLAY1; i<=SRMISC; i++)
    { if (!isblank(ssval[i][j]) )
      { colnext=j+1;
        break;
      } }
    }
  return(colnext);
  }


/*************************************************************************
   inctime(n/col,n/amt,n/dispf,n/segf)  INCrement TIME / increment time line
   increment timeline from col out to right.  Stop when hit a column with an *

 *************************************************************************/
inctime (col,amt,dispf,segf)
int col;  /* column to start incrementing the time for */
int amt;  /* the amount of time to increment */
int dispf; /* =0 if are not to display field, else, display updated fields */
int segf;  /* =0 if are to continue updating time.  =1 are to update only
                  this column */
{ int t,i,r,c,t1,t2;

  int coltype;  /* column type.  0=not segment, 1= beg, 2=match, 3=end */
  char *p;
  FIELD *pf;  WINDOW *pw;
```

```
if (debug) printf("inctime.  col amt dispf segf= %d %d %d %d\n",
  col, amt, dispf, segf);
pause("INCTIME");
if (amt==0) return;
r= crow;
c= ccol;

  /* set coltype */
if (video[playeros][col]==NULL) coltype=0;
else coltype= video[playeros][col]->segtype;

  /* update times */
for (i=col;     i<NTLDCOL; i++)
{ if (isblank(ssval[SRTIME][i]) ) continue;
  if ( i!=col &&    /* after 1st column */
       ( segf || stpchr(ssval[SRTIME][i],'*') != NULL || tenths[i]==0 )
       ) break;

  t= tenths[i];
  t+= amt;
  itosd(t,ssval[SRTIME][i]);
  tenths[i]=t;
  }

if (dispf) {
  pw= windows + WNTIMEL;
  pf= pw->flds;
  for (i=ctlcol; i< col; i++) pf++;  /* skip first columns */
  for (i=col; i< ctlcol+ NTLCOL; i++)  {
    cursor(pf->row,pf->col);
    wrtstrn(pf->data,pw->dispatt,ENTRYLEN);
    pf++;
    }
    cursor(r,c);
    }

  }

delete (col)
int col;
{ int time;
  time= tenths[NTLDCOL-1]+1;
  movecol(col,NTLDCOL-1, NTLDCOL-1,time);
  }

static newtime (col)
int col;
{ int t,t1,t2;
    /* always can add.  see how much to increment timeline */
  if (col==0) t= (tenths[col]) ? 0 : 1;
  else {
    t1= tenths[col-1];
    t2= tenths[col];
    if (t2== 0) t=0;
    else
    { t= (t1+ t2)/2;
      if (t1== t || t== t2) t= -1;  /* not enough time */
      if (col== NTLDCOL-1) t=-1;    /* are at last column */
      }
    }
  return(t);
  }

static movecol (fst, lst, blankcol, time)
int fst, lst, blankcol,time;
{ int inc,i,j,i1;
  inc= (fst<lst) ? 1 : -1;
  for (i= fst; i!= lst; i+=inc) {
    i1= i+inc;
    for (j= 0; j< NTLROW; j++) strcpy(ssval[j][i],ssval[j][i1]);
```

```
   video[0][i]= video[0][i1];
   still[0][i]= still[0][i1];
   load[0][i]= load[0][i1];
   video[1][i]= video[1][i1];
   still[1][i]= still[1][i1];
   load[1][i]= load[1][i1];
   graph[i]= graph[i1];
   lit[i]=   lit[i1];
   for (j=0; j< NTOUCH; j++) touch[j][i]= touch[j][i1];
   ntchcol[i]= ntchcol[i1];
   line25[i]= line25[i1];
   words[i]= words[i1];
   spaddr[i]= spaddr[i1];
   keybrd[i]= keybrd[i1];
   switches[i]= switches[i1];
   print[i]= print[i1];
   tenths[i]= tenths[i1];
   }
 for (j= 1; j<NTLROW; j++) stcblnk(ssval[j][blankcol]);
   /* do not release memory, as it is being used */
   video[0][blankcol]= NULLADDR;
   still[0][blankcol]= NULLADDR;
   load[0][blankcol]=  NULLADDR;
   video[1][blankcol]= NULLADDR;
   still[1][blankcol]= NULLADDR;
   load[1][blankcol]=  NULLADDR;
   graph[blankcol]=    NULLADDR;
   lit[blankcol]=      NULLADDR;
   for (j=0; j< NTOUCH; j++) touch[j][blankcol]= NULLADDR;
   ntchcol[blankcol]=  0;
   line25[blankcol]=   NULLADDR;
   words[blankcol]=    NULLADDR;
   spaddr[blankcol]=   NULLADDR;
   keybrd[blankcol]=   NULLADDR;
   switches[blankcol]= NULLADDR;
   print[blankcol]=    NULLADDR;

   itosd(time, ssval[SRTIME][blankcol]);
   tenths[blankcol]= time;
   }

DSVIDEO *mallvid (playos,col)
int playos,col;
{  release((char*) still[playos][col] ,col,"still x");
   still[playos][col]= NULLADDR;
   release((char*) load[playos][col]  ,col,"load x");
   load[playos][col]= NULLADDR;
   return( (DSVIDEO*) cmalloc(sizeof(DSVIDEO)) );
   }

DSSTILL *mallsti (playos,col)
int playos,col;
{  release((char*) video[playos][col] ,col,"video x");
   video[playos][col]= NULLADDR;
   release((char*) load[playos][col]  ,col,"load x");
   load[playos][col]= NULLADDR;
   return( (DSSTILL*) cmalloc(sizeof(DSSTILL)) );
   }

DSLOAD *mallload (playos,col)
int playos,col;
{  release((char*) video[playos][col] ,col,"video x");
   video[playos][col]= NULLADDR;
   release((char*) still[playos][col] ,col,"still x");
   still[playos][col]= NULLADDR;
   return( (DSLOAD*) cmalloc(sizeof(DSLOAD)) );
   }
```

```
/********************************** STILL.C ************************************/
/*                                                                             */
/*                                                                             */
/*******************************************************************************/

#include <\c\stdio.h>
#define EXTERN extern
#include "state.i"

EXTERN unsigned ibsta;
extern int ibcnt;
int iberror = NO;
static int vidinit=0;  /* set to 1 when video is initialized */

stillfrm (g, showerr)
DSGRAPH *g;
int showerr;
{ int i,disc, pl;
  unsigned fnum;
  DSVIDEO *v;
  DSSTILL *s;

  if (debug) printf("vision nplayers= %d %d ___\n",vision,nplayers);
  if (!vision || nplayers<=0)
  { if (showerr) beep("You do not have any active players.");
    return;
    }

  /***** beginning of failing section *****/
  if (debug) printf(" are going to play player ___\n");
  fnum = 0;
  disc = 0;

  for (i=actcol, fnum=0; i>=0 && !fnum; --i)
  { for (pl=0; pl<nplayers && !fnum; pl++)
    {
      v=video[pl][i];
      if (v!= NULLADDR &&     /* have video           */
          v->vidof-0x31==pl) /* showing this player */
      { disc= pl+1;
        fnum= (v->segtype==3) ? v->eframe : v->bframe;
        }
      else
      { s= still[pl][i];
        if (s!= NULLADDR &&     /* have video           */
            s->vidof-0x31==pl) /* showing this player */
        { disc= pl+1;
          fnum= s->bframe;
          }
        }
      }
    }
 if (debug) printf("fnum=%d  disc=%d  nplayers=%d vidinit=%d ___\n",
   fnum,disc,nplayers,vidinit);
 if (!fnum)
 { if (showerr) beep("You do not have any video to show");
   }
 else
 { if (!vidinit)
   { initvid();
     vidinit=1;
     }

   if (player[disc-1])
   {    /* if don't have a graph */
     if (g!= NULLADDR) dostill(fnum,disc,g->trncolor);
     else dostill(fnum,disc, 0x7FFF); /* all but white */
     }
   }
}
```

```
#define lobyte(a)         (a & 0x00FF)          /* low byte of a */
#define hibyte(a)         ( (a>>8) & 0x00FF )   /* high byte of a */

/**  show a video still **/
static dostill (frame,disc,trans)
unsigned frame;
int disc,trans;
{  static char *pa[2]= { "\001\xf0", "\001\xe0" };
   char buf[256];
   int device;
   int done;

   if (!vision) return;

   device = (disc == 1) ? vdisc1 : vdisc2;

   settrans( 0); /* show nothing while searching */

   /* search to the frame */
   buf[0] = 0x02;
   buf[1] = hibyte(frame);
   buf[2] = lobyte(frame);
   ibwrt(device,buf,3);                  /* display the still */
   if (debug) printf("DOSTILL ___\n");
   if (ibwait(device, disc, 0x02, buf))  /* seek to frame */
   { ibwrt(video0,pa[disc-1],2);          /* select composite 1 or 2 */
     settrans( trans); /* set transparent colors */
     if (debug) printf(" dostill.  ibwrt.   trans= %xh ___\n",trans);
     }
   }

/**  initialize VISION   **/
initvid ()
{  int i;
   char buf[256];
   int rc;

   if (!vision) return;

   beep("Please wait while player is initialized");
   vdisc1 = ibfindx("vdisc1");

   if (debug) printf("gpib0 vdisc1 = %d %d ___\n",gpib0,vdisc1);

   if (nplayers==2) vdisc2 = ibfindx("vdisc2");

   if (nplayers>0)
   { rc= discinit(1);
     if (rc && nplayers==2) discinit(2);
     }

   if (rc) beep("VIDEO PLAYER INITIALIZED");
   }

discres (dev)  /* disc reset.  shut off frame #s */
int dev;
{ if (debug) printf("discres.s ___\n");
  if (vidinit && vision) discwrt( (dev==1) ? vdisc1 : vdisc2, dev, "\6\0",2,1);
  if (debug) printf("discres.e ___\n");
  }

static discinit (dev)   /* initialize a videodisc player if present */
int dev;
{
   int device;
   char buf[65];
   if (!vision) return;
   device= (dev == 1) ? vdisc1 : vdisc2;
```

```
 if (debug) printf("DISCINIT.s  ___\n");
 ibwrt(device,"\x0C",1);
 if (ibsta & 0xC000)
 { player[dev-1]=0;
   return(0);
   }

 if (debug) printf("DISCINIT.2 ___\n");
 if (ibwait( device, dev, 0x0C, buf))
 { if (*(buf+2) & 0x80) player[dev-1] = NO;
   else
   { player[dev-1] = YES;

     discwrt(device,dev,"\1\1",2,0);              /* load player dev         */
     if (discwrt(device,dev,"\6\1",2,1)           /* turn on frame display */
      && discwrt(device,dev,"\xE\x1",2,1) )       /* manual control          */
        return(1);
     }
   }
  return(0);
  }

closepl2 ()
{ char buf[255];
  /* cmd 255 will mean will read all things for player */
  ibwait2(vdisc2, 2, 255, buf);
  }
static ibwait2 (device, reldev, cmd, buf)
int device;
int reldev;
int cmd;
char *buf;
{ int ntimes2try;
  int rc;
  int t;

  ntimes2try= 30;
  rc=0;
  while (ntimes2try-- && !rc)  /* keep trying till OK or run out of times */
  { ibrpp(device,&t);
    if (debug) printf("ibwait2. device reldev cmd t= %xh %xh %xh %xh ___\n",
                      device,reldev,cmd,t);
    if (t & (reldev*16))  /* have something to read */
    { ibrd(device,buf,64);
      if (*buf == cmd && *(buf+1) == 0) rc=1;
      if (debug) printf("ibwait2. *buf *(buf+1) ibcnt = %xh %xh %d ___\n",
        *buf,*(buf+1),ibcnt );
      }
    }
  if (debug) printf("ibwait2.e  rc= %d ___\n",rc);
  pause("ibwait2");
  return(rc);
  }

 static ibwait (device, reldev, cmd, buf)
 int device;
 int reldev;
 int cmd;
 char *buf;
 { int rc;
   rc= ibwait(device,reldev,cmd,buf);
   if (!rc)
   { vision=0;  /* shut vision off is this was unsuccessful */
     beep("Problem writing to the player.  VISION will no longer be used.");
     printf("\n reldev cmd = %xh ___\n",reldev,cmd);
     }
   return(rc);
   }
```

```
static discwrt (device, reldev, buf, n, checkflg)
int device, reldev, n, checkflg;
char *buf;
{ char temp[65];
  ibwrt(device,buf,n);
  if (debug) printf("\nDISCWRT.  *buf *bufl n %xh %xh %d ___\n",
    *buf,*(buf+1),n);
  return( !checkflg || ibwait(device, reldev, (int) buf[0], temp));
  }

settrans (colors) /* set transparent colors */
unsigned colors;
{ char ddbuf[4];
  unsigned i;

  if (!vision) return(0);

  ddbuf[0] = 0x02;
  ddbuf[1] = lobyte(colors);
  ddbuf[2] = hibyte(colors);
  ibwrt(video0,ddbuf,3);
  if (debug) printf("settrans.e video0 ibsta colors= %xh %xh %xh ___\n",
    video0,ibsta,colors);
  return( (ibsta & 0xE000)==0); /* timeout bit is 14 */
  }

inittch ()
{ char buf[2];
  touchdev= ibfindx("touch");
  buf[0]= 1;
  buf[1]= 0x88;
  ibwrt(touchdev,buf,2);
  }

ibfindx (s)
char *s;
{ int rc;
  rc= ibfind(s);
  if (debugsp) printf("ibfindx.e  opening |%s|.  returning %d ^G^G\n",s,rc);
  return(rc);
  }
```

```
/********************************** TCH.C ***************************************/
/*                                                                               */
/*                                                                               */
/*********************************************************************************/

#include <\c\stdio.h>
#define EXTERN extern
#include "state.i"
#include "keys.i"
#include "rwdefs.h"     /* Local definitions       */
#include "userproc.i"

#define USEATTR 0x02

int modefact;  /* =1 for 80 colunn, =2 for 40 column */
static int modegrph;
static char *pgr;
static int graphcol;
static int hitf3esc;
int addmode;
static int palette;
static int newlit;  /* says whether the literal acknowledgement is new */
static int uattr;
static int grattg;

gettouch (col, gcol, gname)
  /* get touch areas, updatting the data structure */
int col;         /* number of DSTOUCH structure */
int gcol;        /* number of DSGRAPH structure */
char *gname;     /* graphics image file name */
{       /* throughout this routine, column positions are kept in the data
            structure as 80 column coordinates.  If the screen is in MODELO
            mode, the column coordinate has to be converted to 40 column
            equivalent before display.  This is why we need fcol and lcol as
            temps for t->fcol and t->lcol */

  DSTOUCH *t;      /* touch structure */
  DSGRAPH *g;      /* graphics structure */
  GHEADER header; /* graphics file header */
  int i;
  unsigned vsrowcol;   /* information for dispgraph */
  unsigned verowcol;
  int retcode;
  int done;
  int nt,newtnum;

  ntouchs= ntchcol[actcol];
  addmode= (ntouchs==0);   /* go into add mode automatically if don't have
                              any touch areas */
  graphcol= gcol;
  hitf3esc=0;
  pgr= NULLADDR;
  g= NULLADDR;
  back=0;  /* set to 0 since if don't have graphics, will test 'att'
              against back */
  haveclear=0;
  if ( havegraph= (graphcol>=0) ) {   /* get and display graphics image */
    g=graph[graphcol];
    if (haveclear= isclear( gname) )  { setclmode( gname[5]); havegraph=0; }
    else
    { pgr= readgraph(gname,&header,0);
      if (pgr== NULLADDR) { havegraph=0; setmode(MODELO); }
      else setmode(header.gmode);
      }

    back=    (g->bckcolor == 255) ? header.color   : g->bckcolor;
    border=  (g->borcolor == 255) ? header.color   : g->borcolor;
    palette= (g->palcolor == 255) ? header.palette : g->palcolor;
```

```
    if ((g->fcol==0) && (g->lcol==0) && (g->frow==0) && (g->lrow==0)) {
      vsrowcol=header.ulrowcol;
      verowcol=header.lrrowcol;
      }
    else {
      vsrowcol = ovlbytes( g->frow, g->fcol, 8);
      verowcol = ovlbytes( g->lrow, g->lcol, 8);
      }

    if (smode== MODELO) setgrcol( back, border, palette);
    else
    { setgrcol( 0xff, border, palette); /* 0xff means don't set backgr */
      if (pgr== NULLADDR) fillit( back, vsrowcol, verowcol);
      }
    if (pgr!=NULLADDR) dispgraph(0x0101,vsrowcol,verowcol,pgr);
    }
  else {   /* display a blank screen in the appropriate graphics mode */
    cls(0);
    setmode(MODE80);
    back=    0; /* g->bckcolor; */
    border=  0; /* g->borcolor; */
    palette= 0; /* g->palcolor; */
    }

  modefact= (smode == MODELO || smode == MODEMD || smode == MODE40) ? 2 : 1;
  modegrph= (smode == MODELO || smode == MODEMD || smode == MODEHI);

  displits(actcol,1);
  stillfrm(g, 0);

  gratt= ATTR;
  if (modefact==2) gratt &= 0x3;
  if (back== gratt) gratt=1;
  grattg= gratt;
  uattr= (back!= USEATTR) ? USEATTR : 1;
/*if (smode >= MODEMD) */
/*{ grattg |= 0x8000;   */ /* say to overlay graph */
/*  uattr  |= 0x8000;   */ /* say to overlay graph */
/*  }                   */
  grid(gratt);  /* display coordinate grid */

  i= havegraph;
 freegraf();
 havegraph= i;
 pgr= rscrn( graphbuf, 1, 1, 25, maxcol);

 shwtouch(col); /* show the existing touch areas */

 /* keyboard routine for accept or cancel */
 done= 0;
 while(!done && !hitf3esc)
 {
   if (addmode)
   { t= (DSTOUCH *) maketch(ntouchs,col);
     newtnum= ntouchs++;
     while (newtnum>=0) newtnum= updtch(newtnum,col);
     }
   else                 /*.........1         2         3         4 */
   { cursor(24,1); wrtstrn("Touch CRT or F4 to change area",gratt,40);
     cursor(25,1); wrtstrn("F6 to add area/ F10 to end", gratt,40);
     lch=gettchx();  /* selecting an area */
     switch (lch)
     { case 0:  /* hit a touch screen */
         newtnum= hittouch();
         while (newtnum>=0) newtnum= updtch(newtnum,col);
         break;
       case ESC: hitf3esc=ESC; break; /* bail out prematurely & save */
       case F3:  hitf3esc=F3;  break; /* bail out prematurely */
       case F4:
```

```
        newtnum= getarea(col);
        if (newtnum>=0) while (newtnum>=0) newtnum= updtch(newtnum,col);
        break;
      case F6: addmode=1; break; /* add touch area */
      case FA: done=1;    break; /* accept screen */
      default: beep("This key cannot be used at this time");
      }
    }
  }  /* end of while */

if (!hitf3esc)
{ blline(24);
  if (getyn("SAVE THIS FORMAT Y/N ? [.]",gratt,25,1,40,25,25))
  {
    wformat(actcol,ssval[SRTOUCH][actcol]);
    }
  }

 setmode(MODE80);   /* return screen to "normal" */
 settrans(0x0000);

 if (hitf3esc != F3)  /* consolidate touch areas */
 { nt= ntouchs;
   ntouchs=0;
   for (i=0; i< NTOUCH; i++)
   { if (touch[i][col]!= NULLADDR && touch[i][col]->counter> 0)
     { if (i!= ntouchs)
       { touch[ntouchs][col]= touch[i][col];
         touch[i][col]= NULLADDR;
           }
         ntouchs++;
       } }
     ntchcol[actcol]= ntouchs;
     }

   return(DONE*(hitf3esc!=F3));
   }

static getarea (col)
int col;
{ int ta,rc,i;
  WINDOW *w;
  FIELD *f;
  char c[4];

  dispwind(WNTOUCH);
  rc= -1;
  while (1 && rc== -1)
  { entwind(WNTOUCH,0);
    if (lch== F3)
    { hitf3esc= lch;
      break;
      }
    if (lch== ESC) break;

    w= windows+ WNTOUCH;
    f= w->flds;
    stctrim(c,f->data,0);
    ta= stoi(c);

    for (i=0; i<NTOUCH; i++)
      if (touch[i][col]!= NULLADDR && touch[i][col]->counter==ta)
      { rc= i;
        break;
        }
    if (rc== -1) beep("Invalid touch area");
    }

  actwind= discwind( lch != F3);
  if (hitf3esc) rc= -1;
  return(rc);
  }
```

```
static hittouch ()
{ DSTOUCH *t;
  int i;
  for (i=0; i< NTOUCH; i++)
  { t= touch[i][actcol];
    if (t== NULLADDR) break;
    if (t->counter<=0) continue;
    if (t->frow<=touchrow && touchrow<= t->lrow
        && modecol(t->fcol)<= touchcol && touchcol<= modecol(t->lcol))
      return(i);
    }
  cursor(touchrow,touchcol);
  return(-1);
  }

updtch (tnum,col)
int tnum,col;
{ int rc;
  int dobox;
  DSTOUCH *t;
  char temp[BRANCHLEN+1];

  t= touch[tnum][col];
  dobox= (t->counter!=0);
  if (dobox) box(t->frow,t->fcol,t->lrow,t->lcol,uattr);  /* set color */
  rc= updtch2(tnum,col);
  t= touch[tnum][col];
  if (t!= NULLADDR && t->counter>=0)  /* reset color if area was not deleted */
  { box(t->frow,t->fcol,t->lrow,t->lcol,grattg);
    cursor(t->frow+upoffset(t),modecol((t->fcol))+1);
    sprintf(temp,"Area %d",t->counter);
    wrtstr(temp,gratt);

    cpyevtnm(temp,t->branch,EVFLDLEN);
    stctrimr(temp);
    cursor(t->frow+upoffset(t)+1,modecol((t->fcol))+1);
    wrtstr(temp,gratt);
    }
  return(rc);
  }

updtch2 (tnum,col)
int tnum,col;
{ DSTOUCH *t,*t1;
  WINDOW *w;
  FIELD *f;
  int done,i,retcode,newtnum;
  int fcol,lcol;
  char temp[41];
  int newbox;
  DSLIT lit;
  int oldack;
  char *p;

  t=touch[tnum][col];
  if (t->counter==-1) return(-1); /* deleted touch area */

  newbox= (t->counter== 0);
  if ( newbox) {  /* defaults for new areas */
    t->counter= tnum+1;
    if (tnum==0) { t->frow=12; t->fcol=40; }
    else { t1=touch[tnum-1][col]; t->frow=t1->lrow+1; t->fcol=t1->lcol+1; }
    t->lrow=t->frow+2;
    t->lcol=t->fcol+2;
    chkbox(&(t->frow),&(t->fcol),&(t->lrow),&(t->lcol));
    }
  /* display screen overlay data */
```

```
if (!addmode)
{ cursor(24,1);
  sprintf(temp,"Area %d (Touch crt or F4 for other area)",t->counter);
  wrtstrn(temp, gratt,40);
  cursor(25,1);
  wrtstr(      "RETURN moves/F6 add/F8 delete/F9 accepts",gratt);
  }           /*.........1          2          3          4 */

/* outermost keyboard loop */

done=0;
while (!done && !hitf3esc)
{ fcol= modecol(t->fcol);
  lcol= modecol(t->lcol);

  if (addmode) lch= RETURN;
  else lch= gettchx();  /* modifying an area */
  switch (lch)
  { case 0:  /* hit a touch screen */
      newtnum= hittouch();
      if (newtnum>=0) return(newtnum);
      break;
    case ESC: hitf3esc=ESC; break; /* bail out prematurely and save */
    case F3:  hitf3esc=F3;  break; /* bail out prematurely */
    case F4:
      newtnum= getarea(col);
      if (newtnum>=0) return(newtnum);
      break;
    case F5:
      t->frow=1;
      t->fcol=1;
      t->lrow=24;
      t->lcol=80;
      showbox(t,uattr,0);
      done= 1;
      break;
    case F6:  /* add touch area */
        /* increment ntouchs after because maketch and updtch refer to
           touch data structure which is in base 0 */
      t= (DSTOUCH *) maketch(ntouchs,col);
      newtnum= ntouchs++;
      addmode= 1;
      return(newtnum);
    case F8:
      resplus(t->frow,modecol(t->fcol),t->lrow,modecol(t->lcol));
      t->counter=-1;  /* mark as deleted */
      done= 1;
      cursor(t->frow+upoffset(t),fcol+1);
      wrtstr("DELETED ",gratt);
      break;
    case F9: /* outer loop, accept area without changing it */
      done= 1;
      break;
    default:
      beep("This key cannot be used at this time");
      break;
    case RETURN:  /* press return to get the '+' */
       /***************************** define box **********************/
      if (newbox== 0) strcpy(temp,"Define area or press F10 to end add");
      else
      { resplus(t->frow,modecol(t->fcol),t->lrow,modecol(t->lcol));
        sprintf(temp,"Define area # %d or press F10 to end add",
          t->counter);
        }

      cursor(23,1);
      wrtstr(temp, gratt);

      wenterml();
      cursor(25,1);
```

```
/* keyboard routine to move the '+' around */
retcode = NO;
while (retcode== NO && !hitf3esc)
{ cursor(t->frow,fcol);
  wrtch('+',uattr);

  sprintf(temp,"ROW=%2d--COL=%2d  ROW=%2d--COL=%2d ",
    t->frow,fcol,t->lrow,lcol);
/*  if ( t->frow == 1 || fcol <=2 ) grid(gratt); */
  cursor(25,1);
  wrtstr(temp,gratt);

  lch=gettchx();  /* moving upper left */
  switch (lch) {
    case F5:
      resplus(t->frow,modecol(t->fcol),t->lrow,modecol(t->lcol));
      t->frow=1;
      t->fcol=1;
      t->lrow=24;
      t->lcol=80;
      showbox(t,uattr,newbox);
      done= 1;
      retcode= YES;
      break;
    case ESC: hitf3esc=ESC; /* bail out prematurely & save */
      /* intentional fall through */
    case FA:  /* end add mode */
      if (lch==FA && !addmode)
        beep("You cannot press this key at this time");
      else
      { blline(23);
        resplus( t->frow, fcol, t->frow, fcol);
        ntouchs--;
        touch[ntouchs][col]= NULLADDR;
        addmode=0;
        return(-1);
        }
      break;
    case F3:  hitf3esc=F3;  break; /* bail out prematurely */
    case 0 :  movecurl(&(t->frow),&fcol,
                touchrow- t->frow, touchcol- fcol, 1,1,24,maxcol-1);
              break;
    case UP:  movecurl(&(t->frow),&fcol,-1, 0,1,1,24,maxcol-1); break;
    case DN:  movecurl(&(t->frow),&fcol, 1, 0,1,1,24,maxcol-1); break;
    case LFT: movecurl(&(t->frow),&fcol, 0,-1,1,1,24,maxcol-1); break;
    case RGT: movecurl(&(t->frow),&fcol, 0, 1,1,1,24,maxcol-1); break;
    case HOM: movecurl(&(t->frow),&fcol,-1,-1,1,1,24,maxcol-1); break;
    case END: movecurl(&(t->frow),&fcol, 1,-1,1,1,24,maxcol-1); break;
    case PUP: movecurl(&(t->frow),&fcol,-1, 1,1,1,24,maxcol-1); break;
    case PDN: movecurl(&(t->frow),&fcol, 1, 1,1,1,24,maxcol-1); break;
    case RETURN:  /* finished moving '+'*/
      resplus(t->frow,modecol(fcol),t->frow,modecol(fcol));
      retcode = YES;
      break;
    default:
      beep("This key cannot be used at this time");
      break;
    }
  } /* through with upper-left part of box */

if (!done) /* if done, have defined full box */
{ t->fcol= fcol*modefact;

  t->lrow=t->frow+2;
  t->lcol=t->fcol+2*modefact;

  chkbox(&(t->frow),&(t->fcol),&(t->lrow),&(t->lcol));

  /* draw the box */
  showbox(t,uattr,newbox);
```

```
        /* keyboard routine for expand/contract box */
        retcode = NO;
        lcol= modecol(t->lcol);
        movelr(t,fcol,&lcol,newbox);  /* move lower right part of box */

        t->lcol= lcol*modefact;

        /************************** end of define box ********************/

        done= 1;
        }
      break;
    }
  }

if (hitf3esc || t->counter<0) return(-1); /* have deleted touch area */

/* put up second touch window */
w= windows+ WNTOUCH2;
f= w->flds;

cpyevtnm(f->data,t->branch,13);      f++;
sprintf(f->data,"%2d",t->counter);   f++;
sprintf(f->data,"%2d",t->acknowl);
actwind= WNTOUCH2;
dispwind(WNTOUCH2);
retcode= entwind(WNTOUCH2,0);
actwind= discwind(1);
blline(25);
if (lch== F3) hitf3esc=F3;
else
{ if (lch== ESC) hitf3esc= ESC;  /* " " " & save */
  f= w->flds;
  chkevent(f->data,t->branch);    f++;
  t->counter= stoi(f->data);      f++;
  oldack= t->acknowl;
  t->acknowl= stoi(f->data);
    /* must reset acknowledgement pointer if have different acknowledgement*/
  if (oldack != t->acknowl) t->acknowlp= NULLADDR;

  switch (t->acknowl)                  /*1234567890123456*/
  { case 1: t->acknowlp= getcolor(1, "Outline color", NULLADDR, t->acknowlp);
      break;
    case 2: t->acknowlp= getcolor(1, "Fill color", NULLADDR, t->acknowlp);
      break;
    case 3: t->acknowlp= getcolor(1, "Exterior color", NULLADDR,t->acknowlp);
      break;
    case 6: t->acknowlp= getcolor(2, "From color", "To color", t->acknowlp);
      break;
    case 7: t->acknowlp= getcolor(2, "Not color", "To color", t->acknowlp);
      break;
    case 10:
      if (oldack== 10)
      { p= t->acknowlp;
        p++;  /* font */
        lit.fcolor= *p++;
        lit.row= *p++;
        lit.col= *p++;
        if (strlen(p) >= sizeof(lit.literal))
        { beep("ERROR IN LITERAL ACKNOWLEDGEMENT.  BAD STRING");
          t->acknowl=0;
          t->acknowlp= NULLADDR;
          return(-1);
          }
        strcpy(lit.literal, p);
        }
      else
      { newlit=1;
        lit.lcolor= 0xFFFF;  /* not assigned   */
        lit.literal[0]= '\0';
        lit.fcolor=  7;  /* white on black */
        }
```

```
        if (newlit)
        { lit.row= t->lrow+1;
          lit.col= t->fcol;
          newlit=0;
          }
        lit.litlen=strlen(lit.literal);
        lit.col=modecol(lit.col);
        getliter(&lit,pgr,1);
        lit.col*=modefact;
        if (t->acknowlp) cfree(t->acknowlp,"literal acknowledgement");
        p= cmalloc(strlen(lit.literal) +1+4,"tchl");
        t->acknowlp= p;
        *p++= 0;  /* font */
        *p++= lit.fcolor;
        *p++= lit.row;
        *p++= lit.col;
        strcpy(p, lit.literal);

        break;
      default: break;
      }
    }
  return(-1);
  }

upoffset (t)
DSTOUCH *t;
{ return ( (t->frow+1==t->lrow) ? 0 : 1 );
  }

chkbox (frow,fcol,lrow,lcol)
int *frow, *fcol, *lrow, *lcol;
{ if (*frow<  1)      *frow= 1;
  if (*frow> 24)      *frow=24;
  if (*fcol<  1)      *fcol= 1;
  if (*fcol> 79)      *fcol=79;
  if (*lrow<= *frow)  *lrow= *frow+1;
  if (*lrow> 25)      *lrow=25;
  if (*lcol<= *fcol)  *lcol= *fcol+ modefact;
  if (*lcol> 80)      *lcol= 80;
  }

movelr (t,fcol,lcol,newbox)
DSTOUCH *t;
int fcol,*lcol, newbox;
{ char temp[80];
  int done;

  done=0;
  cursor(23,1);
  if (newbox== 0) strcpy(temp,"Defining area");
  else sprintf(temp,"Defining area # %d", t->counter);
  wrtstrn(temp,gratt,40);

  cursor(25,1);
  sprintf(temp,"ROW=%2d--COL=%2d  ROW=%2d--COL=%2d",
    t->frow,fcol,t->lrow,*lcol);
  wrtstr(temp,gratt);
  wenterm2();
  while (!hitf3esc && !done)
  { lch=gettchx();

    switch (lch) {     /* All of these cases do the same basic things */
      case 0:
        movecur2(t->frow,fcol,&(t->lrow),lcol,
          touchrow- t->lrow, touchcol- *lcol,
          t->frow+1,fcol+1,25,maxcol);
        break;
      case UP:
        movecur2(t->frow,fcol,&(t->lrow),lcol, -1, 0,
          t->frow+1,fcol+1.25,maxcol);
```

```
        break;
      case DN:
        movecur2(t->frow,fcol,&(t->lrow),lcol,  1, 0,
          t->frow+1,fcol+1,25,maxcol);
        break;
      case LFT:
        movecur2(t->frow,fcol,&(t->lrow),lcol,  0,-1,
          t->frow+1,fcol+1,25,maxcol);
        break;
      case RGT:
        movecur2(t->frow,fcol,&(t->lrow),lcol,  0, 1,
          t->frow+1,fcol+1,25,maxcol);
        break;
      case HOM:
        movecur2(t->frow,fcol,&(t->lrow),lcol, -1,-1,
          t->frow+1,fcol+1,25,maxcol);
        break;
      case END:
        movecur2(t->frow,fcol,&(t->lrow),lcol,  1,-1,
          t->frow+1,fcol+1,25,maxcol);
        break;
      case PUP:
        movecur2(t->frow,fcol,&(t->lrow),lcol, -1, 1,
          t->frow+1,fcol+1,25,maxcol);
        break;
      case PDN:
        movecur2(t->frow,fcol,&(t->lrow),lcol,  1, 1,
          t->frow+1,fcol+1,25,maxcol);
        break;

      case F3:  hitf3esc=F3;  break; /* bail out prematurely */
      case ESC: hitf3esc=ESC; break; /* bail out prematurely & save */
      case F8: /* delete area  */
        t->counter= -1;
        done=1;
        break;

      case F9: /* area ok, accept it */
        done=1;
        break;

      default:
        beep("This key cannot be used at this time");
        break;
      }
    }
  }

movecur1 (currow,curcol,delrow,delcol,minrow,mincol,maxrow,maxcol)
int *currow,*curcol;
int delrow,delcol,minrow,mincol,maxrow,maxcol;
{ int nr;
  int nc;
  nr= *currow+ delrow;
  nc= *curcol+ delcol;
  if (moveok( nr, nc, minrow, mincol, maxrow, maxcol) )
  { resplus(*currow, *curcol, *currow, *curcol);
    if (*currow == 24) wenterml();
    *currow= nr;
    *curcol= nc;
    }
  }

movecur2 (curfrow,curfcol,curlrow,curlcol,
  delrow,delcol,minrow,mincol,maxrow,maxcol)
int curfrow, curfcol, *curlrow, *curlcol;
int delrow,delcol,minrow,mincol,maxrow,maxcol;
{ int nr;
  int nc;
  nr= *curlrow+ delrow;
  nc= *curlcol+ delcol;
```

```
  if (moveok( nr, nc, minrow, mincol, maxrow, maxcol) )
  {   /***** remove part of box that needs to be removed *****/
    if (delrow)
    { resplus( *curlrow,  curfcol, *curlrow, *curlcol);
      if (delrow< 0)
      { resplus( (*curlrow)+delrow,  curfcol, (*curlrow-1),  curfcol);
        resplus( (*curlrow)+delrow, *curlcol, (*curlrow-1), *curlcol);
        }
      }
    if (delcol)
    { resplus(  curfrow, *curlcol, *curlrow, *curlcol);
      if (delcol< 0)
      { resplus(  curfrow,  (*curlcol)+delcol,  curfrow, (*curlcol)-1);
        resplus( *curlrow,  (*curlcol)+delcol, *curlrow, (*curlcol)-1);
        }
      } /* end of remove section */

/*  if (curfcol<=2) grid(gratt); */
    if (*curlrow== 24) wenterm2();
    *curlrow= nr;
    *curlcol= nc;
    boxchg( delrow, delcol, curfrow, *curlrow, curfcol, *curlcol, uattr);
    }
  }

moveok ( row, col, minrow, mincol, maxrow, maxcol)
int row, col, minrow, mincol, maxrow, maxcol;
{ if (row<minrow)      beep("You cannot move up anymore");
  else if (row>maxrow) beep("You cannot move down anymore");
  else if (col<mincol) beep("You cannot move left anymore");
  else if (col>maxcol) beep("You cannot move right anymore");
  else return(1);  /* ok to do move */
  return(0);
  }
 resplus (frow,fcol,lrow,lcol)
 int frow,lrow,fcol,lcol;
 { unsigned int src,erc;
   if ( pgr== NULLADDR ) blankbox(frow,fcol,lrow,lcol,grattg);
   else
   { src= ovlbytes(frow, fcol, 8);
     erc= ovlbytes(lrow, lcol, 8);
     dispgraph(src,src,erc,pgr);
     }
   }

 wenterm1 ()  /* write enter message */
 { cursor(24,1);
   wrtstrn("Change size with touch or cursor keys",gratt,40);
   }

 wenterm2 ()  /* write enter message */
 { cursor(24,1);
   wrtstr("Change size and press F9 to accept area ",gratt);
        /*.........1         2         3         4 */
   }

 static blankbox (top,left,bottom,right,att) /* print a blank box at coord's */
 int top,left,bottom,right;
 int att; /* display attribute */
 { int i;

   for (i=top;i<=bottom;++i) {
     cursor(i,left);
     wrtchars(' ', right-left+1,att);
     }
   }

 shwtouch (touchnum) /* display boxes at touch areas */
 int touchnum;  /* number of DSTOUCH structure */
 {
```

```
   DSTOUCH *t;
   int i;
   char temp[BRANCHLEN+1];

   for (i=0; i<ntouchs; ++i) {
     t=touch[i][touchnum];
     if (t->counter>0)
     {
       showbox(t,grattg,0);
       cpyevtnm(temp,t->branch,EVFLDLEN);
       stctrimr(temp);
       cursor(t->frow+1+upoffset(t),modecol((t->fcol))+1);
       wrtstr(temp,gratt);
       }
     }
   }

static showbox (t,att,new)
DSTOUCH *t;
   int att,new;
   { char temp[11];

     /* draw box */
     box(t->frow,t->fcol,t->lrow,t->lcol,att);

     /* label with area number */
     if (!new)
     { cursor(t->frow+upoffset(t),modecol((t->fcol))+1);
       sprintf(temp,"AREA %d",t->counter);
       wrtstr(temp,gratt);
       }
     }

   static blline (row)
   int row;
   { cursor(row,1);
     wrtchars(' ',40,gratt);
     }

   char *maketch (tn, col)
   int tn, col;
   { DSTOUCH *t;
     char *q;
     char *p;
     int i;
     int sa;
     q= cmalloc(sizeof(DSTOUCH),"tch2");
     t = (DSTOUCH *) q;
     touch[tn][col]= t;

     t->counter=0;
     moveevent( t->branch," ",0);
     t->acknowl= third_ctl_rec[0];
     p= &third_ctl_rec[1];
     for (i=tn-1; i>=0; i--)    /* if have entered one previously, copy it */
     { if (touch[i][col]!= NULLADDR)
       { t->acknowl = touch[i][col]->acknowl;
         p= touch[i][col]->acknowlp;
         break;
         }
       }
       /* set acknowledgement information */
     sa= sizeack(t->acknowl, p);
     newlit= (t->acknowl== 10);
     if (sa)
     { t->acknowlp= cmalloc( sa, "tch3");
       movmem( p, t->acknowlp, sa );
       }
     else t->acknowlp= NULLADDR;
     return(q);
     }
```

```
static sizeack ( acknum, ack)
int acknum;
char *ack;
{ int rc;
  switch (acknum)
  { case  0: case 4: case 5: case 8: case 9: rc= 0; break;
    case  1: case 2: case 3:                 rc= 1; break;
    case  6: case 7:                         rc= 2; break;
    case 10: rc= 4+1+ strlen(ack+4); break; /* literal */
    case 11: rc=0; break; /* speech  */
    default: rc=0;
    }
  return(rc);
  }

gettchx ()
{ int lch;
  if (vision && usetouch)
  { touchact= 1;
    resettch();
    }
  lch=getchx();
  touchact= 0;
  return(lch);
  }

#define FILLCHAR (char) 219
#define FR 3
#define NC 20
#define COLOR 0x1f
static int fccol; /* first column for color */

static char *getcolor (ncolors, msg1, msg2, colors)
int ncolors;
char *msg1, *msg2, *colors;
{ int i, maxcolor;
  int lccol;  /* last column for color */
  int fcol,lcol;     /* first and last columns for box   */
  int twocol;
  int inrow, lrow;
  char *p;
  char fillstr[NC];
  static char inst1[]= "(F1 & F2 move +)";
  static char inst2[]= "(F3 & F4 move +)";

  if (colors== NULLADDR)
  { colors= cmalloc(2,"tch4");
    colors[0]= 0;
    colors[1]= 0;
    }

  /* translate conductor colors into composer colors */
  if (smode == MODELO) { colors[0]/=2; colors[1]/=2; }

  gcurson=0;
  twocol= (ncolors==2);
  maxcolor= (smode== MODELO) ? 4 : 16;
  colors[0]%=maxcolor;
  colors[1]%=maxcolor;
  setmem( fillstr, NC-2, FILLCHAR);
  fillstr[NC-2]= '\0';

  /* display colors */
  fcol= (modecol(80) - NC)/2 + 1;
  fccol= (modecol(80) - maxcolor)/2 + 1;
  lcol=  fcol + NC - 1;
  lccol= fccol + maxcolor - 1;
  lrow= (twocol) ? FR+8 : FR+4;
  p= readscrn( FR, fcol, lrow+1, lcol);
```

```
  /* draw box */
box(FR, fcol*modefact, lrow, lcol*modefact, COLOR);

  /* put up headings */
cursor(FR+1, fcol+1); wrtstrn(msg1,COLOR,NC-2);
if (twocol) { cursor(lrow-3, fcol+1); wrtstrn(msg2,COLOR,NC-2); }

  /* put up colors surrounded by brackets ********************/
if (fcol!= fccol-1)  /* may need to fill up area where colors are put */
{ cursor(FR+2,fcol+1);
  wrtstr(fillstr, (modegrph) ? 0 : COLOR/16);
  if (twocol)
  { cursor(lrow-2,fcol+1);
    wrtstr(fillstr, (modegrph) ? 0 : COLOR/16);
  } }

cursor(FR+2, fccol-1); wrtch('[',COLOR);
if (twocol) cursor(lrow-2, fccol-1); wrtch('[',COLOR);
for (i=0; i< maxcolor; i++)
{ cursor(FR+2, fccol+i);
  wrtch(FILLCHAR, i);
  if (twocol)
  { cursor(lrow-2, fccol+i);
    wrtch(FILLCHAR, i);
    }
  }
cursor(FR+2, lccol+1); wrtch(']',COLOR);
if (twocol)
{ cursor(lrow-2, lccol+1);
  wrtch(']',COLOR);
  }
  /* end putting up colors */

 /* put up instructions */
cursor(FR+3, fcol+1); wrtstrn(inst1,COLOR,NC-2);
if (twocol) { cursor(lrow-1, fcol+1); wrtstrn(inst2,COLOR,NC-2); }

  /* blank line between two rows of colors */
if (twocol)
{ cursor(FR+4,fcol+1);
  wrtstr(fillstr, (modegrph) ? 0 : COLOR/16);
  }

  /* put up '+'s */
gcurs3(FR+2,fccol+ colors[0],1);
if (twocol) gcurs3(lrow-2, fccol+ colors[1], 1);

while (1)
{ lch=gettchx();  /* selecting an area */
  switch (lch)
  { case 0:  /* hit a touch screen */
      if (touchcol < fccol || lccol < touchcol) continue;
      if (FR+1<= touchrow && touchrow <= FR+3) { touchrow= FR+2; inrow=0; }
      else if (twocol && lrow-3<=touchrow && touchrow<=lrow-1)
           { inrow=1;
             touchrow= lrow-2;
             }
      else continue;

      gcurs3(touchrow, fccol+ colors[inrow],0); /* get rid of old color */
      colors[inrow]= touchcol- fccol;
      gcurs3(touchrow, fccol+ colors[inrow],1); /* disp '+' for new color */
      break;

    case F1: colors[0]=udcc(FR+2, (int)colors[0],-1,fccol, maxcolor); break;
    case F2: colors[0]=udcc(FR+2, (int)colors[0], 1,fccol, maxcolor); break;

    case F3: case F4:
      if (ncolors==1) beep("This key cannot be used now");
      else colors[1] =
             udcc(lrow-2,(int)colors[1],(lch==F3) ? -1: 1, fccol, maxcolor);
      break;
```

```
        case F9: case ESC: case RETURN:
          writscrn( FR, fcol, lrow+1, lcol, p);
          gcurson=1;
            /* translate composer colors into conductor colors */
          if (smode == MODELO)
          { colors[0]= (colors[0]*2)+(palette%2);
            colors[1]= (colors[1]*2)+(palette%2);
            }
          return(colors);
        default:
          beep("This key cannot be used at this time");
          break;
        }
      }
    }

static udcc (row, color, inc, fcol, maxcol)
int row, color, inc, fcol, maxcol;
{ gcurs3(row,fcol+ color,0);
  color += inc;
  if (color< 0)        color= maxcol-1;
  if (color>= maxcol) color= 0;
  gcurs3(row,fcol+ color,1);
  return(color);
  }

gcurs3 (row, col, onoff)
int row, col, onoff;
{ int attr;
  if (modegrph) gcurs2(row,col);
  else
  { cursor(row,col);
    attr= col- fccol;
    if (onoff)
    { wrtch( 0x8, (((15-attr)&0x7)<<4) +attr);
      cursor(row,col);
      }
/*  if (onoff) wrtch( '+', attr *16 + (0x0f- attr) );
*/  else wrtch( FILLCHAR, attr);
    }
  }

extern int    c_col;                  /* Current column of the SS          */
extern int    event_info_psn;           /* Current position in event_info    */
extern int    rw_error;                 /* Error flag                        */
extern FILE   *tfile;       /* File handle for the touch.idx file    */

wformat (col, lb)
/***************************************************************************
* This module saves a touch area format in the file touch1.idx. col is the    *
* column that the touch areas are going to be saved from.  lb is a string *
* containing the lb of the touch area.                                     *
***************************************************************************/
int   col;
char  *lb;
{
#define  GOOD_WRITE         0
#define  RANGE_ERROR        1
#define  RCLEN              2

   int             touch_area; /* Current touch area that I' working on     */
   long  int       last_byte;  /* Used to determine the length of the file */
   int             last_rec;   /* Last record of the file                  */
   int             found = FALSE; /* Found the label in the file flag       */
   int             values[4];  /* Temporary holding place for the row/cols */
   int             n;          /* Returned by the conversion - good or bad */
   int             i;          /* Loop counter                             */
   int             cur_rec;    /* Current record in the file               */
   long  int       ftell();
   char            num[3];        /* A 2 digit number holder */
   char            temp[BRANCHLEN + 1];  /* Temp label for compare */
```

```
struct
 { char  label[EVENT_NAME_LENGTH];       /* The name of the format     */
   char  rcinfo[MAX_SAVE_AREAS * 4 * RCLEN]; /* The ASCII row-col info */
   char  evts[MAX_SAVE_AREAS][10];
 } form;                      /* The record that I'm building to write    */

i= fseek(tfile, 0l, 2);        /* Find the last record in the file */
last_byte = ftell(tfile);
last_rec = last_byte / sizeof(form);

strcpy(temp, lb);        /* Set up a temporary area for the label */
stcpadr(temp, EVENT_NAME_LENGTH, 0 );

if (last_rec == 0) cur_rec = 0;
else
{ cur_rec = 1;
  while (!found)        /* Go find the record */
  { read_rec(&form, tfile, cur_rec, sizeof(form));
    if (str_compare(form.label, temp,EVENT_NAME_LENGTH)) found =TRUE;
    else if (cur_rec < last_rec) ++cur_rec;
    else break;
    } /* End while (searching for the label) */
  }
if (!found)
{ ++cur_rec;
  movmem( temp, form.label, EVENT_NAME_LENGTH);
  }

for (touch_area = 0; touch_area < MAX_SAVE_AREAS; ++touch_area)
{
  setmem(form.evts[touch_area], 10, ' '); /* 10 blanks */
  if (touch[touch_area][col] != NULLADDR)
  { values[0] = touch[touch_area][col]->frow;
    values[1] = touch[touch_area][col]->fcol;
    values[2] = touch[touch_area][col]->lrow;
    values[3] = touch[touch_area][col]->lcol;

    for (i = 0; i < 4; ++i)
    { if ((values[i] < 0) || (values[i] > 99))
      { fclose(tfile);
        return(RANGE_ERROR);
        }
      sprintf(num, "%2d", values[i]);
      form.rcinfo[(touch_area * (RCLEN * 4)) + (i * RCLEN)] = num[0];
      form.rcinfo[(touch_area * (RCLEN * 4)) + (i * RCLEN) + 1] = num[1];
      } /* End for (putting four values) */

    moveevent(form.evts[touch_area],touch[touch_area][col]->branch,0);
    }
  else setmem(&form.rcinfo[touch_area*(RCLEN*4)] , 4*RCLEN, ' ');

  } /* End for loop (getting all the data) */

write_rec(&form, tfile, cur_rec, sizeof(form));
fflush(tfile);
return(GOOD_WRITE);
} /* End wformat */

ovlbytes (hi, lo, nbits)
int hi, lo, nbits;
{ int rc;
  rc= hi;
  rc<<= nbits;
  rc+= lo;
  return(rc);
  }
modecol (col)
int col;
{ return( (col+ (modefact-1))/modefact);
  /* if modefact==1 this is same as col
     if modefact==2 this is col+1/2      */
  }
```

```
wformat (col, lb)
/*************************************************************************
* This module saves a touch area format in the file touchl.idx. col is the   *
* column that the touch areas are going to be saved from.  lb is a string *
* containing the lb of the touch area.                                 *
*************************************************************************/
int   col;
char  *lb;
{
#define  GOOD_WRITE        0
#define  RANGE_ERROR       1
#define  RCLEN             2

   int              touch_area; /* Current touch area that I' working on    */
   long  int        last_byte;  /* Used to determine the length of the file */
   int              last_rec;   /* Last record of the file   -              */
   int              found = FALSE; /* Found the label in the file flag      */
   int              values[4];  /* Temporary holding place for the row/cols */
   int              n;          /* Returned by the conversion - good or bad */
   int              i;          /* Loop counter                             */
   int              cur_rec;    /* Current record in the file               */
   long  int        ftell();
   char             num[3];        /* A 2 digit number holder */
   char             temp[EVENT_NAME_LENGTH + 1];  /* Temp label for compare */
   struct
   {  char  label[EVENT_NAME_LENGTH];       /* The name of the format       */
      char  rcinfo[MAX_SAVE_AREAS * 4 * RCLEN]; /* The ASCII row-col info       */
      char  events[MAX_SAVE_AREAS][10];
   } format;                    /* The record that I'm building to write    */

   wform2();
   printf("WFORMAT.S\n");
   printf("LB ADDR= %lx\n",lb);
   printf("%s\n",lb);
   printf("tfile= %lx\n",tfile);
   if (col<0) return(0);

   i= fseek(tfile, 0l, 2);        /* Find the last record in the file */
   printf("wtf.  fseek returns = %d \n",i);
   last_byte = ftell(tfile);
   last_rec = last_byte / sizeof(format);

   printf("wformat.  last_rec= %x\n",last_rec);
   strcpy(temp, lb);        /* Set up a temporary area for the label */

   stcpadr(temp, EVENT_NAME_LENGTH,0);

   if (last_rec == 0) cur_rec = 0;
   else
   {  cur_rec = 1;
      while (!found)     /* Go find the record */
      {  read_rec(&format, tfile, cur_rec, sizeof(format));
         if (str_compare(&(format.label), temp,EVENT_NAME_LENGTH)) found =TRUE;
         else if (cur_rec < last_rec) ++cur_rec;
         else break;
      } /* End while (searching for the label) */
   }
   printf(" found cur_rec= %d %d\n",found,cur_rec);
   if (!found)
   {  ++cur_rec;
      movmem( temp, &(format.label), EVENT_NAME_LENGTH);
   }

   for (touch_area = 0; touch_area < MAX_SAVE_AREAS; ++touch_area)
   {  setmem(format.events[touch_area],9,' '); /* 9 blanks */
      if (touch[touch_area][col] != NULLADDR)
      {  values[0] = touch[touch_area][col]->frow;
         values[1] = touch[touch_area][col]->fcol;
         values[2] = touch[touch_area][col]->lrow;
         values[3] = touch[touch_area][col]->lcol;
```

```
         for (i = 0; i < 4; ++i)
         {  if ((values[i] < 0) || (values[i] > 99))
            {  fclose(tfile);
               return(RANGE_ERROR);
            }
            sprintf(num, "%d", values[i]);
            if (strlen(num) == 1)
            {  num[2] = num[1];
               num[1] = num[0];
               num[0] = '0';
            }
            format.rcinfo[(touch_area * (RCLEN * 4)) + (i * RCLEN)] = num[0];
            format.rcinfo[(touch_area * (RCLEN * 4)) + (i * RCLEN) + 1] = num[1]
;
         } /* End for (putting four values) */

         movmem(touch[touch_area][col]->branch,format.events[touch_area],
           EVENTLEN+2);
      }

      else setmem(format.rcinfo[touch_area*(RCLEN*4)] , 4*RCLEN, ' ');

   } /* End for loop (getting all the data) */

   write_rec(&format, tfile, cur_rec, sizeof(format));
   fflush(tfile);
   return(GOOD_WRITE);
} /* End wtf */

wform2 ()
{ printf(" WFORM2 ");
  }


/********************************** WIND.C ************************************/
/*                                                                            */
/*                                                                            */
/******************************************************************************/

#include "\c\stdio.h"
#define EXTERN extern
#include "state.i"
#include "keys.i"
#include "userproc.i"

char *dataptr;
int chcount;
int curwind;

extern int nsavs,cursrow;
extern char *savptr[];
#define FLSIZE 10500
char *litarea, *las, *lae;
static long lao=0;

/************************************************************************/
addwind (windnum)       /*  ADD WINDow
  *  increments nwindows, causes forced exit if value exceeds MAXWINDS
  *  saves current cursor position and windnum in saved arrays
  *  must be called before readscrn ???????
  *  RETURNS:  nothing
  *  GLOBALS:  nwindows, savedrow[], savedcol[], savedwn[]
  **/
int windnum;     /*  number of window    */
{ nwindows++;
  if (nwindows> MAXWINDS)
  { printf("ERROR nwindows exceeds limit= %d^G^G^G\n",nwindows);
    dispmem(0);
    exit(0);
    }
```

```
  savedrow[nwindows]= crow;
  savedcol[nwindows]= ccol;
  savedwn[nwindows]=windnum;
  }

/*************************************************************************/
discwind (disp)         /* DISCard WINDow
  *  discards latest window displayed
  *  screen is refreshed with saved data if disp == TRUE
  *  else saved data is freed
  *  RETURNS:  number of new active window
  *  GLOBALS:  nwindows, scrsave[], saved..[]
  **/
int disp;
{  int i;
   /* refresh area hidden by window */
   WINDOW *old;
   int newwind;

   newwind= savedwn[nwindows-1];
   if (nwindows > 1) {
     old = windows+savedwn[nwindows];
     if (disp)    /* if replacing where timeline was, start from row 1 */
     { writscrn( (savedwn[nwindows]== WNTIMEL) ? 1 : old->frow,
         old->fcol,old->lrow,old->lcol,scrsave[nwindows]);
       wrtl25(newwind);
       cursor(savedrow[nwindows], savedcol[nwindows]);
       }
     }
   if (nwindows<=1 || !disp) cfree(savptr[--nsavs],"ERROR FREEING IN WIND");
   nwindows--;
   fldnum= savedfld[nwindows];
   if (newwind<0 || newwind>= LWIND)
   { printf("error in discwind. newwind nwindows= %d %d\n^G^G^G",
       newwind,nwindows);
     for (i=0; i<= nwindows; i++) printf("savedwn[%d]= %d\n",i,savedwn[i]);
     printf("savedwn= %lx\n",savedwn);
     dispmem(0);
     }
   return(newwind);
   }

/*************************************************************************/
dispwind (windnum)      /*  DISPlay WINDow
  * saves screen info which will be "hidden"
  * REQUEST:  display window # 'windnum'
  **/
int windnum;  /* window # to display */
{  WINDOW *new;

   new=windows+windnum;

   /* save old screen information */

   /* savedfld[nwindows]= fldnum; */
   addwind(windnum);
   if (windnum<0 || windnum>=LWIND)
   { printf("^G^G^G error in dispwind.  windnum, nwindows= %d %d\n",
       windnum,nwindows);
     dispmem(0);
     }

     /* screen is saved before saving timeline since screen is modified */
   if (windnum!= WNTIMEL)  /* SEE CONTROL.C,  function TIMEL          */
     scrsave[nwindows]= readscrn( new->frow, new->fcol,new->lrow,new->lcol);
   dspwnd(windnum);
   }
```

```
/*********************************************************************/
dspwnd (windnum)        /*  DiSPlay WiNDow
  *  sets curwind to windnum
  *  displays literals and line25 info (if any) of the window
  *  calls dspflds to display fields
  *  RETURNS:  nothing
  *  GLOBALS:  curwind,windows[]
  **/
int windnum;
{
  FIELD *infield;
  WINDOW *w;
  int i;
  curwind= windnum;
  w=windows+windnum;

  /* display w screen information */
  for (i=0;i < (w->nlit);++i) {
    cursor((w->frow)+i,w->fcol);
    wrtstr(*(w->literals+i),w->dispatt);
    }
  if (strcmp(w->line25," ") >0) wrtl25(windnum);
  dspflds(windnum);
  }

/*********************************************************************/
dspflds (windnum)  /* DiSPlay FieLDS
  *  calls dfld for each field of window
  *  RETURNS:  nothing
  *  GLOBALS:  windows[]
  **/
int windnum;
{ int i;
  WINDOW *w;
  FIELD *f;
  w= windows+ windnum;
  for (i=0, f= w->flds; i < (w->nfield); ++i, f++) dfld(w,f,1);
  }

/*********************************************************************/
dspfld (fnum,windnum)  /* DiSPlay FieLD
  *  sets up and calls dfldc
  *  RETURNS:  nothing
  *  GLOBALS:  windows[]
  **/
int fnum,windnum;
{ WINDOW *w;
  FIELD *f;
  w= windows+ windnum;
  f= w->flds;
  f+= fnum;
  dfldc(w,f,1);
  }

/*********************************************************************/
dfldc (w,f,af)  /*  Display FieLD move Cursor
  *  calls dfld
  *  sends cursor to crow, ccol
  *  RETURNS:  nothing
  *  GLOBALS:  crow, ccol
  **/
WINDOW *w;
FIELD *f;
int af;
{ int r,c;
  r= crow; c= ccol;
  dfld(w,f,af);
  cursor(r,c);
  }
```

```
/**********************************************************************/
dfld (w,f,af)          /*  Display FieLD
  *  actually displays field on screen
  *  first moves cursor to frow and fcol of field
  *  if af != 0, replaces screen attributes with w->deatt
  *  RETURNS:  nothing
  *  GLOBALS:  none
  **/
WINDOW *w;
FIELD *f;
int af;  /* =0 if are not to change attribute of field */
{ char buf[81];
  int i,ac,att,playos;
  static int cols[6]= { 20, 30, 40, 50, 60, 70 };

  att= (af || smode > MODE80 ) ? w->deatt : -1;
  strcpy(buf,f->data);
  stcpadr(buf,f->length,0);
  playos=-1;
  if (f->row==ORPLAY1) playos=0;
  else if (f->row== ORPLAY2) playos=1;
  if (abs(f->datat)== VID && playos>=0)   /* have a video segment */
  { for (i=0; i< 6; i++) if (f->col== cols[i]) break;

    if (video[playos][i+ctlcol]!=NULLADDR) {
      if (af) att= (video[playos][i+ctlcol]->vidof=='Y') ? ATVIDON : ATVIDOFF;
      if (video[playos][i+ctlcol]->segtype==2) stcfillr(buf,0xF7);
        /*f7=double tilde */
      }
    }
  cursor(f->row,f->col);
  wrtstrn(buf,att,f->length);
  }


static char * alloclit (len)
int len;
{ char *p;
  if (lae- las <= FLSIZE-len)
  { p= lae;
    lae+= len;
    }
  else
  { p= cmalloc(len,"WIND1");
    lao+= len;
    }
  return(p);
  }

readwind ()

{  /* read window and field information from @window file */
   int i,n,j;
   FILE *fp;
   char *p, *fldata, *125;
   WINDOW *w;
   FIELD *f;
   char temp[86];
   int litlen;
   char v[4];

   litarea= cmalloc( FLSIZE,"WIND2");
   las= litarea;
   lae= las;

   numflds= numwinds=0;

   w=windows;
   f=fields;

   fp=fopenx("@WINDOW","rb");
```

```
freadx(v,3,1,fp);
v[3]='\0';
sscanf(v,"%d",&i);
if (i!= sysver) return(0);

p=(char *)w;
while ((n=freadx(p,sizeof(*w),1,fp)) > 0) {
  if (n != 1) error("error reading","");
  else {
    numwinds++;
    w->flds=f;
    for (i=0;i<w->nfield;++i) {
      p=(char *) f;
      n=freadx(p,sizeof(*f),1,fp);
      if (n != 1) {
        printf("numwinds i w->nfield= %d %d %d\n",numwinds,i,w->nfield);
        error("error reading fields","");
        }
      else {
        f->data= alloclit( f->length+1);
        *(f->data)=NULL;
        f++;
        numflds++;
        }
      }
    p = alloclit(w->nlit *4);

    w->literals=  (CHARPTR *) p;
    litlen= w->lcol - w->fcol +1;
    for (i=0;i<w->nlit;++i) {
      n=freadx(temp,85,1,fp);
      if (n != 1) error("error reading literals","");
      else
      { temp[litlen]= '\0';
        stctrimr(temp);
        stcpadr(temp,litlen, 0);
        p= alloclit(litlen+1);
        if (i==0 && (numwinds-1)==WNPHRASE) litaddr= p;
        *(w->literals+i)= p;
        strcpy( p, temp);
        }
      }
    w->line25= alloclit(85);
    n=freadx(w->line25,85,1,fp);
    if (n != 1) error("error reading line 25","");
    }
  w++;
  p=(char *)w;
  }
fclosex(fp);
if (numwinds != LWIND || numflds> NFIELDS ) {
  printf("ERROR. numwinds numflds = %d %d\n",
    numwinds,numflds);
  exit(0);
  }

if (debug) printf("readwind.e lae-las lao= %lx %lx\n",lae-las,lao);
return(1);
}

setdef (windnum) /* set defaults for fields within window # 'windnum' */
int windnum;
{
   WINDOW *w;
   FIELD *f;
   int i;

   w=windows + windnum;
   for (i=0, f=w->flds; i<(w->nfield); ++i, f++) {
     strcpy(f->data,f->dfault);
     stcpadr(f->data,f->length,0);
     }
   }
```

```
/***********************************************************************/
entwind ( windnum, fn)  /*  ENTer WINDow
  *  positions cursor on field number 'fn' of window # 'windnum'
  *  allows for data entry.
  *  RETURNS: above action codes upon exit
  *  GLOBALS:
  **/
int windnum;  /* window number that you are working in */
int fn;       /* field number to start with            */
{
   FIELD *f;
   WINDOW *w;
   int retcode=NO;
   int ch,i;
   int t,att,errfld;
   char temp[80];
   fldnum= fn;
   w=windows+ windnum;
   f=w->flds+fldnum;

   while (f->datat== DISPONLY) { f++; fldnum++; }

   actfld(f,w);
   dl25(windnum);
   while (retcode==NO) {
     if (windnum==WNTIMEL) actcol= (fldnum % NTLCOL)+ ctlcol;
     lch= getchx();
       /* if field is blank, clear out data */
     t= chtype(lch);
     if ( windnum== WNTIMEL
          && chtype(lch) != TASCII && fisblank(windnum,fldnum) )
     { if (crow== ORTIME)  /* have blank time row */
       { if (ctlcol==0 && actcol==0)
         { /* are trying to blank out time entry in first column. can't do that*
/
           strcpy(ssval[SRTIME][0],kbdtemp);
           dfldc(w,f,0);
           deactfld(f,w);
           actfld(f,w);
           beep("You cannot blank out the first time entry.");
           continue;
           }
         else
         if ( !isblank(ssval[SRPLAY1][actcol]) ||
              !isblank(ssval[SRPLAY2][actcol]) ||
              !isblank(ssval[SRTOUCH][actcol]) ||
              !isblank(ssval[SRL25  ][actcol])
              ) ,
         { /* are trying to blank out time entry that has video in it */
           strcpy(ssval[SRTIME][actcol],kbdtemp);
           dfldc(w,f,0);
           deactfld(f,w);
           actfld(f,w);
           beep(
"You cannot blank out the time when you have video, icons or touch in the column
.");
           continue;
           }
         else tenths[actcol]= 0; /* set tenths to 0 */
         }
       else
       { blnkdata(crow, actcol);
         entered= NO;
         }
       }
     switch (chtype(lch)) {
       case TFN: /* quick special case regarding WNPHRASE */
         if (lch!=F3 && windnum!= WNPHRASE && entered == YES)
         { beep("Press ENTER to complete entry first.");
           continue;
           }
         if (actwind!= WNTIMEL && actwind != WNOUTL && lch== ESC)
```

```
  { errfld=-1;
    f= w->flds+fldnum;
    if (!chkch(f->data, f->datat)) errfld= fldnum;
    f= w->flds;
    for (i=0; i< w->nfield && errfld==-1; i++,f++)
      if (!chkch(f->data, f->datat)) errfld=i;
    if (errfld>=0)
    { beep("What you entered into the field is not valid.");
      deactfld(f,w);
      actfld(f,w);
      entered= YES;
      continue;
      }
    f= w->flds+fldnum;
    }
  retcode= (lch==F3) ? QUIT : DOSOME;
  deactfld(f,w);
  break;
case TMOVE:
  switch(lch) {
    case INS:
      if (stxinscf(f->data,chcount,' ',0) )
      { dfldc(w,f,0);
        entered= YES;
        }
      else beep("Inserting a space would cause loss of a character.");
      break;

    case DEL:
      stxdelcf(f->data,chcount);
      dfldc(w,f,0);
      entered= YES;
      break;

    case LFT:
      if (entered== NO &&
        windnum== WNTIMEL && (fldnum==0 || f->row!= (f-1)->row ) )
      { retcode= DOSOME;
        break;
        }
      /* intentional fall through */
    case BACKSPA:
      if (entered==NO)
      { if (((fldnum-1) >= 0) && ((f-1)->datat != DISPONLY)) {
          deactfld(f,w);
          fldnum--;
          f--;
          actfld(f,w);
          }
        else beep("You cannot move to the left anymore.");
        }
      else
      { if (chcount >0) { chcount--; dataptr--; cursor(crow,ccol-1); }
        else beep("This is as far to the left as the cursor can go.");
        }
      break;

    case RGT:
      if (entered==NO)
      { if (windnum== WNTIMEL && (f->row!= (f+1)->row) )
        { retcode= DOSOME;
          break;
          }
        if (((fldnum+1) < w->nfield) && ((f+1)->datat != DISPONLY)) {
          deactfld(f,w);
          fldnum++;
          f++;
          actfld(f,w);
          }
        else beep("Going past end of field.");
        }
```

```
          else
          { if (chcount < (f->length-1))
            { chcount++; dataptr++; cursor(crow,ccol+1);
              }
            else beep("Cannot move cursor anymore to the right in this field"
);
            }
          break;
        case CLF:
          entered= YES;
          stcblnkn(dataptr,f->length-chcount,0);
          dfldc(w,f,0);

          if (chcount==0)
          { blnkdata(crow, actcol);
            entered= NO;
            }

          break;
        default: break;
        }
      break;
    case TMOVEF:
      if (entered==YES) beep("Press ENTER to complete entry first.");
      else switch(lch) {
        case HOM:
          deactfld(f,w);
          if (actwind== WNTIMEL)
          { f= w->flds+ NTLCOL;
            fldnum= NTLCOL;
            settl(0,0);
            actcol=0;
            dspwnd(WNTIMEL);
            }
          else
          { fldnum=0;
            f= w->flds;
            while (f->datat== DISPONLY) { f++; fldnum++; }
            }
          actfld(f,w);
          break;

        case END:
          deactfld(f,w);
          if (actwind== WNTIMEL)
          { t= lcolumn()-1;
            if (t<0) break;  /* time line is empty */
            if (t< NTLCOL-1) { fldnum= NTLCOL+ t; t= 0; }
            else { fldnum= NTLCOL+ NTLCOL- 1; t-= NTLCOL-1; }
            f= w->flds+ fldnum;
            settl(0,t);
            actcol= ctlcol+ t;
            dspwnd(WNTIMEL);
            }
          else
          { fldnum= w->nfield- 1;
            f= w->flds+ fldnum;
            }
          actfld(f,w);
          break;
        case UP:
          if ( (fldnum - w->ord) >=0 && (f-w->ord)->datat != DISPONLY)
          { deactfld(f,w);
            fldnum-=(w->ord);
            f-=(w->ord);
            actfld(f,w);
            }
          else beep("You cannot move the cursor up any more.");
          break;
```

```
    case DN:
      if ((fldnum + w->ord) < w->nfield
        && ((f+w->ord)->datat != DISPONLY) )
      { deactfld(f,w);
        fldnum+=(w->ord);
        f+=(w->ord);
        actfld(f,w);
        }
      else beep("You cannot move the cursor down anymore.");
      break;
    }
  break;

case TRETURN:
  stcpadr(f->data,f->length,0);

  if (actwind== WNTIMEL && isblank(ssval[SRTIME][actcol]) &&
  (crow== ORPLAY1 || crow== ORPLAY2 || crow== ORTOUCH || crow== ORL25) )
  { /* are entering video into a blank column */
    stcblnk(ssval[SRPLAY1+(crow- ORPLAY1)][actcol]);
    dfldc(w,f,0);

    beep(
    "The time entry is blank.  You cannot enter a value in this line.");
    break;
    }

  deactfld(f,w);
  if (!chkch(f->data, f->datat))

   { beep("What you entered into the field is not valid.");
     actfld(f,w);
     entered= YES;
     break;
     }
   else if (f->intflag >0) {
     lfield= fldnum;
     retcode = (fldnum+1== w->nfield) ? FINTDONE : FINT;
     }
   else if ((fldnum+1) == w->nfield) {
     lfield= fldnum;
     retcode= DONE;
     }
   else {
     fldnum++;
     f++;
     actfld(f,w);
     }
   break;
 case TASCII:
   if (chcount < f->length) {
  /* if (chkch(lch,f->datat)) */ {
       entered = YES;
       *dataptr=lch;

       if (smode== MODE80) att=-1;  /* don't change attribute */
       else att= w->deatt; /* must specify attribute */
       if (wrtch(lch,att))
       { dataptr++;
         chcount++;
         }
       }
  /* else beep(10); */
     }
   else beep("FIELD TOO LONG");
   break;
 default:
   sprintf(temp,"UNDEFINED KEY %2x",lch);
   beep(temp);
   break;
```

```
      }
     dl25(windnum);
     }

  if (windnum==WNTIMEL) actcol= (fldnum % NTLCOL)+ ctlcol;
  savedfld[nwindows]= fldnum;
  return (retcode);
  }

/*
leavefld (f,w)
FIELD *f;
WINDOW *w;
{ int rc;
  deactfld(f,w);
  if(f->intflag>0) {
    lfield= fldnum;
    rc = (fldnum+1== w->nfield) ? FINTDONE : FINT;
    }
  else if ((fldnum+1) == w->nfield) {
    if (chkch(f->data, f->datat)) {
      lfield= fldnum;
      rc= DONE;
      }
    else {
      beep("BAD DATA IN FIELD.");
      actfld(f,w);
      }
    }
  else {
    fldnum++;
    f++;
    actfld(f,w);
    }
  return(rc);
  }
*/

/***************************************************************************/
wrtl25 (windnum)          /*      WRiTe Line25
  *  displays line 25
  *  first displays l25 info of active window,
  *  then calls dl25 to display info specific to timeline row
  *  RETURNS:  nothing
  *  GLOBALS:  crow, ccol, windows[]
  **/
int windnum;
{ int r,c;
  char l25[81];
  r= crow;
  c= ccol;
  cursor(25,1);
  strcpy(l25,(windows+windnum)->line25);
  stcpadr(l25,80,0);
  wrtstr(l25,0x1F);
  dl25(windnum);
  cursor(r,c);
  }

/* Display Line 25 for timeline. */
/* put information on what to do next in lower left part of line 25 */
/* uses 'crow' to see what row the cursor is in */
dl25 (windnum)
int windnum;
{ WINDOW *w;
  static int orow=-1;
  int r,c;
  w= windows+ windnum;
  if (windnum== WNTIMEL && orow!= crow) {   /* output bottom line */
    switch (crow) {
```

```
      case ORTIME    : w125("ENTER TIME for COLUMN"       ); break;
      case ORPLAY1   :
      case ORPLAY2   : w125("ENTER FRAME#/P/S/(UN)LOAD"   ); break;
      case ORGRAPH   : w125("FILENAME OF DISPLAY"         ); break;
      case ORLIT     :
      case ORTOUCH   :
      case ORL25     :
      case ORSOUND   :
      case ORKBD     :
      case ORINDIC   : w125("F4 FOR LABEL"                ); break;
      case ORMISC    : w125("LOG,NOLOG,FIND,READ,WRITE"   ); break;
      }
    r= crow;
    c= ccol;
    if (1<orow && orow<25) {
      cursor(orow,3);
      color(w->dispatt,15);
      }
    cursor(r,3);
    color(0x30,15);
    cursor(r,c);
    orow=crow;
    }
  }

/*************************************************************************/
w125 (s)        /* Write string to Line25
  *  writes string s to line 25
  *  uses attribute 7 (grey on black)
  *  RETURNS:  nothing
  *  GLOBALS:  crow, ccol
  **/
char *s;        /*  string pointer   */
{ int r,c;
  r= crow;
  c= ccol;
  cursor(25,1);
  wrtstrn(s,0x7,28);
  cursor(r,c);
  }

/**********************************************************************/
actfld (f,w) /* ACTivate FieLD
  *  "activate" field for data entry by changing display attribute
  *  and displaying brackets
  *  RETURNS:  nothing
  *  GLOBALS:  dataptr, chcount
  **/
FIELD *f;
WINDOW *w;
{
   if (entered== STAYYES) entered = YES;
   else entered= NO;
   makeynx = (f->datat== YNX) ? 1 : 0;
   makeuppr= (f->datat<0) ? 1 : 0;
   makelowr= (f->datat<0==LOWER) ? 1 : 0;
   stcpadr(f->data,f->length,0);
   chcount=0;
   dataptr= f->data;
   if (actwind== WNTIMEL) {
     cursor(f->row,f->col);
     color(ATTIMELE,f->length);
     if (!entered) strcpy(kbdtemp,f->data);   /* if have started to enter it
                                                 don't reset it */
     }
   else {
     cursor(f->row,f->col-1);
     wrtch('[',w->deatt /* 0 */ );
     cursor(f->row,((f->col)+(f->length)));
```

```
      wrtch(']',w->deatt /* 0 */ );
      }
   cursor(f->row,f->col);
   }
/**********************************************************************/
deactfld (f,w) /* DEACTivate FieLD
  *  "deactivate" field for data entry by changing display attribute
  *  and removing brackets
  *  RETURNS:  nothing
  *  GLOBALS:  actwind, smode
  **/
FIELD *f;
WINDOW *w;
{  char buf[81];
   stctrim(buf,f->data,0);  /* trim off leading and trailing blanks */
   strcpy(f->data,buf);     /* copy back */
   if (actwind!= WNTIMEL)
   { cursor(f->row,(f->col)-1);
     wrtch(' ',w->deatt /* 0 */ );
     cursor(f->row,((f->col)+(f->length)));
     wrtch(' ',w->deatt /* 0 */ );
     }

   dfld(w,f,( (actwind== WNTIMEL) || (smode!= MODE80) ) );
   cursor(f->row,f->col);
   makeuppr= 0;
   makelowr= 0;
   }

/**********************************************************************/
error (str1, str2)      /*  ERROR
  *  displays error message as concatenation of two strings
  *  causes forced exit of pgm
  *  RETURNS:  nothing
  *  GLOBALS:  none
  **/
char *str1, *str2;      /*  string pointers      */
{  printf("%s%s\n",str1,str2);
   exit(0);
   }

/**********************************************************************/
sscol (cellnum)   /* SpreadSheet COLumn
  *  cellnum is the cell number (base 1) of SpreadSheet
  *  the cells of column 0 are numbered 1,2,3,4,5,6...
  *  RETURNS:  the column (base 0) of the cell
  *  GLOBALS:  none
  **/
int cellnum;     /*  cell number */
{ return( (cellnum-1)/NTLROW);
  }

/**********************************************************************/
ssrow ( cellnum)  /* SpreadSheet ROW
  *  cellnum is the cell number (base 1) of SpreadSheet
  *  the cells of column 0 are numbered 1,2,3,4,5,6...
  *  RETURNS:  the row (base 0) of the cell
  *  GLOBALS:  none
  **/
int cellnum;     /*  cell number */
{ return( cellnum- sscol(cellnum)*NTLROW) - 1;
  }

/**********************************************************************/
cnum (row, col)          /*  Cell NUMber
  *  row and col are base 0
  *  the cells of column 0 are numbered 1,2,3,4,5,6...
  *  RETURNS:  the cell number (base 0!!!)
  *  GLOBALS:  none
  **/
```

```
int row,col;
{ return(col*NTLROW+row);
  }

/*rssval= ssval; */

/******* to scroll right sncols *******/
  /* rssval+= (sncols* NTLROW);*/
  /*  redisplay  */

/* strpblnk(p)
char *p;
{
   int i;

   while (*p==' ' || *p=='\0') {
     p--;
     }
   p++;
   *p='\0';
   return;
   }
*/

/********************************* WORDS.C ***********************************/
/*                                                                            */
/*                                                                            */
/******************************************************************************/

#include "\c\stdio.h"
#define EXTERN extern
#include "state.i"
#include "keys.i"
#include "userproc.i"

#define NWRECS   9  /* # of word records   */

char wordbuf[MAX_SPEECH_LEN+2];

char *fl;

phrase (action)   /*  speech handler */
int action;
{
  int ch; retcode;
  int rc,i,orow,ofield;

  fl= (char*) (*(windows+WNPHRASE)->literals);
  rc=0;
  switch (action) {
    case START:
      ofield= fldnum;    /* remember original field */
      orow=   crow;      /* remember current row    */
      ldphrase();
      dispwind( WNPHRASE);
      fldnum= 0;
      break;

    case RESUME: fldnum= savedfld[nwindows]; dspwnd(WNPHRASE); break;
    }

  while (!rc) {
    retcode= entwind(WNPHRASE, fldnum);
    if (retcode== QUIT)
    { actwind= discwind(1);

      stcblnk(ssval[orow-(ORPLAY1-SRPLAY1)][actcol]);
      blnkdata(orow,actcol);
      dspfld(ofield, actwind);
```

```
      rc= RESUME;
      break;
      }
    if ( (lch== ESC) || (lch== RETURN && retcode==FINTDONE) ) { /* are done */
      if (svphrase()) { /* save and check words */
        actwind= discwind(1);
        rc= RESUME;
        break;
        }
      continue;
        }
      if (lch== RETURN) fldnum++;  /* go to next field */
      if (lch== F2) word(START);
      }
    return(rc);
    }

word (action)     /*  word list handler */
int action;
{ int rc, r, c;
  int first, fstword, curword;
  first=1;
  fstword= curword= 0;
  while (1)
  {
    rc= selfrlist( (first) ? START : RESUME,
      WNWORDS,  &fstword, &curword, NWRECS, nwords, wrds, 2);
    first=0;
    if (rc<0) break;
    else   /*** have selected a word ***/
    { svbuf();
      stctrimr(wordbuf);
      if (*wordbuf) strcat(wordbuf," ");
      if (strlen(wordbuf) + strlen(wrds[rc]) >
        MAX_SPEECH_LEN/2) stcpadr(wordbuf,MAX_SPEECH_LEN/2,0);
      if (strlen(wordbuf)+ strlen(wrds[rc]) >= MAX_SPEECH_LEN)
        beep("Adding too many words to list");
      else
      {
        strcat(wordbuf,wrds[rc]);
        ldbuf();
        r= crow; c= ccol;
        dspflds(WNPHRASE);
        cursor(r,c);
    } } }
  }

ldphrase ()
{
  if (words[actcol]== NULLADDR)
  { setdef(WNPHRASE);
    *wordbuf= '\0';
    }
  else {
    strcpy(wordbuf,words[actcol]);
    ldbuf();
    }
  }

svphrase ()
{ int i,l,have,t,nw;
  char *dv;  FIELD *f;
  char c,*cp, tword[81];
  char ml[81];
  char dq[2]; dq[0]='"'; dq[1]='\0';
  if (spaddr[actcol]== NULLADDR) spaddr[actcol]=
    (unsigned int *) cmalloc(2* MAXWCOL);
  dv= words[actcol];
  svbuf();
```

```
  i=0;
  nw=0;
  while ( (i=getword(wordbuf,tword,i)) >=0 ) {
    have=0;
    for (l=0; l<nwords; l++) {
      stxlower(tword);
      t= stscmpnb(tword,wrds[l]);
      if (t==0) { have=1; spaddr[actcol][nw++]= wrdaddr[l]; break; }
      /* if (t<0) break; */ /* check entire list now */
      }
    if (!have) {
      strcpy(m1,"The word ");
      strcat(m1,dq);
      strcat(m1,tword);
      strcat(m1,dq);
      strcat(m1," is not on the word list.");
      wmsg(m1);
      spaddr[actcol][nw]=0;
      return(0);
      }
    }

  if (dv== NULLADDR) words[actcol] = cmalloc(MAX_SPEECH_LEN+2);
  strcpy(words[actcol],wordbuf);
  spaddr[actcol][nw]=0;
  return(1);
  }

getword (from,to,start)
char *from, *to;
int start;
{ int i,j;
  i= start;
  to[0]='\0';
  while(from[i]==' ') i++;  /* trim off leading blanks */
  for (j=0; from[i] && from[i]!=' '; i++, j++) to[j] = from[i];
  to[j]= '\0';
  if (!to[0]) i=-1;
  return(i);
  }

ldbuf ()
{ char c,*cp;
  FIELD *f;
  int i;

  stcpadr(wordbuf,MAX_SPEECH_LEN,0);
  f= (windows+ WNPHRASE)->flds;
  cp= ((char*) wordbuf)+f->length;
  c= *cp;
  *cp= '\0';
  strcpy(f->data,wordbuf);

  f++;
  *cp= c;
  if (c== ' ') cp++;  /* this is the way it is now, but some phrases might */
                      /* not be this way from old versions */
  *(cp+f->length)= '\0';

  strcpy(f->data,cp);
  }


svbuf ()  /* move window into 'wordbuf' */
{ FIELD *f;
    /* saving words in 'words' */
  f= (windows+ WNPHRASE)->flds;
  stcpadr(f->data, f->length, 0);
  strcpy(wordbuf,f->data);
  strcat(wordbuf," "); /* add space to end */
```

```
  ++f;
  stcpadr(f->data,f->length, 0);
  strcat(wordbuf,f->data);
  }

invwords ()  /* invert addresses on word list */
{ int i,j;
  for (i=0; i< NTLDCOL; i++)
  { if (spaddr[i]!= NULLADDR)
      for (j=0; j<MAXWCCL; j++)
      { if (spaddr[i][j]) spaddr[i][j]= invert(spaddr[i][j]);
        else break;
        }
    }
  }


invert (n)
int n;
{ char *p1,*p2;
  int i;
  p1= (char*) &n;
  p2= (char*) &i;
  *p2= *(p1+1);
  *(p2+1)= *p1;
  return(i);
  }


#define NERECS  10  /* # of event records   */
#define EVTRLEN 13  /* event recrod length */
#define EVTDLEN  8  /* event data length   */

extern char *dataptr;
extern int chcount, curwind;
event (action)
int action;
{ int ch;
  int i,j,t,tl, rc;
  int tchcount, tcurwind, tfldnum;
  int zerol, zero2;
  char *tdataptr;

  tchcount=chcount;
  tcurwind=curwind;
  tdataptr=dataptr;
  tfldnum= fldnum;

  zerol= 0;
  zero2= 0;
  rc= selfrlist( START, WNEVTS, &zerol, &zero2, NERECS, nevents, events, 1);
  if (rc== -1 || actwind != WNOUTL)
  { chcount= tchcount;
    curwind= tcurwind;
    dataptr= tdataptr;
    fldnum=  tfldnum;
    return(0);
    }
    /* must have hit the return key */
  strcpy(evname,events[rc]);
  return(GOTOEVT);
  }

static cpythem (newfitem, fitem, actflag)
int newfitem, fitem, actflag;
{ if (actflag==2) return(cpystuff( newfitem,fitem,nwords, wrds,  2, WNWORDS));
  else            return(cpystuff( newfitem,fitem,nevents, events, 1, WNEVTS));
  }
```

```
static cpystuff (newfitem, fitem, nitems, items, itmf, windnum )
int newfitem, fitem, nitems, itmf, windnum;
char *items[];
{ int i;
  WINDOW *pw;
  FIELD *pf;

  pw= windows + windnum;
  pf= pw->flds;

  if (newfitem >= nitems)
  { beep("YOU ARE AT THE BOTTOM");
    newfitem= nitems-1;
    }
  if (newfitem<0)
  { beep("YOU ARE AT THE TOP");
    newfitem=0;
    }

  if (newfitem!= fitem)
  { for (i=0; i<pw->nfield; i++)
    { if (newfitem+i>=nitems) stcblnkn( pf->data, pf->length,0);
      else strcpy( pf->data, items[newfitem+i]);
      stcpadr(pf->data, pf->length,0);
      pf++;
      }
    }
  return(newfitem);
  }

  /* select from list */
selfrlist (action, window, ffld, cfld, nrecs, nitems, items, actflag)
int action, window, *ffld, *cfld, nrecs, nitems;
int actflag;  /* if =1, this says take value and return */
char *items[];
{ FIELD *f; WINDOW *w;
  int ch, retcode, rc,i, ofld, r, c;
  int fstfld, curfld;
  fstfld= *ffld;
  curfld= *cfld;

  actwind= window;
  w= windows+ actwind;
  f= w->flds;
  rc=0;
  switch (action) {
    case START:
      curfld=0;
      fstfld= cpythem(0, -1, actflag); /* = -1 cpythem will load in items */
      dispwind( window);
      cursor( (f+curfld)->row, (f+curfld)->col);
      break;

    case RESUME:
      break;
    }

  while (1) {
    ofld= fstfld;
    ch= getchx();
    if (chtype(ch)== TASCII)  /* have entered a letter */
    { ch= (actflag==1) ? toupper(ch) : tolower(ch);
      for (i=0; i< nitems; i++) if (ch== items[i][0]) break;
      curfld=0;
      if (i>= nitems) i= 0; /*if didn't find anything, show beginning of list*/
      if (i)    /* if are not at the beginning of the file, we want to show
                 one record before the record that was found.  This just
                 adds some context within which to look at the record      */
```

```
      { i--;
        curfld++;
        }
      fstfld= cpythem(i,fstfld,actflag);
      }
    if (ch==RETURN)
    { if (actflag==1) actwind= discwind(1);  /* off in words */
      *ffld= fstfld; *cfld= curfld;
      return( fstfld+ curfld);
      }
    if (ch== F3 || ch== ESC)
    { actwind= discwind(1);
      *ffld= fstfld; *cfld= curfld;
      return(-1);
      }
    if (ch== UP || ch== LFT) {
      if (curfld>0) curfld--;
      else fstfld= cpythem(fstfld-1,fstfld,actflag);
      }

    if (ch== DN || ch== RGT) {
      if (curfld< nrecs-1) curfld++;
      else fstfld= cpythem(fstfld+1,fstfld,actflag);
      }
    if (ch== PDN) fstfld= cpythem(fstfld+nrecs,fstfld,actflag);
    if (ch== PUP) fstfld= cpythem(fstfld-nrecs,fstfld,actflag);
    if (ch== HOM) fstfld= cpythem(0,fstfld,actflag);
    if (ch== END) fstfld= cpythem(nitems-nrecs,fstfld,actflag);
    if (ofld!= fstfld) dspwnd(window);
    cursor( (f+curfld)->row, (f+curfld)->col);
    }
  }

#include <\c\stdio.h>   /* Standard header         */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"

/************************ Local globals to write_event ***********************
* event_info is a char array that holds the file image of all the CTL file   *
* records for a given event                                                  *
******************************************************************************/

char config, old_config;

extern   int    event_info_psn;
         int    first_opcode_psn;
extern   char   *dir_to_use, *event_name;
         int    last_valid_col;
extern   char   calctime[NTLDCOL];
extern   int    c_col,f_col,l_col;

int lastplayer;  /* last player used */

/**************************************************************************/
int   writeevt (pres_name, evt_name)    /* WRITE EVenT
  *  opens the key and control files and then assembles all the information
  *  in the array event_info[] as one continuous stream. This is all done
  *  by assemble_info(). Put_event() actually writes it.
  *  RETURNS:  nothing
  *  GLOBALS:  file pointers
  **/
char  *pres_name;        /*  pointer to presentation name         */
char  *evt_name;         /*  pointer to event name                */
{
```

```
extern   FILE  *lit_file, *lit_key_file, *var_file, *var_key_file;
TIME_REC *p1;
int   done = FALSE;
int   need_line25;
int   row;
int   key;
int   word;
int   blank_col;
int   i;
char event_name[EVENTLEN+1];
DSVIDEO *pv;

lastplayer= 0;

strcpy(event_name,evt_name);
stcpadr(event_name, EVENTLEN, 0);

last_valid_col = -1;

setmem(event_info, event_info_psn+1, '\0');

for (c_col = 0; c_col < NTLDCOL; ++c_col) calctime[c_col] = (char)FALSE;

/* For asterisks, must reserve first NTLDCOL + 2 or 3 bytes of event_info.   */
/* If you want the asterisks, use the following statement :                 */
/*                                                                           */
/* event_info_psn = sizeof(p1->length) + NTLDCOL + 1;                        */
/*                                                                           */
/* If you don't want the asterisks, use :                                    */
/*           event_info_psn = 0;                                             */

event_info_psn = 0;    /* No asterisks */

if (debug) printf("In writeevt.\n");
wipetime=0;
lwipetime=0;
c_col = 0;
blank_col = FALSE;

for ( f_col=0; f_col< NTLDCOL; f_col= l_col+1 )  /* Go column by column */
{   /* set l_col */
  c_col= f_col;  /* this is just to be safe */
  l_col= f_col;
  while ((l_col< (NTLDCOL-1)) && isblank(ssval[SRTIME][l_col+1]) ) l_col++;
  if (debug) printf("f l_col eip= %d %d %d\n",f_col,l_col,event_info_psn);

  if (!isblank(ssval[SRTIME][f_col]))
  { if (!blank_col)
    { event_info_psn += sizeof(TIME_REC) + 1;
      last_valid_col = f_col;
    } }

  blank_col = FALSE;
  first_opcode_psn = event_info_psn;
  event_info[first_opcode_psn] = (char)255;

/************* begin output of prioritized commands **************/
 /**   0 **/
  c_col= f_col;
  for (playeros= 0; playeros<=1; playeros++)
  { if (debug) printf(" writeevt.1  playeros c_col wipetime= %d %d %d \n",
      playeros,c_col,wipetime);
    pv= video[playeros][c_col];
    if (pv != NULLADDR)
    { encode_config(&config, playeros+1, pv->vidof, pv->track);
      if ( pv->segtype == MID_FRAME && config == old_config)
        wmid( (char)WAIT_FRAME);                                   /** 21 **/
      else if (pv->segtype== END_FRAME) wwaitend();                /** 25 **/
      }
    }
```

```
/**   5 **/
   for (c_col= f_col; c_col<= l_col; c_col++)
     if (print[c_col] != NULLADDR)  w_misc(c_col);                    /** 110 **/

/**  10 & 20 **/
    c_col= f_col;

    for (playeros= 0; playeros<=1; playeros++)
    { pv= video[playeros][c_col];
      if (pv!= NULLADDR)
      { encode_config(&config, playeros+1, pv->vidof, pv->track);
        if (pv->segtype== BEG_FRAME) wbeg(PLAY_VID_SEG);              /** 20 **/
        else
          if (pv->segtype== MID_FRAME && config != old_config)
            wmid( (char) CHG_AUD_VID); /* priority 10 */              /** 23 **/
        }
      }

/**  22 **/
    for (playeros= 0; playeros<=1; playeros++)
    { for (c_col= f_col; c_col<= l_col; c_col++)
        if (still[playeros][c_col] != NULLADDR) w_still(c_col);     /** 30 **/
      }

/**  23 **/
    for (playeros= 0; playeros<=1; playeros++)
    { for (c_col= f_col; c_col<= l_col; c_col++)
      { if (still[playeros][c_col] != NULLADDR)
          wplayer(still[playeros][c_col]->vidof-0x30);                /** 26 **/
        if (video[playeros][c_col] != NULLADDR &&
            video[playeros][c_col]->segtype!=3)
          wplayer(video[playeros][c_col]->vidof-0x30);                /** 26 **/
        }
      }

/**  24 &  24 **/
   c_col= f_col;
   if (line25[c_col]!= NULLADDR) w_line25(c_col);                 /** 71 & 72 **/

/**  25 &  30 **/
   for (c_col= f_col; c_col<= l_col; c_col++)
     if (graph[c_col]     != NULLADDR)  w_graph(c_col);         /** 40 41 42 **/

/**  40 **/
   for (c_col= f_col; c_col<= l_col; c_col++)
     if (lit[c_col]       != NULLADDR)  w_literal(c_col);                 /** 50 **/

/**  50 **/
   for (c_col= f_col; c_col<= l_col; c_col++)
     if (spaddr[c_col] != NULLADDR && *spaddr[c_col]) w_speech(c_col);/**80*/

/**  70 **/
   for (c_col= f_col; c_col<= l_col; c_col++)
   { if (!isblank(ssval[SRTOUCH][c_col]) &&
       stscmpn(ssval[SRTOUCH][c_col], "CLEAR", 5)!=0) wtchbr(c_col); /**70**/
     }

/**  71 **/
   for (c_col= f_col; c_col<= l_col; c_col++)
   { if (!isblank(ssval[SRTOUCH][c_col]) &&
       stscmpn(ssval[SRTOUCH][c_col], "CLEAR", 5)!=0)
     { wack(  c_col, 0, 19);
       wack(  c_col, 20, 39);
       wack(  c_col, 40, 49);                                             /** 73 **/
       }
     }

/**  79 **/
   for (c_col= f_col; c_col<= l_col; c_col++)
     if (str_compare(ssval[SRTOUCH][c_col], "CLEAR  ", 7))
        wcleartch();                                                      /** 61 **/
```

```
/** 80 **/
   for (c_col= f_col; c_col<= l_col; c_col++)
   { if (!isblank(ssval[SRTOUCH][c_col]) &&
        stscmpn(ssval[SRTOUCH][c_col], "CLEAR", 5)!=0)
     { wtouch(c_col, 0, 19);                                       /* 60 */
        wtouch(c_col, 20, 39);
        wtouch(c_col, 40, 49);
        }
     }

/**  90 **/
   for (c_col= f_col; c_col<= l_col; c_col++)
     if (stsisvar(ssval[SRKBD][c_col])) wvar(c_col);          /** 90 91 **/

/**  95 **/
   for (c_col= f_col; c_col<= l_col; c_col++)
     if (switches[c_col] != NULLADDR && switches[c_col]->opcode == SET_IND)
        wset(c_col);                                                /** 100 **/

/** 100 **/
   c_col= f_col;
   chk_op24(c_col,0);      /* Check for an opcode 24 */           /** 24 **/
   chk_op24(c_col,1);      /* Check for an opcode 24 */           /** 24 **/

   for (playeros= 0; playeros<=1; playeros++)
   { if (video[playeros][c_col]!= NULLADDR &&
          video[playeros][c_col]->segtype== BEG_FRAME) wbeg(VIDEO_START);
     }                                                              /** 22 **/

/** 110 **/
   for (c_col= f_col; c_col<= l_col; c_col++)
   { if (stscmpnb(ssval[SRKBD][c_col],"ADD")==0) wcalc(103);       /** 103 */
     else if (stscmpnb(ssval[SRKBD][c_col],"SUB")==0)  wcalc(104); /** 104 */
     else if (stscmpnb(ssval[SRKBD][c_col],"MULT")==0) wcalc(105); /** 105 */
     else if (stscmpnb(ssval[SRKBD][c_col],"DIV")==0)  wcalc(106); /** 106 */
     else if (stscmpnb(ssval[SRKBD][c_col],"EXP")==0)  wcalc(107); /** 107 */
/** 120 **/
     else if (stscmpnb(ssval[SRKBD][c_col],"SET")==0) wsetv(108);   /* 108 */
     else if (stscmpnb(ssval[SRKBD][c_col],"SETALL")==0) wsetv(108);/* 108 */
     }

/** 150 **/
   for (c_col= f_col; c_col<= l_col; c_col++)
   { if (keybrd[c_col]!= NULLADDR && !stsisvar(ssval[SRKBD][c_col]) )
        wdefkbd(c_col);                                             /** 92 **/
     if (switches[c_col] != NULLADDR && switches[c_col]->opcode== TEST_IND)
        wtest(c_col);                                               /** 101 **/
     if (switches[c_col] != NULLADDR && switches[c_col]->opcode== ADD_IND)
        wadd(c_col);                                                /** 102 **/
     }

/** 160 **/
   for (c_col= f_col; c_col<= l_col; c_col++)
   { if (stscmpnb(ssval[SRMISC][c_col],"FIND" )==0) w_file(FIND); /** 112 **/
     if (stscmpnb(ssval[SRMISC][c_col],"READ" )==0) w_file(READ); /** 113 **/
     if (stscmpnb(ssval[SRMISC][c_col],"WRITE")==0) w_file(WRITE);/** 114 **/
     }

   if (debug)
     printf("writeevt. before write_time:  f_col, wipetime= %d %d \n",
     f_col,wipetime);
   write_time(f_col, &blank_col);

   } /* End for loop looping thru columns */

  /* write_calc(0); */            /* Put the asterisks no-op out          */
                          /* Comment out if don't want the asterisks */

 put_event2(pres_name, event_name);         /* Write the event */
```

```
   /* Don't forget to write the next event opcode (200) */

   flushrw();

}  /* End write_event */

/*********************************************************************/
static write_calc (psn) /*  WRITE CALCulated time no-op
  *  writes the first calculated time no-op
  *  RETURNS: nothing
  *  GLOBALS: event_info[], calctime[]
  **/
int   psn;
{
   TIME_REC *p1;
   char     *p2;
   int      i;


   event_info[psn] = (char)NO_OP;
   ++psn;
   p1 = (TIME_REC *)(&(event_info[psn]));
   p2 = (char *)(&(p1->time));
   p1->length = NTLDCOL;

   for (i = 0; i < NTLDCOL; ++p2, ++i) *p2 = calctime[i];
} /* End write_calc */

/*********************************************************************/
int encode_config (config_ptr,player,video_flag,track)
                /*  ENCODE_CONFIGuration
  * takes the information in the bytes player(s), video_flag, and track
  * and encodes them in the necessary format to be placed into the
  * configuration byte, *config_ptr.
  * RETURNS:  nothing
  * GLOBALS:  none
  **/
char  *config_ptr;      /*  pointer to configuration byte */
int   player;
char  video_flag, track;
{ int t;
  int pl;

  char vf, tr;
  int debugoff;

  pl= player;
  vf= video_flag;
  tr= track;

/**** encoding table for video_flag ***/
/*                    playeros
     video_flag      0     1
                  +-----+-----+
          '1'     |  1  |  0  |
          '2'     |  0  |  1  |
                  +-----+-----+
*/

   *config_ptr = 0x00;
   t= ( (video_flag- 0x30) - (player-1) ) %2;
   if (video_flag!= '1' && video_flag!='2')
     printf("BAD VIDEO_FLAG FOR ENCODE.  video_flag= %x\n",video_flag);

   video_flag = t << 2;
   *config_ptr |= video_flag;

   player     <<= 3;
   *config_ptr |= player;
```

```
 if (track== 'S') track=3;
 else track-=0x30;
 *config_ptr |= track;

 debugoff=0;
 if ( (player & 0x10) && (player & 0x08) )
 { printf("ERROR IN PLAYER #^G^G\n");
   if (!debug)
   { debugoff=1;
     debug=1;
     }
   }
 if (debug)
 { printf(
"ENCODE.e config= %x  player #= %d (%d)  video f.= %d (%d)  track= %d (%d)\n",
       *config_ptr, player, pl, (int) video_flag, (int) vf,
       (int) track, (int) tr);
   printf("wipetime= %d ",wipetime);
   }
  pause("encode");
  if (debugoff) debug=0;
} /* End encode_config */

/**********************************************************************/
int put_symbolic_name (row, col, name_ptr)      /* PUT SYMBOLIC NAME
  *  puts the entry in the SS into event_info[] array. It first checks
  *  to see whether the name is really a symbolic name (by looking for an
  *  alpha string). If so, it inserts it. In either case event_info_psn
  *  is updated to be either name_ptr (an array index)
  *  or name_dex + length of the string in the SS entry.
                              *
  *  RETURNS:  nothing
  *  GLOBALS:  event_info_name[]
  **/
int row, col;   /*  of Timeline SS      */
int name_ptr;   /*  index into event_info[]     */
{  char str[20], *p;
   int   length;

   if (ssval[row][col] != NULLADDR)    /* There is something there */
   {  stctrim(str,ssval[row][col],0);
      p = str;
      if (*p == BEGSEG)  ++p;
      if ((row == STILL_G - 1) && ((*p == 'P') || (*p == 'p')))
         ++p;
      if ((row >= GRAPHICS_G - 1) || (!isdigit(*p)))
      {
         length = strlen(p);
         movmem( p, &(event_info[name_ptr]), length);
         if (debug) printf("In putsym  name = [%s]   l = %d\n", p, length);
         event_info_psn = name_ptr + length;

      } /* End if (was a symbolic name) */

      else        /* Else it wasn't a symbolic name, just update event_info_psn
*/
         event_info_psn = name_ptr;

   } /* End if (there was something) */

   else        /* Else wasn't anything in the cell,just update event_info_psn */
      event_info_psn = name_ptr;

} /* End put_symbolic_name */

/**********************************************************************/
static int put_event2(pres_name, event_name) /* PUT EVENT2
  *  actually writes the information in event_info[] to the right file.
                                                             *
```

```
 *  RETURNS:  nothing
 *  GLOBALS:  event_info[]
 **/
char *pres_name;                    /*  pointer to presentation name  */
char *event_name;                   /*  pointer to event name         */
{
  int   i;
  extern   int   next_time;
  TIME_REC *p1;


  if (debug) printf("The next time = %d\n", next_time);

  event_info[first_opcode_psn - 4] = (char)WAIT;     /* Opcode 00 */

  p1 = (TIME_REC *)(&(event_info[first_opcode_psn - 3])); /* Point to length */
  p1->length = 2;                     /* Length */
  p1->time = next_time - lwipetime;

  w_next_event();
  put_event(pres_name, event_name);

} /* End put_event2 */

/***********************************************************************/
int var_compare (string1, string2, length) /*  VAR_COMPARE
  *  simply compares 2 non-null-terminated fields up to the specified
  *  length starting with the second character.
  *  It is used to compare variable names in the variable file and
  *  ignores the type specifier (the first character).
               *
  *  RETURNS:  TRUE/FALSE; whether fields are identical
  *  GLOBALS:  none
  **/
char  string1[], string2[];
int   length;
{
   int   match = TRUE;
   int   done  = FALSE;
   int   i     = 1;

   do
   { if (string1[i] != string2[i]) match = FALSE;
     ++i;
     if (i == length) done = TRUE;
   } /* End do loop */
   while (!done && match);

   return(match);
} /* End str_compare */

/***********************************************************************/
int sslen(s)            /*  SSval entry LENgth
  *  RETURNS: the length of a blank stripped ssval entry.
  *  GLOBALS:  none
  **/
char  *s;               /*  pointer to entry              */
{ char  temp[81];
  stctrim(temp,s,0);
  return(strlen(temp));
} /* End sslen */

/***********************************************************************/
static int chk_op24 (col,playcs)        /*  CHecK_OPcode24
  *  checks for an opcode 24. It must be called first so that the 24 can
  *  be written before any other.
  *  RETURNS:  nothing (??)
  *  GLOBALS:  ssval[], load[]
  **/
```

```
int   col;        /*  column # of Timeline SS      */
int playos;
{
   int   rtn_code;

   if (load[playos][col] != NULLADDR)
   {
      if ((str_compare(ssval[SRPLAY1+playos][col], "LOAD", 4)) ||
           (str_compare(ssval[SRPLAY1+playos][col], "UNLOAD", 6)))
      {
         w_load(col,playos);
         rtn_code = free(load[playos][col]);
         load[playos][col] = NULLADDR;  /* Set it to NULL so release_mem won't *
/
                                         /* try to de-allocate it again.       */
         if (rtn_code != 0)
          printf("There was a bad memory de-allocation for load %d, col=%d\n",
              playos,col);

      } /* End if(There was a print to write) */
   } /* End if (there was a print allocated) */
} /* End chk_op24 */

/*********************************************************************/
w_load (col, playos)    /*  Write LOAD record
  *  RETURNS:  nothing
  *  GLOBALS:  event_info[], encode_config[], load[]
  **/
int   col;        /*  column # of Timeline SS      */
int playos;
{  LD_OR_UNLD_REC *p3;
     /* Must be an opcode 24 */
   event_info[event_info_psn] = (char)LD_OR_UNLD;
   ++event_info_psn;

   p3 = (LD_OR_UNLD_REC *)(&(event_info[event_info_psn]));

   p3->length = sizeof(LD_OR_UNLD_REC) - sizeof(p3->length);
   encode_config(&(p3->config),playos+1, 0x31+ playos, '0');
   p3->prompt = load[playos][col]->prompt;
   p3->load   = load[playos][col]->loadf;

   event_info_psn += sizeof(LD_OR_UNLD_REC);

   } /* End else (opcode 24) */
#include <\c\stdio.h>       /* Standard header          */

#define  EXTERN extern  /* So all EXTERN xxxx in data.i become extern xxxx */

#include <std.i>          /* Some global definitions */
#include <data.i>         /* Global data definitions */
#include <rwdefs.h>       /* Local definitions       */
#include "userproc.i"     /* Local definitions       */

extern int   c_col;                /* Current column of the SS          */
extern int   rw_error;               /* Error flag                        */
extern FILE        *tfile;      /* File handle for the touch.idx file       */

wform  (label)
char *label;
{
   printf("%s\n",label);
   printf("tfile= %lx\n",tfile);
  }


wformat (col, label)
/*****************************************************************************
* This module saves a touch area format in the file touch1.idx. col is the   *
* column that the touch areas are going to be saved from.  label is a string *
* containing the label of the touch area.                                    *
*****************************************************************************/
```

```
int   col;
char  *label;
{
#define  GOOD_WRITE       0
#define  RANGE_ERROR      1
#define  RCLEN            2

   int              touch_area; /* Current touch area that I' working on    */
   char             *malloc();
   long  int        last_byte;  /* Used to determine the length of the file */
   int              last_rec;   /* Last record of the file                  */
   int              done = FALSE;  /* EOF flag                              */
   int              found = FALSE; /* Found the label in the file flag      */
   int              values[4];  /* Temporary holding place for the row/cols */
   int              n;          /* Returned by the conversion - good or bad */
   int              i;          /* Loop counter                             */
   int              cur_rec;    /* Current record in the file               */
   int              good_data;  /* Flag tells whether there was a good def  */
   long  int        ftell();
   char             temp2[12];  /* Temporary place for an event name        */
   char             filename[80];  /* File name                             */
   char             num[3];        /* A 2 digit number holder */
   char             temp[EVENT_NAME_LENGTH + 1];  /* Temp label for compare */
   struct
   {  char   label[EVENT_NAME_LENGTH];        /* The name of the format     */
      char   rcinfo[MAX_SAVE_AREAS * 4 * RCLEN]; /* The ASCII row-col info     */
      char   events[MAX_SAVE_AREAS][10];
   } format;                     /* The record that I'm building to write    */

  printf("%s\n",label);
  printf("tfile= %lx\n",tfile);
  if (col<0) return(0);

  i= fseek(tfile, 0l, 2);          /* Find the last record in the file */
  printf("wtf.  fseek returns = %d \n",i);
  last_byte = ftell(tfile);
  last_rec = last_byte / sizeof(format);

  printf("wformat.  last_rec= %x\n",last_rec);
  strcpy(temp, label);          /* Set up a temporary area for the label */

  stcpadr(EVENT_NAME_LENGTH);

  if (last_rec == 0) cur_rec = 0;
  else
  {  cur_rec = 1;
     while (!done && (found)    /* Go find the record */
     {  read_rec(&format, tfile, cur_rec, sizeof(format));
        if (str_compare(&(format.label), temp,EVENT_NAME_LENGTH)) found =TRUE;
        else if (cur_rec < last_rec) ++cur_rec;
        else done = TRUE;
     } /* End while (searching for the label) */
  }
  printf(" done found cur_rec= %d %d %d\n",done,found,cur_rec);
  if (!found)
  {  ++cur_rec;
     movmem( temp, &(format.label), EVENT_NAME_LENGTH);
  }

  for (touch_area = 0; touch_area < MAX_SAVE_AREAS; ++touch_area)
  {  setmem(format.events[touch_area],9,' '); /* 9 blanks */
     if (touch[touch_area][col] != NULLADDR)
     {  values[0] = touch[touch_area][col]->frow;
        values[1] = touch[touch_area][col]->fcol;
        values[2] = touch[touch_area][col]->lrow;
        values[3] = touch[touch_area][col]->lcol;

        for (i = 0; i < 4; ++i)
        {  if ((values[i] < 0) || (values[i] > 99))
           {  fclose(tfile);
              return(RANGE_ERROR);
           }
```

```
        sprintf(num, "%d", values[i]);
        if (strlen(num) == 1)
        {  num[2] = num[1];
           num[1] = num[0];
           num[0] = '0';
        }
        format.rcinfo[(touch_area * (RCLEN * 4)) + (i * RCLEN)] = num[0];
        format.rcinfo[(touch_area * (RCLEN * 4)) + (i * RCLEN) + 1] = num[1]

    } /* End for (putting four values) */

    movmem(touch[touch_area][col]->branch,format.events[touch_area],
             EVENTLEN+2);
       }

       else setmem(format.rcinfo[touch_area*(RCLEN*4)] , 4*RCLEN, ' ');

     } /* End for loop (getting all the data) */

     write_rec(&format, tfile, cur_rec, sizeof(format));
     fflush(tfile);
     return(GOOD_WRITE);
  } /* End wtf */
#include <\c\stdio.h>   /* Standard header          */
#define  EXTERN extern  /* So all EXTERN xxxx in data.i become extern xxxx */

#include <std.i>
#include <data.i>
#include <rwdefs.h>     /* Local definitions        */
#include "userproc.i"

extern int   event_info_psn;
extern int   first_opcode_psn;

int   w_literal (col)
/****************************************************************************
* This module takes the information from the current literal element and    *
* makes a 5X opcode and puts it into the event_info[] array. It uses struct- *
* ures defined in rwdefs.h as templates to address the information.          *
*****************************************************************************/
int   col;
{ DSP_LIT_VAR_REC   *pl;
   extern   FILE  *lit_file, *lit_key_file, *var_file, *var_key_file;
   char     ssval_lit[EVENTLEN+1];  /* Holding place for ssval entry */
   int num_lits;        /* Number of literals in the literal file  */
   int cur_key;         /* Current literal key                     */
   int i,t;
   int var_rec_num;
   long  int   last_byte;
   int last_var_key;
   int last_var_rec;
   int last_key;
   int last_data;
   int ms_len;
   int ms_extra;
   int added_psn;

   struct                      /* Structure to hold a literal key          */
   {  char  lit_name[EVENTLEN];
      int   rec_num;
   } lit_key;

  if (stsisvar( ssval[SRLIT ][col]))
    lit[col]->recnum= findvar( ssval[SRLIT][col], 0);
  else
  { lit[col]->recnum= findindx(lit_key_file, lit_file,
      ssval[SRLIT][col], lit[col]->literal, 0, LITKLEN, LITKRLEN, LITRLEN, 2);
    }  /* End else (literal was not a variable) */

  event_info[event_info_psn] = (char)DSP_LIT_VAR;          /* Opcode 50 */
  ++event_info_psn;
```

```
  pl = (DSP_LIT_VAR_REC *)(&(event_info[event_info_psn]));
  pl->length=
    sizeof(DSP_LIT_VAR_REC)-sizeof(pl->length)+sslen(ssval[SRLIT][col]);

  pl->rec_num        =       lit[col]->recnum;
  pl->row            = (char)lit[col]->row;
  pl->col            = (char)lit[col]->col;

  pl->before_attr  = (char)(lit[col]->fcolor);
  pl->after_attr   = (char)(lit[col]->lcolor);
  pl->field_length = (char)lit[col]->litlen;
  pl->edit_code    = (char)lit[col]->editcode;

  put_symbolic_name(SRLIT, col, event_info_psn + sizeof(DSP_LIT_VAR_REC));
  } /* End literal */

findindx (ifp, fp, pkey, rec, varflag, keylen, keyrlen, reclen, wrflag)
FILE *ifp;     /* index file pointer      */
FILE *fp;      /* file pointer to file    */
char *pkey;    /* key to compare against */
char *rec;     /* record to add to file   */
int varflag;   /* variable flag           */
int keylen;    /* length of key           */
int keyrlen;   /* length of key file      */
int reclen;    /* length of record        */
int wrflag;    /* write record flag,
                  =0 if are not to write records,
                  =1 if are to write record if not found
                  =2 if are to write record even if found  */
{ int lastkey;
  int lastrec;
  int curkey;
  int recnum;
  int krecnum;
  char buf[81];
  char key[81];
  char keybuf[81];

  stccpy(key,pkey,keylen+1);
  stcpadr(key,keylen,0);

  fseek( ifp, 0L, 2);     /* Find the last record in the key file  */
  lastkey= ftell(ifp)/ (long) keyrlen;
  fseek(  fp, 0L, 2);     /* Find the last record in the key file  */
  lastrec= ftell(fp)/ (long) reclen;

  krecnum= recnum= 0;
  if (lastkey > 0)   /* there are some variables */
  { curkey= 1;
    while ( ++curkey <= lastkey  &&  !krecnum)
    { read_rec(buf, ifp, curkey, keyrlen);   /* Get index record  */

      fitost( keybuf, buf, keylen, 0);
      stcpadr(keybuf, keylen, 0);

      if (debug>1) printf("findindx. comparing |%s| |%s|\n",
        keybuf+ varflag, key+ varflag);
      if (strcmp( keybuf+ varflag, key+ varflag)== 0)
      { movmem(buf+keylen, &recnum, 2);
        if (!varflag || *keybuf== *key) krecnum= curkey;
        }
      } /* End while */
    } /* End if there were some records */

  if (wrflag)
  { if (!recnum || wrflag==2)  /* if don't have a record, or if are to
                                  update it anyway */
    { if (!recnum) recnum= lastrec+1;
```

```
      if (wrflag==2 || recnum > lastrec) write_rec                              len);
      }

    if (!krecnum)  /* write out index record only if its not there */
    { krecnum= lastkey+1;
      movmem( key, keybuf, keylen);
      *(int*)(&keybuf[keylen])= recnum;
      setmem( keybuf+(keylen+2), keyrlen- (keylen+2), ' ');
      write_rec(keybuf, ifp, krecnum, keyrlen);
      }

    } /* End else (didn't find the key) */

  return(recnum);
  }

prfieldx (msg,s,len)
char *msg,*s;
int len;
{ printf("%s",msg);
  while (len-- > 0) printf("%x ",*s++);
  printf("\n");
  }

#include <\c\stdio.h>   /* Standard header         */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */

extern   int   event_info_psn;
extern   int   first_opcode_psn;


int   w_misc (col,playos)
/****************************************************************************
* This module takes the current element of the print[] array and makes a    *
* print opcode(11X) out of it. It uses structures defined is rwdefs.h as    *
* templates                                                                 *
****************************************************************************/
int   col,playos;
{
   TOGGLE_LOG_REC *p1;
   PRT_CTL_REC    *p2;

   if ((str_compare(ssval[SRMISC][col], &("LOG"), 3)) ||   /* If "LOG" or    */
       (str_compare(ssval[SRMISC][col], &("NOLOG"), 5)))   /* "NOLOG" in SS  */
   {                                                        /* then op 110    */
      event_info[event_info_psn] = (char)TOGGLE_LOG;    /* Opcode 110 */
      ++event_info_psn;

      p1 = (TOGGLE_LOG_REC *)(&(event_info[event_info_psn]));

      p1->length = sizeof(TOGGLE_LOG_REC) - sizeof(p1->length);
      p1->toggle = print[col]->logf;

      event_info_psn += sizeof(TOGGLE_LOG_REC);

   } /* End if (opcode 110) */


   else if (str_compare(ssval[SRMISC][col], &("PRINT"), 5)) /* If "PRINT"    */
   {                                                          /* then op 111  */
      event_info[event_info_psn] = (char)PRT_CTL;    /* Opcode 111 */
      ++event_info_psn;

      p2 = (PRT_CTL_REC *)(&(event_info[event_info_psn]));
```

```
      p2->length       = sizeof(PRT_CTL_REC) - sizeof(p2->length);
      p2->width        = print[col]->prwidth;
      p2->control_code = print[col]->prtype;
      p2->form_feed    = print[col]->prff;

      event_info_psn += sizeof(PRT_CTL_REC);

   } /* End else if (opcode 111) */
   } /* End print */


#include <\c\stdio.h>   /* Standard header         */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"

extern   int   event_info_psn;
extern   int   first_opcode_psn;


int   w_speech (col)
/*****************************************************************************
* This routine takse the information in the current element of the speech   *
* array(spaddr) and makes an opcode for it. It uses structures defined in   *
* rwdefs.h as templates to address the information.                         *
*****************************************************************************/
int   col;
{
   SPEECH_CHIP_REC   *p1;
   SPEECH_FILE_REC   *p2;
   int   word = 0;
   int   done = FALSE;
   int   found = FALSE;
   int   length_psn;
   int   rtn_code;
   int   fclose();
   extern   FILE  *lit_file, *lit_key_file;
   FILE  *speech_file, *fopen();
   int   i;
   int   cur_key;              /* Current literal key                      */
   int   ms_len;
   int   ms_extra;
   int   added_psn;
   int   last_key;
   int   last_data;
   long  int   last_byte;
   long  int   ftell();
   char  ssval_mp[EVENTLEN+1];  /* Holding place for ssval entry */
   struct                      /* Structure to hold a literal key         */
   {
      char  mpname[EVENTLEN];
      int   rec_num;
   } lit_key;

/*---------------------------------------------------------------------------
| We need to open the file named in ssval[] in order to see whether to write a |
| 80 or an 81. If the file exists the we need to write an 81 else write an 80. |
|--------------------------------------------------------------------------*/
   if (debug) printf("WSPEECH.s col= %d\n",col);

   if (strncmp(ssval[SRSOUND][col],"SP",2)==0)
   {
   event_info[event_info_psn++] = (char)SPEECH_CHIP;
   length_psn = event_info_psn;
```

```
strcpy(ssval_mp, ssval[SRSOUND][col]);
pad_right_blks(ssval_mp, EVENTLEN); /* Pad right for the compare */


fseek(lit_key_file, 0l, 2);
last_byte = ftell(lit_key_file);
last_key  = last_byte / LIT_KEY_LEN;
if (last_key == 0)       /* Skip over the header record */
   last_key = 1;


fseek(lit_file, 0l, 2);
last_byte = ftell(lit_file);
last_data = last_byte / LIT_REC_LEN;


if (last_key > 1)    /* First is the header, rest are the keys. */
{
   cur_key = 2;
   while (!done && !found)
   {
      read_rec(&lit_key, lit_key_file, cur_key, LIT_KEY_LEN);  /* Get reco
rd  */

      if (str_compare(&(lit_key.mpname), ssval_mp, EVENTLEN))
         found = TRUE;

      if (++cur_key > last_key) done = TRUE;

   } /* End while */
} /* End if (there were some literals) */

/* Now go write the speech phrase */
ms_len = MAX_SPEECH_LEN / LIT_REC_LEN;  /* Calculate the length */
ms_extra = MAX_SPEECH_LEN % LIT_REC_LEN;
if (ms_extra != 0) ++ms_len;

if (found)
   write_rec(words[col],lit_file,lit_key.rec_num, ms_len * LIT_REC_LEN);
else
{  added_psn = last_key + 1;  /* Add one to the key file */
   movmem(ssval[SRSOUND][col], lit_key.mpname, EVENTLEN);
   pad_right_blks(&(lit_key.mpname), EVENTLEN);
   lit_key.rec_num = last_data + 1;
   write_rec(&lit_key, lit_key_file, added_psn, LIT_KEY_LEN);

   write_rec(words[col],lit_file,last_data+ 1, ms_len * LIT_REC_LEN);

   read_rec(&lit_key, lit_key_file, 1, LIT_KEY_LEN);  /* Update header */
   lit_key.rec_num = last_data + ms_len;             /* record after  */
   write_rec(&lit_key, lit_key_file, 1, LIT_KEY_LEN); /* adding data   */

} /* End else (didn't find the key) */

p1 = (SPEECH_CHIP_REC *)(&(event_info[event_info_psn]));

done = FALSE;
while ((word < NUM_WORDS) && (!done))
{
   p1->word_addr[word] = spaddr[col][word];

   if (spaddr[col][word++] == 0) done = TRUE;

} /* End while */

/*------------------------------------------------------------------------*/
/* we now have to call put_symbolic_name and pass it the row, col, and */
/* a pointer to where in event_info[] to put it. That's what the last  */
/* parameter, though funny looking, is.                                 */
/*------------------------------------------------------------------------*/
```

```
      put_symbolic_name(SRSOUND, col, event_info_psn + 1 +
         (word * 2));

      p1->length = event_info_psn - length_psn - sizeof(p1->length);

   } /* End if (opcode 80) */


   else              /* opcode 81 */
   {
      event_info[event_info_psn++] = (char)SPEECH_FILE;
      length_psn = event_info_psn;

      p2 = (SPEECH_FILE_REC *)(&(event_info[event_info_psn]));

      put_symbolic_name(SRSOUND, col, event_info_psn +
         sizeof(SPEECH_FILE_REC));

      p2->length = event_info_psn - length_psn - sizeof(p2->length);

   } /* End else (opcode 81) */

} /* End speech */

#include <\c\stdio.h>   /* Standard header         */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"

extern   int   event_info_psn;
extern   int   first_opcode_psn;

int   w_still (col)
/*****************************************************************************
* This module takes the current still element and makes a 3X opcode in the  *
* evetn_info[] array. It uses structures defined in rwdefs.h as templates to *
* address the information in the event_info [] array.                        *
*****************************************************************************/
int   col;
{
   SHOW_STILL_REC    *p1;
   STILL_SERIES_REC  *p2;
   int   length_psn;

     /* Check for still */
   if (stpchr(ssval[SRPLAY1+playeros][col], 'S') != NULLADDR)
   {
      stcremc(ssval[SRPLAY1+playeros][col],'S',1);
      event_info[event_info_psn] = (char)SHOW_STILL;           /* Opcode 30 */
      ++event_info_psn;
      length_psn = event_info_psn;

      p1 = (SHOW_STILL_REC *)(&(event_info[event_info_psn]));
      encode_config(&(p1->config), playeros+1, still[playeros][col]->vidof, '0'
;

      p1->frame = still[playeros][col]->bframe;

      put_symbolic_name(SRPLAY1+playeros, col, event_info_psn +
         sizeof(SHOW_STILL_REC));

      p1->length = event_info_psn - length_psn - sizeof(p1->length);
      if ( (p1->config & 0x10) && (p1->config & 0x08) )
      { printf("ERROR IN W_STILL.  BAD PLAYER #. config= %x\n^G^G",p1->config);
        }
   } /* End if (opcode 30)*/
```

```
else        /* Must be an opcode 31 */
if (stpchr(ssval[SRPLAY1+playeros][col], 'P') != NULLADDR)
{  stcremc(ssval[SRPLAY1+playeros][col],'P',1);
   event_info[event_info_psn] = (char)STILL_SERIES;           /* Opcode 31 */
   ++event_info_psn;
   length_psn = event_info_psn;

   p2 = (STILL_SERIES_REC *)(&(event_info[event_info_psn]));

       encode_config(&(p2->config), playeros+1, (char) 0x31+playeros, '0');

       p2->beg_frame = still[playeros][col]->bframe;
       p2->end_frame = still[playeros][col]->eframe;
       p2->increment = still[playeros][col]->nskip;
       p2->time      = still[playeros][col]->time;

       put_symbolic_name(SRPLAY1+playeros, col, event_info_psn +
          sizeof(STILL_SERIES_REC));

       p2->length = event_info_psn - length_psn - sizeof(p2->length);

    } /* End else (opcode 31) */

  } /* End still */
#include <\c\stdio.h>   /* Standard header          */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */
#include "userproc.i"

/************************ Local globals to write_event ************************
* event_info is a char array that holds the file image of all the CTL file    *
* records for a given event                                                   *
******************************************************************************/

extern   int   event_info_psn;
extern   int   first_opcode_psn;
   extern   FILE  *var_file, *var_key_file;

int wtouch (col, first_area, last_area)
int   col;
int   first_area, last_area;
{
  DEF_TOUCH_REC *p1;
  int    touch_area,tn;
  int    length_psn;
  int    i;
  int    cur_key_def;
  int    var_rec_num;

  char  ssval_var[EVENTLEN+1];
  char  ssval_mp[EVENTLEN+1];   /* Holding place for ssval entry */

  /* Check if we really need to write a 60/70 */
  if (touch[first_area][col] == NULLADDR) return;

  event_info[event_info_psn] = (char)DEF_TOUCH;     /* Opcode 60 */
  ++event_info_psn;

  cur_key_def = 0;
  p1 = (DEF_TOUCH_REC *)(&(event_info[event_info_psn]));
  length_psn = event_info_psn;

  for (tn= first_area; tn <= last_area; ++tn)
  { if (touch[tn][col] != NULLADDR &&
       (touch_area=touch[tn][col]->counter) >0 )
    { if (debug) printf("outputing a touch area. tn= %d\n",tn);
```

```
    pl->key_def[cur_key_def].key_num = touch_area;
    pl->key_def[cur_key_def].first_row = touch[tn][col]->frow;
    pl->key_def[cur_key_def].last_row  = touch[tn][col]->lrow;
    pl->key_def[cur_key_def].first_col = touch[tn][col]->fcol;
    pl->key_def[cur_key_def].last_col  = touch[tn][col]->lcol;
    ++cur_key_def;
    } /* End if */
   } /* End for loop - thru the touch areas */

 if (debug) printf(" have defined key_defs \n");

  /*-------------------------------------------------------------------*/
  /* we now have to call put_symbolic_name and pass it the row, col, and */
  /* a pointer to where in event_info[] to put it. That's what the last  */
  /* parameter, though funny looking, is.                                */
  /*-------------------------------------------------------------------*/
  put_symbolic_name(TOUCH_G - 1,col,
    event_info_psn+1+(sizeof(key_def_rec)*cur_key_def));

  /* Now we need to set the length byte */
  pl->length = event_info_psn - length_psn - sizeof(pl->length);
  }


int   wtchbr (col)
/*************************************************************************
* This module takes the information in the current touch element and makes a *
* 6X opcode out of it and puts it into event_info[]. It uses structures def- *
* ined in rwdefs.h as templates to address the information.                 *
*************************************************************************/
int   col;
{
  int    touch_area,tnum;
  int    length_psn;
  int    eip;
  int    i;
  int    var_rec_num;
  int    *rn;
  DSTOUCH *pt;

  char  ssval_var[EVENTLEN+1];
  char  ssval_mp[EVENTLEN+1];   /* Holding place for ssval entry */

/*----- An opcode 70 must follow an opcode 60. This code is what follows ----*/
  tnum= 0;

  if (debug) printf("WTCHBR.s col= %d\n",col);
  while(1)  /* continue untill all touch areas are done */
  {  /* if touch area is not defined, just return */
    if (tnum>= NTOUCH || touch[tnum][col]== NULLADDR) return;

    event_info[event_info_psn++] = (char)DEF_TOUCH_BR_TBL;    /* Opcode 70 */
    eip= event_info_psn;
    length_psn= eip++;

    if (debug) printf(" about to define branches, col tnum= %d %d \n",
      col,tnum);
    while (eip- event_info_psn <200 && tnum< NTOUCH)
    { pt= touch[tnum][col];
      if (pt != NULLADDR && (touch_area= pt->counter) >0 )
      { event_info[eip++] = (char)touch_area;
        eip+= moveevent( &event_info[eip], pt->branch, 1);
        } /* End of have a touch area */
      tnum++;
      } /* End for.loop - thru the touch areas */
    /*-------------------------------------------------------------------*/
    /* we now have to call put_symbolic_name and pass it the row, col, and */
    /* a pointer to where in event_info[] to put it. That's what the last  */
    /* parameter, though funny looking, is.                                */
    /*-------------------------------------------------------------------*/
```

```
    put_symbolic_name(SRTOUCH, col, eip);
      /* Now we need to set the length byte */
    event_info[length_psn]= event_info_psn- length_psn- 1;

    if (debug) printf(" WTCHBR.E col eip= %d %d \n",col,eip);
    }
  } /* End touch */


wcleartch ()
{ CLR_TOUCH_TBL_REC    *p3;
  event_info[event_info_psn++] = (char)CLR_TOUCH_TBL;  /* Opcode */
  p3 = (CLR_TOUCH_TBL_REC *)(&(event_info[event_info_psn]));
    /* Now insert the length (0) */
  p3->length = 0;
  event_info_psn += sizeof(p3->length);
  } /* End else (opcode 61) */
#include <\c\stdio.h>    /* Standard header         */

#define  EXTERN extern  /* So all EXTERN xxxx in data.i become extern xxxx */

#include <std.i>        /* Some global definitions */
#include <data.i>       /* Global data definitions */
#include <rwdefs.h>     /* Local definitions       */

/************************ Local globals to write_event ***********************
* event_info is a char array that holds the file image of all the CTL file    *
* records for a given event                                                   *
******************************************************************************/

extern   int    event_info_psn;
extern   int    first_opcode_psn;
extern   char   calctime[NTLDCOL];


int   write_time (col, blank_col)
/*****************************************************************************
* This module writes the time opcodes (00 and 04) for each new column. It is *
* called at the end of each column. The first opcode of the column is        *
* checked. If it is a 21 or 25 then an insignificant time is called for.     *
* Else a significant time is called for. The new time is computed by sub-    *
* tracting the time in the last column from the current one.                 *
*****************************************************************************/
int   col;
int   *blank_col;
{
   TIME_REC    *p1;
   char  *stpchr();
   int   time, t1, t2;
   char  *dec_place;
   char  *ast_ptr;
   int pcol;

   if (event_info[first_opcode_psn] == (char)255)
   {
      *blank_col = TRUE;
      return(1);
   } /* End if */

   if ((event_info[first_opcode_psn] == WAIT_FRAME) ||
       (event_info[first_opcode_psn] == CHG_AUD_VID) ||
       (event_info[first_opcode_psn] == WAIT_ON_END))
      event_info[first_opcode_psn - 4] = (char)NO_OP;    /* Opcode 04*/

   else event_info[first_opcode_psn - 4] = (char)WAIT;   /* Opcode 00*/

   p1 = (TIME_REC *)(&(event_info[first_opcode_psn - 3])); /* Point to length */
   p1->length = 2;                  /* Length */
```

```
    ast_ptr = stpchr(ssval[TIME][col], '*');
    if (ast_ptr != NULLADDR) calctime[col] = (char)TRUE;

    t1= sdtoi(ssval[TIME][col]);
   pcol= col-1;
   while (pcol>=0 && isblank(ssval[TIME][pcol])) pcol--;
   if (pcol>=0) t2= sdtoi(ssval[TIME][pcol]);
   else t2=0;

   if ((col != 0) && (t1 == 0)) time = 0;  /* If time is 0, write a 0 */
   else time = (t1 - t2);  /* Else regular time     */

   time-= lwipetime;
   p1->time = time;    /* Put in the time */

   if (debug)
     printf("w_wait. col time lwipetime wipetime tenths[]= %d %d %d %d %d\n",
     col,time,lwipetime,wipetime,tenths[col]);

   lwipetime= wipetime;
   wipetime=0;

     /* if first column, do not wait forever */
   if ( (time == 0 && col == 0) ||
        (time == 0 && tenths[col]!= 0) )  /* do not want to wait, time=0 */
                                           /* because of wipe time        */
   { event_info[first_opcode_psn - 4] = (char)NO_OP;    /* Opcode 04*/
     if (debug) printf("putting out NO_OP\n");
     }
} /* End write_time */

/******************************************************************************
        all_calc() - all calculation routines

        called with:

        returns:

        uses:

        notes:
                02-07-86 rwp - not checking for overflow yet.
                             - not checking for precision.
                             - not checking for numeric type.
        history:
                02-06-86 rwp - initial entry
                02-20-86 rwp - correct op2 not being initialized
                03-03-86 rwp - change sprintf to correct turncating of result
                               string
                03-10-86 rwp - change calc code for double in op_name
                03-11-86 rwp - first constant was looking at the wrong string
                                to get it's value
                             - add exponential
******************************************************************************/


#include "view.h"
#include "vstruct.h"
#include "viewdata.h"
#include "cmdnum.i"
#include "math.h"

double atof();

/*******************************************************************************
all_calc(op1_name,rec#,type,opt2_name,rec#,type,
           s0       n0   b0   s1        n1   b1
        result_name,rec#,type,precision,calc_code)
          s2          n2   b2    b3         b4
*******************************************************************************/
```

```
all_calc()

{
double op1,op2,result;
char buffer[20];
char argu_buffer[20];

/* get value of op1 */

/* if this is an variable */
if (num_op[0])
   {
    /* get the value of the agrument */
    get_var(str_op[0],num_op[0],buffer,1,9);
    op1 = atof(buffer);
       }
     else
        {
       /* it's a constant */
       if (byt_op[0] == 5)
          {
          op1 = *((double *)(str_op[0]));
          }
       else
          {
          op1 = 0;
          }
       }


     /* get value of op2 */

     /* if this is an variable */
     if (num_op[1])
        {
         /* get the value of the agrument */
         get_var(str_op[1],num_op[1],buffer,1,9);
         op2 = atof(buffer);
        }
     else
        {
        /* it's a constant */
        if (byt_op[1] == 5)
           {
           op2 = *((double *)(str_op[1]));
           }
        else
           {
           op2 = 0;
           }
        }


     /* determine which operation */
     switch(byt_op[4])
           {
           case ADD_ARGS:
                result = op1 + op2;
                break;
           case SUB_ARGS:
                result = op1 - op2;
                break;
           case MULT_ARGS:
                result = op1 * op2;
                break;
           case DIVIDE_ARGS:
                if (op2)
                    result = op1 / op2;
                else
                    result = 0;
                break;
```

```
      case EXPON_ARGS:
           result = pow(op1,op2);
           break;
       }


/* change result to a string */
sprintf(buffer,"%8.0f",result);

/* write the value of the result */
put_var(str_op[2],num_op[2],buffer,9);


}
/*****************************************************************************
        assignit
                assign_all()
                assign_num()
                assign_str()

        uses:

        notes:

        history:
                02-03-86 rwp - initial entry
                02-20-86 rwp - correct number of arguments for put_var()
                03-04-86 rwp - allow constants
                03-07-86 rwp - add argument type
                03-10-86 rwp - correct double pointer
*****************************************************************************/


#include "view.h"
#include "vstruct.h"
#include "viewdata.h"
#include "cmdnum.i"


/* assign all does not do anything */

assign_all()

{;}

/******************************************************************************
assign variables - both numeric and string

 assign_num(num_var,num_rec#,argu_var,argu_rec#,argu_type,precision)
             s0      n0        s1        n1         b0         b1
******************************************************************************/

assign_num()

{
char argu_buffer[45];
int varsize;
double argu_value;

/* if numeric variable */
if (*str_op[0] == '%')
   varsize = 9;
else
   varsize = 41;

if (num_op[1])
   {
   /* get the value of the agrument */
   get_var(str_op[1],num_op[1],argu_buffer,1,varsize);
   }
```

```
else
   {
   /* it's a constant */
   if (byt_op[0] == 5)
      {
      argu_value = *((double *)(str_op[1]));
      sprintf(argu_buffer,"%8.0f",argu_value);
      }
   else
      {
      strcpy(argu_buffer,str_op[1]);
      }
   }

/* write the value to the variable file */
put_var(str_op[0],num_op[0],argu_buffer,varsize);

}


/*****************************************************************************
 assign_str(str_var,str_rec#,argu_var,argu_rec#)
             s0       n0        s1        n1
*****************************************************************************/


assign_str()

{

char argu_buffer[42];

/* get the value of the agrument */
get_var(str_op[1],num_op[1],argu_buffer,0,41);

/* write the value to the variable file */
put_var(str_op[0],num_op[0],argu_buffer,41);



}


/*****************************************************************************

        bldindex()

        called with:

        returns:

        uses:

        notes:
             creates the event table index in memory based on the disk file inde
x


        history:
              01-22-86 rwp - modified to check for the last index name of
                             "ZZZZZ"
                02-06-86 rwp - correct event name length maximum
                02-14-86 rwp - change _exit to end_conductor()
                             - add log_message()
                02-20-86 rwp - delete variable lnum

*****************************************************************************/
```

```
#include "view.h"
#include "vstruct.h"
#include "viewdata.h"

bldindex()

{
char *cmalloc();
long pos;                  /* position of record in index file */
int indx = 0;              /* the index record being read      */
char evt[10];              /* the current event name           */
char buf[15];              /* buffer to hold index records             */
int i;                     /* counter for loop                         */
int str_len;               /* length of the event name                 */
evtindex = 0;              /* number of events in the presentation      */

/* read record 0  */
lseek(indxnum,0L,0);
read(indxnum,buf,13);

if (buf[10] != 255)
   {
    log_message(113,"   ");
    printf("\nThis version is not compatible with the C Version Conductor.");
    printf("\nThere can only be one index record per event.");
    end_conductor();
   }

while (1)
    {

     pos = (long)(++indx)*13;                /* start with indx == 1 */
     lseek(indxnum,pos,0);
     if ( read(indxnum,buf,13) < 13 )           /* read until eof  */
         {
          return;
          }
     evttable[evtindex].fileindx = byword(buf[12],buf[11]) - (1);
                                   /*location of event */
     if (evttable[evtindex].fileindx > 0)
        {
         stccpy(evt,buf,9);
         if (strncmp(evt,"ZZZZZ",5) == 0)
             return;
         trim_end(evt);
         str_len = strlen(evt) + 1;
         evttable[evtindex].ename = cmalloc(9);
         stccpy(evttable[evtindex].ename,evt,str_len);
         for (i=0;i<str_len;i++)
              {
              *(evttable[evtindex].ename + i) =
               toupper(*(evttable[evtindex].ename + i));
              }
         evttable[evtindex].evtsize =  buf[10];  /* number of 64 byte blocks */
         evtindex++;
       }       /* end if */

    }          /* end while */

}


/*****************************************************************************
        branching routines
        notes:
        history:
                01-31-86 rwp - initial entry
                02-03-86 rwp - add trim_end() to jump_branch()
                             - add default to call jump_branch()
```

```
02-05-86 rwp - add saving of current screen to loop_screen()
02-05-86 rwp - put debug on line 17
02-10-86 rwp - translate key numbers
             - add call to wrt_tch()
02-11-86 rwp - add reading of the touch response to loop_scrn
02-13-86 rwp - add ibtrace()  and wrt_ib_buf()
               remove wrt_ib_buf()
             - add log_message to jump_branch()
             - add log_message to end_conductor()
02-14-86 rwp - add auto_event()
02-20-86 rwp - lint cleanup
02-21-86 rwp - return the screen to the original mode at
               end_conductor()
             - add waitpoll()
02-24-86 rwp - add default branch to call jump_branch
03-05-86 rwp - add loop_state()
03-06-86 rwp - correct return on loopscreen and loop event
03-10-86 rwp - make all colors solid in end_conductor()
             - problem trying to go to manual mode
*****************************************************************************/
#include "stdio.h"
#include "view.h"
#include "vstruct.h"
#include "task.h"
#include "viewdata.h"
#include "cmdnum.i"

char *cfree();

/******************************************************************************
find goto event : determine which branch routine to use
******************************************************************************/

findgoto(branch_name)
  char *branch_name;
{


switch(*branch_name)
            {
             case '*':  /* jump to event */
                  jump_branch(branch_name + 1);
                  break;
             case '@':  /* loop event */
                  loop_state(0);
                  log_message(8,evttable[cur_evt].ename);
                  jump_branch(branch_name + 1);
                  break;
             case '&':  /* user procedure */
                  wrt_tch();
                  userproc(branch_name + 1);
                  break;
             case '#':  /* loop screen */
                  loop_screen(branch_name + 1);
                  pcounter--;
                  break;
             case '$':  /* read variable file for label */
                  /* send the '$' with the string */
                  variable_branch(branch_name);
                  break;
             case '/':
                  switch (*(branch_name + 1))
                        {
                         case 'C':                 /* continue */
                              continue_branch();
                              break;
                         case 'E':                 /* end conductor */
                              end_conductor();
                              break;
```

```
                case 'R':                   /* return  */
                     loop_state(1);
                     /* continue_branch(); */
                     log_message(9,evttable[cur_evt].ename);
                     break;
                }
            break;
        default:  /* call jump branch */
            jump_branch(branch_name);
            break;

        }
}

/** continue_branch() - branch to the next command that is not WAITTIME  **/

continue_branch()

{
int done = FALSE;

pcounter++;          /* skip the current command token  */
while (!done)
      {
       /* find the next command token */
       while (*pcounter < 128)
             pcounter++;
       /* if the command is not WAITTIME then back up to the beginning */
       /* of it's operand tokens */
       if (*pcounter != WAITTIME +128)
           {
            pcounter--;
            while (*pcounter < 128)
                  pcounter--;
            done = TRUE;
            pcounter++;              /* this is a test for Kentucky   */
           }
       else         /* if WAITTIME then try again */
           pcounter++;
      }

/* log that you are continuing  */

}

/*** jump branch **/

jump_branch(evt_name)
     char *evt_name;

{
int n;
char *newptr = 0;

tchbrch[1].tbrhcode = 0;   /* turn off help */

init_tasks();                /* reset processes and tasks */

trim_end(evt_name);

if (rmode)
   {
    cursor(17,1);
    printf("LOOKING FOR [%s]",evt_name);
   }

/* find the event name and number in the event table */
for (n = 0; n<evtindex; n++)
    {
```

```
    if (strcmp(evt_name,evttable[n].ename) == 0)
        {
         newptr = evttable[n].evalue;        /* event location in memory    */
         cur_evt = n;                        /* set cur_evt to event number */
         break;
        }
    }

/* if the event was not found goto start event  */
if (n == evtindex)
   {
    cursor(16,1);
    printf("COULD NOT FIND EVENT %s ",evt_name);
    log_message(84,evt_name);
    jump_branch(strt_evt);
    return;
   }

/* if the event is not already loaded into memory then load it */
if (newptr == 0 )
    {
     getevent(n);
    }

/* set the program pointer to the start of the event  */
pcounter = evttable[n].evalue;
log_message(2,evt_name);

/* set icon branch strings to null */
sysbrstr[0] = 0;
pause_str[0] = 0;


 }

/*****************************************************************************
variable branch
*****************************************************************************/

variable_branch (branch_name)
     char *branch_name;

{
char var_name[10];
unsigned var_record;
char var_buffer[82];
int i,str_len;

/* get the variable name */
strncpy(var_name,branch_name,8);

/* trim blanks off the end */
trim_end(var_name);

/* get the record number */
var_record = (unsigned)*(branch_name + 8);

/* read the variable file */
get_var(var_name,var_record,var_buffer,1,81);

/* trim the blanks off the end */
trim_end(var_buffer);

str_len = strlen(var_buffer);
/* make it upper case */
for (i = 0; i< str_len;i++)
     var_buffer[i] = toupper(var_buffer[i]);

/* call the branch routine */
findgoto(var_buffer);

 }
```

```
/*************************************************************************************
loop screen
*************************************************************************************/

loop_screen(screen_name)
    char *screen_name;

{
extern unsigned ibsta;
char errornum = 0;
int done = FALSE;
char polbuf[2];
char *readscrn();
int cur_mode;
static char *scrn_display;
static char *scrn_mem_free;

char sys_icon_str[250];
char pau_icon_str[100];
char loop_touch[250];


int srow = 1;
int scol = 1;
int erow = 25;
int ecol = 80;

if (smode == 4 || smode == 1)
    ecol = 40;

cur_mode = smode;

/* save the current screen */
scrn_display = readscrn(srow,scol,erow,ecol,&scrn_mem_free);


/* set up variables for putscrn1() */

byt_op[0] = 1;
byt_op[1] = 2;
byt_op[2] = 0;
byt_op[3] = 0;
byt_op[4] = 0;
num_op[0] = 0;
num_op[1] = 0;

num_op[2] = putgtabl(screen_name);

putscrn1();

strcpy(sys_icon_str,sysbrstr);
strcpy(pau_icon_str,pause_str);
strcpy(loop_touch,tchbrstr);


/* clear any existing touch responses */


while (vision_poll(TOUCH_DEVICE))
   {
     while (!done)
      {
      ibrd(device_var[TOUCH_DEVICE],ddbuf,255);
      ibtrace(3,device_var[TOUCH_DEVICE],255,ddbuf);

      if (ibsta & 0xc000)    /* bits 15 and 14 */
          errornum++;
      else
          done = TRUE;
```

```
      if (errornum > 10)
         {
          if (rmode)
               printf("\nError reading Vision");
          return(FALSE);
         }
      }
   }


/** activate touch screen for row/col  **/
ddbuf[0] = 0x01;
ddbuf[1] = 0xc8;          /* row col mode */
devicewt(touch,ddbuf,2);
waitpoll(TOUCH_DEVICE);

/* wait for the touch */
waitpoll(TOUCH_DEVICE);

if (cur_mode != smode)
   setmode(cur_mode);

writscrn(srow,scol,erow,ecol,scrn_display);
scrn_mem_free = cfree(scrn_mem_free);

          if (loop_touch[0])
             {
             strcpy(tchbrstr,loop_touch);
             tch_on(0);
             loop_touch[0] = 0;
             }
          if (*sys_icon_str)
              {
               str_op[0] = sys_icon_str;
                sysbrch();
               }
          if (*pau_icon_str)
             {
              str_op[0] = pau_icon_str;
              pausebrh();
             }

 }

/*****************************************************************************
end conductor
*****************************************************************************/

end_conductor()

{

touchoff();
stopvid();
/* manual_vid(); */

log_message(1,"Ending");

/* write header file */
log_message(0,"   ");

wrt_tch();     /* write touch key numbers */

/* close all the files for the presentation */
close(cntlnum);
close(indxnum);
close(litnum);
close(varnum);
close(libnum);
close(lognum);
```

```
close(var_file_indx);
close(user_fld_def);
close(user_file);
close(user_file_indx);

/* free all memory */

/* set all colors solid */
ddbuf[0] = 0x02;
ddbuf[1] = 0;
ddbuf[2] = 0;
devicewt(video,ddbuf,3);
waitpoll(VIDEO_DEVICE);

/* change to original screen mode */
setmode(start_mode);

_exit(0);

}

/*****************************************************************************
auto_event
*****************************************************************************/

auto_event()

{
float gettime();
float newtime;

/***** return until auto event tested  *******/
return;

/* get the current time */

newtime = gettime();
if (newtime >= target_time)
   {
   findgoto(autoevt);
   }

}
/*****************************************************************************
save state
*****************************************************************************/

loop_state(loop_code)
    int loop_code;

{
static int loop_evt_num = -1;
static char loop_evt_pcounter;
static char sys_icon_str[250];
static char pau_icon_str[100];
static char loop_touch[250];

char *readscrn();
unsigned get_frame();
static int cur_mode;
static char *scrn_display;
static char *scrn_mem_free;

static int srow = 1;
static int scol = 1;
static int erow = 25;
static int ecol = 80;
static struct plytable loop_player;
int cnt;
int i;
```

```
static char loop_task[50];
static char loop_process[50];


switch(loop_code)
     {
     case 0:      /* going into a loop event */

          if (rmode)
             {
             cursor(24,1);
             printf("Event Number = %d",cur_evt);
             getch();
             }
          loop_evt_num = cur_evt;

          loop_evt_pcounter = pcounter - tkstart;
          /* next check for display of second attribute */
          if (process_var[SECOND_ATTR_PROCESS])
                 {
                 putvar_second();
                 }
           strcpy(sys_icon_str,sysbrstr);
           strcpy(pau_icon_str,pause_str);
           strcpy(loop_touch,tchbrstr);

           if (smode == 4 || smode == 1)
               ecol = 40;

           cur_mode = smode;

           /* save the current screen */
           scrn_mem_free = cfree(scrn_mem_free);
           scrn_display = readscrn(srow,scol,erow,ecol,&scrn_mem_free);
           loop_player.status    = player[cur_play].status;
           if (player[cur_play].status & AUTOPLAY)
               {
                stopvid();
                loop_player.startfrm = get_frame(cur_play);
                loop_player.endfrm   = player[cur_play].endfrm;
                loop_player.waitfrm  = player[cur_play].waitfrm;
                loop_player.vdisc    = player[cur_play].vdisc;
                }

           for (i = 0; i <= MAX_PROCESSES; i++)
                 loop_process[i] = process_var[i];

           for (i = 0; i<= MAX_TASKS; i++)
                 loop_task[i] = task_var[i];

           break;
     case 1:     /* ending a loop event */
          jump_branch(evttable[loop_evt_num].ename);
          return;

          if (loop_evt_num < 0)
             return;
          if (rmode)
             {
             cursor(24,1);
             printf("Return event number = %d",loop_evt_num);
             getch();
             }
          getevent(loop_evt_num);
          cur_evt = loop_evt_num;
          pcounter = evttable[loop_evt_num].evalue + loop_evt_pcounter;
          pcounter -= 2;
          if (cur_mode != smode)
              setmode(cur_mode);
          if (smode == 4 || smode == 1)
               ecol = 40;
```

```
/* writscrn(srow,scol,erow,ecol,scrn_display); */
scrn_mem_free = cfree(scrn_mem_free);
if (loop_touch[0])
   {
   strcpy(tchbrstr,loop_touch);
   tch_on(0);
   loop_touch[0] = 0;
   }
if (*sys_icon_str)
    {
     str_op[0] = sys_icon_str;
      sysbrch();
     }
if (*pau_icon_str)
   {
    str_op[0] = pau_icon_str;
    pausebrh();
   }

if (loop_player.status & AUTOPLAY)
   {
   /* reset */
   ddbuf[0] = 0x00;
   devicewt(loop_player.vdisc,ddbuf,1);

   if (loop_player.vdisc == vdisc1)
       {
        cur_play = 0;
        waitpoll(VDIS1_DEVICE);
        }
   else
        {
        cur_play = 1;
        waitpoll(VDIS2_DEVICE);
        }

   /* search to the frame */
   ddbuf[0] = 0x02;
   ddbuf[1] = hibyte(loop_player.startfrm);
   ddbuf[2] = lobyte(loop_player.startfrm);

   devicewt(loop_player.vdisc,ddbuf,3);

   player[cur_play].startfrm = loop_player.startfrm;

  if (loop_player.vdisc == vdisc1)
      waitpoll(VDIS1_DEVICE);
  else
      waitpoll(VDIS2_DEVICE);

  /* play to from */
  player[cur_play].status |= AUTOPLAY;

  ddbuf[0] = 0x03;
  player[cur_play].endfrm = loop_player.endfrm;
  ddbuf[1] = 0;
  ddbuf[2] = 0;
  ddbuf[3] = hibyte(loop_player.endfrm);
  ddbuf[4] = lobyte(loop_player.endfrm);

  cnt = 5;

  devicewt(loop_player.vdisc,ddbuf,cnt);

  intlace(0x01);  /* interlace */

 }

 for (i = 0; i <= MAX_PROCESSES; i++)
        process_var[i] = loop_process[i];
```

```
        for (i = 0; i<= MAX_TASKS; i++)
                task_var[i] = loop_task[i];

        break;
    }
}


/*****************************************************************************

        breakout(cmdnum,tstack,tokennum)

        called with:
                int cmdnum;             the command token number.
                char *tstack;           pointer to the current position in the
                                        token list.
                int tokennum;           number of operands for this command.

        returns:
                VOID
        uses:
                putntabl()
                putgtabl()

        notes:
            - Translates the command from Composer into a command that Conductor
              can execute quicker.
            - For each new command puts the new operands and operators into the
              token buffer.
            - The commands translated are :
                PLAYVID - 22 : creates a SETAUDIO command that is placed before
                               the PLAYVID command.
                PLAYSEARCH - 20 : creates DOSTILL and SETVIDEO.
                CHGVIDEO - 23 : creates WAITFRAME, SETVIDEO, and SETAUDIO.
                DOSTILLS - 31 : creates a set of DOSTILL and WAITTIME commands.
                PUTSCREEN - 40 : creates either a CLRSCRN or PUTSCRN1.
                ASSIGN_ALL - 108 : creates either ASSIGN_NUM or ASSIGN_STR
                ADD_ARGS - 103 :
                SUB_ARGS - 104
                MULT_ARGS - 105
                DIVIDE_ARGS - 106
                EXPON_ARGS - 107
                ALL_CALC    - 122

        history:
                01-22-86 rwp - initial description
                01-28-86 rwp - correct breakout for reverse video
                02-03-86 rwp - add ASSIGN_NUM and ASSIGN_STR
                02-04-86 rwp - delete SETVIDEO from CHGVIDEO and PLAYSEARCH
                               commands. SETVIDEO will be generated by Composer.
                             - add newptr as local variable
                02-06-86 rwp - add calc commands
                02-21-86 rwp - add border color to clrscrn command
                03-04-86 rwp - look for constant in ASSIGN_ALL
                03-07-86 rwp - add the argument type to ASSIGN_ALL
                             - make precision a byte
                             - add constants to ALL_CALC

*****************************************************************************/


#include "view.h"
#include "cmdnum.i"
#include "vstruct.h"
#include "viewdata.h"


breakout(cmdnum,tstack,tokennum)
  int cmdnum;
  char *tstack;
```

```
int tokennum;

{

unsigned frame;
char *graph_name;
int i;
char *newptr;
int length;

switch(cmdnum)

     {
     case PLAYVID:
          *tokenptr++ = *tstack;                     /* playcode */
          *tokenptr++ = SETAUDIO + 128;

          *tokenptr++ = *tstack;                     /* playcode */
          *tokenptr++ = *(tstack + 1);               /* from frame */
          *tokenptr++ = *(tstack + 2);               /* to frame */
          *tokenptr++ = *(tstack + 3);               /* speed */
          *tokenptr++ = PLAYVID + 128;
          break;
     case PLAYSEARCH:
          *tokenptr++ = *tstack;                     /* playcode */
          *tokenptr++ = *(tstack + 1);                 /* from frame */
          *tokenptr++ = DOSTILL + 128;
          break;

     case CHGVIDEO:
          *tokenptr++ = *tstack;                     /* put playcode */
          *tokenptr++ = *(tstack + 1);               /* frame */
          *tokenptr++ = WAITFRAME + 128;
          *tokenptr++ = *tstack;                     /* put playcode */
          *tokenptr++ = SETAUDIO +128;
          break;
     case DOSTILLS:
          /* find the value of the starting frame number from numtable */
          frame = numtable[*(tstack+1)].nvalue;
          /* create the individual dostill commands */
          while (frame <= numtable[*(tstack + 2)].nvalue )
               {
               *tokenptr++ = *tstack;                /* playcode */
               *tokenptr++ =(char)putntabl(frame);   /* frame */
               *tokenptr++ = DOSTILL + 128;
               *tokenptr++ = *(tstack + 4);          /* wait time */
               *tokenptr++ = WAITTIME + 128;
               frame += byttable[*(tstack + 3)].bvalue;
               }
          break;
     case PUTSCREEN:
          /* find the name of the graphic */
          graph_name = strtable[*(tstack + 7)].svalue;

          /* if the keyword "CLEAR" is used then find the mode */
          /* set i to the mode number                          */
          if (strncmp(graph_name,"CLEAR",5)== 0)
               {
               if (strcmp(graph_name+5,"40") == 0)
                    i = 1;
               else if (strcmp(graph_name + 5,"80") == 0)
                    i = 3;
               else if (strcmp(graph_name + 5,"LO") == 0)
                    i = 4;
               else if (strcmp(graph_name + 5,"MD") == 0)
                    i = 13;
               else if (strcmp(graph_name + 5,"HI") == 0)
                    i = 14;
               else
                    i = 0;     /* clear a section of the screen */
```

```
        *tokenptr++ = (char)putntabl((unsigned)i);  /* mode */
        *tokenptr++ = *(tstack + 3);  /* background color      */
        *tokenptr++ = *(tstack + 2);  /* palette or foreground */
        *tokenptr++ = *(tstack + 4);  /* border color          */
        *tokenptr++ = *(tstack + 5);  /* srowScol              */
        *tokenptr++ = *(tstack + 6);  /* erowecol              */
        *tokenptr++ = CLRSCRN+128;
      }
    else
      {
      /* Else this is a regular putscreen command. */
      /* the last 2 tokens will be the graph number and the new */
      /* command number.                                         */

        for (i = 0;i<tokennum-2; i++)
            {
            *tokenptr = *(tstack+i);
             tokenptr++;
            }
        /* find the graph name in the gtable  */
        i = putgtabl(graph_name);
        *tokenptr++ = (char)putntabl((unsigned)i);
        *tokenptr++ = PUTSCRN1 +128;
      }

    break;
case ASSIGN_ALL:
    /* buffer format */
    /* type length name  rec#  type length  name   rec#   precision */
    /*  0     1    2-9   10-11  12    13    14-21  22-23     24     */

    /* set pointer to the buffer */
    newptr = strtable[*tstack].svalue;
    /* if type == variable */
    if (*newptr == 7)
      {
        /* put the variable name in the string table */
        *tokenptr++ = (char)putstabl(newptr + 2,8);

        /* put the record number in the numeric table */
        *tokenptr++ = (char)putntabl(*(unsigned *)(newptr + 10));

        /* find the agru length */
         length = *(newptr + 13);

        /* put the agru name in the string table */
        *tokenptr++ = (char)putstabl(newptr + 14,length);

        if (*(newptr + 12) == 7)
          {
          /* put the argu record number int the numeric table */
          *tokenptr++ = (char)putntabl(*(unsigned *)(newptr + 22));
          }
        else
          *tokenptr++ = (char)putntabl((unsigned)0);

          /* the argument type */
        *tokenptr++ = (char)putbtabl(*(newptr + 12));

        /* put the precision into the numeric table */
        *tokenptr++ = (char)putbtabl(*(newptr +13+length));

        *tokenptr++ = ASSIGN_NUM + 128;
        }

    else
      {
       for (i = 0;i<tokennum;i++)
           {
           *tokenptr = *(tstack + i);
```

```
                    tokenptr++;
                    }
                }
            break;
        case ADD_ARGS:
        case SUB_ARGS:
        case MULT_ARGS:
        case DIVIDE_ARGS:
        case EXPON_ARGS:
             /* buffer format */
             /* type1 len1 name1  rec#1  type2 len2  name2   rec#2     */
             /*  0     1    2-9   10-11  12    13    14-21  22-23      */

             /* rtype  r_len  r_name r_rec#  precision */

             /*  24     25     26-33  34-35    36       */

             /* set pointer to the buffer */
             newptr = strtable[*tstack].svalue;
             for (i = 1;i<= 3;i++)
                 {
                  /* if type == variable */
                  if (*newptr == 7)
                     {
                      /* put the variable name into the string table */
                      *tokenptr++ = (char)putstabl(newptr + 2,8);

                      /* put the record number into the numeric table */
                      *tokenptr++ = (char)putntabl(*(unsigned *)(newptr + 10));

                      /* put the agr type in byte table */
                      *tokenptr++ = (char)putbtabl(*newptr);

                      newptr += 12;
                      }
                   else
                      {
                      /* put the value into the string table  */
                      *tokenptr++ = (char)putstabl(newptr + 2,*(newptr + 1));

                      /* put a zero record number in the numeric table  */
                      *tokenptr++ = (char)putntabl(0);

                      /* put the agr type in byte table */
                      *tokenptr++ = (char)putbtabl(*newptr);

                      newptr += *(newptr +1) + 2;
                      }
                   }

             /* put the precision into the byte table */
             *tokenptr++ = (char)putbtabl(*newptr);

             /* add the current command token */
             *tokenptr++ = (char)putbtabl(cmdnum) ;

             *tokenptr++ = ALL_CALC + 128;
          break;
        }

}

/***************************************************************************
        debug_process()

        called with:
                nothing

        returns:
                VOID
```

```
        uses:

        notes:

        history:
                02-06-86 rwp - initial entry
                02-07-86 rwp - change output to color screen
                             - modify for 40 columns
                02-11-86 rwp - add BASIC's debugging
                02-12-86 rwp - modify sbox for debug use
                02-21-86 rwp - add waitpoll()

****************************************************************************/


#include "task.h"
#include "view.h"
#include "vstruct.h"
#include "viewdata.h"
#include "cmdnum.i"

extern struct cmd cmds[];



struct proc
        {
        char *pname;
        int proc_num;
        char *task_name;
        int task_num;
        };

static struct proc proc_list[] = {

/* proc_name        proc_num              task_name                task_num    */
"Command Key",  COMMAND_KEY_PROCESS, "Cmd Key Pressed", COMMAND_KEY_TSK,
"Touch",        REGULAR_KEY_PROCESS, "Scrn Touched",      REGULAR_KEY_TSK,
"Icons",        ICON_KEY_PROCESS,    "Icon Touched",         ICON_KEY_TSK,
"Keyboard",     KEY_IN_PROCESS,      "Key Pressed",          KEYBOARD_TSK,
"TouchBoard",   TCHBOARD_PROCESS,    "Touch Key",    TCHBOARD_TSK,
"Time",         TIME_UP_PROCESS,     "Time Wait",  TIMEWAIT_TSK,
"2nd Attri",    SECOND_ATTR_PROCESS, "Column ",     SECOND_ATTR_TSK,
"Commands",     COMMAND_PROCESS,     "Command ",  COMMAND_TSK,
};

debug_process()

{


if (task_var[DEBUG_TSK])
   {
   debug2_process();
   }
else
   {
   debug_off();
   block_process(DEBUG_PROCESS);
   clear_task(DEBUG_TSK);
   }

}

/****************************************************************************
debug2_process()
****************************************************************************/

debug2_process()
```

```
{
int i;
int key;
int strow,stcol,end_row,end_col;
unsigned k;
char buf[10];
int newcol;

/* turn frame display on */
ddbuf[0] = 0x06;
ddbuf[1] = 0x01;

if (player[0].vdisc > 0)
   {
    devicewt(player[0].vdisc,ddbuf,2);
    waitpoll(VDIS1_DEVICE);
    }

/* show touch areas */
for (i = 60;i > 0;i--)
    {
     if (tchbrch[i].tsrow)
        {
         strow = tchbrch[i].tsrow;
         stcol = tchbrch[i].tscol;
         end_row = tchbrch[i].terow;
         end_col = tchbrch[i].tecol;

         sbox_debug(strow,stcol,end_row,end_col,7);
         key = (i > 10) ? i - 10: i + 50;
         if (smode == 4 || smode == 1)
            {
             stcol /= 2;
             end_col /= 2;
             }
         sprintf(buf,"%d",key);
         wrtdebug(buf,strow,end_col-2);
         }
    }
wrtdebug(evttable[cur_evt].ename,2,2);
newcol = strlen(evttable[cur_evt].ename) + 4;

    k = 65535;
    for (i = 16; i > 0;i--)
        {
         if (sys_ind & k)
             wrtdebug("1",2,newcol);
         else
             wrtdebug("0",2,newcol);
         if (i == 16)
            k = 32768;
         else
            k  /= 2;
         newcol++;
        }
}

/**
turn debug off
*******************************************************************************/

debug_off()

{
/* turn frame display on */
ddbuf[0] = 0x06;
ddbuf[1] = 0x00;

if (player[0].vdisc > 0)
   {
```

```
    devicewt(player[0].vdisc,ddbuf,2);
    waitpoll(VDIS1_DEVICE);
    }


}
/*************************************************************************
debug1_process
*************************************************************************/

debug1_process()

{
int i;
char buf[41];
char *cur_pcounter;
char operator;
debug_scrn();
for (i = 0; i< 8;i++)
     {
      sprintf(buf,"%2d",process_var[proc_list[i].proc_num]);
      wrtdebug(buf,i+3,15);
      sprintf(buf,"%2d",task_var[proc_list[i].task_num]);
      wrtdebug(buf,i+3,37);
      }

wrtdebug(evttable[cur_evt].ename,14,15);
sprintf(buf,"%2c",kb_buff[kb_buff[0]]);
wrtdebug(buf,15,15);

buf[0] = touch_key_buff[touch_key_buff[0]];
sprintf(buf,"%2d",touch_key_buff[touch_key_buff[0]]);
wrtdebug(buf,16,15);
sprintf(buf,"%25s","");
wrtdebug(buf,17,15);
cursor(17,15);

for (i = 1; i<= 60;i++);
     {
     if (tchbrch[i].tbrhcode)
         printf("%d,",i);
     }

sprintf(buf,"%40s","");
wrtdebug(buf,19,1);
wrtdebug(buf,20,1);
wrtdebug(buf,21,1);

cur_pcounter = pcounter;

while (*pcounter < 128)                /* stack the operands */
         pcounter++;

operator = (*pcounter) - 128;          /* unstack the operands */
unstack(operator);
prt_all_debug(operator);
pcounter = cur_pcounter;

if (dpause)
    get_kb_key();
}
/*************************************************************************
debug_scrn
*************************************************************************/

debug_scrn()

{

int i;
```

```
wrtdebug("PROCESSES",1,5);
wrtdebug("TASKS",1,25);

for (i = 0; i< 8;i++)
     {
      wrtdebug(proc_list[i].pname,i+3,1);
      wrtdebug(proc_list[i].task_name,i+3,21);
      }

wrtdebug("Current Event:",14,1);
wrtdebug("Key Pressed:",15,1);
wrtdebug("Touch Key:",16,1);
wrtdebug("Active Touch:",17,1);
wrtdebug("Next Command ",18,1);
}

/******************************************************************************
        prt_all_debug - displays the command with operands

        called with:

        returns:

        uses:

        notes:

        history:
                02-06-86 rwp - initial entry

******************************************************************************/

prt_all_debug(cmdnum)
  char cmdnum;

{

char bytcnt;
char numcnt;
char strcnt;
int bufcnt = 0;
int i;
char *new_ptr;
char cmdbuf[160];


bytcnt = 0;
numcnt = 0;
strcnt = 0;

for (i = 0;i<maxcmds;i++)
     {
      if (cmdnum == cmds[i].cmdtoken)
          break;
      }
sprintf(cmdbuf,"%s (",cmds[i].cname);
bufcnt = strlen(cmdbuf);

for (i = 0; i < cmdline[cmdnum].varmax; i++)
     {
      switch(cmdline[cmdnum].varcode[i])
            {
             case 0:      /* byte    */
                  sprintf(cmdbuf+ bufcnt,"%d",byt_op[bytcnt++]);
                  bufcnt = strlen(cmdbuf);
                  break;
             case 1:      /* unsigned */
                  if (cmdnum == PUTSCRN] && i == 7)
                     {
```

```
                    sprintf(cmdbuf + bufcnt,"%s",gphtable[num_op[numcnt++]].gna
me);
                    }
                else
                    {
                     sprintf(cmdbuf + bufcnt,"%u",num_op[numcnt++]);
                    }
                bufcnt = strlen(cmdbuf);
                break;
           case 2:      /* buffer   */
                new_ptr = str_op[strcnt];

                while (*new_ptr)
                      {
                    if (cmdnum == SYSBRCH &&
                          ( *new_ptr >50 && *new_ptr < 61) ) -
                        sprintf(cmdbuf + bufcnt,"[%d]",*new_ptr);
                    else if (cmdnum == PAUSEBRH &&
                          ( *new_ptr >50 && *new_ptr < 61) )
                        sprintf(cmdbuf + bufcnt,"[%d]",*new_ptr);

                    else if ((*new_ptr < 32 || *new_ptr > 125)
                                || cmdnum == DFNTOUCH )
                          sprintf(cmdbuf + bufcnt,"[%d]",*new_ptr);
                    else
                          sprintf(cmdbuf + bufcnt,"%c",*new_ptr);
                       new_ptr++;
                       bufcnt = strlen(cmdbuf);
                      }
                strcnt++;
                break;
           default:
                if (cmdnum != ASSIGN_NUM && cmdnum != ASSIGN_STR &&
                      cmdnum != ASSIGN_ALL)
                      {
                       sprintf(cmdbuf + bufcnt,"%s",str_op[strcnt++]);
                       bufcnt = strlen(cmdbuf);
                      }
                else
                     {
                     new_ptr = str_op[strcnt];
                     while (*new_ptr)
                         {
                         if (*new_ptr < 33 || *new_ptr > 125)
                             sprintf(cmdbuf + bufcnt,"[%d]",*new_ptr);
                         else
                             sprintf(cmdbuf + bufcnt,"%c",*new_ptr);
                          new_ptr++;
                          bufcnt = strlen(cmdbuf);
                          }
                     strcnt++;
                     }
                break;
           }
     if (i <  cmdline[cmdnum].varmax-1)
        {
        sprintf(cmdbuf + bufcnt,",");
        bufcnt = strlen(cmdbuf);
        }
     }
  sprintf(cmdbuf + bufcnt,")");

  wrtdebug(cmdbuf,19,1);
  }
```

```
/*****************************************************************************
wrtdebug
*****************************************************************************/


wrtdebug(str_ptr,row,col)
   char *str_ptr;
   int row,col;

{

wrtstr10(str_ptr,7,row,col);

}
/****************************************************************************

        screen i/o primitives
                cls() - clears entire screen including border.
                clx() - clears a section of the screen.
                chbord() -clears the border
                chback() - changes the color of background
                chpal()  - changes the pallette
                vretrace() - checks for vertical retrace
                prog_palette() - program the pallette register

        notes:

        history:
                01-31-86 rwp - initial descriptions
                02-04-86 rwp - add modifications per T.R.
                02-21-86 rwp - add prog_pallette()
                02-27-86 rwp - correct chbord and chback
                03-13-86 rwp - add cmp_palettes(&header.palreg,&cur_pal_array)

****************************************************************************/
#include "view.h"
#include "stdio.h"
#include "vstruct.h"
#include "viewdata.h"
#include "dos.h"

#define TO_EGA(a)        (((a) & 8) < 1 + ((a) & 7 ))
#define TO_CGA(a)        (((a) & 16) > 1 + ((a) & 7))

cls (att) /* clear the entire screen, including the border, to attribute att */
  /* cls(1) makes it blue */

int att;
{
   clx(att,0x0,0,0,24,maxcol-1);
   chbord(att);

 }

clx (hatt,latt,srow,scol,erow,ecol)
int hatt,latt;
unsigned srow,scol,erow,ecol;

{
   union REGS inregs;
   union REGS outregs;

if (smode == 4)
   {
     /* does the background */
     chback(hatt);
   }
     /* set up regular */
   /* inregs.x.cx=0; */
```

```
  inregs.h.ch = srow;
  inregs.h.cl = scol;
  inregs.h.dh=erow;
  inregs.h.dl=ecol;
  if (smode == 4)
       inregs.h.bh = 0;
  else if (smode < 4)
       {
        /* blink bit (16) ignored */
        inregs.h.bh = (hatt & 7) <<4 + (latt & 0x0f);
       }
  else
       {
       inregs.h.bh = (hatt & 7);     /* no shift if D or E mode */
       }
   inregs.h.ah = 0x06;                /* scroll up */
   inregs.h.al = 0x00;                /* entire window */
   int86(0x10,&inregs,&outregs);
  }

chbord (att)  /* change border color */
int att;
{
   union REGS inregs;
   union REGS outregs;

   att= (att & 8)*2 + (att & 7);

     /* does the border */
   inregs.x.ax=0x1001;
   inregs.h.bh=att;
   vretrace();
   int86(0x10,&inregs,&outregs);
}


chback (att)
int att;
{
   union REGS inregs;
   union REGS outregs;

   att= (att & 8)*2 + (att & 7);
   inregs.x.ax=0x1000;

   inregs.h.bh = att;
   inregs.x.cx = 0;
   inregs.h.bl=0;
   vretrace();
   int86(0x10,&inregs,&outregs);

 }

chpal (num)
int num;
{
union REGS inregs;
union REGS outregs;
int bxs[4][3];
int i;

if (num < 0 || num > 3)
   num = 0;

cur_pal = num;

bxs[0][0]=0x0201;
bxs[0][1]=0x0402;
bxs[0][2]=0x0603;
bxs[1][0]=0x0301;
```

```
    bxs[1][1]=0x0502;
    bxs[1][2]=0x0703;
    bxs[2][0]=0x1201;
    bxs[2][1]=0x1402;
    bxs[2][2]=0x1603;
    bxs[3][0]=0x1301;
    bxs[3][1]=0x1502;
    bxs[3][2]=0x1703;
      /* does the palette */
    inregs.x.ax=0x1000;
    for (i=0;i<3;++i)
      {
      inregs.x.bx=bxs[num][i];
      vretrace();
      int86(0x10,&inregs,&outregs);
      }
    }

/**************************************************************************
program the palette register
**************************************************************************/

prog_palette(palreg)
      char *palreg;
{
union REGS inregs;
union REGS outregs;
int i;

/* does the palette */
inregs.x.ax=0x1000;
for (i=0;i<16;++i)
   {
   inregs.h.bh = *(palreg + i);
   inregs.h.bl = i;
   vretrace();
   int86(0x10,&inregs,&outregs);
   }

chbord(TO_CGA(*(palreg + 16)));

}

/**************************************************************************
vertical retrace
**************************************************************************/


vretrace()
{

unsigned port = 0x3da;

while (!(inp(port) & 0x08))      /* wait for vertical retrace */
     ;

while (inp(port) & 0x08)       /* wait for not vertical retrace */
      ;

}


/**************************************************************************
cmp_palettes(&header.palreg,&cur_pal_array)

**************************************************************************/

cmp_palettes(first_pal,second_pal)
    char *first_pal;
    char *second_pal;
```

```
{
int i;
for (i = 0;i<17;i++)
    {
    if (*(first_pal + i) != *(second_pal + i) )
       return(FALSE);
    }
return(TRUE);
}
/*****************************************************************************
        routines to change directories

        called with:

        returns:

        uses:

        notes:

        history:
                02-17-86 rwp - initial entry
*****************************************************************************/

#include "dos.h"

int find_dir(buffer)
    char *buffer;           /* buffer must be 65 byte area */
{

union REGS inregs;
union REGS outregs;
struct SREGS segregs;
char *dummy;

dummy = buffer;

inregs.h.ah = 0x47;
inregs.h.dl = 0;        /* default drive */
movmem(&dummy,&inregs.x.si,2);
movmem(((char *)&dummy)+2,&segregs.ds,2);

int86x(0x21, &inregs, &outregs,&segregs);


}

/*****************************************************************************
 change the directory
*****************************************************************************/

int chg_dir(buffer)
    char *buffer;

{


union REGS inregs;
union REGS outregs;
struct SREGS segregs;
char *dummy;
```

```
dummy = buffer;

inregs.h.ah = 0x3b;
movmem(&dummy,&inregs.x.dx,2);
movmem(((char *)&dummy)+2,&segregs.ds,2);

int86x(0x21, &inregs, &outregs,&segregs);


}

/****
main ( argc, argv )
        int argc;
        char *argv[];
{

char buffer[70];

find_dir(buffer);
printf("\nCurrent directory  %s",buffer);

chg_dir(argv[1]);

}

****/

/*****************************************************************************
chkevt

o determines if this is an event name

*****************************************************************************/
#include "view.h"

extern char *scan_ptr;

chkevt()


{

int vtype;

if (*scan_ptr == '*' && isalpha( *(scan_ptr + 1) ) )
        return(TRUE);              /* variable */

else
     return(FALSE);

}

/*****************************************************************************
chknum

o determines if this is numeric

*****************************************************************************/
#include "view.h"

extern char *scan_ptr;

chknum()


{

int vtype;
```

```
if ( isdigit(*scan_ptr) )
    vtype = 1;                      /* constant */

else if (*scan_ptr == '%' && isalpha( *(scan_ptr + 1) ) )
        vtype = 2;                  /* variable */

else
     vtype = FALSE;

return(vtype);

}

/*********************************************************************************
chkstr

o determines if this is a string

*********************************************************************************/
#include "view.h"

extern char *scan_ptr;

chkstr()


{

int vtype;

if ( *scan_ptr == '"')
    vtype = 1;                      /* constant */

else if (*scan_ptr == '$' && isalpha( *(scan_ptr + 1) ) )
        vtype = 2;                  /* variable */

else
     vtype = FALSE;

return(vtype);

}

/*******************************************************************************

        chktime - compare current time to target time

        called with:
                nothing
        returns:
                TRUE - if current time > target time
                FALSE - if current time < target time
        uses:
               tictime()
        notes:

        history:
                01-29-86 rwp - add sync routines
                01-30-86 rwp - add TCHBOARD_PROCESS
                03-05-86 rwp - add SECOND_ATT_TSK
*******************************************************************************/

#include "view.h"
#include "task.h"

extern long targetic;
long tictime();

chktime()
```

```
{

long curtic;

curtic = tictime();
if ( curtic >= targetic )
   {
   signal_process(COMMAND_PROCESS);
   signal_task(SECOND_ATTR_TSK);
   block_process(TIME_UP_PROCESS);
   clear_task(TIMEWAIT_TSK);
   block_process(KEY_IN_PROCESS);
   block_process(REGULAR_KEY_PROCESS);
   block_process(TCHBOARD_PROCESS);
   return(TRUE);
   }
else
   return(FALSE);


}

/*****************************************************************************************
memory allocation

*****************************************************************************************/
#include "\viewc\view.h"
#include "stdio.h"

char *malloc();


char *cmalloc(n)
   unsigned n;

{
char *p;

p = malloc(n);

if (p == 0)
   {
   printf("\nMEMORY ALLOCATION ERROR.");
   _exit(0);
   }

return(p);

}

char *cfree(p)
 char *p;


{
int n;
if (p != NULL)
    n = free(p);
return(NULL);

}

/****************************************************************************************
cmdlist - gives a listing of all presentation commands

        main(argc, argv)

        called with:
                PRESENTATION NAME,(S)UMMARY OR (D)ETAIL,COMMAND NUMBER
```

```
                presentation name - without the sub-directory
                s - summary listing
                d - detail listing of all of the command
                999 - all commands

        returns:
                setfnptr()
                setcmd()
                fd_files()
                presdata()
                bldindex()
                listall()
                prt_one_cmd()
                unstack()
                prt_all_of_one()

        uses:

        notes:

        history:
                01-21-86 rwp - modified to use the new library format
                01-28-86 rwp - add 1 to maxcmds to account for command_error.
                02-04-86 kmb - modified to print out all unkown cmd numbers
                02-06-86 kmb - bldgtabl now called only for found graphics
                03-13-86 rwp - add end_conductor to this file

*******************************************************************************/

#include "stdio.h"
#include "view.h"
#include "vstruct.h"
#include "cmdnum.i"
#include "fcntl.h"

int command_list[500];

#define extern
#include "viewdata.h"
#undef extern

#include "cmds.i"          /* commmand definitions                    */

char *cmalloc();
char *malloc();

/*******************************************************************************
main procedure
*******************************************************************************/

main ( argc, argv )
        int argc;
        char *argv[];
{
int i;
int done = FALSE;

int command_to_find = 0;
int report_level = 1;  /* detail */
char summary_level[4];

maxcmds = sizeof(cmds)/sizeof(struct cmd) ;   /* number of commands   */


setfnptr();                         /* assign function pointers */

if ( argc == 2)
    {
    strcpy(pres_name,argv[1]);
    }
else
```

```
    {
     printf("\nENTER PRESENTATION NAME");
     _exit(0);
    }

setcmd();      /* set the command syntax */

      /* allocate memory */
     tkstart = cmalloc(2000);
     tokenptr = tkstart;
     pcounter = tkstart;
     tk_end = tkstart + 1900;

fd_files(pres_name);    /* open control file */
presdata();           /* read control files */
if (libnum > 0) bldgtabl();           /* build the graphics table */
bldindex();           /* build event index */

listall(command_to_find,report_level);
/*
printf("\n numindex = %d strindex = %d evtindex = %d",numindex,strindex,evtindex
);
printf("\n bytindex = %d gphindex = %d",numindex,strindex);
*/
}

/****************************************************************************
list all
****************************************************************************/
listall (command_to_find,report_level)
 int command_to_find;
 int report_level;

{
int i;
int j;

printf("\nPRESENTATION  - [%s]",pres_name);
printf("\nSTART EVENT   - [%s]",strt_evt);
printf("\nSYSTEM COLOR  - %u",syscolor);
printf("\nGOODBYE EVENT - [%s]",end_evt);
printf("\nDEBUG FLAG    - %u",dbugflag);
printf("\nLOG FLAG      - %u",logflag);
printf("\nMAX TIME      - %u",max_time);
printf("\nAUTO LOAD     - %u",autoload);
printf("\nSTAGE         - %u",stage);
printf("\nGOOD BEEP     - %u",goodbeep);
printf("\nBAD BEEP      - %u",badbeep);
printf("\nVERSION       - %u",version);
printf("\nINDICATORS    - %u",sys_ind);
printf("\nRETURN BRANCH - %u",sys_brch);
printf("\nAUTO EVENT    - [%s]",autoevt);
printf("\nAUTO TIME     - [%s]",autotime);
printf("\nMAX MODE      - %u",max_mode);
printf("\nWIPE MODE     - %u",wipe_mode);
printf("\nICON FEEDBACK - %u",sysfeed);
printf("\nTCH FEEDBACK  - %u",tchfeed);
printf("\nHELP ICON     - [%s]",icon[0].icon_name);
printf("\nREPLAY ICON   - [%s]",icon[1].icon_name);
printf("\nJUMP1 ICON    - [%s]",icon[2].icon_name);
printf("\nJUMP2 ICON    - [%s]",icon[3].icon_name);
printf("\nJUMP3 ICON    - [%s]",icon[5].icon_name);
printf("\nRESUME ICON   - [%s]",icon[9].icon_name);
printf("\nSLOW BACK     - [%s]",icon[6].icon_name);
printf("\nSLOW FORWARD  - [%s]",icon[7].icon_name);
printf("\nGOODBYE ICON  - [%s]",icon[4].icon_name);

/* if a detail report */
if (report_level)
   {
```

```
printf("\n\nEVENT TABLE\n");
for (i=0; i< evtindex;i++)
    {
    j = evttable[i].evalue - tkstart;
    printf("\n%2d [%s]  file = %2d",
        i,evttable[i].ename,evttable[i].fileindx);
    }

printf("\n\nSCREEN TABLE\n");

for (i=1; i<= gphindex;i++)
    {
     printf("%2d  ",i);
     printf("[%s] %6u %81d",gphtable[i].gname,gphtable[i].gsize,
         gphtable[i].position);
     printf("\n");

          }

    }

printf("\n\n\nCOMMAND LIST : ");

if (report_level)
    printf("DETAIL LISTING");
else
    printf("SUMMARY LISTING");


 pcounter = tkstart;
 tokenptr = tkstart;
 numindex = 0;
 strindex = 0;
 bytindex = 0;

 for (i=0;i<evtindex;i++)
      {
       getevent(i);
       prt_cmd();
       pcounter = tkstart;
      }
 if (report_level ==1)
      printf("\f");
/***
printf("\nPRESENTATION  - [%s]",pres_name);

printf("\n\nCOMMAND #   COMMAND NAME              TIMES FOUND\n\n");

for (i = 0;i<129;i++)
     {
      if (command_list[i])
          {
           printf("\n    %-9u",i);
           for (j = 0;j<maxcmds;j++)
                {
                 if (i == cmds[j].cmdtoken)
                     break;
                }
           if (j < maxcmds) printf("%-25s",cmds[j].cname);
           else printf("%-25s","UNKNOWN");
           printf("%5u",command_list[i]);
           }
     }

****/


 }
```

```
/***
if (command_to_find == 999 || cmdnum == command_to_find)
    command_list[cmdnum]++;
***/

/*****************************************************************************
end conductor
*****************************************************************************

end_conductor()

{

_exit(0);

}

/*****************************************************************************

        command_key_process()  - gets the next key from kb_buff and
                                  executes the command.

        called with:
                nothing
        returns:
                TRUE if execution should end
                FALSE if execution continues

        uses:

        notes:

        history:
                01-29-86 rwp - initial entry
                02-06-86 rwp - add debug keys
                02-11-86 rwp - add BASIC's debugging keys
                02-13-86 rwp - add test of dbugflag
                02-18-86 rwp - disconnect function keys

*****************************************************************************/


#include "task.h"
#include "view.h"
#include "vstruct.h"
#include "viewdata.h"

command_key_process()

{
int key;
int tch_key;

key = kb_buff[kb_buff[0]];

/* make sure the number of keys is >= 0 */
if (kb_buff[0] > 1)
    kb_buff[0]--;

block_process(COMMAND_KEY_PROCESS);
clear_task(COMMAND_KEY_TSK);

switch (key)
    {
    case F1:
    case F2:
    case F3:
    case F4:
    case F5:
    case F6:
```

```
case F7:
case F8:
case F9:
case F10:
/******* Function key activate icons
     signal_task(ICON_KEY_TSK);
     signal_process(ICON_KEY_PROCESS);
     tch_key = key - 58;
     if (touch_key_buff[0] < 10)
         {
         touch_key_buff[0]++;
         touch_key_buff[touch_key_buff[0]] = tch_key;
         }
********/
     break;
case ALTF1:
     touchoff();
     return(TRUE);
     break;
case ALTF2:   /* toggle debug active  */

     if (process_var[DEBUG_PROCESS])
         {
         block_process(DEBUG_PROCESS);
         clear_task(DEBUG_TSK);
         }
     else
         {
         signal_process(DEBUG_PROCESS);
         signal_task(DEBUG_TSK);
         }
     break;
case ALTF3:       /* pause mode */
        if (dpause == 0)
            dpause = 1;
        else
            dpause = 0;
        break;
case ALTF9:
        /* toggle debug */
        if (process_var[DEBUG_PROCESS])
        {
         /* block_process(DEBUG_PROCESS); do this in debug_process() */
         clear_task(DEBUG_TSK);
         }
     else if (dbugflag)
         {
         signal_process(DEBUG_PROCESS);
         signal_task(DEBUG_TSK);
         }
     break;
case ALTF10:
     end_conductor();
     break;
case CURS_UP:
case CURS_DOWN:
case CURS_LEFT:
case CURS_RIGHT:
case PAGE_UP:
case PAGE_DOWN:
case HOME:
case END:
case INSERT:
case DELETE:
     break;
case ESC:
    break;
 }
return(FALSE);
}
```

```
/*****************************************************************************
Conductor main routine

        main ( argc, argv )
             int argc;
             char *argv[];

        called with:

        returns:

        uses:

        notes:

        history:
                01-22-86 rwp - add check of autoload before calling loadplyr()
                01-31-86 rwp - add asterisk to findgoto name
                             - make search for author file a separate function
                             - add init_vars()
                02-03-86 rwp - take cfree out of init_vars()
                             - calculate maxcmds using structure size
                02-05-86 rwp - take grphindex and evtindex out of init_vars()

                02-21-86 rwp - find the starting screen mode
                02-22-86 rwp - add call to clear_poll()
                03-03-86 rwp - delete ln25name()

*****************************************************************************/


#include "stdio.h"
#include "view.h"
#include "vstruct.h"
#include "cmdnum.i"

#define extern
#include "viewdata.h"       /* global data              */
#include "ver_text.h"
#undef extern

#include "tch.i"         /* alpha touch & help touch definitions */
#include "cmds.i"          /* commmand definitions                 */

extern unsigned ibsta;
extern int iberr;
extern int ibcnt;

char *cfree();
char *cmalloc();
char *malloc();

/*****************************************************************************
main procedure
*****************************************************************************/

main ( argc, argv )
        int argc;
        char *argv[];
{
int i;
int done = FALSE;
char first_evt[10];
int read_first = 0;
char branch_buf[10];


maxcmds = sizeof(cmds)/sizeof(struct cmd) ;   /* number of commands    */
```

```
/* get the starting screen mode */
getvmode();
start_mode = smode;

setfnptr();                         /* assign function pointers */
cur_off();                          /* turn the text cursor off */

/* use the argvs on the command line */
if ( argc > 1 )
    {
    strcpy(pres_name,argv[1]);            /* the presentation name */
    if (argc > 2)
        {
        strncpy(first_evt,argv[2],8);   /* the event name        */
        read_first = 1;
        }
    }
else
    {
    read_author();
    }

setcmd();                           /* set the command syntax */
initvid();                          /* initialize device driver */

while (1)
    {
    /* allocate memory */
    tkstart = cfree(tkstart);
    tkstart = cmalloc(2000);        /* token space              */
    tk_end = tkstart + 1900;        /* set to end of tokens     */
    init_vars();                    /* reset variables          */
    init_tasks();                   /* reset the processes and tasks  */
    fd_files(pres_name);        /* open all files
    presdata();               /* read the presentation options data */
    bldgtabl();               /* build graphics index               */
    if (!newpres)
        copyrht();              /* display copy right screen */
    newpres = 0;              /* turn off newpres          */
    bldindex();               /* build event index */

    if (autoload)
        loadplyr();           /* load player */

    /* determine which event to start with */
    strcpy(branch_buf,"*");
    if (read_first)
        {
        strcat(branch_buf,first_evt);  /* load event from command line */
        read_first = 0;
        }
    else
        strcat(branch_buf,strt_evt);   /* load the starting event  */

    findgoto(branch_buf);
    /* clear vision reponses */
    clear_poll();

    /* stays in exe_loop() until end, new presentation or debug  */
    exe_loop();               /* main execution loop                 */

    /* if this is not a new pres it must be debug */
    if (!newpres)
        {
        while (1 )
            {
            get_cmd ();                /* wait for user command */
            scan_ptr = cmd_buff;    /* set pointer to beginning */
            scanline();           /* parse the command */
```

```
            }  /* end while (1) */
        }      /* end if        */
    }          /* end while (1) */
}

/*******************************************************************************
get_cmd -  reads keyboard input with echo
          until a carriage return is received.
*******************************************************************************/
get_cmd ()

{
int keyin;
int rcode;
int i;
char *dummy[1];
int temp;
int start;
int endevt;
static char kact;
static char t_array[4];

long free_memory();
long mem_free;

/*  clear the command buffer */
cmd_buff[0] = '\0';

/* set pcounter  */
pcounter = tkstart;
printf("\nCommand >" );

nstring(cmd_buff,&rcode,50,ANYKEY,7,1);

switch(rcode)
      {
       case F1:  /* print tokens */
            setmode(3);
            prttoken();
            break;
       case F2:  /* trace mode */
            if (rmode == 0)
                rmode = 1;
            else
                rmode = 0;
            break;
       case F3:        /* pause mode */
           if (dpause == 0)
                dpause = 1;
            else
                dpause = 0;
            break;
       case F4:       /* load a new event */
             setmode(3);
             cursor(1,1);
             printf("Enter the event number :");
             nstring(cmd_buff,&rcode,3,ALPHA,7,1);
             keyin = atoi(cmd_buff);
             getevent(keyin);
             break;
       case F5:   /* print the event */
             setmode(3);
             temp = rmode;
             rmode = 0;
             prt_cmd();
             rmode = temp;
             pcounter = tkstart;
             break;
       case F6:
            break;
```

```
      case F7:   /*quit */
           setmode(3);
           _exit(0);
           break;
      case F8:  /* new */
           init_vars();
           break;
      case F9:   /* run */
           init_tasks();
           waitstat = 0;
           pollnum = 0;
           pollseg = 0;
           exe_loop();
           break;
      }

}

read_author()
{
FILE *author;                    /* author file                   */
char rstring[81];                /* first record of author file   */
char *presentation;               /* presentation name             */
int j;
int OK=0;
int i;

author = fopen("author.fil", "ra");       /* read the author file       */

if (author != NULL)
     {
     fgets(rstring,81,author);
     }
else
    {
     printf("\nUnable to find AUTHOR file");
    _exit(0);
    }

fclose(author);
i = 0;
while(rstring[i] && rstring[i++] != 34)
           ;

if (rstring[i-1]==34)

    {
     presentation = &rstring[i];
     while(rstring[i] && rstring[i++] != 34)
             ;

     if (rstring[--i] == 34)
         {
          OK = -1;
          rstring[i]=0x0;
         }
    }

if (!OK)
    {
     printf("\nThe AUTHOR FILE does not contain a legal file name.");
     _exit(0);
    }

strcpy(pres_name,presentation);

}
```

```
/*****************************************************************************
init_vars
*****************************************************************************/


init_vars()
{
int i;

pcounter = tkstart;
tokenptr = tkstart;
for (i = 0; i < strindex;i++)
    strtable[i].svalue = cfree(strtable[i].svalue);
strindex = 0;
numindex = 0;
bytindex = 0;
for (i = 0; i< evtindex;i++)
    {
    evttable[i].evalue = 0;
    }
waitstat = 0;
pollnum = 0;
pollseg = 0;
rtnindex = 0;
/*
tkstart = cfree(tkstart);
graphmem = cfree(graphmem);
*/
}

/*****************************************************************************/
/*  Detect Collision between Two Windows                                     */
/*     and Report Coordinates in Window-Relative Terms                       */
/*                                                                           */
/*                                                                           */
/*                                                                           */
/*          SCw1      ECw1              SCw2          ECw2                   */
/*  SRw1    ______________        SRw2  __________________                   */
/*          _            _              _                _                   */
/*          _            _              _                _                   */
/*          _  Window 1  _              _    Window 2    _                   */
/*          _            _              _                _                   */
/*  ERw1    ______________              _                _                   */
/*                                      _                _                   */
/*                                ERw2  __________________                   */
/*                                                                           */
/*                                                                           */
/*   SCwx => start column for window                                         */
/*   ECwx => end column for window                                           */
/*   SRwx => start row for window                                            */
/*   ERwx => end row for window                                              */
/*****************************************************************************/
#include "stdio.h"
#include "view.h"
#include "vstruct.h"
#include "viewdata.h"


char *cmalloc();


collide(start_row1,start_col1,end_row1,end_col1,scrnptr)
     unsigned start_row1,start_col1,end_row1,end_col1;
       /* coordinates of graphic: window 1  */
     char *scrnptr;        /* pointer to graphic window 1       */
```

```
{
unsigned start_row2,end_row2,start_col2,end_col2;
unsigned start_row_over,end_row_over,start_col_over,end_col_over;
unsigned start_row1r,start_col1r,SRCw1r;
unsigned start_row2r,end_row2r,start_col2r,end_col2r,SRCw2r,ERCw2r;
char *buf_ptr;
int bufsize;

/* set window 2 to coordinates of help icon */
start_row2 = icon[0].start_row;
start_col2 = icon[0].start_col;
end_row2   = icon[0].end_row;
end_col2   = icon[0].end_col;

/**
bufsize = bufcalc(start_row2,end_col2,end_row2,end_col2);
buf_ptr = cmalloc(bufsize + 16);
**/

/* calculate overlap of window 1 and window 2, if any */
start_row_over = max(start_row1, start_row2);
end_row_over = min(end_row1, end_row2);
if (end_row_over < start_row_over)                /* no overlap possible */
    return(FALSE);

start_col_over = max(start_col1, start_col2);
end_col_over = min(end_col1, end_col2);
if (end_col_over < start_col_over)               /* no overlap possible */
     return(FALSE);

/* convert screen-coordinate overlap to window-relative */
start_row1r = start_row_over - start_row1 + 1;  /* relative coordinate of */
start_col1r = start_col_over - start_col1 + 1;  /* graphics               */

start_row2r = start_row_over - start_row2 + 1;
end_row2r = end_row_over - start_row2 + 1;
start_col2r = start_col_over - start_col2 + 1;
end_col2r = end_col_over - start_col2 + 1;

/* calculate the parameters for MOVWIN */

SRCw1r = byword(start_row1r,start_col1r);
SRCw2r = byword(start_row2r, start_col2r);
ERCw2r = byword(end_row2r,end_col2r);

/* movwin(SRCw1r,SRCw2r,ERCw2r,scrnptr,buf_ptr);  to save overlapped part */
                                               /*    of window             */

/* SRCw1r - upper left corner of from window   */
/* SRCw2r - upper left corner of to window     */
/* ERCw2r - lower right corner of to window    */
/* scrnptr - ptr to header of from screen in memory */
/* buf_ptr - ptr to header of to screen in memory   */

/* overlap icon on top of window  */
end_row2r = end_row_over - start_row1 + 1;
end_col2r = end_col_over - start_col1 + 1;

ERCw2r = byword(end_row2r,end_col2r);

movwin(SRCw2r,SRCw1r,ERCw2r,icon[0].display_ptr,scrnptr);

}

/*****************************************************************************
        copyrht()

        called with:
                nothing
```

```
returns:
        VOID
uses:
        putgtabl()      to find the graph index
        putscrnl()      to display the copyright screen
        strcpy()
        strlen()
        strcat()
        cursor()
        wrtstr10()

notes:
        Displays the copyright screen if chk_flag and newpres
        are FALSE

history:

        01-21-86 rwp - initial breakout from mainint
        02-05-86 rwp - modify call to wrtstr10() to use T.R.'s changes
                     - change col to int
        03-06-86 rwp - keep screen up longer

*****************************************************************************/

#include "view.h"
#include "vstruct.h"
#include "viewdata.h"
#include "ver_text.h"

copyrht()

{
char buf[80];
int cr;
int col;
unsigned i;

if (chk_flag == 1 || newpres == 1)
    return;

byt_op[0] = 1;
byt_op[1] = 2;
byt_op[2] = 0;
byt_op[3] = 0;
byt_op[4] = 0;
num_op[0] = 0;
num_op[1] = 0;
num_op[2] = putgtabl("HELLO");

putscrnl();

if (smode == 4)
     cr = grpcolor;
else
     cr = syscolor | 0x10;  /* blue background */

strcpy(buf,"(c) Copyright IBM Corp 1984");

col = (80 - strlen(buf))/2;
wrtstr10(buf,syscolor,9,col);


strcpy(buf,"Version Date ");
strcat(buf,ver_date);
col = (80 - strlen(buf))/2;
wrtstr10(buf,syscolor,12,col);
```

```
strcpy(buf,text_line);
col = (80 - strlen(buf))/2;
wrtstr10(buf,syscolor,13,col);


strcpy(buf,"C Version");
col = (80 - strlen(buf))/2;
wrtstr10(buf,syscolor,15,col);

strcpy(buf,"AES Internal Use Only");
col = (80 - strlen(buf))/2;
wrtstr10(buf,syscolor,17,col);

strcpy(buf,"Not For Distribution");
col = (80 - strlen(buf))/2;
wrtstr10(buf,syscolor,18,col);

for (i=0;i<50000;i++)
     ;
}

/***************************************************************************
cursor positioning
***************************************************************************/

#include "dos.h"


cursor (row,col)            /* int 10h cursor positioning */
int row,col;                  /* row 1-23, column 1-80 */

{
  union REGS inregs;
  union REGS outregs;
  unsigned x;

  --row;            /* adjust for relative to zero */
  --col;            /* adjust for relative to zero */
  x=((row <<8 ) + col);
  inregs.x.dx = x;      /* CH,CL Row,column for cursor */
  inregs.h.bh = 0x00;     /* BH=0 Page number */
  inregs.h.ah = 0x02;     /* AH=2 Set cursor position */
  int86(0x10,&inregs,&outregs); /* BIOSCALL */

}

/***************************************************************************
cur_off()
***************************************************************************/

cur_off()
{
  union REGS inregs;
  union REGS outregs;
 int start;
 int end;

 start = 6;
 end = 7;

 start |= 0x20;

 inregs.h.ah = 0x01;
 inregs.h.al = 0x00;
 inregs.x.bx = 0x00;
 inregs.h.ch = start;   /* start line */
 inregs.h.cl = end;   /* end line */
 int86(0x10,&inregs,&outregs);

 }
```

```
/*****************************************************************************
cur_on()
*****************************************************************************/

cur_on()
{
  union REGS inregs;
  union REGS outregs;
int start;
int end;

start = 6;
end = 7;

start &= ~0x20;

inregs.h.ah = 0x01;
inregs.h.al = 0x00;
inregs.x.bx = 0x00;
inregs.h.ch = start;   /* start line */
inregs.h.cl = end;   /* end line */
int86(0x10,&inregs,&outregs);

}

/*****************************************************************************

        devicerd

        called with:
                int num - the number for the device that a response is
                          expected from.

        returns:
               VOID
        uses:
               ibrd()
               printf()

        notes:

        history:
                01-22-86 rwp - add support for second player
                02-05-86 rwp - add writing to line 18 for debugging
                02-13-86 rwp - add ibtrace
*****************************************************************************/


#include "task.h"
#include "vstruct.h"
#include "viewdata.h"

extern unsigned ibsta;
extern unsigned iberr;

devicerd(num)
 int num;

{
unsigned newnum;

if (rmode)
   {
   cursor(18,1);
   printf("Reading response from %d",num);
   }
```

```
switch(num)
   {
    case TOUCHTSK:
         ibrd(touch,ddbuf,255);
         pollnum = 0;
         break;
    case VDIS1TSK:
    case VDIS2TSK:
         if (num == VDIS1TSK)
            ibrd(vdisc1,ddbuf,255);
         else
            ibrd(vdisc2,ddbuf,255);
         switch(ddbuf[0])
               {
                case 0:   /* reset videodisc */
                     pollnum = 0;
                     break;
                case 1:   /* load - unload disc */
                     pollnum = 0;
                     break;
                case 2:   /* still frame */
                     pollnum = 0;
                     break;
                case 3:   /* play to from */
                     if (!process_var[ICON_KEY_PROCESS])
                        {
                        pollseg = 0;
                        waitstat &= ~SEG1BIT;
                        waitstat &= ~INTCHBIT;
                        player[cur_play].status &= ~FRAMEBIT;
                        player[cur_play].waitfrm = 0;
                        player[cur_play].status &= ~AUTOPLAY;
                        waitstat &= ~ALLWAIT;
                        }
                     break;
                case 4:   /* stop */
                     pollnum = 0;
                     break;
                case 5:   /* frame step */
                     pollnum = 0;
                     break;
                case 6:   /* frame number display */
                     pollnum = 0;
                     break;
                case 7:   /* audio control */
                     pollnum = 0;
                     break;
                case 8:   /* pass thru     */
                     pollnum = 0;
                     break;
                case 9:   /* match frame */
                     if (!process_var[ICON_KEY_PROCESS])
                        {
                         pollnum = 0;
                         waitstat &= ~FRAMEBIT;
                         framlook = 0;
                         player[cur_play].status &= ~FRAMEBIT;
                         player[cur_play].waitfrm = 0;
                         waitstat = 0;
                         }
                     break;
                case 12:    /*  videodisc status */
                     pollnum = 0;
                     if (!process_var[ICON_KEY_PROCESS])
                        {
                        if (ddbuf[2] & 0x10 )  /* player stopped */
                          {
                           waitstat &= ~SEG1BIT;
                           waitstat &= ~FRAMEBIT;
```

```
                              framlook = 0;
                              player[cur_play].status &= ~FRAMEBIT;
                              player[cur_play].waitfrm = 0;
                              }
                         }
                    break;
               case 13:     /* read frame number */
                    break;
               case 14:     /* manual control */
                    pollnum = 0;
                    break;
               }
          break;
     case SPEAKTSK:
          ibrd(speech,ddbuf,255);
          pollnum = 0;
          break;
     case VIDEOTSK:
          ibrd(video,ddbuf,255);
          pollnum = 0;
          break;
  }
if (num > 1)
   num--;

ibtrace(3,device_var[num],255,ddbuf);

}

/*****************************************************************************
        devicewt

        called with:

        returns:

        uses:

        notes:

        history:
                02-13-86 rwp - add ibtrace()
                02-22-86 rwp - add waitall()
                02-24-86 rwp - delete waitall()
*****************************************************************************/


#define ERRBIT   32768     /*  0x8000 */  /* bit 15 */
#define TIMBIT   0x4000   /* bit 14 */
#define CMPLBIT  0x0100   /* bit 8 */

#include "view.h"
#include "vstruct.h"
#include "viewdata.h"
#include "task.h"

extern unsigned ibsta;

devicewt(cmd,buf,cnt)
 int cmd;
 char *buf;
 int cnt;


{
char errornum = 0;
int done = FALSE;
```

```
while (!done)
      {

      ibwrt(cmd,buf,cnt);
      ibtrace(1,cmd,cnt,buf);


      if (ibsta & 0xc000)   /* bits 15 and 14 */
          errornum++;
      else
          done = TRUE;

      if (errornum > 4000)
         {
          if (rmode)
              printf("\nError writing to Vision");
          done = TRUE;
         }
      }

}

/******************************************************************************
device pooling
******************************************************************************/

devicepl()

{
int done = FALSE;
int errnum;
char polbuf[2];

errnum = 0;

while (!done)              /* wait for a response */
       {
       ibrpp(video,polbuf);
       ibtrace(2,video,2,polbuf);

       if (polbuf[0])
           done = TRUE;
       else
           errnum++;
       if (errnum > 20000)
           done = TRUE;
       }

}

/******************************************************************************
do_batch - load commands from a file until EOF
******************************************************************************/
#include "stdio.h"
#include "view.h"
#include "vstruct.h"
#include "viewdata.h"


do_batch ()

{

char *fname,
     *stpchr (),
     *stpblk ();


FILE *fp;
```

```
/* set the file name pointer to the file name in cmd_buff */

fname = stpchr ( cmd_buff, ' ' );          /* find the first space */

/* check if null fname, if so then this is a default command, fix-up */

if ( !fname ) fname = cmd_buff;

fname = stpblk ( fname ); /* advance to beginning of file name */

if ( ! ( fp = fopen ( fname, "r" ) ) )
        {
        printf("\nOpen of file failed: %s\n",fname );
        return;
        }

/* read all records into cmd_buff ,put them into memory */

while ( fgets ( cmd_buff, 256, fp ) )
        {
         scan_ptr = cmd_buff;    /* set pointer to beginning */
         scanline();
        }

/* close the file */
fclose ( fp );

}

/*****************************************************************************
do_cmd

performs the command

*****************************************************************************
#include "view.h"
#include "vstruct.h"
#include "viewdata.h"


do_cmd()

{
char operator;

while (*pcounter < 128)                 /* stack the operands */
        pcounter++;

operator = (*pcounter) - 128;
unstack(operator);                     /* unstack the operands */
(*functptr[operator])();               /* execute the command  */
pcounter++;                            /* increment program counter */

}

/*****************************************************************************
graphic file library routines

History
        01-20-86 rwp - modify to use the new library file structure

*****************************************************************************/


#include "FCNTL.H"
#include "vstruct.h"
#include "viewdata.h"

#define MAXINDEXS        1024
#define NAMESIZE         8
struct index_header    /* structure for index header record/s */
```

```
{
int lib_ver_nr;             /* version number of library */
char sname[NAMESIZE];   /* name of index header segment */
long position;              /* position (offset) of index segment. */
int nr;                     /* nr of active indexs + 1 (including deleted) */
                            /*   nr of next avail index element (base 0) */
int maxi;                   /* maximum allowed indexs in index segment */
long next_head_pos;         /* offset of next index header segment */
                            /*   set to 0, if no more header segments */

char expansion[512 - NAMESIZE - 14]; /* reserved for future expand. */
};


struct hdfile
  {
  char hname[NAMESIZE];
  long hpos;            /* file position in library file */
  };

struct hdfile hfile[MAXINDEXS];  /* the index for the library  */

/* index in alpha order of graph names     */
/* h_idx[i] is the offset of the ith name  */
/* used for binary search for a graph name */
int h_idx[MAXINDEXS];
char *cmalloc();

/*******************************/
/* not int functions          */
/*******************************/
long rd_file();
long lib_read();
long lib_info();

/**************************************************************************

        lib_open(library_name)
                function to open a graphics library.

        called with:
               library_name : the complete file name with sub-directory and
                              extension.

        returns:
                none

        uses:
        notes:

        history:

        01-20-86 rwp - changes to read new library format
**************************************************************************/


/* define externals */

int lib_open (lib_name)
    char *lib_name;                 /* the library file name */

{
   /* define local variables */
        int lib_id;                 /* the file id returned from open() */
        int nr_members;             /* total number of items in the library */
        int i;                      /* counter */
        struct index_header graph_header; /* areas in load the header */

/* open the file */
   lib_id = open(lib_name, O_RDONLY | O_RAW);
```

```
/* read the index header to find the location of the index */
   rd_file(lib_id, (char *)&graph_header, (long) (sizeof (struct index_header)))
;

/* move to the start of the index */
   lseek(lib_id,graph_header.position,0);

/* load the library index */
   rd_file(lib_id, (char *) hfile, (long) (sizeof (hfile)));

/* set the total number of items */
   nr_members = (int) (hfile[0].hpos);

/* set up h_idx[] for future binary sorts */
   for (i = 0;  i < MAXINDEXS;  i++)
        h_idx[i] = i;

   lib_sort(1, nr_members - 1);

   return (lib_id);
}
/*********************************************************************/
/*  lib_sort - sort an indirect index to members for lib_search       */
/*********************************************************************/

int lib_sort(lo, hi)
int lo, hi;

{
int i, j, piv;
int pivot;

if (lo < hi)
        {
        piv = (lo + hi) / 2;
        i = lo;
        j = hi;

        pivot = h_idx[piv];
        while (i < j)
                {
                while (i < j && strcmp(hfile[h_idx[i]].hname, hfile[pivot].hname
) <= 0)
                        i++;
                while (j > i && strcmp(hfile[h_idx[j]].hname, hfile[pivot].hname
) >= 0)
                        j--;
                if (i < j)
                        {
                        int_swap(&h_idx[i], &h_idx[j]);
                        }
                }
        if (piv < i && strcmp(hfile[h_idx[i]].hname, hfile[pivot].hname) > 0)
                i--;
        int_swap(&h_idx[i], &h_idx[piv]);

        if (i - lo <= hi - i)
                {
                lib_sort(lo, i - 1);
                lib_sort(i + 1, hi);
                }
        else {
                lib_sort(i + 1, hi);
                lib_sort(lo, i - 1);
                }
        }
}                                               /* lib_sort */

int int_swap(x, y)
int *x, *y;
```

```
                                                    /* int_swap */
{
int temp;
temp = *x;
*x = *y;
*y = temp;                                          /* int_swap */
}

/****************************************************************************/
/*  lib_search - binary search of library using indirect index
*/
/****************************************************************************/

int gphfind(member, totnum) /* find member in gphtable */
char *member;
int totnum;

{
int low, high, mid, cond;

low = 1;
high = totnum;
while (low <= high)
        {
        mid = (low + high) / 2;
        if ((cond = strcmp(member, gphtable[h_idx[mid]].gname)) < 0)
                high = mid - 1;
        else if (cond > 0)
                low = mid + 1;
        else return (h_idx[mid]);
        }
return (-1);
}

/*******************************************/
/* rd_file - general file reading function*/
/*******************************************/

long rd_file(file_id, buf_ptr, buf_size)
int file_id;
char *buf_ptr;
long buf_size;

{
int rdbytes;
int rd_size;
long bytesrd;

bytesrd = 0;

while (buf_size > 0)
        {
        if (buf_size > 32766)
                rd_size = 32766;
        else rd_size = (int) (buf_size);
        rdbytes = read(file_id, buf_ptr, rd_size);
        if (rdbytes > 0)
                {
                bytesrd = bytesrd + rdbytes;
                buf_size = buf_size - rd_size;
                if (buf_size)
                        buf_ptr = buf_ptr + 32766;
                }
        else buf_size = rdbytes;
        }
return (bytesrd);

}
```

```
/*****************************************************************************
bldgtabl   build the graphics table using data from the graphics library file

*****************************************************************************/

bldgtabl()

{
struct hdfile *hptr;          /* pointer to the library index   */
int i;
int j,str_len;

/* set the pointer to the first record of the index */
hptr = &hfile[0];

/* the first record indictes the number of graphs in the library */
gphindex = (int)(hfile[0].hpos);

/* load the conductor graph table using the binary search index array */
for (i = 1; i<=gphindex; i++)
    {
     /* allocate memory for the name */
     gphtable[i].gname = cmalloc(9);
     /* copy the name from the library to the graphics table */
     strncpy(gphtable[i].gname,(hptr+i)->hname,8);
     /* force all letters to upper case */
     str_len = strlen(gphtable[i].gname);
     for (j=0;j<str_len;j++)
         {
          *(gphtable[i].gname + j) = toupper(*(gphtable[i].gname + j));
         }
     /* set the file position */
     gphtable[i].position = (hptr+i)->hpos;
     /* calculate the file size */
     if (i > 1)
         gphtable[i-1].gsize = gphtable[i].position - gphtable[i-1].position;
    }

}

/*****************************************************************************

        fd_files(presentation_name)

                Opens all files all files for this presentation.

        called with:  a pointer to the presentation name.

        returns:
                VOID
        uses:
                open()
                printf()
                _exit()

        notes:

        history:
        01-16-86 rwp - change all calls to bywordc to macro byword.
                     - add printing of time and text to intro screen.
        01-17-86 rwp - print date and time on one line.
        01-21-86 rwp - change name from mainint to fd_files
                     - break the file into individual functions
        01-23-86 rwp - modify to use getccf().
        02-05-86 rwp - open the control file for read and write
        02-10-86 rwp - open variable index
                        *** user files are not handled by getccf() yet ***
                     - call set_tch_index()
        02-11-86 rwp - add user files
```

```
        02-13-86 rwp - add create to log file, user index , and user file
                     - remove write to cndlog for ibtrace
        02-17-86 rwp - add write to cndlog for ibtrace
                       remove write to cndlog for ibtrace
        02-24-86 rwp - add write to cndlog for ibtrace

*****************************************************************************/


#include "fcntl.h"
#include "view.h"
#include "vstruct.h"
#include "viewdata.h"

char *cmalloc();

fd_files (pres_name)
  char      *pres_name;              /* the presentation name    */

{
int i;
char *name_buf[15];
char err_switch = 0;
static char buf[80];                       /* used in ibtrace */

for ( i = 0; i<15; i++)
     name_buf[i] = cmalloc(80);

/* find the file names */
getccf(pres_name,name_buf);

cntlnum = open (name_buf[0], O_RDWR | O_RAW);
indxnum = open (name_buf[1], O_RDONLY | O_RAW);
litnum = open (name_buf[5],  O_RDWR | O_RAW);
varnum = open (name_buf[3],  O_RDWR | O_RAW);
libnum = lib_open(name_buf[2]);
lognum = open(name_buf[7],O_RDWR | O_CREAT);

var_file_indx = open(name_buf[4], O_RDONLY | O_RAW);


user_fld_def = open(name_buf[14],O_RDONLY | O_RAW );
if (user_fld_def > 0)
    {
     user_file = open(name_buf[12],O_RDWR | O_RAW | O_CREAT);
     user_file_indx = open(name_buf[13],O_RDWR | O_RAW | O_CREAT );
     bld_ufile_table(user_fld_def);
     }
else
     {
     user_file = -1;
     user_file_indx = -1;
     }

/* check for errors */
if (cntlnum <0 )
          {
            err_switch = 1;
            printf ("\nCould not find the event file: %s",name_buf[0]);
          }

if( indxnum < 0 )
          {
            err_switch = 1;
            printf ("\nCould not find the event index: %s",name_buf[1]);
          }
```

```
if ( libnum < 0)
          {
            err_switch = 1;
            printf ("\nCould not find the graphics library: %s",name_buf[2]);
          }

if (err_switch)
          {
            _exit(0);
          }

/* load touch variable index */
set_tch_index(var_file_indx,&tch_rec_num);

/*****
/*****      ibtrace infor   *******/
close(lognum);
lognum = open(name_buf[7],O_RDWR | O_CREAT | O_TRUNC);

sprintf(buf,
"\nTouch = %2d\nPlayer 1 = %2d\nPlayer 2 = %2d\nVideo = %2d\nSpeech = %2d\n",
          touch,vdisc1,vdisc2,video,speech);

write(lognum,buf,80);
/******* end of ibtrce info    ********/
*****/

for ( i = 0; i<15; i++)
     cfree(name_buf[i]);


}

/*******************************************************************************
findcmd

o finds the next command

*******************************************************************************/

#include "view.h"
#include "ctype.h"
#include "vstruct.h"

extern char *scan_ptr;
extern struct cmd cmds[];
extern int maxcmds;

findcmd(cmdindex)
  int *cmdindex;
{

int index = -1;
int cmdlen = 0;
int i;
char *buffptr;
char *lenptr;
char *ptr;
char cbuff[20];

        /* skip white space, set buffptr to start of cmd */

        buffptr = scan_ptr;
        while ( *buffptr == ' ' ) ++buffptr;

        /* force command to lower case and
           determine the length of the command */
```

```
lenptr = buffptr;
while (   ( *lenptr != '\0')
&& ( *lenptr != '(' )
&& ( *lenptr != ' ' )
&& ( *lenptr != '\n' ) )
        {
        *lenptr = tolower ( *lenptr );
        ++cmdlen;
        ++lenptr;
        }

scan_ptr = lenptr;

if ( cmdlen == 0 )
        {
        return(-2);
        }

ptr = buffptr;

for ( i=0;i<cmdlen;i++ )
        {
        cbuff[i] = *ptr;
        ++ptr;
        }

 cbuff[i] = '\0';

/* determine the command number */
while (1)
        {
        ++index;
                if ( strcmp( cbuff, cmds[index].cname ) == 0 )
                        {
                        *cmdindex = index;
                        return(cmds[index].cmdtoken);
                        }

        /* if we have run out of commands then assume that this
           is an INVALID command. */

        if ( index == maxcmds  )
                return(-1);

        }

}
/*************************************************************************************

        interpretive functions addinds thru playvid

        called with:

        returns:

        uses:

        notes:

        history:
                01-22-86 rwp - comment out matchstring
                01-28-86 rwp - correct playvid to send speed byte
                             - do not send speed byte if normal speed
                             - add call to itmatchs in matchstring
                             - comment out matchstring
                             - put matchstring back in
                01-30-86 rwp - modify inkeyb()
                             - take out all devicepl() and devicerd()
                             - add signal_task(SECOND_ATTR_TSK) to no_op()
```

```
01-31-86 rwp - modify clrscrn() to not clear a section.
             - move findgoto() to branches()
             - modify to use findgoto()
               addinds(),matchbrch(),nextevt()
02-04-86 rwp - ignore edit code in inkeybrd
             - ignore mask in colors
02-10-86 rwp - use the attribute for clearing in inkeybrd
             - translate key numbers : make icons 1 - 10
02-11-86 rwp - use scan_branch() in matchbrch() and pausebrh()
02-14-86 rwp - correct feedback
02-21-86 rwp - add border color to clrscrn
             - add pause_str copy to pause_branch
             - add waitpoll
02-24-86 rwp - check for correct key number in dfntouch()
02-25-86 rwp - set play[].startfrm in dostill() instead of
                in playvid()
             - add waitpoll to all devicewts
02-27-86 rwp - add cursor_off to inkeybrd
03-04-86 rwp - complete touch input
03-05-86 rwp - correct color for text mode in clrscrn()
03-07-86 rwp - add check for user-defined input
03-10-86 rwp - call intlace in colors and dostill
03-12-86 rwp - reset the touch code in intouch
03-13-86 rwp - use the background color for the border color
                on a CLEAR

******************************************************************************/

#include "stdio.h"
#include "view.h"
#include "vstruct.h"
#include "task.h"
#include "viewdata.h"
#include "cmdnum.i"

char getvideo();
char *cmalloc();
char *cfree();
char *ecvt();
char *malloc();
long tictime();

extern unsigned ibsta;

/*******************************************************************************
addinds(mask,test,value,Truebranch,FalseBranch)
         n0   b0    b1     s0          s1
******************************************************************************/

addinds()
{
unsigned j,i;
char tot = 0;
char enum;

j = 1;
for (i=1; i<= 16; i++)
    {
     if (num_op[0] & j)                    /* test for bit on in the mask */
        {
         if (sys_ind & j)                  /* test sys_ind bit */
             tot++;
        }
      if (j < 16384)
          j *= 2;                                 /* next bit to test */
      else
          j = 32768;

    }
```

```
switch(byt_op[0])
          {
           case 60:          /*  <  */
                if (tot < byt_op[1])
                    enum = 0;
                else
                    enum = 1;
                break;
           case 62:          /* >  */
                if (tot > byt_op[1])
                    enum = 0;
                else
                    enum = 1;
                break;
           case 61:          /*  =  */
                if (tot == byt_op[1])
                    enum = 0;
                else
                    enum = 1;
                break;
          }

findgoto(str_op[enum]);

}

/*****************************************************************************
clear screen (screenmode,background color,palette,border,SrowScol,ErowCol)
               n0            b0             b1      b2       n1       n2
*****************************************************************************/

clrscrn()
{
unsigned srow,scol,erow,ecol;
unsigned srowcol,erowcol;
int border_color;

/* if CLEARxx  and the mode is not the same as current mode */
if (num_op[0] != 0 && num_op[0] != smode)
    {
     setmode((int)num_op[0]);
    }

srow = 0;
scol = 0;
erow = 24;
ecol = 79;

border_color = byt_op[2];
if (num_op[0] == 0)
   border_color = byt_op[0];

if (smode == 4 || smode == 1)
     ecol = 39;
/*****************************************************************************
/* if text mode */
if (smode == 1 || smode == 3)
   byt_op[0] = (byt_op[0] * 16) | 7;
*****************************************************************************/

/* clear the screen */
clx((int)byt_op[0],(int)byt_op[1],srow,scol,erow,ecol); /* clr screen  */

/* change the border */
chbord(border_color);

/* set the system color back to solid */
solidsys();
```

```
/* redisplay the icon */
if (tchbrch[HELP_ICON].tbrhcode)
    key25on(HELP_ICON);


}
/*****************************************************************************
chgvid(PlayerCode,Frame)
          b0       n0
Changed to setvideo() and setaudio() by breakout()
*****************************************************************************/
chgvideo()
{;}

/*****************************************************************************
clrtouch()

*****************************************************************************/

clrtouch()


{
char i;

ddbuf[0] = 0x02;
ddbuf[1] = 0x00;
ddbuf[2] = 0x00;
ddbuf[3] = 0x00;
ddbuf[4] = 0x00;
ddbuf[5] = 0x00;

devicewt(touch,ddbuf,6);
/* waitpoll(TOUCH_DEVICE);  */

}

/*****************************************************************************
colors(mask,visible)
        n0    n1
*****************************************************************************/

colors()
{
unsigned lown0,highn0,lown1,highn1;
unsigned j,i;

num_op[0] = 0xFFFF;     /* ignore the mask */

lown1 = lobyte(num_op[1]);
highn1 = hibyte(num_op[1]);
num_op[1] = byword(lown1,highn1);

j = 1;
for (i=1; i<= 16; i++)
    {
     if (num_op[0] & j)
        {
         if (num_op[1] & j)
             curmask = (curmask | j);
         else
              curmask = (curmask & (~j));
         }
      if (j >0 && j < 16384)
          j *= 2;
      else
         j = 32768;
    }
```

```
ddbuf[0] = 0x02;
ddbuf[1] = hibyte(curmask);
ddbuf[2] = lobyte(curmask);
devicewt(video,ddbuf,3);
waitpoll(VIDEO_DEVICE);
if (curmask == 0)
   intlace(0);
}

/*************************************************************************
dfntouch(buffer)
          s0
*************************************************************************/

dfntouch()

{
int cnt;
char key;
char *newptr;
char i;
char newstr[250];

/** activate touch screen **/

ddbuf[0] = 0x01;
ddbuf[1] = tchstate;

devicewt(touch,ddbuf,2);
waitpoll(TOUCH_DEVICE);

strcpy(tchbrstr,str_op[0]);
strcpy(newstr,str_op[0]);

cnt = (strlen(str_op[0]) - 2)/5;   /* subtract var at end & multiples of 5 */

for (i = 0;i<cnt;i++)
     {
      newptr = newstr + (i*5);
      if (*newptr > 0 && *newptr < 51)
         {
         /* change key numbers */
         key = *newptr + 10;
         *newptr = key;
         tchbrch[key].tsrow = *(newptr + 1);
         tchbrch[key].tscol = *(newptr + 2);
         tchbrch[key].terow = *(newptr + 3);
         tchbrch[key].tecol = *(newptr + 4);
         }
      }

cnt *= 5;
cnt++;     /* add one for the command byte */

ddbuf[0] = 0x02;

strcpy(ddbuf+1,newstr);

devicewt(touch,ddbuf,cnt);
waitpoll(TOUCH_DEVICE);
}
```

```
/*****************************************************************************
do one still(PlayerCode,Frame)
             b0         n0
*****************************************************************************/

dostill()


{
int vid;

vid = getplayr(byt_op[0]);

/* reset */
ddbuf[0] = 0x00;
devicewt(vid,ddbuf,1);

if (vid == vdiscl)
    waitpoll(VDIS1_DEVICE);
else
    waitpoll(VDIS2_DEVICE);


/* search to the frame */
ddbuf[0] = 0x02;
ddbuf[1] = hibyte(num_op[0]);
ddbuf[2] = lobyte(num_op[0]);

devicewt(vid,ddbuf,3);

player[cur_play].startfrm = num_op[0];

if (vid == vdiscl)
    waitpoll(VDIS1_DEVICE);
else
    waitpoll(VDIS2_DEVICE);

intlace(0);  /* interlace */


}

/*****************************************************************************
dostills(PlayerCode,FromFrame,ToFrame,Increment,Wait)
           b0         n0        n1       b1       n2

Converted into dostill commands by breakout()

*****************************************************************************/

dostills()

{

;

}

/*****************************************************************************
feedback(buf)
*****************************************************************************/

feedback()
{

char key = 0;
char *newptr;
unsigned str_len;

newptr = str_op[0];
```

```
/* translate key number  */
key = *newptr + 10;

while (key > 10 && key < 61)
      {
       switch(*(newptr + 1))
             {
             case 255:   /* no feed back */
                  tchbrch[key].k_action = 255;
                  newptr += 2;
                  break;
             case 0:   /* no feed back */
                  tchbrch[key].k_action = 0;
                  newptr += 2;
                  break;
             case 1:              /* draw box outline */
                  tchbrch[key].k_action = 1;
                  tchbrch[key].k_act_ptr = cmalloc(2);
                  *tchbrch[key].k_act_ptr = *(newptr + 2);  /* color */
                  newptr += 3;
                  break;
             case 2:              /* fill with color */
                  tchbrch[key].k_action = 2;
                  tchbrch[key].k_act_ptr = cmalloc(2);
                  *tchbrch[key].k_act_ptr = *(newptr + 2);  /* color */
                  newptr += 3;
                  break;
             case 3:              /* flood exterior with color */
                  tchbrch[key].k_action = 3;
                  tchbrch[key].k_act_ptr = cmalloc(2);
                  *tchbrch[key].k_act_ptr = *(newptr + 2);  /* color */
                  newptr += 3;
                  break;
             case 4:              /* sound good beep */
                  tchbrch[key].k_action = 4;
                  newptr += 2;
                  break;
             case 5:              /* sound bad beep */
                  tchbrch[key].k_action = 5;
                  newptr += 2;
                  break;
             case 6:              /* speech chip */
                  /* find null */
                  while (*newptr++)
                        ;
                  break;
             case 7:              /* display message */
                  /* find null */
                  while (*newptr++)
                        ;
                  break;
             case 8:              /* explode */
                  tchbrch[key].k_action = 8;
                  newptr += 2;
                  break;
             case 9:             /* crush  */
                  tchbrch[key].k_action = 9;
                  newptr += 2;
                  break;
             case 10:             /* change color 1 to color 2 */
                  tchbrch[key].k_action = 10;
                  tchbrch[key].k_act_ptr = cmalloc(2);
                  *tchbrch[key].k_act_ptr = *(newptr +2);
                  *(tchbrch[key].k_act_ptr + 1) = *(newptr + 3);
                  newptr += 4;
                  break;
```

```
            case 11:                /* change color 1 to color 2 */
                 tchbrch[key].k_action = 11;
                 tchbrch[key].k_act_ptr = cmalloc(2);
                 *tchbrch[key].k_act_ptr = *(newptr +2);
                 *(tchbrch[key].k_act_ptr + 1) = *(newptr + 3);
                 newptr += 4;
                 break;

         }  /* switch */
     key = *newptr + 10;

     }  /* end while */
}

/********************************************************************************
inkeyb(row,col,length,att,edit,scrn,voice,rec#,varname)
        b0  b1   b2    b3  b4   b5   b6    n0   s0

********************************************************************************/

inkeybrd()
{
int rcode;
unsigned rowcol;
char i;

block_process(COMMAND_PROCESS);
signal_process(KEY_IN_PROCESS);
kb_buff[0] = 0;

/* clear the keyboard buffer */
while(kbhit())
      getch();

cursor(byt_op[0],byt_op[1]);

for (i=0;i<byt_op[2];i++)
     wrtch10(32,byt_op[3]);

cursor(byt_op[0],byt_op[1]);

cur_row = byt_op[0];
cur_col = byt_op[1];

if (smode > 3)
   {
    rowcol = byword(cur_row,cur_col);
    gcursor(rowcol);
    }
else
   cur_on();

insize = byt_op[2];
inattril = byt_op[3];
inedit = byt_op[4];
inshow = byt_op[5];
inshow = 1;
insound = byt_op[6];
input_record = num_op[0];
strcpy(input_varname,str_op[0]);
inputbuf[0] = '\0';

/********************************************************************************
inkeyb(row,col,length,att,edit,scrn,voice,rec#,varname)
        b0  b1   b2    b3  b4   b5   b6    n0   s0
**/

}

/********************************************************************************
```

```
intouch(row,col,length,att,edit,scrn,voice,rec#,varname)
        b0  b1   b2    b3  b4   b5   b6    n0   s0
******************************************************************************/

intouch()
{
extern char alph_tch[];
GHEADER header;
char *readgraf();
unsigned rowcol;
char i;
char input_ext[6][4];
int input_set;
int num;
char *mem_free_ptr;
char *display_ptr;
char inputname[15];
int cnt;
int key;
char *newptr;

block_process(COMMAND_PROCESS);
signal_process(TCHBOARD_PROCESS);

touch_key_buff[0] = 0;

/* if default input */
if (byt_op[5] == 0 || byt_op[5] == 1)
   {
   /* display the input screen */
    strcpy(input_ext[0],"40");
    strcpy(input_ext[1],"80");
    strcpy(input_ext[2],"LO");
    strcpy(input_ext[3],"MD");
    strcpy(input_ext[4],"HI");

    switch(smode) /* the screen mode determines which icon set to use */
      {
      case 1:
           input_set = 0;
           break;
      case 3:
           input_set = 1;
           break;
      case 4:
           input_set = 2;
           break;
      case 13:
           input_set = 3;
           break;
      case 14:
           input_set = 4;
           break;
      default:
           input_set = 2;
      }
    strcpy(inputname,"INPUT");
    strcat(inputname,input_ext[input_set]);

    num = putgtabl(inputname);  /* find the input file number   */
    display_ptr = readgraf(num,&header,&mem_free_ptr);
        /* load the icon    */

    /* display the input screen */
    movepc(smode,0x0101,header.ulrowcol,header.lrrowcol,display_ptr,scrseg);

    /* free the allocated memory */
    mem_free_ptr = ffree(mem_free_ptr);
/***
```

```
    byt_op[0] = 0;
    byt_op[1] = 0;
    byt_op[2] = 255;
    byt_op[3] = 255;
    byt_op[4] = 255;
    num_op[0] = 0;
    num_op[1] = 0;
    num_op[2] = num;
    putscrn1();
****/
    /* turn touch screen on */
    /** activate touch screen **/

    ddbuf[0] = 0x01;
    ddbuf[1] = tchstate;

    devicewt(touch,ddbuf,2);
    waitpoll(TOUCH_DEVICE);

    cnt = strlen(alph_tch)/5;

    for (i = 0;i<cnt;i++)
        {
        newptr = alph_tch + (i*5);
        key = *newptr ;
        tchbrch[key].tsrow = *(newptr + 1);
        tchbrch[key].tscol = *(newptr + 2);
        tchbrch[key].terow = *(newptr + 3);
        tchbrch[key].tecol = *(newptr + 4);
        tchbrch[key].tbrhcode  = 23;
        }

    cnt *= 5;
    cnt++;     /* add one for the command byte */

    ddbuf[0] = 0x02;

    strcpy(ddbuf+1,alph_tch);

    devicewt(touch,ddbuf,cnt);
    waitpoll(TOUCH_DEVICE);
    }
cursor(byt_op[0],byt_op[1]);

for (i=0;i<byt_op[2];i++)
     wrtch10(32,byt_op[3]);

cursor(byt_op[0],byt_op[1]);

cur_row = byt_op[0];
cur_col = byt_op[1];

if (smode > 3)
   {
    rowcol = byword(cur_row,cur_col);
    gcursor(rowcol);
    }
else
    cur_on();

insize = byt_op[2];
inattril = byt_op[3];
inedit = byt_op[4];
inshow = byt_op[5];
inshow = 1;
insound = byt_op[6];
input_record = num_op[0];
strcpy(input_varname,str_op[0]);
inputbuf[0] = '\0';

}
```

```
/*****************************************************************************
loadvid(PlayCode,Prompt,Load)
        b0      b1      b2
*****************************************************************************/

loadvid()

{
int vid;

vid = getplayr(byt_op[0]);

/* if prompted call prompt routine first */

if (byt_op[1])
   loop_screen("VDISC80");

if (vid == vdisc1)
   set_player(1,&vdisc1,byt_op[2]);
else
   set_player(2,&vdisc2,byt_op[2]);


}

/*****************************************************************************
logging(on/off)
        b0
*****************************************************************************/

logging()


{
   logflag = byt_op[0];
}

/*****************************************************************************
matchbrch(variable,record#,MatchName,MatchRecord#,BranchLabels)
          s0        n0        s1        n1              s2

branch label could be in a variable
*****************************************************************************/

matchbrh()
{
int i;
int j;
char *newstr;
char *newptr;
int matched;
int branch_len;
int branch_num = 0;

matched = matchs(str_op[0],num_op[0],str_op[1],num_op[1]);

/* find the number of branches */
branch_num = (strlen(str_op[2]))/10;
j = 0;
/* put the branch labels into the branch table */
for (i = 0; i<= branch_num;i++)
    {
     branch_len = scan_branch(str_op[2] + j,&strbrch[i].strbrnch,10);
     j += branch_len;

     /* find the branch code */
     switch(*(str_op[2]+j))
           {
```

```
                case '*':
                     strbrch[i].sbrhcode = 4;
                     break;
                case '@':
                     strbrch[i].sbrhcode = 5;
                     break;
                case '&':
                     strbrch[i].sbrhcode = 6;
                     break;
                case '#':
                     strbrch[i].sbrhcode = 7;
                     break;
                case '$':
                case '%':
                     strbrch[i].sbrhcode = 16;
                     break;
                }
     }

/* matched == the relative branch number or 0 if no match */
if (matched)
   {
   matched = matched - 1;          /* matched branch     */
   }
else

   matched = branch_num-1;         /* the default branch */


/* execute the branch */
findgoto(strbrch[matched].strbrnch);

}


/*********************************************************************************
nextevt(evtname)
         s0
*********************************************************************************/

nextevt()
{

findgoto(str_op[0]);

}
/*********************************************************************************
no op
*********************************************************************************/

no_op()


{

/* signal_task(SECOND_ATTR_TSK); */
;

}


/*********************************************************************************
pausebrh(buf)  define pause table
         s0
*********************************************************************************/

pausebrh()
{
char key = 0;
char *newptr;
int str_len;
int strsize;
char i;
```

```
newptr = str_op[0];
strsize = strlen(str_op[0]);
strcpy(pause_str,str_op[0]);

/* translate key numbers */
for (i= 7;i<11;i++)
     tchbrch[i].tbrhcode = 0;

while (*newptr> 56 && *newptr < 61)
       {
        key = *newptr - 50;
        switch(*(newptr))
              {
              case 57:              /* slow back */
                   if (*(newptr +1) == 'Y')
                      {
                       tchbrch[key].tbrhcode = 12;
                       sysbslow = 1;
                      }
                   else
                      {
                       tchbrch[key].tbrhcode = 0;
                       sysbslow = 0;
                      }
                   newptr += 2;
                   break;
              case 58:              /* slow forward */
                   if (*(newptr + 1) == 'Y')
                      {
                       tchbrch[key].tbrhcode = 13;
                       sysfslow  = 1;
                       }
                   else
                      {
                       tchbrch[key].tbrhcode = 0;
                       sysfslow  = 0;
                       }
                   newptr += 2;
                   break;
              case 59:              /* stop */
                   if (*(newptr + 1) == 'Y')
                       {
                       tchbrch[key].tbrhcode = 14;


                       sys_stop = 1;
                       }
                   else
                       {
                       tchbrch[key].tbrhcode = 0;
                       sys_stop = 0;
                       }
                   newptr += 2;
                   break;
              case 60:              /* goto screen name for info  */
                   /* key 60 switched with pause key #56   */
                   tchbrch[6].tbrhcode = 15;
                   str_len = scan_branch(newptr + 1,&tchbrch[6].tchbrnch,10);
                   newptr += str_len + 1;
                   break;
          }  /* switch */
    }  /* end while */
}

/*************************************************************************
playvid(playcode,FromFrame,ToFrame,Speed)
          b0      n0       n1      b1
*************************************************************************/

playvid()
```

```
{
int vid;
int cnt;

vid = getplayr(byt_op[0]);

/* play to from */
player[cur_play].status |= AUTOPLAY;

ddbuf[0] = 0x03;
if (num_op[0] < num_op[1])      /* forward  */
   {
    /* player[cur_play].startfrm = num_op[0]; */
    player[cur_play].endfrm = num_op[1];
    ddbuf[1] = 0;
    ddbuf[2] = 0;
    ddbuf[3] = hibyte(num_op[1]);
    ddbuf[4] = lobyte(num_op[1]);
   }
else                            /* backward  */
   {
    /* player[cur_play].startfrm = num_op[0]; */
    player[cur_play].endfrm = num_op[1];
    ddbuf[1] = 0xff;
    ddbuf[2] = 0xff;
    ddbuf[3] = hibyte(num_op[1]);
    ddbuf[4] = lobyte(num_op[1]);
   }

ddbuf[5] = byt_op[1];                 /* speed byte */

if (byt_op[1] == 0)
   cnt = 5;
else
   cnt = 6;

devicewt(vid,ddbuf,cnt);

pollnum = 0;
pollseg++;
intlace(0x01);  /* interlace */

}

/**
function

o all the interpretive functions independent of Vision

*****************************************************************************/

#include "\viewc\view.h"
#include "\viewc\vstruct.h"
#include "\viewc\task.h"
#include "\viewc\viewdata.h"

char *calloc();

/*****************************************************************************
 assignment functions
*****************************************************************************/

/*****************************************************************************
letnum(%a,%b)    : Let %a equal %b
                   %a - unsigned
                   %b - unsigned
*****************************************************************************/

letnum()
```

```
{
int i;

i = opstack[opmax];                      /* location of %a in numtable */
if (numtable[i].name != 0)               /* if %a is not a constant    */
    numtable[i].value = num_op[1];       /* set a value to b           */

}


/******************************************************************************
letstr($a,$b)    : let $a equal $b
                   $a - string pointer
                   $b - string pointer
******************************************************************************/

letstr()

{

int i;

i = opstack[opmax];                      /* location of $a in strtable */

if (strtable[i].name != 0)               /* if $a is not a constant    */
    {
    free(strtable[i].value);             /* free previous string       */
    strtable[i].value = str_op[1];       /* set a address to  b        */
    }

}

/******************************************************************************
incre(%a)     %a - unsigned

******************************************************************************/

incre()
{
int i;

i = opstack[opmax];

if (numtable[i].name != 0)          /* if not constant */
    numtable[i].value++;            /* increment table value */

}

/******************************************************************************

flow control functions

******************************************************************************/


/******************************************************************************
gotoevt(event name)
******************************************************************************/

gotoevt()

{
int i;
char *newptr = 0;

for (i=0; i<evtindex;i++)                /* find event in evttable */
    {
     if (strcmp(str_op[0],evttable[i].name) == 0)
         newptr = evttable[i].value;
    }
```

```
if (newptr == 0)
     {
      pcounter = tokenptr;
      printf("\nUndefined event name\n");
     }
else
    pcounter = newptr -1;             /* set pcounter to event start - 1 */

}

/*****************************************************************************
gosub(event name)
*****************************************************************************/

gosub()
{
int i;
char *newptr = 0;

for (i=0; i<evtindex;i++)
    {
     if (strcmp(str_op[0],evttable[i].name) == 0)
         newptr = evttable[i].value;
    }

if (newptr == 0)
    {
     pcounter = tokenptr;
     printf("\nUndefined event name\n");
    }
else
    {
     rtnstack[rtnindex ++] = pcounter + 1;    /* set return stack */

     pcounter = newptr -1;              /* set pcounter to event location-1 */
    }

}

/*****************************************************************************
event return
*****************************************************************************/

evtrtrn()

{

pcounter = rtnstack[--rtnindex] -1;

}

/*****************************************************************************
if equal(%a,%b,eventname)
*****************************************************************************/

ifeq()
{
int i;
char *newptr = 0;

for (i=0; i<evtindex;i++)
    {
     if (strcmp(str_op[0],evttable[i].name) == 0)
         newptr = evttable[i].value;
    }


if (newptr == 0)
    {
     pcounter = tokenptr;
     printf("\nUndefined event name\n");
    }
```

```
else if (num_op[1] == num_op[0])
    pcounter = newptr - 1;

}

/*****************************************************************************
if less than(%a,%b,eventname)
*****************************************************************************/

iflt()
{
int i;
char *newptr = 0;

for (i=0; i<evtindex;i++)
    {
     if (strcmp(str_op[0],evttable[i].name) == 0)
         newptr = evttable[i].value;

    }

if (newptr == 0)
    {
     pcounter = tokenptr;
     printf("\nUndefined event name\n");
    }
else if (num_op[0] < num_op[1])
    pcounter = newptr - 1;

}

/*****************************************************************************
if greater than(%a,%b,event name)
*****************************************************************************/

ifgt()
{
int i;
char *newptr = 0;

for (i=0; i<evtindex;i++)
    {
     if (strcmp(str_op[0],evttable[i].name) == 0)
         newptr = evttable[i].value;
    }

if (newptr == 0)
    {
     pcounter = tokenptr;
     printf("\nUndefined event name\n");
    }
else if (num_op[0] > num_op[1])
        pcounter = newptr - 1;

}

/*****************************************************************************
if equal else(%a,%b,event1,event2)
*****************************************************************************/

ifeql()

{
char *newptr1 = 0;
char *newptr2 = 0;
int i;

for (i=0; i<evtindex;i++)
    {
```

```
    if (strcmp(str_op[0],evttable[i].name) == 0)
        newptr1 = evttable[i].value;
    if (strcmp(str_op[1],evttable[i].name) == 0)
        newptr2 = evttable[i].value;
   }


    if (newptr1 == 0 || newptr2 == 0)
        {
         pcounter = tokenptr;
         printf("\nUndefined event name\n");
        }
    else if (num_op[1] == num_op[0])
            pcounter = newptr1 -1;
    else
        pcounter = newptr2 -1;

    }

/*****************************************************************************

Program Code Control functions

*****************************************************************************/

/*****************************************************************************
load (filename)
*****************************************************************************/

load()

{

strcpy(cmd_buff,str_op[0]);

pcounter = tkstart;
tokenptr = tkstart;
numindex = 0;
strindex = 0;
evtindex = 0;

do_batch();

}

/*****************************************************************************
end
*****************************************************************************/

end()

{

pcounter = tokenptr;

}

/*****************************************************************************

Displaying

*****************************************************************************/


/*****************************************************************************
printstr(row,col,str,att)
         b0  b1  s0  b2
*****************************************************************************/

printstr()
```

```
{
cursor((int)byt_op[0],(int)byt_op[1]);
wrtstr10(str_op[0],(int)byt_op[2]);

}
/*************************************************************************
printnum
*************************************************************************/

printnum()

{

printf("%u",num_op[0]);

}

/*************************************************************************
      funct3 -  all the interpretive functions independent of Vision

        called with:

        returns:

        uses:

        notes:

        history:
              02-05-86 rwp - initial description
                           - use new wrtstr10()
                           - add init_vars() and init_tasks() to load()

*************************************************************************/


#include "view.h"
#include "vstruct.h"
#include "task.h"
#include "viewdata.h"

/*************************************************************************
load (filename)
*************************************************************************/

load()

{

strcpy(cmd_buff,str_op[0]);
init_vars();
init_tasks();

do_batch();

}
/*************************************************************************
end
*************************************************************************

end()

{
```

```
pcounter = tokenptr;
}

/*****************************************************************************
Displaying
*****************************************************************************/

/*****************************************************************************
printstr(row,col,str,att)
         b0  b1  s0  b2
*****************************************************************************/
printstr()

{
wrtstr10(str_op[0],(int)byt_op[2],(int)byt_op[0],(int)byt_op[1]);
}

/*****************************************************************************

       the interpretive functions putscrn thru waittime

        called with:

        returns:

        uses:

        notes:

        history:
                01-29-86 rwp - initial entry
                             - add sync routines to waittime()
                01-30-86 rwp - delete all devicerd()
                             - take out call to redisplay icon in putscrn()
                01-31-86 rwp - modify testinds() to call findgoto()
                             - modify touchbrh() to include branch code in the
                               string.
                02-04-86 rwp - modify setvideo to use 0 for channel 1
                               and 1 for  channel 2.
                02-05-86 rwp - use new wrtstr10()
                02-10-86 rwp - correct waittime() to signal COMMAND
                               PROCESS
                             - translate key numbers
                02-11-86 rwp - add scan_branch() to sysbrch() and touchbrh()
                             - add signal_process(ANY_WAIT_TSK)
                02-12-86 rwp - write tch counters before reading variable file
                02-17-86 rwp - in putscrn1 change palette only if mode 4
                02-21-86 rwp - program the palette register
                02-25-86 rwp - add waitpoll to all devicewts
                02-27-86 rwp - correct putvar_secon
                03-03-86 rwp - add mem_ptr to readgraf() call
                03-07-86 rwp - add speakfile()
                             - add user touch input definition to touchbrch()
                03-10-86 rwp - only change the background for mode 4
                03-13-86 rwp - write tch counters only if the variable name
                                 is "%T..."
                             - reprogram the palette register only if a full
                               screen
*****************************************************************************/

#include "stdio.h"
#include "view.h"
#include "vstruct.h"
```

```
#include "task.h"
#include "viewdata.h"
#include "cmdnum.i"

char getvideo();
char *cmalloc();
char *ecvt();
char *malloc();
long tictime();
char *cfree();

extern int ibsta;

/****************************************************************************
putscrn1(fade,time,fore,back,border,SrowScol,ErowEcol,num)
          b0    b1   b2   b3    b4     n0       n1      n2
****************************************************************************/

putscrn1()
{
char *readgraf();
GHEADER header;
char *scrnptr;
unsigned wsrowcol;   /* window start row/col   */
unsigned vsrowcol;   /* viewport start row/col */
unsigned verowcol;   /* viewport end row/col   */
int ecol;
int border,background;
char *mem_ptr;
static char zero_pal[17];
static char cur_pal_array[17];
static char first_hi = 1;

scrnptr = readgraf((int)num_op[2],&header,&mem_ptr);

if (smode != header.gmode)
   {
    setmode(header.gmode);
    /* redisplay the icon */
    if (tchbrch[HELP_ICON].tbrhcode)
        key25on(HELP_ICON);
   }

/* program the palette register */
if (smode == 13 || smode == 14)
   {
    /* if full screen */
    if (header.ulrowcol == 0x0101 &&  header.lrrowcol == 0x1950)
       {
       if (!cmp_palettes(&header.palreg,&cur_pal_array) && first_hi)
          {
          first_hi = 1;
          prog_palette(&zero_pal);
          fill(0,0x0101,0x1950);
          }
       prog_palette(&header.palreg);
       movmem(header.palreg,cur_pal_array,17);
       }
   }
if (byt_op[2] != 255 && smode == 4)      /* change palette */
    {
     if (byt_op[2] != cur_pal)
        {
         cls((int)byt_op[1]);        /* clear entire screen including border */
         chpal((int)byt_op[2]);
         }
     }

/* if fade == 255 generate a random number between 1 and 11 */
if (byt_op[0] == 255)
```

```
    {
    byt_op[0] = ((rand())/3276) + 1;
    }

 if (byt_op[3] != 255)      /* change background */
     background = byt_op[3];
 else
     background = header.color;

 if (byt_op[4] != 255)      /* change border     */
     border = byt_op[4];
 else
     border = header.color;

 if (smode == 4 || smode == 1)
    ecol = 39;

 if (smode == 4)
     chback(background);

 chbord(border);

 if (num_op[0])
     vsrowcol = num_op[0];
 else
     vsrowcol = header.ulrowcol;

 if (num_op[1])
     verowcol = num_op[1];
 else
     verowcol = header.lrrowcol;

 wsrowcol = 0x0101;
 fadescrn(byt_op[0],byt_op[1],wsrowcol,vsrowcol,verowcol,scrnptr);

 /* free the memory for the uncompresses screen */
 mem_ptr = cfree(mem_ptr);

 if (curmask == 0)
    intlace(0);

 }
 /***************************************************************************
 putscreen(fade,time,fore,back,border,SrowScol,ErowEcol,name)
 ***************************************************************************

 putscrn()
 {;}

 /****************************************************************************
 putvar(row,col,att1,att2,length,edit,record#,varname)
        b0  b1  b2   b3   b4      b5    n0       s0

 ***************************************************************************/
 putvar()
 {
 char buf[82];
 char len;

 display_row = byt_op[0];
 display_col = byt_op[1];
 insize = byt_op[4];
 inattri1 = byt_op[2];
 inattri2 = byt_op[3];
 inedit = byt_op[5];


 /* write tch counters */
 if (strncmp(str_op[0],"%T,2") == 0)
     wrt_tch();
```

```
get_var(str_op[0],num_op[0],buf,inedit,insize + 1);

wrtstr10(buf,inattri1,(int)byt_op[0],(int)byt_op[1]);
strcpy(outputbuf,buf);
signal_process(SECOND_ATTR_PROCESS);
clear_task(SECOND_ATTR_TSK);     /* clear any outstanding second att tasks */


}

putvar_second()
{

wrtstr10(outputbuf,inattri2,display_row,display_col);
block_process(SECOND_ATTR_PROCESS);
clear_task(SECOND_ATTR_TSK);
}

/*****************************************************************************
setaudio(PlayerCode)
            b0
*****************************************************************************/

setaudio()
{

int i;

i = getplayr(byt_op[0]);

byt_op[0] &= 0x03;              /* audio uses bits 0 and 1 */

/* set audio control */
ddbuf[0] = 0x07;
ddbuf[1] = byt_op[0];            /* audio only uses bits 0 and 1  */
devicewt(i,ddbuf,2);

/*****************************************************************************
if (i == vdisc1)
   waitpoll(VDIS1_DEVICE);
else
   waitpoll(VDIS2_DEVICE);

*****************************************************************************/
}

/*****************************************************************************
setinds(mask,value)
         n0   n1
*****************************************************************************

setinds()


{
unsigned j,i;

j = 1;
for (i=1; i<= 16; i++)
    {
     if (num_op[0] & j)                    /* test for bit on in the mask */
        {
         if (num_op[1] & j)                /* test for bit on in the indicator */
             sys_ind = (sys_ind | j);              /* set current indicator on */
         else
              sys_ind = (sys_ind & (~j)); /* set current indicator off */
         }
      if (j < 16384)
          j *= 2;                                  /* next bit to test */
      else
```

```
        j = 32768;

    }
}

/**
setvideo(channel)        0 - channel 1     1 - channel 2
             b0
********************************************************************************/

setvideo()
{
char newvst;

newvst = 0xff;
playlast = 0xfe;

/* if channel 2  */
if (byt_op[0])
   {
    newvst &= ~0x10;     /* turn bit 5 off */
    playlast = 0xee;
   }

ddbuf[0] = 0x01;
ddbuf[1] = newvst;
devicewt(video,ddbuf,2);
/********************************************************************************
waitpoll(VIDEO_DEVICE);
********************************************************************************/

}

/********************************************************************************
spkchip(buffer)
          s0
********************************************************************************/

spchchip()


{
int cnt;

cnt = strlen(str_op[0])+1;

if (cnt > 160)
   {
   cnt = 160;
   *(str_op[0] + 160) = '\0';
   }

ddbuf[0] = 0x01;

strcpy(&ddbuf[1],str_op[0]);

devicewt(speech,ddbuf,cnt);

}

/********************************************************************************
spkfile(filename)
          s0
********************************************************************************/

spchfile()


{
```

```
int rc;

rc = speak_file(str_op[0]);

}

/**************************************************************************
sysbrch(buf)
      s0
**************************************************************************/

sysbrch()

{
char key = 0;
char *newptr;
int str_len;
unsigned grpclear;
int i;

/* make system color solid */
 solidsys();

tch_on(2);    /* turn key touch on */
/* translate keys */
for (i = 1; i< 11;i++)
     {
     tchbrch[i].tbrhcode = 0;
     /* tchbrch[i].tchbrnch = cfree(tchbrch[i].tchbrnch); */
     }

tchbrch[10].tbrhcode = 17;      /* resume key : switched with key 56 */

str_len = strlen(end_evt);

if (str_len > 2 )
   {
    tchbrch[5].tbrhcode = 4;       /* goodbye event */
    tchbrch[5].tchbrnch = cmalloc(10);
    strcpy(tchbrch[5].tchbrnch,end_evt);
    }

strcpy(sysbrstr,str_op[0]);

newptr = str_op[0];

while (*newptr >50 && *newptr < 56)
       {
        key = (*newptr < 51) ? *newptr + 10: *newptr - 50;
        switch (key + 50)
              {
              case 51:             /* Pause */
                   if (*(newptr +1) == 'Y')
                        {
                        tchbrch[key].tbrhcode = 9;
                        key25on(1);
                        }
                   newptr += 2;
                   break;
              case 52:             /* replay  */
                   if (*(newptr + 1) == 'Y')
                        {
                        tchbrch[key].tbrhcode = 10;
                        }
                   newptr += 2;
                   break;
              case 53:             /* continue : goto event name  */
```

```
        case 54:            /* return   : goto event name  */
             str_len  = scan_branch(newptr + 1,&tchbrch[key].tchbrnch,10);
             tchbrch[key].tbrhcode = 4;
             newptr += str_len + 1;
             tchbrch[1].tbrhcode = 9;
             key25on(1);
             break;
        case 55:
             newptr += 2;
             break;
     }  /* switch */

  }  /* end while */

}

/**********************************************************************************
testinds(mask,value,TrueBranch,FalseBranch)
         n0   n1      s0         s1
*********************************************************************************/

testinds()
{
unsigned j,i;
char enum = 0;    /* start true */

j = 1;
for (i=1; i<= 16; i++)
    {
     if (num_op[0] & j)                  /* test for bit on in the mask */
        {
         if ( (sys_ind & j) ==  (num_op[1] & j) ) /* both bits the same */
            {
             enum = 0;
            }
         else                                    /* bits different */
             {
             enum = 1;
             break;
            }
         }
      if (j < 16384)
          j *= 2;                                /* next bit to test */
      else
          j = 32768;
    }

findgoto(str_op[enum]);

}

/**********************************************************************************
touchbrh(buf)   sets up the touch branch table
          s0
*********************************************************************************/

touchbrh()
{
char key = 0;
char *newptr;
int str_len;

newptr = str_op[0];

/* translate key numbers */
key = (*newptr) + 10 ;

while (*newptr > 0 && *newptr < 51)
      {
```

```
        str_len = scan_branch(newptr + 1,&tchbrch[key].tchbrnch,10);
        /* find the branch code */
        switch(*(newptr+1))
              {
              case 175:   /* high byte on */
              case '/':
                   switch (*(newptr + 2))
                        {
                         case 'C':
                         case 'c':
                              tchbrch[key].tbrhcode = 1;
                              break;
                         case 'E':
                         case 'e':
                              tchbrch[key].tbrhcode = 2;
                              break;
                         case 'R':
                         case 'r':
                              tchbrch[key].tbrhcode = 3;
                              break;
                        }
                   break;
              case 170:              /* high bit on */
              case '*':              /* goto event */
                   tchbrch[key].tbrhcode = 4;
                   break;
              case 192:              /* high bit on */
              case '@':              /* gosub event */
                   tchbrch[key].tbrhcode = 5;
                   break;
              case 166:              /* high bit on */
              case '&':              /* call user procedure */
                   tchbrch[key].tbrhcode = 6;
                   break;
              case 163:              /* high bit on */
              case '#':              /* loop screen */
                   tchbrch[key].tbrhcode = 7;
                   break;
              case 164:              /* high bit on */
              case '$':              /* get event name from file */
                   tchbrch[key].tbrhcode = 8;
                   break;
              case '=':             /* user touch input */
              case 189:             /* high bit on      */
                   tchbrch[key].tbrhcode = 22;
                   break;
             default:               /* no action */
                   tchbrch[key].tbrhcode = 21;
                   break;
         }  /* switch */
    newptr += str_len + 1;
    key = (*newptr ) + 10;

    }  /* end while */
}

/*****************************************************************************
waitframe(PlayerCode,Frame)
             b0       n0
*****************************************************************************/

waitfram()
{
int vid;

vid = getplayr(byt_op[0]);
ddbuf[0] = 0x09;
ddbuf[1] = hibyte(num_op[0]);
ddbuf[2] = lobyte(num_op[0]);
```

```
framlook = num_op[0];

devicewt(vid,ddbuf,3);

block_process(COMMAND_PROCESS);
signal_task(ANY_WAIT_TSK);

if (vid == device_var[VDIS1_DEVICE])
   signal_task(FRAMEWAIT1_TSK);
else
   signal_task(FRAMEWAIT2_TSK);
/*****************************************************************************
if (vid == vdiscl)
   waitpoll(VDIS1_DEVICE);
else
   waitpoll(VDIS2_DEVICE);
*****************************************************************************/

player[cur_play].status |= FRAMEBIT;
player[cur_play].waitfrm = num_op[0];

ddbuf[0] = 0x0c;     /* get status  */
devicewt(vid,ddbuf,1);

if (vid == vdiscl)
   waitpoll(VDIS1_DEVICE);
else
   waitpoll(VDIS2_DEVICE);


}

/*****************************************************************************
waitseg(PlayerCode)
        b0
*****************************************************************************/

waitseg()
{
int vid;

vid = getplayr(byt_op[0]);

block_process(COMMAND_PROCESS);
signal_task(ANY_WAIT_TSK);

if (vid == vdiscl)
   signal_task(SEGMENT1_TSK);
else
   signal_task(SEGMENT2_TSK);

ddbuf[0] = 0x0c;     /* get status */
devicewt(vid,ddbuf,1);

if (vid == vdiscl)
   waitpoll(VDIS1_DEVICE);
else
   waitpoll(VDIS2_DEVICE);


}

*****************************************************************************
wait time(time)
        n0
*****************************************************************************

long tictime();

waittime()
```

```
{
long curtic;
float rate = 1.82;  /* tics per tenth of a second */

w_time = num_op[0];  /* set global variable w_time to wait time */

block_process(COMMAND_PROCESS);
signal_task(ANY_WAIT_TSK);

if (num_op[0] == 0)
   {
    signal_task(TIMEWAIT_TSK);
    block_process(TIME_UP_PROCESS);

   /* if inkeybrd or intouch process is awake */
   if (process_var[KEY_IN_PROCESS] || process_var[TCHBOARD_PROCESS])
      {
       signal_process(COMMAND_PROCESS);
       block_process(KEY_IN_PROCESS);
       block_process(TCHBOARD_PROCESS);
       block_process(REGULAR_KEY_PROCESS);
      }
  }
else
   {
    signal_task(TIMEWAIT_TSK);
    signal_process(TIME_UP_PROCESS);
    curtic =  tictime();
    targetic = ((float)num_op[0] * rate) + curtic;
    }
}


/**
dummy functions to resolve calls for list programs
*******************************************************************************/

 int waittime() {;}
 int no_cp() {;}
 int playvid() {;}
 int waitfram() {;}
 int chgvideo() {;}
 int loadvid() {;}
 int waitseg() {;}
 int dostill() {;}
 int dostills() {;}
 int setvideo() {;}
 int setaudio() {;}
 int putscrn() {;}
 int putscrni() {;}
 int clrscrn() {;}
 int colors() {;}
 int putvar() {;}
 int dfntouch() {;}
 int clrtouch() {;}
 int touchbrh() {;}
 int feedback() {;}
 int sysbrch() {;}
 int pausebrh() {;}
 int spchchip() {;}
 int spchfile() {;}
 int inkeybrd() {;}
 int intouch() {;}
 int matchbrh() {;}
 int setinds() {;}
 int testinds() {;}
 int addinds() {;}
 int logging() {;}
 int nextevt() {;}
 int printstr() {;}
 int load() {;}
```

```
 int assign_all(){;}
 int assign_num(){;}
 int assign_str(){;}
 int all_calc(){;}
 int find_u_file(){;}
 int read_u_file(){;}
 int write_u_file(){;}

int bld_ufile_table(num)
   int num;
{;}

/*************************************************************************/
/*                                                                       */
/*   PROCEDURE NAME: getccf.c                                            */
/*   DESC:           get/set presentation file names                     */
/*                                                                       */
/*   COMPILE:        compile getccf                                      */
/*   PROGRAMMER:     Jerry F. Williams                                   */
/*                                                                       */
/*   INITIAL CODING: 10/27/85                                            */
/*   LAST REVISION:  02/11/86                                            */
/*                                                                       */
/*************************************************************************/
/*************************************************************************/
/*  * indicates comment - skip                                          */
/*  CONTROL FILE = dos file spec   (DEFAULT = \PRESNAME\PRESNAME+".CTL") */
/*  CONTROL INDEX = dos file spec  (DEFAULT = \PRESNAME\PRESNAME+".IDX") */
/*  LIBRARY = dos file spec        (DEFAULT = \PRESNAME\PRESNAME+".LBR") */
/*  VARIABLE FILE = dos file spec  (DEFAULT = \PRESNAME\PRESNAME+".VAR") */
/*  VARIABLE INDEX = dos file spec (DEFAULT = \PRESNAME\PRESNAME+".VRX") */
/*  LITERAL FILE = dos file spec   (DEFAULT = \PRESNAME\PRESNAME+".LIT") */
/*  LITERAL INDEX = dos file spec  (DEFAULT = \PRESNAME\PRESNAME+".LTX") */
/*  LOG FILE = dos file spec       (DEFAULT = \PRESNAME\"CNDLOG."+(1ST 3 */
/*                                             CHAR PRESNAME)           */
/*  KEY FILE = dos file spec       (DEFAULT = \PRESNAME\PRESNAME+".KEY") */
/*  TOUCH FILE = dos file spec     (DEFAULT = \PRESNAME\"TOUCH1.IDX")    */
/*  OUTLINE FILE = dos file spec   (DEFAULT = \PRESNAME\PRESNAME+".OUT") */
/*  DIRECT FILE = dos file spec    (DEFAULT = \PRESNAME\PRESNAME+".VT)"  */
/*       USER FILE = dos file spec              (DEFAULT = \PRESNAME\PRESNAME+
".FIL)" */
/*       USER INDEX = dos file spec       (DEFAULT = \PRESNAME\PRESNAME+".FLX)"
*/
/*       USER DEFINITION = dos file spec(DEFAULT = \PRESNAME\PRESNAME+".FLD)" */
/*************************************************************************/
#include "getccf.h"

getccf(presname,file_names)
char *presname;              /* presentation name */
char *file_names[];          /* presenation file names */

  {
  FILE *presname_fp;               /* file id for file names file */
  char *tpresname;                 /* temp ptr to "upper case" presname */
  char rstring[MAX_READ_SIZE+1];   /* read string for fgets */
  char *file_type;                 /* beginning of file_type string */
  char *file_name;                 /* beginning of file_name string */
  char *end_file_type;             /* end of file_type string */
  char *end_file_name;             /* ending of file_name string */
  int rec_nr = 0;                  /* current record number (presname.ccf)*/
  int i;

  tpresname = presname - 1;
  while(*++tpresname)
    *tpresname = toupper(*tpresname);

  for (i=0; i < NR_PRES_FILES; i++)      /* set up default file names */
    {
       if (strcmp("LOG FILE",file_types[i])
    && strcmp("TOUCH FILE",file_types[i]) )
      sprintf(file_names[i],"%s%s%s%s%s",
             "\\",presname,"\\",presname,default exts[i]);
```

```
  if (!strcmp("LOG FILE",file_types[i]))
    {
    strncpy((default_exts[i]+1),presname,3);     /* set up log default */
    sprintf(file_names[i],"%s%s%s%s",
            "\\",presname,"\\CNDLOG",default_exts[i]);
    }

  if (!strcmp("TOUCH FILE",file_types[i]))
    sprintf(file_names[i],"%s%s%s%s",           /* set up touch name */
            "\\",presname,"\\TOUCH1",default_exts[i]);

  }
presname_fp = fopen_file(presname, ".ccf", "ra");
if (presname_fp != NULL)
  {
  while (fgets(rstring,MAX_READ_SIZE,presname_fp))
    {
    if (rstring[0] == '*')
      continue;

    file_type = end_file_name = rstring;
    i = -1;
    --end_file_name;
    while (*++end_file_name != 13
         && *end_file_name != 10
         && ++i < MAX_READ_SIZE )
      *end_file_name = toupper(*end_file_name);
    *end_file_name = 0x0;

    if (file_name = strpbrk(rstring,"="));
      {
      end_file_type = file_name;
      *end_file_type = 0x0;
      while(*--end_file_type == ' ')
        *end_file_type = 0x0;

      i=-1;
      while (++i < NR_PRES_FILES
           && strcmp(file_types[i],file_type) )
        ;
      if (i < NR_PRES_FILES)
        {
        while(*++file_name == ' ')
          ;
        if (end_file_name > file_name)
          strncpy(file_names[i],file_name,MAX_FILENAME_SIZE);
        }
      }
    }
  fclose(presname_fp);
  return(1);

    }
  else
    return(0);
  }

/*****************************************************/
/* fopen_file - general buffered file opening routine */
/*****************************************************/

FILE *fopen_file(fil_name, ext, ftype)
char *fil_name;
char *ext;
char *ftype;
  {
  char filename[71];

  strcpy(filename, fil_name);
  strcat(filename, ext);

  return(fopen(filename, ftype));
```

```
/*****************************************************************************

        getevent - loads an event from disk

        called with:

        returns:

        uses:

        notes:

        history:
                01-28-86 rwp - initial comments
                02-04-86 rwp - modify to use defines for command codes
                             - stop if token == blanks (32).
*****************************************************************************/

#include "view.h"
#include "vstruct.h"
#include "viewdata.h"
#include "cmdnum.i"

char *cfree();
extern struct cmd cmds[];

getevent(evtnum)
int evtnum;

{
char *cmalloc();
int i;
long pos;
int indx = 0;
int endindx = 0;
int reclen;
unsigned evtlen;
char *buf;
char *scanbuf;
char token;
int command_valid;

indx = evttable[evtnum].fileindx;

cur_evt = evtnum;


evtlen = (unsigned)evttable[evtnum].evtsize * 64;
buf = cmalloc(evtlen);
pos = (long)(indx)*64;
lseek(cntlnum,pos,0);
read(cntlnum,buf,evtlen);

     tokenptr = tkstart;
     pcounter = tkstart;
     numindex = 0;
     for (i = 0; i<strindex; i++)
          {
          strtable[i].svalue = cfree(strtable[i].svalue);
          }
     strindex = 0;
     bytindex = 0;
     for (i = 0; i<evtindex;i++)
          {
          evttable[i].evalue = 0;
          }
     evttable[evtnum].evalue = tokenptr;

scanbuf = buf;
token = 0;
```

```
while (token != NEXTEVT && token != 32 && ( (scanbuf-buf) < evtlen ) )
   {
    scan_ptr = scanbuf;          /* start scanning at beginning of command */
    token = *scan_ptr;           /* command token */
    if (token == 200)            /* change next event to NEXTEVT  */
          token = NEXTEVT;
    reclen = *(scan_ptr+1);      /* get the command length    */
    scan_ptr += 2;               /* skip the token and the length */

    /* is this a valid command */
    command_valid = FALSE;
    for (i = 0;i<maxcmds;i++)
       {
       if (token == cmds[i].cmdtoken)
          {
          command_valid = TRUE;
          break;
          }
       }

    if (command_valid)
       {
       /* find the operands */
       for (i=0;i<cmdline[token].varmax;i++)
            {
             getm_op(token,cmdline[token].varcode[i],reclen,scanbuf);
            }
       puttoken(1,token);
       }

    scanbuf += reclen + 2;              /* find start of next command */

   } /* end while() */

 cfree(buf);

 }   /* end main */

/****************************************************************************
        getm_op - get operands from commands in memory

        called with:

        returns:

        uses:

        notes:

        history:
                02-18-86 rwp - modify scanning of branch names
                               for test indicators and add indicators.

 ****************************************************************************/

 #include "view.h"
 #include "vstruct.h"
 #include "viewdata.h"
 #include "cmdnum.i"

 char *cfree();

 getm_op(token,code,length,scanbuf)
   char token;      /* command token  */
   int code;        /* variable code */
   int length;      /* length of the command */
   char *scanbuf;   /* pointer to beginning of the command */
 {
```

```
int newlen;
int str_len;
char *branch_name;

switch(code)
      {
      case 0:             /* byte */
           scanbyte(3);
           break;
      case 1:             /* unsigned int */
           scannum(3);
           break;
      case 2:             /* buffers of varying lengths */
           scanstr(length);
           break;
      case 3:             /* match branch names */
           length -= 20;
           scanstr(length);
           break;
      case 8:             /* variable name,match string,file name,graphic  */
      case 9:                               /* variable                  */
           if (token != MATCHBRCH)
              {
               newlen = (scanbuf +length + 2) - scan_ptr;
               scanstr(newlen);
               }
           else
               scanstr(code);
           break;
      case 10:            /* true branch,false branch,event name     */
           scanstr(code);
           break;
      case 11:
           /* find the length of the branch name */
           str_len = scan_branch(scan_ptr,&branch_name,10);
           scanstr(str_len);
           branch_name = cfree(branch_name);
           if (str_len > 10)
              scan_ptr++;
           break;
      }

}

/*****************************************************************************
getplayr

gets the player number

*****************************************************************************/
/****************************************************************************/
        getpalyr -  determines which palyer is being requested.

        called with:
                playcode from the command

        returns:
                the vision device variable
        uses:

        notes:

        history:
                02-04-86 rwp - initial description
                03-12-86 rwp - delete playlast change
*****************************************************************************/

#include "vstruct.h"
#include "viewdata.h"
```

```
getplayr(playcode)
  char playcode;

{

if (playcode & 0x08)
     {
      /* playlast = 0xFE; */        /* 1111 1110  used to set interlace */
      cur_play = 0;
      return(vdisc1);
     }
else
    {
     /* playlast = 0xEE; */         /* 1110 1110 */
     cur_play = 1;
     return(vdisc2);
     }
}

/*****************************************************************************
        get_kb_key

        called with:
             nothing
        returns:
             key_num : the key pressed
        uses:
        notes:
                puts the key into the kb_buffer if a valid key

        history:
                01-29-86 rwp - initial entry
                01-30-86 rwp - restructure using cases
                             - add include of ctype for isprint()
                02-10-86 rwp - add CR and BS to default case
                02-13-86 rwp - add log_message()
                03-07-86 rwp - let kb_buff hold 100 characters

*****************************************************************************/
#include "task.h"
#include "view.h"
#include "vstruct.h"
#include "viewdata.h"
#include "ctype.h"

get_kb_key()

{
int key_num;
char log_buf[10];
int col = 0;

key_num = getch();

/* log the key */
movmem((char *)&key_num,log_buf + 2,2);
movmem((char *)&col,log_buf,2);

log_message(4,log_buf);

switch(key_num)
      {
       case 0:          /* a function key */
            key_num = getch();
            /* no break */
       case ESC:
            signal_process(COMMAND_KEY_PROCESS);
            signal_task(COMMAND_KEY_TSK);
            if (kb_buff[0] < 99)
               {
```

```
              kb_buff[0]++;
              kb_buff[kb_buff[0]] = key_num;
              }
              /* log the key */
              movmem((char *)&key_num,log_buf + 2,2);
              movmem((char *)&col,log_buf,2);
              log_message(4,log_buf);
             break;
      default:
           /* is input process awake */
           if (process_var[KEY_IN_PROCESS])
              {
             /* is it a printable character */
             if (isprint(key_num) || key_num == CR || key_num == BACKSPACE)
                {
                 signal_task(KEYBOARD_TSK);
                 /* if the buffer is not full */
                 if (kb_buff[0] < 99)
                    {
                     kb_buff[0]++;
                     kb_buff[kb_buff[0]] = key_num;
                    }
                }
              }
           break;
   }

return(key_num);
}

/****************************************************************************
get_op

o finds the operand

****************************************************************************/

#include "\viewc\view.h"

extern char *scan_ptr;

get_op(type)
  int type;
{

int newtype;            /* operand type */

while (*scan_ptr == ' ')
       scan_ptr++;

switch(type)
      {
      case 0:   /* numeric 0 to 255 */
           if (newtype = chknum())    /* returns FALSE if its not numeric */
              {
               scanbyte(newtype);      /* newtype  1 - constant 2 - variable */
               }
           else
               return(FALSE);
           break;
      case 1:   /* numeric */
           if (newtype = chknum())    /* returns FALSE if its not numeric */
              {
               scannum(newtype);      /* newtype  1 - constant 2 - variable */
               }
           else
               return(FALSE);
           break;
/****************************************************************************
      case 3:   /* event */
```

```
        if (newtype = chkstr())
           {
            scanevt(newtype);
           }
        else
            return(FALSE);
        break;
*****************************************************************************
    case 5:   /* variable name */
        if (newtype = chknum())    /* returns FALSE if its not numeric */
           {
            scannum(newtype);      /* newtype  1 - constant 2 - variable */
            }
        else if (newtype = chkstr())
            {
            scanstr(newtype);
            }
        else
            return(FALSE);
        break;
      default:
        if (newtype = chkstr())    /* returns FALSE if its not string */
           {
           scanstr(newtype);      /* newtype  1 - constant 2 - variable */

           }
       else
            return(FALSE);
       break;

    }

next_op();
return(TRUE);

}

/****************************************************************************
        get_touch_key

        called with:
              pointer to response buffer

        returns:
               FALSE if error
               key number if good touch
        uses:
        notes:
             The key number is already translated : icons = 1 to 10.
             This function puts the key number into the touch_key_buffer.

        history:
               01-27-86 rwp - initial entry
               01-29-86 rwp - add signal_task()
               01-30-86 rwp - set targetic to 0 if key 1 thru 50
                            - delete block_process(COMMAND_PROCESS)
                              touch_process() will execute before do_cmd()
                              no need to block do_cmd()
               02-10-86 rwp - translate keys
               02-14-86 rwp - add log_message()
               03-04-86 rwp - look for touch input process for all keys
               03-07-86 rwp - let touch_key_buff hold 100 characters

****************************************************************************/
#include "task.h"
#include "view.h"
#include "vstruct.h"
#include "viewdata.h"

get_touch_key(response_buf)
    char *response_buf;
```

```
{
int key_num;
char log_buf[8];
int col = 0;

/* if not a touchscreen response or an error */
if (response_buf[0] != 3 || response_buf[1] != 0 || response_buf[3] <= 0)
   {
    /* log the key */
    movmem((char *)&col,log_buf + 2,2);
    movmem((char *)&col,log_buf,2);
    /* if touch response and key <= 0 */
    if (response_buf[0] == 3 && response_buf[3] <= 0 )
         log_message(97,log_buf);
   return(FALSE);
   }

key_num = response_buf[3];

if (key_num > 10 || process_var[TCHBOARD_PROCESS])  /* regular key number  */
   {

     /* if this is not touch screen input */
     if (!process_var[TCHBOARD_PROCESS])
        {
        targetic = 0;
        signal_task(REGULAR_KEY_TSK);
        signal_process(REGULAR_KEY_PROCESS);
        }
     else
        {
        signal_task(TCHBOARD_TSK);
        }
    }
else
      {
      signal_task(ICON_KEY_TSK);
      signal_process(ICON_KEY_PROCESS);
      }

if (touch_key_buff[0] < 99)
   {
    touch_key_buff[0]++;
    touch_key_buff[touch_key_buff[0]] = key_num;
   }

if (rmode == 1)
   {
    cursor(19,1);
    printf("Touch Key: %2d",key_num);
   }

/* log the key */
movmem((char *)&key_num,log_buf + 2,2);
movmem((char *)&col,log_buf,2);

log_message(3,log_buf);

return(key_num);


}

/*************************************************************************
        graphics routines

        called with:

        returns:

        uses:

        notes:
```

```
        compcalc() now returns an unsigned. It must return a long
        when we support mode 10.

    history:
        02-04-86 rwp - initial description
        02-21-86 rwp - add getvmode()
        03-03-86 rwp - add mem_ptr to readgraf()
                     - add loopscrn file

****************************************************************************/

#include "stdio.h"
#include "fcntl.h"
#include "dos.h"
#include "vstruct.h"
#include "viewdata.h"

char *cfree();

char *readgraf (fnum,header,mem_ptr)
      int fnum;          /* file number containing graphics image */
      GHEADER *header;   /* pointer to file header */
      char **mem_ptr;    /* pointer for freeing allocated memory  */

{
long rd_bytes;
long rd_file();
char *cmalloc();
char *p1,*q1;
long nact;
unsigned size;
unsigned compcalc();
int para;
FILE *fp;
union {
     struct {
         unsigned offset;
         unsigned segment;
         } parts ;
     char *ptr;
       } pp,qq;

/* find the size of the compressed file in the graphics library */
size = (unsigned)gphtable[fnum].gsize;

/* allocate memory for the compressed file */
pp.ptr=cmalloc(size+16);   /* size is limited to 64k  */

p1=pp.ptr;
para=pp.parts.offset/16;
pp.parts.segment+=(para+1);
pp.parts.offset=0;

/* load the file */
lseek(libnum,gphtable[fnum].position,0);

rd_bytes = rd_file(libnum,pp.ptr,(long)size);
if (*(pp.ptr) == 0xFD)     /* if bsaved */
    {
     size-=7;
     lseek(libnum,gphtable[fnum].position+7,0);
     rd_bytes = rd_file(libnum,pp.ptr,(long)size);
     }


if (*(pp.ptr) > 6 )
      movmem(pp.ptr,(char *)header,28);
else
      movmem(pp.ptr,(char *)header,11);
```

```
/* calculate the size of the uncompressed screen */
size = compcalc(header);

/* allocate memory for the uncompressed screen */
qq.ptr = cmalloc(size+16);

q1=qq.ptr;
para=qq.parts.offset/16;
qq.parts.segment+=(para+1);
qq.parts.offset=0;

/* uncompress the screen */
decomp(qq.parts.segment,pp.parts.segment);

/* free the memory for the compressed screen */
p1 = cfree(p1);

/* set the pointer for freeing the uncompressed memory */
*mem_ptr = q1;

/* return a pointer used to display the screen */
return(qq.ptr);

}


/***************************************************************************
setmode
***************************************************************************

setmode (mode)  /* set screen mode */
int mode;
{
   union REGS inregs;  /* input registers */
   union REGS outregs; /* output registers */

   smode = mode;
   inregs.h.ah=0;
   inregs.h.al=smode;
   int86(0x10,&inregs,&outregs); /* interrupt 10 call */
   if (smode < 0x0D) scrseg = 0xB800;
   else scrseg = 0xA000;

   if (smode == 4)
       chpal((int)cur_pal);

   if (smode == 3 || smode == 14)
       maxcol = 80;
   else
       maxcol = 40;


}
/**************************************************************************
getvmode
**************************************************************************

getvmode ()  /* find the current screen mode */

{
   union REGS inregs;  /* input registers */
   union REGS outregs; /* output registers */

   inregs.h.ah= 0x0f;


   int86(0x10,&inregs,&outregs); /* interrupt 10 call */
   smode = outregs.h.al;
   if (smode < 0x0D) scrseg = 0xB800;
   else scrseg = 0xA000;
```

```
   if (smode == 3 || smode == 14)
       maxcol = 80;
   else
       maxcol = 40;

}

/*****************************************************************************
compcalc
*****************************************************************************/

unsigned compcalc (header)
GHEADER *header;
{
   char table[8];
   int mode,erc,src,rows,cols;
   int area;
   unsigned total;

   table[0]=0x02;
   table[1]=0x02;
   table[2]=0x10;
   table[3]=0x08;
   table[4]=0x00;
   table[5]=0x00;
   table[6]=0x20;
   table[7]=0x20;

   mode = (int)header->gmode & 0x000E;
   src=header->ulrowcol;
   erc=header->lrrowcol;
   erc-=src;
   erc+=0x0101;
   cols=erc & 0x00FF;
   rows=erc>>8;
   area=rows*cols;
   total=(unsigned)(area*table[mode/2]);
   total+=(unsigned)11;       /* normal header */

   if (mode >= 0x0C) total+=(unsigned)17;      /* extended header */
   else if (mode >= 4) total+=(unsigned)384;
   total+=(unsigned)256;                       /* safety margin */
   return(total);
}


char *readscrn (top,left,bottom,right,free_mem_ptr)
       int top,left,bottom,right;
       char **free_mem_ptr;
{
union {
    struct {
       unsigned offset;
       unsigned segment;
       } parts ;
      char *ptr;
       } buffer;

unsigned int bufsiz;
unsigned vsrc,verc,para,bufcalc();

vsrc = top;
verc = bottom;
vsrc <<= 8;
verc <<= 8;
vsrc += left;
verc += right;
bufsiz = bufcalc(top,left,bottom,right);
buffer.ptr = cmalloc(bufsiz+16);

*free_mem_ptr = buffer.ptr;
```

```
para = buffer.parts.offset/16;
buffer.parts.segment += (para+1);
buffer.parts.offset = 0;
savepc2(smode,vsrc,verc,buffer.parts.segment);

return(buffer.ptr);   /* pointer for displaying screen */

}

/*****************************************************************************
display an uncompressed screen
*****************************************************************************/


writscrn(top,left,bottom,right,buffer)
   int top,left,bottom,right;
   char *buffer;
{
   unsigned vsrc,verc;

   vsrc=top;
   verc=bottom;
   vsrc<<=8;
   verc<<=8;
   vsrc+=left;
   verc+=right;
   movepc(smode,0x0101,vsrc,verc,buffer,scrseg);
   }


unsigned bufcalc (top,left,bottom,right)
{
   char table[8];
   int mode,erc,src,rows,cols;
   int area;
   unsigned total;

   table[0]=0x02;
   table[1]=0x02;

   table[2]=0x10;
   table[3]=0x08;
   table[4]=0x00;
   table[5]=0x00;
   table[6]=0x20;
   table[7]=0x20;

   mode = (int)smode & 0x000E;
   src=top;
   src<<=8;
   src+=left;
   erc=bottom;
   erc<<=8;
   erc+=right;
   erc-=src;
   erc+=0x0101;
   cols=erc & 0x00FF;
   rows=erc>>8;
   area=rows*cols;
   total=(unsigned)(area*table[mode/2]);
   total+=(unsigned)11;
   if (mode >= 0x0C) total+=(unsigned)17;
   else if (mode >= 4) total+=(unsigned)384;
   total+=(unsigned)256;
   return(total);
   }

/****************************************************************************
       ibtrace      - trace ibrd ,ibrpp and ibwrt
       called with:
```

```
        returns:

        uses:

        notes:

        history:
                02-13-86 rwp - initial entry
                             - add return at beginning
                               remove trace_buf from viewdata.h
                02-14-86 rwp - remove return
                02-17-86 rwp - add return
                02-22-86 rwp - remove return
                02-24-86 rwp - add return
                               remove return
***************************************************************************/


extern char trace_buf[];
extern int lognum;
extern unsigned ibsta;
extern int buf_cnt;

char *cmalloc();

int ibtrace(cmd_num,device,count,buffer)
          int cmd_num;
          int device;
          int count;
          char *buffer;

{
int i;
static unsigned last_poll;
static long poll_count;

return;

switch(cmd_num)
     {
     case 1:    /* ibwrt */
          sprintf(trace_buf + buf_cnt,"ibwrt %4x %2x %5x,",ibsta,count,device);
          buf_cnt += 20;
          for (i = 0;i<count;i++)
               {
               sprintf(trace_buf + buf_cnt,"%3x",*(buffer + i));
               buf_cnt += 3;
               }
          sprintf(trace_buf + buf_cnt,"\n");
          buf_cnt += 2;
          last_poll = 0xff;
          poll_count = 0x01;
          break;
     case 2:  /* ibrpp */
          if (last_poll != *(buffer + 1))
               {
               sprintf(trace_buf + buf_cnt,"   ibrpp %4x%2x %4x,",ibsta,count,dev
ice);
               buf_cnt += 21;
               sprintf(trace_buf + buf_cnt,"%3x %5d\n",*(buffer + 1),poll_count);
               buf_cnt += 11;
               }
          else
               {
               poll_count++;
               }
          break;
     case 3: /* ibrd */
          sprintf(trace_buf + buf_cnt,"ibrd  %4x %2x %5x,",ibsta,count,device);
          buf_cnt += 20;
          for (i = 0;i<4;i++)
```

```
                {
                sprintf(trace_buf + buf_cnt,"%3x",*(buffer + i));
                buf_cnt += 3;
                }
            sprintf(trace_buf + buf_cnt,"\n");
            buf_cnt +=2;
            last_poll = 0xff;
            poll_count = 0x01;
            break;
        }

 if (buf_cnt > 2950)
    {
    wrt_ib_buf();
    buf_cnt = 0;
    }

 }


wrt_ib_buf()

 {
 write(lognum,trace_buf,buf_cnt);
 }

/*************************************************************************
        intlace - set the interlace on or off

        called with:
                0 - turn interlace off
                1 - try to turn interlace on

        returns:

        uses:

        notes:
               Set interlace mode :
                - If there is one transparent color
                   or a player is in motion
                    and the video is on for that player.

               1 will not always turn interlace on.

        history:
               02-04-86 rwp - initial description
               03-10-86 rwp - take return out
*************************************************************************/

#include "view.h"
#include "vstruct.h"
#include "viewdata.h"
#include "task.h"


intlace(scanmode)
  char scanmode;

{
int done = FALSE;

if (curmask == 0)
   {
    scanmode = 0x00;       /* non_lace */
   }

ddbuf[0] = 0x01;
ddbuf[1] = (playlast | scanmode);
```

```
devicewt(video,ddbuf,2);    /* write */

waitpoll(VIDEO_DEVICE);

}

/*****************************************************************************

        called with:

        returns:

        uses:

        notes:

        history:
                01-21-86 RWP - changed icon names to new format
                               still using overrides and not defaults from
                               literal file.
                01-22-86 rwp - modify to get icon names from literal file
                01-23-86 rwp - correct how the extension is chosen for the
                               icon sets.
                01-30-86 rwp - take out devicepl and devicerd
                             - put devicepl and devicerd back
                02-10-86 rwp - translate key numbers
                02-21-86 rwp - add waitpoll
                03-03-86 rwp - modify to use icontable structure

*****************************************************************************/


#include "view.h"
#include "vstruct.h"
#include "viewdata.h"
#include "task.h"

char *cfree();


key25on(key)
 int key;

{
GHEADER header;
char *readgraf();
char *readscrn();

char srow;
char erow;
char scol;
char ecol;
char buf[10];
int num;
char icon_set;
char helpname[10];
unsigned srowcol,erowcol;
char icon_num;          /* 0 to 9 help icon number */
char icon_ext[5][3];

strcpy(icon_ext[0],"40");
strcpy(icon_ext[1],"80");
strcpy(icon_ext[2],"LO");
strcpy(icon_ext[3],"MD");
strcpy(icon_ext[4],"HI");


icon_num = key - 1;

switch(smode)                   /* the screen mode determines which icon set to
use */
     {
```

```
        case 1:
             icon_set = 0;
             break;
        case 3:
             icon_set = 1;
             break;
        case 4:
             icon_set = 2;
             break;
        case 13:
             icon_set = 3;
             break;
        case 14:
             icon_set = 4;
             break;
        default:
             icon_set = 2;
        }

strcpy(helpname,icon[icon_num].icon_name);
strcat(helpname,icon_ext[icon_set]);

/* Only the mode 4 icon are being kept in memory right now. */
/* All other modes are loaded from disk each time they are turned on.   */

if (smode != 4 )        /* if screen mode != 4    */
   {
    num = putgtabl(helpname);   /* find the icon's file number   */
    icon[icon_num].display_ptr = readgraf(num,&header,&icon[icon_num].free_ptr);
                                        /* load the icon    */

    /* display the icon */
    movepc(smode,0x0101,header.ulrowcol,header.lrrowcol,
              icon[icon_num].display_ptr,scrseg);

    /* free the allocated memory */
    icon[icon_num].free_ptr = cfree(icon[icon_num].free_ptr);

    /* set the row columns for touch key definition */
    srow = hibyte(header.ulrowcol);
    scol = lobyte(header.ulrowcol);
    erow = hibyte(header.lrrowcol);
    ecol = lobyte(header.lrrowcol);
    }

   /* if the icon is not already loaded into memory  */

else if ( icon[icon_num].free_ptr == 0)
       {
        num = putgtabl(helpname); /* find the icon  */
        icon[icon_num].display_ptr =
             readgraf(num,&header,&icon[icon_num].free_ptr);   /* load the icon
*/


        /* set the row column coordinates for the icon arrays  */
        icon[icon_num].start_row = hibyte(header.ulrowcol);
        icon[icon_num].start_col = lobyte(header.ulrowcol);
        icon[icon_num].end_row   = hibyte(header.lrrowcol);
        icon[icon_num].end_col   = lobyte(header.lrrowcol);

        /* set the row column touch key definitions */
        srow = icon[icon_num].start_row;
        scol = icon[icon_num].start_col;
        erow = icon[icon_num].end_row;
        ecol = icon[icon_num].end_col;

        /* if it's the help icon then save the part of the existing screen */
        /* that will be under the icon  */
        if (key == 1)
           {
```

```
            icon[10].display_ptr =
                   readscrn((int)srow,(int)scol,(int)erow,(int)ecol,
                       &icon[10].free_ptr);
            icon[10].start_row = srow;
            icon[10].start_col = scol;
            icon[10].end_row   = erow;
            icon[10].end_col   = ecol;
            }

        /* display the icon  */
        movepc(smode,0x0101,header.ulrowcol,header.lrrowcol,
              icon[icon_num].display_ptr,scrseg);

        /* do not free the memory for the icon */
       }
else      /* the icon is already in memory  */
      {
       /* set the touch key definition */
        srow = icon[icon_num].start_row;
        scol = icon[icon_num].start_col;
        erow = icon[icon_num].end_row;
        ecol = icon[icon_num].end_col;
        /* if it's the help icon then save the part of the existing screen */
        /* that will be under the icon  */
        if (key == 1)
           {
            icon[10].display_ptr =
                   readscrn((int)srow,(int)scol,(int)erow,(int)ecol,
                               &icon[10].free_ptr);
            icon[10].start_row = srow;
            icon[10].start_col = scol;
            icon[10].end_row   = erow;
            icon[10].end_col   = ecol;
            }

        /* display the icon  */
        srowcol = byword(srow,scol);
        erowcol = byword(erow,ecol);
        movepc(smode,0x0101,srowcol,erowcol,
                     icon[icon_num].display_ptr,scrseg);

       /* do not free the icon memory */
      }

buf[0] = 0x02;     /* touch key command */

/* correct columns to base 80 */
if (smode == 4 || smode == 1 )
   {
    scol *= 2;
    ecol *= 2;
   }

buf[1] = key;     /* set up buffer for call to VISION to turn on a touch */
buf[2] = srow;    /* touch key  */
buf[3] = scol;
buf[4] = erow;
buf[5] = ecol;

devicewt(touch,buf,6);   /* turn on a touch key using the coordinates */
                                                      /* of the icon   */

tchbrch[key].tsrow = srow;    /* set tchbrch coordinates to be used for   */
tchbrch[key].tscol = scol;    /* touch acknowledgement  */
tchbrch[key].terow = erow;
tchbrch[key].tecol = ecol;

if (rmode)
   {
   cursor(18,1);
   printf("ICON KEY %d",key);
   }
```

```
waitpoll(TOUCH_DEVICE);

}

/*************************************************************************
        loadplyr()

        called with:
                nothing
        returns:
                VOID
        uses:
                devicewt()
                devicepl()
                devicerd()
                wrtstr()
                cursor()
                _exit()
                set_player()

        notes:

        history:
                01-22-86 rwp - add player 2 code
                             - delete the check of autoload.It's now being
                               done in cndcmain().
                01-22-86 rwp - add prompted load screen.
                             - take out player 2 call
                01-28-86 rwp - add player 2 call
                01-29-86 rwp - turn touch screen off
                01-31-86 rwp - modify to use loop_screen()
                             - can set_player() to load or unload
                02-05-86 rwp - use new wrtstr10()
                02-06-86 rwp - correct call to devicepl()
                02-10-86 rwp - reset player structure value for vdisc
                02-21-86 rwp - add waitpoll

*************************************************************************/


#include "view.h"
#include "vstruct.h"
#include "viewdata.h"
#include "task.h"

loadplyr()

{

if (vdisc1 > 0)
  {
   set_player(1,&vdisc1,1);
   player[0].vdisc = vdisc1;
  }

if (vdisc2 > 0)
   {
    set_player(2,&vdisc2,1);
    player[1].vdisc = vdisc2;

/*************************************************************************
        icon_process

        called with:
                nothing
        returns:
                VOID
        uses:
        notes:
```

```
        history:
                01-27-86 rwp - initial entry
                01-29-86 rwp - add clear_task() and block_process
                01-30-86 rwp - delete touch ackn
                01-31-86 rwp - modify to use findgoto()
                02-31-86 rwp - delete reset_time()
                03-03-86 rwp - use icontable structure

****************************************************************************/
#include "task.h"
#include "view.h"
#include "vstruct.h"
#include "viewdata.h"
#include "cmdnum.i"

char *cfree();

icon_process()

{
int key_num;

key_num = touch_key_buff[touch_key_buff[0]];

if (touch_key_buff[0])
    touch_key_buff[0]--;

tchbrch[key_num].tcount++;                      /* increment touch key counter */
/* t_action(tchbrch[key_num].k_action,key_num);*/ /* acknowledgement */

/* execute the icon process for this key */
icon_branch(key_num,tchbrch[key_num].tbrhcode,tchbrch[key_num].tchbrnch);

clear_task(ICON_KEY_TSK);

}

/****************************************************************************
        icon_branch()

        called with:
                int key_num;
                int touch_code;
                char *branch_label;

        returns:
                 none

        uses:
        notes:
        history:
                01-27-86 rwp - initial entry
                01-30-86 rwp - correct switch variable
                01-31-86 rwp - modify to use findgoto()
                02-03-86 rwp - delete pcounter increment after findgoto() call
                02-05-86 rwp - block COMMAND_PROCESS if help icon pressed
                02-10-86 rwp - delete signal of COMMAND_PROCESS after resume()
                             - translate key numbers
                02-12-86 rwp - add icon_off()
                02-25-86 rwp - add signal_process(ICON_KEY_PROCESS) to 51

****************************************************************************/

icon_branch(key,touch_code,branch_label)
     int key;
     int touch_code;
     char *branch_label;
{
int i;
char *readscrn();
static char *scrn_display;
```

```
static char *scrn_mem_free;
int srow = 1;
int scol = 1;
int erow = 25;
int ecol = 80;

if (smode == 4 || smode == 1)
    ecol = 40;


switch(key + 50)
      {
        case 51:      /* help icon  */
             stopvid();

             /* display the part of the screen that the help icon covers */
             /* writscrn(icon[10].start_row,icon[10].start_col,icon[10].end_row,
                        icon[10].end_col,icon[10].display_ptr);  */

             /* save the entire screen before displaying other icons */
             scrn_display = readscrn(srow,scol,erow,ecol,&scrn_mem_free);
              clrtouch();   /* turn touch screen off but keep key definitions */
              key25on(10);  /* turn on resume first */

              /* display all other icons if they are enabled */
              for (i=2;i<10;i++)
                  {
                   if (tchbrch[i].tbrhcode)
                        key25on(i);
                  }
              signal_process(ICON_KEY_PROCESS);
              block_process(COMMAND_PROCESS);
              break;
       case 52:         /* replay -goto start of the event */
              stopvid();
              touchoff();   /* clear key definitions */
              clrtouch();                           /* turn touch off */
              tchbrch[1].tbrhcode = 0;            /* turn sys branch off */
              pcounter = evttable[cur_evt].evalue;
              waitstat = 0;
              player[cur_play].status &= ~AUTOPLAY;

              scrn_mem_free = cfree(scrn_mem_free);
              clear_task(ICON_KEY_TSK);
              block_process(ICON_KEY_PROCESS);
              signal_process(COMMAND_PROCESS);
              break;
       case 53:         /* jump1 */
       case 54:         /* jump2 */
       case 56:         /* jump 3 */
       case 55:         /* goodbye event */
             clear_task(ICON_KEY_TSK);
             block_process(ICON_KEY_PROCESS);
             signal_process(COMMAND_PROCESS);
             stopvid();
             touchoff();
             clrtouch();
             tchbrch[1].tbrhcode = 0;
             findgoto(tchbrch[key].tchbrnch);
             targetic = 0;
             waitstat = 0;
             player[cur_play].status &= ~AUTOPLAY;
             scrn_mem_free = cfree(scrn_mem_free);
             break;
      case 60:          /* resume after a stop command */
             /* switched with key 56 */

             /* redisplay the entire screen with just the help icon */
             writscrn(srow,scol,erow,ecol,scrn_display);
```

```
          scrn_mem_free = cfree(scrn_mem_free);
          clrtouch();
          icon_off();   /* set icon definitions to zero */
          tch_on(0);    /* turn touch keys on */
          resume();
          clear_task(ICON_KEY_TSK);
          block_process(ICON_KEY_PROCESS);
          break;
     case 57:        /* slow back */
          playfrom(1);
          break;
     case 58:        /* slow forward */
          playfrom(0);
          break;
     case 59:        /* stop */
          stopvid();
          break;

     }    /* end switch */

}


/*****************************************************************************
icon_off()
*****************************************************************************/

icon_off()

{

int i;

for (i = 2; i<=10;i++)
     {
     tchbrch[i].tsrow = 0;
     }

}


/*****************************************************************************

        initvid()

        called with:
                nothing
        returns:
                VOID
        uses:
               ibfind()
               finderr()
        notes:

        history:
               01-22-86 rwp - initial description
                            - add call for video 2 player
               01-28-86 rwp - add assignments to device_var[]
                            - add include for task.h
*****************************************************************************/


#include "view.h"
#include "vstruct.h"
#include "viewdata.h"
#include "task.h"

extern int iberr;

initvid()

{
```

```
adapter = ibfind("gpib0");
if (adapter < 0) finderr();

video = ibfind("video");
if (video < 0) finderr();

speech = ibfind("speech");
if(speech < 0 ) finderr();

touch = ibfind("touch");
if (touch < 0 ) finderr();

vdisc1 = ibfind("vdisc1");
if (vdisc1 < 0 ) finderr();

vdisc2 = ibfind("vdisc2");

player[0].vdisc = vdisc1;
player[1].vdisc = vdisc2;

device_var[TOUCH_DEVICE] = touch;
device_var[VDIS1_DEVICE] = vdisc1;
device_var[VDIS2_DEVICE] = vdisc2;
device_var[VIDEO_DEVICE] = video;
device_var[SPEAK_DEVICE] = speech;

}


finderr()

{

printf("\Error %d\n",iberr);

}

   }

/* turn touch screen off */

ddbuf[0] = 0x01;
ddbuf[1] = 0x00;

devicewt(touch,ddbuf,2);
waitpoll(TOUCH_DEVICE);


}

/***************************************************************************

set_player

***************************************************************************/

set_player(player_number,player_code,on_code)
     int player_number;
     int *player_code;
     int on_code;

{
int done = FALSE;
char errnum;
char polbuf[4];

/* reset */
ddbuf[0] = 0x00;
devicewt(*player_code,ddbuf,1);
if (player number == 1)
```

```
    waitpoll(VDIS1_DEVICE);
else
    waitpoll(VDIS2_DEVICE);

ddbuf[2] = 0;

/* get player status */
ddbuf[0] = 0x0C;
devicewt(*player_code,ddbuf,1);

ddbuf[1] = 255;
ddbuf[2] = 0;

if (player_number == 1)
    waitpoll(VDIS1_DEVICE);
else
    waitpoll(VDIS2_DEVICE);

/* if already loaded and trying to load */
if ((ddbuf[2] & 0x20) && on_code == 1)
    return;

/* if already unloaded and trying to unload */
if ((ddbuf[2] & 0x40) && on_code == 0)
   return;

/* if player off or there was an error  */
if (ddbuf[2] & 0x80 || ddbuf[1] != 0)
   {
   *player_code = -1;
   return;
   }

loop_screen("VDISC80");

done = FALSE;
errnum = 0;
while (!done)
      {
        ddbuf[0] = 0x01;
        if (on_code)
            ddbuf[1] = 0x01;   /* load */
        else
            ddbuf[1] = 0x00;   /* unload */

        devicewt(*player_code,ddbuf,2);
        pollnum = 0;

        if (player_number == 1)
            waitpoll(VDIS1_DEVICE);
        else
            waitpoll(VDIS2_DEVICE);

         /* check response to make sure it's loaded or unloaded */
        if (ddbuf[1]== 0)
            done = TRUE;
        else
            errnum++;
        if (errnum > 5000)
           {
            if (on_code)
               wrtstr10("PLAYER NOT LOADED !!",4,1,1);
            else
               wrtstr10("PLAYER NOT UNLOADED !!",4,1,1);
            _exit(0);
            }
        }
}

/**********************************************************************
        log file routines
```

```
called with:

returns:

uses:

notes:
        ERROR CODES                           CALLED IN FUNCTION
        -1      Initialize log file           presdata()
        0       write new header              end_conductor()
        1       Begin presentation            presdata()
        2       Change event                  jump_branch()
        3       valid touch                   get_tch()
        4       keyboard input                get_key()
        5       execute user program          userproc()
        6       log indicators                ????
        7       restore directory             ????
        8       enter a loop event            findgoto()
        9       return from loop evt          findgoto()
        83      error loading screen          putgtabl()
        84      event not found               jump_branch()
        85      unknown command               ?
        86      wrong screen type             ?
        87      loop evt underflow            ?
        88      empty execute queue           ?
        89      GPIB error                    ?
        97      invalid touch                 get_tch()
        113     wrong index type

history:
        02-13-86 rwp - start with J.W. 's routines
                     - change function name to log_message()
                     - add conv_flt() to file
        02-22-86 rwp - add return
        03-03-86 rwp - remove return
                     - correct time

*****************************************************************************/

#include "fcntl.h"
#include "view.h"
#include "vstruct.h"
#include "viewdata.h"

float conv_flt();

int log_message(errnr, errstrg)
      int errnr;
      char *errstrg;
{

static int inited;
static int nr_logs;
static int max_logs;
float gettime();

static struct hdr
     {
     int nr;
     int maxerr;
     float htime;
     char hmsg[8];
     } err_hdr;

struct log
   {
   int errnr;
   int date;
   float time;
   char msg[8];
   } err_log;
```

```
/* reading the header info after opening file */
if (errnr < 0)
   {
   lseek(lognum, 0L, 0);
   if (!read(lognum, (char *) &err_hdr, sizeof (err_hdr)))
      {
        err_hdr.nr = 1;
        err_hdr.maxerr = 1000;
        err_hdr.htime = gettime();
        err_hdr.htime = conv_flt(err_hdr.htime, 1);
        movmem(errstrg, err_hdr.hmsg, 8);
        }
   }
/* if a valid error number */
if (errnr > 0)
   {
   err_log.errnr = errnr;
   err_log.date = getdate();
   err_log.time = gettime();
   err_log.time = conv_flt(err_log.time, 1);
   movmem(errstrg, err_log.msg, 8);
   lseek(lognum, (long) (err_hdr.nr * sizeof (err_log)), 0);
   write(lognum, (char *) &err_log, sizeof (err_log));
   if (++err_hdr.nr > err_hdr.maxerr)
      err_hdr.nr = 1;
   }
else    /* if 0 or a negative error number  */
   {
    lseek(lognum, 0L, 0);
    write(lognum, (char *) &err_hdr, sizeof (err_hdr));
    }
}

/************************************************************/
/*datetime- general date and time routines*/
/************************************************************/
#include "DOS.H"

union REGS registers_in;
union REGS registers_out;

/************************************************************/
/*gettime - con time from dos and convert to long*/
/************************************************************/

float gettime()
{
int hours;
int mins;
int secs;
int hsecs;
float hrs_mins_secs;

registers_in.h.ah = 0x2C;

/* Interrupt 0x21 is the DOS FUNCTION REQUEST */

int86(0x21, &registers_in, &registers_out);
hours = registers_out.x.cx >> 8;
mins = registers_out.x.cx << 8;
mins = mins >> 8;
secs = registers_out.x.dx >> 8;
hsecs = registers_out.x.dx << 8;
hsecs = hsecs >> 8;

hrs_mins_secs = (hours * 3600L) + (mins * 60) + secs;

/* to show hundreds of seconds */
/* hrs_mins_secs = (mins * 3600L) + (secs * 60) + hsecs; */
return (hrs_mins_secs);
}
```

```
/**************************************************************/
/*getdate - get date from dos and convert to integer*/
/**************************************************************/

int getdate()
{
int year;
int month;
int day;
int md;

registers_in.h.ah = 0x2A;

/* Interrupt 0x21 is the DOS FUNCTION REQUEST */

int86(0x21, &registers_in, &registers_out);
year = registers_out.x.cx;
month = registers_out.x.dx >> 8;
day = registers_out.x.dx << 8;
day = day >> 8;
md = (month * 32) + day;
return (md);
}


/**************************************************************/
/*      conv_flt - routine to convert c and basic floating points       */
/*              returns converted floating point number        */
/**************************************************************/
float conv_flt(float_nr,ftype)
         float float_nr;                  /*floating point number to convert*/
         int ftype;               /*type of floating point 0=basic, !0=c*/
        {
        float xfloat;
        float rfloat;

        struct cflt
        {
        int cmant2;
        unsigned csign : 1;
        unsigned cexpo : 8;
        unsigned cmant1 : 7;
        }*cfloat;

        struct bflt
        {
        int bmant2;
        unsigned bexpo : 8;
        unsigned bsign : 1;
        unsigned bmant1 : 7;
        }*bfloat;

        xfloat=float_nr;
        if (ftype==1)
/* convert c float to basic float */
                {
                cfloat=(struct cflt *)&xfloat;
                bfloat=(struct bflt *)&rfloat;
                bfloat->bsign=cfloat->csign;
                bfloat->bexpo=cfloat->cexpo;
                if (bfloat->bexpo != 0)
                        bfloat->bexpo=bfloat->bexpo + 2;
                bfloat->bmant1=cfloat->cmant1;
                bfloat->bmant2=cfloat->cmant2;
                }
        else
           /* convert basic float to c float */
                {
                bfloat=(struct bflt *)&xfloat;
                cfloat=(struct cflt *)&rfloat;
                cfloat->csign=bfloat->bsign;
                cfloat->cexpo=bfloat->bexpo;
```

```
        if (cfloat->cexpo != 0)
                cfloat->cexpo=cfloat->cexpo - 2;
        cfloat->cmant1=bfloat->bmant1;
        cfloat->cmant2=bfloat->bmant2;
        }
    return(rfloat);
    }

/*******************************************************************************
next_op

finds the beginning of the next operand

*******************************************************************************/

#include "view.h"

extern char *scan_ptr;


next_op()

{
/* skip white space */

while ( (*scan_ptr == ' ') || (*scan_ptr == ',') )
      scan_ptr++;

/*
if ( (*scan_ptr == '\n') || (*scan_ptr == ')') || (*scan_ptr == '\0') )
    return(TRUE);                       /* the end of the line */

else
     return(FALSE);                     /* not the end of the line */

*/
}

/*******************************************************************************
  nstring  accepts string input
*******************************************************************************/

#include "\viewc\view.h"
#include "\viewc\vstruct.h"
#include "\viewc\viewdata.h"

#include "ctype.h"

nstring(string,rcode,max_size,str_type,att,echo)
char *string;
int *rcode;
int max_size;
char str_type;
int att;
char echo;

{
     int key;
     int indx=0;
     int done=FALSE;
     int valid;
     int f_switch;
     unsigned rowcol;

     f_switch = (max_size <0) ? 0:1;
     max_size = (max_size <0) ? -max_size:max_size;
     while (!done)
         {
          key=getch();
          switch (key)
               {
```

```
case '\0':          /* if extended key get next part */
   key=getch();
   switch (key)
   {
    case F1:
    case F2:
    case F3:
    case F4:
    case F5:
    case F6:
    case F7:
    case F8:
    case F9:
    case F10:
    case ALTF9:
    case ALTF10:
    case CURS_UP:
    case CURS_DOWN:
    case CURS_LEFT:
    case CURS_RIGHT:
    case PAGE_UP:
    case PAGE_DOWN:
    case HOME:
    case END:
    case INSERT:
    case DELETE:
         if (f_switch == 1)
             {
              *rcode=key;
              done=TRUE;
             }
         else
              {
               /* beep */ ;
              }
         break;
   }
   break;
case CR:
case ESC:
     *rcode=key;
     done=TRUE;
     break;

case BACKSPACE:          /* on backspace */
     if (indx > 0)
            {
             *(string + indx--) = '\0';
            if (echo)
                 {
                  putch(8);
                  wrtch10(32,att);
                  putch(8);
                  }
            }
     break;

default:

     switch(str_type)
            {
             case ANYKEY:
                  valid = (isascii(key) &&
                             key != 0) ? 1 : 0;
                  break;
             case ALPHA:
                  valid = (isalnum(key) ||
                             key == '.'   ||
                             key == ' '   ||
                             key == '-') ? 1 : 0;
                  break;
             case NUMERIC:
```

```
                    valid = (isdigit(key) ||
                             key == '-' ) ? 1 : 0 ;
                    break;
                case INTEGER:
                    valid = (isdigit(key) ||
                             key == '-') ? 1 : 0;
                    break;
                case Y_OR_N:
                   valid = (key == 'y' || key == 'Y'
                               || key == 'n'
                               || key == 'N') ? 1 : 0;
                    key = toupper(key);
                    break;
                }
            if (valid)
               {
                 if (indx < max_size)
                  {
                  *( string + indx++) = key;
                   if (echo)
                      {
                       rowcol = byword(cur_row,cur_col);
                       wrtch10(key,att);
                       if (smode >3)
                          {
                           gcursor(rowcol);
                           rowcol = byword(cur_row,cur_col++);
                           gcursor(rowcol);
                          }
                      }
                  }
               else
                   {
                    /* thump */ ;
                   }
               }
            else
              /*  beep */;
            break;
        }
    }
    *(string + indx)='\0';
}

/***************************************************************************

        playfrom ()  - controls slow back and slow forward

        called with:
                char num;      /* 0 forward   , 1 back   ,2 normal speed */
        returns:

        uses:

        notes:

        history:
                01-29-86 rwp - add player 2 support
                03-03-86 rwp - make slow 20% instead of 50%

***************************************************************************/


#include "view.h"
#include "vstruct.h"
#include "viewdata.h"
#include "task.h"

playfrom(num)
   char num;      /* 0 forward   , 1 back   ,2 normal speed */
```

```
{
char cnt;

stopvid();

    ddbuf[0] = 0x03;
    ddbuf[3] = hibyte(player[cur_play].endfrm);
    ddbuf[4] = lobyte(player[cur_play].endfrm);

if (num == 2)
    cnt = 5;      /* full speed */
else
   {
    ddbuf[5] = 0x14;       /* 20 % speed */
    cnt = 6;
    }

if (num == 1)      /* back */
    {

    if (player[cur_play].startfrm < player[cur_play].endfrm)
       {
        ddbuf[1] = 0xff;
        ddbuf[2] = 0xff;
        ddbuf[3] = hibyte(player[cur_play].startfrm);
        ddbuf[4] = lobyte(player[cur_play].startfrm);
        }
    else
        {

         ddbuf[1] = 0x00;
         ddbuf[2] = 0x00;
         }
    }
else        /* forward  0 and 2 */
    {
    if (player[cur_play].startfrm < player[cur_play].endfrm)
       {
        ddbuf[1] = 0x00;
        ddbuf[2] = 0x00;
        }
    else
        {
        ddbuf[1] = 0x00;
        ddbuf[2] = 0x00;
        ddbuf[3] = hibyte(player[cur_play].startfrm);
        ddbuf[4] = lobyte(player[cur_play].startfrm);

        }
    }

devicewt(player[cur_play].vdisc,ddbuf,cnt);

intlace(0x01);    /* interlace mode */

}

/*****************************************************************************************

        presdata()  - reads the presentation option data

        called with:
              nothing
        returns:
              VOID
        uses:
            is_yes()
            byword() - macros

        notes:
            - Reads the 1st, 2nd and 3rd record of the event file to set the
              presentation options.
```

```
           - Reads the second record of the literal file to get the icon
             names.
           - Does not currently check for the correct version number
           - Sets sysclear based on syscolor
           - Sets grpcolor based on syscolor


       history:
               01-21-86 rwp - initial breakout from mainint
               01-23-86 rwp - trim blanks off icon names.
               02-05-86 rwp - use is_yes() for sys_brch
                            - add check of the version number
               02-13-86 rwp - add initialization of log file
                              add log message for start of presentation
               02-14-86 rwp - add check of autotime
               02-21-86 rwp - correct to read start event if length == 8
               03-03-86 rwp - use icontable structure
               03-10-86 rwp - set playlast

*****************************************************************************/
#include "fcntl.h"
#include "view.h"
#include "vstruct.h"
#include "viewdata.h"
#include "task.h"

char is_yes();

presdata()

{
char buf[66];
char *cmalloc();
unsigned  i,j;
double nd;
double floor();
int str_len;
int hours,mins,secs;

lseek (cntlnum, 0L, 0);           /* read first record       */
read (cntlnum,buf,64);            /* read in name             */
if (chk_flag == 0)
   {
   chk_flag = is_yes(buf[0]);
   sys_ind = byword(buf[31],buf[30]);
   }

dbugflag = is_yes(buf[1]);
logflag = is_yes(buf[2]);
stccpy(strt_evt,&buf[3],9);
trim_end(strt_evt);
strt_num = byword(buf[12],buf[11]);
max_time = byword(buf[14],buf[13]);
autoload = is_yes(buf[15]);
syscolor = buf[16];

stccpy(end_evt,&buf[17],9);
trim_end(end_evt);
stage = is_yes(buf[25]);
goodbeep = is_yes(buf[26]);
badbeep = is_yes(buf[27]);
tchstate = 0x02;    /* key mode */
if (goodbeep)
    tchstate |= 0x80;
if (badbeep)
    tchstate |= 0x40;

/* set playlast for player one */
playlast = 0xFE;
```

```
version = byword(buf[29],buf[28]);

/*  check for correct version number */
if.(buf[29] < 127)
    {
     printf("\nThe PLAY FROM/TO Command is not in the correct format.");
     _exit(0);
    }

sys_brch = is_yes(buf[32]);
stccpy(autoevt,&buf[33],9);
trim_end(autoevt);


stccpy(autotime,&buf[41],9);
hours = atoi(&buf[41]);
mins = atoi(&buf[44]);
secs = atoi(&buf[47]);

if (strlen(autoevt) > 2 )
   {
   signal_process(AUTO_TIME_PROCESS);
   signal_task(AUTO_TIME_TSK);
   target_time = (hours * 3600L) + (mins * 60) + secs;
   }
   max_mode = buf[49];
   if (max_mode == 32)
       max_mode = 14;

   j = 1;
   for (i = 1; i <= (syscolor & 15); i++)
       {
        if (i < 15)
           j *= 2;
        else
           j = 0x8000;
       }
   sysclear = ~j;

   grpcolor =  (syscolor & 7)/2;


   if (grpcolor == 0)
       grpcolor = 3;

   grpmask = 1;

   for (i = 1; i <= grpcolor; i++)
        grpmask *= 4;              /* 4 , 16, or 64 */

   lseek (cntlnum, 64L, 0);          /* read second record        */
   read (cntlnum,buf,64);            /* read in name              */

   sysfeed = buf[2];

   lseek (cntlnum, 128L, 0);                 /* read third record        */
   read (cntlnum,buf,64);            /* read in name              */

   tchfeed = buf[0];

   /* read literal file  */
   lseek(litnum,80L,0);
   read(litnum,buf,80);

   stccpy(icon[0].icon_name,buf + 24,7);
   stccpy(icon[1].icon_name,buf +  6,7);
   stccpy(icon[2].icon_name,buf + 12,7);
   stccpy(icon[3].icon_name,buf + 18,7);
   stccpy(icon[4].icon_name,buf + 69,7);
   stccpy(icon[5].icon_name,buf + 63,7);
   stccpy(icon[6].icon_name,buf + 36,7);
```

```
   stccpy(icon[7].icon_name,buf + 48,7);
   stccpy(icon[8].icon_name,buf + 42,7);
   stccpy(icon[9].icon_name,buf + 30,7);

   /* trim the blanks off the end */
   for (i = 0; i<=9; i++)
       {
       trim_end(icon[i].icon_name);
       }
/* initialize the log file */
log_message(-1,"   ");
/* send begin presentation */
log_message(1,pres_name);
}

/*****************************************************************************
is_yes()

determines if the character is 'Y'.
returns 1 if it is 'Y' else returns 0.

*****************************************************************************/

char is_yes(character)
  char character;

{
if (character == 'Y')
    return(1);
else
    return(0);
}

/****************************************************************************
        exe_loop()         - process loop

        called with:

        returns:
                none

        uses:
        notes:
             replaces exe_loop() and gettask()
        history:
                01-27-86 rwp - initial entry
                01-29-86 rwp - add touch_process() and icon_process()
                             - put dummy user_input() ,debug_process()
                             - change time_up() to chktime()
                             - delete frame_passed() and segment_ended()
                             - change name of function to exe_loop()
                01-30-86 rwp - delete return from do_cmd()
                             - add check for end of command tokens

                             - change wait_process for user_input(TCHBOARD)
                             - delete dummy user_input

                02-06-86 rwp - delete dummy debug_proc()
                             - move debug_proc() to beginning
                02-11-86 rwp - look at only DEBUG_PROCESS
                02-12-86 rwp - move debug_proc() to end
                02-14-86 rwp - add auto_event()

****************************************************************************/


#include "task.h"
#include "view.h"
#include "vstruct.h"
#include "viewdata.h"
```

```
exe_loop()

{
int poll_device;
int done = FALSE;
static char buf[20];
long time_chg;
long tictime();

while (!done)
      {
        /* poll to see if there is a response from Vision */
        poll_device = vision_poll(0);

        /* if there is a response call vision process */
        if (poll_device)
             {
              vision_process(poll_device);
             }
        /* check for keyboard hit */
        if (kbhit())
           {
           get_kb_key();             /* get key and put into key buffer */
           }

        /* see if command keys have been pressed  */
        if (wait_process(COMMAND_KEY_TSK,COMMAND_KEY_PROCESS))
           {
           done = command_key_process();
           }


        /* check for valid key touched and touch process awake */
        if (wait_process(REGULAR_KEY_TSK,REGULAR_KEY_PROCESS))
           {
           touch_process();
           }

        /* next check for icon key and icon process awake  */
        else if (wait_process(ICON_KEY_TSK,ICON_KEY_PROCESS))
                {
                icon_process();
                }

        /* next check for keyboard touch and input process awake  */
        else if (wait_process(KEYBOARD_TSK,KEY_IN_PROCESS))
                {
                 user_input(KEYBOARD_TSK);
                }

        /* next check for touchbroad and the input process awake  */
        else if (wait_process(TCHBOARD_TSK,TCHBOARD_PROCESS))
                {
                 user_input(TCHBOARD_TSK);
                }

        /* next check for waiting time expired   */
        else if (wait_process(TIMEWAIT_TSK,TIME_UP_PROCESS))
                {
                 chktime();
                }

        /* next check for display of second attribute */
        if (wait_process(SECOND_ATTR_TSK,SECOND_ATTR_PROCESS))
                {
                putvar_second();
                }

        /* add autotime event here */
        if (wait_process(AUTO_TIME_TSK,AUTO_TIME_PROCESS))
           {
           auto_event();
           }
```

```
        /* next check for command execution process awake  */
        /* this is tried on each cycle                     */

        if (wait_process(COMMAND_TSK,COMMAND_PROCESS))
           {
            /* if not pass end of tokens */
            if (pcounter < tokenptr)
                do_cmd();
            else
                done = TRUE;
            }

        /* see if debugging is awake */
        if (process_var[DEBUG_PROCESS])
           {
           debug_process();
           }

         clear_task(ANY_WAIT_TSK);

    }   /* end of while(!done ) */

}

/*********************************************************************************
prttoken
*********************************************************************************/

#include "view.h"
#include "vstruct.h"
#include "viewdata.h"


prttoken()

{
int i;
char *newptr;
int j;

/*********
printf("\nNUMERIC TABLE\n");
for (i=0; i< numindex;i++)
    {
     printf("%2d  ",i);
     if (numtable[i].nname == 0)
         printf("CONSTANT ");
     else
         {
          printf("%8s",numtable[i].nname);
          }
     printf("  %u\n",numtable[i].nvalue);

    }

printf("BYTE TABLE\n");
for (i=0; i< bytindex;i++)
    {
     printf("%2d  ",i);
     if (byttable[i].bname == 0)
         printf("CONSTANT ");
     else
         {
          printf("%8s",byttable[i].bname);
          }
     printf("  %d\n",byttable[i].bvalue);

    }

printf("STRING TABLE\n");
```

```
for (i=0; i< strindex;i++)
     {
      newptr = strtable[i].svalue;
      printf("%2d  ",i);
      if (strtable[i].sname == 0)
          printf("CONSTANT ");
      else
         {
          printf("[%s]",strtable[i].sname);
         }
     while (*newptr)
           {
            if (*newptr < 32)
                printf("[%d]",*newptr++);
            else
                printf("%c",*newptr++);
            }
       printf("\n");
       }

printf("SCREEN TABLE\n");

for (i=1; i<= gphindex;i++)
     {
      printf("%2d  ",i);
      printf("[%s] %6u %81d",gphtable[i].gname,gphtable[i].gsize,
              gphtable[i].position);
      printf("\n");
      }
******/

printf("TOUCH TABLE\n");

for (i=1; i<= 50;i++)
     {
          printf("%2d  ",i);
          printf("Touch Code: %6d Branch: [%s]",tchbrch[i].tbrhcode,
                 tchbrch[i].tchbrnch);
          printf("\n");
      }

/*****
printf("MATCH STRING TABLE\n");

for (i=0; i<=matchnum;i++)
     {
      printf("%2d  ",i);
      printf("Match Code: %6d Branch: [%s] Match String [%s]",
             strbrch[i].sbrhcode,strbrch[i].strbrnch,strbrch[i].strmatch);
      printf("\n");
      }

***/

printf("EVENT TABLE\n");

for (i=0; i< evtindex;i++)
     {
     j = evttable[i].evalue - tkstart;
      printf("\n%2d [%s]  file = %2u  memory = %2u",
             i,evttable[i].ename,evttable[i].fileindx,j);
     }
printf("\n %d TOKENS => ",tokenptr-tkstart);
for (newptr = tkstart; newptr<tokenptr; newptr++)
     {
     i = *newptr;
     printf("%d,",i);
     }

}
```

```
/*****************************************************************************
        prt_cmd - displays the command with operands

        called with:

        returns:

        uses:

        notes:

        history:
                02-04-86 rwp - add ASSIGN_NUM
                             - add ASSIGN_ALL

*****************************************************************************/


#include "view.h"
#include "vstruct.h"
#include "viewdata.h"
#include "cmdnum.i"

extern struct cmd cmds[];

prt_cmd()

{
char operator;
int i;

opmax = 0;


while (pcounter < tokenptr)
      {
      for (i = 0;i<evtindex;i++)
         {
         if (pcounter == evttable[i].evalue)
              break;
          }
      if (i <evtindex)
           printf("\n%s",evttable[i].ename);
      i = 0;
      while (*pcounter < 128)                    /* stack the operands */
             {
              index_stack[i++] = *pcounter;
              pcounter++;
             }

       operator = (*pcounter) - 128;
       unstack(operator);                        /* unstack the operands */
       prt_all(operator);                        /* print the command    */
       pcounter++;                               /* increment program counter */
       opmax = 0;
      }
}
/**
prt_all
*****************************************************************************/

prt_all(cmdnum)
  char cmdnum;

{

char bytcnt;
char numcnt;
char strcnt;
```

```
int i;
char *new_ptr;
double calc_num;

bytcnt = 0;
numcnt = 0;
strcnt = 0;
for (i = 0;i<maxcmds;i++)
    {
     if (cmdnum == cmds[i].cmdtoken)
         break;
     }
printf("\n%s (",cmds[i].cname);
for (i = 0; i < cmdline[cmdnum].varmax; i++)
    {
     switch(cmdline[cmdnum].varcode[i])
           {
            case 0:     /* byte    */
                 printf("%d",byt_op[bytcnt++]);
                 break;
            case 1:     /* unsigned */
                 if (cmdnum == PUTSCRN1 && i == 7)
                     {
                      printf("%s",gphtable[num_op[numcnt++]].gname);
                      }
                 else
                      {
                       printf("%u",num_op[numcnt++]);
                      }
                 break;
           case 2:     /* buffer  */
                 new_ptr = str_op[strcnt];

                 if (cmdnum == ALL_CALC || cmdnum == ASSIGN_NUM)
                        {
                        if (*str_op[strcnt] == 0)
                           {
                           calc_num = *(double *)str_op[strcnt];
                           printf("%8.0f",calc_num);
                           strcnt++;
                           }
                         else
                           printf("%s",str_op[strcnt++]);
                        }
                 else
                      {
                 while (*new_ptr)
                          {
                      if (cmdnum == SYSBRCH &&
                            ( *new_ptr >50 && *new_ptr < 61) )
                          printf("[%d]",*new_ptr);
                      else if (cmdnum == PAUSEBRH &&
                            ( *new_ptr >50 && *new_ptr < 61) )
                          printf("[%d]",*new_ptr);

                      else if ((*new_ptr < 32 || *new_ptr > 125)
                                || cmdnum == DFNTOUCH )
                              printf("[%d]",*new_ptr);
                         else
                              printf("%c",*new_ptr);
                          new_ptr++;
                         }
                 strcnt++;
                 }
                 break;
           default:
                 if (cmdnum != ASSIGN_NUM && cmdnum != ASSIGN_STR &&
                       cmdnum != ASSIGN_ALL)
                      printf("%s",str_op[strcnt++]);
                 else if (cmdnum == ASSIGN_NUM)
                         {
```

```
                if (*str_op[strcnt] == 0)
                   {
                   calc_num = *(double *)str_op[strcnt];
                   printf("%8.0f",calc_num);
                   strcnt++;
                   }
                 else
                   printf("%s",str_op[strcnt++]);
                }

            else
                {
                new_ptr = str_op[strcnt];
                while (*new_ptr)
                   {
                   if (*new_ptr < 33 || *new_ptr > 125) -
                       printf("[%d]",*new_ptr);
                   else
                       printf("%c",*new_ptr);
                    new_ptr++;
                    }
               strcnt++;
               }
            break;
         }
   if (i <  cmdline[cmdnum].varmax-1)
      printf(",");
   }
      printf(")");

      if (cmdnum == NEXTEVT)
          printf("\n");
      }
/****************************************************************************
        putbtabl - puts an entry into the byte table

        called with:

        returns:

        uses:

        notes:

        history:
                02-28-86 rwp - initial entry

****************************************************************************/


#include "view.h"
#include "vstruct.h"
#include "viewdata.h"

putbtabl(num)
  unsigned num;

{
int i = 0;                 /* counter */
int done = FALSE;

i = -1;
while (!done)
      {
      i++;
      if (byttable[i].bname == 0)   /* if constant */
          if( byttable[i].bvalue == num )
             done = TRUE;                /* constant in table */
      if( i == bytindex)               /* not in table */
        {
```

```
        if (bytindex > 500)
           {
           printf("\nBYTE TABLE OVERFLOW !!");
           _exit(0);
           }
        byttable[i].bname = 0;
        byttable[i].bvalue = num;
        bytindex++;
        done = TRUE;
       }
     }

  return(i);

  }
  /*****************************************************************************

        putntabl()     puts an unsigned constant into the graphic table

        called with:

        returns:

        uses:

        notes:

        history:
                01-21-86 rwp - test new library format
                02-05-86 rwp - take out 500 limit on file numbers
                02-14-86 rwp - return 1 instead of exiting on error
                             - add log_message
                             - add trim_end of graph name

 *****************************************************************************/

 #include "view.h"
 #include "vstruct.h"
 #include "viewdata.h"


 putgtabl(gname)
   char *gname;

 {
 int i = 0;                 /* counter */
 int done = FALSE;
 char *newptr;
 int j;
 char newname[10];
 char len;

 strcpy(newname,gname);
 trim_end(newname);

 i = gphfind(newname,gphindex);

 if (i < 1 )
    {
     log_message(83,newname);
     printf("\nERROR: COULD NOT FIND THE GRAPHIC [%s]",newname);
     return(1);
    }

 return(i);
 }
 /*****************************************************************************
 putntabl - puts a constant in the num table

 *****************************************************************************/
```

```
#include "view.h"
#include "vstruct.h"
#include "viewdata.h"

putntabl(num)
  unsigned num;

{
int i = 0;              /* counter */
int done = FALSE;

i = -1;
while (!done)
     {
     i++;
     if (numtable[i].nname == 0)    /* if constant */
         if( numtable[i].nvalue == num )
            done = TRUE;                    /* constant in table */
     if( i == numindex)                 /* not in table */
       {
        if (numindex > 500)
           {
           printf("\nNUMERIC TABLE OVERFLOW !!");
           _exit(0);
           }
        numtable[i].nname = 0;
        numtable[i].nvalue = num;
        numindex++;
        done = TRUE;
       }
    }
return(i);
}
/*****************************************************************************
          putstabl - puts a string into the string table

        called with:
                pointer to string
                the string length

        returns:
                the string table offset
        uses:

        notes:

        history:
                02-03-86 rwp - initial entry
                02-28-86 rwp - limit to 500
                03-10-86 rwp - do not look for duplicates

*****************************************************************************/

#include "view.h"
#include "vstruct.h"
#include "viewdata.h"

char *cmalloc();

putstabl(str_ptr,str_length)
  char *str_ptr;
  int str_length;

{
int i = 0;              /* counter */
int done = FALSE;
char str_buffer[300];

movmem(str_ptr,str_buffer,str_length);
str_buffer[str_length] = '\0';
```

```
i =-1;
while (!done)
      {
/*****
        i++;
        /* if this is a constant in the table */
        if (strtable[i].sname == 0)    /* if constant */
           {
            /* compare the strings */
            if( strcmp(strtable[i].svalue,str_buffer) == 0 )
                        done = TRUE;
           }
*****/
        i = strindex;
        /* if the string is not already in the table */
        if( i == strindex)
          {
           /* if the table is full */
           if (strindex > 500)
              {
               printf("\nSTRING TABLE OVERFLOW !!");
               _exit(0);
              }
           /* this is a constant */
           strtable[i].sname = 0;

           /* allocate memory for the string */
           strtable[i].svalue = cmalloc((unsigned)str_length + 1);

           /* move the string to the allocated space */
           movmem(str_buffer,strtable[i].svalue,(unsigned)str_length+1);
           strindex++;
           done = TRUE;
          }
      }

return(i);

}
/*****************************************************************************
        puttoken - puts the token into the command stream

        called with:

        returns:

        uses:

        notes:

        history:
                02-03-86 rwp - add ASSIGN_ALL
                02-04-86 rwp - delete ASSIGN_ALL to test
                             - add ASSIGN_ALL
                02-06-86 rwp - add calc defines
                02-28-86 rwp - modify to accomodate more than 128 tokens
                             - make token an int instead of a char

*****************************************************************************/

#include "view.h"
#include "task.h"
#include "cmdnum.i"
#include "vstruct.h"
#include "viewdata.h"

puttoken(num,token)
 int num;
 int token;
{
static char mask[3];
```

```
static char tstack[40];
static int tokennum;
int i;

mask[0] = 0;
mask[1] = 128;

token += mask[num];

switch(num)
    {
    case 0:     /* operand  */
        if (token < 127 )
            {
            tstack[tokennum++] = token;
            }
        else
            {
            tstack[tokennum++] = OP_ESCAPE;
            tstack[tokennum++] = lobyte(token);
            tstack[tokennum++] = hibyte(token);
            }
        break;
    case 1:     /* operator */
        tstack[tokennum++] = token;
        switch(token)
            {
            case ADD_ARGS+128:
            case SUB_ARGS+128:
            case MULT_ARGS+128:
            case DIVIDE_ARGS+128:
            case EXPON_ARGS+128:
            case ASSIGN_ALL+128:
            case DOSTILLS+128:
            case PLAYVID+128:
            case PLAYSEARCH+128:
            case CHGVIDEO+128:
            case PUTSCREEN+128:
                breakout(token-128,&tstack[0],tokennum) ;
                break;
            default:
                for (i = 0;i<tokennum;i++)
                    {
                    *tokenptr = tstack[i];
                    tokenptr++;
                    }
            }
        tokennum = 0;
        break;
    case 2:             /* command error; clear tstack[] */
        tokennum = 0;
        break;
    }

}
/*****************************************************************************
        resume - resume after an  icon take control command

        called with:

        returns:

        uses:

        notes:

        history:
                02-21-86 rwp - add call of pausebrch

*****************************************************************************/
```

```
#include "view.h"
#include "vstruct.h"
#include "viewdata.h"
#include "task.h"

resume()

{

if (player[cur_play].status & AUTOPLAY)
    {
     playfrom(2);
    /* play from where it is to end of play segment */
    /* if waiting on match frame re-send the wait frame command */
    if (player[cur_play].status & FRAMEBIT)
        {
         byt_op[0] = player[cur_play].vdisc;
         num_op[0] = player[cur_play].waitfrm;
         waitfram();
        }
    }

waitstat &= ~ALLWAIT;

if (*sysbrstr)
    {
    str_op[0] = sysbrstr;
    sysbrch();
    }

if (*pause_str)
    {
    str_op[0] = pause_str;
    pausebrh();
    }

reset_time();
/* continue execution at pcounter */

}

/**
resetting  the timer
*******************************************************************************/

reset_time()

{

if (waitstat & TIMEBIT)
   {
    num_op[0] = w_time;
    waittime();
   }

}
/******************************************************************************
sbox    displays a single line box
**/
#include "vstruct.h"
#include "viewdata.h"

sbox(strow,stcol,endrow,endcol,color1)

char strow,stcol,endrow,endcol,color1;

{
char i;
```

```
     char lindex;
     char width;
     char length;

if (smode == 4 || smode == 1)
   {
    stcol /= 2;
    endcol /= 2;
    color1 = (color1 & 7)/2;
   }

     length = (endrow - strow) + 1;
     width = (endcol - stcol) + 1;
     cursor(strow,stcol);
     wrtch10(218,(int)color1);
     for (i=0;i<width-2;i++)
          wrtch10(196,(int)color1);

     wrtch10(191,(int)color1);

     for(lindex=1;lindex <=length-2;lindex++)
         {
          cursor(++strow,stcol);
          wrtch10(179,(int)color1);
          cursor(strow,stcol+width-1);
          wrtch10(179,(int)color1);
         }
     cursor(++strow,stcol);
     wrtch10(192,(int)color1);
     for (i=0;i<width-2;i++)
          wrtch10(196,(int)color1);
     wrtch10(217,(int)color1);
}

/*******************************************************************************
sbox_debug same as sbox but leaves a gap in top line

*******************************************************************************/

sbox_debug(strow,stcol,endrow,endcol,color1)

char strow,stcol,endrow,endcol,color1;
{
char i;
     char lindex;
     char width;
     char length;

if (smode == 4 || smode == 1)
   {
    stcol /= 2;
    endcol /= 2;
    color1 = (color1 & 7)/2;
   }

     length = (endrow - strow) + 1;
     width = (endcol - stcol) + 1;
     cursor(strow,stcol);
     wrtch10(218,(int)color1);
     for (i=0;i<width-4;i++)
          wrtch10(196,(int)color1);

     cursor(strow,endcol);
     wrtch10(191,(int)color1);

     for(lindex=1;lindex <=length-2;lindex++)
         {
          cursor(++strow,stcol);
          wrtch10(179,(int)color1);
          cursor(strow,stcol+width-1);
          wrtch10(179,(int)color1);
```

```
        }
    cursor(++strow,stcol);
    wrtch10(192,(int)color1);
    for (i=0;i<width-2;i++)
        wrtch10(196,(int)color1);
    wrtch10(217,(int)color1);
}
/*****************************************************************************
        scan_branch

        called with:
                char *start_ptr;    pointer to start of branch name
                char *mem_ptr;      pointer for allocating memory for branch
                                    name
                int max_len;        maximum length of the branch name if high
                                     bit is not on

        returns:
                actual length of the branch name including spaces

        uses:

        notes:

        history:
                02-11-86 rwp - initial entry
                03-07-86 rwp - use movmem instead of strcpy
                             - take the = sign out
                03-11-86 rwp - add 1 to length if high bit is on
                             - check for a beginning blank in the label

*****************************************************************************/


#include "stdio.h"
#include "view.h"
#include "vstruct.h"
#include "viewdata.h"
#include "cmdnum.i"

char *cmalloc();

int scan_branch(start_ptr,mem_ptr,max_len)
        char *start_ptr;
        char **mem_ptr;
        int max_len;

{
/* is the high bit on ?  */
   if (*start_ptr > 128 )
       {
        /* the string is null terminated  */
        *start_ptr -= 128;
        max_len = strlen(start_ptr) + 1;
       }


/* allocate memory for the branch label */
   *mem_ptr = cmalloc(max_len + 1);

/* copy the label to the allocated memory   */
/* strncpy(*mem_ptr,start_ptr,max_len); */
/* take the equal sign out */
if (*start_ptr != '=' )
    movmem(start_ptr,*mem_ptr,max_len);
else
    movmem(start_ptr + 1,*mem_ptr,max_len);

*(*mem_ptr + max_len) = '\0';
```

```
/* trim any spaces off the end if it does not start with a blank */
if (*(*mem_ptr) != 32)
    trim_end(*mem_ptr);

return(max_len);

}
/*****************************************************************************
        scanbyte

        called with:

        returns:

        uses;

        notes:

        history:
                02-28-86 rwp - make token an int

*****************************************************************************/


#include "view.h"
#include "vstruct.h"
#include "viewdata.h"


char *cmalloc();

scanbyte(vtype)
  int vtype;

{
int token = 0;              /* token value  */
char buf[9];                /* buffer for variable name */
int dvalue;                 /* value of constant    */
int i = 0;                  /* counter */
int done = FALSE;

switch(vtype)
   {
   case 1:         /* constant */
   case 3:         /* Composer input */
        if (vtype == 3)
            {
            dvalue = *scan_ptr;
            scan_ptr++;
            }
        else
            {
             while (isdigit(*scan_ptr) && i < 5) /* find constant string */
                    {
                    buf[i++] = *scan_ptr;
                    scan_ptr++;
                    }
             buf[i] = '\0';
             dvalue = atoi(buf);
            }
        token = putbtabl(dvalue);
        break;
   }
puttoken(0,token);

}
/*****************************************************************************
scanevt()

o Evaluates an operand
```

o scans the string pointed to by scan_ptr to parse an event name

Looks for a match in the event table (evttable)
If there is a match, token equals the index into the table.
If no match, it increments the number of entries in the table and assigns
the new event name with a value of 0 to indicate that the event does not
exist yet.

```
*****************************************************************************/


#include "view.h"
#include "ctype.h"
#include "vstruct.h"

extern char *scan_ptr;
extern cmd_buff[];
extern char *tokenptr;
extern struct etable evttable[];
extern int evtindex;

char *calloc();

scanevt(vtype)
  int vtype;
{
int done = FALSE;
int i = 0;
char *lenptr;  /* pointer to determine length of event name */
int evtlen = 0;    /* length of event name */
char bufl[20]; /* the event name without the *  */
char token;

/* skip white space */

while ( *scan_ptr == ' ' || *scan_ptr == '"')
        ++scan_ptr;

/* force event name to lower case */

lenptr = scan_ptr;
while (   ( *lenptr != '\0')
        && ( *lenptr != '(' )
        && ( *lenptr != ' ' )
        && ( *lenptr != '\n' )
        && ( *lenptr != '"' )
        && ( evtlen < 11) )
        {
        *lenptr = tolower ( *lenptr );
        ++lenptr;
        evtlen++;
        }
for ( i=0;i<evtlen;i++ )
        {
        bufl[i] = *scan_ptr;
        ++scan_ptr;
        }

bufl[i] = '\0';

/* check the event table */

for (i = 0; i<evtindex; i++)
    {
     if (strcmp(evttable[i].name,bufl) == 0)   /* event found in table */
        {
         done = TRUE;
         token = i;
         break;
         }
    }
```

```
 if (!done)
        {
         evttable[evtindex].name = calloc(1,strlen(bufl)+1);
         strcpy(evttable[evtindex].name,bufl);
         evttable[evtindex].value = 0;   /* set value to event name without addr
ess */
         token = evtindex;
         evtindex++;
        }

puttoken(0,token);
}
/*******************************************************************************
scanline

o controls the parsing of a statement

*******************************************************************************/

#include "\viewc\view.h"
#include "\viewc\vstruct.h"
#include "\viewc\viewdata.h"

extern struct cmd cmds[];

scanline()

{

char cmdnum;          /* command number */
int done = FALSE;
int num;
int cmdindx = 0;
int i;

while ( *scan_ptr == ' ' )
        scan_ptr++;

num = findcmd(&cmdindx);
cmdnum = num;
if (num == 126)    /* RUN command */
    return(126);

switch(num)
      {
       case -1:  /* invalid command */
             /* printf("\nInvalid command\n");  */
             return(FALSE);
             break;
       case -2:  /* no command entered */
              return(FALSE);
              break;
       default:         /* valid command */
              while ( (*scan_ptr == ' ') || (*scan_ptr == '(') )
                      scan_ptr++;

              for (i = 0; i <cmdline[cmdnum].varmax; i++)
                  {
                  if ( get_op(cmdline[cmdnum].varcode[i]) != TRUE)
                       {   /* true if valid operand found */
                        puttoken(2,cmdnum);    /* clear token stack */

                        printf("\nSyntax error\n");

                        printf("%s(%s)\n",
                                cmds[cmdindx].cname,cmdline[cmdnum].lineptr);
                        return(FALSE);
                       }
                  }
              puttoken(1,cmdnum);   /* add all tokens to token space */
              return(TRUE);
```

```
            break;
      }  /* end switch */

 }     /* end main */
/*******************************************************************************
scannum(vtype)

o Scans the string pointed to by scan_ptr to parse a numeric.
o if vtype == 1 then its a constant.
o If vtype == 2 then its a variable.
o if vtype == 3 then its scanning a Composer file command

Looks for a match in the numeric table (numtable).
If no match it increments the number of entries in the table (numindex)
and assigns the new variable or constant.

Calls puttoken with the token.

*******************************************************************************/

#include "stdio.h"
#include "view.h"
#include "vstruct.h"
#include "viewdata.h"


char *cmalloc();
long strtol();

scannum(vtype)
  int vtype;

{
int token = 0;              /* token value */
char buf[9];              /* buffer for variable name */
unsigned dvalue;              /* value of constant    */
unsigned lowbyt;
unsigned highbyt;
int i = 0;                /* counter */
int done = FALSE;
char **p = NULL;

switch(vtype)
   {
   case 1:        /* constant */
   case 3:        /* Composer constant */
        if (vtype == 3)
            {
            lowbyt = *scan_ptr;
            scan_ptr++;
            highbyt  = *scan_ptr;
            scan_ptr++;
            dvalue = byword(highbyt,lowbyt);
            }
        else
          {
            while (isdigit(*scan_ptr) && i < 5)   /* find constant string */
                  {
                   buf[i++] = *scan_ptr;
                   scan_ptr++;
                   }
             buf[i] = '\0';
             dvalue = (unsigned)strtol(buf,p,10); /* decimal conversion */
            }
        token = putntabl(dvalue);
        break;

     }
puttoken(0,token);

}
```

```
/*****
        i = -1;
        while (!done)
               {
               i++;
               if (numtable[i].nname == 0)   /* if constant */
                  if( numtable[i].nvalue == dvalue )
                        done = TRUE;                    /* constant in table */
               if( i == numindex)                  /* not in table */
                   {
                   if (numindex > 127)
                      {
                       printf("\nNUMERIC TABLE OVERFLOW !!");
                       _exit(0);
                       }
                   numtable[i].nname = 0;
                   numtable[i].nvalue = dvalue;
                   numindex++;
                   done = TRUE;
                   }
               }


*******/
/*******************************************************************************
scanstr(vtype)

o Scans the string pointed to by scan_ptr to parse a numeric.
o if vtype == 1 then it,s a constant.
o If vtype == 2 then it's a variable.
o if vtypr > 3 then it's a Composer file .

Looks for a match in the string (strtable).
If no match, it increments the number of entries in the table (strindex)
and assigns the new variable or constant.

Calls puttoken with the token.

*******************************************************************************/

#include "view.h"
#include "vstruct.h"
#include "viewdata.h"


char *cmalloc();

scanstr(vtype)
  int vtype;

{
int token = 0;              /* token value */
char buf[300];             /* buffer for variable name and string */
int i = 0;               /* counter */
int done = FALSE;
int str_len;

switch(vtype)
   {
   case 1:       /* constant */
   default:      /* Composer input */
        if (vtype != 1)
           {
            movmem(scan_ptr,buf,(unsigned)vtype);
            scan_ptr += vtype;
            str_len = vtype;
            buf[str_len] = '\0';
           }
        else
            {
```

```
            scan_ptr++;    /* get pass quote sign */
            while ((*scan_ptr != '"') && i < 127)     /* find constant string */
                  {
                  buf[i++] = *scan_ptr;
                  scan_ptr++;
                  }
            scan_ptr++;      /* get past last quote sign */
            buf[i] = '\0';
            str_len = strlen(buf) + 1;
            }
        token = putstabl(buf,str_len);
        break;
    }
puttoken(0,token);

}
/******************************************************************************

        setcmd()

        called with:

        returns:

        uses:

        notes:
              varcodes
               0 - char  0 to 255
               1 - unsigned int
               2 - string pointer to buffer of varying length
               3 to 10 - buffer of length equal to varcode
               11 - branch names of normal length 10


        history:
               01-28-86 rwp - add undefined command
               02-03-86 rwp - add ASSIGN command
                            - add ASSIGN_NUM and ASSIGN_STR
                02-06-86 rwp - add ALL_CALC
                02-13-86 rwp - add FIND_INDEX,READ_USER,WRITE_USER
                02-21-86 rwp - add border color to clrscrn
                03-07-86 rwp - add the argument type to ASSIGN_NUM
                             - add argument type to ALL_CALC
                03-10-86 rwp - correct ALL_CALC varcodes

******************************************************************************/

#include "vstruct.h"
#include "cmdnum.i"

extern struct command cmdline[];

setcmd()

{
cmdline[WAITTIME].lineptr = "time";
cmdline[WAITTIME].varmax = 1;
cmdline[WAITTIME].varcode[0] = 1;

cmdline[NO_OP].lineptr = "";
cmdline[NO_OP].varmax = 0;

cmdline[SEARCHWAIT].lineptr = "";
cmdline[SEARCHWAIT].varmax = 0;

cmdline[PLAYVID].lineptr = "PlayCode,FromFrame,ToFrame,Speed";
cmdline[PLAYVID].varmax = 4;
cmdline[PLAYVID].varcode[0] = 0;
cmdline[PLAYVID].varcode[1] = 1;
```

```
cmdline[PLAYVID].varcode[2] = 1;
cmdline[PLAYVID].varcode[3] = 0;

cmdline[PLAYSEARCH].lineptr = "PlayCode,FromFrame,ToFrame,Speed";
cmdline[PLAYSEARCH].varmax = 4;
cmdline[PLAYSEARCH].varcode[0] = 0;
cmdline[PLAYSEARCH].varcode[1] = 1;
cmdline[PLAYSEARCH].varcode[2] = 1;
cmdline[PLAYSEARCH].varcode[3] = 0;

cmdline[WAITFRAME].lineptr = "PlayCode,Frame";
cmdline[WAITFRAME].varmax = 2;
cmdline[WAITFRAME].varcode[0] = 0;
cmdline[WAITFRAME].varcode[1] = 1;

cmdline[CHGVIDEO].lineptr = "PlayCode,Frame";
cmdline[CHGVIDEO].varmax = 2;
cmdline[CHGVIDEO].varcode[0] = 0;
cmdline[CHGVIDEO].varcode[1] = 1;

cmdline[SETVIDEO].lineptr = "PlayCode";
cmdline[SETVIDEO].varmax = 1;
cmdline[SETVIDEO].varcode[0] = 0;

cmdline[SETAUDIO].lineptr = "PlayCode";
cmdline[SETAUDIO].varmax = 1;
cmdline[SETAUDIO].varcode[0] = 0;

cmdline[LOADVID].lineptr = "PlayCode,Prompt,LoadCode";
cmdline[LOADVID].varmax = 3;
cmdline[LOADVID].varcode[0] = 0;
cmdline[LOADVID].varcode[1] = 0;
cmdline[LOADVID].varcode[2] = 0;

cmdline[WAITSEG].lineptr = "PlayCode";
cmdline[WAITSEG].varmax = 1;
cmdline[WAITSEG].varcode[0] = 0;

cmdline[DOSTILL].lineptr = "PlayCode,Frame";
cmdline[DOSTILL].varmax = 2;
cmdline[DOSTILL].varcode[0] = 0;
cmdline[DOSTILL].varcode[1] = 1;

cmdline[DOSTILLS].lineptr = "PlayCode,FromFrame,ToFrame,Increment,Wait";
cmdline[DOSTILLS].varmax = 5;
cmdline[DOSTILLS].varcode[0] = 0;
cmdline[DOSTILLS].varcode[1] = 1;
cmdline[DOSTILLS].varcode[2] = 1;
cmdline[DOSTILLS].varcode[3] = 0;
cmdline[DOSTILLS].varcode[4] = 1;

cmdline[PUTSCREEN].lineptr = "Fade,Time,Fore,Back,Border,SrowScol,ErowEcol,Name"
;
cmdline[PUTSCREEN].varmax = 8;
cmdline[PUTSCREEN].varcode[0] = 0;
cmdline[PUTSCREEN].varcode[1] = 0;
cmdline[PUTSCREEN].varcode[2] = 0;
cmdline[PUTSCREEN].varcode[3] = 0;
cmdline[PUTSCREEN].varcode[4] = 0;
cmdline[PUTSCREEN].varcode[5] = 1;
cmdline[PUTSCREEN].varcode[6] = 1;
cmdline[PUTSCREEN].varcode[7] = 8;

cmdline[PUTSCRN1].lineptr = "Fade,Time,Fore,Back,Border,SrowScol,ErowEcol,Number
";
cmdline[PUTSCRN1].varmax = 8;
cmdline[PUTSCRN1].varcode[0] = 0;
cmdline[PUTSCRN1].varcode[1] = 0;
cmdline[PUTSCRN1].varcode[2] = 0;
cmdline[PUTSCRN1].varcode[3] = 0;
cmdline[PUTSCRN1].varcode[4] = 0;
```

```
cmdline[PUTSCRN1].varcode[5] = 1;
cmdline[PUTSCRN1].varcode[6] = 1;
cmdline[PUTSCRN1].varcode[7] = 1;

cmdline[CLRSCRN].lineptr = "ScreenMode,Background,Pallete,Border,SrowScol,ErowEc
ol";
cmdline[CLRSCRN].varmax = 6;
cmdline[CLRSCRN].varcode[0] = 1;
cmdline[CLRSCRN].varcode[1] = 0;
cmdline[CLRSCRN].varcode[2] = 0;
cmdline[CLRSCRN].varcode[3] = 0;
cmdline[CLRSCRN].varcode[4] = 1;
cmdline[CLRSCRN].varcode[4] = 1;

cmdline[COLORS].lineptr = "Mask,Visible";
cmdline[COLORS].varmax = 2;
cmdline[COLORS].varcode[0] = 1;
cmdline[COLORS].varcode[1] = 1;

cmdline[PUTVAR].lineptr = "Row,Col,Att1,Att2,Length,Edit,Record#,VarName";
cmdline[PUTVAR].varmax = 8;
cmdline[PUTVAR].varcode[0] = 0;
cmdline[PUTVAR].varcode[1] = 0;
cmdline[PUTVAR].varcode[2] = 0;
cmdline[PUTVAR].varcode[3] = 0;
cmdline[PUTVAR].varcode[4] = 0;
cmdline[PUTVAR].varcode[5] = 0;
cmdline[PUTVAR].varcode[6] = 1;
cmdline[PUTVAR].varcode[7] = 9;

cmdline[DFNTOUCH].lineptr = "Buffer";
cmdline[DFNTOUCH].varmax = 1;
cmdline[DFNTOUCH].varcode[0] = 2;

cmdline[CLRTOUCH].lineptr ="";
cmdline[CLRTOUCH].varmax = 0;

cmdline[TOUCHBRCH].lineptr = "Buffer";
cmdline[TOUCHBRCH].varmax = 1;
cmdline[TOUCHBRCH].varcode[0] = 2;
cmdline[SYSBRCH].lineptr = "Buffer";
cmdline[SYSBRCH].varmax = 1;
cmdline[SYSBRCH].varcode[0] = 2;

cmdline[PAUSEBRH].lineptr = "Buffer";
cmdline[PAUSEBRH].varmax = 1;
cmdline[PAUSEBRH].varcode[0] = 2;

cmdline[FEEDBACK].lineptr = "Buffer";
cmdline[FEEDBACK].varmax = 1;
cmdline[FEEDBACK].varcode[0] = 2;

cmdline[SPEECHCHIP].lineptr = "Buffer";
cmdline[SPEECHCHIP].varmax = 1;
cmdline[SPEECHCHIP].varcode[0] = 2;

cmdline[SPEECHFILE].lineptr = "FileName";
cmdline[SPEECHFILE].varmax = 1;
cmdline[SPEECHFILE].varcode[0] = 8;

cmdline[INKEYBRD].lineptr = "Row,Col,Length,Att,Edit,Scrn,Voice,Record#,VarName"
;
cmdline[INKEYBRD].varmax = 9;
cmdline[INKEYBRD].varcode[0] = 0;
cmdline[INKEYBRD].varcode[1] = 0;
cmdline[INKEYBRD].varcode[2] = 0;
cmdline[INKEYBRD].varcode[3] = 0;
cmdline[INKEYBRD].varcode[4] = 0;
cmdline[INKEYBRD].varcode[5] = 0;
cmdline[INKEYBRD].varcode[6] = 0;
cmdline[INKEYBRD].varcode[7] = 1;
cmdline[INKEYBRD].varcode[8] = 8;
```

```
cmdline[INTOUCH].lineptr = "Row,Col,Length,Att,Edit,Scrn,Voice,Record#,VarName";
cmdline[INTOUCH].varmax = 9;
cmdline[INTOUCH].varcode[0] = 0;
cmdline[INTOUCH].varcode[1] = 0;
cmdline[INTOUCH].varcode[2] = 0;
cmdline[INTOUCH].varcode[3] = 0;
cmdline[INTOUCH].varcode[4] = 0;
cmdline[INTOUCH].varcode[5] = 0;
cmdline[INTOUCH].varcode[6] = 0;
cmdline[INTOUCH].varcode[7] = 1;
cmdline[INTOUCH].varcode[8] = 8;

cmdline[MATCHBRCH].lineptr = "VarName,Record#,MatchString,Record#,BranchName";
cmdline[MATCHBRCH].varmax = 5;
cmdline[MATCHBRCH].varcode[0] = 8;
cmdline[MATCHBRCH].varcode[1] = 1;
cmdline[MATCHBRCH].varcode[2] = 8;
cmdline[MATCHBRCH].varcode[3] = 1;
cmdline[MATCHBRCH].varcode[4] = 2;

cmdline[SETINDS].lineptr = "Mask,Value";
cmdline[SETINDS].varmax = 2;
cmdline[SETINDS].varcode[0] = 1;
cmdline[SETINDS].varcode[1] = 1;

cmdline[TESTINDS].lineptr = "Mask,Value,TrueBranch,FalseBranch";
cmdline[TESTINDS].varmax = 4;
cmdline[TESTINDS].varcode[0] = 1;
cmdline[TESTINDS].varcode[1] = 1;
cmdline[TESTINDS].varcode[2] = 11;
cmdline[TESTINDS].varcode[3] = 11;

cmdline[ADDINDS].lineptr = "Mask,Test,Value,TrueBranch,FalseBranch";
cmdline[ADDINDS].varmax = 5;
cmdline[ADDINDS].varcode[0] = 1;
cmdline[ADDINDS].varcode[1] = 0;
cmdline[ADDINDS].varcode[2] = 0;
cmdline[ADDINDS].varcode[3] = 11;
cmdline[ADDINDS].varcode[4] = 11;

cmdline[LOAD].lineptr = "FileName";
cmdline[LOAD].varmax = 1;
cmdline[LOAD].varcode[0] = 2;

cmdline[LOGGING].lineptr = "On/Off";
cmdline[LOGGING].varmax = 1;
cmdline[LOGGING].varcode[0] = 0;

cmdline[111].lineptr = "Width,ControlCode,FormFeed (y/n)";
cmdline[111].varmax = 3;
cmdline[111].varcode[0] = 0;
cmdline[111].varcode[1] = 0;
cmdline[111].varcode[2] = 0;

cmdline[NEXTEVT].lineptr = "Event Name";
cmdline[NEXTEVT].varmax = 1;
cmdline[NEXTEVT].varcode[0] = 10;

cmdline[PRINTSTR].lineptr = "row,col,string,attribute";
cmdline[PRINTSTR].varmax = 4;
cmdline[PRINTSTR].varcode[0] = 0;
cmdline[PRINTSTR].varcode[1] = 0;
cmdline[PRINTSTR].varcode[2] = 2;
cmdline[PRINTSTR].varcode[3] = 0;

cmdline[COMMAND_ERROR].lineptr = "UNDEFINED COMMAND";
cmdline[COMMAND_ERROR].varmax = 1;
cmdline[COMMAND_ERROR].varcode[0] = 2;

cmdline[ASSIGN_ALL].lineptr = "Buffer";
cmdline[ASSIGN_ALL].varmax = 1;
cmdline[ASSIGN_ALL].varcode[0] = 2;
```

```
cmdline[ASSIGN_NUM].lineptr = "var_name,rec#,var_name,rec#,var_type,precision";
cmdline[ASSIGN_NUM].varmax = 6;
cmdline[ASSIGN_NUM].varcode[0] = 8;
cmdline[ASSIGN_NUM].varcode[1] = 1;
cmdline[ASSIGN_NUM].varcode[2] = 8;
cmdline[ASSIGN_NUM].varcode[3] = 1;
cmdline[ASSIGN_NUM].varcode[4] = 0;
cmdline[ASSIGN_NUM].varcode[5] = 0;

cmdline[ASSIGN_STR].lineptr = "var_name,rec#,var_name,rec#";
cmdline[ASSIGN_STR].varmax = 4;
cmdline[ASSIGN_STR].varcode[0] = 8;
cmdline[ASSIGN_STR].varcode[1] = 1;
cmdline[ASSIGN_STR].varcode[2] = 8;
cmdline[ASSIGN_STR].varcode[3] = 1;

cmdline[ADD_ARGS].lineptr = "Buffer";
cmdline[ADD_ARGS].varmax = 1;
cmdline[ADD_ARGS].varcode[0] = 2;

cmdline[SUB_ARGS].lineptr = "Buffer";
cmdline[SUB_ARGS].varmax = 1;
cmdline[SUB_ARGS].varcode[0] = 2;

cmdline[MULT_ARGS].lineptr = "Buffer";
cmdline[MULT_ARGS].varmax = 1;
cmdline[MULT_ARGS].varcode[0] = 2;

cmdline[DIVIDE_ARGS].lineptr = "Buffer";
cmdline[DIVIDE_ARGS].varmax = 1;
cmdline[DIVIDE_ARGS].varcode[0] = 2;

cmdline[EXPON_ARGS].lineptr = "Buffer";
cmdline[EXPON_ARGS].varmax = 1;
cmdline[EXPON_ARGS].varcode[0] = 2;

cmdline[ALL_CALC].lineptr =
"op1_name,rec#,type,op2_name,rec#,type,result_name,rec#,type,prec,calc_code";
cmdline[ALL_CALC].varmax = 11;
cmdline[ALL_CALC].varcode[0] = 2;
cmdline[ALL_CALC].varcode[1] = 1;
cmdline[ALL_CALC].varcode[2] = 0;
cmdline[ALL_CALC].varcode[3] = 2;
cmdline[ALL_CALC].varcode[4] = 1;
cmdline[ALL_CALC].varcode[5] = 0;
cmdline[ALL_CALC].varcode[6] = 2;
cmdline[ALL_CALC].varcode[7] = 1;
cmdline[ALL_CALC].varcode[8] = 0;
cmdline[ALL_CALC].varcode[9] = 0;
cmdline[ALL_CALC].varcode[10] = 0;

cmdline[FIND_INDEX].lineptr = "user file#";
cmdline[FIND_INDEX].varmax = 1;
cmdline[FIND_INDEX].varcode[0] = 1;

cmdline[READ_USER].lineptr = "user file#";
cmdline[READ_USER].varmax = 1;
cmdline[READ_USER].varcode[0] = 1;


cmdline[WRITE_USER].lineptr = "user file#";
cmdline[WRITE_USER].varmax = 1;
cmdline[WRITE_USER].varcode[0] = 1;

}
```

```
/*****************************************************************************

        setnptr()   sets the function pointers

        returns:

        uses:

        notes:

        history:
                02-03-86 rwp - add ASSIGN_ALL, ASSIGN_NUM,ASSIGN_STR
                02-06-86 rwp - add ALL_CALC
                02-13-86 rwp - add READ_USER,WRITE_USER,FIND_INDEX
*****************************************************************************/


#include "view.h"
#include "vstruct.h"
#include "viewdata.h"
#include "cmdnum.i"

setfnptr()
{
functptr[WAITTIME]        = waittime;
functptr[NO_OP]           = no_op;
functptr[PLAYVID]         = playvid;
functptr[SEARCHWAIT]      = no_op;
functptr[WAITFRAME]       = waitfram;
functptr[CHGVIDEO]        = chgvideo;
functptr[LOADVID]         = loadvid;
functptr[WAITSEG]         = waitseg;
functptr[DOSTILL]         = dostill;
functptr[DOSTILLS]        = dostills;
functptr[SETVIDEO]        = setvideo;
functptr[SETAUDIO]        = setaudio;
functptr[PUTSCREEN]       = putscrn;
functptr[PUTSCRN1]        = putscrn1;
functptr[CLRSCRN]         = clrscrn;
functptr[COLORS]          = colors;
functptr[PUTVAR]          = putvar;
functptr[DFNTOUCH]        = dfntouch;
functptr[CLRTOUCH]        = clrtouch;
functptr[TOUCHBRCH]       = touchbrh;
functptr[FEEDBACK]        = feedback;
functptr[SYSBRCH]         = sysbrch;
functptr[PAUSEBRH]        = pausebrh;
functptr[SPEECHCHIP]      = spchchip;
functptr[SPEECHFILE]      = spchfile;
functptr[INKEYBRD]        = inkeybrd;
functptr[INTOUCH]         = intouch;
functptr[MATCHBRCH]       = matchbrh;
functptr[SETINDS]         = setinds;
functptr[TESTINDS]        = testinds;
functptr[ADDINDS]         = addinds;
functptr[LOGGING]         = logging;
functptr[NEXTEVT]         = nextevt;
functptr[PRINTSTR]        = printstr;
functptr[LOAD]            = load;
functptr[ASSIGN_ALL]      = assign_all;
functptr[ASSIGN_NUM]      = assign_num;
functptr[ASSIGN_STR]      = assign_str;
functptr[ALL_CALC]        = all_calc;
functptr[FIND_INDEX]      = find_u_file;
functptr[READ_USER]       = read_u_file;
functptr[WRITE_USER]      = write_u_file;

}
```

```
/********************************************************************/
/* settch - compiled to settch.obj
                                */
/*  set up touch counter record index table
                          */
/*
/*                                                                  */
/*                                                                  */
/*  Programmer: Jerry F. Williams (404-261-4634 // 404-238-2298)   */
/*  Last Change/Update: 02/06/86                                    */
/********************************************************************/
#include "STDIO.H"
#include "FCNTL.H"
#include "CTYPE.H"

#define MAX_INAME_SIZE        8
#define MAX_TOUCHS                      61

struct var_index              /* structure for variable index elements (.vrx f
ile) */
        {
        char name[MAX_INAME_SIZE];      /* variable name */
        int rec_nr;                                          /* relative reco
rd number of variable */
        char filler[6];                         /* filler */
        } *vrx;


/*********************************************************/
/* set_tch_index - setup the touch counter index array  */
/*********************************************************/
int set_tch_index(touch_id, tch_rec_num)
int touch_id;                   /* touch index file id */
unsigned *tch_rec_num;  /* array of touch record numbers */
        {
        long rd_file();
        char *getml();

        char *index_buf;                /* pointer to beg of index buffer */
        char *end_index_buf;    /* pointer to end of index buffer */
        char number[3];         /* temp number string */
        int number_pos;         /* position of number within index name string *
/
        int num_end;                    /* position of end of number in number s
tring */
        int touch_nr;                   /* converted touch number */
        int ret_code = 0;               /* !0 = error */
        int nr_touchs = 0;      /* number of touch elements set up */
        long index_size;                /* size of the index file and buffer */

        index_size = lseek(touch_id, 0L, 2);
        lseek(touch_id, 0L, 0);

        if (!(index_buf = getml(index_size)))
                ret_code = -1;
        else if (rd_file(touch_id, index_buf, index_size) != index_size)
                ret_code = -2;
        else {
                for (nr_touchs = 0;  nr_touchs <= MAX_TOUCHS;  nr_touchs++)
                        *(tch_rec_num + nr_touchs) = 0;
                nr_touchs = 0;
                end_index_buf = index_buf + index_size - 1;
                vrx = (struct var_index *) index_buf;
                --vrx;
                while (vrx < end_index_buf && nr_touchs < MAX_TOUCHS)
                        {
                        while (++vrx < end_index_buf && (vrx->name[0] != '%'
                              || toupper(vrx->name[1]) != 'T'))
                                ;
                        if (vrx < end_index_buf)
                                {
                                number_pos = 1;
```

```
                        num_end = 0;
                        while (isdigit(vrx->name[number_pos + 1])
                                        && ++number_pos < 4)
                                number[num_end++] = vrx->name[number_pos
];

                        if (num_end > 0
                            && ++number_pos < 5
                            && (vrx->name[number_pos] == ' '
                            || vrx->name[number_pos] == '\t'
                            || vrx->name[number_pos] == 0x0))
                                {
                                number[num_end] = 0x0;
                                if (number[0] == '0' && num_end > 2)
                                        touch_nr = -1;
                                else
                                        touch_nr = atoi(number);
                                if (touch_nr >= 0
                                    && touch_nr < 61
                                    && *(tch_rec_num + touch_nr) == 0)
                                        {
                                        *(tch_rec_num + touch_nr) = vrx-
>rec_nr;
                                        ++nr_touchs;
                                        }
                                }
                        }
                }
        }
        if (!ret_code && nr_touchs != MAX_TOUCHS)
                ret_code = nr_touchs;
        if (ret_code != -1)
                rlsml(index_buf, index_size);
        return (ret_code);
        }
/*****************************************************************************
make system colors solid
*****************************************************************************/
#include "view.h"
#include "vstruct.h"
#include "viewdata.h"
#include "task.h"

solidsys()

{

unsigned grpclear;
unsigned lown,highn;

/* make system color solid */

switch(cur_pal)
      {
       case 0:
            grpclear = grpmask;
            break;
       case 1:
            grpclear = grpmask * 2;
            break;
       case 2:
            grpclear = grpmask * 256;
            break;
       case 3:
            grpclear = grpmask * 256;
            if (grpclear < 0x4000)
                grpclear = grpclear * 2;
            else
                grpclear = 0x8000;
            break;
```

```
        default:
             grpclear = grpmask * 2;
             break;
       }

grpclear = ~grpclear;
lown = lobyte(grpclear);
highn = hibyte(grpclear);
grpclear = byword(lown,highn);

if (smode == 4)
    {
     curmask = (curmask & grpclear);
    }
else
    {
     curmask = (curmask & sysclear);
    }

ddbuf[0] = 0x02;
ddbuf[1] = hibyte(curmask);
ddbuf[2] = lobyte(curmask);
devicewt(video,ddbuf,3);
waitpoll(VIDEO_DEVICE);

}
/* speak_file.c */
/* Dialogic Tech Support 201-334-8450 Nick Zwick */

#include "fcntl.h"
#include "stdio.h"
#include "dos.h"

char dskbuf[4096];        /* I/O buffer for file data. May be in ES */

ioctl(handle,blk,siz)
unsigned int handle;
int *blk;
int siz;
   {
   struct XREG inreg;
   struct SREGS segreg;

   inreg.ax = 0x4403;      /* write device */
   ptr_off_seg(&blk,&inreg.dx,&segreg.ds);
   inreg.bx = handle;
   inreg.cx = siz;
   intdosx(&inreg,&inreg,&segreg);
   }

ptr_off_seg(source,offset,segment)  /* move address of source to destination */
char *source,*offset,*segment;
   {
   movmem(source,offset,2);          /* move offset portion of pointer */
   movmem(source+2,segment,2);       /* move segment portion of pointer */
   }

speak_file(file_name)
char *file_name;
   {
   char *pointer;
   int length;                  /* WARNING WARNING WARNING */
   int bused,bfree;             /* bused and bfree must be in same segment as */
   unsigned int vox_buf[4];     /* vox_buf */
   unsigned int flag;           /* put them all on the stack, or all in DS */
   unsigned int file,handle;
   struct XREG inreg;
   struct XREG outreg;
   struct SREGS segreg;

      segread(&segreg);      /* prime segreg.ds */
```

```
/* open voice device for output */
inreg.ax = 0x3d01;
pointer = "VOX";
ptr_off_seg(&pointer,&inreg.dx,&segreg.ds);
flag = intdosx(&inreg,&inreg,&segreg);
if (flag & 1)
   return(121);        /* open failure */
handle = inreg.ax;

/* put voice device in binary mode */
      inreg.ax = 0x4401;        /* set device information */
      inreg.bx = handle;
      inreg.dx = 0xa0;          /* set ISDEV and BIN */
      intdosx(&inreg,&inreg,&segreg);

      /* activate voice device */
      vox_buf[0] = 1;             /* activate */
      vox_buf[1] = 0x2e9;         /* command port 2e9 */
      vox_buf[2] = 0x2e8;         /* data port 2e8 */
      vox_buf[3] = 4;             /* hardware interrupt 4 */
      ioctl(handle,vox_buf,8);    /* send 8 bytes */

      file = open(file_name,O_RDONLY|O_RAW);
        if (file == -1)
           return(122);          /* cannot open speech data file */

      /* set playback options */
      vox_buf[0] = 5;             /* set playback */
      vox_buf[1] = 8;             /* 8 kHz sampling rate */
      vox_buf[2] = 0;             /* unencoded  ie. ADPCM used */
      ioctl(handle,vox_buf,6);    /* send 6 bytes */

      /* set up registers for while loop below */
      inreg.ax = 0x4000;      /* write file handle */
      inreg.bx = handle;
      pointer = dskbuf;
      ptr_off_seg(&pointer,&inreg.dx,&segreg.ds);

      while ((length = read(file,dskbuf,4096)) > 15)   /* read speech file */
         {
         inreg.cx = (length & 0x7ff0);             /* must be multiple of 16 */
         intdosx(&inreg,&outreg,&segreg);          /* write voice device */
         if ((outreg.ax != inreg.cx))
            return(123);                           /* fail on write */
         }


      /* check voice device buffer for unprocessed characters */
      vox_buf[0] = 10;
      pointer = (char *)&bused;
      /* get offset of bused ASSUME segment is DS */
      ptr_off_seg(&pointer,&vox_buf[1],&vox_buf[2]);
      pointer = (char *)&bfree;
      /* get offset of bfree ASSUME segment is DS */
      ptr_off_seg(&pointer,&vox_buf[2],&vox_buf[3]);

      /* ASSUME BUSED AND BFREE ARE IN SAME SEGMENT AS VOX_BUF */
      /* WARNING EXPLAINED */
      /* the ioctl function sets DS to the segment containing vox_buf, and */
      /* vox_buf contains the offset addresses of two integers, bused and bfree,
 */
      /* that are assumed by the VOX device driver to be in the segment */
      /* pointed to by DS */

      /* bused will be 0 when there are no more characters in the speech buffer
*/
      while (ioctl(handle,vox_buf,6), bused);

      /* stop playback mode */
      vox_buf[0] = 3;
      ioctl(handle,vox_buf,2);
```

```
      close(file);

      /* deactivate voice device */
      vox_buf[0] = 2;
      ioctl(handle,vox_buf,2);

      /* close voice device and release handle */
      inreg.ax = 0x3e00;
      inreg.bx = handle;
      intdosx(&inreg,&inreg,&segreg);

      return(0);
   }
/*****************************************************************************
        speak_process()

        called with:
                pointer to response buffer
        returns:
                none

        uses:
        notes:
        history:
                01-27-86 rwp - initial entry

*****************************************************************************/
#include "task.h"
#include "view.h"
#include "vstruct.h"
#include "viewdata.h"

speak_process(response_buf)
     char *response_buf;

{

;

}
/* speak.c */
/* Dialogic Tech Support 201-334-8450 Nick Zwick */

#include "fcntl.h"
#include "stdio.h"
#include "dos.h"
#include "ctype.h"

extern int speak_file();


main()
   {
   char file_name[20];
   int rc,i;

   while(1)
      {
      printf("Enter filename, or q to quit\n");
      scanf("%s",file_name);
      for (i = 0;file_name[i];i++)
         file_name[i] = toupper(file_name[i]);
      if (file_name[0] == 'Q')
         return;
      else
         {
         rc = speak_file(file_name);
         if (rc)
            printf("error from speak_file %d\n",rc);
         }
      }
   }
```

```
/* speak_file.c */
/* Dialogic Tech Support 201-334-8450 Nick Zwick */

char dskbuf[4096];      /* I/O buffer for file data. May be in ES */

ioctl(handle,blk,siz)
unsigned int handle;
int *blk;
int siz;
   {
   struct XREG inreg;
   struct SREGS segreg;

   inreg.ax = 0x4403;     /* write device */
   ptr_off_seg(&blk,&inreg.dx,&segreg.ds);
   inreg.bx = handle;
   inreg.cx = siz;
   intdosx(&inreg,&inreg,&segreg);
   }

ptr_off_seg(source,offset,segment)  /* move address of source to destination */
char *source,*offset,*segment;
   {
   movmem(source,offset,2);          /* move offset portion of pointer */
   movmem(source+2,segment,2);       /* move segment portion of pointer */
   }

speak_file(file_name)
char *file_name;
   {
   char *pointer;
   int length;                  /* WARNING WARNING WARNING */
   int bused,bfree;             /* bused and bfree must be in same segment as */
   unsigned int vox_buf[4];     /* vox_buf */
   unsigned int flag;           /* put them all on the stack, or all in DS */
   unsigned int file,handle;
   struct XREG inreg;
   struct XREG outreg;
   struct SREGS segreg;

      segread(&segreg);     /* prime segreg.ds */

      /* open voice device for output */
      inreg.ax = 0x3d01;
      pointer = "VOX";
      ptr_off_seg(&pointer,&inreg.dx,&segreg.ds);
      flag = intdosx(&inreg,&inreg,&segreg);
      if (flag & 1)
         return(121);        /* open failure */
      handle = inreg.ax;

      /* put voice device in binary mode */

      inreg.ax = 0x4401;        /* set device information */
      inreg.bx = handle;
      inreg.dx = 0xa0;          /* set ISDEV and BIN */
      intdosx(&inreg,&inreg,&segreg);

      /* activate voice device */
      vox_buf[0] = 1;             /* activate */
      vox_buf[1] = 0x2e9;         /* command port 2e9 */
      vox_buf[2] = 0x2e8;         /* data port 2e8 */
      vox_buf[3] = 4;             /* hardware interrupt 4 */
      ioctl(handle,vox_buf,8);    /* send 8 bytes */

      file = open(file_name,O_RDONLY|O_RAW);
        if (file == -1)
           return(122);          /* cannot open speech data file */

      /* set playback options */
```

```
vox_buf[0] = 5;               /* set playback */
vox_buf[1] = 8;               /* 8 kHz sampling rate */
vox_buf[2] = 0;               /* unencoded  ie. ADPCM used */
ioctl(handle,vox_buf,6);      /* send 6 bytes */

/* set up registers for while loop below */
inreg.ax = 0x4000;     /* write file handle */
inreg.bx = handle;
pointer = dskbuf;
ptr_off_seg(&pointer,&inreg.dx,&segreg.ds);

while ((length = read(file,dskbuf,4096)) > 15)    /* read speech file */
   {
   inreg.cx = (length & 0x7ff0);               /* must be multiple of 16 */
   intdosx(&inreg,&outreg,&segreg);            /* write voice device */
   if ((outreg.ax != inreg.cx))
      return(123);                             /* fail on write */
   }


/* check voice device buffer for unprocessed characters */
vox_buf[0] = 10;
pointer = (char *)&bused;
/* get offset of bused ASSUME segment is DS */
ptr_off_seg(&pointer,&vox_buf[1],&vox_buf[2]);
pointer = (char *)&bfree;
/* get offset of bfree ASSUME segment is DS */
ptr_off_seg(&pointer,&vox_buf[2],&vox_buf[3]);

/* ASSUME BUSED AND BFREE ARE IN SAME SEGMENT AS VOX_BUF */
/* WARNING EXPLAINED */
/* the ioctl function sets DS to the segment containing vox_buf, and */
/* vox_buf contains the offset addresses of two integers, bused and bfree,
*/
/* that are assumed by the VOX device driver to be in the segment */
/* pointed to by DS */

/* bused will be 0 when there are no more characters in the speech buffer
*/
while (ioctl(handle,vox_buf,6), bused);

/* stop playback mode */
vox_buf[0] = 3;
ioctl(handle,vox_buf,2);

close(file);

/* deactivate voice device */
vox_buf[0] = 2;
ioctl(handle,vox_buf,2);

/* close voice device and release handle */
inreg.ax = 0x3e00;
inreg.bx = handle;
intdosx(&inreg,&inreg,&segreg);

return(0);
}
/*****************************************************************************
   stopvid()

   called with:
           nothing
   returns:
           VOID
   uses:

   notes:

   history:
           02-06-86 rwp - stop both players
```

```
        02-21-86 rwp - add waitpoll
        03-05-86 rwp - add get_frame();
        03-06-86 rwp - add manual mode

*****************************************************************************/


#include "view.h"
#include "vstruct.h"
#include "viewdata.h"
#include "task.h"

stopvid()

{

ddbuf[0] = 0x00;  /* reset */

/* reset player one and get response */
if (player[0].vdisc > 0)
   {
    devicewt(player[0].vdisc,ddbuf,1);    /* write */
    waitpoll(VDIS1_DEVICE);
    }

/* reset player two and get response */
if (player[1].vdisc > 0)
   {
    devicewt(player[1].vdisc,ddbuf,1);    /* write */
    waitpoll(VDIS2_DEVICE);
    }

}

unsigned get_frame(player_num)
    int player_num;

{
unsigned frame;
ddbuf[0] = 0xd;  /* read frame number */

devicewt(player[player_num].vdisc,ddbuf,1);    /* write */
waitpoll(VDIS1_DEVICE);

frame = byword(ddbuf[2],ddbuf[3]);
return(frame);

}

manual_vid()

{

ddbuf[0] = 0xe;  /* manual mode */
ddbuf[1] = 1;

/* player one  */
if (player[0].vdisc > 0)
   {
    devicewt(player[0].vdisc,ddbuf,2);    /* write */
    waitpoll(VDIS1_DEVICE);
    }

/* player two  */
if (player[1].vdisc > 0)
   {
    devicewt(player[1].vdisc,ddbuf,2);    /* write */
    waitpoll(VDIS2_DEVICE);
    }

}
```

```
/*****************************************************************************
        synchronization routines
                        signal_task()
                        clear_task()
                        wait_process()
                        signal_process()
                        block_process()
                        init_tasks()
        notes:

        history:
                01-28-86 rwp - initial entry
                01-29-86 rwp - add init_task()
                02-07-86 rwp - keep DEBUG in  it's previous state

*****************************************************************************/
/* signal that an event or task has occurred  */
#include "task.h"
#include "view.h"
#include "vstruct.h"
#include "viewdata.h"
#include "cmdnum.i"


signal_task(task_num)
    int task_num;

{
task_var[task_num] = 1;
}


/** clear an event or task  **/

clear_task(task_num)
    int task_num;
{
task_var[task_num] = 0;
}


/* check for an event or task and whether a process is blocked */

wait_process(task_num,process_num)
   int task_num;
   int process_num;

{
int proceed = FALSE;

/* if the task has occurred and the process is awake  */
if (task_var[task_num] && process_var[process_num])
    proceed = TRUE;

return(proceed);
}
/* signal that a process can proceed  */

signal_process(process_num)
    int process_num;

{
process_var[process_num] = 1;
}


/** block a process from proceeding **/

block_process(process_num)
    int process_num;
{
```

```
process_var[process_num] = 0;

}


/** initialize the task and process variables **/

init_tasks()

{

int i;
int debug_tsk;
int debug_proc;

debug_proc = process_var[DEBUG_PROCESS];
debug_tsk = task_var[DEBUG_TSK];

for (i = 0; i <= MAX_PROCESSES; i++)
     process_var[i] = 0;

for (i = 0; i<= MAX_TASKS; i++)
     task_var[i] = 0;

process_var[DEBUG_PROCESS] = debug_proc;
task_var[DEBUG_TSK] = debug_tsk;

signal_task(COMMAND_TSK);
signal_process(COMMAND_PROCESS);

}
/*****************************************************************************
        touch_process

        called with:
                nothing
        returns:
                VOID
        uses:
        notes:

        branch codes
        1 - Continue , goto next column
        2 - End Conductor
        3 - RETURN   return to location on return stack
        4 - GOTO EVENT goto the event in tchbrnch
        5 - GOSUB EVENT gosub the event in tchbrnch
        6 - GOSUB USER PROC gosub the program in tchbrnch
        7 - GOSUB LOOP SCREEN execute loop procedure and return
        8 - GOTO EVENT IN VARIABLE find the event name in variable
        9 - PAUSE
        10 - REPLAY
        11 - HELP
        12 - SLOW BACK
        13 - SLOW FORWARD
        14 - STOP
        15 - PAUSE MORE INFO
        16 - PUT THE VALUE IN A VARIABLE
        17 - RESUME
        18 - more help
        19 - cancel conductor
        20 - cancel help
        21 - No Action
        22 - user touch input
        23 - standard keyboard input

        history:
                01-27-86 rwp - initial entry
                01-28-86 rwp - make call to touch_branch
                             - call clear_task and block_process
                01-31-86 rwp - modify to call findgoto()
```

```
02-02-86 rwp - delete pcounter increment
             - add signal_process(COMMAND_PROCESS)

02-05-86 rwp - put last key touched in tchbrch[0].tcount
02-10-86 rwp - translate key numbers
02-12-86 rwp - add touchoff() and tch_on to file
02-21-86 rwp - add waitpoll
03-11-86 rwp - do not signal COMMAND PROCESS if no action or
               user input process

*****************************************************************************/
#include "task.h"
#include "view.h"
#include "vstruct.h"
#include "viewdata.h"
#include "cmdnum.i"
char *cfree();
char *cmalloc();


touch_process()

{
int key_num;

key_num = touch_key_buff[touch_key_buff[0]];
if (touch_key_buff[0])
    touch_key_buff[0]--;

tchbrch[0].tcount = key_num;                    /* the last key touched       */
tchbrch[key_num].tcount++;                      /* increment touch key counter */
t_action(tchbrch[key_num].k_action,key_num);    /* acknowledgement            */


/* execute the process for this key */
/******* this is for calling a process directly

(*tchbrch[key_num].tbrhptr)(tchbrch[key_num].tbrhcode,
                            tchbrch[key_num].tchbrnch);

*******/

/* touch_branch(touch_code,branch_label)    */
touch_branch(key_num,tchbrch[key_num].tbrhcode,tchbrch[key_num].tchbrnch);

clear_task(REGULAR_KEY_TSK);

/* don't signal command process if a do nothing touch or user input */

if (tchbrch[key_num].tbrhcode != 21 && tchbrch[key_num].tbrhcode !=22)
    {
    signal_process(COMMAND_PROCESS);
    block_process(REGULAR_KEY_PROCESS);
    }

}
/*****************************************************************************
        touch_branch()

        called with:
                int touch_code;
                char *branch_label;

        returns:
                none

        uses:
        notes:
        history:
                01-27-86 rwp - initial entry
                01-31-86 rwp - modify to use findgoto()
```

```
              03-07-86 rwp - add user defined touch input
              03-11-86 rwp - call user_in for user defined touch
******************************************************************************/

touch_branch(key,touch_code,branch_label)
     int key;
     int touch_code;
     char *branch_label;
{

int i,length;

if (touch_code == 21)
   return;

if (player[cur_play].status & AUTOPLAY)
    stopvid();

if (touch_code != 7 && touch_code != 5 && touch_code != 22)
   {
   clrtouch();
   touchoff();
   }

if (touch_code != 22)
   {
    tchbrch[1].tbrhcode = 0;
    findgoto(branch_label);
   }
else  /* user defined touch input */
   {
   /* put the key number back on the stack */
   touch_key_buff[0]++;
   touch_key_buff[touch_key_buff[0]] = key;
   user_input(TCHBOARD_TSK);
   }


}
/********************************************************************************
touchoff
********************************************************************************/


touchoff()


{
char i;

/* turn system and pause branches off */

for (i=1;i<61;i++)
     {
     tchbrch[i].tsrow = 0;
     }

/** de-activate touch screen **/

ddbuf[0] = 0x01;
ddbuf[1] = 0x00;

devicewt(touch,ddbuf,2);
waitpoll(TOUCH_DEVICE);

/* set the last key definitions to NULL */
tchbrstr[0]  = '\0';

}
```

```
/*****************************************************************************
tch_on     0 key table   1 - row col
*****************************************************************************/


tch_on(num)
   char num;

{
int cnt;
char i;

/** activate touch screen **/

ddbuf[0] = 0x01;
ddbuf[1] = tchstate;

/*****************************************************************************
if (num)
   ddbuf[1] = 0xc8;
*****************************************************************************/

devicewt(touch,ddbuf,2);
waitpoll(TOUCH_DEVICE);
/* if no key table defined then return */
if (tchbrstr[0] == '\0')
   return;

if (num == 0)      /* re-activate touch keys */
   {
    str_op[0] = cmalloc(250);
    strcpy(str_op[0],tchbrstr);
    dfntouch();
    str_op[0] = cfree(str_op[0]);
   }
}
/*****************************************************************************
tictime

18.20 tics per second

*****************************************************************************/


long tictime()

{
unsigned hours;
unsigned ticks;
long tot_ticks;

struct regval { int ax, bx, cx, dx,si, di, ds, es; };

struct regval regin;
struct regval regout;

regin.ax = 0;

/* Interrupt 26 is the timer interrupt */

int86(0x1a, &regin, &regout);


hours = regout.cx;
ticks = regout.dx;
tot_ticks = (hours * 65536) + ticks;
return(tot_ticks);

}
```

```
/*****************************************************************************

        trim_end(string_ptr)
                trims blanks off the end of strings.

        called with:
                pointer to the string.

        returns:
                VOID
        uses:
                strlen()
        notes:
             based on stctrimr (p) from Allen.

        history:
             01-23-86 rwp - initial entry.
*****************************************************************************/

#include "view.h"
#include "stdio.h"

trim_end(str_ptr)
   char *str_ptr;

{
char *new_ptr;
int length,n;

  length = strlen(str_ptr);
  new_ptr = str_ptr + length;
  while (length--)
   {
    if (*(--new_ptr)==' ')
       *new_ptr='\0';
    else
       break;
    }

}
/*****************************************************************************

        t_action() - touch acknowledgements

        called with:
                  num - acknowledgement code
                  key - the touch key number

        returns:
                  VOID
        uses:
                sbox()
                fill()
                fill_outside()
                devicewt()
                change_color()
                change_not_color()


        notes:

        history:
                01-31-86 rwp - initial description
*****************************************************************************/

#include "view.h"
#include "vstruct.h"
#include "viewdata.h"
```

```
t_action(num,key)
   char num;
   int key;
{
char buf[4];
unsigned srowcol;
unsigned erowcol;
char color1;
char color2;

switch(num)
      {
       case 255:     /* default action */
            if (key < 51)
                t_action(tchfeed,key);
            else
                t_action(sysfeed,key);
            break;
       case 1:     /* draw outline */
            sbox(tchbrch[key].tsrow,tchbrch[key].tscol,tchbrch[key].terow,
                  tchbrch[key].tecol,*tchbrch[key].k_act_ptr);
            break;
       case 2:    /* fill with color */
            if (smode == 4 || smode == 1)
               {
               srowcol = byword(tchbrch[key].tsrow,(tchbrch[key].tscol)/2);
               erowcol = byword(tchbrch[key].terow,(tchbrch[key].tecol)/2);
               color1 = ( *tchbrch[key].k_act_ptr & 7)/2;
               }
            else
               {
               srowcol = byword(tchbrch[key].tsrow,tchbrch[key].tscol);
               erowcol = byword(tchbrch[key].terow,tchbrch[key].tecol);
               color1 = *tchbrch[key].k_act_ptr;
               }
            fill((int)color1,srowcol,erowcol);
            break;
       case 3:    /* flood exterior with color */
            if (smode == 4 || smode == 1)
               {
               srowcol = byword(tchbrch[key].tsrow,(tchbrch[key].tscol)/2);
               erowcol = byword(tchbrch[key].terow,(tchbrch[key].tecol)/2);
               color1 = ( *tchbrch[key].k_act_ptr & 7)/2;
               }
            else
               {
               srowcol = byword(tchbrch[key].tsrow,tchbrch[key].tscol);
               erowcol = byword(tchbrch[key].terow,tchbrch[key].tecol);
               color1 = *tchbrch[key].k_act_ptr ;
               }
            fill_outside((int)color1,srowcol,erowcol);
            break;
       case 4:    /* sound good beep */
            buf[0] = 0x01;
            buf[1] = tchstate;
            buf[1] |= 0x20;
            devicewt(touch,buf,2);
            break;
       case 5:   /* sound bad beep   */
            buf[0] = 0x01;
            buf[1] = tchstate;
            buf[1] |= 0x10;
            devicewt(touch,buf,2);
            break;
       case 6:   /* speak chip    */
            break;
       case 7:  /* display message */
            break;
       case 8:  /* explode */
            exp_row = (tchbrch[key].terow + tchbrch[key].tsrow)/2;
            exp_col = (tchbrch[key].tecol + tchbrch[key].tscol)/2;
            break;
```

```
        case 9:  /* crush    */
             crushrow = (tchbrch[key].terow + tchbrch[key].tsrow)/2;
             crushcol = (tchbrch[key].tecol + tchbrch[key].tscol)/2;
             break;
        case 10:  /* change color 1 to color 2 */
             if (smode == 4 || smode == 1)
                {
                srowcol = byword(tchbrch[key].tsrow,(tchbrch[key].tscol)/2);
                erowcol = byword(tchbrch[key].terow,(tchbrch[key].tecol)/2);
                color1 = ( *tchbrch[key].k_act_ptr & 7)/2;
                color2 = ( *(tchbrch[key].k_act_ptr +1) & 7)/2;
                }
             else
                {
                srowcol = byword(tchbrch[key].tsrow,tchbrch[key].tscol);
                erowcol = byword(tchbrch[key].terow,tchbrch[key].tecol);
                color1 = *tchbrch[key].k_act_ptr ;
                color2 = *(tchbrch[key].k_act_ptr +1);
                }
             change_color((int)color1,(int)color2,srowcol,erowcol);

             break;
        case 11:  /* change not_color 1 to color 2 */
             if (smode == 4 || smode == 1)
                {
                srowcol = byword(tchbrch[key].tsrow,(tchbrch[key].tscol)/2);
                erowcol = byword(tchbrch[key].terow,(tchbrch[key].tecol)/2);
                color1 = ( *tchbrch[key].k_act_ptr & 7)/2;
                color2 = ( *(tchbrch[key].k_act_ptr +1) & 7)/2;
                }
             else
                {
                srowcol = byword(tchbrch[key].tsrow,tchbrch[key].tscol);
                erowcol = byword(tchbrch[key].terow,tchbrch[key].tecol);
                color1 = *tchbrch[key].k_act_ptr ;
                color2 = *(tchbrch[key].k_act_ptr +1);
                }
             change_not_color((int)color1,(int)color2,srowcol,erowcol);

             break;

        }
  }
/*****************************************************************************

        unstack()

        called with:
                command token number
        returns:
              VOID
        uses:

        notes:

        history:
                01-29-86 rwp - take out indicator display
*****************************************************************************/


#include "view.h"
#include "vstruct.h"
#include "task.h"
#include "viewdata.h"

unstack(cmdnum)
  char cmdnum;

{
struct command *cmdptr;
struct btable *bytptr;
```

```
struct stable *strptr;
struct ntable *numptr;
char bytcnt;
char numcnt;
char strcnt;
int i;
int indx;
char *op_base;
int v_max;
unsigned k;
static int num_of_cmds;

bytcnt = 0;
numcnt = 0;
strcnt = 0;

cmdptr = &cmdline[cmdnum];
v_max = cmdptr->varmax;
op_base = pcounter - v_max;
bytptr = &byttable[0];
numptr = &numtable[0];
strptr = &strtable[0];

for (i = 0; i < v_max; i++)
    {
     indx = *(op_base + i);
     switch(cmdptr->varcode[i])
            {
             case 0:     /* byte    */
                   *(byt_op + bytcnt++) = (bytptr+indx)->bvalue;
                   /* byt_op[bytcnt++] = byttable[indx].bvalue;   */
                   break;
             case 1:     /* unsigned */
                   *(num_op + numcnt++) = (numptr + indx)->nvalue;
                  /*  num_op[numcnt++] = numtable[indx].nvalue;   */
                   break;
             default:
                   *(str_op + strcnt++) = (strptr + indx)->svalue;
                   /* str_op[strcnt++] = strtable[indx].svalue;   */
                   break;
            }
     }

if (rmode == 1)
   {
    cursor(20,1);
    printf("%80s"," ");
    cursor(20,1);
    prt_all(cmdnum);
    if (dpause == 1)
        getch();
   }

/***
if (rmode == 1)
   {
    k = 1;
    prt_all(cmdnum);
    printf("\nIndicator = %u   ",sys_ind);
    for (i = 1; i<= 16;i++)
        {
         if (sys_ind & k)
             printf("1");
         else
             printf("0");
         if ( k < 16384)
             k  *= 2;
         else
             k = 32768;
        }
    if (dpause == 1)
```

```
        getch();
    }
*****************************************************************************/
}
/****************************************************************************

        userproc()      - calls a user program

        called with:
                the name of the user program

        returns:

        uses:

        notes:

        history:
                01-21-86 rwp - delete call to mainint()
                01-30-86 rwp - add init_tasks()
                02-03-86 rwp - delete init_tasks()
                02-05-86 rwp - add write of indicators to file
                02-14-86 rwp - add log_message()
                02-19-86 rwp - use system command instead of forkv()
                02-21-86 rwp - check the screen mode on return from user

*****************************************************************************/


#include "stdio.h"
#include "fcntl.h"
#include "view.h"
#include "vstruct.h"
#include "viewdata.h"
#include "cmdnum.i"

char *cfree();

userproc(name)
  char *name;

{

char log_buf[10];
char cur_directory[75];
char new_directory[10];
char new_args[128];
char *arg_ptr[10];
int error;
int arg_len;
int new_start;
int i;

for (i = 0;i<10;i++)
     arg_ptr[i] = NULL;

/* write indicators  */
lseek(cntlnum,30L,0);
write(cntlnum,(char *)&sys_ind,2);
/* log the presentation name */

log_message(5,evttable[cur_evt].ename);

/* close all the files for the presentation */
close(cntlnum);
close(indxnum);
close(litnum);
close(varnum);
close(libnum);

/* add log file call */
```

```
/* determine if this is a call to start another presentation */
if (strncmp("CND",name,3) == 0)
   {
    /* start new presentation */
    pcounter = tokenptr;
    strcpy(pres_name,name+4);
    newpres = 1;
    return;
   }

/* free memory */
graphmem = cfree(graphmem);

/* change to presentation directory */

find_dir(cur_directory);
sprintf(new_directory,"\\%s",pres_name);

chg_dir(new_directory);
/* write system indicators          */
/* log branch                       */


/* find the arguments */
arg_len = strlen(name);
new_start = 0;
i = 0;

/*** to use forkv
while (new_start < arg_len && i < 10)
       {
       arg_ptr[i++] = name + new_start;
       new_start = stcarg(name + new_start," ");
       *(name + new_start) = '\0';
       new_start++;
       }

*****/

/* call the user program */
/* error = forkv(name,arg_ptr);  */

error = system(name);
/* change the directory back */
sprintf(new_directory,"\\%s",cur_directory);


chg_dir(new_directory);

/* set smode to the current screen mode */
getvmode();

/* read author file */
/* if different presentation then do startup procedures */

/* on return from the user program re-open all files */
fd_files(pres_name);
presdata();

if (sys_brch)
     {
      /* branch to str_evt */
      findgoto(strt_evt);
     }

/* redisplay help icon */
if (tchbrch[51].tbrhcode)
     key25on(51);

}
```

```
/*******************************************************************************

        user_input()  - user input from keybroad or touch screen

        called with:
                 KEYBROAD_TSK or TCHBROAD_TSK

        returns:
                 VOID
        uses:

        notes:

        history:
                 01-30-86 rwp - initial entry
                 02-05-86 rwp - use wrtstr10() instead of wrtchr()
                 02-10-86 rwp - correct gcursor position
                              - the clearing and blocking of key processes
                                will occur in waittime()
                02-27-86 rwp - add cur_off()
                03-04-86 rwp - add touch input
                03-07-86 rwp - break into two functions
                               user_in() and key_action()
                             - add routine to handle user defined touch input
                03-10-86 rwp - use cursor() to move the text cursor.

*******************************************************************************/

#include "task.h"
#include "view.h"
#include "vstruct.h"
#include "viewdata.h"

user_input(input_code)
   int input_code;

{
int key;
int key_num;
int i,length;

if (input_code == TCHBOARD_TSK )
   {
    key_num  = touch_key_buff[touch_key_buff[0]];
    if (touch_key_buff[0])
        touch_key_buff[0]--;

    /* translate the touch key into a character or string */
    if (tchbrch[key_num].tbrhcode != 22)
       {
       if (key_num < 27)                /* A thru Z */
          key = 64 + key_num;
       else if (key_num < 37)           /* 0 thru 9 */
          key = 21 + key_num;
       else if ( key_num == 37)         /* backspace */
          key = 8;
       else if (key_num == 38)          /* space bar  */
          key = 32;
       else if (key_num == 39)          /* enter key  */
          key = CR;
      key_action(key);
       }
   else
      {
      length = strlen(tchbrch[key_num].tchbrnch);
      for  (i = 0;i<length;i++)
           {
           key_action((int)(*(tchbrch[key_num].tchbrnch + i)));
           }
      }
```

```
   }
else
   {
   /* get character from kb_buff */
    key = kb_buff[kb_buff[0]];
    if (kb_buff[0])
       kb_buff[0]--;
    key_action(key);

   }

clear_task(KEYBOARD_TSK);
clear_task(TCHBOARD_TSK);

}


/*****************************************************************************
key action
*****************************************************************************/

key_action(key)
  int key;

{
static int indx;
static row,col;
unsigned rowcol;

if (row == 0)
   {
   row = cur_row;
   col = cur_col;
   }

switch(key)
     {
      case CR:
           inputbuf[indx] = '\0';
           row = 0;
           col = 0;
           if (smode > 3)
              {
               rowcol = byword(cur_row,cur_col);
               gcursor(rowcol);
               }
           put_var(input_varname,input_record,inputbuf,indx+1);
           indx = 0;
           signal_process(COMMAND_PROCESS);
           cur_off();
           if (process_var[TCHBOARD_PROCESS])
               touchoff();
            /*
              the processes are not blocked here so that the waittime(0)
               will not wait. Waittime will block the processes.
            */
            break;
      case BACKSPACE:       /* on backspace */
           if (indx > 0)
              {
               inputbuf[indx-1] = 32;
               inputbuf[indx] = '\0';
               wrtstr10(inputbuf,inattril,row,col);
               inputbuf[indx-1] = '\0';
               indx--;
               if (inshow)
                  {
                   if (smode > 3)
                      {
                      rowcol = byword(cur_row,cur_col);
                      gcursor(rowcol);
```

```
                    rowcol = byword(cur_row,cur_col-1);
                    gcursor(rowcol);
                    }
                 cur_col--;
                 cursor(cur_row,cur_col);
                }
             }
          break;
      default:
          if (indx < insize)
              {
              inputbuf[indx] = key;
              inputbuf[++indx] = '\0';
               inshow = 1;            /* used to force display */
               if (inshow)
                   {
                   if (smode >3)
                       {
                        /* clear gcursor */
                        rowcol = byword(cur_row,cur_col);
                        gcursor(rowcol);
                        /* move the cursor */
                        rowcol = byword(cur_row,cur_col+1);
                        gcursor(rowcol);
                        }
                    /* write the string */
                    wrtstr10(inputbuf,inattril,row,col);
                    cur_col++;
                    cursor(cur_row,cur_col);

                   }
               }
          break;
     } /* end switch */

}
/*******************************************************************************
structures for user file

*******************************************************************************/


struct u_index
     {
      unsigned i_rec_len;
      char indx_name[12];
      unsigned i_var_rec_num;
      unsigned indx_loc;
      unsigned indx_len;
      char indx_type;
      char indx_format;
      unsigned u_recn_loc;
      unsigned u_recn_len;
      unsigned u_recn_type;
      unsigned u_file_rec_len;
      unsigned u_file_max_flds;
      };

struct u_field
     {
      char fld_name[12];
      unsigned f_var_rec_num;
      unsigned fld_loc;
      unsigned fld_len;
      char fld_type;
      char fld_precision;
      unsigned fld_mag;
      };
```

```
struct u_index user_indx;
struct u_field *user_field;
char *cmalloc();
long find_index();


/***************************************************************************
        bld_ufile_table()    - build the tables for the user file

        called with:
                user_dfn - file id for the user definition file

        returns:
                VOID
        uses:

        notes:
                If there is no user definition file this function is not
                called.

        history:
                02-12-86 rwp - initial entry

***************************************************************************/
#include "view.h"
#include "vstruct.h"
#include "viewdata.h"


bld_ufile_table(user_dfn)
   int user_dfn;

{

char buffer[50];
unsigned name_len;
struct u_field *field_ptr;
int i;


/* go to beginning of file */
   lseek(user_dfn,0L,0);

   read(user_dfn,(char *)&user_indx.i_rec_len,2);

/* skip number of index fields */
   lseek(user_dfn,4L,0);

   read(user_dfn,(char *)&name_len,2);
   read(user_dfn,(char *)&user_indx.indx_name,name_len);
   user_indx.indx_name[name_len] = '\0';
   read(user_dfn,buffer,17);

   user_indx.i_var_rec_num = *(unsigned *)buffer;
   user_indx.indx_loc     = *(unsigned *)(buffer + 2);
   user_indx.indx_len     = *(unsigned *)(buffer + 4);
   user_indx.indx_type    = *(buffer + 6);
   user_indx.indx_format  = *(buffer + 7);
   user_indx.u_recn_loc   = *(unsigned *)(buffer + 8);
   user_indx.u_recn_len   = *(unsigned *)(buffer + 10);
   user_indx.u_recn_type  = *(buffer + 12);
   user_indx.u_file_rec_len    = *(unsigned *)(buffer + 13);
   user_indx.u_file_max_flds    = *(unsigned *)(buffer + 15);

/* allocate memory for the user file fields  */
   user_field = (struct u_field *)cmalloc(user_indx.u_file_max_flds *
                                          sizeof(struct u_field));

   field_ptr = user_field;

/* get the user file field info */
   for (i = 1; i<= user_indx.u_file_max_flds;i++)
```

```
        read(user_dfn,(char *)&name_len,2);
        read(user_dfn,(char *)&field_ptr->fld_name,name_len);
        field_ptr->fld_name[name_len] = '\0';
        read(user_dfn,buffer,9);
        field_ptr->f_var_rec_num = *(unsigned *)(buffer);
        field_ptr->fld_loc       = *(unsigned *)(buffer + 2);
        field_ptr->fld_len       = *(unsigned *)(buffer + 4);
        field_ptr->fld_type      = *(buffer + 5);
        field_ptr->fld_precision = *(buffer + 6);
        field_ptr->fld_mag       = *(buffer + 7);
        field_ptr++;
        }

}


/*****************************************************************************
find index value
*****************************************************************************/

long find_index(update)
    int update;     /* 0 - no update 1 - update index */
{

long fsize;           /* size of the user index file  */
unsigned max_indx;    /* number of index entries      */
int i;                /* counter                      */
long pos;             /* lseek position               */
char var_buf[55];     /* buffer for variable file value  */
char index_buf[55];     /* buffer for index file value     */
long rec_num;

/* get the value of index from variable file */
/* get_var(name,number,buf,edit,size);       */

get_var(user_indx.indx_name,user_indx.i_var_rec_num,var_buf,
                                        1,user_indx.indx_len + 1);

trim_end(var_buf);
fsize = lseek(user_file_indx,0L,2);
max_indx = fsize/user_indx.i_rec_len;

for (i = 0; i< max_indx;i++)
    {
     pos = (long)(i * user_indx.i_rec_len);
     lseek(user_file_indx,pos,0);
     read(user_file_indx,index_buf,user_indx.i_rec_len);
     trim_end(index_buf);
     if (strcmp(var_buf,index_buf + user_indx.indx_loc) == 0)
        {
        break;
        }
    }


if (i < max_indx )
   {
    *(index_buf + user_indx.u_recn_loc + user_indx.u_recn_len) = '\0';
    rec_num = atol(index_buf + user_indx.u_recn_loc);
    /* set %ZFSTAT to 0 - it's found */
    return(rec_num + 1);
   }
else
    {
    if (update)
      {
      fsize = lseek(user_file,0L,2);
      rec_num = fsize/user_indx.u_file_rec_len;
      strcpy(index_buf,var_buf);
      sprintf(index_buf + user_indx.u_recn_loc,"%lu",rec_num);
      write(user_file_indx,index_buf,user_indx.i_rec_len);
     return(rec_num);
```

```
        }
    else
        {
        /* set %ZFSTAT to 1 */
        return(0L);
        }
    }

}

/*****************************************************************************
read_u_file()
*****************************************************************************/

read_u_file()
{

long indx_record;           /* index file record number            */
long user_offset;           /* beginning of record in user file    */
struct u_field *field_ptr;  /* pointer to field info               */
int i;                      /* counter                             */
char field_buf[42];         /* buffer for field value              */

indx_record = find_index(0);
/* %ZFSTAT is set in find_index()  */

if (indx_record)
   {
   /* set indx_record to 0 base */
   indx_record--;
   user_offset = indx_record * user_indx.u_file_rec_len;
   field_ptr = user_field;

   /* read each field */
    for (i = 0;i < user_indx.u_file_max_flds;i++)
        {
         lseek(user_file,user_offset + field_ptr->fld_loc,0);
         read(user_file,field_buf,field_ptr->fld_len);
         /* write the value to the variable file */
         put_var(field_ptr->fld_name,field_ptr->f_var_rec_num,
                     field_buf,field_ptr->fld_len);
         }

    }
}

/*****************************************************************************
write_u_file
*****************************************************************************/

write_u_file()

{
long indx_record;           /* index file record number            */
long user_offset;           /* beginning of record in user file    */
struct u_field *field_ptr;  /* pointer to field info               */
int i;                      /* counter                             */
char field_buf[42];         /* buffer for field value              */

indx_record = find_index(1);       /* update index */

/* %ZFSTAT is set in find_index()  */

if (indx_record)
   {
   /* set indx_record to 0 base */
   indx_record--;
   user_offset = indx_record * user_indx.u_file_rec_len;
   field_ptr = user_field;
```

```
/* write each field */
for (i = 0;i < user_indx.u_file_max_flds;i++)
    {
     get_var(field_ptr->fld_name,field_ptr->f_var_rec_num,
               field_buf,1,field_ptr->fld_len + 1);

     lseek(user_file,user_offset + field_ptr->fld_loc,0);
     write(user_file,field_buf,field_ptr->fld_len);
    }
}

}

/*****************************************************************************
call to find_index
*****************************************************************************/

find_u_file()

{
find_index(0);
}

/*****************************************************************************

        vdis1_process()

        called with:
                pointer to response buffer
        returns:
              VOID
        uses:

        notes:

        history:
                01-27-86 rwp - initial entry
                01-29-86 rwp - add sync
                02-21-86 rwp - add check for icon_process in play to from
                                and status
*****************************************************************************/


#include "task.h"
#include "vstruct.h"
#include "viewdata.h"

extern int ibsta;
extern int iberr;


vdis1_process(response_buf)
      char *response_buf;

{
switch(response_buf[0])
      {
      case 0:   /* reset videodisc */
      case 1:   /* load - unload disc */
      case 2:   /* still frame */
           break;
      case 3:   /* play to from */
           if (process_var[ICON_KEY_PROCESS] == 0);
              {
              clear_task(SEGMENT1_TSK);          /* segment 1 complete */
              clear_task(FRAMEWAIT1_TSK);        /* frame wait complete */
              signal_process(COMMAND_PROCESS);   /* execution can continue */
              player[0].status &= ~FRAMEBIT;
              player[0].waitfrm = 0;
              player[0].status &= ~AUTOPLAY;
              }
           break;
```

```
        case 4:   /* stop */
        case 5:   /* frame step */
        case 6:   /* frame number display */
        case 7:   /* audio control */
        case 8:   /* pass thru     */
             break;
        case 9:   /* match frame */
            if (process_var[ICON_KEY_PROCESS] == 0);
               {
               clear_task(FRAMEWAIT1_TSK);          /* found frame */
               signal_process(COMMAND_PROCESS);     /* execution can continue */
               player[0].status &= ~FRAMEBIT;
               player[0].waitfrm = 0;
               }
           break;
      case 12:    /*  videodisc status */
       if (process_var[ICON_KEY_PROCESS] == 0);
              {
              if (response_buf[2] & 0x10 )  /* player stopped */
                 {
                 clear_task(SEGMENT1_TSK);            /* segment 1 complete     *
/
                 clear_task(FRAMEWAIT1_TSK);          /* frame wait complete    *
/
                 signal_process(COMMAND_PROCESS);     /* execution can continue *
/
                 player[0].status &= ~FRAMEBIT;
                 player[0].waitfrm = 0;
                 }
              }
            break;
      case 13:    /* read frame number */
      case 14:    /* manual control */
           break;
   }

}

/*******************************************************************************

        vdis2_process()

        called with:
                 pointer to response buffer
        returns:
               VOID
        uses:

        notes:

        history:
                01-27-86 rwp - initial entry
                01-29-86 rwp - add sync
                02-21-86 rwp - add check for icon_process in play to from
                               and status

*******************************************************************************/


#include "task.h"
#include "vstruct.h"
#include "viewdata.h"

extern int ibsta;
extern int iberr;


vdis2_process(response_buf)
      char *response_buf;

{
```

```
switch(response_buf[0])
      {
      case 0:   /* reset videodisc */
      case 1:   /* load - unload disc */
      case 2:   /* still frame */
           break;
      case 3:   /* play to from */
           if (!process_var[ICON_KEY_PROCESS]);
              {
              clear_task(SEGMENT2_TSK);            /* segment 2 complete */
              clear_task(FRAMEWAIT2_TSK);          /* frame wait complete */
              signal_process(COMMAND_PROCESS);     /* execution can continue */
              player[0].status &= ~FRAMEBIT;
              player[0].waitfrm = 0;
              player[0].status &= ~AUTOPLAY;
              }
           break;
     case 4:   /* stop */
     case 5:   /* frame step */
     case 6:   /* frame number display */
     case 7:   /* audio control */
     case 8:   /* pass thru     */
          break;
     case 9:   /* match frame */
          clear_task(FRAMEWAIT2_TSK);          /* found frame */
          signal_process(COMMAND_PROCESS);     /* execution can continue */
          player[0].status &= ~FRAMEBIT;
          player[0].waitfrm = 0;
          break;
     case 12:    /*  videodisc status */
          if (!process_var[ICON_KEY_PROCESS]);
             {
             if (response_buf[2] & 0x10 )  /* player stopped */
                {
                 clear_task(SEGMENT2_TSK);       /* segment 2 complete     */
                 clear_task(FRAMEWAIT2_TSK);     /* frame wait complete    */
                 signal_process(COMMAND_PROCESS);/* execution can continue */
                 player[0].status &= ~FRAMEBIT;
                 player[0].waitfrm = 0;
                 }
             }
           break;
     case 13:    /* read frame number */
     case 14:    /* manual control */
          break;
   }

}

/*****************************************************************************
        video_process()

        called with:
                pointer to response buffer
        returns:
                none

        uses:
        notes:
        history:
                01-27-86 rwp - initial entry

*****************************************************************************/
#include "task.h"
#include "view.h"
#include "vstruct.h"
#include "viewdata.h"

video_process(response_buf)
     char *response_buf;
```

```
{

;

}

/***************************************************************************
        vision_poll()

        called with:
                nothing
        returns:
                code of device with a response.

        uses:
        notes:
        history:
                01-27-86 rwp - initial entry
                02-13-86 rwp - add ibtrace
                02-22-86 rwp - add device number

***************************************************************************/
#include "task.h"
#include "view.h"
#include "vstruct.h"
#include "viewdata.h"

vision_poll(device_num)
     int device_num;
{
char polbuf[2];          /* buffer for poll response */

polbuf[0] = 0;

/* poll vision */
ibrpp(touch,polbuf);
ibtrace(2,touch,2,polbuf);


if (device_num == 0)
   {
   if (polbuf[0])
      {
      /**
       set return based on device with message
       priority of tasks :
        (1) touch  (2) vdisc#1  (3) vdisc#2  (4) video (5)  speech
      **/

    if (polbuf[0] & TOUCHBIT)
        return(TOUCH_DEVICE);

    else if (polbuf[0] & VDIS1BIT)
            return(VDIS1_DEVICE);

    else if (polbuf[0] & VDIS2BIT)
            return(VDIS2_DEVICE);

    else if (polbuf[0] & VIDEOBIT)
            return(VIDEO_DEVICE);

    else if (polbuf[0] & SPEAKBIT)
            return(SPEAK_DEVICE);

      }
   return(FALSE);
   }
else
    {
    switch(device_num)
         {
```

```
        case TOUCH_DEVICE:
             if (polbuf[0] & TOUCHBIT)
                 return(TOUCH_DEVICE);
             break;
        case VDIS1_DEVICE:
             if (polbuf[0] & VDIS1BIT)
                return(VDIS1_DEVICE);
             break;
        case VDIS2_DEVICE:
             if (polbuf[0] & VDIS2BIT)
                return(VDIS2_DEVICE);
             break;
        case VIDEO_DEVICE:
             if (polbuf[0] & VIDEOBIT)
                return(VIDEO_DEVICE);
             break;
        case SPEAK_DEVICE:
             if (polbuf[0] & SPEAKBIT)
                 return(SPEAK_DEVICE);
             break;
       }
    }
  return(FALSE);
}

/*****************************************************************************
        vision_process()

        called with:
                 int device_num - the number of the device to read

        returns:
                none

        uses:
        notes:
        history:
                01-27-86 rwp - initial entry
                02-13-86 rwp - add ibtrace
                02-25-86 rwp - add retry of read if ibsta shows error

*****************************************************************************/

#include "task.h"
#include "view.h"
#include "vstruct.h"
#include "viewdata.h"

extern unsigned ibsta;

vision_process(device_num)
   int device_num;

{
char errornum = 0;
int done = FALSE;


while (!done)
       {
       ibrd(device_var[device_num],ddbuf,255);
       ibtrace(3,device_var[device_num],255,ddbuf);

       if (ibsta & 0xc000)    /* bits 15 and 14 */
           errornum++;
       else
           done = TRUE;

       if (errornum > 10)
           {
           if (rmode)
```

```
            printf("\nError reading Vision");
        return(FALSE);
        }
    }

switch(device_num)
    {
     case TOUCH_DEVICE:         /* touch screen */
          get_touch_key(ddbuf);
          break;
     case VDIS1_DEVICE:         /* video player 1 */
          vdis1_process(ddbuf);
          break;
     case VDIS2_DEVICE:         /* video player 2 */
          vdis2_process(ddbuf);
          break;
     case SPEAK_DEVICE:         /* speech chip    */
          speak_process(ddbuf);
          break;
     case VIDEO_DEVICE:         /* video          */
          video_process(ddbuf);
          break;
    }
return(TRUE);
}


/*****************************************************************************
        waitpoll - wait for a specific device

        called with:
                device number

        returns:
                none

        uses:
        notes:
        history:
                02-21-86 rwp - initial entry
                02-22-86 rwp - add waitall
                02-24-86 rwp - delete ibtrace write
                             - add trace
                             - delete waitall()

*****************************************************************************/


#include "task.h"
#include "view.h"
#include "vstruct.h"
#include "viewdata.h"

waitpoll(poll_device)
     int poll_device;

{
int done = FALSE;
int new_poll;
int errnum = 0;

while (!done)
       {
        /* poll to see if there is a response from Vision */
        new_poll = vision_poll(poll_device);

        /***********
        /* if this is the required response call vision process */
        sprintf(trace_buf + buf_cnt,"\nLooking for %2d  Found %2d",
                                        poll_device,new_poll);
```

```
        buf_cnt += 26;
        if (buf_cnt > 2950)
            {
              wrt_ib_buf();
              buf_cnt = 0;
            }
        ***********/

        if ( new_poll == poll_device)
              {
               vision_process(poll_device);
               done = TRUE;
              }

        }
}
/**************************************************************************
clear any outstanding responses
**************************************************************************/

clear_poll()
{

int done = FALSE;
int new_poll;

return;

while (!done)
        {
          /* poll to see if there is a response from Vision */
          new_poll = vision_poll(0);
          if ( new_poll)
                {
                 vision_process(new_poll);
                }
           else
                done = TRUE;
        }
 }

 /************************************************************************
          write strings

          called with:

          returns:

          uses:

          notes:

          history:
                  02-04-86 rwp - delete vretrace()
                  02-06-86 rwp - use wrtstr10() midified by T.R.
                  03-06-86 rwp - change  for mode d & e
                                      from -> back = (att >> 4) & 7;
                                      to   -> back = (att >> 4);

  ************************************************************************/


  #include "dos.h"
  #include "vstruct.h"
  #include "viewdata.h"


  wrtch10 (ch,att)  /* write ch to screen at current cursor position,
                       incrementing that position by one column.  No
```

```
                        provision for row or screen wrap. Uses int10h */
int ch;              /* character to display */
int att;             /* display attribute */
{
  union REGS inregs;
  union REGS outregs;
  unsigned row,column;

  inregs.h.bh = 0x00;
  inregs.h.ah = 0x09;
  inregs.x.cx = 0x01;
  inregs.h.al = ch;
  inregs.h.bl = att;
  /* vretrace(); */
  int86(0x10,&inregs,&outregs);
  inregs.h.ah = 0x03;
  inregs.h.bh = 0x00;
  /* vretrace(); */
  int86(0x10,&inregs,&outregs);
  row = outregs.h.dh;
  column = outregs.h.dl;
  if (column < maxcol-1)  /* zero based row col */
      column++;
  else
      {
      row++;
      column = 0;
      }
  cursor(++row,++column);  /* 1 based */
}


char *point();
int mov_addr();
extern int fill();

/* return 0 if ok, 1 if string truncated to avoid screen scroll */

int wrtstr10 (string,att,row,column)
char *string;
unsigned int att;
int row, column;
  {                                               /* base 1,1 */
  int slen,rowcol,back,i,exit;
  char *s,*d;
  unsigned char_att;
  union REGS inregs;
  union REGS outregs;

     exit = 0;

     slen = strlen(string);

     if (smode < 4)
        {
        s = (char *)&char_att;                    /* point source pointer to at
t/char word */
        d = point(row,column);                    /* point dest to screen */

        for (i = 0;i < slen;i++,d+=2)             /* move a string */
           {                                      /* will move nulls if request
ed */
           char_att = (att << 8) + *(string+i);
           movmem(s, d, 2);                       /* move a word */
           }
        }
     else
        {
        rowcol = (row << 8) + column;
        if (smode == 4)
```

```
            att &= 3;               /* color 0 to 3 on 0 */
         else
            if (smode == 6)
               att &= 1;            /* color 0 to 1 on 0 */
            else
               if (smode >= 13)
                  {
                  back = (att >> 4) ;
                  fill(back,rowcol,rowcol+slen-1);      /* fill with background
color */
                  att = 0x80 | ((att & 15) ^ back);     /* xor foreground */
                  }
         if (row == 25)
            if ((column + slen) > maxcol)               /* avoid wrap */
               {
               exit = 1;                                /* inform caller */
               slen = maxcol - column;                  /* truncate */
               }

         --row;
         --column;                                      /* int 10 uses base 0,0
*/
         for (i = 0;i < slen;i++)
            {
            inregs.x.ax = 0x0200;                       /* set cursor position *
/
            inregs.x.bx = 0;
            inregs.x.dx = (row << 8) + column;          /* base 0 */
            int86(0x10,&inregs,&outregs);

            inregs.h.ah = 0x09;                         /* write char-att */
            inregs.h.al = *(string + i);                /* character code */
            inregs.x.bx = att;
            inregs.x.cx = 1;
            int86(0x10,&inregs,&outregs);
            if (++column > maxcol)
               {
               ++row;
               column = 0;
               }
            }
         }

      return(exit);
   }


/* return a memory pointer to a row/column on the EGA card */
char *point(row,col)
unsigned int row,col;
   {
   struct seg_off {
                  unsigned int off;
                  unsigned int seg;
                  } v_ram;
   char *d;

      switch (smode)
         {
         case 1:
                v_ram.off = 80 * (row - 1);
                v_ram.off += 2 * (col - 1);
                v_ram.seg = 0xb800;
                break;
         case 3:
                v_ram.off = 160 * (row - 1);
                v_ram.off += 2 * (col - 1);
                v_ram.seg = 0xb800;
                break;
         case 4:
                v ram.off = 320 * (row - 1);
```

```
                v_ram.off += 2 * (col - 1);
                v_ram.seg = 0xb800;
                break;
        case 6:
                v_ram.off = 320 * (row - 1);
                v_ram.off += (col - 1);
                v_ram.seg = 0xb800;
                break;
        case 13:
                v_ram.off = 320 * (row - 1);
                v_ram.off += (col - 1);
                v_ram.seg = 0xa000;
                break;
        case 14:
                v_ram.off = 640 * (row - 1);
                v_ram.off += (col - 1);
                v_ram.seg = 0xa000;
                break;
        default:
                v_ram.off = 80 * (row - 1);
                v_ram.off += 2 * (col - 1);
                v_ram.seg = 0xb800;
                break;
        }
      mov_addr(&v_ram,&d,4);
      return(d);
   }

/* move 4 bytes from s to d */
mov_addr(s,d,n)
char *s,*d;
unsigned int n;
   {
   movmem(s,d,4);
   }

/*****************************************************************************
        write_touch counters

        called with:

        returns:

        uses:

        notes:

        history:
                02-10-86 rwp - initial entry

*****************************************************************************/

#include "view.h"
#include "vstruct.h"
#include "viewdata.h"


wrt_tch()

{
int key;
int i;
char tch_name[4];
char buffer[10];

for (i = 0; i<61;i++)
    {
    if (i < 11 && i > 0)
       key = i + 50;
    else if ( i > 10)
```

```
    key = i - 10;
 else
     key = 0;
 sprintf(buffer,"%u",tchbrch[key].tcount);
 sprintf(tch_name,"\%T%d",key);
 put_var(tch_name,tch_rec_num[key],buffer,9);
 }
```

Having thus described our invention, what we claim as new and desire to secure by Letters Patent is as follows:

1. An interactive software multi-media presentation composing method for a computer system, said computer system comprising a display monitor and an operator input device, said computer system controlling a plurality of input and output multi-media devices, said software method assisting an operator of the computer system in developing an interactive multi-media presentation for use by a user, said interactive multi-media presentation comprising a plurality of events executed by the computer system and the input and output multi-media devices under the control of said computer system and in response to inputs by said user, said software method comprising the steps of:

providing to the operator on the display monitor for each event in a presentation list of events a set of event elements which may take place during the event and a set of time periods for the event elements, each event element in the list corresponding to an input or output multi-media device controlled by said computer;

said set of event elements and said set of time elements defining a matrix whereby each cell of the matrix represents the operation of one of said multi-media devices during one time period of a plurality of time periods of an event;

prompting the operator to select one or more event elements from the list and to specify a time period for each event element selected;

prompting the operator, for each event, to specify a next event, said next event including a branch event dependent on a user input during said interactive presentation; and generating and storing a representation of each event and the sequence in which events are to be executed by the computer system and the devices under its control, all in response to signals from the operator input device.

2. The software method recited in claim 1 wherein the operator input device is a keyboard and further comprising the step of prompting the operator to specify a word or phrase for comparing with a keyed variable input from said keyboard.

3. The software method recited in claim 1 wherein the operator input device is a touch screen, further comprising the steps of:

prompting the operator to define the size and location of active areas on the touch screen; and prompting the operator to specify a branch event in the presentation for each defined active area.

4. The software method recited in claim 3 further including the step of prompting the operator to specify for each defined active area various kinds of visual or auditory feedback to a user of the multi-media presentation.

5. The software method recited in claim 1 wherein the output devices include a video disk player for reading a video disk that stores information to be presented, further comprising the step of prompting the operator to specify an address on the video disk when an event element corresponding to the video disk player is selected by the operator as an event element.

6. The software method recited in claim 1 including the step of displaying to the operator on the display monitor options selectable by the operator of authoring an event, erasing an event, or testing an event.

7. The software method recited in claim 6 wherein the option of authoring an event includes the option of editing an event previously authored, said method comprising the step of accepting an operator input editing an event by inserting or removing columns in the matrix.

8. The software method recited in claim 6 wherein the operation of authoring an event includes the option of editing an event previously authored and a row of the matrix is a time row specifying the time periods of the event elements, said method comprising the step of accepting an operator input to directly edit the time row.

9. The software method recited in claim 6 wherein, when the operator selects the option to test an event, said method comprises the step of running an authored event.

10. A interactive software multi-media composing and presentation method for a computer system, said computer system comprising a display monitor and an operator input device, said computer system controlling a plurality of input and output multi-media devices, said software method assisting an operator in composing a multi-media presentation comprising a plurality of events and presenting to a user a composed interactive presentation using said computer system, said method comprising the steps of:

displaying on the monitor to the operator who composes the multi-media presentation a time-line for each event in the presentation, said time-line being in the form of a matrix formed by said event elements and time periods for operation of said event elements, each event element corresponding to an input or output multi-media device controlled by the computer;

prompting the operator to select one or more event elements and to specify the time period of operation for each event element selected by entering selections in corresponding cells of the matrix;

prompting the operator, for each event, to specify a next event, said next event including a branch event dependent on a user input during said presentation;

generating and storing a representation of each event and the sequence in which events are to be executed in response to signals from an input device; and interactively executing the composed multi-media presentation in response to user inputs by retrieving and reading the stored representations of the events of the presentation according to a sequence in which they are to be executed and activating the input and output multi-media devices as specified in the time-lines for each event.

11. The software method recited in claim 10 wherein the step of executing comprises the steps of:

logically analyzing the time-line for the current event and any operator inputs to determine the next event to be read;

reading the next event; and then performing said step of activating said input and output devices controlled by said computer for the next event.

12. The method recited in claim 11 wherein said step of activating comprises the steps of:

controlling said input and output multi-media devices so that every event element having a selection in cells corresponding a common time period of the matrix appear to occur simultaneously; and controlling said input and output multi-media devices so that event elements having selections in cells corresponding to different time periods of the matrix appear to occur at different times.

13. An interactive software multi-media presentation method for presenting on a computer an interactive multi-media presentation composed by filling in a time-line for each event of a plurality of events making up the presentation, said time-line being in the form of a matrix defined by event elements and time periods for operation of said event elements, said event elements corresponding to input or output multi-media devices which are controlled by said computer, each of said events identifying a next event in the presentation, said method comprising the steps of:

logically analyzing by said computer the time-line corresponding to a current event and any user inputs to determine a next event to be read, said next event including a branch event when specified;

retrieving and reading by said computer the next event; and activating by said computer those input and output multi-media devices corresponding to the current event as specified by the time-line of said next event; and repeating said steps until said presentation is completed.

14. The method recited in claim 13 wherein said step of activating comprises the steps of:

controlling said input and output multi-media devices so that event elements having entries in cells corresponding a common time period of said matrix appear to occur simultaneously; and controlling said input and output multi-media devices so that event elements having entries in cells corresponding to different time periods of said matrix appear to occur at different times.

* * * * *